US005390356A

United States Patent [19]

Houlberg

[11] Patent Number: 5,390,356

[45] Date of Patent: Feb. 14, 1995

[54] RAPID REPROGRAMMING TERMINAL

[75] Inventor: Christian L. Houlberg, Ventura, Calif.

[73] Assignee: The United States of America as represented by the Secretary of the Navy, Washington, D.C.

[21] Appl. No.: 182,958

[22] Filed: Jan. 11, 1994

Related U.S. Application Data

[63] Continuation-in-part of Ser. No. 878,704, May 5, 1992, Pat. No. 5,307,505.

[51] Int. Cl.[6] .......... G06F 13/00

[52] U.S. Cl. .......... 395/800; 395/200; 364/242.5; 364/260; 364/942; 364/942.3; 364/DIG. 2

[58] Field of Search .......... 395/200, 800, 725; 364/242.5, 260, 260.1, 260.2, 260.3, 926, 942

[56] References Cited

U.S. PATENT DOCUMENTS

| | | | |
|---|---|---|---|
| 4,777,595 | 10/1988 | Strecker et al. | 364/200 |
| 4,805,137 | 2/1989 | Grant et al. | 364/900 |
| 4,821,180 | 4/1989 | Gerety et al. | 364/200 |
| 4,937,777 | 6/1990 | Flood et al. | 364/900 |
| 4,945,473 | 7/1990 | Holtey et al. | 364/200 |
| 5,048,771 | 9/1991 | Siering | 244/3.15 |

*Primary Examiner*—Alyssa H. Bowler

*Assistant Examiner*—Valerie Darbe

*Attorney, Agent, or Firm*—David Kalmbaugh; Melvin Sliwka

[57] ABSTRACT

A rapid reprogramming terminal for reprogramming all electronic warfare and avionics systems aboard an aircraft including the bus controllers for each avionics or electronic warfare bus on the MS-1553 multiplex data bus in the aircraft and the remote terminals connected to each bus in the aircraft. The rapid reprogramming terminal includes a high speed digital signal processor which executes the functions required to reprogram a remote terminal or bus controller through software stored in an electrically erasable program read only memory. The information required to reprogram a remote terminal or bus controller is stored on an IC memory card which is electrically coupled to the digital signal processor. When the rapid reprogramming terminal establishes communications with either an avionics bus or electronic warfare bus by enabling certain discretes associated with the bus, the digital data required to reprogram, for example, a remote terminal is transferred from the IC memory card through the digital signal processor in a parallel format to a 1553 communications interface controller. The controller converts the digital data to Manchester encoded differential data for transfer via the MS-1553 multiplex data bus to the remote terminal or bus controller being reprogrammed.

11 Claims, 43 Drawing Sheets

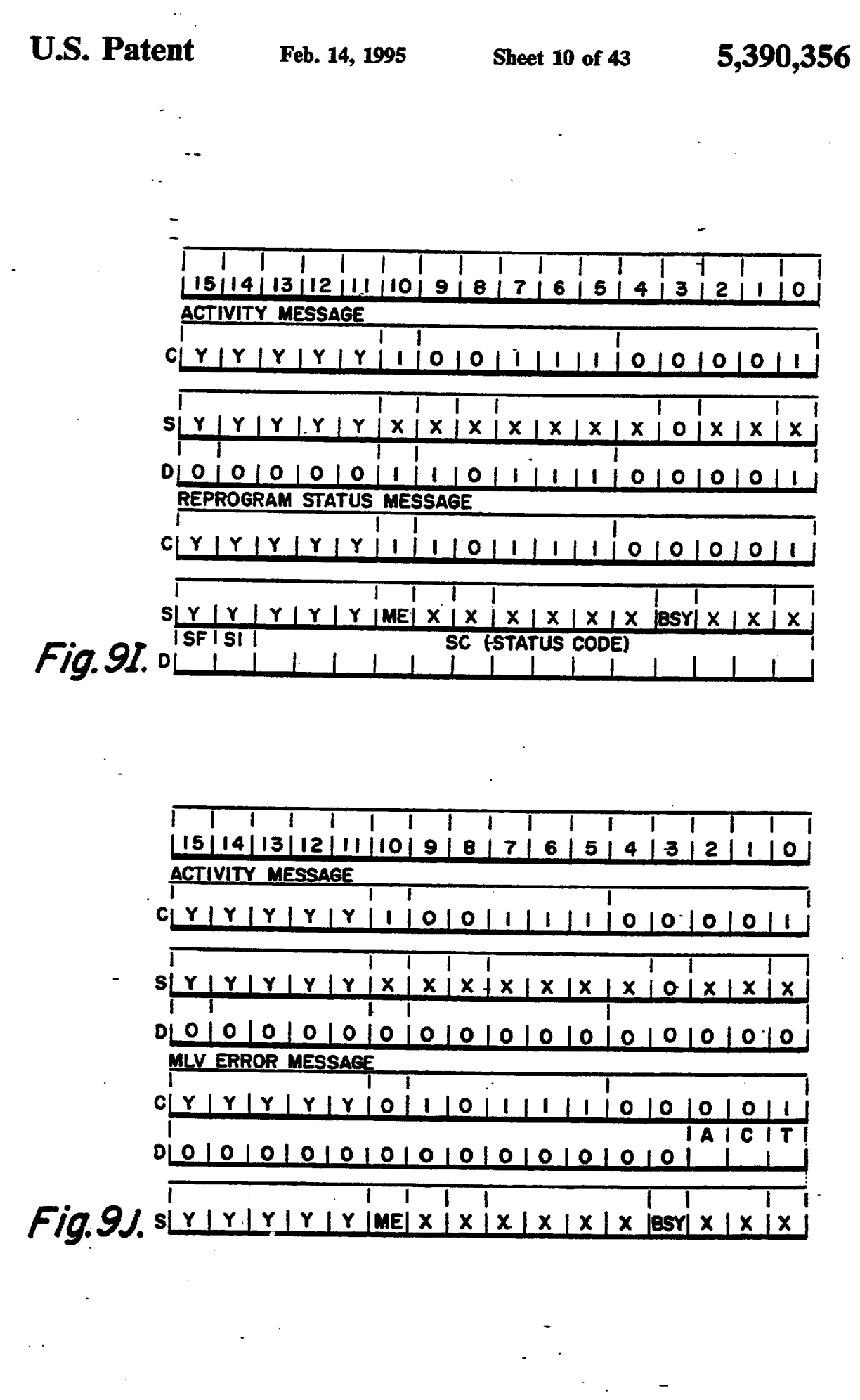

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| **ACTIVITY MESSAGE** | | | | | | | | | | | | | | | | |
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 1 | 1 | 0 | 1 | 1 | 1 | 0 | 0 | 0 | 0 | 1 |
| **REPROGRAM STATUS MESSAGE** | | | | | | | | | | | | | | | | |
| C | Y | Y | Y | Y | Y | 1 | 1 | 0 | 1 | 1 | 1 | 0 | 0 | 0 | 0 | 1 |
| S | Y | Y | Y | Y | Y | ME | X | X | X | X | X | X | BSY | X | X | X |
| D | SF | SI | SC (STATUS CODE) | | | | | | | | | | | | | |

Fig. 9I.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| **ACTIVITY MESSAGE** | | | | | | | | | | | | | | | | |
| C | Y | Y | Y | Y | Y | 1 | 0 | 0 | 1 | 1 | 1 | 0 | 0 | 0 | 0 | 1 |
| S | Y | Y | Y | Y | Y | X | X | X | X | X | X | X | 0 | X | X | X |
| D | 0 | 0 | 0 | 0 | 0 | 0 | 0 | 0 | 0 | 0 | 0 | 0 | 0 | 0 | 0 | 0 |
| **MLV ERROR MESSAGE** | | | | | | | | | | | | | | | | |
| C | Y | Y | Y | Y | Y | 0 | 1 | 0 | 1 | 1 | 1 | 0 | 0 | 0 | 0 | 1 |
| D | 0 | 0 | 0 | 0 | 0 | 0 | 0 | 0 | 0 | 0 | 0 | 0 | 0 | A | C | T |
| S | Y | Y | Y | Y | Y | ME | X | X | X | X | X | X | BSY | X | X | X |

Fig. 9J.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 0 | 1 | 0 | 1 | WORD COUNT 1-32 | | | | |
| MEMORY DATA LOAD MESSAGE | | | | | | | | | | | | | | | | |
| C | Z | Z | Z | Z | Z | 1 | 1 | 0 | 1 | 0 | 1 | WORD COUNT 1-32 | | | | |
| S | Z | Z | Z | Z | Z | ME | 0 | 0 | 0 | 0 | 0 | 0 | 0 | 0 | 0 | TF |
| D1 | DATA | | | | | | | | | | | | | | | |
| D2 | DATA | | | | | | | | | | | | | | | |
| DN | DATA | | | | | | | | | | | | | | | |

Fig. 11F.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 0 | 1 | 0 | 1 | 0 | 1 | WORD COUNT 1-32 | | | | |
| MESSAGE DATA VERIFY MESSAGE | | | | | | | | | | | | | | | | |
| C | Z | Z | Z | Z | Z | 0 | 1 | 0 | 1 | 0 | 1 | WORD COUNT 1-32 | | | | |
| D1 | DATA | | | | | | | | | | | | | | | |
| D2 | DATA | | | | | | | | | | | | | | | |
| DN | DATA | | | | | | | | | | | | | | | |
| S | Z | Z | Z | Z | Z | ME | 0 | 0 | 0 | 0 | 0 | 0 | BSY | 0 | 0 | TF |

Fig. 11G.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 0 | 1 | 1 | 0 | 0 | 0 | 0 | 1 | 0 |
| TRAILER MESSAGE | | | | | | | | | | | | | | | | |
| C | Z | Z | Z | Z | Z | 1 | 1 | 0 | 1 | 1 | 0 | 0 | 0 | 0 | 1 | 0 |
| S | Z | Z | Z | Z | Z | ME | 0 | 0 | 0 | 0 | 0 | 0 | 0 | 0 | 0 | TF |
| D1 | SUB-PAGE/REGISTER COUNT | | | | | | | | FIRST SUB-PAGE/REGISTER | | | | | | | |
| D2 | CHECKSUM | | | | | | | | | | | | | | | |

Fig. 11H.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| REPROGRAM STATUS MESSAGE | | | | | | | | | | | | | | | | |
| C | Z | Z | Z | Z | Z | 0 | 1 | 0 | 1 | 1 | 1 | 0 | 0 | 0 | 0 | 1 |
| D | SF | SI | SC (STATUS CODE) | | | | | | | | | | | | | |
| S | Z | Z | Z | Z | Z | ME | 0 | 0 | 0 | 0 | 0 | 0 | 0 | 0 | 0 | TE |

Fig. 11I.

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVITY MESSAGE | | | | | | | | | | | | | | | | |
| C | Z | Z | Z | Z | Z | 1 | 0 | 0 | 1 | 1 | 1 | 0 | 0 | 0 | 0 | 1 |
| S | Z | Z | Z | Z | Z | ME | 0 | 1 | 0 | 0 | 0 | 0 | 0 | 0 | 0 | TF |
| D | 0 | 0 | 0 | 0 | 0 | 1 | 1 | 0 | 1 | 1 | 1 | 0 | 0 | 0 | 0 | 1 |
| MLV ERROR MESSAGE | | | | | | | | | | | | | | | | |
| C | Z | Z | Z | Z | Z | 1 | 1 | 0 | 1 | 1 | 1 | 0 | 0 | 0 | 0 | 1 |
| S | Z | Z | Z | Z | Z | ME | 0 | 0 | 0 | 0 | 0 | 0 | 0 | 0 | 0 | TF |
| D | 0 | 0 | 0 | 0 | 0 | 0 | 0 | 0 | 0 | 0 | 0 | 0 | 0 | A | C | T |

Fig. 11J.

RAPID REPROGRAMMING TERMINAL

This application is a continuation-in-part of patent application Ser. No. 07/878,704, filed May 5, 1992, now U.S. Pat. No. 5,307,505.

BACKGROUND OF THE INVENTION

1. Field of the Invention

This invention relates generally to memory loading apparatus and, in particular, to a light weight portable reprogramming and data verifier apparatus which may be used to load data into aircraft avionics and electronic warfare and countermeasure systems and then verify the accuracy of the data.

2. Description of the Prior Art

In the prior art there are memory loader and data verifier systems which provide the means for loading data into the avionics aboard military aircraft and thereby reprogram the aircraft avionics. These prior art memory loader and data verifier systems are also utilized to load data into the aircraft's electronic warfare and countermeasure systems. In addition, these prior art systems will verify that the data is loaded correctly into the aircraft's avionics and electronic warfare and countermeasure systems.

One such device of the prior art is the Memory Loader Verifier, Model ASM-607MLV manufactured by Texas Instruments, while another such device of the prior art is the Advanced Memory Loader Verifier, Model ASM-607AMLV also manufactured by Texas Instruments.

Each of these prior art devices load new data into the avionics and electronic warfare and countermeasure systems aboard the aircraft and then verify that the memories have been correctly loaded. The new data is loaded via an aircraft's multiplex data bus which generally meets the design requirements of military standard (MIL-STD)-1553. This, in turn, allows for the reprogramming of aircraft on-board avionics and electronic warfare systems.

While satisfactory for their intended purpose which is the reprogramming of military aircraft on board avionics and electronic warfare and countermeasures systems, these memory loader verifier (MLV) systems of the prior art leave something to be desired in that they often do not make use of state of the art high speed electronics which results in these prior art MLV systems having a slow operating speed, being susceptible to failure, and being bulky in size. Further, these prior art MLV systems are very expensive to produce.

With the above and other disadvantages known to prior art memory loader verifier systems the present invention was conceived and one of its objects is to provide a means whereby the avionics on board an aircraft can be reprogrammed.

Another object of the present invention is to provide a means whereby the electronic warfare and countermeasures systems on board an aircraft can be reprogrammed.

It is yet another object of the present invention to provide a portable, inexpensive and compact reprogramming terminal for reprogramming the avionics and electronic warfare and countermeasures systems on board an aircraft.

It is still another object of the present invention to verify that the data loaded from the reprogramming terminal is correctly loaded into the avionics and electronic warfare and countermeasures systems on board an aircraft.

A further object of the present invention is to provide a reprogramming terminal which uses high speed, state of the art electronics technology to allow for the rapid reprogramming of the avionics and electronic warfare and countermeasures systems on board an aircraft.

Various other objects and advantages of the present invention will become apparent to those skilled in the art as a more detailed description of the invention is set forth below.

SUMMARY OF THE INVENTION

The aforesaid and other objects of the invention are accomplished by a rapid reprogramming terminal adapted for communication with military aircraft MS-1553 multiplex data bus which includes generally five avionics and one electronic warfare bus on board each aircraft. The rapid reprogramming terminal of the present invention may be used to reprogram all electronic warfare and avionics systems on board the aircraft including the bus controllers for each avionics or electronic warfare bus on the aircraft and the remote terminals connected to each bus on the aircraft. The rapid reprogramming terminal includes a high speed digital signal processor which executes the functions required to reprogram a remote terminal or bus controller through software stored in an electrically erasable program read only memory (EEPROM). The information required to reprogram a remote terminal or bus controller is stored on an IC memory card which is electrically coupled to the digital signal processor. When the rapid reprogramming terminal establishes communications with either an avionics bus or electronic warfare bus by enabling certain discretes associated with the bus, the digital data required to reprogram, for example, a remote terminal connected to the avionics bus is transferred from the IC memory card through the digital signal processor in a parallel format to a 1553 communications interface controller/terminal. The 1553 communications interface terminal converts the digital data from the digital signal processor to Manchester encoded differential data for transfer via the MS-1553 multiplex data bus to the remote terminal or bus controller being reprogrammed. Data from a remote terminal or bus controller on the MS-1553 multiplex data bus is converted from Manchester encoded differential data to digital data in a parallel format and then transferred to the digital signal processor for processing.

The rapid reprogramming terminal of the present invention also provides for a verify operation whereby the data stored in the IC memory card is compared with the data stored in the bus controller or remote terminal being reprogrammed to verify that the data stored in the bus controller or remote terminal being reprogrammed is identical to the data in the IC memory card.

BRIEF DESCRIPTION OF THE DRAWINGS

FIG. 9I illustrates the format of a reprogram status message transferred via the 1553 multiplex data bus from a remote terminal being reprogrammed;

FIG. 9J illustrates the format of a RRT error message transferred via the 1553 multiplex data bus to a remote terminal being reprogrammed;

FIG. 11F illustrates the format of a memory data load message transferred via the 1553 multiplex data bus to a bus controller being reprogrammed;

FIG. 11G illustrates the format of a memory data verify message transferred via the 1553 multiplex data bus to a bus controller being reprogrammed;

FIG. 11H illustrates the format of a trailer message transferred via the 1553 multiplex data bus to a bus controller being reprogrammed;

FIG. 11I illustrates the format of a reprogram status message transferred via the 1553 multiplex data bus from a bus controller being reprogrammed;

FIG. 11J illustrates the format of a RRT error message transferred via the 1553 multiplex data bus to a remote terminal berg reprogrammed;

DETAILED DESCRIPTION OF THE PREFERRED EMBODIMENT

Figure 1:
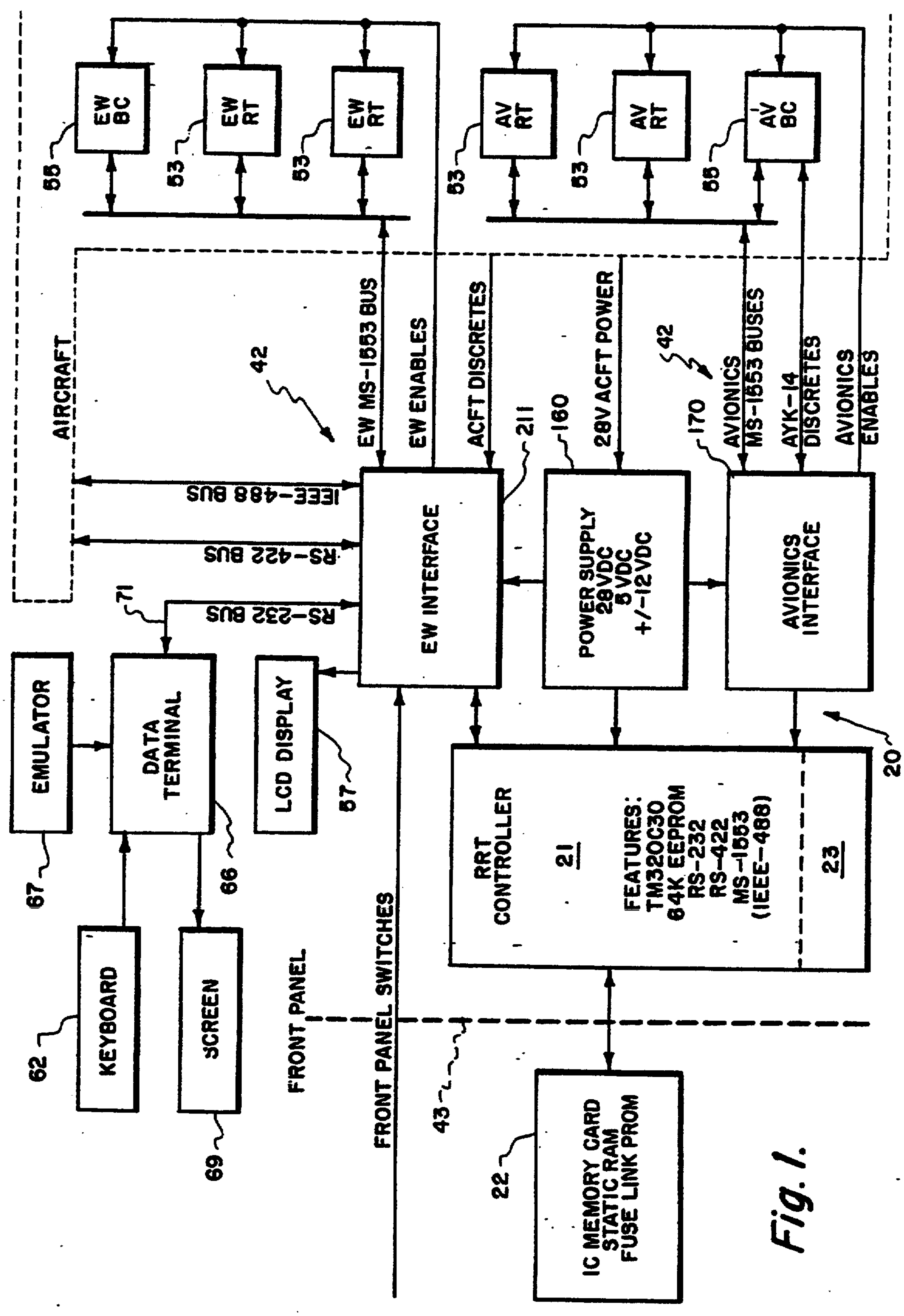
FIG. 1 is a block diagram illustrating the rapid reprogramming terminal interfacing with the 1553 multiplex data bus on board an aircraft.

Referring to FIGS. 1, 16A, 16B, 16D and 16E, the rapid reprogramming terminal 20 of the present invention comprises a digital signal processor 21 which controls the communications interfaces of rapid reprogramming terminal 20, controls the discrete signals provided by and supplied to rapid reprogramming terminal 20 and effects the transfer of digital data to and from an IC memory card 22. Digital signal processor 21, in turn, receives it instructions from an EEPROM 23, provides addressing to EEPROM 23 and utilizes an internal RAM as storage for certain software and temporary storage of data and status bits. EEPROM 23 consist of four 64K×8 bit EEPROMs 240, 241, 244 and 246, FIG. 16D, configured in parallel which function as a single 64K×32 bit EEPROM. Programs are loaded into EEPROM memory under software control of digital signal processor 21, that is digital signal processor 21 provides addressing, data and control signals to EEPROM 23 under the direction of software stored in the internal random access memory of digital signal processor 21. Rapid reprogramming terminal 20 also includes IC memory card 22 which stores the digital data required to reprogram the aircraft on board avionics and electronic warfare and countermeasures systems. Data read from IC memory card 22 is masked to the least sixteen significant bits of each word since the remaining bits are floating and would be read as noise. It should be noted that the digital signal processor used in the preferred embodiment of the present invention is a Texas Instrument Model TMS320C30 Digital Signal Processor.

The 28 megahertz system clock signal for rapid reprogramming terminal 20 is provided by a system clock generator 27 and is supplied to the X2/CLKIN input of digital signal processor 21.

Programmable array logic devices 24 and 25 function as decoders for address and control signals supplied thereto to direct the operation of all external devices to digital signal processor 21. Device 24 is programmed to convert a primary address line input (A22 input) of device 24 and the control line inputs (/STRB, CARD-0_WP, CARDWP_1 MCS1/0 and R/W inputs) into control signals (/EEPROM, /MCS0, /MCS1, /RD and /WR) that control EEPROM 23 and memory cards zero and one of IC memory card 22.

At this time it should be noted that IC memory card 22 comprises a pair of identical IC memory cards with the first IC memory card (memory card zero) being electrically connected to an electrical connector 28 and the second IC memory card (memory card one) being electrically connected to an electrical connector 29.

Figure 3:
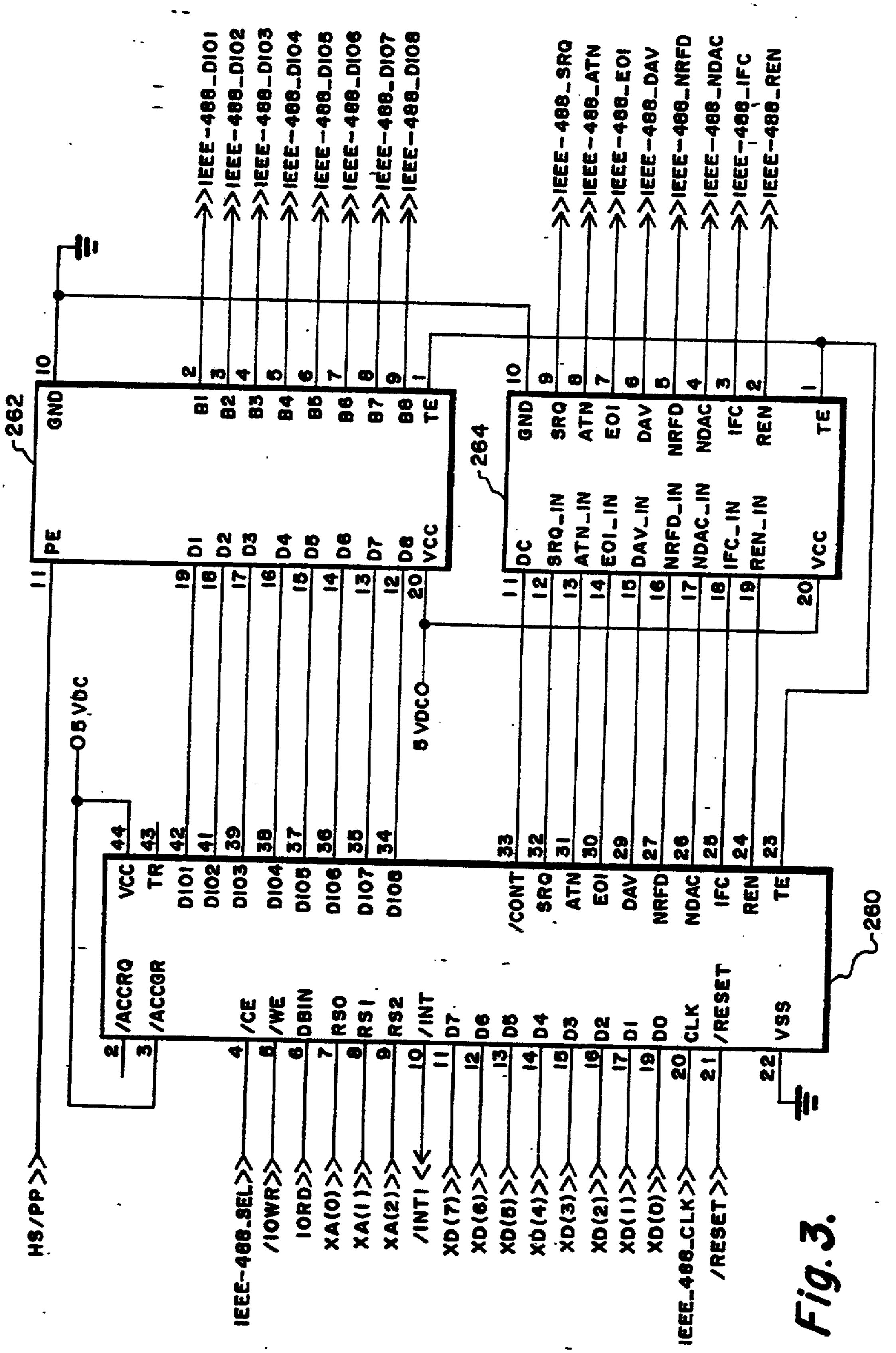
FIG. 3 is an electronics circuit diagram for the interface bus controller for the IEEE-488 bus.
Figure 16A:
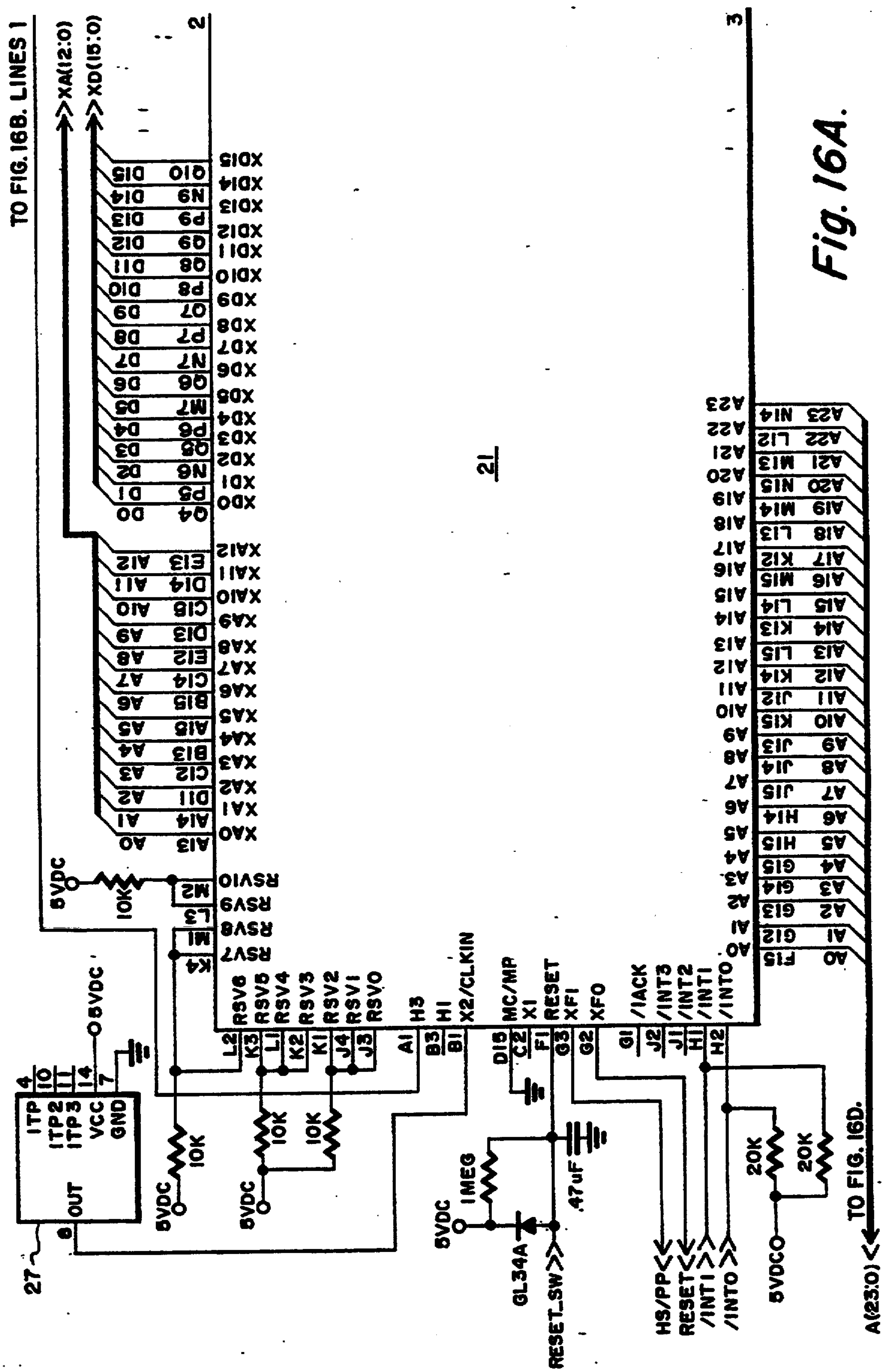
FIGS. 16A-16H are a detailed electrical schematic of the control circuitry including the digital signal processor of the rapid reprogramming terminal.
Figure 16B:
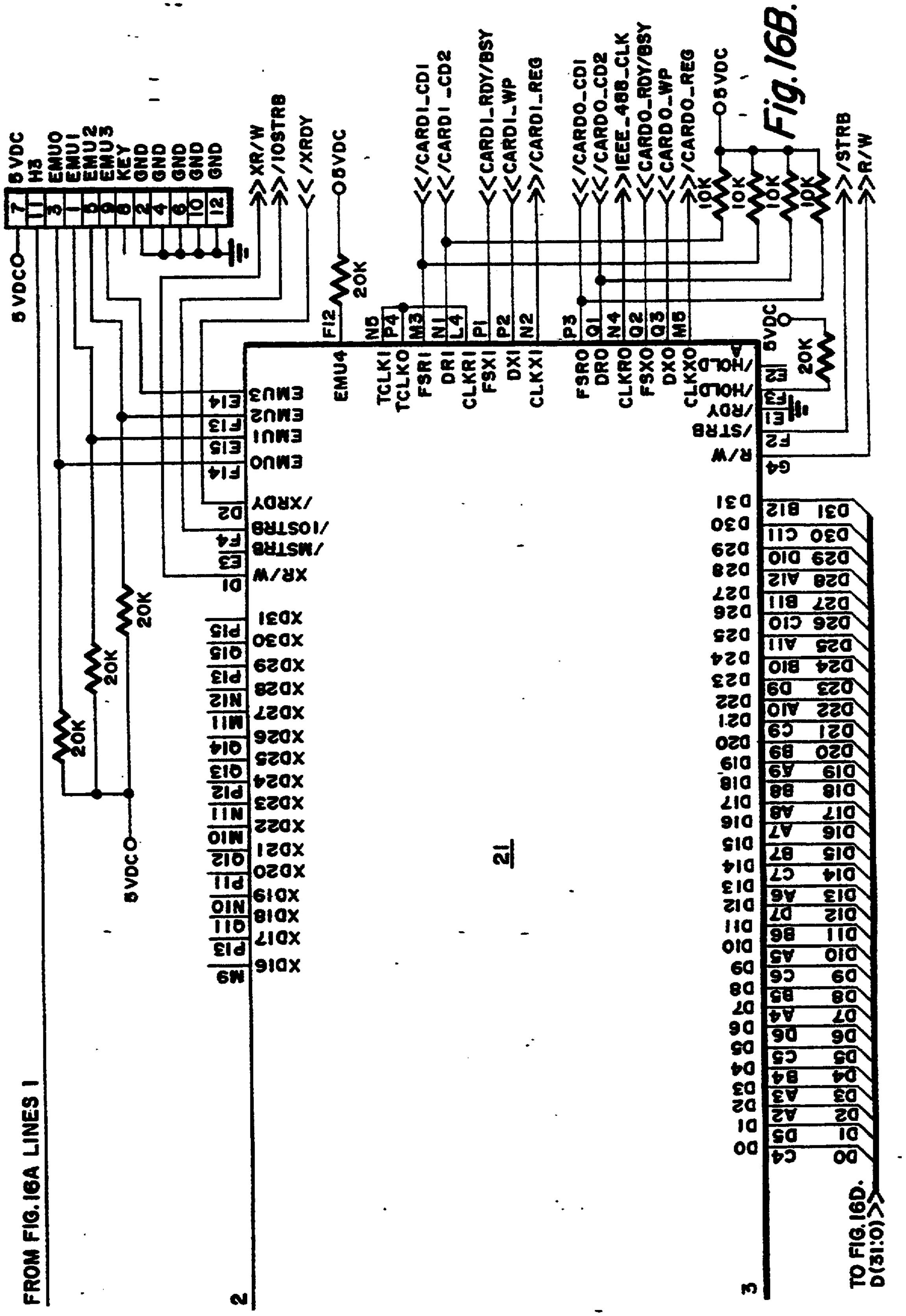
Figure 16C:
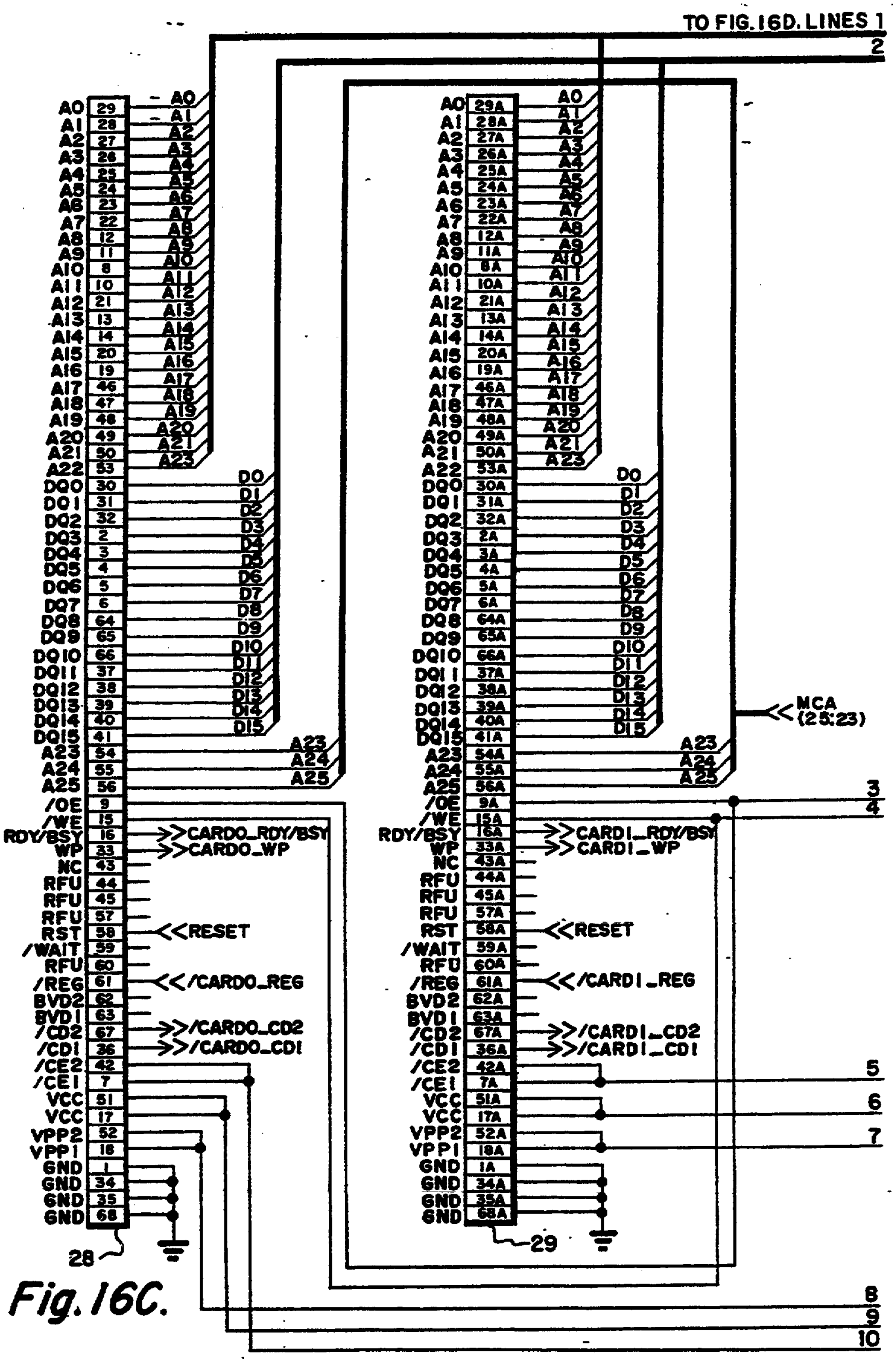
Figures 16D, 16E:
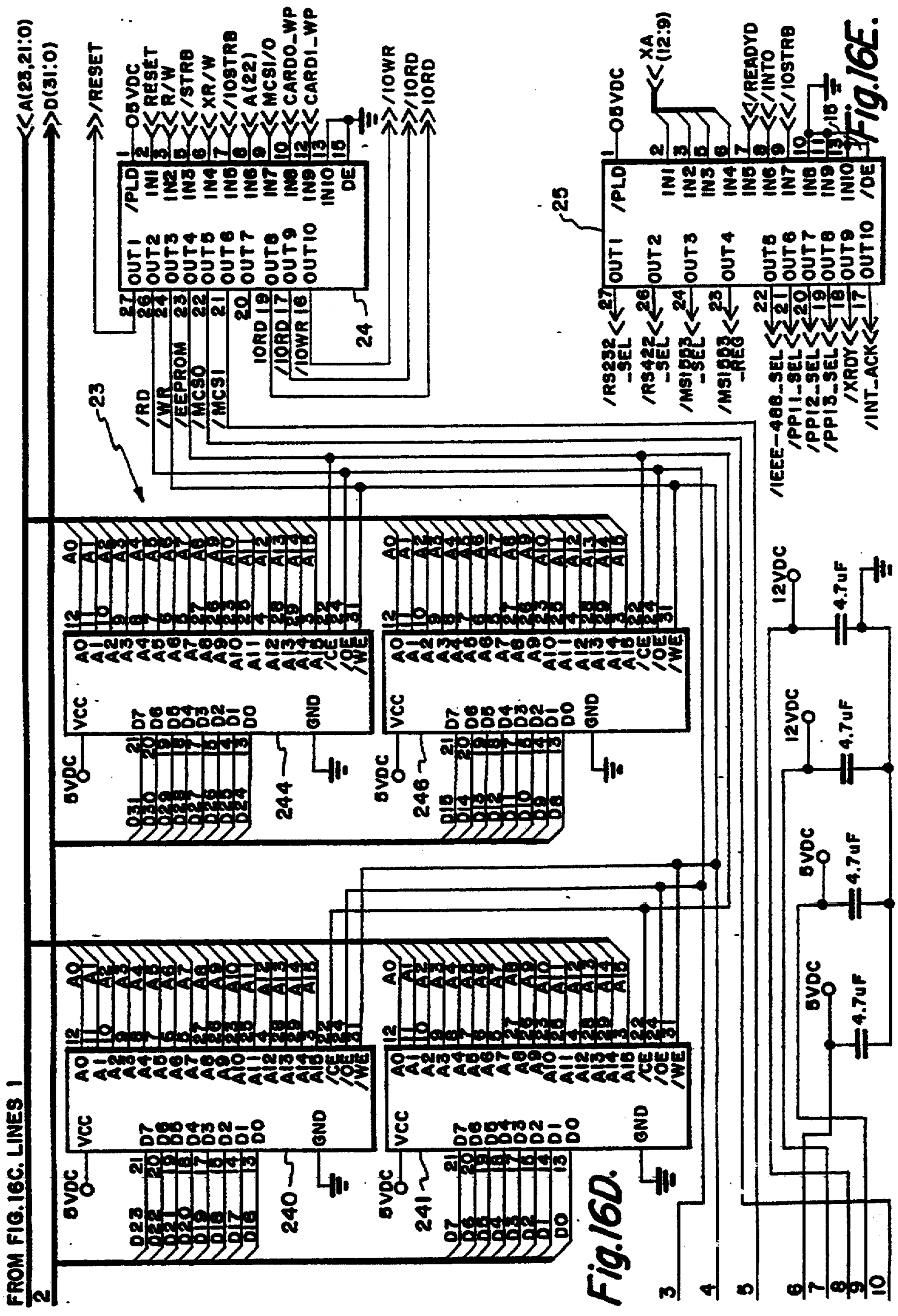
Figure 16F:
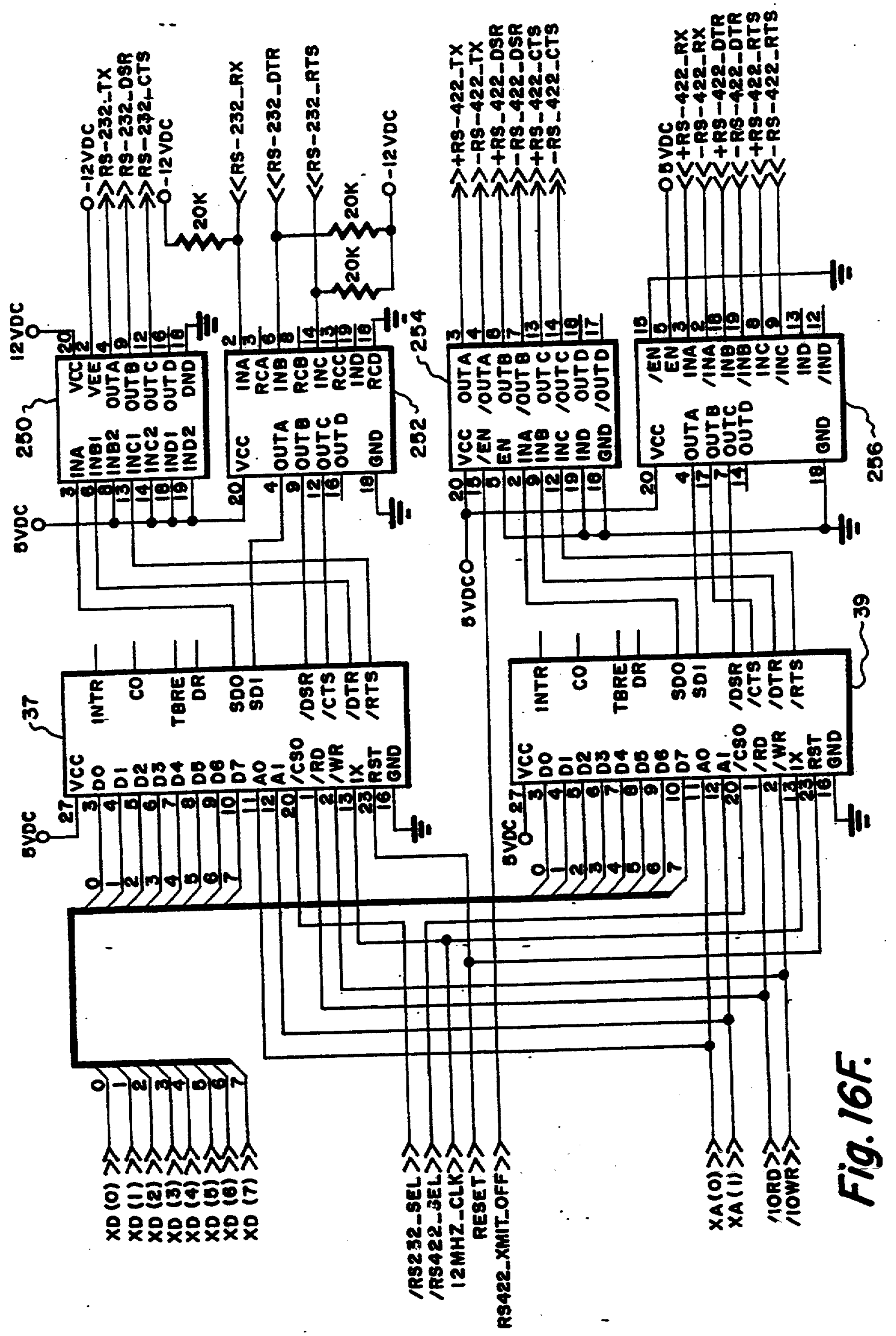
Figure 16G:
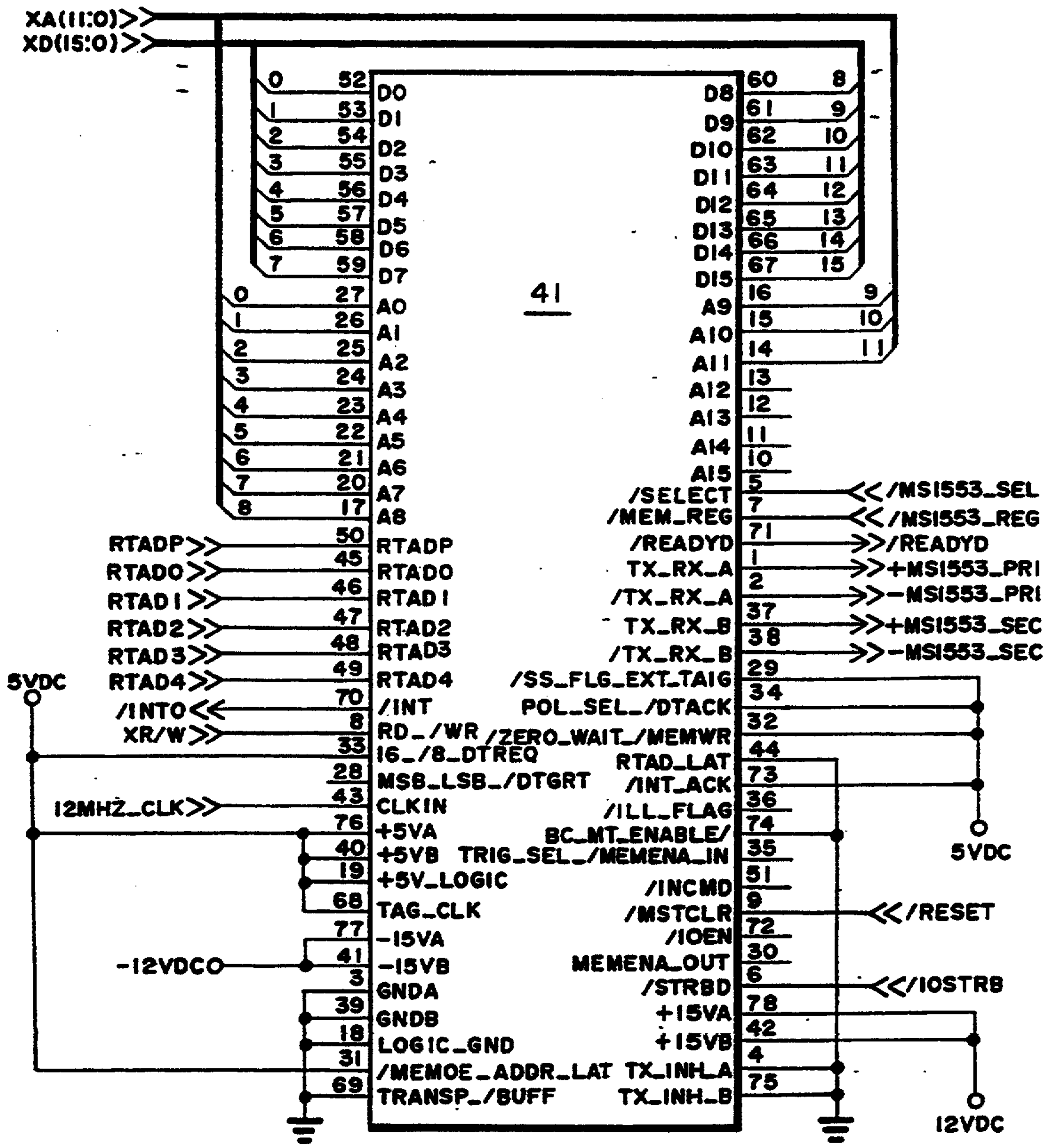
Figure 17:
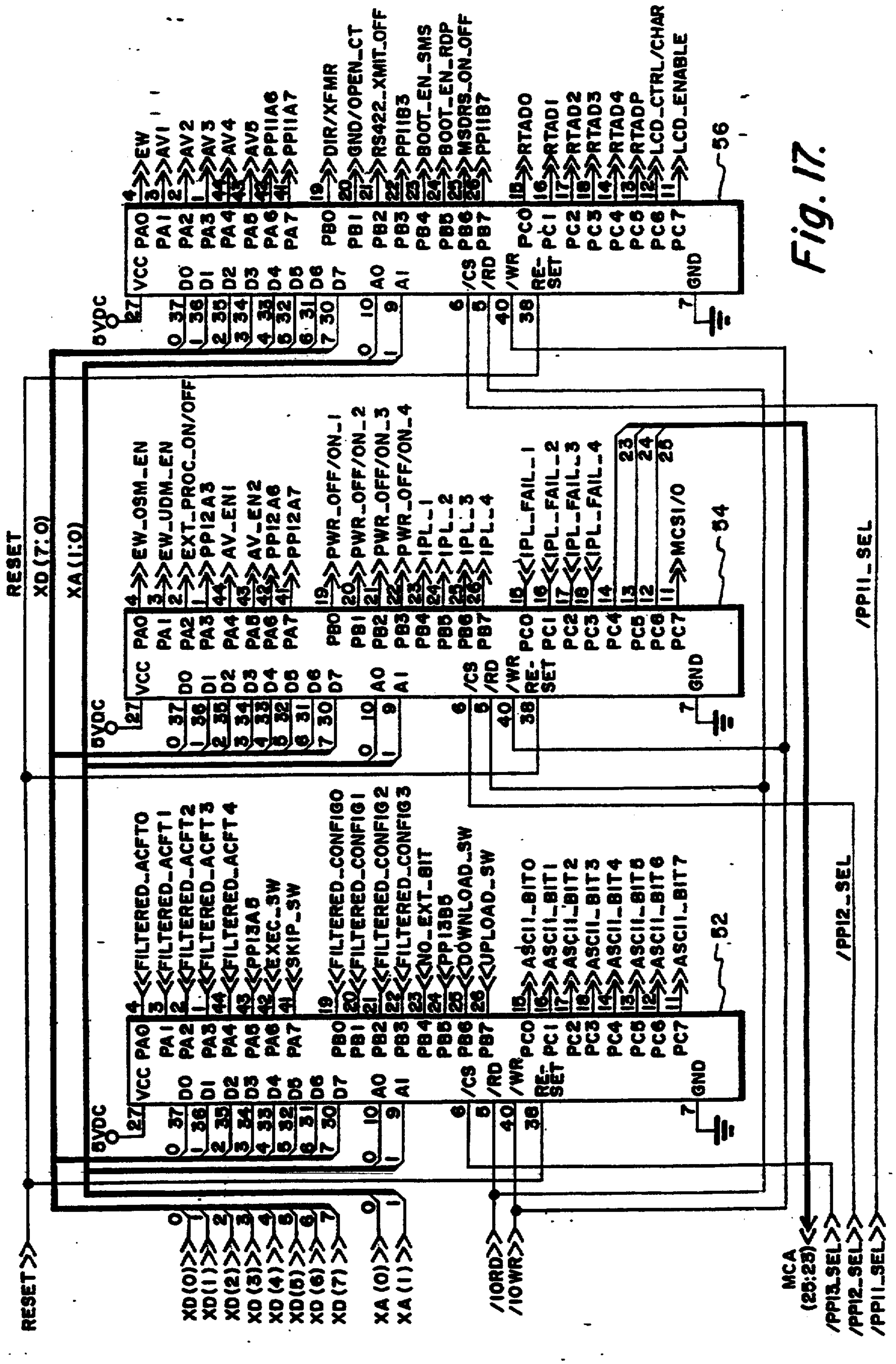
FIG. 17 is an electronics circuit diagram of the discrete interface of the rapid reprogramming terminal.
Figure 18A:
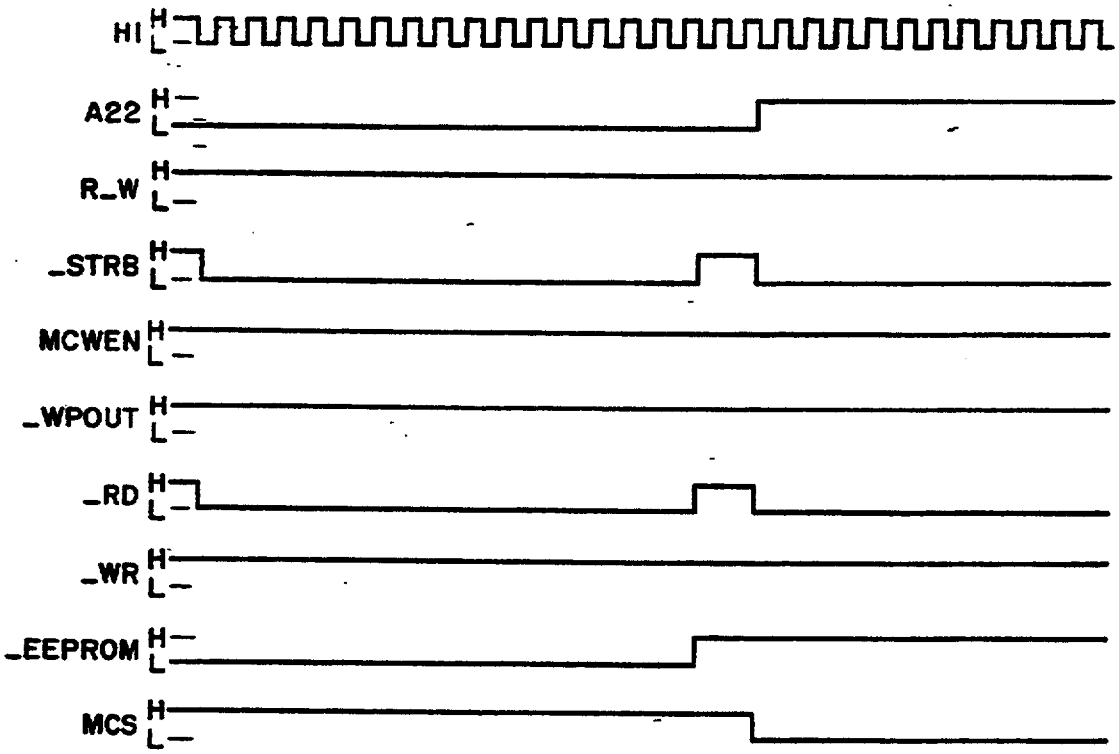
FIGS. 18A-18G illustrate the read and write timing signals for certain electrical devices of the rapid reprogramming terminal.
Figure 18B:
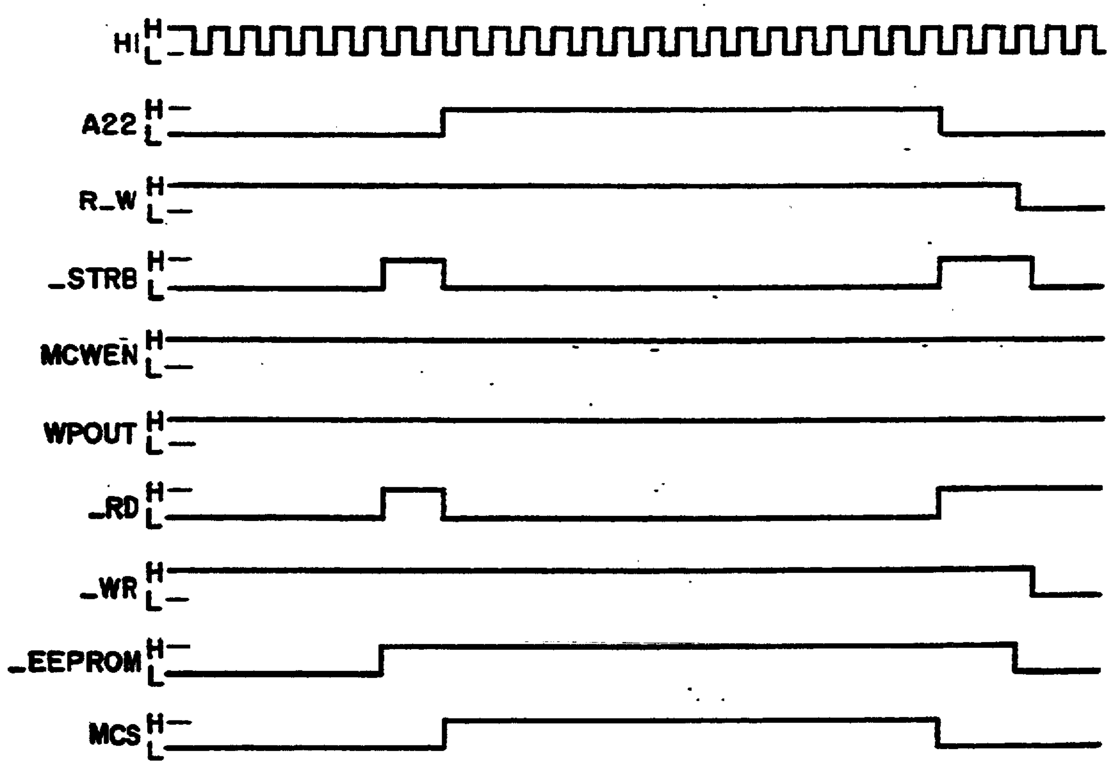
Figure 18C:
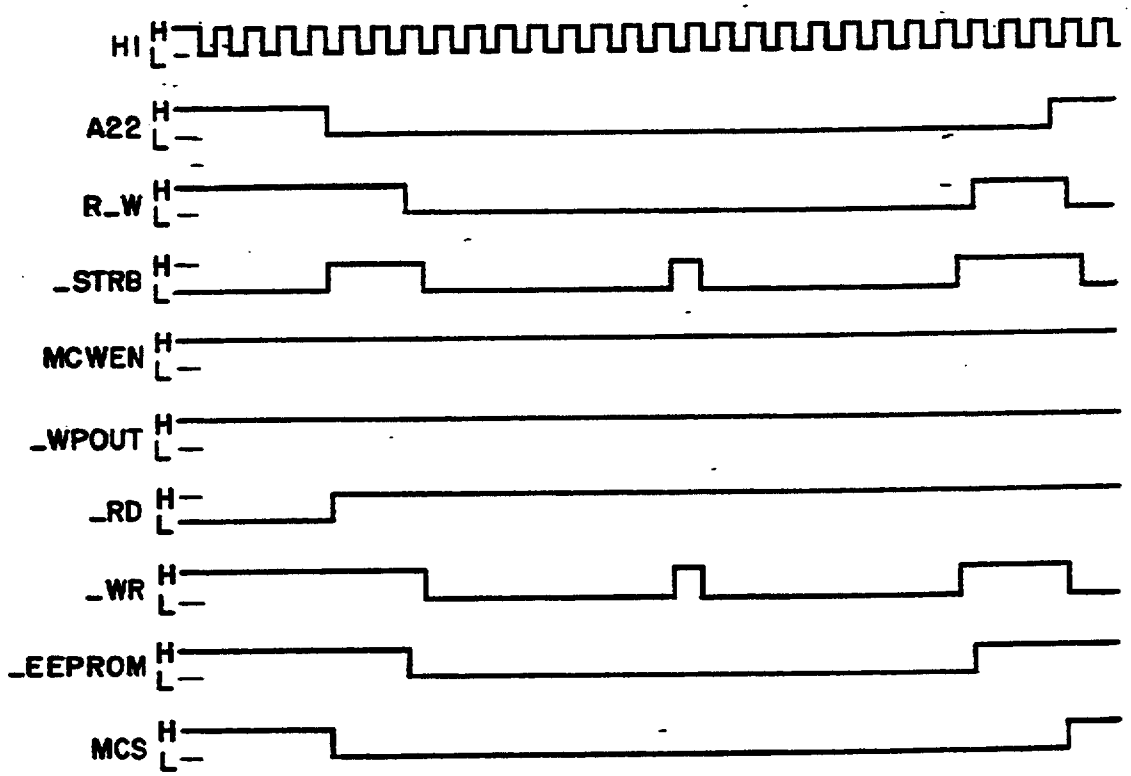
Figure 18D:
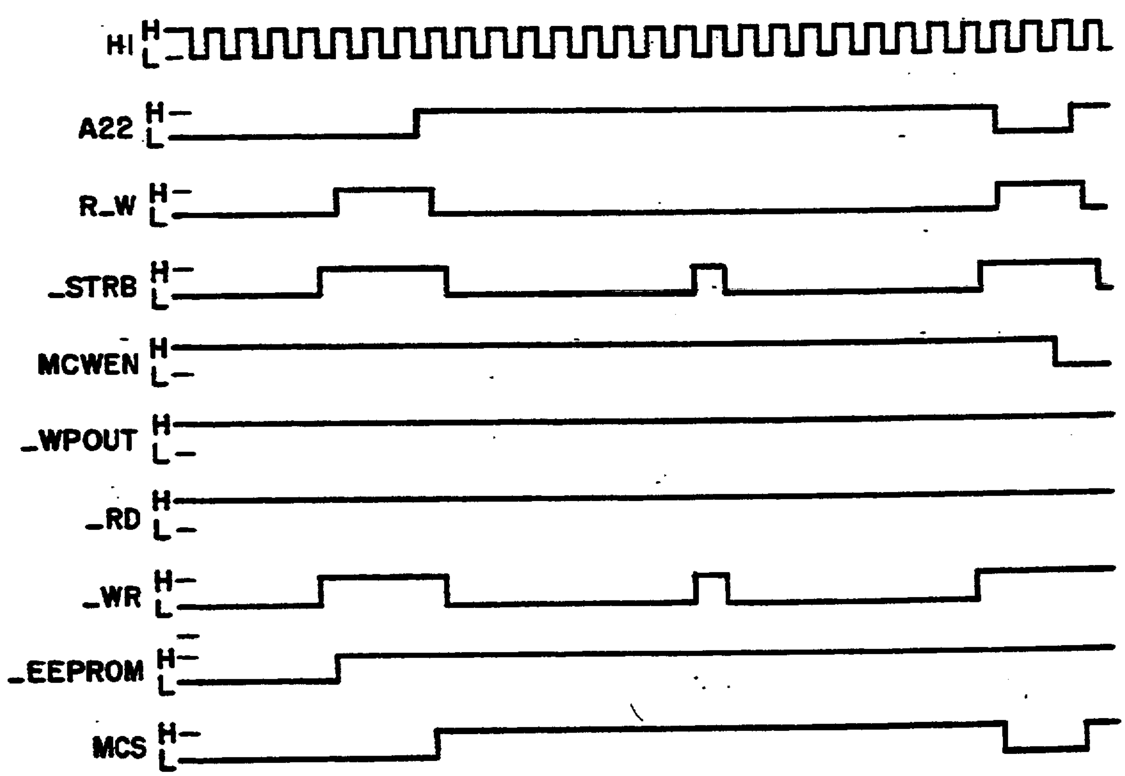
Figure 18E:
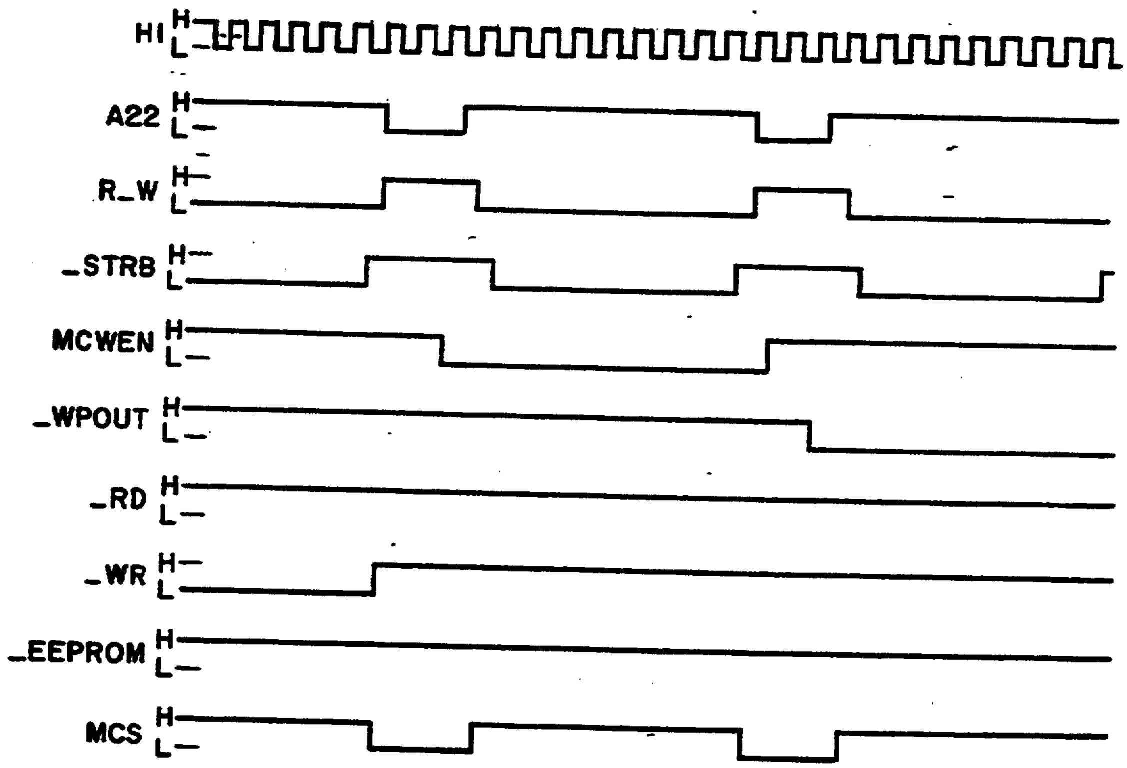
Figure 18F:
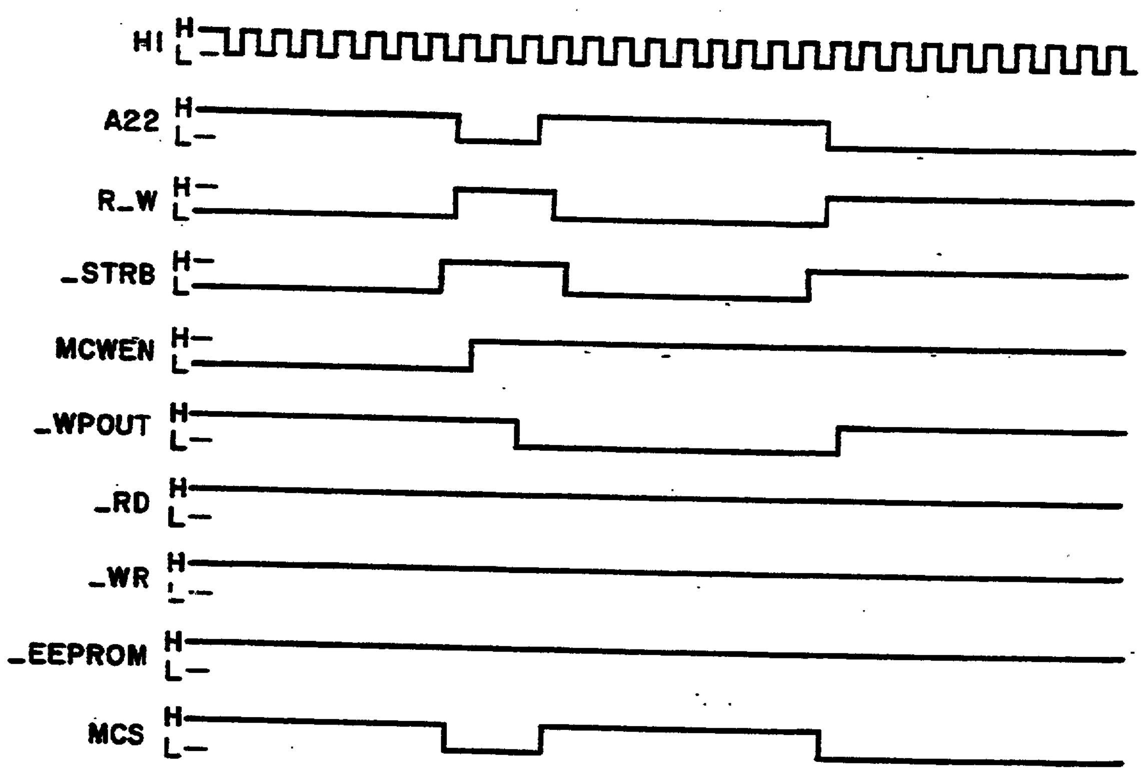
Figure 18G:
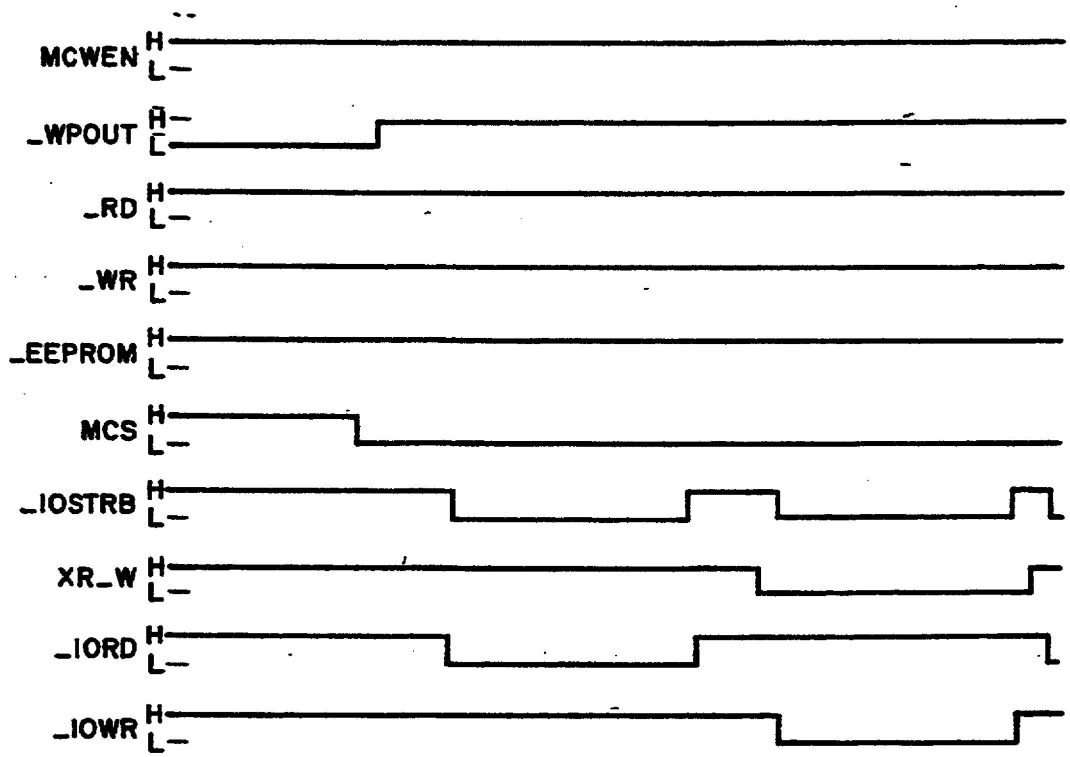

Device 24 is programmed to convert alternate control signals /IOSTRB and XR/W provided by digital signal processor 21 into control signals that operate the parallel peripheral interface (PPI) ports PA0–PA7, PB0–PB7 and PC0–PC7 of three programmable peripheral interfaces 52, 54 and 56, FIG. 17; and the universal asynchronous receiver transmitter (UART) circuits 37 and 39, FIG. 16F; the 1553 communications interface controller 41, FIG. 16G; and the IEEE-488 bus controller 260, FIG. 3, of rapid reprogramming terminal 20. Software within digital signal processor 21 extends access time for the parallel peripheral interface ports PA0–PA7, PB0–PB7 and PC0–PB7 of programmable peripheral interfaces 52, 54 and 56; universal asynchronous receiver transmitter circuits 37 and 39; the 1553 communications interface controller 41; and the IEEE-488 bus controller 260 since processor 21 operates at a processing speed that is too fast for parallel peripheral interface ports PA0–PA7, PB0–PB7 and PC0–PB7 of programmable peripheral interfaces 52, 54 and 56; universal asynchronous receiver circuits 37 and 39; the 1553 communications interface controller 41; and the IEEE-488 bus controller 260.

PPI port PA0–PA7 of interface 56 is an output port designated to send control signals selecting the 1553 multiplex data bus 42 aboard the aircraft. The logic signals EW, AV1, AV2, AV3, AV4 and AV5 select which bus rapid reprogramming terminal 20 will pass data through. PPI port PB0–PB7 of interface 56 is an output port which is utilized to configure and turn on the 1553 multiplex data bus avionics and electronic warfare equipment, that is remote terminals 53 and bus controllers 55. PPI port PC0–PC7 of interface 56 is an output port which provides output control signals to control liquid crystal display 57 and Remote Terminal address signals to the RTAD0–RTAD4 and RTADP inputs of 1553 communications interface controller/terminal 41, FIG. 16G.

PPI port PA0–PA7 of interface 54 is an output port which provides control signals to a predetermined device within the aircraft's avionics or electronic warfare systems enabling access to the memory of the device to which data is being transferred. PPI port PA0–PA7 of interface 54 is also designated to send control signals to the avionics bus controller of 1553 multiplex data bus 42 preparing the bus controller for reprogramming by rapid reprogramming terminal 20.

PPI port PB0–PB7 of interface 54 is an output port which provides rapid reprogramming terminal generated control signals which power down the avionics bus controller allowing rapid reprogramming terminal 20 to upload data into the aircraft avionics and thereby reprogram the avionics.

PPI port PC0–PC3 of interface 54 is an input port which monitors fail signals provided by the aircraft avionics bus controller to determine whether the data has been correctly loaded into the avionics bus controller, that is PPI port PC0–PC3 of interface 54 is used to indicate an error in loading.

PPI port PC4–PC7 of interface 54 is an output port which is used to provide address and control signals to the first and second memory cards of IC memory card 22 via connectors 28 and 29.

PPI port PA0–PA7 of interface 52 is an input port used to monitor the aircraft type and thereby prevent data which is designated for loading in one type of aircraft from being loaded in a different type of aircraft.

PPI port PB0–PB7 of interface 52 is an input port used to monitor configuration of the aircraft to prevent data which is designated for loading in one configuration of the aircraft from being loaded in a different aircraft configuration. PPI ports PA0–PA7 and PB0–PB7 of interface 52 receive control signals from switches on the front panel 43, FIG. 2 so as to monitor the state of the switches on front panel 43.

PPI port PC0–PC7 of interface 52 is an output port for supplying ASCII characters to liquid crystal display 57 on front panel 43, FIG. 2.

The UART circuits 37 and 39 of rapid reprogramming terminal 20 respectively communicate with any RS-232 communications bus 71 and any RS-422 communications bus for the transfer of data to and from the IC memory card 22 via the rapid reprogramming terminal 20. As is best illustrated in FIG. 16F, UART circuits 37 and 39 are connected to drivers 250 and 254 and receivers 252 and 256 which match the interface characteristics of RS-232 and 422 buses.

Rapid reprogramming terminal also includes the 1553 communications interface terminal 41 of FIG. 16G which is used to translate the sixteen bit parallel data words provided by digital signal processor 21 into Manchester mark encoded Military Standard 1553 signals for use by 1553 multiplex data bus 42 and also to decode Manchester mark signals provided by bus 42 into sixteen bit parallel data words supplied to digital signal processor 21.

Figure 2A:
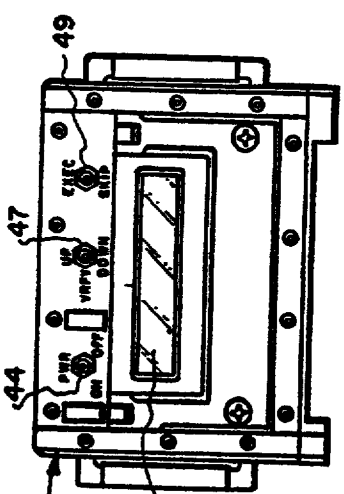
FIGS. 2A and 2B are an illustration of the front panel and front panel electrical wiring diagram for the rapid reprogramming terminal of the present invention.
Figure 2B:
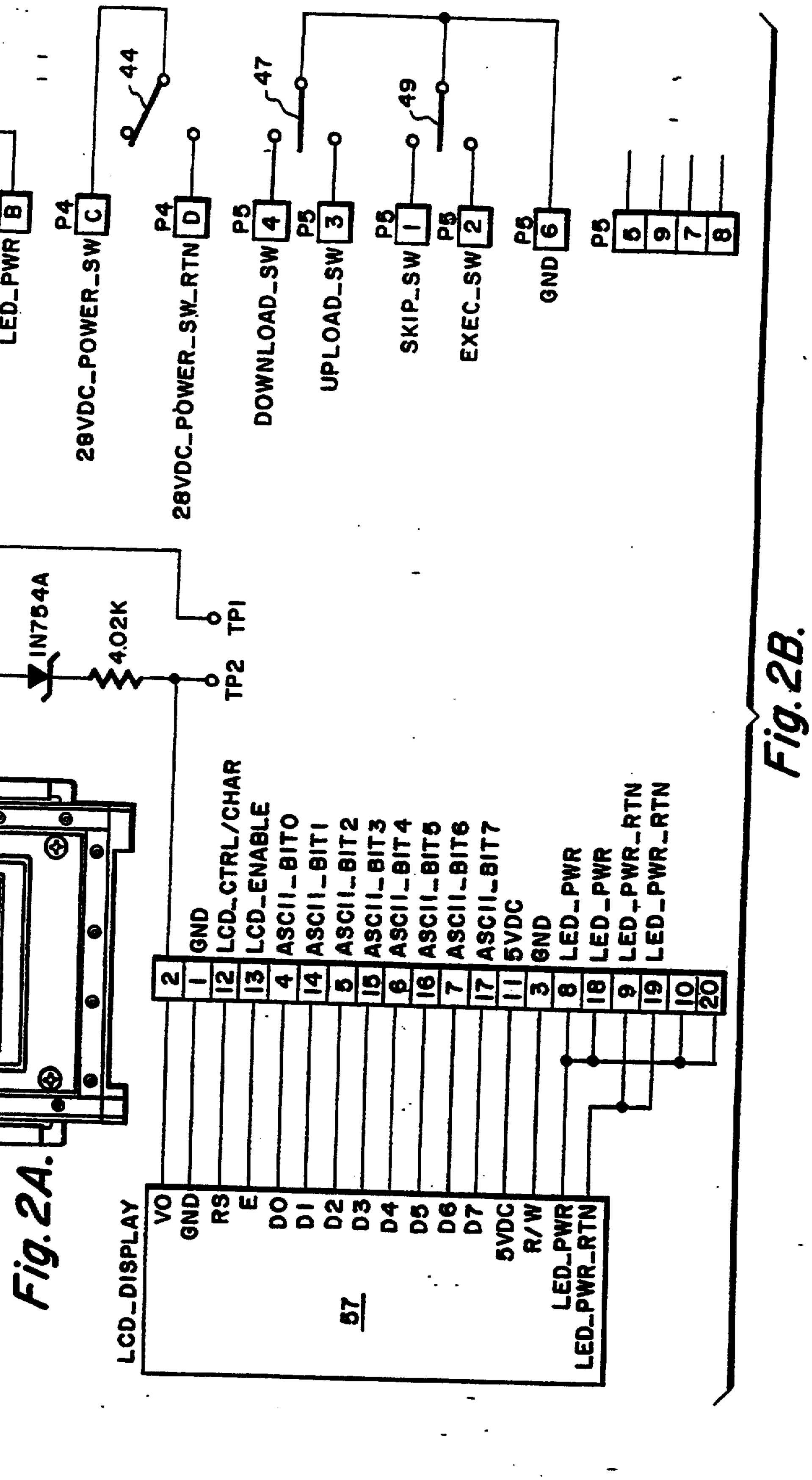

Referring to FIGS. 2A and 2B, there is shown the front panel 43 which includes a power switch 44, a down/verify/up switch 47 and an execute/skip switch 49. The power switch 44 when in the on position turns power on to rapid reprogramming terminal 20. The down/verify/up switch 47 when in the up position allows data to be loaded from rapid reprogramming terminal 20 to the aircraft avionics or electronic warfare system and when in the down position allows data to be loaded from the avionics or electronic warfare systems to rapid reprogramming terminal 20. The down/verify/up switch 48 when in the verify position allows for data already in the aircraft avionics and electronic warfare systems to be verified by rapid reprogramming terminal 20. When the message "Exec to continue" is displayed by liquid crystal display 57, execute/skip switch 49 is a momentary contact switch which when activated to the Exec position allows rapid reprogramming terminal 20 to begin loading data files. When in the manual mode and it is desired to load or skip a data file, that is load or not load the data file, an operator can press the exec/skip switch 49 to the exec position to load the data file or skip position to not load the data file.

Referring now to FIG. 17 there is shown the discrete interface circuit which comprises programmable peripheral interfaces 52, 54 and 56 providing the interface for the discrete logic signals to be provided by rapid reprogramming terminal 20 to the aircraft on board avionics and electronic warfare and countermeasures systems as well as the discrete logic signals provided from the avionics and electronic warfare and countermeasures systems to rapid reprogramming terminal 20. In addition, programmable peripheral interfaces 52 and 56 function as an interface between liquid crystal display 57, FIG. 2A, and digital signal processor 21.

The programmable interfaces 52, 54 and 56 may be a performance CMOS version of the industry standard 8255A general purpose programmable input/output device with which is compatible with any general purpose microprocessor. For example a Model 82C55A CMOS Programmable Peripheral Interface manufactured by Harris Corporation may be used as programmable interfaces 52, 54 and 56.

Referring to FIGS. 1, 2 and 17, the EW output of programmable interface 56 electrically couples the electronic warfare bus of 1553 multiplex data bus 42 to rapid reprogramming terminal 20 when the EW output of programmable interface 56 is at the logic one state. Similarly, the AV1, AV2, AV3, AV4 and AV5 outputs of interface 56 electrically couple the five avionics buses of bus 42 to rapid reprogramming terminal 20. It should be noted that a data transfer from rapid reprogramming terminal 20 to the EW bus, the AV1 bus, the AV2 bus, the AV3 bus, the AV4 bus or the AV5 bus of the aircraft can occur only when the EW, AV1, AV2, AV3, AV4 or AV5 output from interface 56 is at the logic one state.

It should further be noted the EW bus is a single channel 1553 bus, while the AV1 bus, the AV2 bus, the AV3 bus, the AV4 bus and the AV5 bus of the aircraft are two channel 1553 buses, that is the avionics buses are dual redundant buses. This allows bus controllers on the avionics buses of the aircraft to communicate with remote terminals on the bus through either of two channels.

Outputs PA6 and PA7 of interface 56 (lines PPI1A6 and PPI1A7) are spares.

Figure 4:
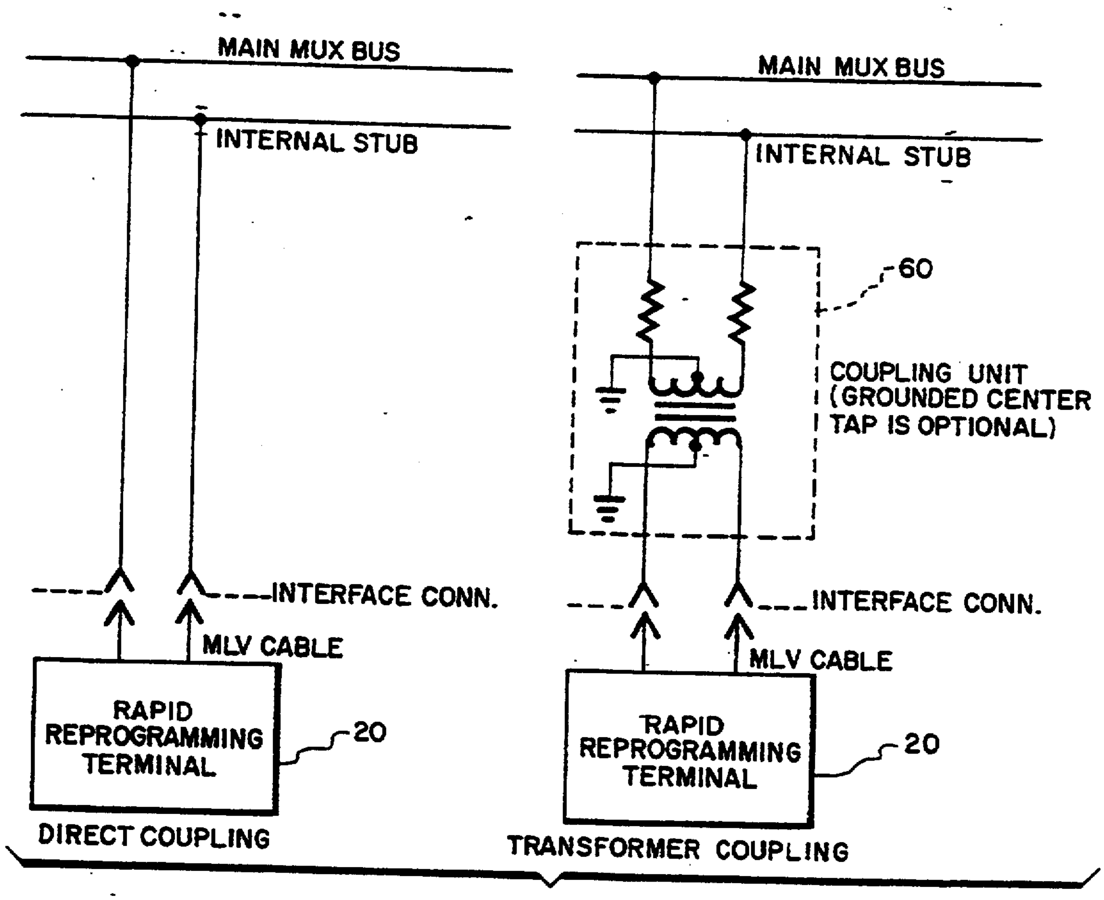
FIG. 4 illustrates the bus coupling methods of the 1553 multiplex data bus to which the rapid reprogramming terminal is connected.

The DIR/XFMR output configures the 1553 multiplex data bus 42 such that coupling is either provided directly as is best illustrated by FIG. 4 or via a transformer 60 as is also best illustrated by FIG. 4. When the DIR/XFMR output is at the logic one state the rapid reprogramming terminal 20 is coupled directly to the aircraft on board avionics and electronic warfare systems. When the DIR/XFMR output is at the logic zero state the coupling is through transformer 60. The GND/OPEN_CT output of interface 56 when at the logic one state grounds the center tap of transformers 213 and 214, FIG. 15*a* while a logic 0 at the GND/OPEN_CT output removes the ground from the center tap of transformers 213 and 214.

The RS422_XMIT_OFF output of interface 56 is connected to the /EN input of driver 254. A logic one at the /EN input of driver 254 tristates driver 254 such that driver 254 is disabled while a logic zero enables driver 254. This logic one signal is necessary since some RS-422 interfaces are half duplex requiring that there be a means whereby the transmit driver can be turned off.

The PB3 output (PPI1B3 line) of interface 56 is a spare.

The MSDRS_ON_OFF Output of interface 56 enables the Maintenance Signal Data Recording Set (MSDRS) aboard an aircraft with a logic zero enabling the MSDRS and a logic one disabling the MSDRS. This output is also currently being utilized with only the F/A-18 fighter aircraft.

The BOOT_EN_SMS output (PB3 output of interface 56) is utilized with an aircraft having a stores management system (SMS) requiring an input to enable a boot strap load operation. A logic one at this output enables the SMS boot strap load allowing data to be transferred from rapid reprogramming terminal 20 to the stores management system via an avionics system bus while a logic zero disables the SMS boot strap load.

The BOOT_EN_RDP output enables the radar data processor (RDP) boot strap load operation aboard an aircraft and is currently being utilized with only the F/A-18 fighter aircraft. When the BOOT_EN_RDP output is at the logic one state the radar data processor boot strap load is enabled allowing data to be transferred from rapid reprogramming terminal 20 to the radar data processor, while a logic zero disables the RDP boot strap load.

The PB7 output (PPI1B7 line) of interface 56 is a spare.

The PC0-PC4 outputs of interface 56 (address lines RTAD0-RTAD4) provide addressing to 1553 communications interface terminal 41 of FIG. 16G, while the PC5 output of interface 56 (RTADP parity line) provides a parity bit for address verification to 1553 communications interface terminal 41. The address provided by the PC0-PC4 outputs of interface 56 to controller/terminal 41 establishes a remote terminal address for rapid reprogramming terminal 20 when rapid reprogramming terminal 20 is used as a remote terminal.

The LCD_CTRL/CHAR output of interface 56 is the register select for the liquid crystal display 57. When the LCD_CTRL/CHAR output is at a logic one state a control register for liquid crystal display 57 is selected, while a logic zero at the LCD_CTRL/CHAR output selects a character register for liquid crystal display 57.

When a character bit is written into liquid crystal display 57, the PC6 output of interface 56 is set at the logic one state. The character bit to be written into liquid crystal display 56 is then provided at the PC0-PC7 outputs of interface 52 (ASCII_BIT0-ASCII_BIT7). An enable pulse provided at the PC7 output of interface 56 (LCD_ENABLE line) writes the character bit occurring at the PC0-PC7 outputs of interface 52 into liquid crystal display 56.

A logic one at the PA0 output (EW_OSM_EN line) of interface 54 enables the operating system memory of the electronic warfare system on board the aircraft, that is data may be loaded into the operating system software memory. Similarly, when the PA1 output (EW-UDM_EN line) of interface 54 is at the logic one state data may be loaded into the user data memory of the electronic warfare system on board the aircraft.

The electronic warfare user data memory program enable discrete of interface 54 enables the erase and write functions of all user data memories, for examples EEPROMS, of all the electronic warfare equipment on the electronic warfare multiplex bus. In addition, upon initial activation the electronic warfare user data memory program enable discrete, if required, will cause the bus controller for the electronic warfare multiplex bus to start polling rapid reprogramming terminal 20 and upon deactivation will cause the bus controller to stop polling rapid reprogramming terminal 20. Further this program enable discrete is used to indicate to the bus controller that it is to resume its bus controller functions when the enable is released, that is driven to the logic zero state. The electronic warfare operating system memory has the same functions with respect to reprogrammable operating system memories in devices connected to the electronic warfare multiplex bus.

A logic one at the PA2 output (EXT_PROC_ON/OFF line) of interface 54 enables the external processor of an AN/ALQ-165 radar jammer on board the aircraft. The purpose of the AN/ALQ-165 external processor discrete is to limit power on time to less than one minute for load/verify of 32K data words of user data memory. It should be noted that the AN/ALQ-165 processor is currently incorporated on only the F/A-18 C/D fighter aircraft.

The AV_EN1 and AV_EN2 lines (AV Program Enable discretes) of interface 54, which are used for the avionics buses in the aircraft, may be connected to individual avionics equipment to control two program memory areas within the equipment or the AV-EN1 and AV_EN2 outputs may be routed separately to avionics equipment on board the aircraft which does not require control of two memory areas. When the PA4 output (AV_EN1 line) of interface 54 is at a logic one state the first memory areas of the aircraft avionics system are enabled, while a logic one at the PA5 output (AV_EN2 line) of interface 54 enables the second memory areas of the aircraft avionics system.

The PPI2A3, PPI2A6 and PPI2A7 lines are spares.

The bus controller for the aircraft avionics buses is an AN/AYK-14 computer with each aircraft avionics system having up to four AN/AYK-14 computers. The Initiate Program Load (IPL), Initiate Program load Fail (IPL_F) and Power Off/On (PWR OFF/ON) discretes, which are used to control an AN/AYK-14 , are implemented between each AN/AYK-14 computer on board the aircraft and rapid reprogramming terminal 20. It should be noted that the AV reprogram enable discretes are not used with the AN/AYK-14 computers.

Logic ones at the PWR_OFF 1, PWR_OFF 2, PWR_OFF 3 or PWR_OFF 4 outputs of interface 52 will turn off one or more of the four AN/AYK-14 Avionics computer bus controllers, while a logic zero at one or more of these outputs will turn on one or more of the controllers. To transfer data from rapid reprogramming terminal 21 to one or more remote terminals 53 or an AN/AYK-14 Avionics computer bus controller 55, that is one or more avionics devices on board the aircraft, on any of the four avionics buses aboard the aircraft, power to the AN/AYK-14 controlling the bus must first be turned off.

After power is turned off a logic one at the PB4 output (IPL_1 line) of programmable interface 54 is required to load data from rapid reprogramming terminal 20 to the AN/AYK-14 avionics computer 55 via avionics bus number one of 1553 multiplex data bus 42. The PB0 output of interface 54 is next transitioned to the logic zero state, that is the PWR_OFF/ON_1 line is set at a logic zero to turn power on.

The PB4 output (IPL_1 line) of programmable interface 54 is next set to a logic zero state allowing data to be loaded into the AN/AYK-14 avionics computer. The PB5 through PB7 outputs (IPL_2 through IPL_4 lines) operate in a similar manner with respect to avionics buses two through four bus of the 1553 multiplex data bus 42.

A logic one at the PC0 input (IPL_FAIL_10 line of programmable interface 54 indicates that the program load for the AN/AYK-14 avionics computer 55 on avionics bus one has failed. Similarly, logic ones at the PC1 through PC3 inputs (IPL_FAIL_2 through IPL_FAIL_4 lines) indicate that program loads for the AN/AYK-14 avionics computers 55 on avionics buses two through four have failed.

The PC4-PC7 outputs of interface 54 are connected through the 54-56 terminals of connector 28 and the 54A-56A terminals of connector 29 to the A23-A25 address inputs of memory card zero and memory card one respectively of IC memory card 22.

The memory cards used in the present invention are Intel Series 2 Flash Memory Cards which conform to the Personal Computer Memory Card International Association (PCMCIA 2.0)/Japanese Electronics Industry Development Association (JEIDA 4.1) 68-pin standard. The three logic bits from the PC4-PC6 outputs of interface 54 when supplied to memory card zero and memory card one of IC memory card 22 allow for addressing of the eight pages of memory of each memory card of IC memory card 22 with each page of memory having 8 megabytes.

The PC7 output of interface 54 (MCS1/0 line) provides a logic signal which selects the memory card of IC memory card 22 to be accessed. The logic signal from the PC7 output of interface 54 is supplied to programmable array logic device 24 which decodes the signal and then provides a logic zero at the OUT4 output of device 24 ( /MSC0 line) to enable memory card zero of IC memory card 22 or a logic zero at the OUT5 output of device 24 ( /MSC1 line) to enable memory card one of IC memory card 22.

The PA0-PA4 inputs (FILTERED_ACFT0 through FILTERED_ACFT4 lines) of interface 52 provide signals from the aircraft to the rapid reprogramming terminal 20 which indicate the aircraft type. The FILTERED_ACFT0 input is the least significant bit provided by the aircraft, while the FILTERED_ACFT4 input is the most significant bit provided by the aircraft. For example a 1, 0, 1, 1, 0 respectively at the FILTERED_ACFT0 through FILTERED_ACFT4 inputs indicates that the aircraft is an F/A-18 fighter aircraft.

Switch 49, FIG. 2B, has a pair of momentary contacts, the first contact of which is connected to the PA6 input (EXEC_SW line) of interface 52 and the second contact of which is connected to the PA7 input (SKIP_SW) of interface 52. When switch 49 is activated to the EXEC position a logic zero pulse is provided to the PA6 input of interface 52 while activation of switch 49 to the SKIP position will result in a logic zero pulse at the PA7 input of interface 52.

The PB0-PB3 inputs (FILTERED_CONFIG0 through FILTERED_CONFIG3) of interface 52 provide signals from the aircraft to rapid reprogramming terminal 20 which indicate the aircraft avionics configuration such as whether the aircraft is an F/A-18A/B or F/A-18C/D.

The PB4 input (NO_EXT_BIT) of interface 52 is normally at the logic one state. An external bit connector may be connected to rapid reprogramming terminal 20 to provide a logic zero to the PB4 input of interface 52. This logic zero is supplied to digital signal processor 21 which then activates a test program (filename: ext_bit.c of Appendix A) which is a self test verifying the integrity of rapid reprogramming terminal hardware.

The PB5 input (PPI3B5 line) of interface 52 is a spare.

The PB6 input (DOWNLOAD_SW line) of interface 52 is connected to switch 47 such that whenever switch 47 is activated to the DOWN position a logic zero pulse is provided to the PB6 input of interface 56 which results in data being down loaded from, for example, an avionics remote terminal 53 to rapid reprogramming terminal 20. In a like manner, whenever switch 47 is activated to the UP position a logic zero is provided to the PB7 input of interface 56 which results in data being up loaded to, for example, an avionics bus controller 55 from rapid reprogramming terminal 20. Leaving switch 47 in a neutral position results in a verify operation occurring.

Referring to FIGS. 1, 16A, 16B, 16D, 16F and 17, the XFO output of digital signal processor 21 provides a hardware Reset (active high reset) for approximately 16 microseconds and then low again. The XFO output of digital signal processor 21 is connected to the RST inputs of UARTS 37 and 39, and the RESET input of all three programmable peripheral interfaces 52, 54 and 56 as well as the IN1 input of programmable array logic device 24.

The initialization of these peripherals configures the peripherals to accomplish specific functions. UART 37 is initialized as RS-232 Data Set Equipment (DSE) for the fastest baud rate the Data Terminal Equipment (DTE) will operate at allowing communications between rapid reprogramming terminal 20 and an external equipment such as an external computer. The second UART 39 is initialized as RS-422 Data Set Equipment also for the fastest baudrate the terminal will operate at to again allow communications between rapid reprogramming terminal 20 and RS-422 compatible equipment. Both UARTs 37 and 39 may be reconfigured for equipment loading, as specified by the IC memory card's contents, for those loads not transpiring over the MS-1553 bus. Programmable peripheral interfaces 52, 54 and 56 are configured to support discrete input or output functions as described in the rapid reprogramming terminal program of Appendix A. Programmable array logic device 24 decodes logic signals provided to the IN1–IN10 inputs thereof and then provides enable signals as well as read and write signals to memory card zero and memory card one of IC memory card 22 and EEPROMs 240, 241, 244 and 246 of EEPROM 23. Reprogrammable array logic device 24 also provides UARTs 37 and 39, FIG. 16F, bus controller 260, FIG. 3, and controller 41, FIG. 16G.

Referring to FIGS. 3 and 16A the XFI output of digital signal processor 21 is connected to the PE input of transceiver 262 which along with transceiver 264 and bus controller 260 perform the interface function between digital signal processor 21 and an IEEE-488 bus and relieves processor 21 of the task of maintaining the IEEE-488 protocol. When the HS/PP line is high, transceiver 262 is in the high speed mode which causes data outputs B1–B8 of transceiver 262 (IEEE-488 _DIO1 through IEEE-488 _DIO8 lines) to be active high and active low. When the HS/PP line is low, transceiver 262 is in the parallel poll mode which requires the use of external pull up resistors connected to data outputs B1–B8 of transceiver 262 since data outputs B1–B8 of transceiver 262 transition to a tristate mode instead of an active high mode.

Referring to FIGS. 3, 16D and 16E, programmable array logic device 25 provides a logic zero /IEEE-488 _SEL signal to the /CE input of bus controller 260 which allows access of the read and write registers of bus controller 260. Programmable array logic device 24 provides a logic zero /IOWR signal to the /WE input of bus controller 260 which allows data to be written into bus controller 260. Programmable array logic device 24 also provides a logic one IORD signal to the DBIN input of bus controller 260 which allows data to be read from bus controller 260 to digital signal processor 21.

Bus controller 260 provides at its /INT output a logic zero /INT1 signal which is supplied to digital signal processor 21 which is an interrupt to processor 21. The approximately one megahertz clock for bus controller 260 is provided by digital signal processor 21 at its CLKR0 output. The RS0–RS2 inputs of bus controller 260 receive address bits from digital signal processor 21 which determine the register of bus controller 260 digital signal processor 21 is addressing during a read or write operation. The D0–D7 terminals of bus controller 260 are bidirectional allowing bus controller 260 to receive data from digital signal processor 21 and transmit data to digital signal processor 21. The TE output of bus controller 260 provides a logic signal to the TE inputs of transceivers 262 and 264 to control the direction of transfer of transceivers 262 and 264 with a logic zero to the TE inputs of transceivers 262 and 264 causing transceivers 262 and 264 to function as receivers and a logic one causing transceivers 262 and 264 to function as transmitters. The /ACCGR input of bus controller 260 is connected to +5 VDC which prevents bus controller from participating in a DMA (Direct Memory Access) transfer to digital signal processor 21.

Transceiver 262 is bidirectional allowing transceiver to receive data at its B1–B8 terminals from an external device or transmit data to an external device. Transceiver 264 is also bidirectional allowing control signals to be transmitted and received by transceiver 262.

In accordance with the IEEE-488 standard the General Purpose Interface Bus allows up to 15 instruments or devices within a localized area to communicate with each other over a common bus. Each device on the IEEE-488 bus has a unique address to which it responds. Information is transmitted in byte serial bit format and may be either device-dependent data or interface messages, referred to as data or commands, respectively. Data may be sent by one device (the talker) and received by a number of other devices (listeners). One of the devices on the bus, designated the Controller in charge (Controller) may send interface control messages. Devices can be assigned to the bus as listeners or talkers by sending their unique talk or listen addresses. The control signals received and transmitted by transceiver 264 to the IEEE-488 bus are as follows:

TABLE I

| Signal | Description |
|---|---|
| DAV | DATA VALID is a handshake signal controlled by a source to show acceptors when valid data is present on the bus. |
| NDAC | NOT DATA ACCEPTED is a handshake signal which the acceptor sets false when the acceptor latches data from the I/O lines. |
| NRFD | NOT READY FOR DATA is a handshake |

TABLE I-continued

| Signal | Description |
|---|---|
| | signal sent by the acceptor to indicate readiness for the next byte. |
| ATN | ATTENTION is a signal sent by the Controller in charge which when true (low) indicates that interface commands are being sent over the DIO lines and when false (high) indicates that the DIO lines are carrying data. |
| IFC | INTERFACE CLEAR is a signal sent by the system controller to set the interface system into a known quiescent state with the system controller becoming the Controller in charge. |
| SRQ | SERVICE REQUEST is a signal when set true (low) by a device indicates a need for service. |
| EOI | END OR IDENTITY is a signal which when ATN is high indicates the end of a message block and when ATN is low indicates that the controller is requesting a parallel poll. |
| /CONT | This is a signal which indicates that a device is the Controller in charge. |

At this time it should be noted that the programmable array logic devices used in the preferred embodiment of the present invention are Advanced Micro Devices 28 Pin leadless chip carrier (LCC) TTL PALs Model No. PAL 20RA10. In it should be noted that the program listing for the software utilized by programmable array logic device 24 is set forth in Appendix B and the program listing for the software utilized by programmable array logic device 25 is set forth in Appendix C.

In addition, it should be noted that bus controller 260 is a Texas Instrument TMS9914A General Purpose Interface Bus Controller (GPIB) Controller, transceiver 262 is a Texas Instrument SN55ALS160 20 Pin LCC transceiver and transceiver 264 is a Texas Instrument SN55ALS161 20 Pin LCC transceiver.

Referring to FIGS. 1, 16B and 16C logic zero signals provided to the FSR0 and DR0 inputs of digital signal processor 21 indicate that memory card zero of IC memory card 22 is present, while logic zeros signals provided to the FSR1 and DR1 inputs of digital signal processor 21 indicate that memory card one of IC memory card 22 is present. For example, if a memory card is connected to connector 28 the /CARD0_CD1 and /CARD0_CD2 signal lines are active low.

There is also provided to the FSX0 and FSX1 inputs of digital signal processor 21 respectively by memory card zero and memory card one of IC memory card 22 a CARD0_RDY/BSY signal and a CARD1_RDY/BSY signal each of which when high indicate to digital signal processor 21 that the command previously supplied to the memory card is complete and when low indicate that the memory card is processing a command.

Memory cards zero and one of IC memory card 22 respectively provide CARD0_WP and CARD1_WP signals to digital signal processor 21 which when at the logic one state indicate to digital signal processor 21 that the memory card is write protected. Digital signal processor supplies to memory cards zero and one of IC memory card 22 respectively CARD0_REG and CARD1_REG signals which when supplied to the memory card at the logic zero state allows selection of the register set within the memory card and when high allows the selection of the memory plane within the memory card.

When the MCS1/0 signal line is high programmable array logic device sets the/MCS1 signal line to the logic zero state enabling memory card one of IC memory card 22. When the MCS1/0 signal line is low programmable array logic device sets the /MCS0 signal line to the logic zero state enabling memory card zero of IC memory card 22.

Addressing for memory cards zero and one of IC memory card 22 is provided by digital signal processor 21 through the A0-A25 terminals of connectors 28 and 29, while digital information is either read from or written into memory cards zero and one of IC memory card 22 through the DQ0-DQ15 terminals of connectors 28 and 29.

The system clock signal, which is 500 kilohertz, from the CLKR1 output of digital signal processor 21 is supplied to the TCKL0 and TCLK1 inputs of processor 21 to allow two 32 bit internal counter/timers within processor 21 to divide the system clock signal.

Referring to FIGS. 16B, 16D and 16E, programmable array logic device 24 provides a means whereby control signals from digital signal processor 21 are decoded to provide read, write and enable control signals for memory cards zero and one of IC memory card 22 and EEPROM 23 as well read and write signals to interfaces 52, 54 and 56; UART circuits 37 and 39 and bus controller 260.

Referring now to FIGS. 1, 16B, 16C and 16D the read (/RD), the write (/WR) and the EEPROM select (/EEPROM) signals are provided by programmable array logic device 24 to the four 64K×8 bit EEPROMs 240, 241, 244 and 246 of EEPROM 23 and the read (/RD), the write (/WR) and the memory card select (/MCS0 and/MCS1) signals to IC memory card 22 are provided by programmable array logic device 24. The read, the write and the EEPROM select signals provided to EEPROM 23 are active logic zero signals.

Addressing for EEPROMs 240, 241, 244 and 246 is provided by digital signal processor 21 through the A0-A15 inputs of EEPROMs 240, 241, 244 and 246, while digital information is either read from or written into EEPROMs 240, 241, 244 and 246 through the D0-D7 terminals of EEPROMs 240, 241, 244 and 246.

The A22 output of digital signal processor 21 provides a logic signal to the IN6 input of programmable array logic device 24 which determines whether IC memory card 22 or EEPROM 23 is being selected for a read or write operation with a logic zero indicating that the EEPROM 23 is selected and a logic one indicating that the IC memory card 22 is selected. The R/W signal provided from the R/W output of digital signal processor 21 to the IN3 input of programmable array logic device 24 indicates whether a read (logic one) or write (logic-zero) operation is to be preformed by IC memory card 22 or EEPROM 23. The /STRB signal provided at the /STRB output of digital signal processor 21 to the IN3 input of programmable array logic device 24 indicates that the A22 and R/W signals are valid. The /STRB signal is active at the logic zero state.

The /EEPROM signal is supplied to the /CE input of EEPROMs 240, 241, 244 and 246 enabling EEPROMs 240, 241, 244 and 246. The /RD signal is supplied to the /OE inputs of EEPROMs 240, 241, 244 and 246 which in response to the /RD signal output data therefrom onto data lines D31-D0. The /WR signal is supplied to the /WE inputs of EEPROMs 240, 241, 244 and 246 which in response to the /WR signal stores data therein from data lines D31-D0.

The /IOSTRB signal provided from the /IOSTRB output of digital signal processor 21 to the IN5 input of programmable array logic device 25 indicates that the XR/W signal is valid and this /IOSTRB signal is active at the logic zero state. The XR/W signal which is provided from the XR/W output of digital signal processor 21 to the IN4 input of programmable array logic device 24 indicates whether a read or write operation is to be performed by programmable peripheral interfaces 52, 54 and 56 or universal asynchronous receiver transmitter (UART) circuits 37 and 39. When the XR/W signal is a logic one, the /IORD signal transitions to the logic zero state causing a read operation to be performed. When the XR/W signal is a logic zero, the /IOWR signal transitions to the logic zero state causing a write operation to be performed.

In addition, when the XR/W signal is a logic one and the /IOSTRB signal is a logic zero, the IORD signal provided at the OUT8 output of programmable array logic device 24 is an active logic one.

Referring to FIGS. 1, 16A, 16B and 17, digital signal processor 21 provides the eight bit data bytes, address and enable signals which selectively activate the outputs (PA0-PA7, PB0-PB7 and PC0-PC7) of programmable peripheral interfaces 52, 54 and 56. Specifically, the XD0-XD7 outputs of processor 21 provide digital data for the D0-D7 inputs of interfaces 52, 54 and 56, while the XA9 through XA12 outputs of processor 21 when decoded by programmable array logic device 25 determine which interface 52, 54 or 56 is to be enabled by providing a logic zero to the /CS (chip select) input of interface 52, 54 or 56.

Specifically, when the PPI1_SEL line is to be at the logic zero state thereby enabling interface 56 address bits A12, A11, A10 and A9 will be respectively 0100. Similarly, when the PPI2_SEL line is to be at the logic zero state thereby enabling interface 54 address bits A12, A11, A10 and A9 will be respectively 0101. In a like manner, when the PPI3_SEL line is to be at the logic zero state thereby enabling interface 52 address bits A12, A11, A10 and A9 will be respectively 0110. The logic zero is supplied to the /CS input of interface 52, 54 or 56 enabling interface 52, 54 or 56. Interfaces 52, 54 and 56 each include three registers which are addressed by the XAO-AX1 outputs of digital signal processor 21. If the PA0 output (EW_OSM_EN line) of interface 54 is to be enabled, logic zeros will be provided from the XA0 and XA1 outputs of processor 21 to the A0 and A1 inputs of interface 54 and the DO input/output of interface 54 will be provided a logic one. Similarly, if the PB0 output (IPL_1 line) of interface 54 is to be enabled, a logic one will be provided from the XA0 output of processor 21 and a logic zero will be provided from the XA1 output of processor 21 respectively to the A0 and A1 inputs of interface 54 and the D4 input/output is provided with the logic signal to enable the PB0 output of interface 54. Likewise, if the IPL_FAIL_1 input of interface 54 is to be read by digital signal processor 21, a logic zero will be provided from the XA0 output of processor 21 and a logic one will be provided from the XA1 output of processor 21 respectively to the A0 and A1 inputs of interface 54 and the DO input/output will be provided with the logic level of IPL_FAIL_1 input.

The read and write signals for interfaces 52, 54 and 56 are provided by programmable array logic device 24. The read and write inputs to interfaces 52, 54 and 56 are active low, that is for digital signal processor 21 to read a logic signal provided to a programmable peripheral interface 52, 54 or 56 requires a logic zero at the /RD input of the interface. A logic zero at the /WR input of interface 52,54 or 56 transfers the logic zeros and ones at D0-D7 input/outputs of the interface to the PA0-PA7, PB0-PB7 or PC0-PC7 outputs of the interface depending upon the logic signals at the A0 and A1 inputs of the interface having data written therein.

Referring to FIGS. 3, 16A, 16B, 16E, 16F and 16G programmable array logic device 25 provides at its OUT1 output an active low /RS232_SEL signal which is supplied to the /CSO input of UART 37 to enable UART 37. The /RS232_SEL signal is active low whenever the address bits A12, A11, A10 and A9 provided by processor 21 are respectively 0000. Similarly, programmable array logic device 25 provides at its OUT2 output an active low /RS422_SEL signal which is supplied to the /CSO input of UART 39 to enable UART 39. The /RS422_SEL signal is active low whenever the address bits A12, A11, A10 and A9 provided by processor 21 are respectively 0001.

Programmable array logic device 25 provides at its OUT3 output an active low /MS1553_SEL signal which is supplied to the /SELECT input of 1553 communications interface controller 41. The /MS1553_SEL signal is active low whenever the address bits A12, A11, A10 and A9 provided by processor 21 are respectively 0010 or 1XXX.

Programmable array logic device 25 provides at its OUT4 output an active low /MS1553_REG signal which is supplied to the /MEM_REG input of 1553 communications interface controller 41. The /MS1553_REG signal is at the logic zero state whenever the address bits A12, A11, A10 and A9 provided by processor 21 are respectively 0010. It should be noted that /MS1553_REG signal is active low only when the /MS1553_SEL signal is a logic zero. This logic zero /MS1553_REG signal allows access to the register set of controller 41.

Whenever the address bits A12, A11, A10 and A9 are 1XXX the /MS1553_SEL signal is active low and the /MS1553_REG signal will be active at the logic one state. A logic one /MS1553_REG signal allows access to the memory of controller 41.

Programmable array logic device 25 provides at its OUT5 output an active low /IEEE-488_SEL signal which is supplied to the /CE input of bus controller 260 to enable bus controller 260. The /IEEE-488_SEL signal is active low whenever the address bits A12, A11, A10 and A9 provided by processor 21 are respectively 0011.

Programmable array logic device 25 provides at its OUT6, OUT7 and OUT8 outputs respectively active low signals PPI1_SEL, PPI2_SEL and PPI3_SEL which enable interfaces 52, 54 and 56. The PPI1_SEL signal is active low whenever the address bits A12, A11, A10 and A9 provided by processor 21 are respectively 0100; the PPI2_SEL signal is active low whenever the address bits A12, A11, A10 and A9 provided by processor 21 are respectively 0101 and the PPI3_SEL signal is active low whenever the address bits A12, A11, A10 and A9 provided by processor 21 are respectively 0110.

The 1553 communications interface controller 41 supplies an active low /READYD signal to the IN5 input of programmable array logic device 25; controller 41 supplies an active low /INT0 signal to the IN6 input of device 25 and digital signal processor 21 supplies the /IOSTRB signal to the IN7 input of device 25. The /READYD signal functions as an arbitrator allowing access to the memory of controller 41 by digital signal processor 21 and remote terminals or bus controllers on the 1553 multiplex data bus 42 aboard the aircraft. When /READYD signal is active low the /XRDY signal provided at the OUT9 output of device 25 is active low. This active low signal is supplied to /XRDY input of digital signal processor 21 indicating to processor 21 that processor 21 may now access the memory of controller 41.

The /INT_ACK signal which is generated in response to the /INT0 signal supplied by controller 41 and which occurs at the OUT10 output of device 25 is not being used by rapid reprogramming terminal 20.

Whenever any of the select signals are active low, e.g. /RS232_SEL signal, the /XRDY signal is active low. However, whenever the /MS1553_SEL signal is low, the /READYD signal must be active low for the /XRDY signal to be active low.

The /IOSTRB signal is used to validate the address bits A12, A11, A10 and A9 provided by processor 21 thereby allowing programmable array logic device 25 to decode address bits A12, A11, A10 and A9 and then generate one of the select signals provided by device 25.

Figure 13:
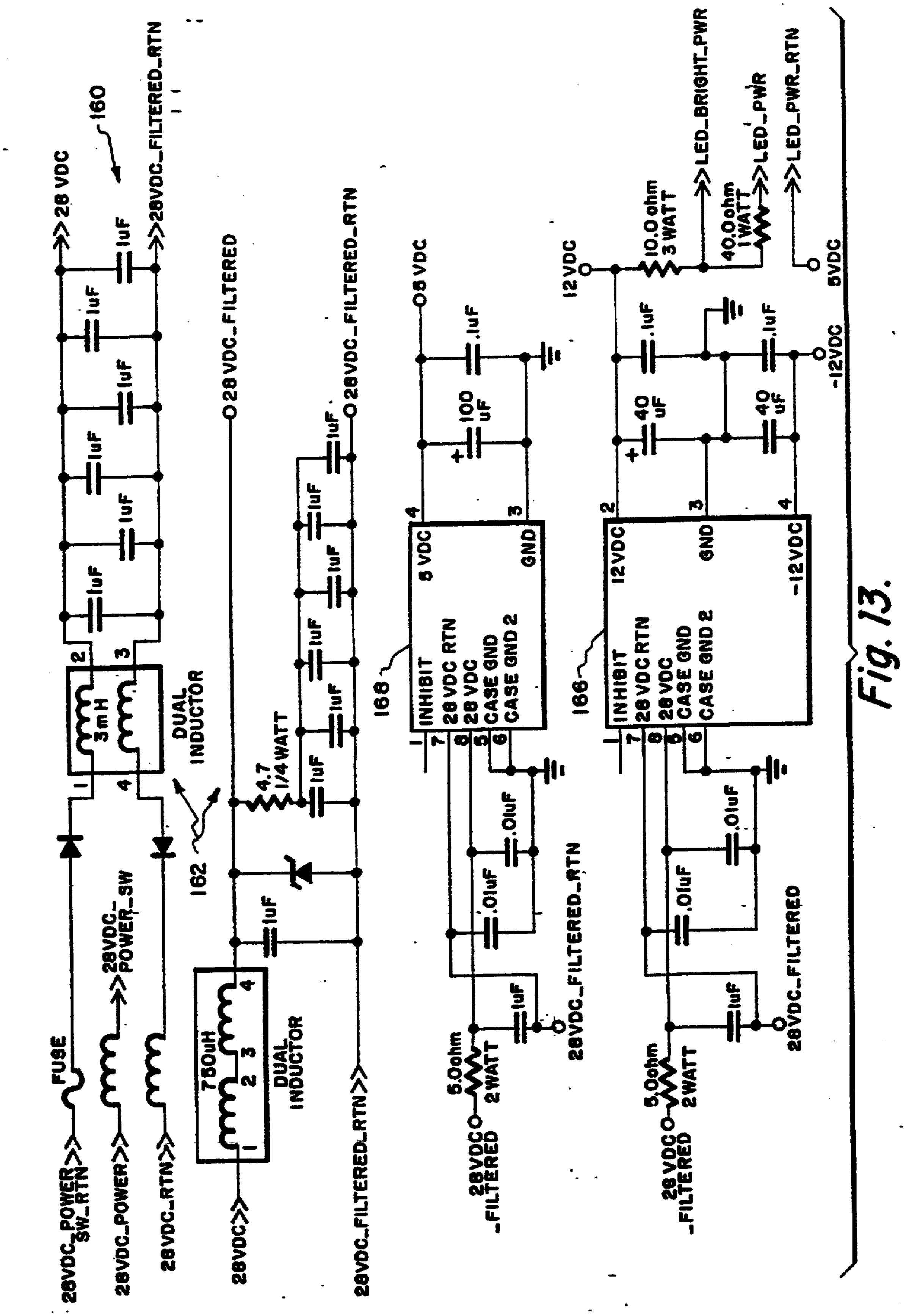
FIG. 13 is a detailed electrical schematic illustrating the power supply for the rapid reprogramming terminal.

Referring now to FIGS. 2A and 13, there is shown the power supply 160 for rapid reprogramming terminal 20 which includes an electromagnetic interference filter 162 for providing a filtered 28 VDC signal (28 VDC_FILTERED). Power supply 160 further includes a pair of DC to DC converters 166 and 168 with power supply 166 providing plus and minus 12 VDC and power supply 168 providing a plus 5 VDC.

Power supply 160 also provides the power for the backlighting for liquid crystal display 57. The backlighting for liquid crystal display 57 requires approximately 3.5 volts at between 300 to 400 milliamps. Plus 12 VDC is supplied through a 10 ohm resistor to the LED_BRIGHT_PWR output of supply 160 resulting in a DC voltage which is approximately 3.5 volts above the LED_PWR_RTN input of supply 160. Power supply 160 also provides a lower voltage differential between its LED_PWR output and its LED_PWR_RTN input which may be used to dim the backlighting of liquid crystal display 57.

Referring now to FIGS. 1, 16B and 16f, there is shown the universal asynchronous receiver transmitter (UART) circuits 37 and 39 which in the preferred embodiment of the present invention are model number 82C52 CMOS serial control interfaces manufactured by Harris Corporation although it should be understood that any controller interface which is compatible with standard RS-232-C band rates may be used as UARTS 37 and 39. UARTS 37 and 39 are used to communicate with devices external to rapid reprogramming terminal such as computer/data terminal 66 via the standard RS-232 and RS-422 serial communications protocol.

Digital data is supplied from the SD0 output of UART 37 through line driver 250 to computer 66 via the RS_232_TX data transmission line. Similarly, digital data is supplied from computer 66 via the RS_232_RX data receive line through line receiver 252 to the SDI input of UART 37. When rapid reprogramming terminal 20 is turned on, a data set ready signal (active logic one) is provided from the /DTR output of UART 37 through driver 250 via the RS_232_DSR data line to computer 66 indicating to computer 66 that rapid reprogramming terminal 20 is powered up. Computer 66 provides a data terminal ready signal (active logic one) via RS_232_DTR data line through receiver 252 to the /DSR input of UART 37 which indicates to rapid reprogramming terminal 20 that computer 66 is operational and ready to send or receive data. When computer 66 is ready to send data, computer 66 provides a request to send signal (active logic one) via RS_232_RTS data line through receiver 252 to the /CTS input of UART 37 which indicates to rapid reprogramming terminal 20 that computer 66 is ready to transmit data. Rapid reprogramming terminal 20 responds with a clear to send signal provided from the /RTS output of UART 37 through driver 250 via the RS-232_CTS data line to computer 66. When digital data from rapid reprogramming terminal 20 is to be provided to computer 66 the only requirement is that the data terminal ready signal be at the logic one state indicating that computer 66 is ready to receive data. The transmission of data to and from rapid reprogramming terminal 20 via the RS-422 data bus is similar to the transmission of data via the RS-232 data bus and therefore will not be discussed in detail.

Figure 16H:
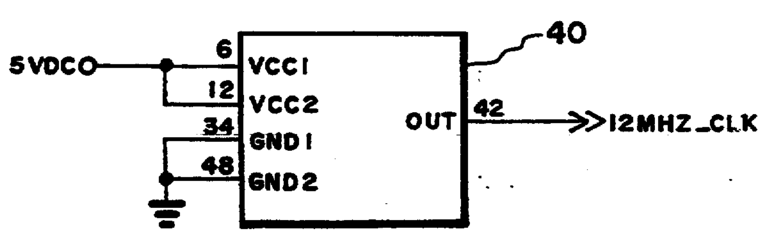

UARTS 37 and 39 include read (/RD) and write (/WR) inputs and a chip select (/CS0) input. The /IORD read signal is provided by programmable array logic device 24 to UARTS 37 and 39 to read the receiver and status registers of UARTS 37 and 39, while the /IOWR write signal is provided by programmable array logic device 24 to UARTS 37 and 39 to write data into the transmitter and control registers of UARTS 37 and 39. The /CS0 input when at the logic zero state acts as an enable signal for the read and write operations of UARTS 37 and 39. The read operation for UARTS 37 and 39 reads the digital data stored in the UART into digital signal processor 21, while the write operation writes digital data from digital signal processor 21 into the UART. UARTS 37 and 39 also receive a 12 MHZ clock signal provided by an oscillator 40, FIG. 16H. It should also be noted that UARTS 37 and 39 are provided logic signals to the A0 and A1 inputs thereof which when decoded address four internal registers within UARTS 37 and 39. Specifically, when A1, A0 is 0,0 the buffer register which receives and sends data is addressed; when A1, A0 is 0,1 the control register (write only register which configures the UART transmitter and receiver circuits) is addressed with a write and the status register (read only register that is examined by the UART to determine errors) is addressed with a read; when A1, A0 is 1,0 the modem control register is addressed and when A1, A0 is 1,1 the baud rate is selected with a write operation and the modem status register is addressed with a read operation.

Rapid reprogramming terminal 20 also has five terminals EMU0-EMU3 and H3 for communicating with an emulator 67 which is connected to external computer 66. Emulator 67 may be used for debugging rapid reprogramming terminal 20 and for the initial loading of the RRT software program into the EEPROM 23 of rapid reprogramming terminal 20. It should be noted that the emulator used in the preferred embodiment of the present invention is a Texas Instrument Model No. TMS 320C30 XDS500 Emulator, although any IBM PC-XT/AT compatible TMS320C30 emulator may be used in the preferred embodiment of the present invention. It should be further noted that external computer 66 may be any IBM PC-XT/AT compatible computer.

Figure 14A:
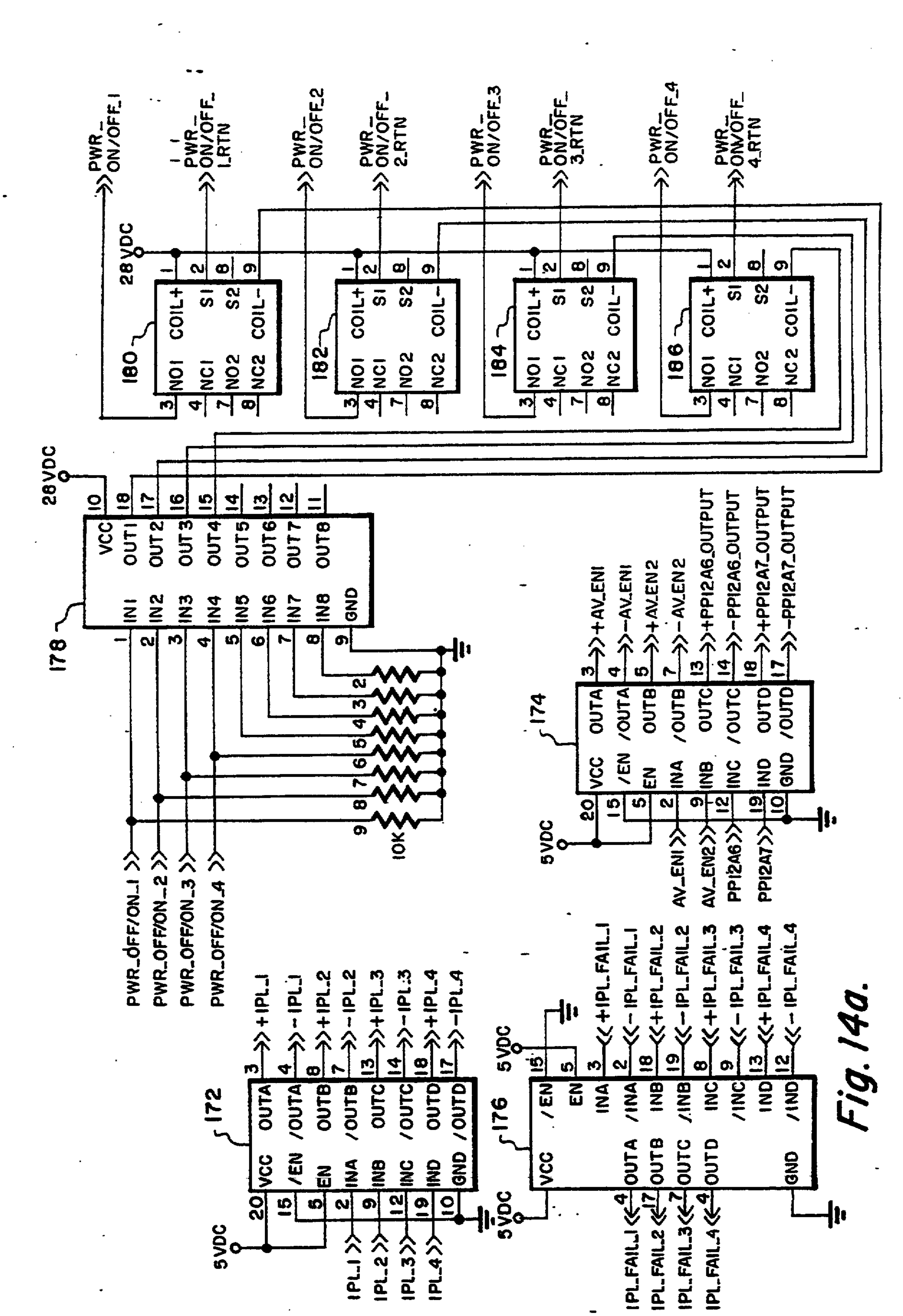
FIGS. 14*a* and 14*b* are a detailed electrical schematic of the avionics interface of the rapid reprogramming terminal.

Referring to FIGS. 1 and 14a, there is shown the avionics interface 170 of rapid reprogramming terminal 20 which includes a pair of differential line drivers 172 and 174 with driver 172 providing the unipolar differential signals +IPL_1, -IPL_1 through +IPL_4, -IPL_4 to the 1553 avionics buses one through four which are required to initiate program loading of the AN/AYK-14 avionics computers on buses one through four. Driver 174 provides the unipolar differential signals +AV_EN1, -AV_EN1 and +AV_EN2, -AV_EN2 to enable memory areas one and two of remote terminals 53 and bus controllers 55 on the 1553 avionics buses one through four.

The avionics interface 170 also includes a differential line receiver 176 which receives the unipolar differential signals +IPL_FAIL_1, -IPL_FAIL_1 through +IPL_FAIL_4, -IPL_FAIL_4 (indicative of an initiate program load failure to an AN/AYK-14 computer) and converts the signals to binary signals IPL_FAIL_1 through IPL_FAIL_4. Avionics interface 170 further includes a power driver 178 which has four inputs PWR_OFF/ON_1 through PWR_OFF-/ON_4 respectively connected to the PWR_OFF-/ON_1 through PWR_OFF/ON_4 outputs of interface 54, FIG. 17. When a five volt logic one signal is applied to the PWR_OFF/ON_1 of driver 178 the OUT1 output of driver 178 is pulled to ground the coil in relay 180 is energized closing a normally open contact within relay 180 (NO1 to S1 is shorted) which turns off the AN/AYK-14 computer on avionics bus one. It should be noted that relays 182, 184 and 186 operate in an identical manner with respect to turning off the AN/AYK-14 computers on avionics buses two through four.

Figure 14B:
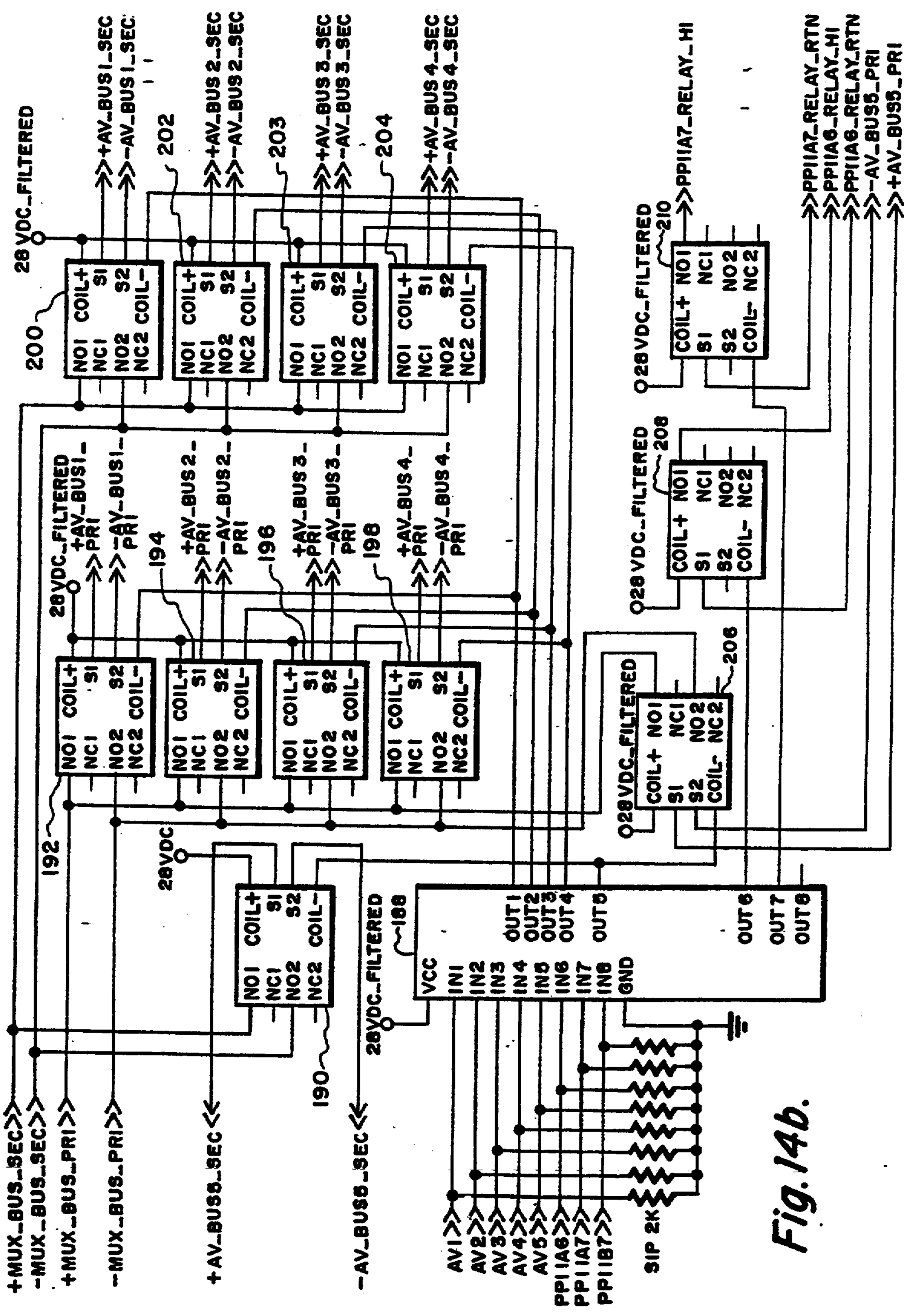

Referring to FIGS. 1 and 14*b*, when a logic one is provided from the AV1 output of interface 56, FIG. 17, to the IN1 input of power driver 188, the OUT1 output of driver 188 is driven to ground providing a ground to the coils of relays 192 and 200 thereby energizing the coils of relays 192 and 200. Energizing the coils of relays 192 and 200 connects the primary avionics bus one and the secondary avionics bus one on the aircraft to the rapid reprogramming terminal 20.

It should be noted that the 1553 multiplex data bus 42 is a dual redundant differential bus with differential data signals (+MUX_BUS, -MUX_BUS signals) that are Manchester mark encoded Military Standard 1553 signals. Thus, energizing any of the primary avionics bus relays 190, 192, 194, 196 and 198 allows data to be transmitted to and from the primary avionics bus associated with that particular relay. Similarly, energizing any of the secondary avionics relays 200, 202, 203, 204 and 206 allows data to be transmitted to and from the secondary avionics bus associated with that particular relay. For example, if the AN/AYK-14 computer on avionics bus number four is to be reprogrammed, a logic one is provided to the IN4 input of driver 188 which energizes the coils of relays 198 and 204 which allows rapid reprogramming terminal 20 to communicate with the AN-/AYK-14 computer on avionics bus number four so that this AN/AYK-14 may be reprogrammed.

Figure 15A:
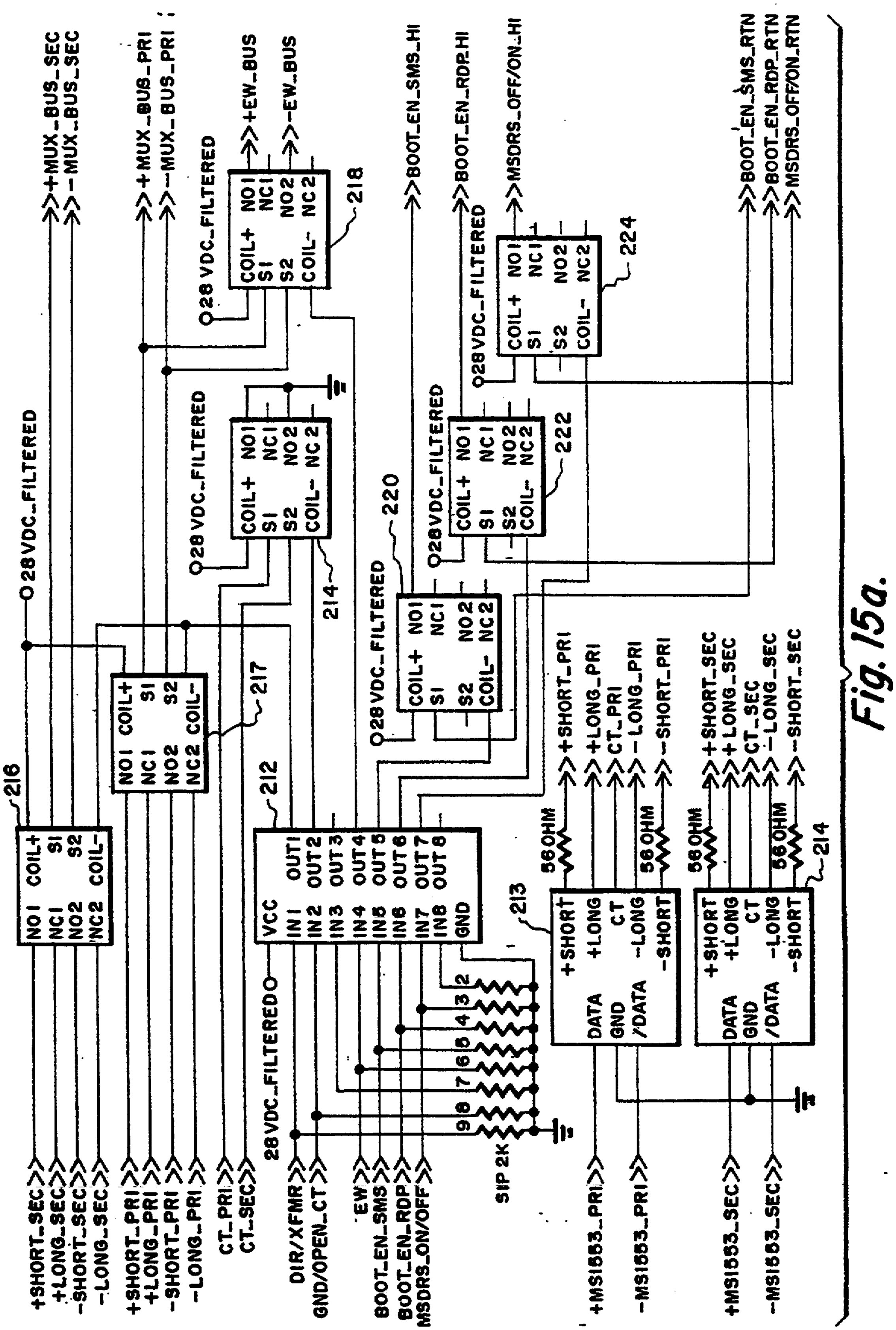
FIGS. 15*a* and 15*b* are a detailed electrical schematic of the electronic warfare interface of rapid reprogramming terminal.

Referring to FIGS. 1, 15*a* and 17, there is shown the electronic warfare interface 211 of rapid reprogramming terminal 20 which includes a power driver 212 having an IN4 input which when supplied a logic one from the PA0 output of interface 56 results in a logic zero at the OUT4 output of driver 212. This logic zero when supplied to the COIL input of relay 218 energizes the coil of relay 218. When the PB0 output of interface 56 (DIR/XFMR line) is at the logic one state the OUT1 output of driver 212 goes to ground energizing the coil of relay 217 closing normally open contacts one and two of relay 217. This allows Manchester encoded data from of 1553 communications interface controller 41 to pass through transformer 213, relays 217 and 218 to a remote terminal 53 or bus controller 55 on the electronics warfare bus.

Similarly, when the PB0 output of interface 56 is at the logic zero state the OUT1 output of driver 212 is open de-energizing the coil of relay 216 leaving the normally closed contacts one and two of relay 216 closed such that data provided from controller 41 will pass through transformer 213, relays 217 and 218 and a transformer 60, FIG. 4, to a remote terminal 53 or bus controller 55 on the electronics warfare bus.

It should be noted that whenever it is required to ground the center tap of transformers 213 and 214, a logic one is supplied to the GND/OPEN_CT of driver 212 from the PB1 output of interface 56. This results in a ground at the OUT2 output of relay 214 energizing the coil of relay 214 which closes the normally open contacts one and two of relay 214. This brings the CT and GND terminals of transformer 213 and 214 to ground level, thus grounding the center tap of transformers 213 and 214. It should be further noted that the center tap of transformers 213 and 214 is generally grounded when coupling to the 1553 multiplex data bus 42 is through a pair of transformers 60 if the remote terminal 53 or bus controller 55 requires grounding.

Relays 220, 222 and 224 function in manner similar to relay 218. For example, if it is desired to reprogram the stores management system aboard an aircraft a logic one will be provided at the PB4 output (BOOT_EN_SMS line) of interface 56. A logic one at this output is supplied to the IN5 input of driver 212 resulting in a ground at the OUT5 output of driver 212. This energizes the coil of relay 220 closing normally open contact one of relay 220 enabling the stores management system boot loader allowing data to be transferred from rapid reprogramming terminal 20 to the stores management system aboard the aircraft.

Figure 15B:
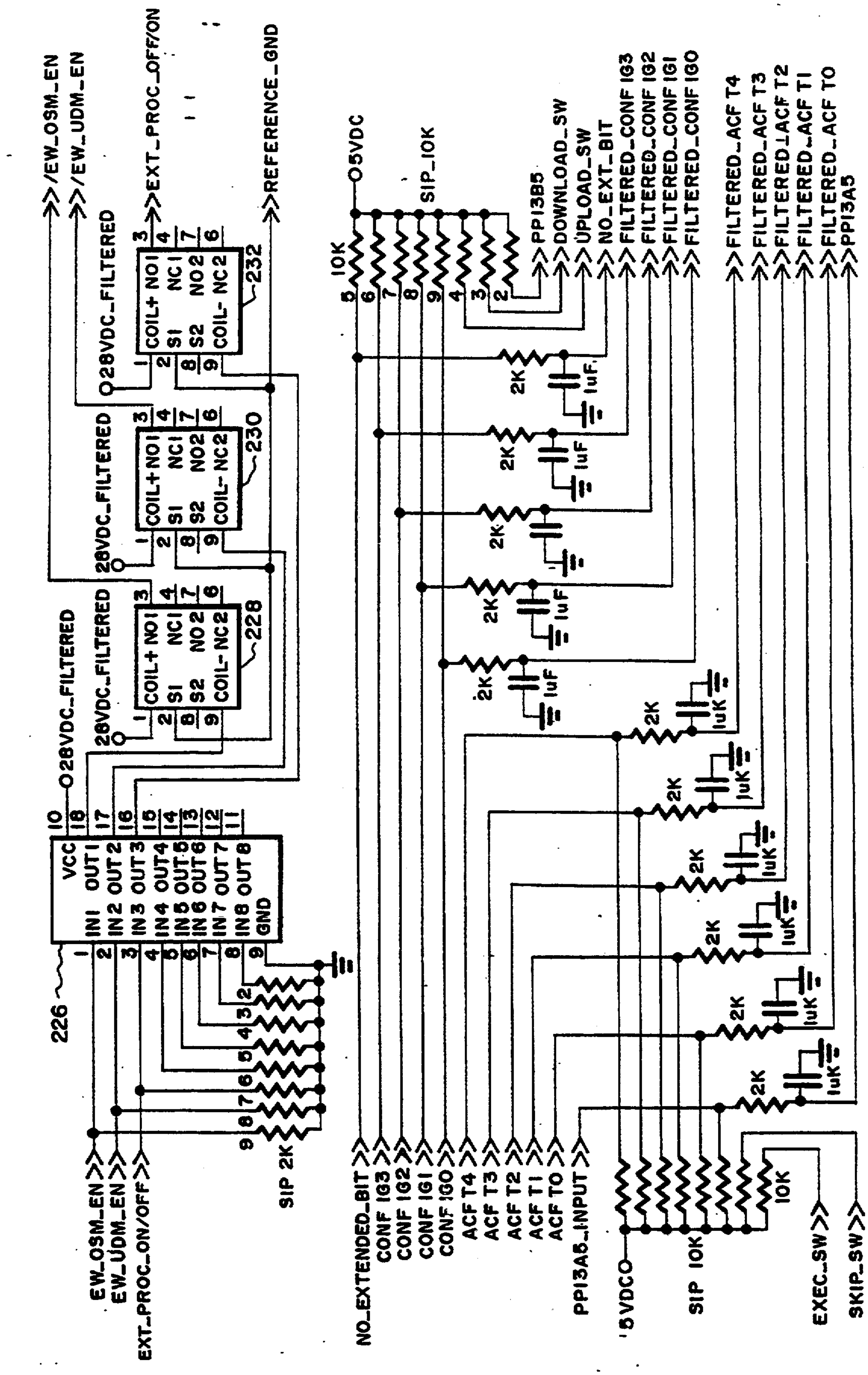

Referring to FIG. 1, 15*b* and 17 operating system memory of all avionics EW equipment, user data memory of all avionics EW equipment and the AN/ALQ-165 radar jammer are respectively enabled by logic ones provided at the IN1, IN2 and IN3 inputs driver 226. This energizes either relay 228, 230 or 232, which respectively enables either the operating system memory of all avionics EW equipment, user data memory of all avionics EW equipment or the AN/ALQ-165 radar jammer which communicate via the electronic warfare bus aboard the aircraft.

Referring to FIGS. 1, 15*a*, 16*a*, 16*b*, 16*g* and 16*h*, when, for example, an aircraft avionics bus AN/AYK-14 computer is to be reprogrammed, the 1553 communications interface controller 41 will convert parallel data supplied to its D0–D15 inputs by digital signal processor to Manchester encoded differential data for transfer via the MS-1553 multiplex data bus to the AN/AYK-14 computer being reprogrammed. Since the MS-1553 multiplex data bus is a dual redundant bus having a primary and secondary data bus, Manchester encoded differential data will be provided at the TX_RX_A and /TX_RX_A outputs of controller 41 to transformer 213 as well as the TX_RX_B and /TX_RX_B outputs of controller 41 to transformer 214. Transformers 213 and 214 convert the Manchester encoded differential data to Manchester encoded differential data which is compatible with aircraft using isolation transformers (Long Stub Coupling Transformers, FIG. 4) and aircraft which do not use isolation transformers (Short Stub Direct Coupling, FIG. 4). The Manchester encoded differential data is next supplied through relays 216 and 217 to the NO1 and NO2 inputs of primary bus relays 190, 192, 194, 196, 198 and 218 and the NO1 and NO2 inputs of secondary bus relays 200, 202, 203, 204 and 206. When, for example, the AN/AYK-14 computer to be reprogrammed is coupled to the aircraft's Primary and Secondary Avionics Bus Number One, relays 192 and 200 are energized. This allows the Manchester encoded differential data to pass through relay 192 (primary bus relay) and relay 200 (secondary bus relay) to the AN/AYK-14 computer being reprogrammed.

The 1553 communications interface controller 41 used in the preferred embodiment of the present invention is a ILC Data Device Corporation Model BU-65190 ACE Series BC/RT/MT Advanced Communication Engine Integrated 1553 Terminal. The BU-65190 comprises an integrated interface between a host processor and a MIL-STD-1553 bus which provides bus controller, remote terminal and monitor terminal functions and is in compliance with MIL-STD 1553 and McAir electrical and protocol requirements.

The 1553 communications interface controller 41 has 32 internal registers of which 16 internal register are being utilized in the preferred embodiment of the present invention. The internal registers of controller 41 characterized the controller as a bus controller, remote terminal or monitor terminal.

The following table identifies the address for each of the internal registers of 1553 communications interface controller 41 which are used during the operation of controller 41.

TABLE II

| ADDRESS INPUTS | | | | | REGISTER |
|---|---|---|---|---|---|
| A4 | A3 | A2 | A1 | A0 | DESCRIPTION/ACCESSIBILITY |
| 0 | 0 | 0 | 0 | 0 | Interrupt Mask Register (RD/WR) |
| 0 | 0 | 0 | 0 | 1 | Configuration Register 1 (RD/WR) |
| 0 | 0 | 0 | 1 | 0 | Configuration Register 2 (RD/WR) |
| 0 | 0 | 0 | 1 | 1 | Start/Reset Register (WR) |
| 0 | 0 | 0 | 1 | 1 | Command Stack Pointer Register (RD) |
| 0 | 0 | 1 | 0 | 0 | BC Control Word/RT Subaddress Control Word Register (RD/WR) |
| 0 | 0 | 1 | 0 | 1 | Time Tag Register (RD/WR) |
| 0 | 0 | 1 | 1 | 0 | Interrupt Status Register (RD) |
| 0 | 0 | 1 | 1 | 1 | Configuration Register 3 (RD/WR) |
| 0 | 1 | 0 | 0 | 0 | Configuration Register 4 (RD/WR) |
| 0 | 1 | 0 | 0 | 1 | Configuration Register 5 (RD/WR) |
| 0 | 1 | 0 | 1 | 1 | Monitro Data Stack Address Register (RD/WR) |
| 0 | 1 | 0 | 1 | 1 | BC Frame Time Remaining Register (RD) |
| 0 | 1 | 1 | 0 | 1 | BC Time Remaining to Next Message Register (RD/WR) |
| 0 | 1 | 1 | 0 | 1 | BC Frame Time/RT Last Command/MT Trigger Word Register (RD/WR) |
| 0 | 1 | 1 | 1 | 0 | RT Status Word Register (RD) |
| 0 | 1 | 1 | 1 | 1 | RT BIT Word Register (RD) |

The /MS1553_SEL and /MS1553_REG logic signals provided by programmable array logic device 25, FIG. 16E are used to access the 16 internal registers of Table II. When the /MS1553_SEL signal is active low, controller 41 is accessed with the logic state of the /MS1553_REG signal determining whether the 16 internal register of controller 41 is being accessed or the 4K of controller internal memory is being accessed. A logic zero at the /MEM-REG input of controller 41 allows access to the 16 internal registers of controller 41, while a logic one at the /MEM-REG input of controller 41 allows access to the 4K of internal memory of controller 41.

Referring to Appendix D, Configuration Registers 2, 3, 4 and 5 are used when rapid reprogramming terminal 20 is powered-on to initialize controller 41. Configuration Register 1 characterizes controller 41 as a bus controller, remote terminal or a monitor terminal when communicating with the MS-1553 multiplex data bus.

Whenever the bits of Configuration Register 1 are set at zero, that is data bits 15–0 are zero, controller 41 is functioning as a bus controller.

BC Control Word Register sets up controller 41 for Bus A (primary bus on the MS-1553 multiplex data bus) or Bus B (secondary bus on the MS-1553 multiplex data bus) operation. For primary bus operation bit 7 of the sixteen bit control word supplied to the D0–D15 inputs of controller 41 is set to the logic zero state. For secondary bus operation bit 7 of the sixteen bit control word supplied to the D0–D15 inputs of controller 41 is set to the logic one state.

The BC Frame Time Remaining Register, BC Message Time Remaining Register and the BC Frame Time Register are not used in the preferred Embodiment of the present invention. Digital signal processor 21 provides the timing requirements normally implemented by these registers. The RT Status Word Register is used to monitor the status of the remote terminal 53 communicating with controller 41.

Whenever Configuration Register 1 of controller 41 is set up to have a hexadecimal value of 8000 or 8F80 controller 41 is functioning as a remote terminal. It should be noted that data bit 15 of Configuration Register 1 is set at the logic one state when controller 41 is functioning as a remote terminal. The address for controller 41 when functioning as a remote terminal is supplied to the RTAD0–RTAD4 inputs thereof from interface 56.

When the control word provided to Configuration Register 1 has the hexadecimal value of 8F80 controller 41 is configured to operate on the primary and secondary buses on the MS-1553 multiplex data bus. This provides for an automatic operation with respect to certain status bits of a remote terminal status word.

When the control word provided to Configuration Register 1 has the hexadecimal value of 8000 controller 41 is configured to operate on, for example, the McAir bus. Operation of controller 41 on the McAir bus requires digital signal processor 21 to have direct control over remote terminal status word bits.

Whenever Configuration Register 1 of controller 41 is set up to have a hexadecimal value of 5600 controller 41 is functioning as a monitor terminal.

The Interrupt Mask Register is not used in the preferred embodiment of the present invention. When digital signal processor 21 provides control words hexadecimal 0004 and 0002 to the Start/Reset Register of controller 41, controller 41 first resets the Interrupt Status Register to hexadecimal 0000, controller then starts sending or receiving messages.

The BC/RT Command Stack Pointer Register is used for memory access of controller 41. The Command Stack Pointer Register, which is a read only register, allows Digital Signal Processor 21 to determine the pointer location in memory for the current or most recent message when controller 41 is functioning as a remote terminal or bus controller.

Controller 41 has a Stack A and a Stack B in memory with the controller of the present invention using only Stack A. The value of the command stack pointer is read from the Command Stack Pointer Register by digital signal processor. This identifies the current location in the command stack controller 41 is accessing. The command stack consist of 256 16 bit words with the starting address within controller 41 for the command stack being address zero (address lines XA0–XA11).

When, for example, controller 41 is operating as a remote terminal, reading the Command Stack Pointer Register provides the pointer location for the current or most recent message Block Status Word, Time Tag Word, Data Block Pointer and Receive Command Word. The Block Status Word, in turn, contains the message block status, the Time Tag Word is not used, the Data Block Pointer is the Data Block Address within memory and the Receive Command Word is the address of the location within the Look-up Table of the Data Block Pointer.

Figure 6:
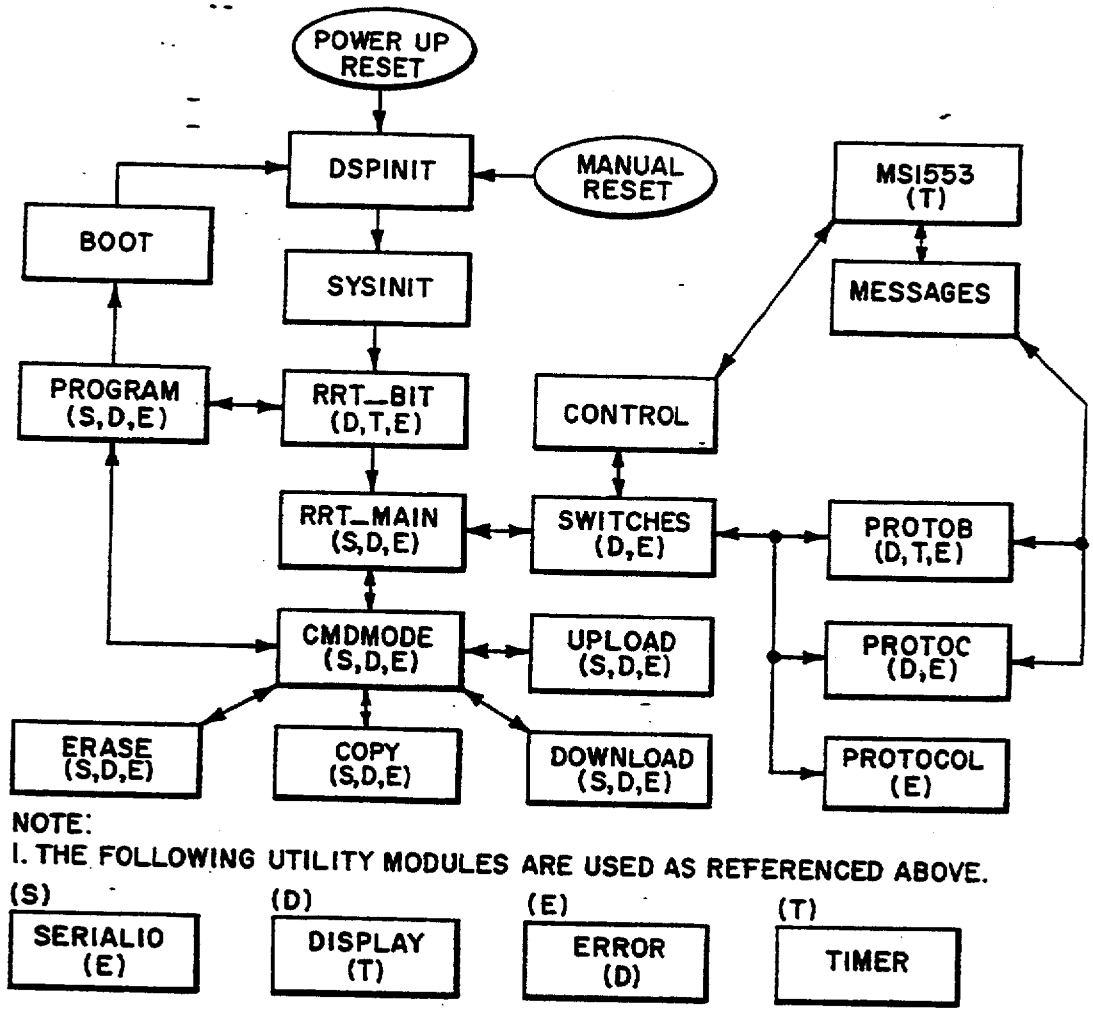
FIG. 6 is a simplified flow diagram illustrating the sequence of operation of the program modules for the software used by rapid reprogramming terminal of the present invention.

Rapid reprogramming terminal 20 utilizes a software program which comprises the modules illustrated in FIG. 6 and as well as the modules set forth in the table below:

description of each section of the dspinit.asm file follows.

The Processor Global Declarations contain declarations of two types, defined globals which are labels defined by the dspinit.asm file and used by other modules and referenced globals which are labels used by the dspinit.asm file that were defined by another module.

The reset and interrupt vector specification contains values or references used to established vectored entry points throughout the rapid reprogramming terminal program. This section's "int-vecs" (interrupt vectors) are mapped into the lower part of program memory by the linker through its interpretation of the linker command file (rrt.cmd file).

The Stack, DMA, Timer 0, Timer 1, Serial Port 0 and Serial Port 1 sections of dspinit.asm contain references used to establish the location of internal registers of digital signal processor 21 throughout the program. These register locations are defined in the linker command file.

TABLE III

| | | | |
|---|---|---|---|
| RRT.CMD | RRT.MAP | DSPINIT.ASM | SYSINIT.ASM |
| VECTORS.ASM | RRT.H | DAP.H | BOOT.H |
| BOOT.C | SERIALIO.H | SERIALIO.C | DISPLAY.H |
| DISPLAY.C | PROGRAM.H | PROGRAM.C | BIT.H |
| BASICBIT.C | CARDHDRS.H | RRT_MAIN.H | RRT_MAIN.C |
| EXT_BIT.C | CMDMODE.H | CMDMODE.C | UPLOAD.H |
| UPLOAD.C | DOWNLOAD.H | DOWNLOAD.C | COPY.H |
| COPY.C | ERASE.H | ERASE.C | SWITCHES.H |
| SWITCHES.C | MS1553.C | RRT_BIT.C | RRT_MAIN.C |
| WORDTYPE.H | CONTROL.H | CONTROL.C | INITPROT.H |
| INITPROT.C | PROTOB.H | PROTOB.C | MSGS_B.H |
| MSGS_B.C | PROTOC.H | PROTOC.C | MSGS_C.H |
| MSGS_C.C | PROTOD.H | PROTOD.C | MSGS_D.H |
| MSGS_D.C | PROTOE.H | PROTOD.C | MSGS_E.H |
| MSGS_E.C | PROTOF.H | PROTOD.C | MSGS_F.H |
| MSGS_F.C | PROTOG.H | PROTOD.C | MSGS_G.H |
| MSGS_G.C | PROTOH.H | PROTOD.C | MSGS_H.H |
| MSGS_H.C | PROTOUL.H | PROTOD.C | MSGS_UL.H |
| MSGS_UL.C | PROTOU2.H | PROTOD.C | MSGS_U2.H |
| MSGS_U2.C | MEMCARD.H | MEMCARD.C | MS1553.H |
| MS1553.C | IEEE488.H | IEEE488.C | INTERPTS.H |
| INTERPTS.C | TIMER.H | TIMER.C | ERROR.H |
| ERROR.C | | | |

A complete program listing for each of the program modules of Table III is set forth in Appendix A.

The software of Appendix A includes three types of program modules the first module type being a filename.c module which is a C listing code, the second module type being a filename.asm module which is an assembly language code and the third module type being a filename.h module which are header files which contain definitions, structures and function prototypes for the filename.c modules.

The rrt.cmd file of the software of Appendix A is the linker command file which instructs the linker as to the placement of the software files in the memory of digital signal processor 21, while the rrt.map is the linker map file.

The dspinit.asm file initializes digital signal processor 21. The dspinit.asm file is the entry point for the rapid reprogramming terminal program of Appendix A. The dspinit.asm file establishes interrupt vectors, initializes internal registers within digital signal processor 21, calls an auto-initialization routine which moves variables from ROM to RAM within digital signal processor 21 for usage by processor 21, initializes internal control registers within processor 21, and calls a system initialization routine for rapid reprogramming terminal 20. A The data constants define values used in initializing the internal registers of the digital signal processor 21 with the specific function of each value being described in the module.

Once the stack pointer, frame pointer, cache, and interrupts are established for digital signal processor 21 an auto-initialization takes place. Auto-initialization is the process of moving variables defined in the ROM of processor 21 into the RAM of processor 21 where these variables can be manipulated. The location in the internal digital signal processor 21 RAM is established in the linker command file.

The defined data constants are then stored into their appropriate locations, completing the process of initializing the various Digital Signal Processor 21 internal control registers leaving only the initialization of the external system components prior to entering the main program.

The sysinit.asm file is the rapid reprogramming terminal initialization module of the software of Appendix A. The sysinit.asm file is the system initialization routine which performs a hardware reset and initializes the registers of all peripheral devices.

Hardware Reset is performed by taking a dedicated output discrete high (active high reset) and then low again. This discrete (XF0 output of digital signal processor 21) is connected to programmable array logic device 24 which inverts the logic one RESET signal to a logic zero RESET signal. The logic one RESET signal is also supplied to UARTS 37 and 39, all three programmable peripheral interfaces 52, 54 and 56, and both IC memory cards of IC memory card 22 while the logic zero /RESET signal is supplied to 1553 communications interface controller 41 and bus controller 260, initializing each of these peripherals of rapid reprogramming terminal 20.

The vectors.asm file is a file containing pointers to the location of interrupt routines in program memory and the code that performs the autoinitialization.

The rrt.h file is a universal program definition file; the dsp.h file comprises the definitions and structures for initializing the digital signal processor 21 and the system.h file comprises the system definitions and structures that relate to the peripherals external to digital signal processor 21 such as UARTS 37 and 39.

The boot.h file comprises definitions and function prototypes for the boot.c module.

The boot.c file is the boot-strap loader module. The boot.c file along with the program.c file are the update modules for the rapid reprogramming terminal program. The boot.c file of the rapid reprogramming terminal software functions to transfer data from a serial port such as the RS-232 port or an IC memory card of IC memory card 22 into the EEPROM 23 of rapid reprogramming terminal 20 and also reboots or starts the program. The program.c file displays an update prompt on a video screen 69 and/or the LCD display 57, transfers the boot.c code into the RAM of processor 21 for execution and then proceeds to upload a new program into program memory (the EEPROM 23) by executing the boot.c code using a modified form of the Hex-32 format designed by Intel Corporation.

The data contained in the modified Intel Hex-32 format represents 32 bit words with the most significant byte coming first. Once a proper record is received the data in the word oriented data record (type 00) is transferred to program memory.

Figure 5:
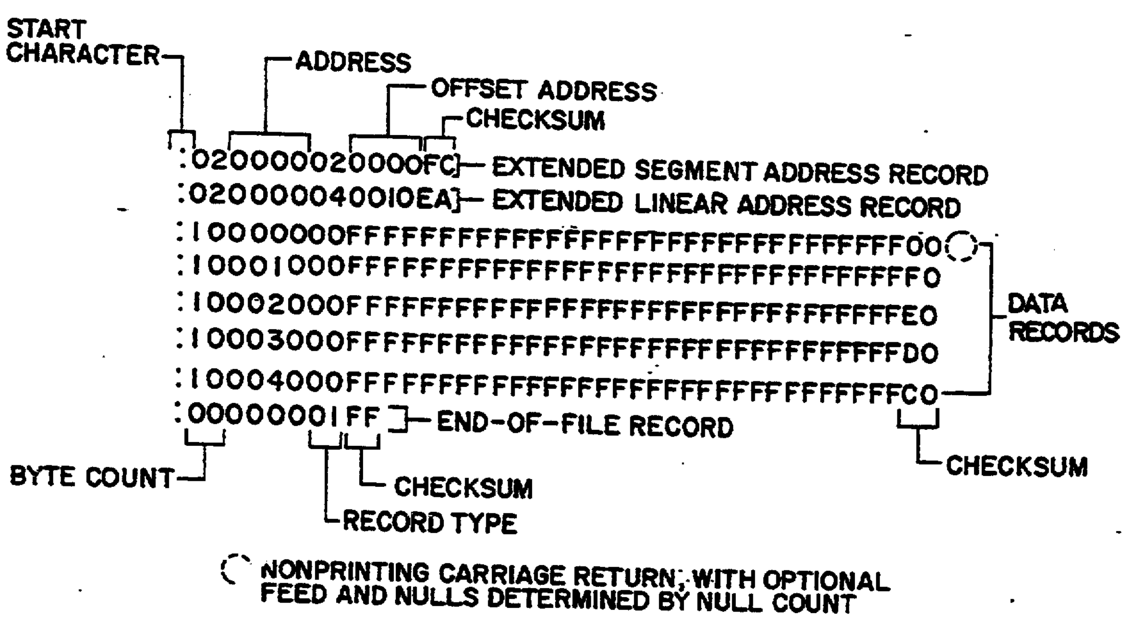
FIG. 5 is an example illustrating the Intel 32 bit Hexadecimal Object File Record Format used with the rapid reprogramming terminal of the present invention.

It should be noted that for the purpose of loading the rapid reprogramming terminal software into rapid reprogramming terminal 20, the Intel format illustrated in FIG. 5 is modified by replacing the byte count with a word count. The Intel format of FIG. 5 is used as illustrated for all upload and download functions between data terminal 66 and IC memory card 22.

Referring to FIG. 5, the Intel 32-bit Hexadecimal Object file record format or the modified format each have a nine character (four field) prefix that defines the start of record, byte count or word count, load address, and record type and a two character checksum suffix. FIG. 5 illustrates the sample records of the Intel format. The six record types for the Intel HEX-32 format are 00 (data record), 01 (end of file record), 02 (extended segment address record), 03 (start segment address record), 04 (extended linear address record) and 05 (start linear address record).

The data record begins with a colon start character, which is followed by the word or byte count which is in hexadecimal notation, the address of the first data word or byte, and the record type which is "00". The data bytes are next in the data record. The checksum follows the data bytes and is the two's complement in binary of the preceding bytes in the record, including the word or byte count, address, record type and data bytes.

The end-of-file record also begins with the colon start character and is followed by the word or byte count (equal to "00"), the address (equal to "0000"), the record type (equal to "01") and the checksum, "FF".

The address contained in the extended segment address record is shifted left four places and added to the address to determine the absolute destination address. The address field for this record must contain ASCII zeros (Hexadecimal 30's). The extended segment address record defines bits 4 to 19 of the segment base address. This record type can appear randomly anywhere within the object file and affects the absolute memory address of subsequent data records in the file.

The start segment address record, which specifies bits 4-19 of the execution start address for the object file, is not used by rapid reprogramming terminal 20.

The extended linear address record specifies bits 16-31 of the destination address for the data records that follow. The address contained in this record is shifted left 16 places and added to the address to determine the absolute destination address, and can appear randomly anywhere within the object file. The address field for this record must contain ASCII zeros (Hexadecimal 30's).

The start linear address record, which specifies bits 16-31 of the execution start address for the object file, is not used by rapid reprogramming terminal 20.

It should be noted that the software of Appendix A is readable from EEPROM 23. With the exception of the boot.c file, the software of Appendix A is executable from EEPROM 23. The boot.c file is transferred to the RAM of processor 21 for execution since the boot.c code programs EEPROM 23 and cannot be read for execution from EEPROM 23. The program.c module transfers the boot.c module to the RAM of digital signal processor 21.

The serialio.h comprises the RS-232 and RS-422 driver definitions and function prototypes. The serialio.c file of the rapid reprogramming software is the RS-232 and RS-422 driver modules which contains routines used to transfer data to and from the RS-232 and RS-422 data buses.

The EIA RS-232 data bus protocol or interface is a conventional, well known, widely used and popular data bus protocol which provides an interface between data terminal equipment and data communications equipment using serial binary data exchange. It may typically be used to interface a computer such as data terminal 66 and a peripheral device such as a modem, mouse, drawing tablet or printer and typically uses a 25 pin DB-25 or a 9 pin DB-9 connector. It normally has a cable length limitation of 50 feet. The RS-232 interface standard specifies the electrical signal characteristics, connector pin assignments and functional interchange circuit descriptions for serial binary exchange.

The RS-422 is an EIA standard for serial transmission that extends the distances and speeds beyond the RS-232 standard.

The routines used by the serialio.c module for the RS-232 interface are a Get Byte routine which inputs data bytes by constructing the byte from nybles obtained from the Get Nyble routine; a Get Nyble routine which inputs data nybles obtained from ASCII characters returned by an RS232 Receive routine; a Put Byte routine which outputs bytes by constructing nybles and sending them through a Put Nyble routine; a Put Nyble routine which outputs nybles by constructing ASCII characters and then outputs the nybles through the RS232 Send routine; a RS232 Receive routine which inputs ASCII characters by first testing the UART status until a character is received and then getting the character from the RS232 Data routine and an RS232 Data routine which inputs ASCII characters directly from the UART receive register without testing any UART status bits other that those indicating if an error (overrun, parity, etc.) has occurred. Further, the serialio.c module for the RS-232 interface uses a RS232 Send routine which outputs ASCII characters by first testing for a busy (the RS-232 interface might be sending data) and if busy prevents a receive overrun and when not busy a receive is enabled and data is sent. The serialio.c module for the RS-232 interface also uses a String Send routine which outputs ASCII strings by first testing the busy status to ensure that each character can be sent.

The display.h file comprises the liquid crystal display driver definitions and function prototypes. The display.c module performs two functions with respect to liquid crystal display 57 in that it provides for the initialization of liquid crystal display 57 and for the alpha numeric display provided to the operator by liquid crystal display 57. The initialization function of the display.c module clears liquid crystal display 57 and sets up display 57. It should be noted that liquid crystal display 57 provides two lines of alpha numeric display characters with each line having twenty alpha numeric characters for display. The display function provides for two arguments for the function call, the second argument being the string of alpha numeric characters to be displayed by liquid crystal display and the first argument being the starting location of the string of alpha numeric characters to be displayed by liquid crystal display 57.

Three control characters, form feed ( f), tab ( t) and line feed ( n), are used to facilitate displaying messages with the liquid crystal display. The form feed character ( f) causes the display 57 to be cleared, the tab character ( t) causes the remaining characters in the current line from the current location in the line to be cleared, and the line feed character ( n) causes the remaining characters in the string to be displayed beginning at the start of the second line of liquid crystal display 57.

The program.h file is the prototype for the program.c (boot.c loader) function. The program.c file comprises the code for transferring the boot.c file from EEPROM 23 into the RAM of digital signal processor 21. This allows rapid reprogramming terminal to reprogram the software of Appendix A with the exception of certain start up modules consisting of dspinit.asm, sysinit.asm, boot.c, serialio.c, display.c, program.c and basicbit.c.

The bit.h file comprises the rapid reprogramming terminal built in test functions definitions and function prototypes. The basicbit.c file provides for a rapid reprogramming terminal controller built-in-test function. The basicbit.c code tests the liquid crystal display 57, UARTs 37 and 39, bus controller 41, interfaces 52, 54 and 56, EEPROM 23 which consists of EEPROMs 240, 241, 244 and 246 and the IEEE-488 interface bus controller 260.

The ext_bit.c module is a rapid reprogramming terminal system built in test function which again test the electronics components tested by the basicbit.c module as well as the remaining electronic components of rapid reprogramming terminal 20. The ext_bit.c module provides for failure code display which identifies the failure to an operator on screen 69. The operator may then either skip the failure code displayed on screen 69 by activating switch 49 to the "skip" position or the operator may use switch 49 to continue with the system built in test function by activating switch 49 to the "exec" position. It should be noted that testing of rapid reprogramming terminal occurs upon turning on power (activating switch 44) to rapid reprogramming terminal 20.

The cardhdrs.h file comprises memory card format and definitions for Military Standard 2217 implemented by the software of Appendix A.

The rrt_main.h file is a background executive function prototype for the rrt_main.c file. The rrt_main.c file provides rapid reprogramming terminal 20 with a means for polling the RS-232 and RS-422 interfaces and look for a sequence of ASCII characters (+++) from a data terminal such as data terminal 66, FIG. 1. Upon detecting the ASCII characters +++ rapid reprogramming terminal enters its command mode software. The rrt_main.c file allows rapid reprogramming terminal 20 to test memory card 22 to see if the card is a program card. If the memory card 22 is a program card rapid reprogramming terminal may then update its software in EEPROM 23 from the code that is on the memory card. It should be noted that the boot.c file allows for reprogramming of rapid reprogramming terminal 20 either via the RS-232 interface or memory card 22.

The cmdmode.h file is the command mode function prototype for the cmdmode.c file.

The cmdmode.c module interfaces a keyboard 62 with rapid reprogramming terminal 20 to allow a user/operator to enter commands into the rapid reprogramming terminal 20. When the user enters "+++" into rapid reprogramming terminal 20 via keyboard 62 a Command Mode menu will appear on video screen 69. The Command Mode menu includes the following UP LOAD (U), DOWNLOAD (D), ERASE (E), PROGRAM (P), APPEND(A) COPY (C), VERIFY (V) and ESCAPE. When the user enters a "U" via the keyboard 62, digital data is transferred from an external computer 66 through either the RS-232 or RS-422 interfaces to IC memory card 22. Similarly, when the user enters a "D" via the keyboard 62, digital data is transferred from IC memory card 22 through either the RS-232 or RS-422 interfaces to external computer 66.

An "E" entered by the user via keyboard 62 erases IC memory card 22. Entering a "P" via keyboard 62 allows the user to enter a new program into EEPROM 23. The PROGRAM command functions in the same manner as the UPLOAD command. The Escape key on keyboard 62 allows the user to escape the Command Mode menu.

An "A" allows the user to transfer data from external computer 66 to IC memory card 22 as an addition to the data to IC memory card 22.

Entering a "C" allows the user to copy the contents of one IC memory card into the other erased IC memory card of IC memory card 22. Entering a "V" allows the user to verify the contents of one IC memory card are identical to the contents of the of the IC memory card of IC memory card 22.

It should be noted that IC Memory Card 22 may be either a library card which contains information for loading other equipment such as an AN/AYK-14 computer on an aircraft avionics bus or a program card which is used to reprogram rapid reprogramming terminal 20.

The upload.h file comprises the IC Memory Card upload/append function prototype and definitions. The upload.c file of the software of Appendix A is the module which uploads data from an external computer 66 through the RS-232 interface 71 and processor 21 to IC memory card 22. An upload prompt message is displayed on video screen 69 at the beginning of this module. The module tests the status of IC memory card 22 for changes, that is IC memory card 22 must be operating properly. The upload.c module then enters an infinite loop to process incoming records in an Intel Hex-32 format. All Intel Hex-32 record types are supported except types 03 and 05. Once a proper data record (type 00) is received the data in the byte oriented data record is transferred to IC memory card 22. The upload.c module is exited with the proper receipt of a type 01 record, that is an end of data record, and returns to the command mode. The upload.c also includes the append function.

The download.h file is the memory card data/file download function prototype. The download.c file is the module during which data is down loaded from IC memory card 22 through digital signal processor 21, the RS-232 interface 71 to computer 66. The download.c module displays a download prompt message on video screen 69 asking for the location of the data to download and then proceeds to download the data using the Intel Hex-32 format of FIG. 5. Upon completion of the down loading of data this module returns to the Command Mode. The user may identify a memory address range within either memory card one or two of IC memory card 22 from which data is to be downloaded. The user may also download a user specified file from memory card 22 by entering an "F" via keyboard 62.

The copy.h file comprises the memory card copy/-verify function prototype and definitions. The copy.c file allows the user to transfer from one memory card of IC memory card 22 to a blank card which is the second card of IC memory card 22. The copied data may then be verified by entering a "V" via keyboard 62.

The erase.h module comprises the memory card erase function prototype. The erase.c module clears memory card one or two of IC memory card 22 by writing the erase command to each memory block within the memory card resulting in logic ones in each location in the memory of the card. The user must specify which of the two memory cards of IC memory card 22 is to be erased.

The switches.h file is the monitoring and library card processing function prototype. The switches.c module is the switch test and the interactive reprogram control module. The UP/VRFY/DOWN switch 47 of front panel 43 determines the mode of operation of rapid reprogramming terminal 20, while the EXEC/SKIP switch 49 determines whether a data file is to be uploaded or downloaded to equipment on the aircraft avionics or EW buses or verified or skipped. When the user activates switch 49 to the EXEC position, the software of Appendix A vectors from the rrt_main.c module to the switches.c module. The switches.c module then determines whether an upload, download or verify operation is to be performed by rapid reprogramming terminal 20 depending upon the user selected position of switch 47 of front panel 43. If, for example, the user activates switch 47 to the download position and such an operation is not allowed with respect to the equipment being accessed by rapid reprogramming terminal 20 then liquid crystal display 57 displays a message to the user that the user may not initiate a download operation. The switches.c module looks for a cable from an aircraft to be reprogrammed as well as the aircraft identification and configuration which is then compared with information stored on IC memory card 22. If, for example, the aircraft identification is different from the identification stored on the IC memory card 22 then an error message is displayed on liquid crystal display 57. Rapid reprogramming terminal 20 also provides for a direct load capability, that is the aircraft's equipment may be reprogrammed when removed from the aircraft.

Switches.c loads a file manually by the user activating switch 49 to the EXEC position. Switches.c skips a file by the user activating switch 49 to the SKIP position. If automatic loading is permitted IC Memory Card 22 includes in its header a bit which allows for automatic loading. A prompt is then provided on screen 69, which indicates to the user to activate switch 49 to the EXEC position for an automatic load or activate switch 49 to the SKIP position for a manual load. If the user selects an automatic load all files are loaded without user participation. If the user selects a manual load, each file is loaded by the user by activating switch 49 to the EXEC position after the file is displayed to the user. If a data file is to be uploaded, downloaded or verified the switches.c file selects the proper bus, bus characteristics, and executes a protocol based upon the contents of a lookup table stored in IC memory card 22.

The wordtype.h file comprises MIL-STD-1553 word type definitions and structures.

The control.h file comprises MIL-STD-1553 bus control definitions and prototypes.

The switches.c module branches to the control.c module which controls the MS-1553 multiplex data bus 42 according to the data provided by IC memory card 22.

The control.c file is used to establish control of the 1553 multiplex data bus 42. The control.c module converts rapid reprogramming terminal 20 to a bus controller 55 and also converts the bus controller 55 to a remote terminal 55 when the bus controller 55 is to be reprogrammed as a remote terminal. The control.c module also converts bus controller 55 to a remote terminal when another remote terminal is being programmed by rapid reprogramming terminal 55 functioning as a bus controller.

Another function performed by the control.c module is to quiet or inactivate the bus controller for the purpose of reprogramming a remote terminal 53. This operation generally takes place whenever the bus controller can not be converted to a remote terminal. For example, if rapid reprogramming terminal 20 is to reprogram an AN/ALQ-126B Defensive Electronic Counter Measures Set (a remote terminal on the electronics warfare bus) and the AN/ALR-67 Radar Warning Receiver (the bus controller on the electronic warfare bus) is active, the control.c module will quite the AN/ALR-67 Radar Warning Receiver to allow rapid reprogramming terminal 20 to reprogram the AN/ALQ-126B Defensive Electronic Counter Measures Set. It should be noted that the AN/ALR-67 Radar Warning Receiver can not be converted to a remote terminal.

The switches.c module enables a bus controller which was previously quieted by the control.c file by releasing the discrete enable, e.g. EW_OSM_EN and EW_UDM_EN discretes.

The control.c module takes the bus controller 55 that was previously converted to a remote terminal by the control.c module and reconverts it to a bus controller and also reconverts rapid reprogramming terminal 20 from a bus controller to it's initial remote terminal status.

The ms1553.c module of the software of appendix A includes a monitor function which determines if there is polling on the MS-1553 multiplex data bus 42.

The memcard.h file comprises the memory card driver definitions and function prototypes. The memcard.c file includes a memory_card_read driver for reading IC memory-card 22. The card address is passed by the memory_card_read driver and the contents at this address is returned. The memory_card_read driver then uses a function address_card_page to select a page of the memory card and returns a system address to processor 21 which then uses the system address to obtain the data from the memory card. It should be noted that memory cards zero and one of IC memory card 22 each have eight pages of memory to store data. Each page stores eight megabytes at information.

The memcard.h file also includes a memory_card_write driver which writes data to the indicated IC memory card address and returns a status value. The memory_card_write driver uses address_card_page in the same manner as the memory_card_read driver. The memory_card_write driver also provides the required command to allow the data to be written into the memory card.

The memcard.h file includes an memory_card_erase driver that erases the entire contents of the IC memory card. The memory_card_erase driver provides the proper command to the memory card to allow the card to be erased to a state where all logic ones are stored in the memory card. The memcard.h file also includes a memory_card_status driver which waits until the memory card is ready or times out and returns a status indicating possible memory card errors. The memcard.h file includes a memory_card_size driver which obtains the size of the IC memory card from the card identification. The memcard.h file includes a memory_card_block driver which obtains the block size of the IC memory card. The memcard.h file includes a memory_card_ID driver which obtains the IC memory card manufacturer and card ID.

The ms1553.h file comprises the bus driver definitions and function prototypes. The ms1553.c file provides the drivers for MS-1553 multiplex data bus 42. The ms1553.c file includes an ms1553_send driver which sends data over the MS-1553 multiplex data bus 42 when rapid reprogramming terminal 20 is set up to function as a bus controller. This driver uses two pointers with the first pointer pointing to the data to transferred via the MS-1553 multiplex data bus 42 and the second pointer points to the storage location of the status word sent from the remote terminal 53.

The ms1553.c file includes an ms1553_receive driver which receives data over the MS-1553 multiplex data bus 42 when rapid reprogramming terminal 20 is set up to function as a bus controller. This driver sends a command to the remote terminal 53 for the remote terminal to send a message block to rapid reprogramming terminal 20.

The ms1553.c file includes an ms1553_respond driver which allows rapid reprogramming terminal 20 to function as a remote terminal. The ms1553_respond driver provides the information required by bus controller 41 to allow bus controller 41 to respond to polls initiated by a bus controller 55 on the MS-1553 multiplex data bus 42. The ms1553_respond driver also allows bus controller 41 to send data to and receive data from the bus controller 55 controlling the bus.

The ms1553.c file includes a ms1553_monitor driver which allows rapid reprogramming terminal 20 to monitor the MS-1553 multiplex data bus 42. Bus controller 41 is first set up to operate as a monitor terminal. Bus controller 41 then monitors the MS-1553 multiplex data bus 42 for activity on the bus 42. If there is activity on the MS-1553 multiplex data bus 42 then the ms1553_monitor driver returns a value indicating an active bus. If there is no activity on the MS-1553 multiplex data bus 42 then the ms1553_monitor driver returns a value indicating no activity on the bus.

The ms1553.c file includes a ms1553_BC_setup driver which initializes controller 41 as a bus controller; a ms1553_RT_setup driver which initializes controller 41 as a remote terminal and a ms1553_MT_setup driver which initializes controller 41 as a monitoring terminal.

The ms1553.c file includes a ms1553_change_bus_channel driver which allows controller 41 to change operation to the alternate channel (either the primary or secondary bus).

The ieee488.h module provides the IEEE-488 bus driver function prototype. The ieee488.c module provides the bus driver function to communicate over the IEEE 488 bus which includes bus driver 260 and transceivers 262 and 264.

The interpts.h file provides interrupt vector function prototypes. The interpts.c file provides the interrupt vector functions and is currently not being used by rapid reprogramming terminal 20.

The timer.h file provides timer definitions and function prototypes. The timer.c file of the rapid reprogramming terminal software is the timer module which contains the timer routines used to set delays or timeouts.

The error.h file provides error definitions and function prototypes. The error.c file of the rapid reprogramming terminal software contains routines that display error messages.

Figure 7:
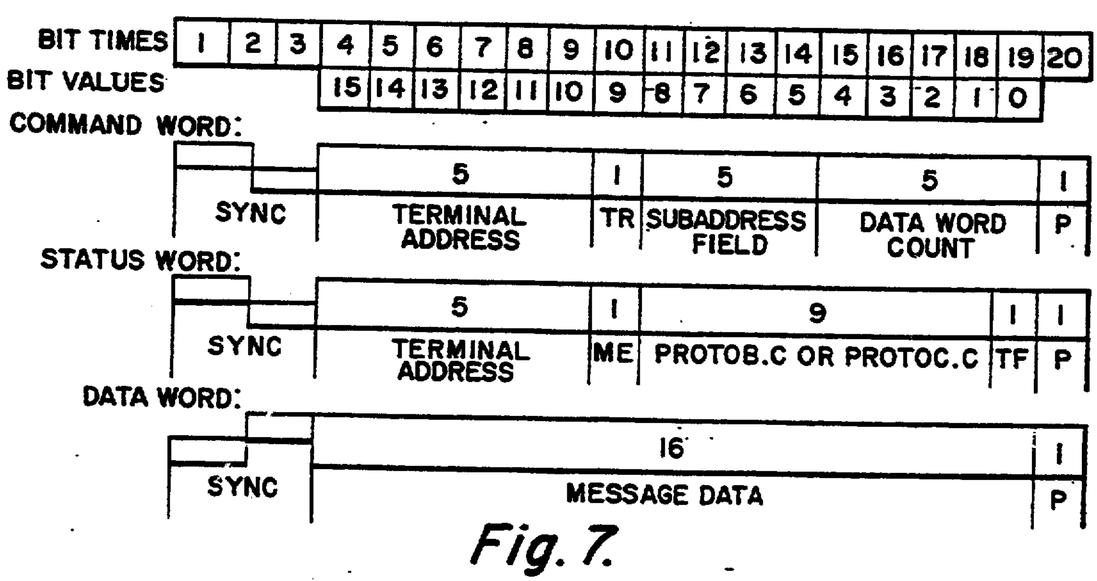
FIG. 7 illustrates the format of message transfers via the 1553 multiplex data bus interface aboard an aircraft.

Referring to FIG. 7, the format of message transfers on the 1553 multiplex data bus 42 will now be discussed. Bus Controller 41 is used to translate sixteen bit data words provided by processor 21 into Manchester mark encoded Military Standard 1553 signals for use by 1553 multiplex data bus 42 and also to decode Manchester mark signals provided by bus 42 into sixteen bit data words supplied to processor 21. A logic one is transmitted as a bipolar coded signal 1/0 or 0/1. A logic zero is the absence of a bipolar coded signal. A transition always occurs during the rising edge of a data clock signal. An absence of either pulse within a bit time is a Manchester error.

As is best illustrated by FIG. 7, the Command Word format for each Command Word transmitted by rapid reprogramming terminal 20 consists of a command sync waveform which is an invalid Manchester waveform. The width of the waveform is three bit times with the waveform being positive for the first one and one-half bit times, and then negative for the following one and one-half bit times.

The next five bits (Bit times 4 to 8, bits 11-15) following the sync waveform is the remote terminal address, with there being normally thirty addressable units per bus since the digital codes 00000 and 11111 are usually not used. The type of avionics or other equipment defined by these addresses vary by aircraft and selected bus.

Following the remote terminal address is the transmit/receive bit (Bit time 9, bit 10) which indicates the action required of the remote terminal 53. A logic zero indicates that the remote terminal 53 is to receive data, while a logic one indicates that the remote terminal 53 is to transmit data.

The subaddress field (Bit time 10 to 14, bits 5–9) follows the transmit/receive bit and identifies the type of message, for example an activity message. The subaddress values 00000 and 11111 are used for mode commands.

The data word count (Bit times 15 to 19, bits 0–4) follows the subaddress field and is a binary number indicating the data words to be either sent or received by the remote terminal 53. The remote terminal 53 may either send or receive a maximum of thirty two words in any one message block with all ones indicating a decimal count of thirty one and all zeros indicating a decimal count of thirty two.

The P bit (Bit time 20) of the command word is used for parity over the preceding sixteen bits and utilizes odd ones parity.

Status words are transmitted by a remote terminal 53 after receipt of rapid reprogramming terminal generated Command Word or following a rapid reprogramming terminal to remote terminal transfer.

The Status Word format for each Status Word transmitted by a remote terminal 53 consist of a status sync waveform which is an invalid Manchester waveform identical to the command sync waveform.

The next five bits (Bit times 4 to 8, bits 11–15) following the sync waveform is the address of the remote terminal 53 which is transmitting a status word.

Following the remote terminal 53 address is a message error bit (Bit time 9, bit 10) which indicates if some error was detected in the command or data words sent by rapid reprogramming terminal 20.

The status code field (Bit times 10 to 18, bits 1–9) follows the message error bit and is used to convey remote terminal status information to rapid reprogramming terminal 20.

The terminal flag (Bit time 19, bit 0) follows the status code and will be set to one to indicate that the status code field should be examined by rapid reprogramming terminal 20.

The P bit (Bit time 20) of the status word is used for parity over the preceding sixteen bits and utilizes odd ones parity.

Sequences of up to thirty two data words may be sent from a remote terminal 53 to rapid reprogramming terminal 20 or from rapid reprogramming terminal 20 to a remote terminal 53. Each data word consist of a data sync waveform (Bit times 1 to 3) which is an invalid Manchester waveform. The width of the waveform is three bit times with the waveform being negative for the first one and one-half bit times, and then positive for the following one and one-half bit times.

The sixteen message data bits (Bit times 4 to 19, bits 0–15) following the sync waveform are used for message data transmission.

The P bit (Bit time 20) of the data word is used for parity over the preceding sixteen bits and utilizes odd ones parity.

Figure 8A:
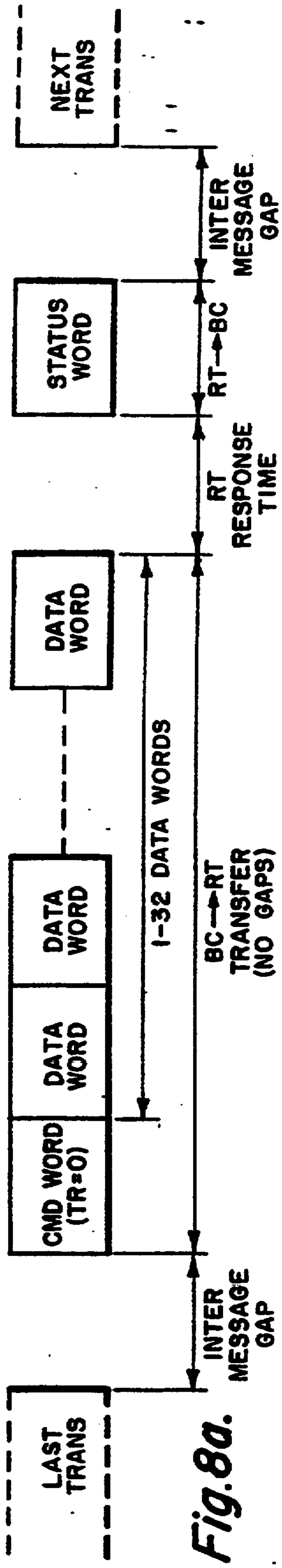
FIG. 8A illustrates rapid reprogramming terminal to remote terminal data transfers.

Referring to FIG. 8a during the transfer sequence from rapid reprogramming terminal 20 to a remote terminal 53, terminal 20 transmits a command word with its TR bit set to zero, followed immediately by from one to thirty two data words also generated by terminal 20. The remote terminal 53 next responds with a status word.

Figure 8B:
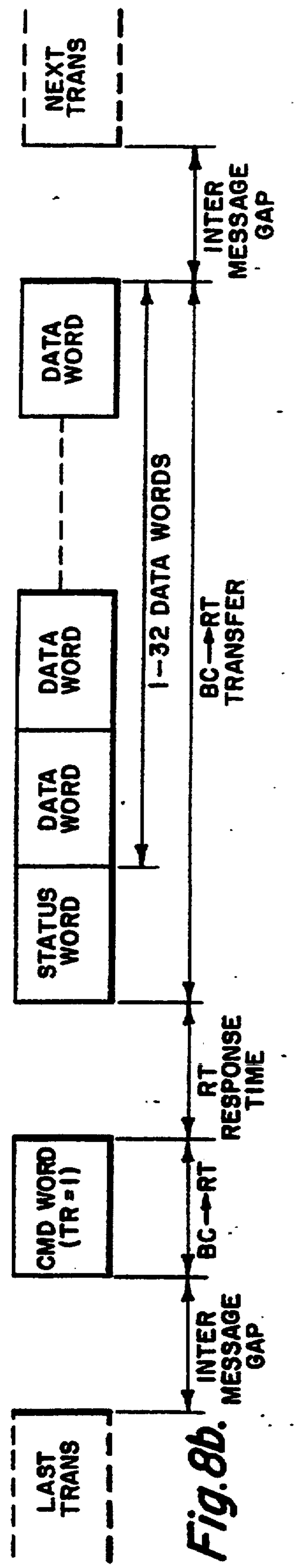
FIG. 8B illustrates remote terminal to rapid reprogramming terminal data transfers.

Referring te FIG. 8*b* during the transfer sequence from a remote terminal 53 to rapid reprogramming terminal 20, rapid reprogramming terminal 20 transmits a command word with its TR bit set to one. The remote terminal 53 responds with a status word followed by one to thirty two data words.

At this time it should be noted that the following discussion relates primarily to protocol B of Military Standard 2217(AS).

The messages utilized by rapid reprogramming terminal 20 to communicate with a remote terminal 53 being reprogrammed via the 1553 multiplex data bus 42 will now be discussed. It should be understood that the messages used by rapid reprogramming terminal 20 to communicate with any remote terminal 53 aboard the aircraft via the 1553 data bus are required to follow the message formats set forth in FIGS. 7 and 9.

Figure 9A:
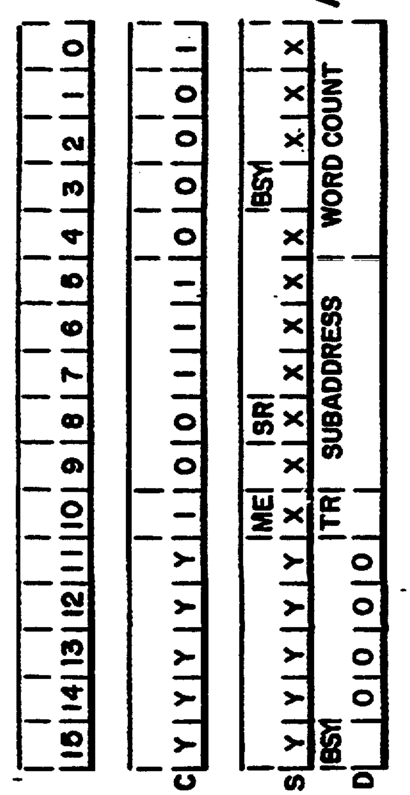
FIG. 9A illustrates the format of activity message transfers via the 1553 multiplex data bus to and from a remote terminal being reprogrammed.

The Activity Message of FIG. 9A is utilized by rapid reprogramming terminal 20 when reprogramming a remote terminal 53 to determine whether the remote terminal 53 is ready to receive data and allows the remote terminal 53 a request to send information to rapid reprogramming terminal 20 or receive information from rapid reprogramming terminal 20.

Referring to FIG. 9A the Command Word for the activity message follows the format set forth in FIG. 7. Bits 11–15 provide the address of the remote terminal 53 to receive the message, bit 10 is set at a logic one, the subaddress (bits 5–9) is set at 07 hexadecimal and the word count (bits 0–5) is one.

Figure 9B:
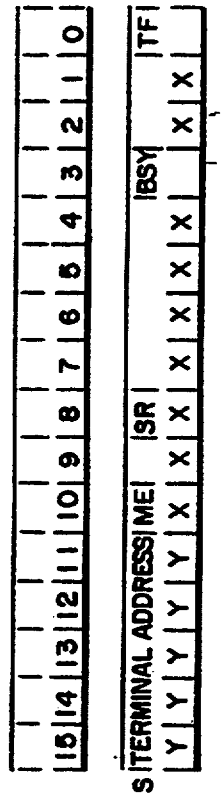
FIG. 9B illustrates the status response word format provided by a remote terminal for each message transaction via the 1553 multiplex data bus.

The status word response to the activity message follows the general format set forth in FIG. 7 supplemented by FIG. 9B. A status response word to the Activity and other messages is provided by a remote terminal 53 for each message transaction. The status response word follows data on a remote terminal receive type transaction and precedes the data on a remote terminal transmit type transaction. The rapid reprogramming terminal 20 allows a response time gap of approximately 12 usec. from the end of the last transmitted command word (transmit type message) or the end of the last transmitted data word (receive type message), to the start of the remote terminal status response word before declaring a no response error. The remote terminal 53 begins the status response word within a time period of approximately 2–10 usec. from the receipt of the end of the last command word (transmit type message) or the receipt of the end of the last data word (receive type message). The software for rapid reprogramming terminal ensures that the time from the end of the remote terminal transmission of the last data word (transmit type message) or the end of the last status response word (receive type message) to the beginning of the next command word is at least 8 usec.

Referring to FIG. 9B, the status response word bits comprise a terminal address (bits 11–15) which is remote terminal address of the remote terminal 53 being reprogrammed (referred to as YYYYY); a message error bit (bit 10); a service request bit (bit 8) and a busy bit (bit 3).

The busy bit is utilized by rapid reprogramming terminal 20 if it is set and when the remote terminal being reprogrammed is compatible with setting the busy bit, that is the remote recognizes the busy bit. The setting of this bit to a logic one indicates to the rapid reprogramming terminal 20 that it is necessary to suspend or slow down communications with the remote terminal 53. The first status response word received by the rapid reprogramming terminal 20 with the busy bit set to a logic one causes the rapid reprogramming terminal 20 to send only activity messages (normally every 10 msec.) until the busy bit is cleared (logic 0). As long as the busy bit is clear in the status response word from a remote terminal 53, rapid reprogramming terminal 20 assumes that the remote terminal 53 can support a continuous stream of identical messages within a time period, identified in the file's lookup table in IC memory card 22, from the end of one message to the start of the next command word. The continuous stream of identical messages is assumed to be either memory data load or memory data verify messages.

This continuous stream is maintained for a time period compatible with IC Memory Card 22 and remote terminal 53 data transfer capabilities and at a minimum, rapid reprogramming terminal 20 is capable of transferring 2K data words (in memory data load or memory data verify messages) per second when remote terminal 53 does not indicate a busy status during the transfer. Any data word transmitted after a status word with the busy bit set is ignored by rapid reprogramming terminal 20. If the remote terminal 53 being reprogrammed cannot set the busy bit in the remote terminal status response, then prior to each message transmission other than an activity message transmission, rapid reprogramming terminal 20 will command an activity message from the remote terminal 53 being reprogrammed and inspect the busy bit in the data word following the status response word to determine if the remote terminal 53 is ready to communicate with rapid reprogramming terminal 20.

The operation of rapid reprogramming terminal 20 after the busy bit has been set to a logic one and then cleared varies depending on the operation of the remote terminal 53. If the busy bit was set in the status response word for a transmit type command, after the busy bit is cleared (in the response to the activity message) the last transmit command will be repeated so that rapid reprogramming terminal 20 can receive data words that were ignored when the busy bit was set.

If the busy bit was set in the data word of the activity message which is only applicable when the busy bit is not set in the status response word, the data word for the first activity message with the busy bit cleared will be processed normally.

If the busy bit is set in the status response word for a receive type command, then two options (selectable by a flag in the look up table for the remote terminal being reprogrammed) are allowed. Rapid reprogramming terminal 20 assumes that the data words were not received by the remote terminal 52 and when the busy bit is cleared in the status response word for the activity message, the last received message will be repeated or rapid reprogramming terminal assumes that the data words were received by the remote terminal 53 and when the busy bit is cleared in the status response word for the activity message, the last received message will not be repeated.

Referring again to FIG. 9A, the remote terminal address (bits 11-15) for the status word response to the activity message is the address of the remote terminal 53 being reprogrammed. The message error bit (bit 10) may be a one or a zero since this bit is not utilized. The service request bit (bit 8) may normally be a one or zero since this bit is not utilized unless a data transfer is in progress. When the service request bit is not used, rapid reprogramming terminal 20 determines that the remote terminal 53 is requesting a message transaction based on the fact that the contents of bits 0 through 10 of the data word that follows are non-zero and will act upon that request only when a data transfer is in progress.

The busy bit (bit 3) if set to a logic one is used to indicate that the remote terminal 53 is not ready to process any messages from terminal 20 other than the activity message. Prior to the transmission of any other type messages to the remote terminal 53, rapid reprogramming terminal 20 will continue to send Activity Messages (approximately every 10 msec.) to the remote terminal 53 until the busy bit is cleared, or the number of sequential Activity Messages is exhausted as determined from a lookup table or a Reprogram Status Message is requested. Remote terminal 53 will respond to the busy bit (bit 15) in the data word that follows only when the busy bit in the status word is not set. Bits 9, 7, 6, 5, 4, 2 and 1 of the status word are not utilized and therefore may be either a one or a zero.

The terminal flag bit (bit 0) of the status word is used only when a data transfer from rapid reprogramming terminal 20 to a remote terminal 53 is in progress. Following a header message and proceeding an exit load message during a data transfer, if the terminal flag bit and the service request bit of the status word are set at a logic one state, rapid reprogramming terminal 20 will extract from a data word sent by the remote terminal 53 to rapid reprogramming terminal 20 the next command word to be sent by rapid reprogramming terminal 20 to the remote terminal 53. This command word is the command word for the reprogram status message.

Rapid reprogramming terminal will ignore the data word of the activity message when the busy bit is set to a logic one in the status response word provided by remote terminal 53; thus, the remote terminal 53 need not transmit the data word.

The busy bit (bit 15) in the data word for the activity message functions identically to the busy bit in the status word (bit 3). This bit is provided to accommodate a remote terminal 53 that does not utilize bit 3 of the status word to indicate it is busy. The busy bit and the remote terminal request bits (bits 0-10) of the data word will not be set simultaneously unless the remote terminal 53 requires sending a reprogram status message to rapid reprogramming terminal 20. The busy bit need not be set to a logic one state in order to send a reprogram status message to rapid reprogramming terminal 20. Rapid reprogramming terminal 20 will not honor the reprogram status message request until an activity message containing the request with the busy bit clear or at the logic zero state is received by terminal 20.

The request bits (bits 0-10) of the data word are utilized to allow the remote terminal 53 to request that rapid reprogramming terminal 20 send a specific command to the remote terminal 53. As a result of the remote terminal request, rapid reprogramming terminal 20 will transmit a command word with the remote terminal address defined in bits 11 through 15 of the command word and the contents of the activity message remote terminal request in bits 0-10 of the data word. The TR bit (bit 10) is set to 1 if remote terminal 53 is to transmit a message and will be set to 0 if remote terminal 53 is to receive a message. The subaddress bits (bits 5-9) of the data word indicate the subaddress of the message to be sent. The word count bits (bits 0-4) indicate the data word count for the message. Bits 11-14 are equal to a logic 0.

The activity messages prior to rapid reprogramming terminal 20 beginning a Load/Verify operation or a Verify operation will now be discussed. After the setting of the discretes, that is the setting of the outputs of programmable peripheral interfaces 52, 54 and 56 and the expiration of a 10 msec. wait period for the discrete to settle, the first messages commanded by rapid reprogramming terminal 20 are activity messages regardless of whether or not a lookup table for the remote terminal 53 indicates that activity messages are required for each and every transaction. A transaction, in turn, comprises a header message followed by a number of data transfer messages as indicated by the header message and a trailer message. Bits 11-14 of the activity message data word are never used by rapid reprogramming terminal 20. The digital information received in bits 0-10 of the data word for all activity messages commanded by rapid reprogramming terminal 20 before the first message of FIG. 9(D) are ignored by terminal 20. This operation is implemented to permit use of the activity message subaddress for other uses when reprogramming is not being performed, that is rapid reprogramming terminal 20 only assumes the activity message data is valid after reprogramming of a remote terminal 53 has begun by the setting of discretes and receipt of a valid load/verify message, FIG. 9D. The information received in bit 15 (busy bit) of the data word for all activity messages commanded by rapid reprogramming terminal 20 before the load/verify message, FIG. 9D, will only be used if the lookup table for the remote terminal 53 indicates that activity messages are required for every transaction and the busy bit is not set to a logic one in the status word response to the activity message. In this case the remote terminal 53 must ensure that bit 15 of the data word is valid or set to zero prior to receipt of the load/verify message, FIG. 9D.

In the manual mode, if the remote terminal lookup table indicates that memory configuration messages are supported, then there will be a memory configuration message commanded before the load/verify message, FIG. 9D, and rapid reprogramming terminal 20 will expect valid memory configuration data. Ignoring the activity message data word bits 0-14 precludes a remote terminal 53 from sending a reprogram status message prior to receipt of the load/verify message, FIG. 9D, from rapid reprogramming terminal 20; however, a reprogram status message would not be valid before reprogramming is initiated. Therefore a remote terminal 53 should not request a reprogram status message until after the remote terminal 53 receives a load/verify message, FIG. 9D.

Figure 9C:
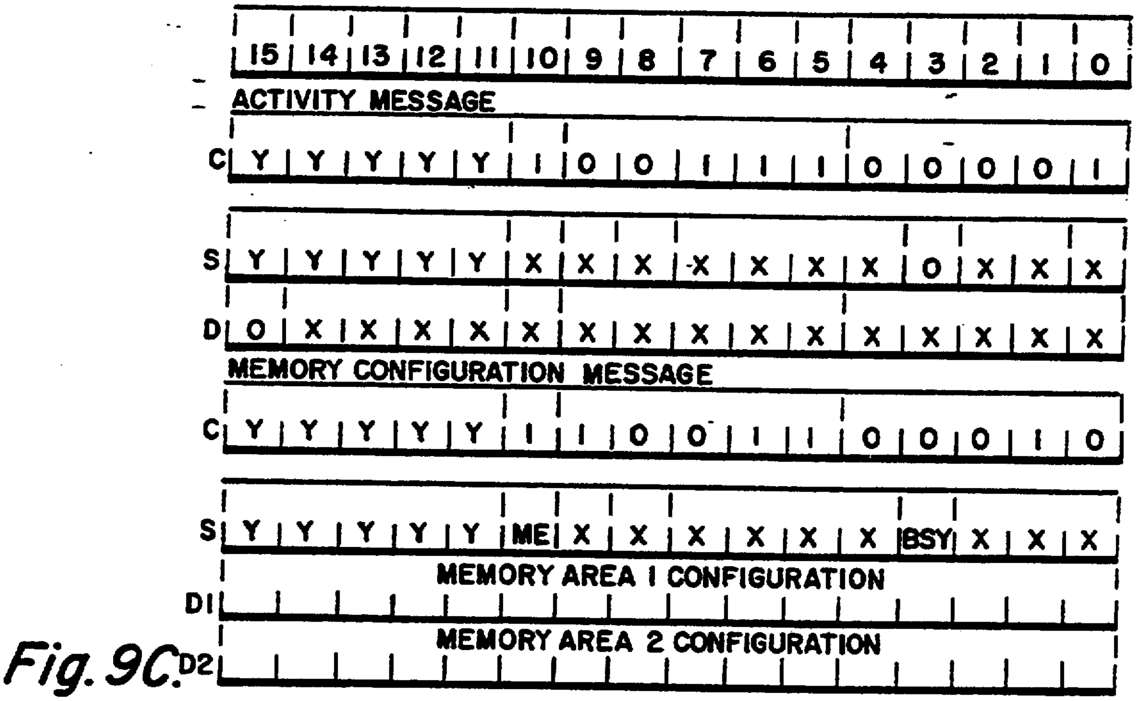
FIG. 9C illustrates the format of memory configuration messages transferred via the 1553 multiplex data bus to a remote terminal being reprogrammed.
Figure 9D:
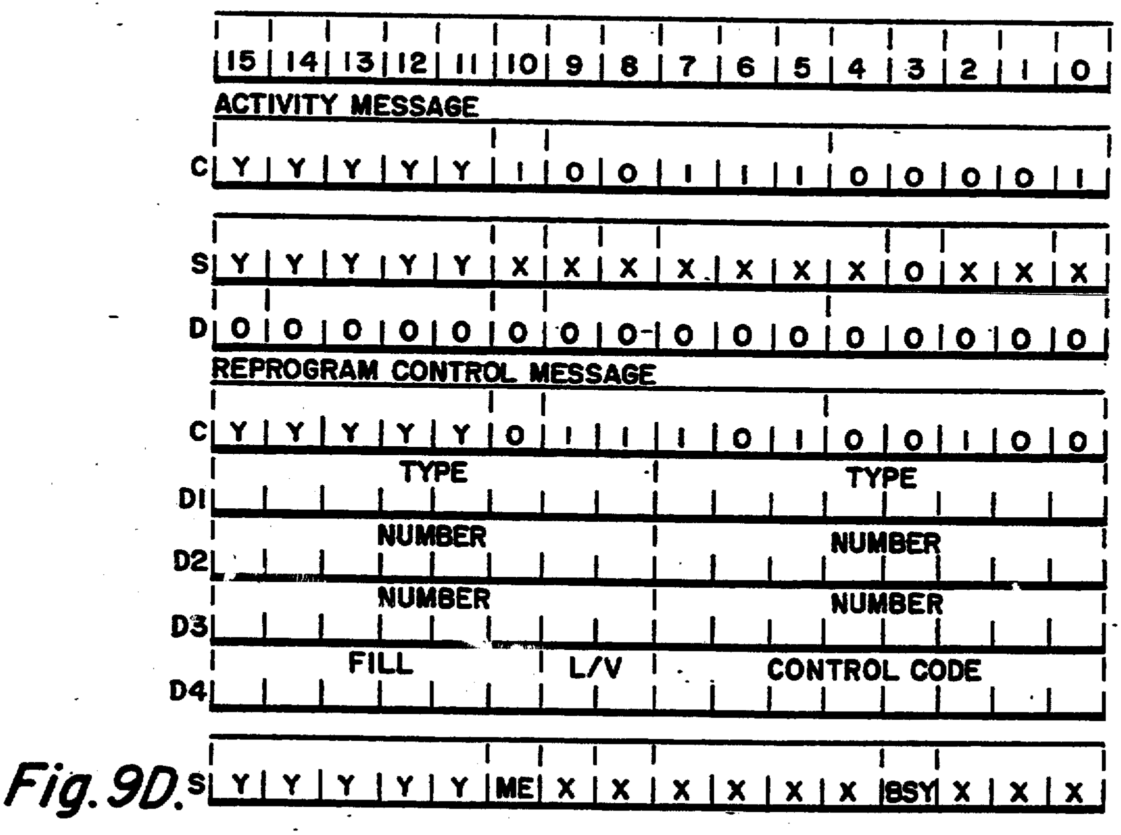
FIG. 9D illustrates the format of enter load, exit load, enter verify and exit verify messages transferred via the 1553 multiplex data bus to a remote terminal being reprogrammed.

Referring to FIG. 9C, the data word in the activity message provided prior to a memory configuration message is processed only when rapid reprogramming terminal 20 is required to check the busy bit status (check bit 15 of the data word of the activity message) of remote terminals 53 that do not use the busy bit in the status response word. The memory configuration message is utilized to read the current memory configuration of remote terminals 53. This message is only used when its use is indicated in a lookup table for the remote terminal 53. The command word and status word for the memory configuration message follow the format of FIG. 7. Each remote terminal 53 aboard an aircraft has up to two memories designated memory area one and memory area two. Data bits 0-15 of data word one of the memory configuration message represent the configuration of the data stored in memory area one. Unused data bits equal zero. Similarly, data bits 0-15 of data word two of the memory configuration message represent the configuration of the data stored in memory area two. Unused data bits equal zero. In the automatic mode of operation this message is used for the purpose of comparing a remote terminal's configuration stored in the IC memory card 22 with reported remote terminal configuration. If the reported value is the same as the value stored in the IC memory card 22, rapid reprogramming terminal 20 will not perform a load operation. However, if the reported value is different from the value stored in the IC memory card 22, rapid reprogramming terminal 20 will proceed with a load operation.

Referring to FIG. 9D, there is shown the format for the enter load, exit load, enter verify and exit verify messages. For the first enter load, exit load, enter verify or exit verify message, the data word in the activity message provided prior to a enter load, exit load, enter verify or exit verify message will be processed only when rapid reprogramming terminal 20 is required to check the busy bit status (check bit 15 of the data word of the activity message) of remote terminals 53 that do not use the busy bit (bit 3) in the status response word and in this case bits 0-14 of the data word will be ignored.

The transmit/receive bit (bit 10) in the command word for the enter load, exit load, enter verify and exit verify messages is a logic zero since the remote terminal 53 is to receive data. The terminal subaddress field (bits 5-9) in the command word is set at 1D hexadecimal. Each message enter load, exit load, enter verify and exit verify requires that an enable signal be provided by rapid reprogramming terminal 20 before a load or verify may be executed. A logic one at the EW_OSM_EN output of interface 54 enables the operating software memory of the electronic warfare system on board the aircraft. Similarly, a logic one at the EW-UDM_EN output of interface 54 enables the user data memory of the electronic warfare system on board the aircraft. When the AV_EN1 output of interface 54 is at a logic one state the first memory areas of the aircraft avionics system are enabled, while a logic one at the AV_EN2 output of interface 54 enables the second memory areas of the aircraft avionics system.

Each field in the data is checked by the remote terminal 53 for compliance with the following prior to execution of a load or verify. The type and number fields are defined based on WRA nomenclature (e.g., RT-1079); however, if this creates a conflict, the system nomenclature (e.g., ALQ-126) is utilized instead. The preferred embodiment of the present invention uses WRA nomenclature.

Data word one (bits 0-15) is the type field consisting of the first two eight bit ASCII characters that represent the nomenclature of the remote terminal 53 being controlled. For example, for RT-1079 the two characters would be "R", "T".

Data word two (bits 0-15) is a number field for consisting of the third and fourth eight bit ASCII characters that represent the nomenclature of the remote terminal 53 being controlled. For example, for RT-1079 the two characters would be "1" "0".

Data word three (bits 0-15) is a number field two consisting of the last two eight bit ASCII characters that represent the nomenclature of the remote terminal 53 being controlled. For example, for RT-1079 the two characters would be "7", "9".

Data word four (bits 10–15) is the fill field which may be any bit pattern including zero and is to be defined by the individual remote terminal 53 being controlled. The fill field is required to be checked even if the field is defined as zero. The fill field is contained in a look up table for the remote terminal 53 being reprogrammed.

The load/verify bits (bits 8–9) are used to described whether a Load, Verify, or other type transaction will follow. The load/verify bits are coded as follows: L/V=01 indicates that a memory load follows; L/V=10 indicates that a memory verify follows; L/V=11 is not used and L/V=00 indicates that a enter load, enter verify, exit load or exit verify message is being sent for some reason other than a load or verify such as to quiet the bus controller for the remote terminal 53 being reprogrammed.

The control code (bits 0–7) of data word four are set as follows: bit 7 is a reprogram enable for memory area one and is equal to 80 hexadecimal; bit 6 is a reprogram enable for memory area two and is equal to 40 hexadecimal; bit 5 is a reprogram disable for memory area one and is equal to 20 hexadecimal and bit 4 is a reprogram disable for memory area two and is equal to 10 hexadecimal. Bit 3 of the control code (08 hexadecimal) indicates to the bus controller for a remote terminal 53 being reprogrammed to convert to a remote terminal so as to allow the remote terminal 53 to be reprogrammed. In addition, bit 3 converts a bus controller 55 which may only be reprogrammed as a remote terminal to a remote terminal for reprogramming. Bit 2 of the control code which is 04 hexadecimal tells the bus controller for remote terminal 53 to stop transmitting or receiving information so as to allow the remote terminal to be reprogrammed. The use of bit 2 of the control code in this manner is required because some bus controllers can not be converted to a remote terminal when reprogramming a remote terminal 53. Bit 1 of the control code which is 02 hexadecimal is utilized to have a bus controller when converted to a remote terminal revert back to a bus controller. Bit 0 of the control code which is 01 hexadecimal causes the remote terminal to begin executing starting at the address previously supplied via data word three or data word four of a header message.

The control code field is valid only if all other fields are correct and only if either the Avionics Reprogram Enable 1 (AV_EN1 output of interface 54); or the EW UDM Reprogram Enable discrete (the EW-UDM_EN output of interface 54) is present or the Avionics Reprogram Enable 2 (AV_EN2 output of interface 54) or the EW OSM Reprogram Enable discrete (EW-OSM_EN output of interface 54) is present. At the end of reprogramming, rapid reprogramming terminal 20 will maintain the active discrete for at least 100 msec after the transmission of a exit load or exit verify message that ends the reprogramming mode.

The following are the only valid control codes that can occur when rapid reprogramming terminal 20 is functioning as a bus controller during a load or verify. Any other code shall cause the remote terminal to not execute a load or verify.

Code 00000000 which is 00 hexadecimal indicates that no load or verify control action is to be taken.

Code 00000001 which is 01 hexadecimal will cause the remote terminal 53 to begin execution starting at the address previously supplied via data word three and data word four of the header message.

Code 00000010 which is 02 hexadecimal will cause the remote terminal 53 to revert back to a bus controller. Upon execution of this Code the message traffic shall be for rapid reprogramming terminal 20 functioning as a remote terminal.

Code 00010000 which is 10 hexadecimal will cause the remote terminal 53 to exit the reprogramming mode for memory area two. This code is only valid if the Avionics Reprogram Enable 2 or the EW OSM Reprogram Enable discrete is active.

Code 00100000 which is 20 hexadecimal will cause the remote terminal to exit the reprogramming mode for memory area one. This code shall only be valid if the Avionics Reprogram Enable 1 or EW UDM Reprogram Enable discrete is active.

Code 00110000 which is 30 hexadecimal is a combination of 10 hexadecimal and 20 hexadecimal for simultaneous memory areas one and two exit reprogramming mode.

Code 01000000 which is 40 hexadecimal will cause the remote terminal 53 to enter the reprogramming mode for memory area two. This code shall only be valid if the Avionics Reprogram Enable 2 or the EW OSM Reprogram Enable discrete is active.

Code 10000000 which is 80 hexadecimal will cause the remote terminal 53 to enter the reprogramming mode for memory area one. This code shall only be valid if the Avionics Reprogram Enable 1 or the EW UDM Reprogram Enable discrete is active.

Code 11000000 which is C0 hexadecimal is a combination of 40H and 80H for simultaneous memory areas one and two enter reprogramming mode.

Figure 9E:
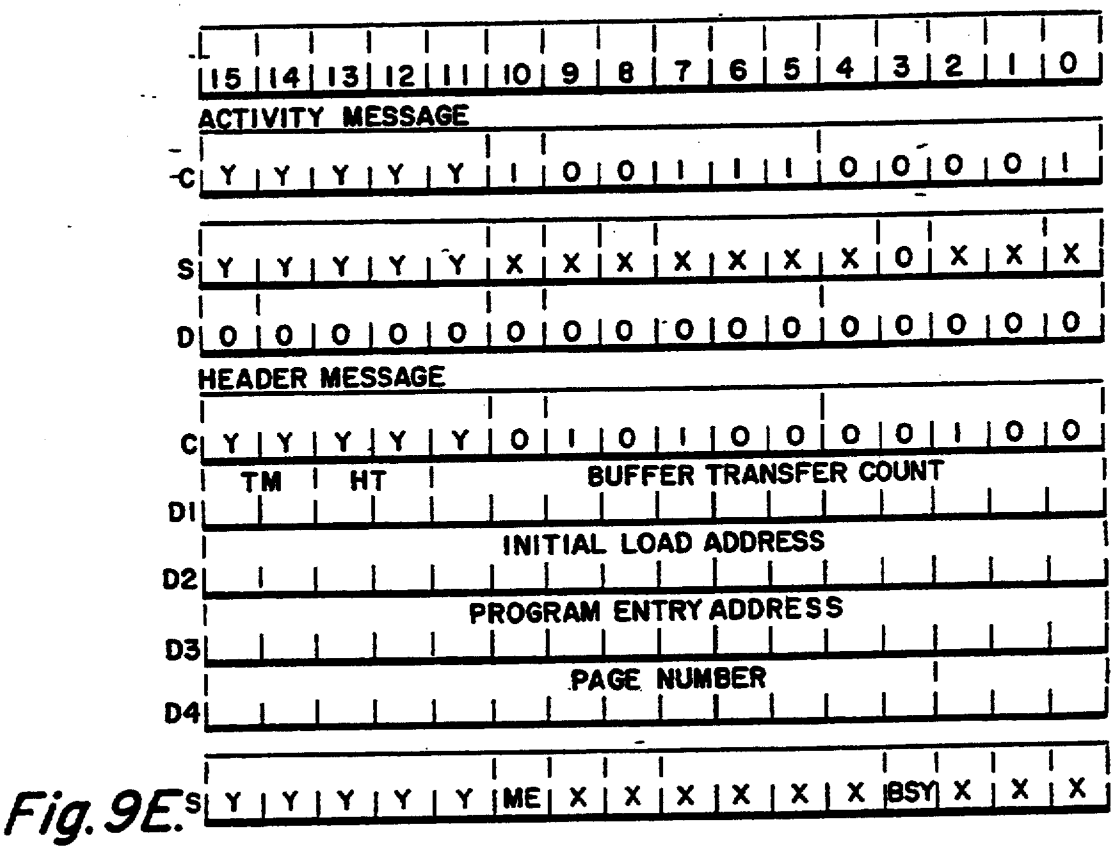
FIG. 9E illustrates the format of a header message transferred via the 1553 multiplex data bus to a remote terminal being reprogrammed.

Referring to FIG. 9E there is shown the format for a header message which is used to pass load and verify parameters to the remote terminal 53 being reprogrammed. The data word in the activity message provided prior to a header message is processed only when rapid reprogramming terminal 20 is required to check the busy bit status (check bit 15 of the data word of the activity message) of remote terminals 53 that do not use the busy bit (bit 3) in the status response word.

The transmit/receive bit (bit 10) in the command word is at the logic zero state since the remote terminal 53 is to receive data and the terminal subaddress field (bits 5–9) is set at 14 hexadecimal. The transfer mode (bits 14–15) are used to describe the memory data load or memory data verify message data word content. The transfer mode bits are binary coded as follows: TM=00; TM=01; TM=10 and TM=11. When TM=00 which is the no transfer mode, the buffer transfer count contained in data word one and the initial load address contained in data word two have no meaning. This mode is used to transfer the program entry address contained in data word three and Page Number contained in data word four or is used as a preamble to the trailer message.

When TM=01, each sixteen bits of data transmitted in a data word will contain only eight bits of information in bits 0–7. When TM=10, each sixteen bits of data transmitted in a data word will contain sixteen bits of information in bits 0–15. When TM=11, the sixteen bits of data transmitted in each odd word (first is odd) contains the sixteen least significant bits of data in bits 0–15 and each even word (second is even) contains the sixteen most significant bits of data in bits 0–15.

The header type bits (bits 12–13) are used to describe the header and have no meaning when the transfer mode is 00. The header type are binary coded as follows: HT=00, HT=01, HT=10 and HT=11. When HT=00, the buffer transfer count equals the number of words to be transferred. When HT=01, the buffer transfer count equals number of messages to be transferred. HT=10 is undefined, while HT=11 reserved for internal use by digital signal processor 21 and therefore will not be transmitted on the 1553 multiplex data bus 42 aboard the aircraft.

The buffer transfer count (bits 0–11) is used to indicate the amount of data that will follow the header message. The buffer transfer count has no meaning when the transfer mode is 00. The range of the buffer transfer count is from one to four thousand ninety six words.

When HT=00 , the buffer transfer count is the total number of data words that will be transmitted in a transaction which includes the header message and trailer message. The data words are transmitted in 32-word messages since each transfer sequence is limited to thirty two data words (see FIG. 8) with the last message containing from one to thirty two data words. The maximum transfer for HT=00 is four thousand ninety six words using one hundred twenty eight memory data load or memory data verify messages.

When HT=01, the buffer transfer count is the number of memory data load or memory data verify messages that will follow the header message. Thus, the maximum data transfer per header message is 4096×32 data words per memory data load or memory data verify message which equals 131,072 sixteen bit words (128K). If paging (data word four, bits 0–1) is utilized for transfer modes 01 or 10, the maximum value of the buffer transfer count will be 2048 which results in 65,536 sixteen bit data words (64K) for transfer modes 01 and 10.

Data word two is the initial load address (bits 0–15) which is the sixteen or less least significant bits of the point in memory into which data is to be loaded or read. The maximum value (number of bits) used in the initial load address is compatible with the page size of remote terminals using paging. Unused bits equal zero.

Data word three is program entry address (bits 0–15) which has meaning only for transfer mode=00. The program entry address is the sixteen or less least significant bit of the point in memory at which the remote terminal 53 being reprogrammed is to begin execution after receipt of an execute command in a load/verify message, FIG. 9D, or when a transfer control is indicated in data word four. The load/verify message, FIG. 9(D), is only used with remote terminals which require this command. The maximum value (number of bits) used in the program entry address is compatible with the page size of remote terminals using paging. Unused bits equal zero.

Data word four is the page number (bits 3–15) representing up to the thirteen most significant bits for a paged memory address within the remote terminal 53. The page number applies to the program entry address for transfer mode=00 or the initial load address for transfer modes=01, 10 or 11. Unused bits shall equal 0. It should be noted that a page comprises 65,536 addresses in memory.

The transfer control bits 0–1 may be used to transfer control to a loaded program after a verify is processed or to an unaltered memory area after a load is completed, that is a remote terminal 53 has been reprogrammed. When the transfer control bits equal 01 this indicates to the remote terminal 53 being reprogrammed that this is the last header, memory data load or verify (up to 4096 messages), trailer or header, trailer transaction. When the transfer control bits equal 01 this indicates to the remote terminal 53 being reprogrammed that more data is to follow the current header, memory data load or verify (up to 4096 messages), trailer transaction or header, trailer transaction and control should not be transferred. For remote terminals 53 using paging and the program entry address, the transfer control will remain equal to 01 even for the last data transaction, until a transfer mode equals 00 message is used to supply the program entry address and page number. Transfer control equal to 10 indicates that control is to be transferred to the program entry address of data word three. When control is transferred, the transfer does not take place until after the trailer message and control is transferred only to non-reprogrammed areas or verified areas in memory. Transfer control equals 11 is invalid and bit 2 equals zero.

Figure 9F:
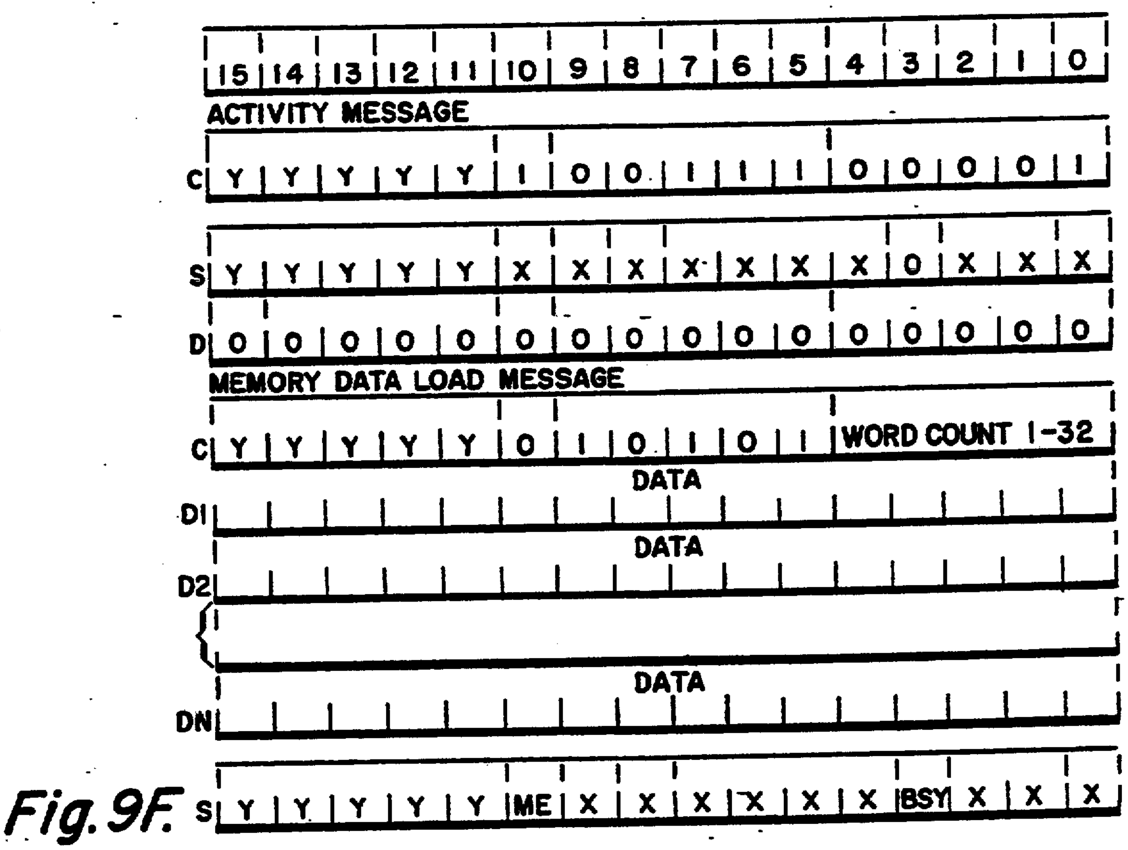
FIG. 9F illustrates the format of a memory data load message transferred via the 1553 multiplex data bus to a remote terminal being reprogrammed.

Referring to FIG. 9F there is shown the format for a memory data load message which is used to transfer the data to be loaded into the memory of a remote terminal 53 being reprogrammed. The data word in the activity message provided prior to a memory data verify message is processed only when rapid reprogramming terminal 20 is required to check the busy bit status (check bit 15 of the data word of the activity message) of remote terminals 53 that do not use the busy bit (bit 3) in the status response word.

The transmit/receive bit (bit 10) in the command word is at the logic zero state since the remote terminal 53 is to receive data and the terminal subaddress field (bits 5–9) is set at 15 hexadecimal, while the word count may vary from one to thirty two.

If the busy bit (bit 3) is set to a logic one in the status response word for a memory data load message and the remote terminal 53 is of the type that requires retransmission of the message, the memory data load message for which the busy bit has previously been set will be repeated after the busy bit (bit 15 of the data word) in the activity message is cleared or at the logic zero state. The number of data words will equal the word count in the memory data load message command word.

Figure 9G:
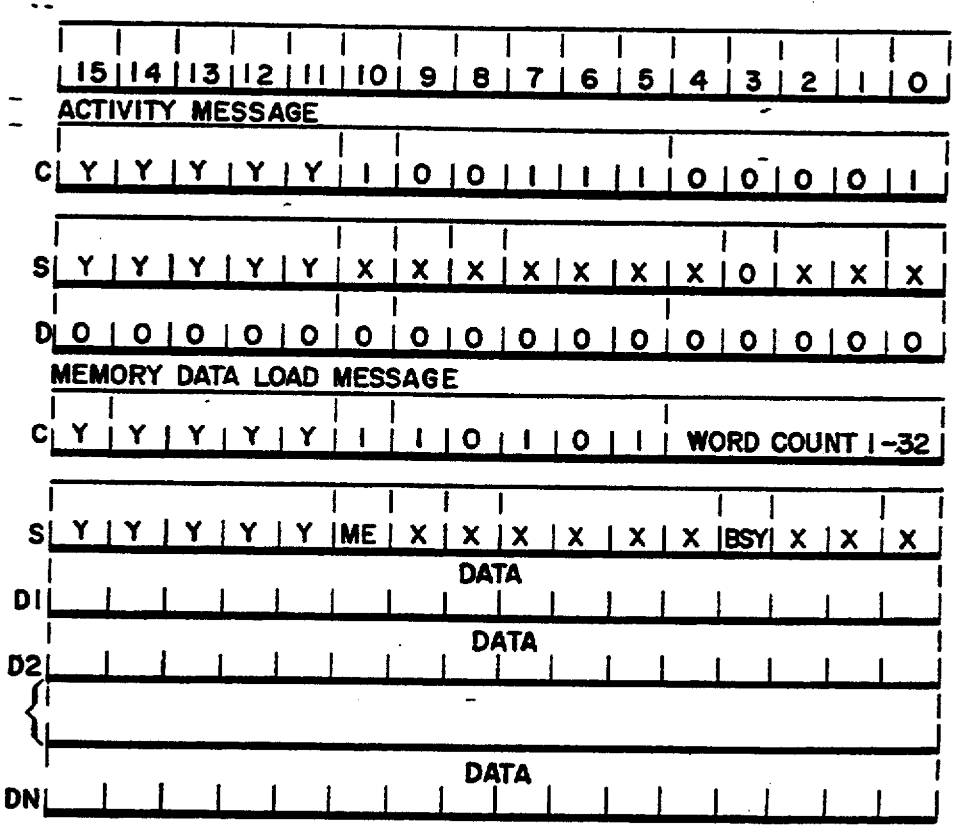
FIG. 9G illustrates the format of a memory data verify message transferred via the 1553 multiplex data bus to a remote terminal being reprogrammed.

Referring to FIG. 9G, there is shown the format for a memory data verify message which is used to pass the data that rapid reprogramming terminal 20 will compare to the data stored in IC memory card 22. The data word in the activity message provided prior to a header message is processed only when rapid reprogramming terminal 20 is required to check the busy bit status (check bit 15 of the data word of the activity message) of remote terminals 53 that do not use the busy bit (bit 3) in the status response word.

The transmit/receive bit (bit 10) in the command word is at the logic zero state since the remote terminal 53 is to receive data and the terminal subaddress field (bits 5–9) is set at 15 hexadecimal, while the word count may vary from one to thirty two.

If the busy bit (bit 3) is set to a logic one in the status response word for a memory data verify message then any data words transmitted by the remote terminal 53 are ignored. After the busy bit is cleared in the status response word for the activity message, rapid reprogramming terminal 20 recommends a memory data verify message. The remote terminal 53 ensures that the data words transmitted are for the memory data verify message for which the busy bit was set, even if the data words were previously transmitted.

The number of data words will equal the word count in the memory data verify message command word.

Figure 9H:
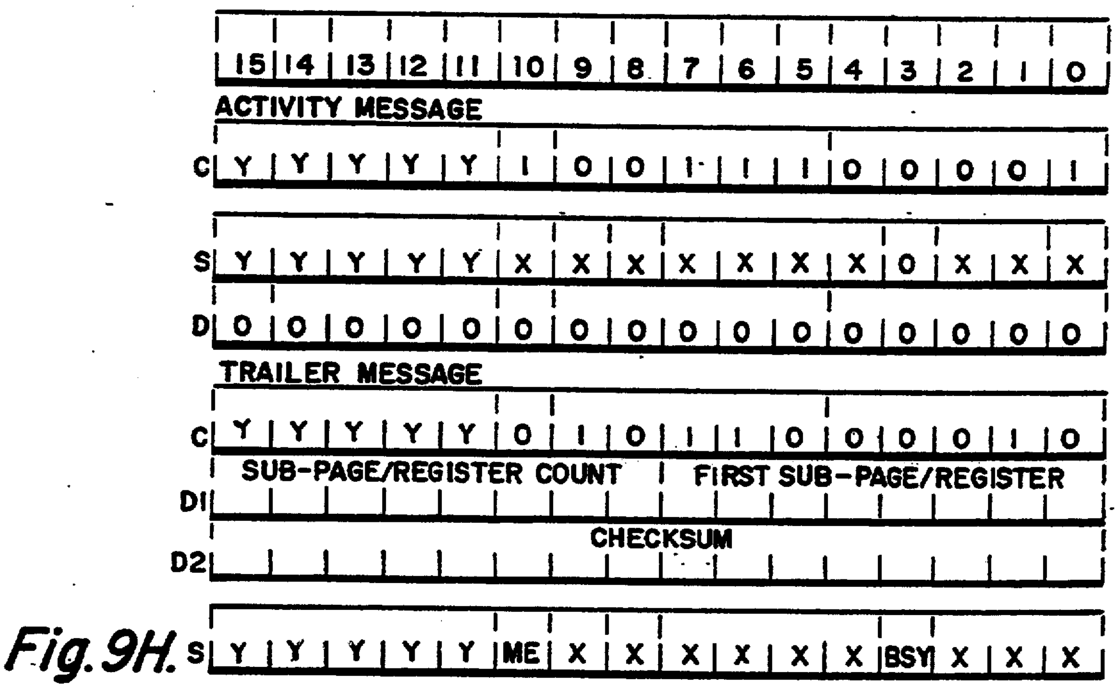
FIG. 9H illustrates the format of a trailer message transferred via the 1553 multiplex data bus to a remote terminal being reprogrammed.

Referring now to FIG. 9H, the trailer message is used to pass the data checksum and additional load or verify parameters to the remote terminal 53 being reprogrammed. The activity message shown prior to the trailer message will only be present when rapid reprogramming terminal 20 is required to check the busy bit status of remote terminals 53 that do not use the busy bit in the status response word.

The transmit/receive bit (bit 10) in the command word for the trailer message is a logic zero since the remote terminal 53 is to receive data and the terminal subaddress field (bits 5–9) in the control word is set at 16 hexadecimal.

Data word one contains the number of sub-pages and the first sub-page for remote terminals 53 utilizing paging or sub-paging. This word may also be used for internal register control. The fields of data word one represent the values to be used in the next header, memory data load or verify (up to 4096 messages), trailer transaction. For the first header, memory data load or verify (up to 4096 messages), trailer transaction the information will be transmitted prior to the memory data transaction via a header message, trailer message transaction in which the TM (transfer mode) field in data word one of the header is 00.

The sub-page/register count (bits 8–15) field in data word one may be used in lieu of or in conjunction with the page number field in data word four of the header message and is individual user definable. Unused bits equal zero. In the preferred embodiment of the present invention the sub-page field in data word one of the trailer message is used in conjunction with the data word four of the header message of FIG. 9E.

For purpose of illustrating the use of the sub-page field in the trailer message the following example is provided. In order to load 256K of memory into a remote terminal 53 with bank switching, 64K of address capability and a page size definition of 2048 words, the following approach may be used. To load 256K with sub-pages 2048 words long requires 128 header, memory data, memory data, trailer transactions (256K/2048=128). The 128 transactions consist of 32 transactions for each of the four banks of switching in remote terminal 53. Thus, for each 32 transactions the header message, data word four page number, FIG. 9(E), equals the bank number which would be incremented from zero to three. Within each group of 32 transactions the sub-page count would increment every transaction from zero to thirty one. For each transaction (assuming HT=01 for buffer transfer count equals the number of messages) the header data one buffer transfer count would be 64 (2048 words/32 words per message).

The first sub-page/register (bits 0–7) field may be used in lieu of or in conjunction with the page number field in data word four of the header message and may be defined by the user. Unused bits equal zero. Examples of use of this field are: specifying a processor register into which the page number field in data word four of the header message is to be loaded or specifying the initial sub-page count in the example set forth above to one so as to not reprogram the first 2048 memory locations (the first group of transactions would only be 31 transactions long (1 to 31) and the sub-page count for the first transaction would be set to one to indicate a starting address of 2048).

The data word two checksum (bits 0–15) is the checksum of an entire transaction, i.e., header, memory data, memory data, trailer transaction (when TM in header data word one is not equal to zero) or header, trailer transaction (when TM in header data one is equal to zero). The checksum is derived by a two's complement sixteen bit addition of every data word in the transaction (i.e., header, memory data, and trailer data words) with the exception of the checksum data word which is data word two of the trailer message. The two's complement sixteen bit addition is binary addition with the carry discarded, that is there is no end around carry (e.g., FFFF (hexadecimal)+1=0).

The remote terminal 53 being reprogrammed is responsible for comparing the checksum received from rapid reprogramming terminal 20 with the data words for both load and verify functions. The checksum value in data word two of the trailer message is the checksum that should be computed by the remote terminal 53. If the value computed does not match the value received from processor 21 for either a load or verify operation, an error is declared and a reprogram status message is requested by the remote terminal 53 being reprogrammed.

Referring to FIG. 9I, the activity message illustrated prior to the reprogram status message indicates that remote terminal 53 wants to provide to rapid reprogramming terminal 20 a reprogram status message (bits 5–9 of the data word of the activity message).

During a reprogramming operation the remote terminal 53 being reprogrammed may halt the operation and notify rapid reprogramming terminal 20 of an error by setting the busy bit (bit 3) in the status response word or the busy bit (bit 15) in the Activity Message data word. When rapid reprogramming terminal 20 receives the busy bit from remote terminal 53, it will continue to transmit activity messages until the busy bit is cleared. The service request by remote terminal 53 to transmit a reprogram status message will be honored after the first activity message response with the busy bit cleared. By this means remote terminal 53 can notify rapid reprogramming terminal 20 of the error.

The transmit/receive bit (bit 10) of the command word of the reprogram status message is set at a logic one since remote terminal 53 is to transmit and the subaddress (bits 5–9 of the command word) for this message is 17 hexadecimal.

The status flag (bit 15) of data word one is set to a logic one to indicate that the remainder of the data word should be processed by rapid reprogramming terminal 20, that is the reprogram status message contains valid data. If this bit is set to a logic zero, the reprogram status message will be ignored by rapid reprogramming terminal 20.

The status indicator (bit 14) defines the meaning of the remainder of the data word, that is an error code or a status code to be displayed by rapid reprogramming terminal 20.

When the status indicator equals zero this indicates that an error has occurred and the error code will be processed by rapid reprogramming terminal 20.

When the status indicator equals one this indicates that no error has occurred and the status code in bits 13–0 are to be displayed on liquid crystal display 57 as 4 hexadecimal characters (bits 15 and 14 of the display value are 0). With the status indicator equal to one the values of bits 13–0 will be used to indicate status or progress through the load or verify operation.

When SF equals one and SI equals one the status code bits 0–13 are display characters. When SF equals one and SI equals zero bits 0–13 represent error codes and the desired rapid reprogramming terminal 20 action. The error codes are 0001 (hexadecimal) which is an abort; 0002 (hexadecimal) which is a restart; 0003 (hexadecimal) which is a retry and 0004 (hexadecimal) which is a automatic retry.

The abort error code indicates to rapid reprogramming terminal 20 that the load operation or verify operation has been aborted and should not be retried. Rapid reprogramming terminal 20 will display the error code and wait for an operator response. On receiving the response from the operator, rapid reprogramming terminal 20 will abort the load of the remote terminal 53 being reprogrammed and continue with the load of the next remote terminal or bus controller to be reprogrammed if there is a requirement to reprogram another remote terminal or bus controller.

The restart status code indicates that an unrecoverable error has occurred in loading a remote terminal 53 and a reload of remote terminal 53 is desired. Rapid reprogramming terminal 20 will display the error code and wait for an operator response. On receiving the response from the operator, rapid reprogramming terminal 20 will restart the load of the remote terminal 53 being reprogrammed.

The retry status code indicates that an error has occurred in the last message sequence transaction and a repeat of the sequence is desired. Rapid reprogramming terminal 20 will display the error code and wait for an operator response. On receiving the response from the operator, rapid reprogramming terminal 20 will repeat the last transaction.

The automatic retry status code indicates that an error has occurred in the last message sequence transaction. After three consecutive retries, rapid reprogramming terminal 20 will display the error code and wait for an operator response. However, if the retry is successful before reception of the third consecutive error, an error message will not be displayed and operation will continue as normal. On receiving the response from the operator, rapid reprogramming terminal 20 will abort the load of the remote terminal 53 being reprogrammed and continue with the load of the next remote terminal or bus controller to be reprogrammed.

Referring to FIG. 9J, the activity message shown prior to the RRT error message is present only when rapid reprogramming terminal 20 is required to check the busy bit status of remote terminals 53 that do not use the busy bit in the status response word.

The RRT error message is utilized to inform the remote terminal 53 being reprogrammed that rapid reprogramming terminal 20 has detected an error in the load or verify. Data word one, bit 2 is an abort which is set to a logic one by rapid reprogramming terminal 20 to notify the remote terminal 53 that the load or verify has been aborted and no further retries will be made.

Bit 1 is a complete restart which is set to a logic one by rapid reprogramming terminal 20 to notify the remote terminal 53 that an unrecoverable error has occurred and all memory data load or memory data verify transactions will be restarted. Bit 0 is the transaction bit which is set to a logic one by rapid reprogramming terminal 20 to notify the remote terminal 53 that there was an error detected in the last header, memory data, trailer or header, trailer transaction and that the transaction will be repeated. The remaining bits (bits 3–15) of the data word are a logic zero.

Figure 10:
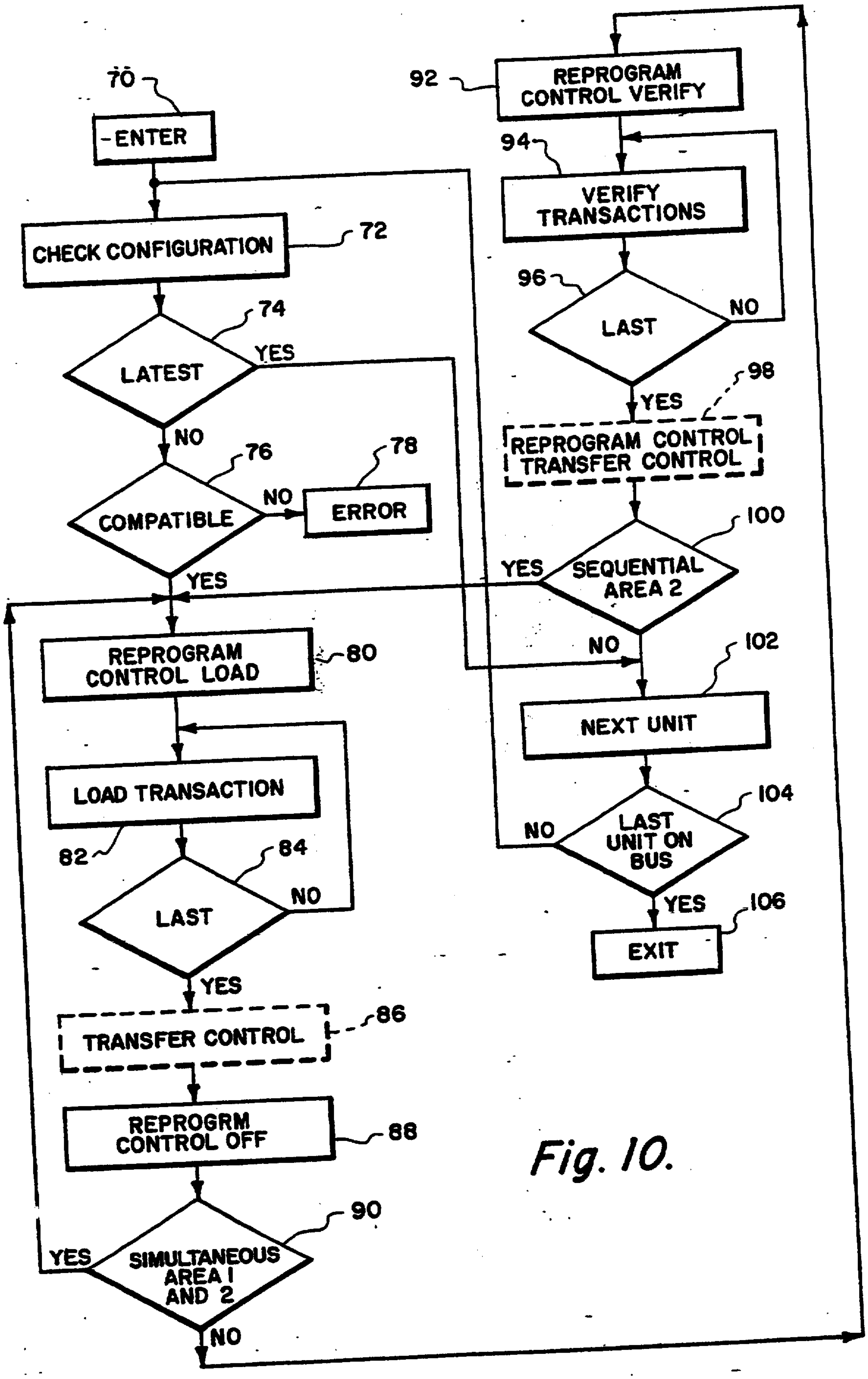
FIG. 10 is a flow chart illustrating the PROTOB.C module of the rapid reprogramming terminal software.

Referring now to FIG. 10, the operation of rapid reprogramming terminal 20 when reprogramming a remote terminal 53 or a bus controller which reverts to a remote terminal during reprogramming will now be discussed.

When the lookup table indicates that the remote terminal 53 supports memory configuration as identified by the remote terminal's software, rapid reprogramming terminal 20 request a memory configuration message, FIG. 9C, from the remote terminal 53 being programmed. The memory configuration message describes the current memory contents for one or two memory areas of the remote terminal 53 being reprogrammed. Rapid reprogramming terminal 20 compares the received memory configuration to the current memory configuration for the remote terminal 53 stored in IC memory card 22 (program step 72). In automatic mode, if the remote terminal 53 already contains the current memory configuration, rapid reprogramming terminal 20 continues on to the next remote terminal 53 to be processed (program step 102). If the memory configuration message is not usable, rapid reprogramming terminal 20 will assume that the remote terminal 53 requires reprogramming. In manual mode, rapid reprogramming terminal 20 will display the memory configuration data and continue reprogramming for the selected remote terminal 53.

If the remote terminal 53 requires reprogramming of either or both memory areas, rapid reprogramming terminal 20 checks the old and new memory configurations to determine if the information in the IC memory card 22 is compatible with updating the old memory (program step 76) and will use a patch file if it exists. If a patch file does not exist or is not usable, rapid reprogramming terminal 20 checks to see if a complete file exists and checks to determine if this file will result in a newer revision level for the memory configuration. If the configuration message is not usable, no patch file should exist and rapid reprogramming terminal 20 uses the complete file for reprogramming the remote terminal 53. Rapid reprogramming terminal 20 will declare an error if the IC memory card 22 information is insufficient (program step 78). If the IC memory card 22 information is correct for reprogramming, rapid reprogramming terminal 20 sends a load message, FIG. 9D to enable the reprogramming function for either or both memory areas and depending upon remote terminal requirements memory areas one and two will be enabled simultaneously or sequentially (program step 80). The remote terminal 53 will next check the validity of the message utilizing internally stored information and the reprogram enable discretes if required.

Once the reprogramming mode is entered (program step 82 and 84), rapid reprogramming terminal 20 proceeds to load the new memory contents in blocks of varying size depending on the remote terminal 53 and update requirements. There will be no specific erasure commands from rapid reprogramming terminal 20. The remote terminal 53 being reprogrammed is responsible for erasure based on the directed write information. The reprogramming of a remote terminal 53 is conducted by a series of one or more header message (FIG. 9E), memory data load message (FIG. 9F), trailer message (FIG. 9H) transactions. If required, a header message, trailer message transaction will also be provided for paging or transfer of control functions. If the remote terminal 53 being reprogrammed is required to keep track of how many times a particular memory area has been reprogrammed, the remote terminal 53 being reprogrammed shall declare an abort error (bits 0–13 of the data word of the reprogram status message of FIG. 9I) if the predetermined memory write capability of the remote terminal 53 has been exceeded. The storage of this information within the remote terminal's memory shall not affect the validity of a memory verify procedure that is the remote terminal 53 being reprogrammed shall mask out this information during a verify operation.

After completion of the load (program step 84), rapid reprogramming terminal 20 will, if required, then provide transfer of control information to the remote terminal 53 using a header message, trailer message transaction (program step 86). Transfer of control prior to a verify via the control code bits (bits 0–7) of the data word four of FIG. 9I is not permitted. The transfer of control prior to a verify is not used to transfer control to a memory area of remote terminal 53 that has been loaded but not verified. If it is necessary to transfer control prior to the completion of a memory area load/-verify, the two parts of the memory area are loaded/-verified separately using the same technique as for sequentially loading memory areas 1 and 2. The transfer of control via the header message of FIG. 9E may be inhibited during the load.

After all required data for a particular memory area have been transferred rapid reprogramming terminal 20 will, via bit 4 or 5 of data word four of FIG. 9D disable the reprogramming function for that memory area.

When simultaneous reprogramming of memory areas one and two of a remote terminal 53 is utilized (program step 88), rapid reprogramming terminal loads the second memory area prior to the verify operation. When sequential memory area reprogramming or single memory area reprogramming is utilized, rapid reprogramming terminal 20 will at this time verify (program steps 92–96) the previously loaded memory area one load prior to the memory area two load operation. Rapid reprogramming terminal 20 performs the memory verify utilizing the same message transactions that are used for the memory load except that the rapid reprogramming terminal 20 receives the data from the remote terminal 53 being reprogrammed and compares the received data with data stored in IC memory card 22. The automatic verify after a load may be inhibited.

After completion of the verify (program step 96) rapid reprogramming terminal 20 will, if required, provide transfer of control information to the remote terminal 53 (program step 98) using either a header message, trailer message transaction or via the control code bits (bits 0–7) of the data word four of FIG. 9I. When sequential reprogramming of memory areas one and two is utilized, rapid reprogramming terminal 20 repeats the load/verify operations (program step 100) for the second memory area after reprogramming of the first memory area is complete.

Assuming there were no errors in reprogramming, rapid reprogramming terminal 20 will continue (program step 102) and reprogram the next remote terminal 53 on the 1553 multiplex data bus 42. If an error did occur, operator intervention is requested by a fault display. This concludes the discussion of protocol B of Military Standard 2217.

There is an individual memory file describing the operation of rapid reprogramming terminal 20 and containing the necessary data to reprogram each remote terminal 53 and each bus controller 55 on the 1553 multiplex data bus 42. The memory file contains a lookup table and reprogramming data for each remote terminal 53 and bus controller 55. A memory file is wholly contained in IC memory card 22.

The lookup table contains the digital information necessary for rapid reprogramming terminal 20 to communicate with the remote terminal 53 or bus controller 55 being reprogrammed. Unless otherwise specified all bits set to a logic one are active (i.e., RRT output is to be active) and all bits set to a logic zero are inactive (i.e., RRT output is to be inactive).

Referring to FIGS. 3 and 4, the specific bus connection for rapid reprogramming terminal 20 is a function of the type of aircraft on board avionics or electronic warfare equipment being reprogrammed. When rapid reprogramming terminal 20 selects a bus for connection terminal 20 will, based on aircraft type and configuration, selected the type of multiplex bus connection to be utilized.

At this time it should be noted that the cardhrds.h module includes the definition for the CARD_HEADER_TYPE structure which pertains to the contents of IC memory card 22. This structure definition of the cardhrds.h module has a thirty two bit word identified as Card Discretes which determines whether an automatic load to a remote terminal 53 or bus controller is permitted. Specifically, if bit 9 of this word is at the logic one state an automatic load is permitted. In addition, bit 8 of this thirty bit word when at the logic one state indicates that a copy from one memory card to the other memory card of IC memory card 22 is allowed; bit 5 allows an erasure of IC memory card 22; bit 6 allows a download to external computer 66; bit 7 allows an upload to IC memory card 22 and bit 4 determines whether the information in IC memory card 22 has been tested, verified and is releasable. The first four bits (bits 3–0) identify the security classification of IC memory card 22.

Referring now to the RRT program section cardhdrs.h module as well as FIGS. 3 and 4, the first three bits (bits 2–0) of the thirty two bit word identified as Discretes #1 in the LOOKUP_TABLE_TYPE structure in cardhdrs.h module of the RRT software program describe the aircraft multiplex bus to which rapid reprogramming terminal 20 will couple. When bits 2–0 are respectively 0,0,1, rapid reprogramming terminal 20 couples to primary Avionics Bus Number One; 0,1,0 couples rapid reprogramming terminal 20 to primary Avionics Bus Number Two; 0,1,1 couples rapid reprogramming terminal 20 to primary Avionics Bus Number Three; 1,0,0 couples rapid reprogramming terminal 20 to primary Avionics Bus Number Four and 1,0,1 couples rapid reprogramming terminal 20 to the Electronic Warfare Bus.

Bits 4,3 of the Discretes #1 word in the lookup table are the secondary bus identifiers with 0,0 coupling rapid reprogramming terminal 20 to secondary Avionics Bus Number One; 0,1 coupling rapid reprogramming terminal 20 to secondary Avionics Bus Number Two; 1,0 coupling rapid reprogramming terminal 20 to secondary Avionics Bus Number Three and 1,1 coupling rapid reprogramming terminal 20 to secondary Avionics Bus Number Four.

Bit 5 of the Discretes #1 word indicates whether the secondary avionics buses aboard the aircraft are usable with a logic one indicating that the buses are usable.

When bit 6 of the Discretes #1 word is a logic zero the aircraft uses a coupling transformer 60, FIG. 4, between the aircraft buses and rapid reprogramming terminal interface connectors. A logic one indicates that the aircraft uses direct coupling as is illustrated in FIG. 4. Data bit 7 of the same word is reserved for the center tap on data bus isolation transformers 213 and 214 with zero being an open-center tap and one being a grounded center tap.

The next four bits (bits 11-8) of the Discretes #1 thirty two bit word set the PWR_OFF/ON_1 through PWR_OFF/ON_4 outputs of interface 54. Bit eight set at a logic one turns off the AYK-14 computer bus controller connected to avionics bus one, bit nine set at a logic one turns off the AYK-14 computer bus controller connected to avionics bus two, bit ten set at a logic one turns off the AYK-14 computer bus controller connected to avionics bus three and bit eleven set at a logic one turns off the AYK-14 computer bus controller connected to avionics bus four.

Bit twelve of the Discretes #1 word is used for enabling any external device such as the external processor of the AN/ALQ-165 radar jammer on board the F/A-18C/D fighter aircraft. The AN/ALQ-165 radar jammer is an electronic warfare bus controller which may be reprogrammed either in the aircraft or when removed from the aircraft. When the AN/ALQ-165 is removed from the aircraft, the power on time for example is generally limited to less than one minute for a load/verify of 32K data words of user data memory, since the aircraft's air conditioning system is not available to cool the AN/ALQ-165. The lookup table provides for reprogramming of the AN/ALQ-165 when removed from the aircraft by allowing for a maximum on time of between ten seconds and thirty minutes for the AN/ALQ-165, although it is desirable to allow the AN/ALQ-165 to be enabled for not more than one minute.

Bit thirteen is used for turning off the Maintenance Signal Data Recording Set (MSDRS) on board the F/A-18 aircraft; bit fourteen is used for enabling the loading software in the radar data processor currently being utilized with only the F/A-18 fighter aircraft and bit fifteen seven is used for enabling the loading software off the stores management system aboard the aircraft. Bit thirteen when set at a logic one state will turn off the MSDRS so it will not record the data transferred over the avionics bus while a remote terminal 53 or a bus controller 55 is being reprogrammed. Bits fourteen and fifteen when set to a logic one state respectively will enable the loading software in the radar data processor and the stores management system.

The first four bits (bits 3-0) of the next thirty two bit word (Discretes #2 in the cardhdrs.h module) in the lookup table set the IPL_1 through IPL_4 outputs of interface 54 for reprogramming the AYK-14 computers. When bit zero of the Discretes #2 word is a logic one the AYK-14 computer on avionics bus one is to be reprogrammed; when bit one of this word is a logic one the AYK-14 computer on avionics bus two is to be reprogrammed; when bit two of this word is a logic one the AYK-14 computer on avionics bus three is to be reprogrammed; and when bit three of this word is a logic one the AYK-14 computer on avionics bus four is to be reprogrammed. To reprogram any of the AYK-14 computers aboard an aircraft it is first required to turn off the power to the AYK-14 to be reprogrammed and then activate the initiate program load output of interface 54 to the AYK-14 of the computer to be reprogrammed before turning on the power to the AYK-14 computer to be reprogrammed. The AYK-14 will sense the initiate program load output is active which initiates the reprogramming of the AYK-14. A failure in the reprogramming of the AYK-14 results in a logic one at the initiate program load fail input of interface 54 when the fail input is connected to the AYK-14 being reprogrammed.

Bits four and five of the Discretes #2 word are respectively used for enabling the first and second memory areas of the remote terminals 53 within the aircraft avionics system; bit six is used for enabling the user data memories of all remote terminals 53 communicating on the electronic warfare multiplex bus and bit seven is used for enabling the operating software memories in remote terminals 53 connected to the electronic warfare multiplex bus.

The next four bits (bits 11-8) of the Discretes #2 word in the look up table determine which of the AYK-14 will be reprogrammed. When bit eight is a logic one the AYK-14 computer on avionics bus number one is to be reprogrammed; when bit nine is a logic one the AYK-14 computer on avionics bus number two is to be reprogrammed; when bit ten is a logic one the AYK-14 computer on avionics bus number three is to be reprogrammed and when bit eleven is a logic one the AYK-14 computer on avionics bus number four is to be reprogrammed.

The last bit (bit 15) of the Discrete #2 word in the lookup table determines if the Initiate Program Load Fail discretes will be used to indicate a failure when loading an AYK-14 computer. When this bit is a logic one the aircraft having the AYK-14 computer on board has the fail discrete wired and the fail discrete is being utilized by the aircraft.

The first three bits (bits 2-0) of the next word (Operational Status word) in the look up table determine the operational status of rapid reprogramming terminal 20. When bits 2-0 are respectively 0,0,1 rapid reprogramming terminal 20 operates as a remote terminal 53, the bus controller 55 converts to a remote terminal 53 and rapid reprogramming terminal 20 converts to the bus control 55. When bits 2-0 are respectively 0,1,0 rapid reprogramming terminal 20 operates as the bus controller 55. When bits 2-0 are respectively 0,1,1 rapid reprogramming terminal 20 operates as a remote terminal 53. When bits 2-0 are respectively 1,0,0 rapid reprogramming terminal 20 operates as a remote terminal 53, the bus controller 55 is quieted and rapid reprogramming terminal 20 converts to the bus control 55. Bits 6-3 are unused and bit 7 indicates that the AYK-14 computer is the normal bus controller 55.

Bits 12-8 of the Operational Status word provide the address of the remote terminal being reprogrammed.

Bits 3-0 of the next word identified as Operational Mode describe the operational mode of rapid reprogramming terminal. For example, when bits 3-0 are respectively 0,0,0,1 rapid reprogramming terminal 20 is in an operational mode by which rapid reprogramming terminal 20 is reprogramming a remote terminal 53 or a bus controller 55 which when being reprogrammed functions as a remote terminal 53. Likewise, when bits 3-0 are respectively 0,0,1,0 rapid reprogramming terminal 20 is in an operational mode by which rapid reprogramming terminal 20 is reprogramming a bus controller 55 such as the AN/ALR-67 Radar Warning Receiver which does not convert to a remote terminal.

When bits 3-0 of the Operational Mode word in the lookup table are respectively 0,0,1,1 rapid reprogramming terminal 20 may reprogram an AYK-14 computer having a serial interface module type B acting as a remote terminal; when bits 3-0 are respectively 0,1,0,0 rapid reprogramming terminal 20 may reprogram an AYK-14 computer having a serial interface module type B acting as a bus controller; when bits 3-0 are respectively 0,1,1,0 rapid reprogramming terminal 20 may reprogram an AYK-14 computer having a serial interface module type A and when bits 3-0 are respectively 0,1,1,1 rapid reprogramming terminal 20 may reprogram the High Speed Anti-Radiation Missile (HARM) Command Launch Computer. Likewise, when bits 3-0 are respectively 1,0,0,0 rapid reprogramming terminal 20 may reprogram the AYQ-9 and AYQ-15 Stores Management Systems' core memory; when bits 3-0 are respectively 1,0,0,1 rapid reprogramming terminal 20 may reprogram the AYQ-9 and AYQ-15 Stores Management Systems' EEPROM memory and when bits 3-0 are respectively 1,0,1,0 rapid reprogramming terminal 20 may reprogram the CP-1726/ASQ-194 Signal Data Computer. When bits 3-0 are respectively 1,0,1,1, rapid reprogramming terminal 20 may reprogram the Digital Map Computer and when bits 3-0 are respectively 1,1,0,0 rapid reprogramming terminal 20 may reprogram the Night Attack Display Computer.

Bit 4 of the Operational Mode word indicates if the system being reprogrammed uses paging to access its memory. Bits 7-5 of the Operational Mode Word are not used.

The next eight bits (bits 15-8) of the Operational Mode word provide for a delay of between 0 and 255 milliseconds between activity messages.

The first bit (bit 0) of the next word identified as Busy Bit and Memory word Usage in the lookup table determines whether the busy bit in the status word, FIG. 9A, provided by the remote terminal 53 is usable with a logic one indicating that the busy bit is usable. If the busy bit in the status word is usable then rapid reprogramming terminal 20 will monitor the status word provided by remote terminal 53 to determine whether remote terminal 53 can receive data from rapid reprogramming terminal 20. If the busy bit in the status word is not usable rapid reprogramming terminal 20 will issue activity messages, FIG. 9A to the remote terminal 53 to determine the busy status of the remote terminal 53, that is whether or not the remote terminal 53 can receive data from rapid reprogramming terminal 20. The seventh bit (bit 6) provides for a pause after rapid reprogramming terminal 20 sends a command word to the remote terminal 53. The eighth bit (bit 7) when at the logic zero state causes rapid reprogramming terminal 20 when functioning as a bus controller to repeat the last message whenever remote terminal 53 is busy.

Bits 15-0 of the next word identified as Automatic Busy Retry Count Before Error in the lookup table provides for the automatic mode retry count which is the number of times (between 0 and 65,535) rapid reprogramming terminal 20 can send activity messages to the remote terminal 53 being reprogrammed before rapid reprogramming terminal 20 declares an error. The sixteen bit value of this word is the total count of busy bits that may occur during a message transaction.

Bits 15-0 of the next word identified as Manual Busy Retry Count Before Error in the lookup table provide for the manual mode retry count which is the number of times (between 0 and 65,535) rapid reprogramming terminal 20 can retry reprogramming a remote terminal 53 before rapid reprogramming terminal 20 declares an error. The sixteen bit value of this word is the total count of busy bits that may occur during a message transaction.

It should be noted that the busy count for the manual retry mode is typically 3 and the busy count for the automatic retry mode is typically 256.

Bits 15-0 of the next three words identified as Nomenclature of RT in the lookup table provide for the WRA nomenclature (e.g., RT-1079 ) of the remote terminal 53 being reprogrammed.

Bits 15-0 of the next word identified as Memory Configuration Word 1 in the lookup table represents the configuration of the data stored in memory area one of the remote terminal 53 being reprogrammed. Similarly, bits 15-0 of the word identified as Memory Configuration Word 2 in the lookup table represent the configuration of the data stored in memory area two of the remote terminal 53 being reprogrammed. These two words in the lookup table contain the memory configuration message, FIG. 9C, data word one and data word two comparison information and are only used for remote terminals 53 and bus controllers 55 that allow the memory configuration message of FIG. 9C. At this time, it should that the user data memory in electronic warfare devices is equivalent to memory area one and operating software memory in electronic warfare devices is equivalent to memory area two.

Bits 7-2 of the next word identified as Memory Control in the lookup table provide the fill data bits (bits 15-10 of data word four) of the load/verify message of FIG. 9D.

Bit 8 of this Memory Control word allows for the transfer of control within the remote terminal 53 being reprogrammed to the program which was loaded once the data is verified as being loaded correctly. Bits 13-12 of this word provide a code which indicates whether either memory area one or memory area two or both memory areas are to be disabled, while bits 15-14 provide a code which indicates whether either memory area one or memory area two or both memory areas are to be enabled. It should be understood that bits 15-14 and 13-12 are software controlled enables and disables which are provided to the load/verify message of FIG. 9D.

Bits 1-0 of the next word identified as File and Control Type in the lookup table represent a code which indicates whether a single memory area is to be loaded or whether memory areas one and two are to be loaded in sequence or simultaneously. When bit 2 of this word is zero a verify is not permitted. When bit 3 of this word is a logic one a verify operation may be performed without a data load. Bits 7-4 provide for the aircraft configuration. Bits 15-10 provide fill data for word four of the reprogram control message, FIG. 11D, when communicating with a bus controller 55.

Bits 4-0 of the next word identified as BC and RRT addresses in the lookup table provide the remote terminal address for a bus controller 55 which can convert to a remote terminal when being reprogrammed.

Bits 12-8 of this word provide the address for rapid reprogramming terminal 20 when terminal 20 operates as a remote terminal 53.

The next three words identified as Nomenclature of BC in the lookup table provide for the WRA nomenclature (six ASCII characters) of bus controller 55 when rapid reprogramming terminal 20 is controlling a bus controller 55.

The messages of utilized by rapid reprogramming terminal 20 to communicate with a bus controller 55 being reprogrammed via the 1553 multiplex data bus 42 will now be discussed. It should be understood that the messages used by rapid reprogramming terminal 20 to communicate with any bus controller 55 aboard the aircraft via the 1553 data bus are required to follow the message formats set forth in FIGS. 7 and 11.

Figure 11A:
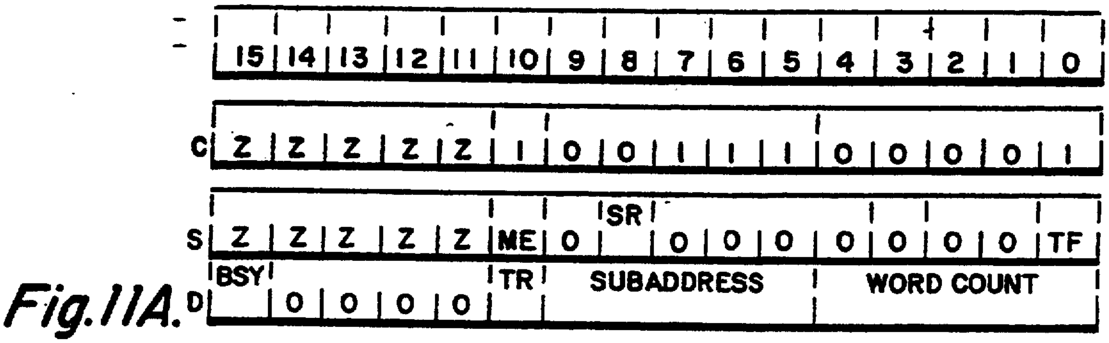
FIG. 11A illustrates the format of activity message transfers via the 1553 multiplex data bus to and from a bus controller being reprogrammed.
Figure 11B:
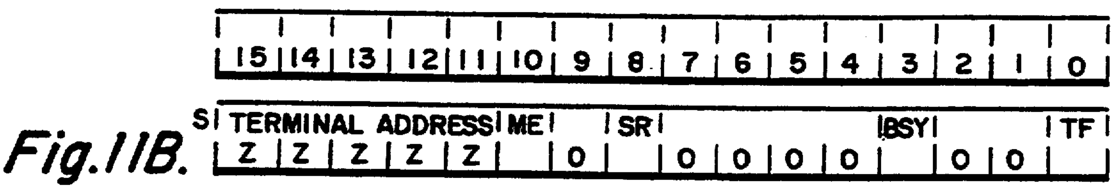
FIG. 11B illustrates the status response word format provided by a bus controller terminal for each message transaction via the 1553 multiplex data bus.

The Activity Message of FIG. 11A is utilized by bus controller 55 when being reprogrammed to determine whether rapid reprogramming terminal 20 (which is operating as a remote terminal) is ready to receive data and allows rapid reprogramming terminal 20 a request to send information to bus controller 55 or receive information from bus controller 55. The Activity Message of FIG. 11A allows rapid reprogramming terminal 20 to control the loading sequence when functioning as a remote terminal. The bus controller 55 commands this message at a periodic rate until a Header Message, FIG. 11E, Memory Data Message, FIG. 11F, Trailer Message, FIG. 11H transaction is begun. After receipt of a Header Message requiring data transfer (TM is not equal to zero), the bus controller 55 may utilize the Activity Message to control the transfer of Memory Data Messages or the bus controller 55 may utilize the Header Message information to internally control the number of Header Data Messages so long as the busy bit (bit 3) in the rapid reprogramming terminal Status Response Word, FIG. 11B, is checked by the bus controller 55. The bus controller 55 may also control the load or the verify (all the Header Message, Memory Data Message, Trailer Message transactions) without the use of the Activity Message by monitoring the TC bits (bits 0-1 of data word four) in the Header Message.

At this time it should be noted that the following discussion relates primarily to protocol C of Military Standard 2217(AS).

Referring to FIG. 11A the Command Word for the Activity Message follows the format set forth in FIG. 7. Bits 11-15 provide the address for rapid reprogramming terminal 20, bit 10 is set at a logic one, the subaddress (bits 5-9) is set at 07 hexadecimal and the word count (bits 0-5) is one.

The status word response to the Activity Message as well as the other messages follows the general format set forth in FIG. 7 supplemented by FIG. 11B. A Status Response Word to any of the messages is provided by a rapid reprogramming terminal 20 for each message transaction. The status response word follows data on a rapid reprogramming terminal receive type transaction and precedes the data on a rapid reprogramming terminal transmit type transaction. The bus controller 55 allows a response time gap of approximately 6.5 usec. from the end of the last transmitted command word (transmit type message) or the end of the last transmitted data word (receive type message), to the start of the rapid reprogramming terminal status response word before declaring a no response error. Rapid reprogramming terminal 20 begins the status response word within a time period of approximately 2-5 usec. from the receipt of the end of the last command word (transmit type message) or the receipt of the end of the last data word (receive type message). The bus controller 55 ensures that the time from the end of the rapid reprogramming terminal transmission of the last data word (transmit type message) or the end of the last status response word (receive type message) to the beginning of the next command word is at least 2 usec.

Referring to FIG. 11B, the status response word bits for each message comprises a terminal address (bits 11-15) which is remote terminal address of the remote terminal 53 being reprogrammed (referred to as ZZZZZ); a message error bit (bit 10) which is not used; a service request bit (bit 8) and a busy bit (bit 3).

The service request bit (bit 8) is set to one by rapid reprogramming terminal 20 in response to an activity message from the bus controller 55, otherwise this bit is zero.

The busy bit (bit 3) may be utilized by rapid reprogramming terminal 20 for the status response word for any command word from the bus controller 55. The setting of this bit to a logic one means that a message previously received by rapid reprogramming terminal 20 or internal rapid reprogramming terminal 20 requirements necessitates suspension or slow down communications with the bus controller 55. If rapid reprogramming terminal 20 sets the busy bit in the status response word, it may suppress transmission of the data words associated with each message. All additional message traffic other than the activity message is suspended until the busy bit is cleared (logic 0). While the bus controller 55 is waiting for the busy bit to clear, the activity message is sent every 10 to 100 milliseconds. As long as the busy bit is clear the bus controller 55 assumes that rapid reprogramming terminal 20 can support a continuous stream of identical messages within a 2 msec. time period from the end of one message to the start of the next command word. The continuous stream of identical messages is assumed to be either memory data load or memory data verify messages.

This continuous stream is maintained for a time period compatible with IC Memory Card 22 and internal memory capabilities of rapid reprogramming terminal 20. Rapid reprogramming terminal 20 utilizes the busy bit to suspend the continuous stream when required. As a minimum rapid reprogramming terminal 20 provides 2K data words in memory data load or memory data verify messages per second. Any data word transmitted after a status word with the busy bit set is ignored by rapid reprogramming terminal 20. The bus controller 55 ensures that the message for which rapid reprogramming terminal 20 initially replied with the busy bit set in the status response word will be transferred once the busy bit is cleared.

The Terminal Flag bit (bit 0) is set to a logic one by rapid reprogramming terminal if bit 10, 8 or 3 is set to one. Bits 9, 7, 6, 5, 4, 2 and 1 will always be zero in the status response word provided by rapid reprogramming terminal 20.

Referring again to FIG. 11A, the address (bits 11-15) for the status word response to the activity message is the address of rapid reprogramming terminal 20 when reprogramming a bus controller 55. The rapid reprogramming terminal address is the address assigned to each individual aircraft on the particular bus selected by the rapid reprogramming terminal switching network.

The status word response to the activity message includes the service request bit (bit 8) which rapid reprogramming terminal 20 sets to a logic one whenever the contents of bits 0 through 10 of the data word are other than zero. The bus controller 55 may utilize the service request bit to determine if it is necessary to examine bits 0 through 10 of the data word that follows. Since the contents of bits 0 through 10 of the data word control the state of the service request bit, it is not necessary for the bus controller 55 to process the service request bit.

The busy bit (bit 3) in the status response word when at the logic one state indicates that rapid reprogramming terminal 20 is not ready to process any message from the bus controller 55 other than the activity message. Prior to transmission of any other messages to rapid reprogramming terminal 20, the bus controller 55 will continue to send activity messages to rapid reprogramming terminal 20 every 10 to 100 milliseconds until the busy bit is cleared. The busy bit and the service request bit are not set simultaneously by rapid reprogramming terminal 20.

The data word in the activity message is transmitted by rapid reprogramming terminal 20 even when the busy bit (bit 3) is set in the status response word. The busy bit (bit 15) in the data word in the activity message is used to completely implement the busy response.

Bits 0–10 are utilized to allow rapid reprogramming terminal 20 to request that the bus controller 55 being reprogrammed send a specific message to rapid reprogramming terminal 20. As a result of this request by rapid reprogramming terminal 20 the bus controller 55 will transmit a command word with the address of rapid reprogramming terminal 20 in bits 11–15 of the command word.

The transmit/receive bit (bit 10 of the data word) is set to one when rapid reprogramming terminal 20 is to transmit a message and is set to one zero rapid reprogramming terminal 20 is to receive a message. The subaddress bits (bits 5–9) indicates the subaddress of the message to be provided by bus controller 55 to rapid reprogramming terminal 20, while the word count bits (bits 0–4) indicate the data word count for the message. The remaining bits (bits 11–14) of the data word are zero.

Figure 11C:
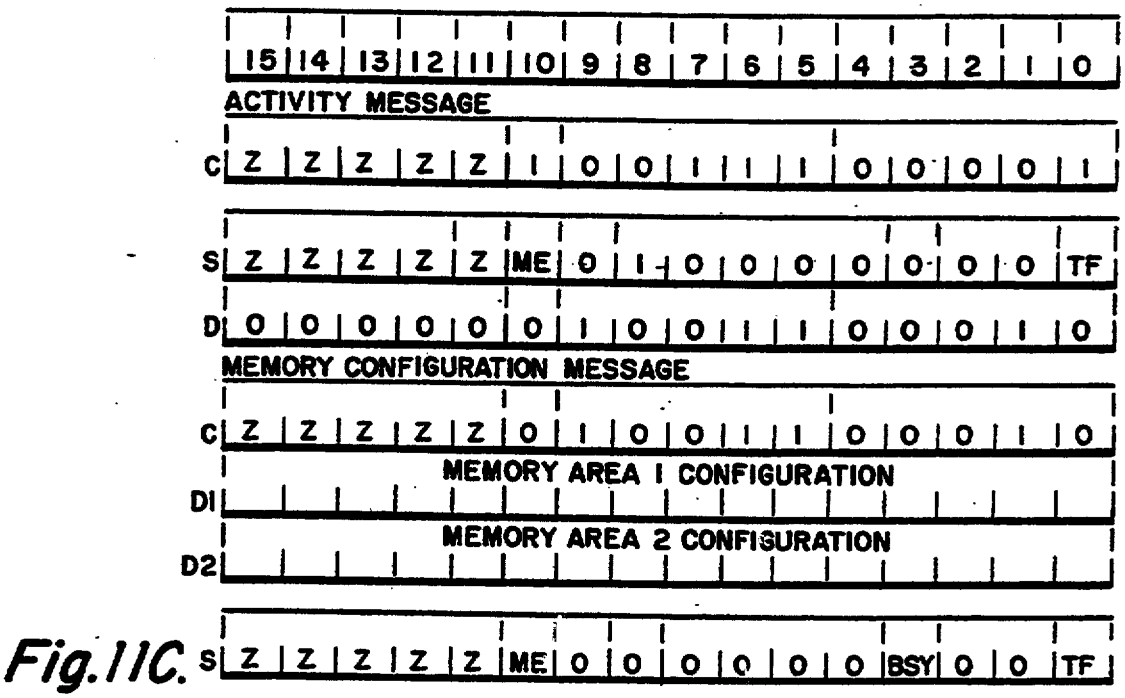
FIG. 11C illustrates the format of memory configuration messages transferred via the 1553 multiplex data bus to a bus controller being reprogrammed.

Referring to FIG. 11C, the activity message provided prior to the memory configuration message requests that the bus controller 55 provide to rapid reprogramming terminal 20 the memory configuration message. The memory configuration message is utilized to read the current memory configuration of the bus controller 55 being reprogrammed. This message is only used when its use is indicated in a lookup table for the bus controller 55. The command word and status word for the memory configuration message follow the format of FIG. 7. Each bus controller 55 aboard an aircraft has up to two memories designated memory area one and memory area two. Data bits 0–15 of data word one of the memory configuration message represent the configuration of the data stored in memory area one. Unused data bits equal zero. Similarly, data bits 0–15 of data word two of the memory configuration message represent the configuration of the data stored in memory area two. Unused data bits also equal zero. In the automatic mode of operation this message is used for the purpose of comparing a bus controller's configuration stored in the IC memory card 22 with reported bus controller configuration. If the reported value is the same as the value stored in the IC memory card 22, rapid reprogramming terminal 20 will not perform a load operation. However, if the reported value is different from the value stored in the IC memory card 22, rapid reprogramming terminal 20 will proceed with a load operation.

Figure 11D:
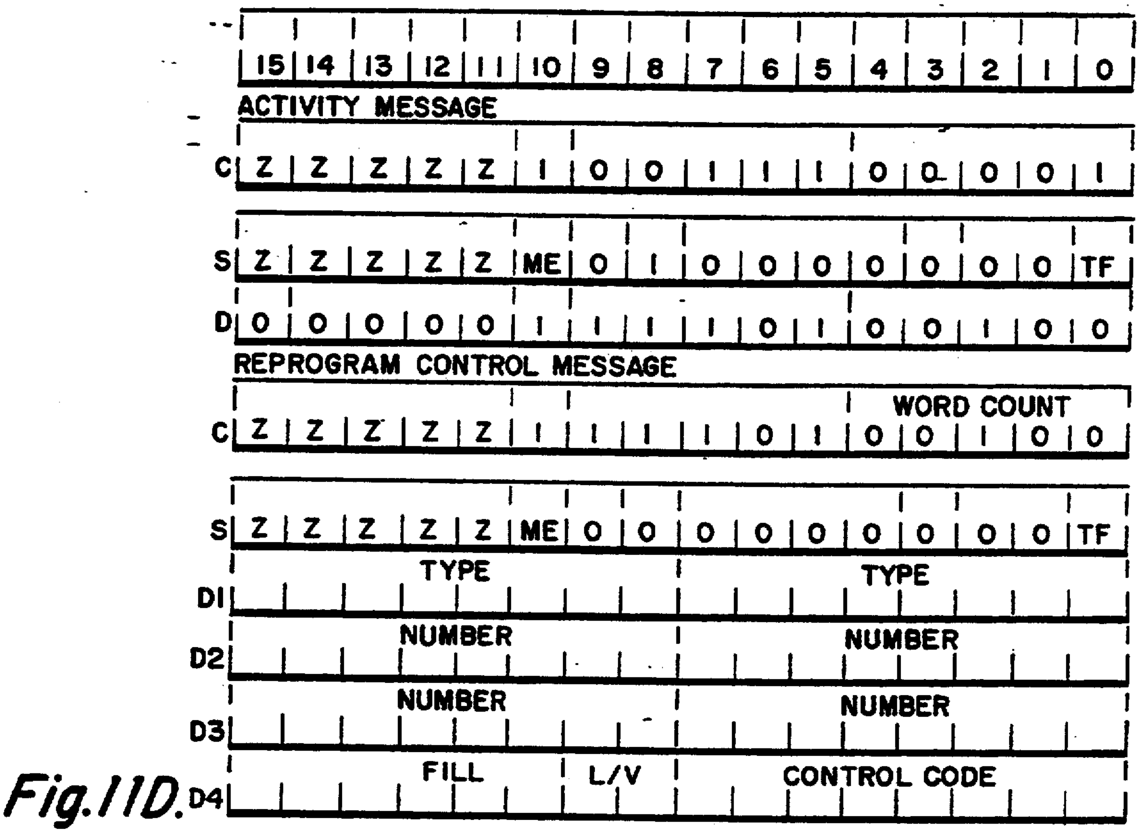
FIG. 11D illustrates the format of enter load, exit load, enter verify and exit verify messages transferred via the 1553 multiplex data bus to a bus controller being reprogrammed.

Referring to FIG. 11D, there is shown the format for the enter load, exit load, enter verify and exit verify messages. The activity message provided prior to the enter load, exit load, enter verify and exit verify messages requests that the bus controller 55 provide to rapid reprogramming terminal 20 the required enter load, exit load, enter verify or exit verify message.

The transmit/receive bit (bit 10) in the command word for the enter load, exit load, enter verify and exit verify messages is a logic one since rapid reprogramming terminal 20 which is operating as a remote terminal is to transmit data to the bus controller 55 being reprogrammed. The terminal subaddress field (bits 5–9) in the control word is set at 1D hexadecimal. Each message enter load, exit load, enter verify and exit verify requires that an enable signal be provided by rapid reprogramming terminal 20 before a load or verify may be executed. A logic one at the EW_OSM_EN output of interface 54 enables the operating software memory of the electronic warfare system on board the aircraft. Similarly, a logic one at the EW-UDM_EN output of interface 54 enables the user data memory of the electronic warfare system on board the aircraft. When the AV_EN1 output of interface 54 is at a logic one state the first memory areas of the aircraft avionics system are enabled, while a logic one at the AV_EN2 output of interface 54 enables the second memory areas of the aircraft avionics system.

Each field in the data is checked by the remote terminal 53 for compliance with the following prior to execution of a load or verify. The type and number fields are defined based on WRA nomenclature (e.g., CP-1293); however, if this creates a conflict, the system nomenclature (e.g., ALR-67) is utilized instead. The preferred embodiment of the present invention uses WRA nomenclature.

Data word one (bits 0–15) is the type field consisting of the first two eight bit ASCII characters that represent the nomenclature of the bus controller 55 being controlled. For example, for CP-1293 the two characters would be "C", "P".

Data word two (bits 0–15) is a number field for consisting of the third and fourth eight bit ASCII characters that represent the nomenclature of the bus controller 55 being controlled. For example, for CP-1293 the two characters would be "1", "2".

Data word three (bits 0–15) is a number field two consisting of the last two eight bit ASCII characters that represent the nomenclature of the bus controller 55 being controlled. For example, for CP-1293 the two characters would be "9", "3".

Data word four (bits 10–15) is the fill field which may be any bit pattern including zero and is to be defined by the individual bus controller 55 being controlled. The fill field is required to be checked even if the field is defined as zero. The fill field is contained in a look up table for the bus controller 55 being reprogrammed.

The load/verify bits (bits 8–9) are used to described whether a Load, Verify, or other type transaction will follow. The load/verify bits are coded as follows: L/V=01 indicates that a memory load follows; L/V=10 indicates that a memory verify follows; L/V=11 is not used and L/V=00 indicates that a enter load, enter verify, exit load or exit verify message is being sent for some reason other than a load or verify such as to quiet a bus controller.

The control code (bits 0–7) of data word four are set as follows: bit 7 is a reprogram enable for memory area one and is equal to 80 hexadecimal; bit 6 is a reprogram enable for memory area two and is equal to 40 hexadecimal; bit 5 is a reprogram disable for memory area one and is equal to 20 hexadecimal and bit 4 is a reprogram disable for memory area two and is equal to 10 hexadecimal. Bit 3 of the control code is not used by rapid reprogramming terminal 20 when reprogramming bus controllers functioning as bus controllers. Bit 2 of the control code which is 02 hexadecimal tells the bus controller 55 to stop transmitting or receiving information on the bus so as to allow the bus controller 55 to be reprogrammed. The use of bit 2 of the control code in this manner is required because some bus controllers can not be converted to a remote terminal when reprogramming a remote terminal 53. Bit 1 of the control word which is 02 hexadecimal is utilized to have a bus controller when converted to a remote terminal revert back to a bus controller. Bit 0 of the control code which is 01 hexadecimal causes the bus controller 55 to begin executing starting at the address previously supplied via data word three or data word four of a header message.

The control code field is valid only if all other fields are correct and only if either the Avionics Reprogram Enable 1 (AV_EN1 output of interface 54); or the EW UDM Reprogram Enable discrete (the EW-UDM_EN output of interface 54) is present or the Avionics Reprogram Enable 2 (AV_EN2 output of interface 54) or the EW OSM Reprogram Enable discrete (EW-OSM_EN output of interface 54) is present. At the end of reprogramming, rapid reprogramming terminal 20 will maintain the active discrete for at least 100 msec after the transmission of an exit load or exit verify message that ends the reprogramming mode.

The following are the only valid control codes that can occur when rapid reprogramming terminal 20 is functioning as a remote terminal during a load or verify. Any other code shall cause the bus controller to not execute a load or verify.

Code 00000000 which is 00 hexadecimal indicates that no load or verify control action is to be taken.

Code 00000001 which is 01 hexadecimal will cause the bus controller 55 to begin execution starting at the address previously supplied via data word three and data word four of the header message.

Code 00000100 which is 04 hexadecimal will cause the bus controller 55 to stop communications on the bus. Once the bus controller 55 stops communications on the bus, communications activity on the bus will remain stopped until the Avionics Reprogram Enable 1/EW UDM Reprogram Enable discrete and the Avionics Reprogram Enable 2/EW OSM Reprogram Enable discrete are inactive.

Code 0000100 which is 08 hexadecimal will cause the bus controller 55 being reprogrammed to revert to a remote terminal. Upon execution of this reprogram control code the message traffic shall be for rapid reprogramming terminal 20 functioning as a bus controller using the messages illustrated in FIG. 9.

Code 00010000 which is 10 hexadecimal will cause the bus controller to exit the reprogramming mode for memory area two. This code shall only be valid if the Avionics Reprogram Enable 2 or EW OSM Reprogram Enable discrete is active.

Code 00100000 which is 20 hexadecimal will cause the bus controller to exit the reprogramming mode for memory area one. This code shall only be valid if the Avionics Reprogram Enable 1 or EW UDM Reprogram Enable discrete is active.

Code 00110000 which is 30 hexadecimal is a combination of 10 hexadecimal and 20 hexadecimal for simultaneous memory areas one and two exit reprogramming mode.

Code 01000000 which is 40 hexadecimal will cause the bus controller 55 to enter the reprogramming mode for memory area two. This code shall only be valid if the Avionics Reprogram Enable 2 or the EW OSM Reprogram Enable discrete is active.

Code 10000000 which is 80 hexadecimal will cause the bus controller 55 to enter the reprogramming mode for memory area one. This code shall only be valid if the Avionics Reprogram Enable 1 or the EW UDM Reprogram Enable discrete is active.

Code 11000000 which is CO hexadecimal is a combination of 40H and 80H for simultaneous memory areas one and two enter reprogramming mode.

Figure 11E:
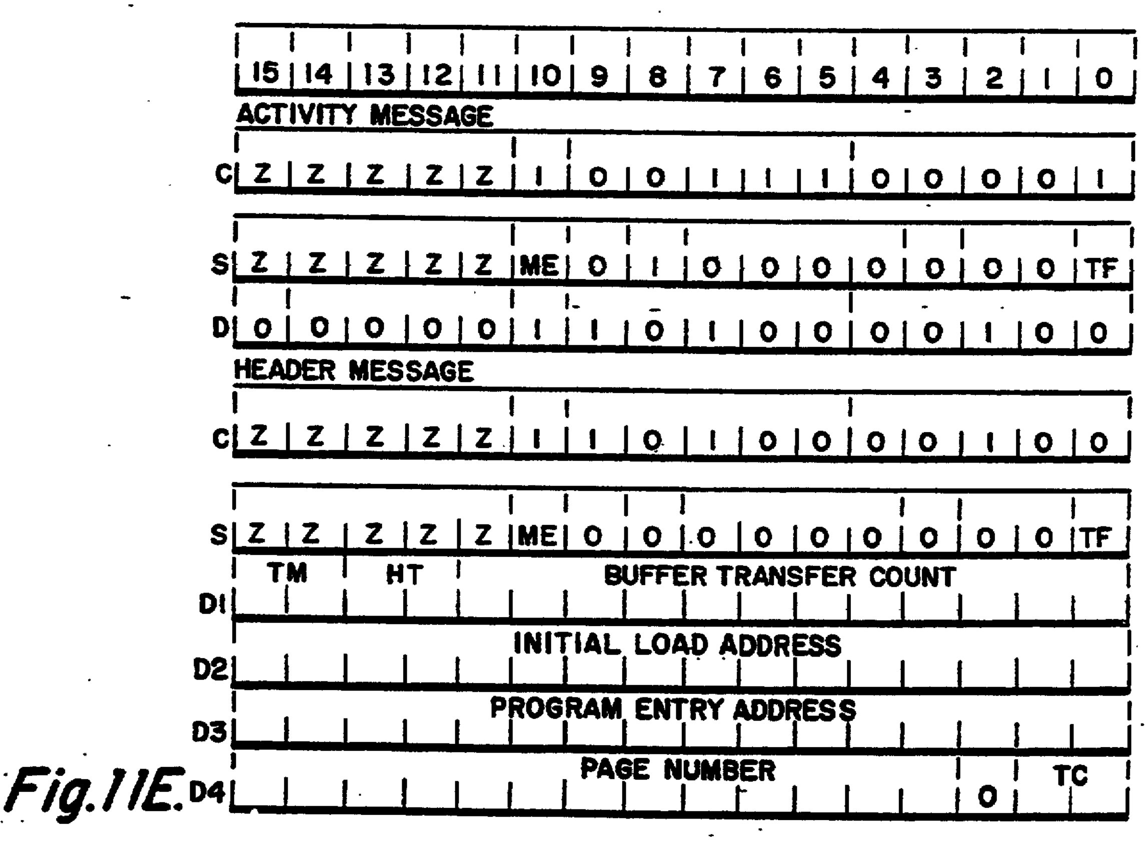
FIG. 11E illustrates the format of a header message transferred via the 1553 multiplex data bus to a bus controller being reprogrammed.

Referring to FIG. 11E there is shown the format for a header message which is used to pass load and verify parameters to the bus controller 55 being reprogrammed. The activity message shown prior to the header message request that the bus controller 55 being reprogrammed command the header message from rapid reprogramming terminal 20. The activity message will not be used by bus controllers 55 which keep track of header, memory data, trailer message sequence, that is the bus controller automatically commands this message sequence without rapid reprogramming terminal 20 requesting each message.

The transmit/receive bit (bit 10) in the command word is at the logic one state since rapid reprogramming terminal 20 which is functioning as a remote terminal is to transmit data and the terminal subaddress field (bits 5-9) is set at 14 hexadecimal. The transfer mode (bits 14-15) are used to describe the memory data load or memory data verify message data word content. The transfer mode bits are binary coded as follows: TM=00; TM=01; TM=10 and TM=11. When TM=00 which is the no transfer mode, the buffer transfer count contained in data word one and the initial load address contained in data word two have no meaning. This mode is used to transfer the program entry address contained in data word three and Page Number contained in data word four or is used as a preamble to the trailer message.

When TM=01, each sixteen bits of data transmitted in a data word will contain only eight bits of information in bits 0-7. When TM=10, each sixteen bits of data transmitted in a data word will contain sixteen bits of information in bits 0-15. When TM=11, the sixteen bits of data transmitted in each odd word (first is odd) contains the sixteen least significant bits of data in bits 0-15 and each even word (second is even) contains the sixteen most significant bits of data in bits 0-15.

The header type bits (bits 12-13) are used to describe the header and have no meaning when the transfer mode is 00. The header type are binary coded as follows: HT=00, HT=01, HT=10 and HT=11. When HT=00, the buffer transfer count equals the number of words to be transferred. When HT=01, the buffer transfer count equals number of messages to be transferred. HT=10 is undefined, while HT=11 reserved for internal use by digital signal processor 20 and therefore will not be transmitted on the 1553 multiplex data bus 42 aboard the aircraft.

The buffer transfer count (bits 0-11) is used to indicate the amount of data that will follow the header message. The buffer transfer count has no meaning when the transfer mode is 00. The range of the buffer transfer count is from one to four thousand ninety six words.

When HT=00, the buffer transfer count is the total number of data words that will be transmitted in a transaction which includes the header message and trailer message. The data words are transmitted in 32-word messages since each transfer sequence is limited to thirty two data words (see FIG. 8) with the last message containing from one to thirty two data words. The maximum transfer for HT=00 is four thousand ninety six words using one hundred twenty eight memory data load or memory data verify messages.

When HT=01, the buffer transfer count is the number of memory data load or memory data verify messages that will follow the header message. Thus, the maximum data transfer per header message is 4096×32 data words per memory data load or memory data verify message which equals 131,072 sixteen bit words (128K). If paging (data word four, bits 0–1) is utilized for transfer modes 01 or 10, the maximum value of the buffer transfer count will be 2048 which results in 65,536 sixteen bit data words (64K) for transfer modes 01 and 10.

Data word two is the initial load address (bits 0–15) which is the sixteen or less least significant bits of the point in memory into which data is to be loaded or read. The maximum value (number of bits) used in the initial load address is compatible with the page size of remote terminals using paging. Unused bits equal zero.

Data word three is program entry address (bits 0–15) which has meaning only for transfer mode=00. The program entry address is the sixteen or less least significant bits of the point in memory at which the bus controller 55 being reprogrammed is to begin execution after receipt of an execute command in the load/verify message of FIG. 11D or when a transfer control is indicated in data word four. The load/verify message, FIG. 11D, is only used with bus controllers which require this command. The maximum value (number of bits) used in the program entry address is compatible with the page size of remote terminals using paging. Unused bits equal zero.

Data word four is the page number (bits 3–15) representing up to the thirteen most significant bits for a paged memory address within the bus controller 55. The page number applies to the program entry address for transfer mode=00 or the initial load address for transfer modes=01, 10 or 11. Unused bits shall equal 0. It should be noted that a page comprises 65,536 addresses in memory.

The transfer control bits 0–1 may be used to transfer control to a loaded program after a verify is processed or to an unaltered memory area after a load is completed, that is a bus controller 55 has been reprogrammed. When the transfer control bits equal 01 this indicates to the bus controller 55 being reprogrammed that this is the last header, memory data load or verify (up to 4096 messages), trailer or header, trailer transaction. When the transfer control bits equal 00 this indicates to the bus controller 55 being reprogrammed that more data is to follow the current header, memory data load or verify (up to 4096 messages), trailer transaction or header, trailer transaction and control should not be transferred. For bus controllers 55 using paging and the program entry address, the transfer control will remain equal to 01 even for the last data transaction, until a transfer mode equals 00 message is used to supply the program entry address and page number. Transfer control equal to 10 indicates that control is to be transferred to the program entry address of data word three. When control is transferred, the transfer does not take place until after the trailer message and control is transferred only to non-reprogrammed areas or verified areas in memory. Transfer control equals 11 is invalid and bit 2 equals zero.

Referring to FIG. 11F there is shown the format for a memory data load message which is used to transfer the data to be loaded into the memory of a bus controller 55 being reprogrammed. The activity message provided prior to a memory data load message is used only for bus controllers 55 that do not keep track of the number of memory data load messages required for each header, memory data, trailer transaction or for bus controllers that do not check the busy bit in the status response word, Fig. 11B, provided by rapid reprogramming terminal 20.

The transmit/receive bit (bit 10) in the command word is at the logic one state since the rapid reprogramming terminal 20 is to transmit and the terminal subaddress field (bits 5–9) is set at 15 hexadecimal, while the word count may vary from one to thirty two.

If the busy bit (bit 3) is set to a logic one in the status response word for a memory data load message, no data words would be required to be sent by rapid reprogramming terminal 20. After the busy bit is cleared in the status response word of the activity message, the bus controller 55 commands the memory data load message for which no data was received. The number of data words will equal the word count in the memory data load message command word.

Referring to FIG. 11G there is shown the format for a memory data verify message which is used to transfer the data that rapid reprogramming terminal 20 will compare to the data stored in IC memory card 22.

The transmit/receive bit (bit 10) in the command word is at the logic zero state since the rapid reprogramming terminal 20 is to transmit data and the terminal subaddress field (bits 5–9) is set at 15 hexadecimal, while the word count may vary from one to thirty two.

If the busy bit (bit 3) is set to a logic one in the status response word for a memory data verify message then bus controller 55 will retransmit the memory data verify message (i.e., same data words) after the busy bit is cleared in the status response word of the activity message.

The number of data words will equal the word count in the memory data verify message command word.

Referring now to FIG. 11H, the trailer message is used to pass the data checksum and additional load or verify parameters to the bus controller 55 being reprogrammed. The activity message shown prior to the trailer message request that the bus controller 55 command the trailer message. The activity message provided prior to a trailer message is used only for bus controllers 55 that keep track of the header, memory data, trailer transaction, that is the bus controller 55 automatically commands this message sequence without rapid reprogramming terminal 20 requesting each message.

The transmit/receive bit (bit 10) in the command word for the trailer message is a logic one since rapid reprogramming terminal 20 is to receive data and the terminal subaddress field (bits 5–9) in the command word is set at 16 hexadecimal.

Data word one contains the number of sub-pages and the first sub-page for bus controllers 55 utilizing paging or sub-paging. This word may also be used for internal register control. The fields of data word one represent the values to be used in the next header, memory data load or verify (up to 4096 messages), trailer transaction. For the first header, memory data load or verify (up to 4096 messages), trailer transaction the information will be transmitted prior to the memory data transaction via a header message, trailer message transaction in which the TM (transfer mode) field in data word one of the header is 00.

The sub-page/register count (bits 8–15) field in data word one may be used in lieu of or in conjunction with the page number field in data word four of the header message and is individual user definable. Unused bits equal zero. In the preferred embodiment of the present invention the sub-page field in data word one of the trailer message is used in conjunction with the data word four of the header message of FIG. 11E.

For the purpose of illustrating the use of the sub-page field in the trailer message the following example is provided. In order to load 256K of memory into a bus controller 55 with bank switching, 64K of address capability and a page size definition of 2048 words, the following approach may be used. To load 256K with subpages 2048 words long requires 128 header, memory data, memory data, trailer transactions (256K/2048=128). The 128 transactions consist of 32 transactions for each of the four banks of switching in bus controller 55. Thus, for each 32 transactions the header message, data word four page number, FIG. 9E, equals the bank number which would be incremented from zero to three. Within each group of 32 transactions the sub-page count would increment every transaction from zero to thirty one. For each transaction (assuming HT=01 for buffer transfer count equals the number of messages) the header data one buffer transfer count would be 64 (2048 words/32 words per message).

The first sub-page/register (bits 0–7) field may be used in lieu of or in conjunction with the page number field in data word four of the header message and may be defined by the user. Unused bits equal zero. Examples of use of this field are: specifying a processor register into which the page number field in data word four of the header message is to be loaded or specifying the initial sub-page count in the example set forth above to one so as to not reprogram the first 2048 memory locations (the first group of transactions would only be 31 transactions long (1 to 31) and the sub-page count for the first transaction would be set to one to indicate a starting address of 2048).

The data word two checksum (bits 0–15) is the checksum of an entire transaction, i.e., header, memory data, memory data, trailer transaction (when TM in header data word one is not equal to zero) or header, trailer transaction (when TM in header data one is equal to zero). The checksum is derived by a two's complement sixteen bit addition of every data word in the transaction (i.e., header, memory data, and trailer data words) with the exception of the checksum data word which is data word two of the trailer message. The two's complement sixteen bit addition is binary addition with the carry discarded, that is there is no end around carry (e.g., FFFF (hexadecimal)+1=0).

The bus controller 55 being reprogrammed is responsible for comparing the checksum received from rapid reprogramming terminal 20 with the data words for both load and verify functions. The checksum value in data word two of the trailer message is the checksum that should be computed by the bus controller 55. If the value computed does not match the value received from processor 21 for either a load or verify operation, an error is declared and a reprogram status message is sent by bus controller 55.

Referring to FIG. 11I, the reprogram status message is used by the bus controller 55 to inform rapid reprogramming terminal 20 of an error condition.

The transmit/receive bit (bit 10) of the command word of the reprogram status message is set at a logic zero since rapid reprogramming terminal 55 is to receive information and the subaddress (bits 5–9 of the command word) for this message is 17 hexadecimal.

The status flag (bit 15) of data word one is set to a logic one to indicate that the remainder of the data word should be processed by rapid reprogramming terminal 20, that is the reprogram status message contains valid data. If this bit is set to a logic zero, the reprogram status message will be ignored by rapid reprogramming terminal 20.

The status indicator (bit 14) defines the meaning of the remainder of the data word, that is an error code or a status code to be displayed by rapid reprogramming terminal 20.

When the status indicator equals zero this indicates that an error has occurred and the error code will be processed by rapid reprogramming terminal 20.

When the status indicator equals one this indicates that no error has occurred and the status code in bits 13–0 are to be displayed on liquid crystal display 57 as 4 hexadecimal characters (bits 15 and 14 of the display value are 0). With the status indicator equal to one the values of bits 13–0 will be used to indicate status or progress through the load or verify operation.

When SF equals one and SI equals one the status code bits 0–13 are display characters. When SF equals one and SI equals zero bits 0–13 represent error codes and the desired rapid reprogramming terminal 20 action. The error codes are 0001 (hexadecimal) which is an abort; 0002 (hexadecimal) which is a restart; 0003 (hexadecimal) which is a retry and 0004 (hexadecimal) which is a automatic retry.

The abort error code indicates to rapid reprogramming terminal 20 that the load operation or verify operation has been aborted and should not be retried. Rapid reprogramming terminal 20 will display the error code and wait for an operator response. On receiving the response from the operator, rapid reprogramming terminal 20 will abort the load of the bus controller 55 being reprogrammed and continue with the load of the next bus controller or remote terminal to be reprogrammed if there is a requirement to reprogram another bus controller or remote terminal.

The restart status code indicates that an unrecoverable error has occurred in loading a bus controller 55 and a reload of bus controller 55 is desired. Rapid reprogramming terminal 20 will display the error code and wait for an operator response. On receiving the response from the operator, rapid reprogramming terminal 20 will restart the load of the bus controller 55 being reprogrammed.

The retry status code indicates that an error has occurred in the last message sequence transaction and a repeat of the sequence is desired. Rapid reprogramming terminal 20 will display the error code and wait for an operator response. On receiving the response from the operator, rapid reprogramming terminal 20 will repeat the last transaction.

The automatic retry status code indicates that an error has occurred in the last message sequence transaction. After three consecutive retries, rapid reprogramming terminal 20 will display the error code and wait for an operator response. However, if the retry is successful before reception of the third consecutive error, an error message will not be displayed and operation will continue as normal. On receiving the response from the operator, rapid reprogramming terminal 20 will abort the load of the bus controller 55 being reprogrammed and continue with the load of the next bus controller or remote terminal to be reprogrammed.

Referring to FIG. 11J, if an RRT error message occurs, the rapid reprogramming terminal 20 sets the busy bit in the status response word for all messages and may suppress transmission of any data words. The bus controller 55 will then poll rapid reprogramming terminal 20 with activity messages. When rapid reprogramming terminal 20 is ready for the bus controller 55 to command the RRT error message, it will clear the busy bit, set the service request bit in the status response to the activity message and transmit the data word requesting that the bus controller 55 command the RRT error message.

Data word one, bit 2 is an abort which is set to a logic one by rapid reprogramming terminal 20 to notify the bus controller 55 that the load or verify has been aborted and no further retries will be made.

Bit 1 is a complete restart which is set to a logic one by rapid reprogramming terminal 20 to notify the bus controller 55 that an unrecoverable error has occurred and all memory data load or memory data verify transactions will be restarted. Bit 0 is the transaction bit which is set to a logic one by rapid reprogramming terminal 20 to notify the bus controller 55 that there was an error detected in the last header, memory data, trailer or header, trailer transaction and that the transaction will be repeated. The remaining bits (bits 3–15) of the data word are a logic zero.

Figure 12:
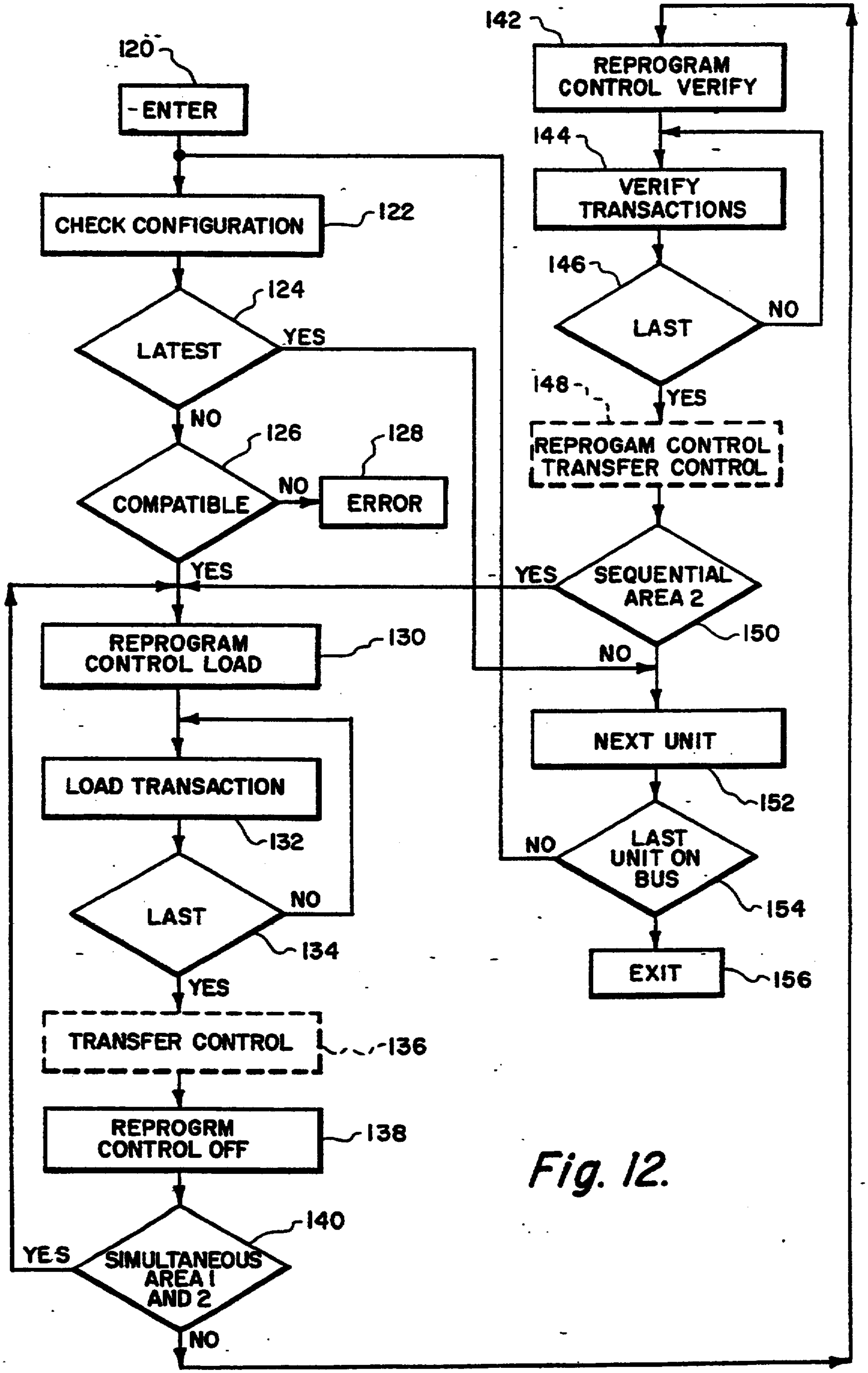
FIG. 12 is a flow chart illustrating the PROTOC.C module of the rapid reprogramming terminal software.

Referring now to FIG. 12, the operation of rapid reprogramming terminal 20 functioning as a remote terminal when reprogramming a bus controller 55 which does not revert to a remote terminal during reprogramming will now be discussed.

When the lookup table for the bus controller indicates that the bus controller 55 supports memory configuration as identified by the bus controller's software, rapid reprogramming terminal 20 request a memory configuration message, FIG. 11C, from the bus controller 53 being programmed. The memory configuration message describes the current memory contents for one or two memory areas of the bus controller 55 being reprogrammed. Rapid reprogramming terminal 20 compares the received memory configuration to the current memory configuration for the bus controller 55 stored in IC memory card 22 (program step 122). In automatic mode, if the bus controller 55 already contains the current memory configuration, rapid reprogramming terminal 20 continues on to the next remote terminal 53 or bus controller 55 to be processed (program step 152). If the memory configuration message is not usable, rapid reprogramming terminal 20 will assume that the bus controller 55 requires reprogramming. In manual mode, rapid reprogramming terminal 20 will display the memory configuration data and continue reprogramming for the selected bus controller 55.

If the bus controller 55 requires reprogramming of either or both memory areas, rapid reprogramming terminal 20 checks the old and new memory configurations to determine if the information in the IC memory card 22 is compatible with updating the old memory (program step 126) and will use a patch file if it exists. If a patch file does not exist or is not usable, rapid reprogramming terminal 20 checks to see if a complete file exists and checks to determine if this file will result in a newer revision level for the memory configuration. If the configuration message is not usable, no patch file should exist and rapid reprogramming terminal 20 uses the complete file for reprogramming the bus controller 55. Rapid reprogramming terminal 20 will declare an error if the IC memory card 22 information is insufficient (program step 128). If the IC memory card 22 information is correct for reprogramming, rapid reprogramming terminal 20 sends a load message, FIG. 11(D), to enable the reprogramming function for either or both memory areas and depending upon bus controller requirements memory areas one and two will be enabled simultaneously or sequentially (program step 130). The bus controller 55 will next check the validity of the message utilizing internally stored information and the reprogram enable discretes if required.

Once the reprogramming mode is entered (program step 132 and 134), rapid reprogramming terminal 20 proceeds to load the new memory contents in blocks of varying size depending on the bus controller 55 and update requirements. There will be no specific erasure commands from rapid reprogramming terminal 20. The bus controller 55 being reprogrammed is responsible for erasure based on the directed write information. The reprogramming of a bus controller 55 is conducted by a series of one or more header message (FIG. 11E), memory data load message (FIG. 11F), trailer message (FIG. 11H) transactions. If required, a header message, trailer message transaction will also be provided for paging or transfer of control functions. If the bus controller 55 being reprogrammed is required to keep track of how many times a particular memory area has been reprogrammed, the bus controller 55 being reprogrammed shall declare an abort error (bits 0–13 of the data word of the reprogram status message of FIG. 11I) if the predetermined memory write capability of the bus controller 55 has been exceeded. The storage of this information within the bus controller's memory shall not affect the validity of a memory verify procedure that is the bus controller 55 being reprogrammed shall mask out this information during a verify operation.

After completion of the load (program step 134), rapid reprogramming terminal 20 will, if required, then provide transfer of control information to the bus controller 55 using a header message, trailer message transaction (program step 136). Transfer of control prior to a verify via the control code bits (bits 0–7) of the data word four of FIG. 11I is not permitted. The transfer of control prior to a verify is not used to transfer control to a memory area of bus controller 55 that has been loaded but not verified. If it is necessary to transfer control prior to the completion of a memory area load/verify, the two parts of the memory area are loaded/verified separately using the same technique as for sequentially loading memory areas 1 and 2. The transfer of control via the header message of FIG. 11E may be inhibited during the load.

After all required data for a particular memory area have been transferred rapid reprogramming terminal 20 will, via bit 4 or 5 of data word four of FIG. 11D disable the reprogramming function for that memory area.

When simultaneous reprogramming of memory areas one and two of a bus controller 55 is utilized (program step 140), rapid reprogramming terminal loads the second memory area prior to the verify operation. When sequential memory area reprogramming or single memory area reprogramming is utilized, rapid reprogramming terminal 20 will at this time verify (program steps 142–146) the previously loaded memory area one load prior to the memory area two load operation. Rapid reprogramming terminal 20 performs the memory verify utilizing the same message transactions that are used for the memory load except that the rapid reprogramming terminal 20 receives the data from the bus controller 55 being reprogrammed and compares the received data with data stored in IC memory card 22. The automatic verify after a load may be inhibited.

After completion of the verify (program step 146) rapid reprogramming terminal 20 will, if required, provide transfer of control information to the remote terminal 53 (program step 148) using either a header message, trailer message transaction or via the control code bits (bits 0–7) of the data word four of FIG. 11I. When sequential reprogramming of memory areas one and two is utilized, rapid reprogramming terminal 20 repeats the load/verify operations (program step 150) for the second memory area after reprogramming of the first memory area is complete.

Assuming there were no errors in reprogramming, rapid reprogramming terminal 20 will continue (program step 152) and reprogram the next remote terminal 53 or bus controller 55 on the 1553 multiplex data bus 42. If an error did occur, operator intervention is requested by a fault display. This concludes the discussion of protocol C of Military Standard 2217.

Figure 19R:
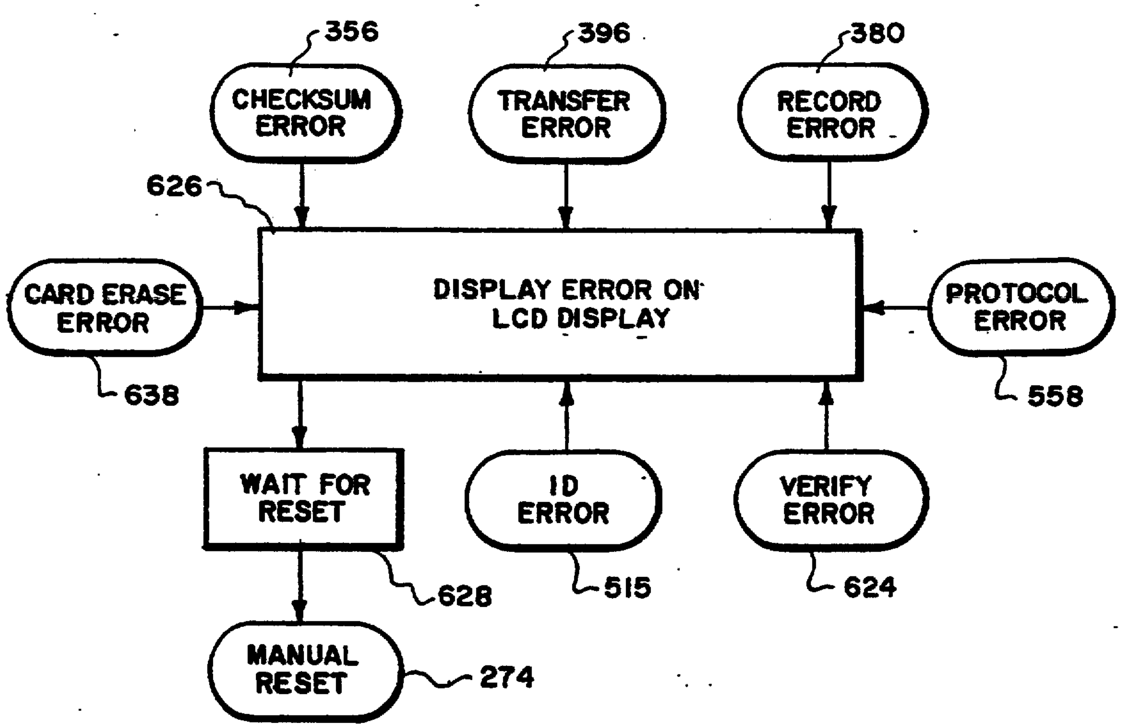
FIGS. 19A-19S is a flow chart for the rapid reprogramming terminal software.
Figure 19A:
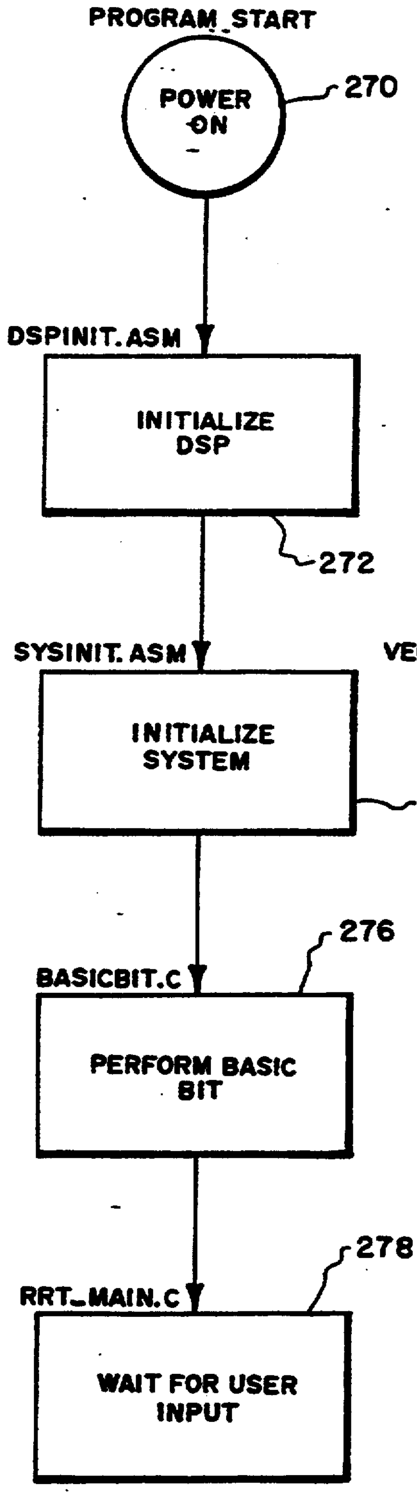
Figure 19B:
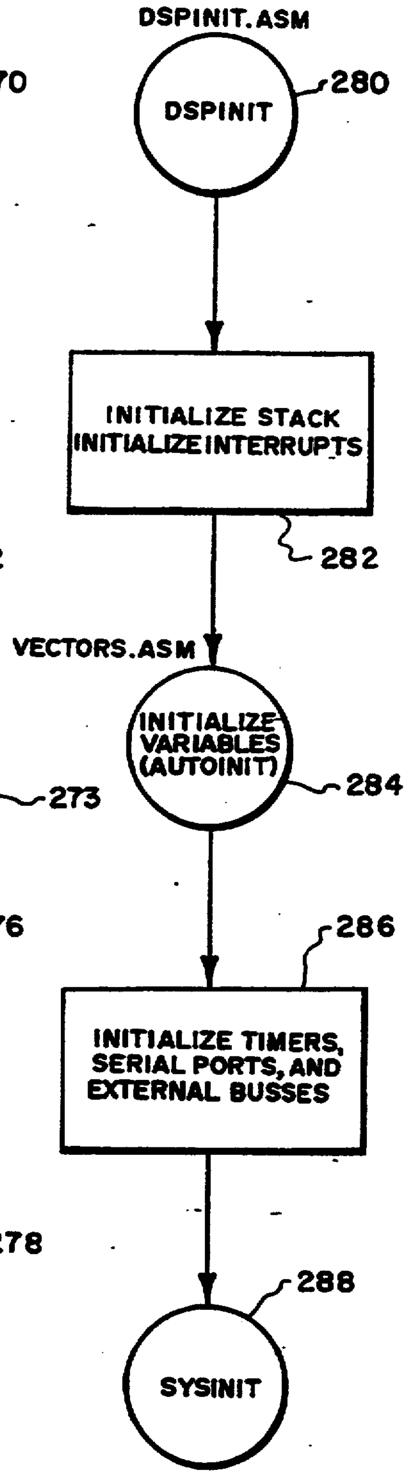
Figure 19C:
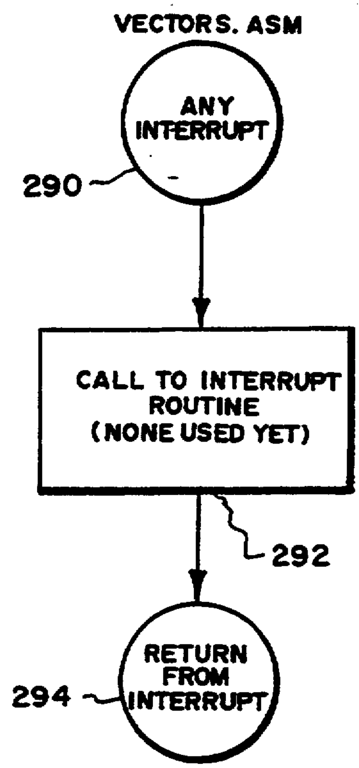
Figure 19D:
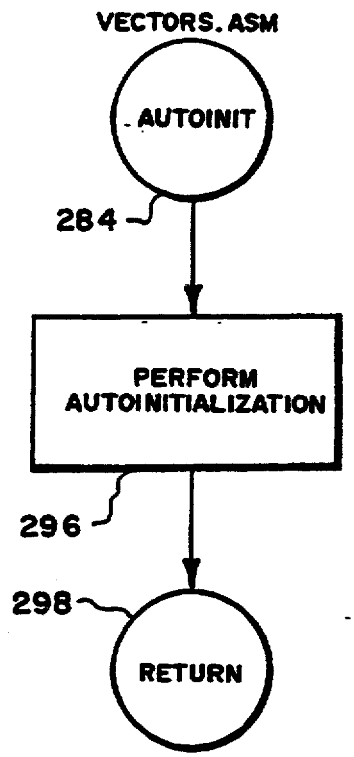
Figure 19E:
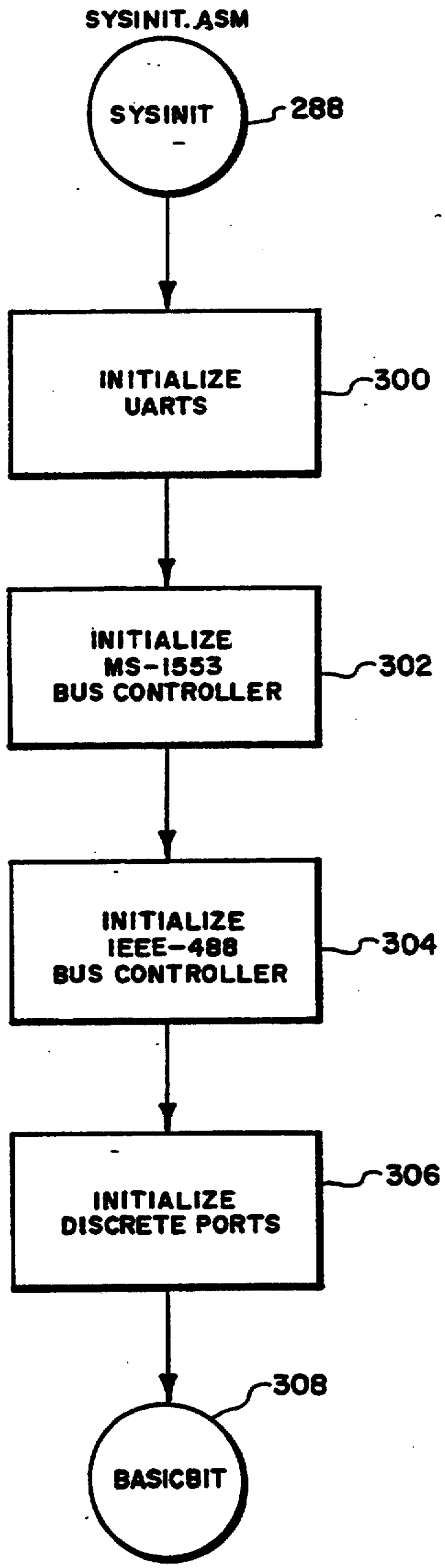
Figure 19F:
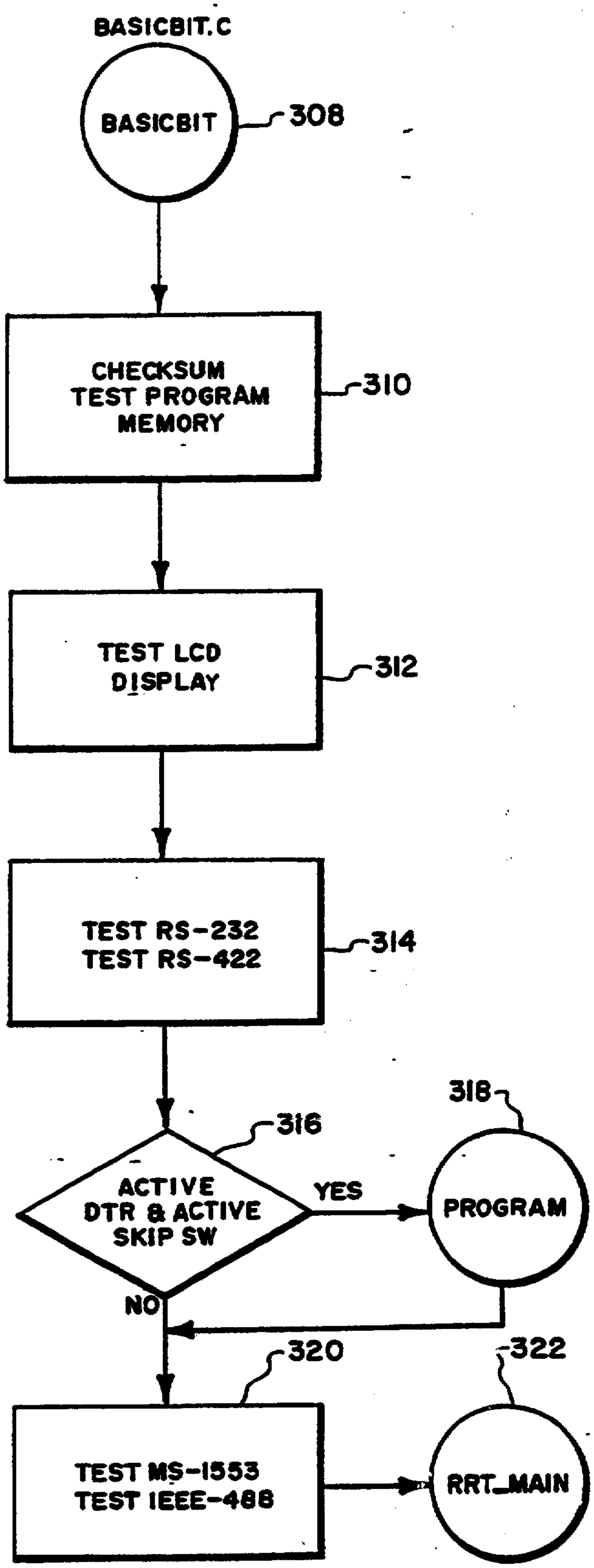
Figure 19G:
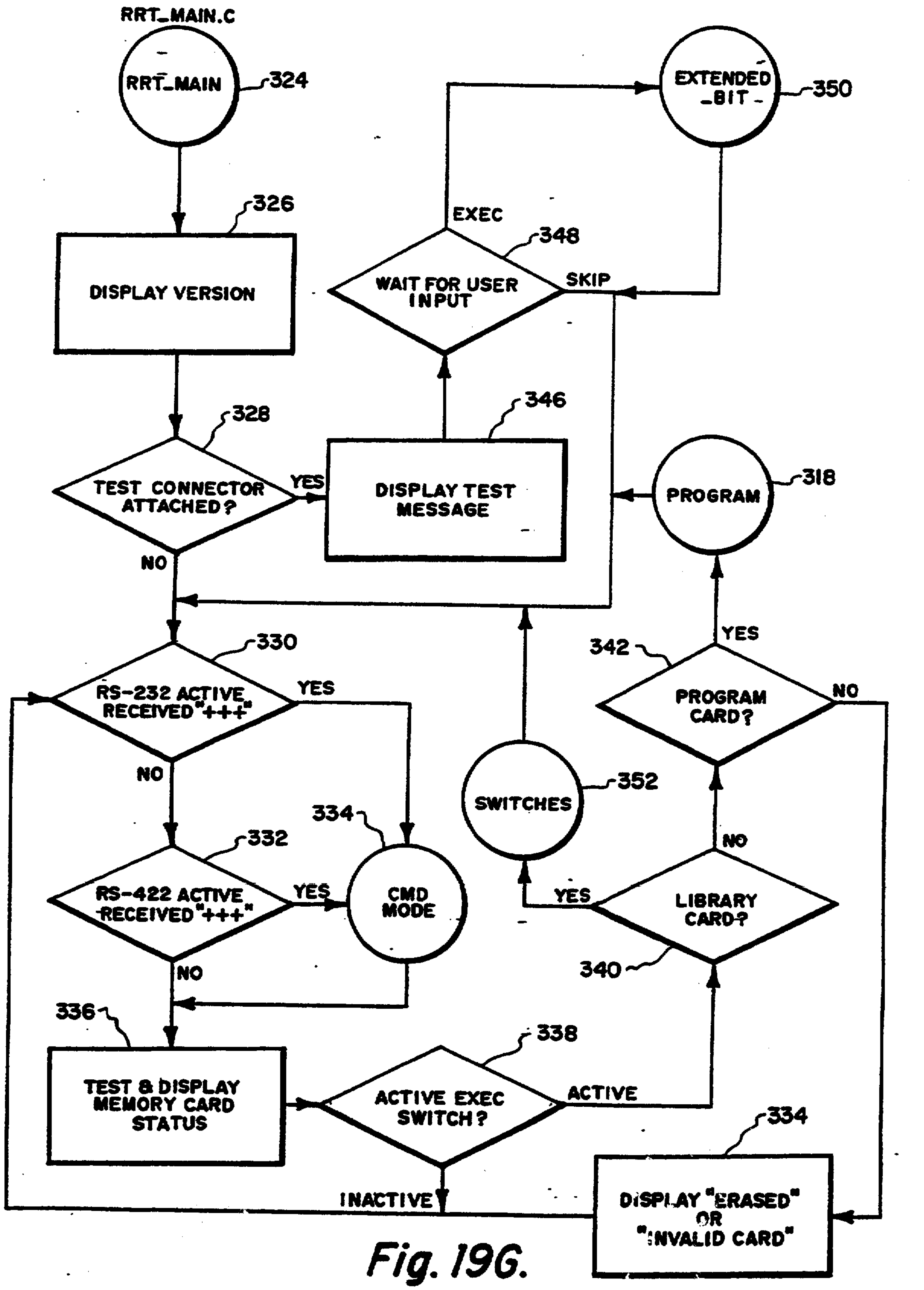
Figures 19H, 19I:
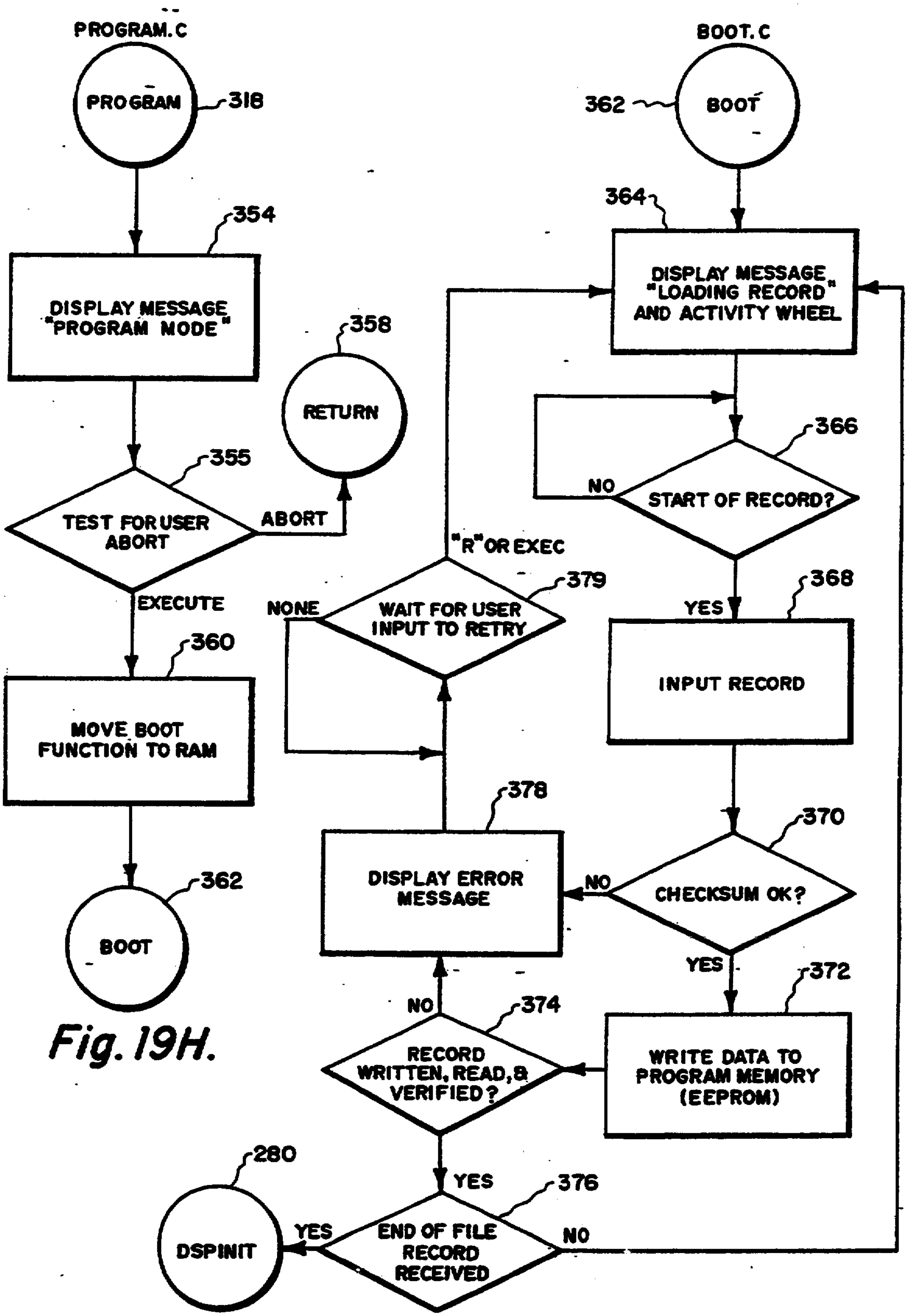
Figure 19J:
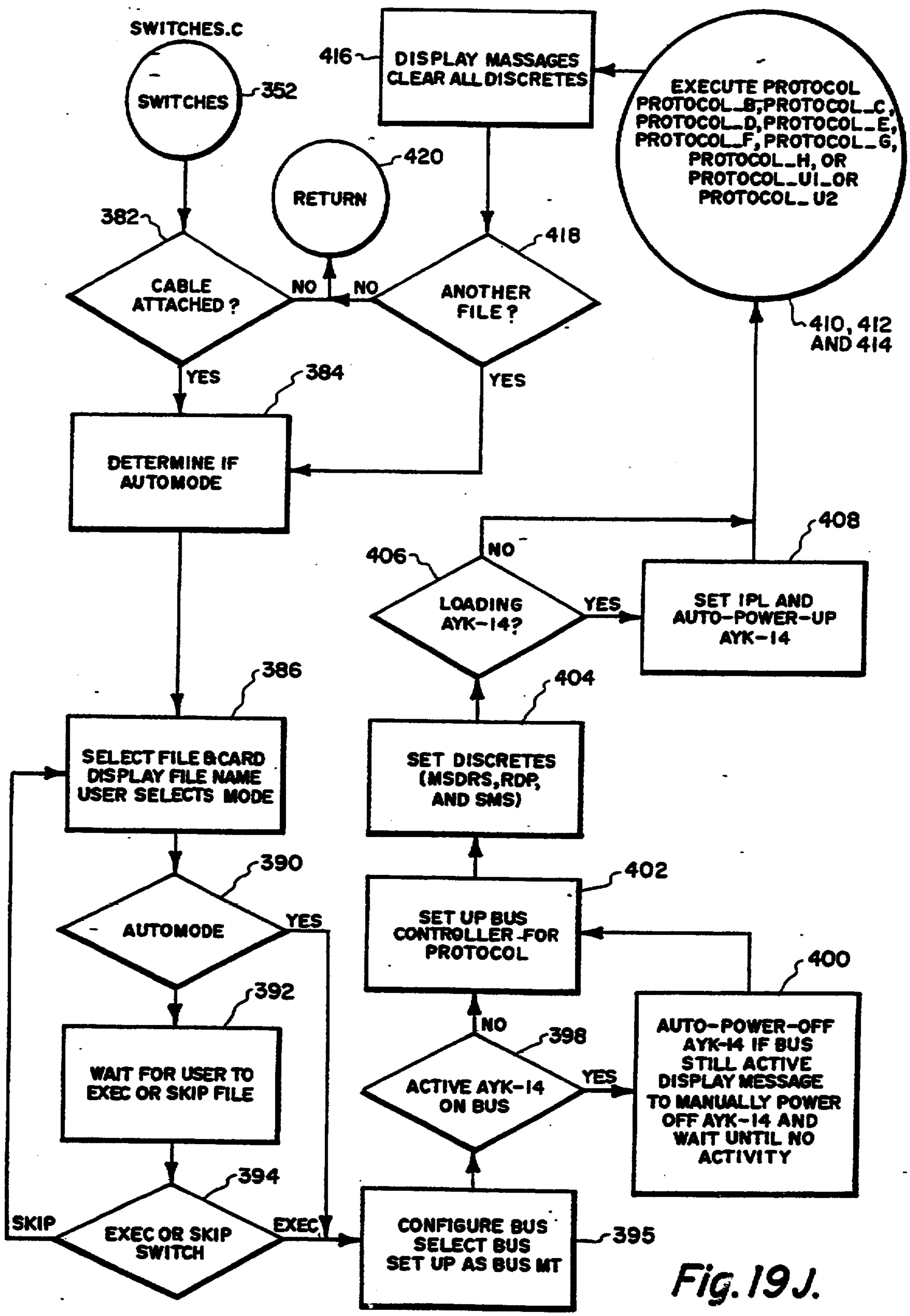
Figure 19K:
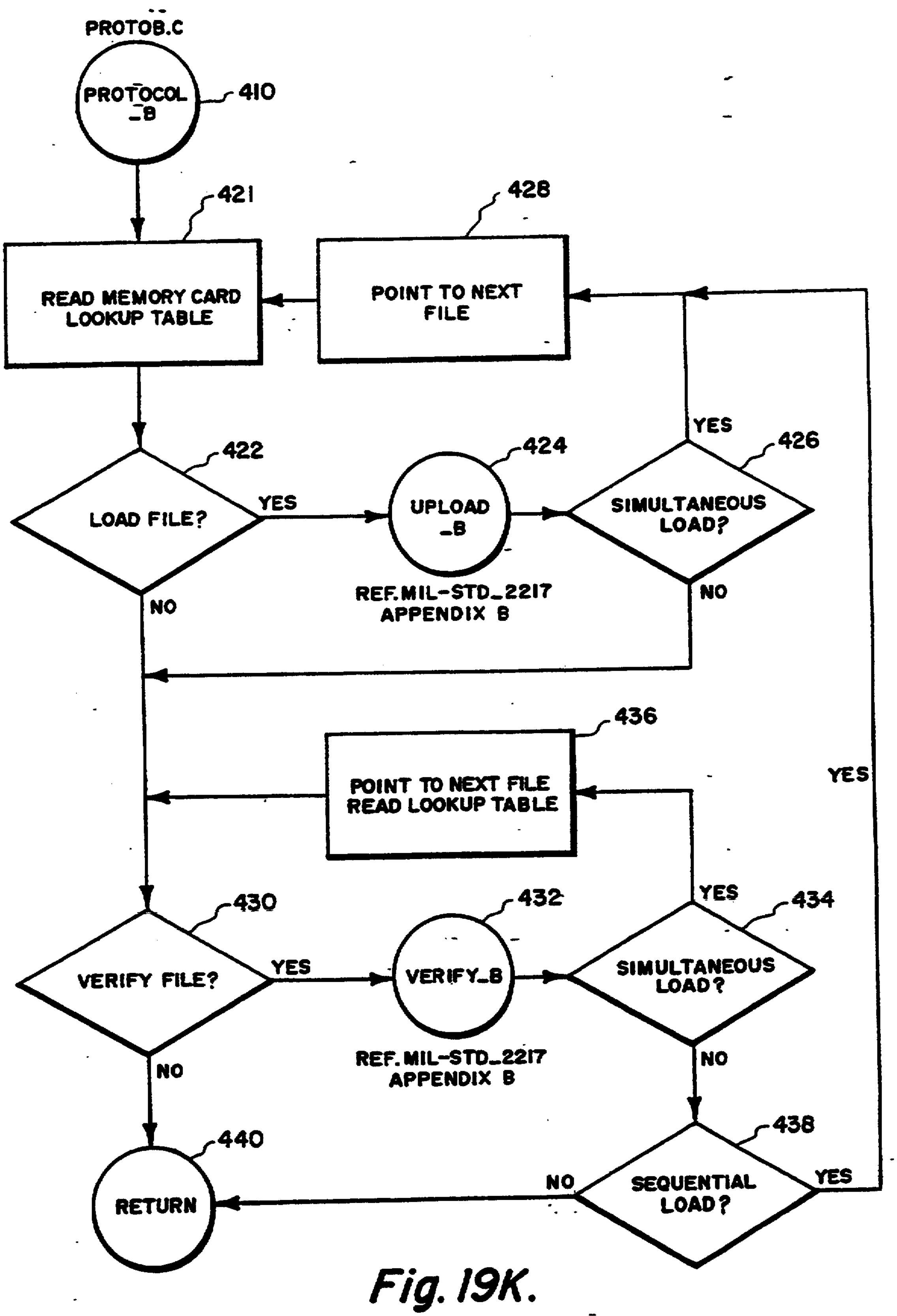
Figure 19L:
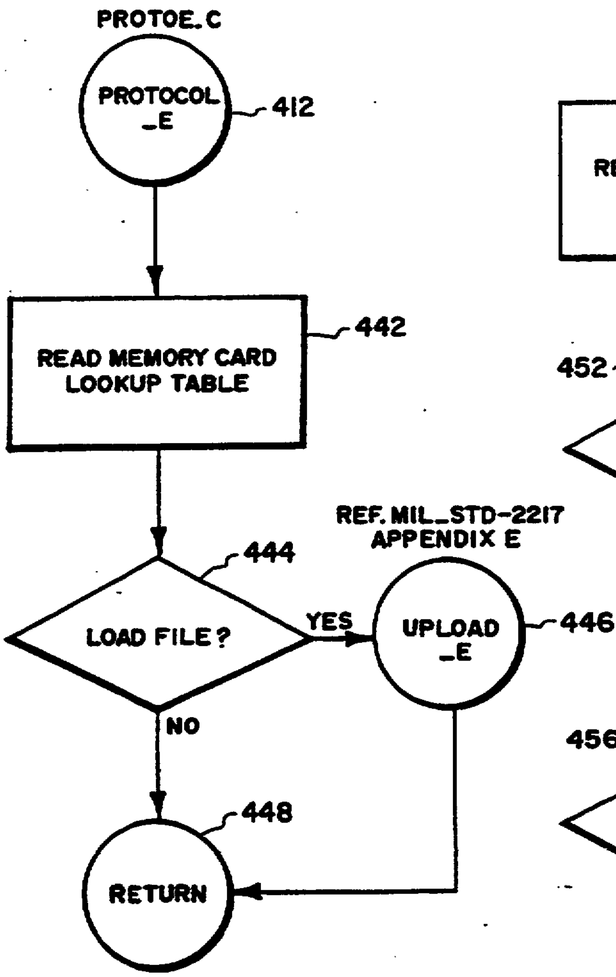
Figure 19M:
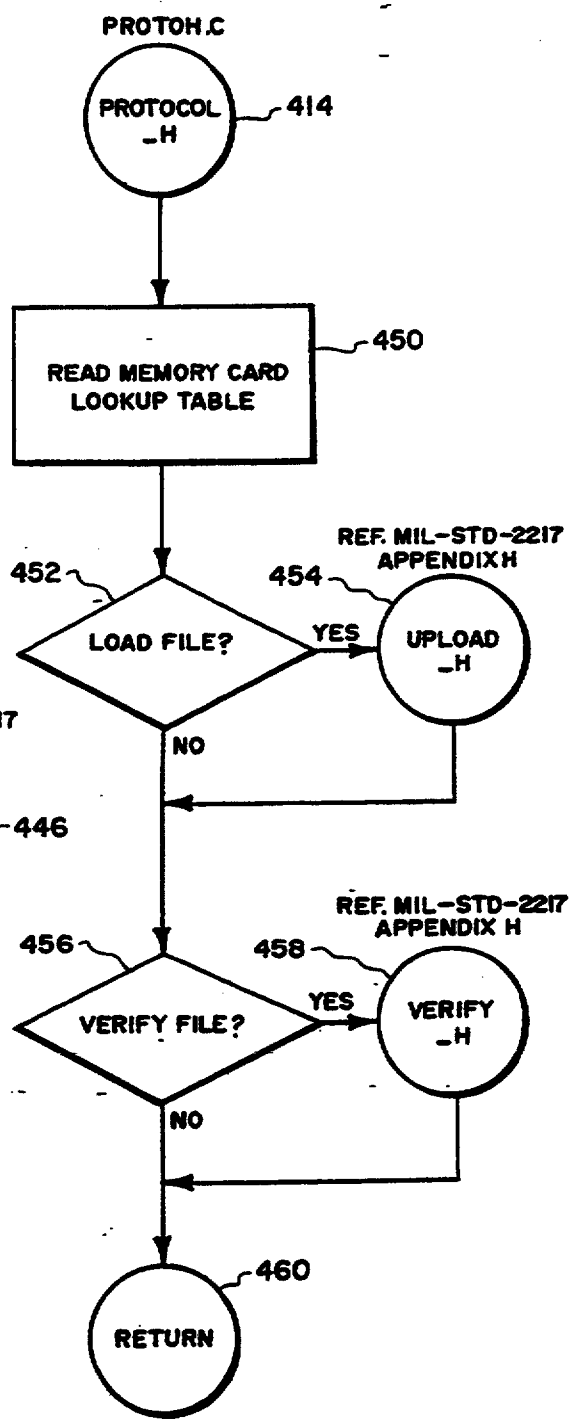
Figure 19N:
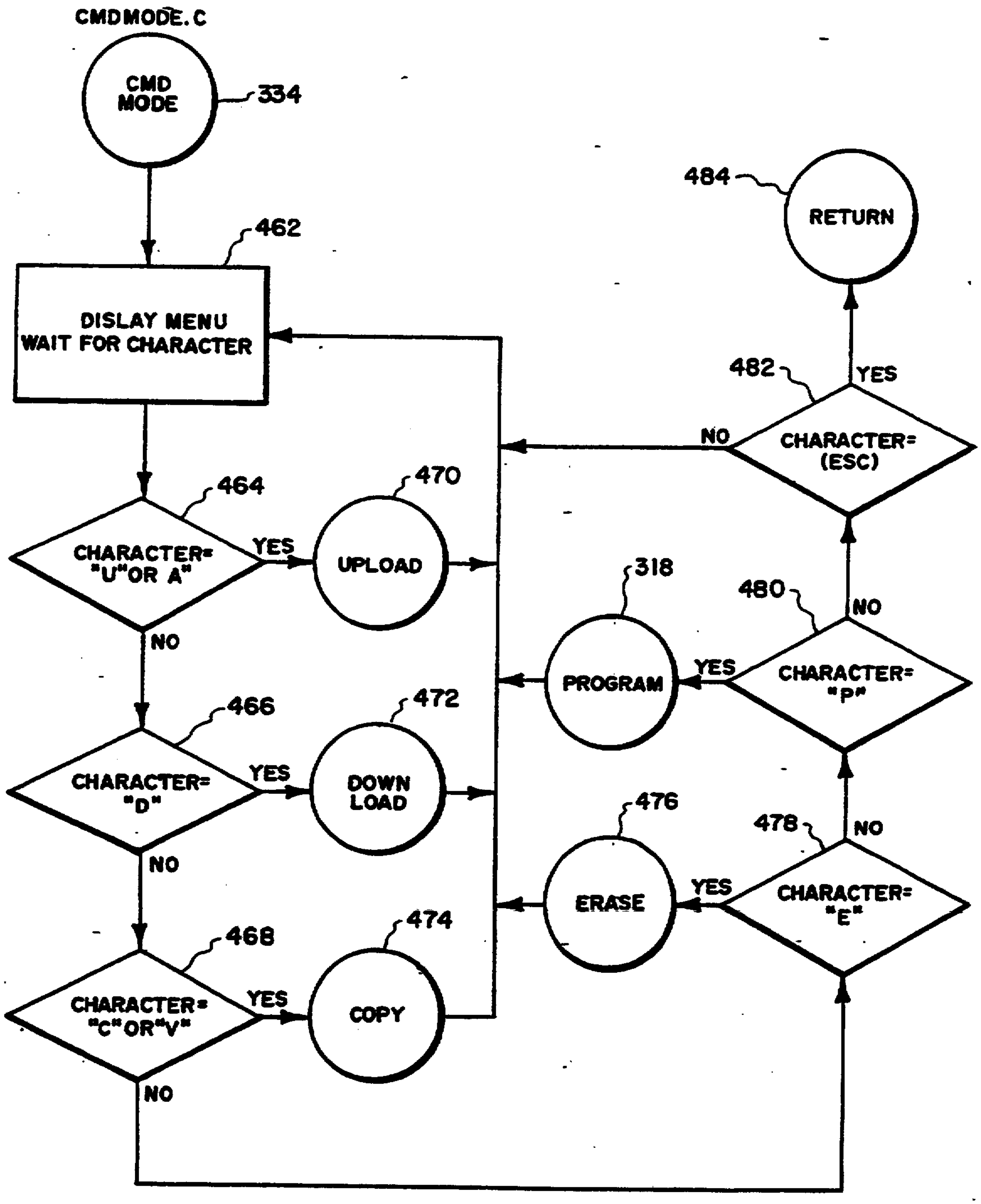
Figure 19:
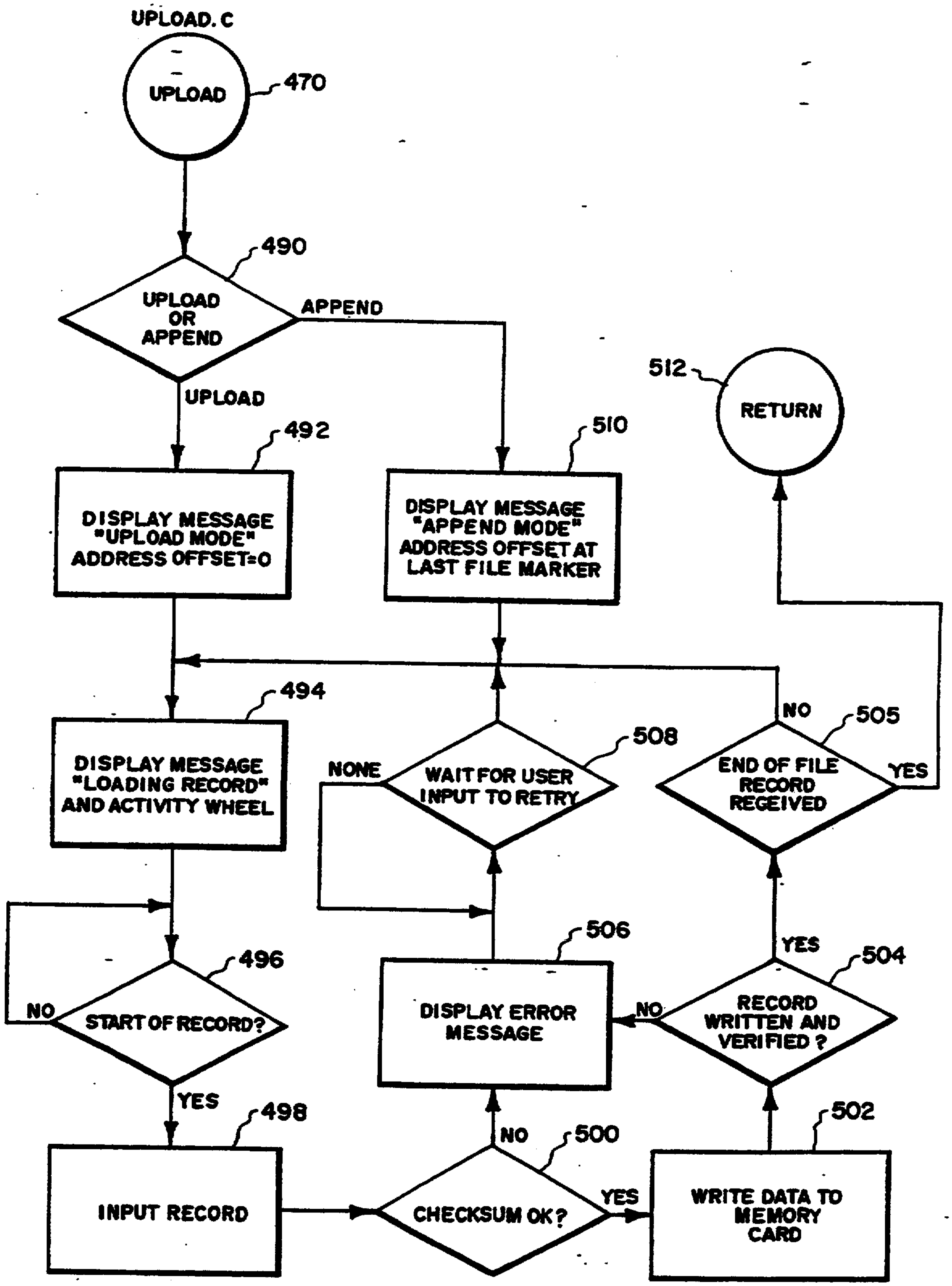
Figure 19P:
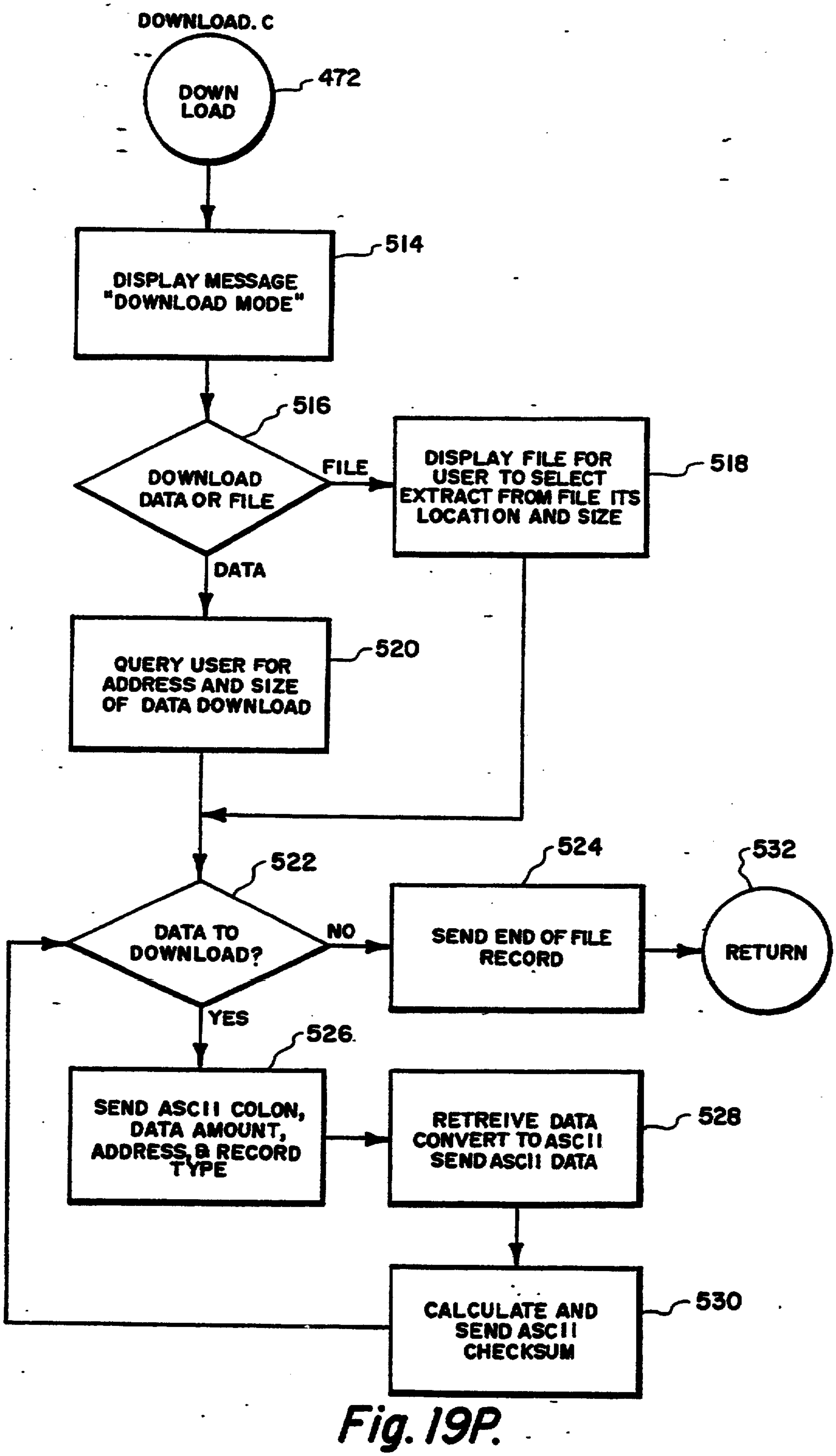
Figure 19Q:
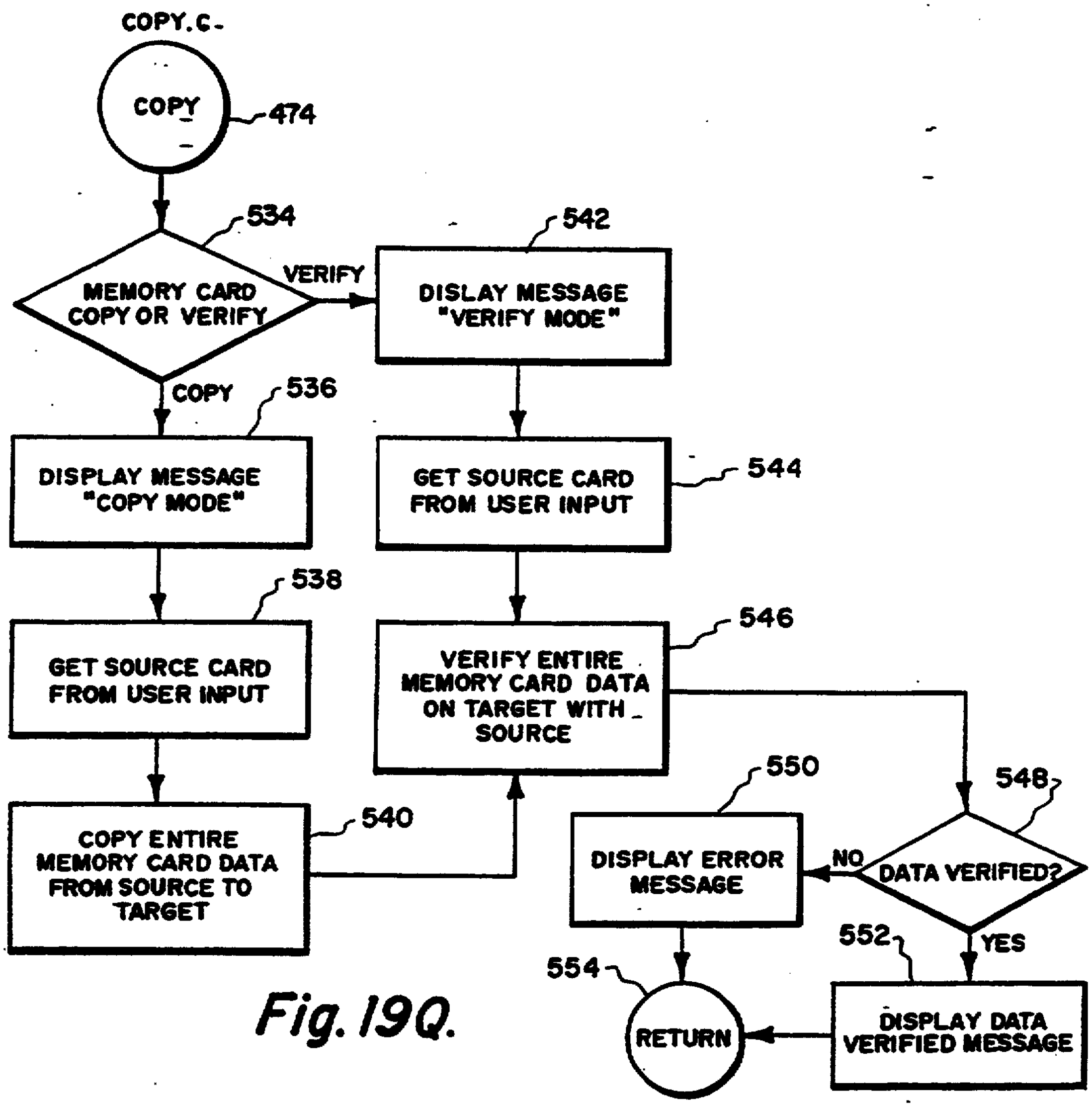
Figure 19S:
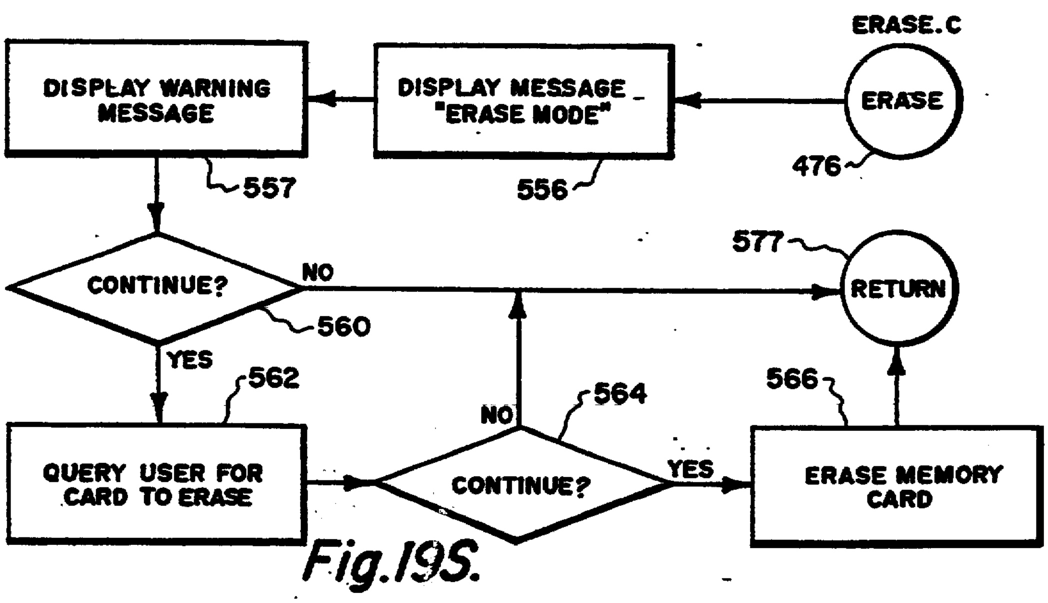

Referring to FIGS. 19A–19S there is shown a flow chart for the software used by rapid reprogramming terminal 20 to reprogram bus controllers 55 and remote terminals 53 connected to the 1553 multiplex data bus 42.

Referring to FIG. 19A power to rapid reprogramming terminal 20 is turned on by activating switch 44 (program step 270), the digital signal processor 21 of rapid reprogramming terminal 20 is initialized during program step 272 and the system is initialized during program step 273. A built in test of the rapid reprogramming terminal controller board is performed during program step 276. Program step 276 which comprises the basicbit.c code test liquid crystal display 57, UARTs 37 and 39, bus controller 41, interfaces 52, 54 and 56, EEPROM 23 which consists of EEPROMs 240, 241, 244 and 246 and the IEEE-488 interface bus controller 260. The program next waits for user input (program step 278).

Referring to FIGS. 19B, 19C and 19D, the digital signal processor stack and interrupts are initialized during program step 282, variables are initialized by entering the autoinit routine (program step 284) and the digital signal processor timers, serial ports and external busses are initialized during program step 286. The software of Appendix A next enters the sysinit.asm module. It should be noted that the preferred embodiment does not use interrupts.

Referring to FIG. 19E, UARTs 37 and 39 are initialized during program step 300 , bus controller 41 is initialized during program step 302, bus controller 260 is initialized during program step 304 and the parallel peripheral interface (PPI) ports PA0–PA7, PB0–PB7 and PC0–PC7 of programmable peripheral interfaces 52, 54 and 56 are initialized during program step 306. The software of Appendix A then enters the basicbit.c module.

Referring to FIG. 19F, a checksum test of program memory is performed during program step 310, the liquid crystal display 57 is tested during program step 312 and the RS-232 and RS-422 interfaces are tested during program step 314. During program step 316 a check is made to determine if there is an active data terminal 66 ready and switch 49 is activated to the SKIP position If the answer is "yes" the program.c module is entered which allows reprogramming of rapid reprogramming terminal 20. If the answer is "no" the software of Appendix A tests the MS-1553 interface and the IEEE-488 interface (program step 320). The software of Appendix A then enters the rrt_main.c module.

Referring to FIG. 19G, during program step 326 the current version of the software of Appendix A is displayed to the user. During program step 328, there is a test to determine if a test connector is attached to rapid reprogramming terminal. If a test connector is attached, a message is displayed to the user indicating that a test connector is attached to rapid reprogramming terminal 20 (program step 346). The user may either move switch 49 to the EXEC position or the SKIP position (program step 348). If the user moves switch 49 to the EXEC position the ext_bit.c module is entered and a self test of rapid reprogramming terminal 20 is initiated.

If the user moves switch 49 to the SKIP position rapid reprogramming terminal tests for a +++ via the RS-232 Bus (program step 330) or the RS-422 bus (program step 332). If the +++ is received by rapid reprogramming terminal 20, then software of Appendix A enters the cmdmode.c module. If rapid reprogramming terminal 20 does not receive a +++ memory cards zero and one of IC memory card 22 are tested (program step 336).

The software of Appendix A proceeds to program step 338 where is determined if switch 49 was moved to the EXEC position. If switch 49 was moved to the EXEC position a determination is made as to whether IC memory card 22 is a library card (program step 340) or program card (program step 342). If IC memory card 22 is a library card then the switches.c module is entered (program step 352). If IC memory card 22 is a program card then the program.c module is entered (program step 318). If however IC memory card 22 is neither a library card or a program card than an "erased" or "invalid card" message is provided to the user (program step 344).

Referring to FIGS. 19G, 19H and 19I if rapid reprogramming terminal 20 identifies IC memory card 22 as a program card (program step 342), the program.c module is entered (program step 318) and a "program mode" message is provided to the user (program step 354). If the user enters an abort ("N" or "Esc" from keyboard 62 or SKIP position from switch 49) the software exits the program.c module and returns to the module from which the program.c module was entered. If the user enters an execute ("Y" from keyboard 62 or EXEC position from switch 49) then the boot.c module is moved to the RAM of digital signal processor 21 (program step 362).

After the software of Appendix A enters the boot.c module, a message "loading record" is displayed to the user indicating that a record is being loaded. In addition an Activity Wheel is displayed to the user (program step 364). The boot.c module waits for a Intel Hex-32 format start of record provided via the RS-232 bus or the RS-422 bus or IC memory card 22 (program step 366). The record is next input into digital signal processor 21 (program step 368), followed by a checksum to verify the data in the record is correct (program step 370). If there is an error in the record an error message is displayed to the user (program step 378). If the record is correct, then the data is written in EEPROM 23, read to the digital signal processor 21 for verification and then verified by digital signal processor 21. An end of file record is then provided to digital program processor 21 resulting in the software of Appendix A entering the dspinit.asm module.

Referring to FIG. 19N, when rapid reprogramming terminal receives a +++, the software enters the cmdmode.c module (program step 334). A menu is then provided to the user on screen 69 a menu which provides to the user executable functions with respect to the manipulation of data in memory cards zero and one of IC memory card 22 (program step 462). When the user enters the characters "U" or "A", an upload (U) data to IC memory card 22 or an append (A) data to IC memory card 22 function is activated (program steps 464 and 470). When the user enters the character "D" a download (D) data from IC memory card 22 function is activated (program steps 466 and 472). When the user enters the characters "C" or "V", a copy (C) data from one memory card to another memory card of IC memory card 22 or a verify (V) the copied data function is activated (program steps 468 and 474). When the user enters the character "E", an erase (E) data from IC memory card 22 function is activated (program steps 478 and 476). Entering the character "P" returns the software of Appendix A to the program.c module. The character "Esc" allows the user to return to the rrt_main.c module.

Referring to FIG. 19J, when IC memory card 22 is a library card, indicating that a bus controller 55 or remote terminal 53 is to be reprogrammed, the software of Appendix A enters the switches.c module. During program step 382, the switches.c module determines if a cable is attached to rapid reprogramming terminal 20. If a cable is not attached then the software of Appendix A returns to the rrt_main.c module. If a cable is attached then a determination is made as to whether Automode may be entered. Automode allows the automatic sequencing and subsequent transfer of the loadable files on IC memory card 22 to the bus controller 55 or remote terminal 53 being reprogrammed (program step 384). During program step 386 a file and a memory card is selected, the file name is displayed for the user and the user then selects the mode of operation, that the user will select an upload, download or verify operation.

During program step 390, the automode flag is checked. If the automode flag is set then the software of Appendix A proceeds to program step 395. During program step 395 the 1553 multiplex data bus 42 is configured (e.g. short stub or long stub), the bus is selected (avionics or electronics warfare bus) and controller 41 is set as a bus monitoring terminal. If automode is not selected by the user, then the user will process or skip the file by using switch 49. When the user moves switch 49 to the EXEC position the software proceeds to program step 395. When the user moves the switch 49 to the SKIP position the file is not loaded and the software of Appendix A returns to program step 386 selecting the next file for processing.

During program step 398, a determination is made as to whether there is an AN/AYK-14 computer which is active on the selected bus. If, for example, the selected bus is the electronics warfare bus, the software proceeds to program step 402 setting up the AN/ALR-67 Radar Warning Receiver which is the bus controller on the electronic warfare bus. If, for example, the selected bus is avionics bus one on bus 42 and the AYK-14 computer on this bus is active the software proceeds to program step 400. The AYK-14 is next powered off (the PB0 output of interface 54 is set to the logic one state). If the bus is still active, a message is displayed to the user to manually power off the AYK-14 computer. This manual turn off of an AYK-14 is required in certain military aircraft.

During program step 402, rapid reprogramming terminal 20 sets up the bus controller 41 for the protocol to be loaded. During program step 404 discretes MSDRS, RDP and SMS are set. For example, the aircraft memory storage data recording system records all data transfers on the 1553 multiplex data bus 42. When loading a remote terminal 53 or a bus controller 55 it is not required to record the data being loaded. Thus the PB6 output of interface 56 is set to the logic zero state turning off the aircraft memory storage data recording system.

During program step 406, rapid reprogramming terminal 20 determines if an AYK-14 computer is being loaded. If an AYK-14 computer is being loaded then the initiate program load discrete is set active (PB4–PB7 outputs of interface) and the selected AYK-14 computer is powered on. It should be noted that some military aircraft require a manual turn on of the AYK-14 computer and the user is advised of this requirement.

During program step 410, 412 or 414 the software enters the protocol for reprogramming the selected remote terminal 53 or bus controller 55 on the 1553 multiplex data bus 42. After the protocol is executed, a message is displayed and the discretes are cleared (program step 416). Rapid reprogramming terminal 20 next test to determine if another file to be loaded (program step 418). If the answer is "no" the software of Appendix A returns to the rrt_main.c module. If the answer is "yes" then the switches.c module is repeated which loads another remote terminal 53 or bus controller 55 on the 1553 multiplex data bus 42.

Referring to FIG. 19K, there is shown the flow chart for the protob.c module which is used for reprogramming a remote terminal 53 when a bus controller reverts to a remote terminal. The program steps of the flow chart for the protoc.c module are identical to the program steps of the flow chart for the protob.c module and thus will not be discussed. Similarly, the program steps of the flow chart for the protod.c and protof.c modules are identical to the program steps of the flow chart for the protob.c module and thus will not be discussed.

The protob.c module is entered from the switches.c module (program step 410) to reprogram a remote terminal 53 on the 1553 multiplex data bus 42. Bus controller 41 was previously set up in control.c which was called by switches.c to function as a bus controller. Rapid reprogramming terminal first reads IC memory card 22 to determine whether an upload, download or verify operation is to be processed (program step 421). If an upload of data to the remote terminal 53 is required, the software of Appendix A proceeds to program step 424, performing an upload of data in the manner illustrated by FIG. 10. If a verify or download of data from the remote terminal is specified the software of Appendix A proceeds to program step 432, performing a verify or download of data.

If there is a simultaneous upload of data (program step 426) the software of Appendix A, the software of Appendix A will point to the next file to be loaded via the 1553 multiplex data bus 42, read IC memory card 22 and then load the file into the remote terminal 53 or bus controller 55 acting as a remote terminal being reprogrammed (program steps 428, 421, 422 and 424).

The software of Appendix A then proceeds to program step 430 to verify the file previously loaded. If there was a simultaneous load, the protob.c module software will verify consecutively each file that was loaded by rapid reprogramming terminal 20. If a file is loaded, followed by a verify then loading of the next file is sequential (program step 438).

When the last file has been loaded the software of rapid reprogramming terminal 20 exits the protob.c module via program step 440 returning to the switches.c module of Appendix A of FIG. 19J.

Referring to FIG. 19L, there is shown the flow chart for the protoe.c module which is used for reprogramming an AYK-14 computer when the AYK-14 computer is a bus controller. The protoe.c module allows for a loading of data, but does not provide for a verify operation. The AYK-14 computer performs the verification by examining the checksum provided by rapid reprogramming terminal 20 and if the checksum comparison is valid the AYK-14 computer assumes a correct load.

After entering the protoe.c module from the switches.c module (program step 412) rapid reprogramming terminal 20 reads the lookup table of IC memory card 22, loads the file and returns to the switches.c module (program steps 442-448). The program steps of the flow chart for the protog.c module are identical to the program steps of the flow chart for the protoe.c module and thus will not be discussed.

Referring to FIG. 19M, there is shown the flow chart for the protoh.c module which is used for reprogramming the High speed Anti-Radiation Missile (HARM) Command Launch Computer. After entering the protoh.c module from the switches.c module (program step 414), rapid reprogramming terminal 20 reads the lookup table of IC memory card 22, loads and then verifies the file and returns to the switches.c module (program steps 450-460).

Referring to FIG. 19O, the software of Appendix A enters the upload.c module from the cmdmode.c module (program step 470). During program step 490, a determination is made as to whether an "upload" or "append" is to be processed by rapid reprogramming terminal 20. If an "append" is being processed a message "Append Mode" is displayed to the user and an address offset is setup at the end of the last file (program step 510). If an "upload is being processed a message "Upload Mode" is displayed to the user and the address offset is set to zero since the load from the beginning of IC memory card 22.

During program step 494, a message "Loading Record" is displayed to the user as well as an activity wheel. Rapid reprogramming terminal 20 next looks for a start of record, that is a colon, inputs the record and verifies the checksum (program steps 496, 498 and 500). If the record has errors, an error message is displayed to the user and the user must then respond with an "R" entered via keyboard 62 (program steps 500, 506 and 508).

If the checksum is correct then rapid reprogramming terminal 20 writes the data into IC memory card 22, determines whether the record is written and verified and if the answer is "yes" proceeds to look for the end of file record (program steps 500, 502, 504 and 505). When rapid reprogramming terminal 20 receives the end of file record 505, the software of Appendix exits the upload.c module and returns to the cmdmode.c module (program step 512).

Referring to FIG. 19P, the software of Appendix A enters the download.c module from the cmdmode.c module (program step 472). During program step 514, a message "Download Mode" is displayed to the user. During program step 516, a determination is made as to whether a download of data or a download of a file is to be processed by rapid reprogramming terminal 20. The user then responds via keyboard 62 indicating whether rapid reprogramming terminal 20 is to download data or a file. If the user enters an "A" then the software of Appendix A proceeds to program step 520. During program step 520, the user is asked address and size of the data block that rapid reprogramming terminal 20 is to download. If the user enters an "F" then the software of Appendix A proceeds to program step 518 displaying a file name so that the user may select the file he wants to download. The location and size of the selected file is then extracted by the software of Appendix A.

Rapid reprogramming terminal 20 next sends to data terminal 66 an ASCII colon (start of record), the data amount, address and record type (program step 526). Rapid reprogramming terminal 20 then retrieves the data from IC memory card 22, converts the data to ASCII data and sends the data to data terminal 66 (program step 528). Rapid reprogramming terminal 20 next calculates and sends the ASCII checksum to data terminal 66 (program step 530). This is followed by the end of file record (program step 524) and a return to the cmdmode.c module (program step 532).

Referring to FIG. 19Q, the software of Appendix A enters the copy.c module from the cmdmode.c module (program step 474). During program step 474, rapid reprogramming terminal 20 determines if a memory card copy or verify is to be processed. A "C" entered by the user via keyboard 62 results in a copy of data from one memory card to the other memory card of IC memory card 22. A "V" entered by the user via keyboard 62 results in a verify.

If a copy is selected, then a message "Copy Mode" is displayed to the user (program step 536), the user specifies the source card of IC memory card 22 (program step 538) and the memory card data is copied from the source card to the target card of IC memory card 22 (program step 540).

If a verify is selected, then a message "Verify Mode" is displayed to the user (program step 542, the user specifies the source card of IC memory card 22 (program step 544) and the data on the target card is compared with the source card data (program step 546). If the data on the target card is verified as being identical to the data on the source card than the user will be provided with a data verified message (program step 548). If an error occurs then an error message is provided to the user (program step 550). The software of Appendix A next returns to the cmdmode.c module (program step 554).

Referring to FIG. 19S, the software of Appendix A enters the erase.c module from the cmdmode.c module (program step 476). During program step 556, a message "Erase Mode" is displayed to the user, followed by a warning message (program steps 556 and 557). If the user decides to continue after the warning message, the user is asked which card of IC memory card 22 is to be erased (program steps 560 and 562). During program step 564 the user is again ask whether he wants to continue. If the answer is yes the selected card is erased (program step 577). The software of Appendix A next returns to the cmdmode.c module (program step 577).

In the best mode presently contemplated for the present invention, the program listings for the software modules of Table III are attached hereto and set forth as Appendix A. The Appendix A program listings are written in the C program language, a common, very popular and often used programming language.

From the foregoing description, it may readily be seen that the subject invention comprises a new, unique and exceedingly useful terminal for reprogramming the avionics and electronic warfare systems aboard an aircraft which constitutes a considerable improvement over the known prior art. Obviously many modifications and variations of the present invention are possible in light of the above teachings. It is, therefore, to be understood that within the scope of the appended claims, that the invention may be practiced otherwise than as specifically described.

APPENDIX A

RAPID REPROGRAMMING TERMINAL PROGRAM LISTING

LINKER FILES

```
/***********************************************/
/****       Specify the input files       ****/
/***********************************************/

/***** Code Not Self Reprogrammed, Relocated To RAM For Execution *****/
boot.obj                /* "C" source, RRT reproram function */

/***** Code Not Self Reprogrammed, Used to Start Up RRT *****/
dspinit.obj             /* Assembly source, DSP initialization */
sysinit.obj             /* Assembly source, System initialization */
serialio.obj            /* "C" source, Serial I/O functions */
display.obj             /* "C" source, Display function */
program.obj             /* "C" source, RRT load boot function */
basicbit.obj            /* "C" source, RRT BASIC BIT function */

/***** Self Reprogrammable Code *****/
vectors.obj             /* Assembly source, Interrupts vectors */
rrt_main.obj            /* "C" source, RRT Main program */
ext_bit.obj             /* "C" source, Extended BIT program */
cmdmode.obj             /* "C" source, Command mode processor */
upload.obj              /* "C" source, Upload memory card function */
download.obj            /* "C" source, Download memory card function */
copy.obj                /* "C" source, Copy memory card function */
erase.obj               /* "C" source, Erase memory card function */
switches.obj            /* "C" source, Switch processing function */
control.obj             /* "C" source, Controller control functions */
initprot.obj            /* "C" source, Protocol initialization */
protob.obj              /* "C" source, Protocol B */
msgs_b.obj              /* "C" source, Standard Protocol B messages */
protoc.obj              /* "C" source, Protocol C */
msgs_c.obj              /* "C" source, Standard Protocol C messages */
protod.obj              /* "C" source, Protocol D */
msgs_d.obj              /* "C" source, Standard Protocol D messages */
protoe.obj              /* "C" source, Protocol E */
msgs_e.obj              /* "C" source, Standard Protocol E messages */
protof.obj              /* "C" source, Protocol F */
msgs_f.obj              /* "C" source, Standard Protocol F messages */
protog.obj              /* "C" source, Protocol G */
msgs_g.obj              /* "C" source, Standard Protocol G messages */
protoh.obj              /* "C" source, Protocol H */
msgs_h.obj              /* "C" source, Standard Protocol H messages */
protou1.obj             /* "C" source, Protocol U1 */
msgs_u1.obj             /* "C" source, Standard Protocol U1 messages */
protou2.obj             /* "C" source, Protocol U2 */
msgs_u2.obj             /* "C" source, Standard Protocol U2 messages */
memcard.obj             /* "C" source, Memory card driver function */
ms1553.obj              /* "C" source, MS-1553 drivers */
ieee488.obj             /* "C" source, IEEE-488 drivers */
interpts.obj            /* "C" source, Interrupt routines */
timer.obj               /* "C" source, Timer functions */
```

```
error.obj              /* "C" source, Error handler function */

       /**********************************************/
       /****      Specify Linker Options        ****/
       /**********************************************/

-o          rrt.out           /* Name of the output file */
-m          rrt.map           /* Create a load map */
-c                            /* Use ROM model */
-e          RRTINIT           /* Define the entry point */
-stack      0x100             /* Define length of stack */

       /**********************************************/
       /****   Specify the Memory Configuration   ****/
       /**********************************************/

/*
       8Megs of continous IC Memory Card are addressable as
       2 4Meg sections (CARD_PAGE_LOW and CARD_PAGE_HIGH).
       This was achieved by swaping A22 and A23.  The result
       was the following mapping:

            0400000h - 07FFFFFh ==> 0000000h - 03FFFFFh
            0C00000h - 0FFFFFFh ==> 0400000h - 07FFFFFh
*/

MEMORY
{
       DMA_REGS:        origin = 0808000h       length = 10h
       TIMER0_REGS:     origin = 0808020h       length = 10h
       TIMER1_REGS:     origin = 0808030h       length = 10h
       SERIAL0_REGS:    origin = 0808040h       length = 10h
       SERIAL1_REGS:    origin = 0808050h       length = 10h

       STACK_RAM:       origin = 0809800h       length = 100h
       PROGRAM_RAM:     origin = 0809900h       length = 600h
       BUFFER_RAM:      origin = 0809F00h       length = 80h
       BSS_RAM:         origin = 0809F80h       length = 80h

       VECTORS:         origin = 0000000h       length = 000040h

       BOOT_ROM:        origin = 00000C0h       length = 000600h
       BOOT_SUPPORT:    origin = 00006C0h       length = 000900h
       ROM:             origin = 0000FC0h       length = 00F040h

       CARD_PAGE_LOW:   origin = 0400000h       length = 400000h
       CARD_PAGE_HIGH:  origin = 0C00000h       length = 400000h

       RS232_REGS:      origin = 0804000h       length = 4h
       RS422_REGS:      origin = 0804200h       length = 4h
       MS1553_REGS:     origin = 0804400h       length = 20h
       GPIB_REGS:       origin = 0804600h       length = 10h
       PPI1_REGS:       origin = 0804800h       length = 4h
       PPI2_REGS:       origin = 0804A00h       length = 4h
       PPI3_REGS:       origin = 0804C00h       length = 4h
       MS1553_MEM:      origin = 0805000h       length = 1000h
}

       /**********************************************/
       /****     Specify the Output Sections      ****/
       /**********************************************/

SECTIONS
{
       int_vecs: > VECTORS               /* Link all interrupts into VECTORS */

       boot_rom:                         /* Link all boot code into BOOT_ROM */
       {
             _PROGRAM_RAM = .;
             boot.obj(.text)
             boot.obj(.const)
       } load = BOOT_ROM, run = PROGRAM_RAM

       pgmentry:                         /* Link all into BOOT_SUPPORT */
       {
             dspinit.obj(.text)
             sysinit.obj(.text)
             serialio.obj(.text)
             serialio.obj(.const)
             isplay.obj(.text)
             display.obj(.const)
             program.obj(.text)
```

```
        program.obj(.const)
        basicbit.obj(.text)
        basicbit.obj(.const)
    } > BOOT_SUPPORT

    .text:                          /* Link all .text sections into ROM */
    {
         _REPROGRAM = .;            /* Start of self reprogrammable code */
    } > ROM

    .const: > ROM                   /* Link all .const sections into ROM */

    .cinit: > ROM                   /* Link all .cinit sections into ROM */

    dma_regs: > DMA_REGS            /* Link all dma_regs into DMAREGS */

    t0_regs: > TIMER0_REGS          /* Link all t0_regs into T0REGS */

    t1_regs: > TIMER1_REGS          /* Link all t1_regs into T1REGS */

    s0_regs: > SERIAL0_REGS         /* Link all s0_regs into S0REGS */

    s1_regs: > SERIAL1_REGS         /* Link all s1_regs into S1REGS */

    pgm_ram: > PROGRAM_RAM          /* Link all into PROGRAM_RAM */

    buffer_ram:                     /* Link all into BUFFER_RAM */
    {
         _BUFFER_RAM = .;           /* Start of global buffer */
    } > BUFFER_RAM

    .bss:                           /* Link all remaining .bss sections */
    {

    } > BSS_RAM

    .stack:                         /* Link from here on to DSP stack */
    {
    } load = STACK_RAM, type = NOLOAD

    pagelow: > CARD_PAGE_LOW        /* Link into CARD_PAGE_LOW(4Meg RAM) */

    pagehigh: > CARD_PAGE_HIGH      /* Link into CARD_PAGE_HIGH(4Meg RAM)*/

    uart1regs: > RS232_REGS         /* Link all into RS-232 Registers */

    uart2regs: > RS422_REGS         /* Link all into RS-422 Registers */

    ms1553regs: > MS1553_REGS       /* Link all into MS-1553 Registers */

    gpibregs: > GPIB_REGS           /* Link all into GPIB (IEEE-488) */

    ppi1regs: > PPI1_REGS           /* Link all into PPI1 Registers */

    ppi2regs: > PPI2_REGS           /* Link all into PPI2 Registers */

    ppi3regs: > PPI3_REGS           /* Link all into PPI3 Registers */

    ms1553mem: > MS1553_MEM         /* Link all into MS-1553 Memory */
}

    /**********************************************/
    /****          End of Command File        ****/
    /**********************************************/

*****************************************************
TMS320C3x/4x COFF Linker        Version 4.50
*****************************************************
Thu Oct 14 13:22:33 1993

OUTPUT FILE NAME:   <rrt.out>
ENTRY POINT SYMBOL: "_c_int00"  address: 000006d4


MEMORY CONFIGURATION

          name      origin     length     attributes     fill
        --------  --------   ---------    ----------   --------
        VECTORS   00000000   000000040       RWIX
        BOOT_ROM  000000c0   000000600       RWIX
        BOOT_SUP  000006c0   000000900       RWIX
```

```
ROM         00000fc0    00000f040    RWIX
CARD_PAG    00400000    000400000    RWIX
RS232_RE    00804000    000000004    RWIX
RS422_RE    00804200    000000004    RWIX
MS1553_R    00804400    000000020    RWIX
GPIB_REG    00804600    000000010    RWIX
PPI1_REG    00804800    000000004    RWIX
PPI2_REG    00804a00    000000004    RWIX
PPI3_REG    00804c00    000000004    RWIX
MS1553_M    00805000    000001000    RWIX
DMA_REGS    00808000    000000010    RWIX
TIMER0_R    00808020    000000010    RWIX
TIMER1_R    00808030    000000010    RWIX
SERIAL0_    00808040    000000010    RWIX
SERIAL1_    00808050    000000010    RWIX
STACK_RA    00809800    000000100    RWIX
PROGRAM_    00809900    000000600    RWIX
BUFFER_R    00809f00    000000080    RWIX
BSS_RAM     00809f80    000000080    RWIX
CARD_PAG    00c00000    000400000    RWIX


SECTION ALLOCATION MAP

 output                                     attributes/
section    page    origin      length        input sections
--------   ----   ---------   ---------     ----------------
int_vecs    0     00000000    00000040
                   00000000    00000040      dspinit.obj (int_vecs)

boot_rom    0     000000c0    0000056a     RUN ADDR = 00809900
                   000000c0    00000442      boot.obj (.text)
                   00000502    00000128      boot.obj (.const)

pgmentry    0     000006c0    000008f2
                   000006c0    0000005d      dspinit.obj (.text)
                   0000071d    00000047      sysinit.obj (.text)
                   00000764    0000015a      serialio.obj (.text)
                   000008be    00000006      serialio.obj (.const)
                   000008c4    0000018d      display.obj (.text)
                   00000a51    00000003      display.obj (.const)
                   00000a54    00000095      program.obj (.text)
                   00000ae9    00000082      program.obj (.const)
                   00000b6b    00000381      basicbit.obj (.text)
                   00000eec    000000c6      basicbit.obj (.const)

.text       0     00000fc0    000065cd
                   00000fc0    0000002f      vectors.obj (.text)
                   00000fef    00000361      rrt_main.obj (.text)
                   00001350    00000b0f      ext_bit.obj (.text)
                   00001e5f    000000b6      cmdmode.obj (.text)
                   00001f15    0000032d      upload.obj (.text)
                   00002242    000003c0      download.obj (.text)
                   00002602    00000282      copy.obj (.text)
                   00002884    000000f7      erase.obj (.text)
                   0000297b    0000059d      switches.obj (.text)
                   00002f18    00000098      control.obj (.text)
                   00002fb0    00000176      initprot.obj (.text)
                   00003126    00000701      protob.obj (.text)
                   00003827    00000311      msgs_b.obj (.text)
                   00003b38    0000080a      protoc.obj (.text)
                   00004342    000001fe      msgs_c.obj (.text)
                   00004540    0000062c      protod.obj (.text)
                   00004b6c    00000142      msgs_d.obj (.text)
                   00004cae    00000264      protoe.obj (.text)
                   00004f12    000000a9      msgs_e.obj (.text)
                   00004fbb    0000054f      protof.obj (.text)
                   0000550a    00000122      msgs_f.obj (.text)
                   0000562c    00000264      protog.obj (.text)
                   00005890    0000009b      msgs_g.obj (.text)
                   0000592b    00000308      protoh.obj (.text)
                   00005c33    000000ea      msgs_h.obj (.text)
                   00005d1d    0000029e      protou1.obj (.text)
                   00005fbb    000000ac      msgs_u1.obj (.text)
                   00006067    000004c1      protou2.obj (.text)
                   00006528    00000127      msgs_u2.obj (.text)
                   0000664f    000002cf      memcard.obj (.text)
                   0000691e    000007ac      ms1553.obj (.text)
                   000070ca    00000007      ieee488.obj (.text)
                   000070d1    0000000e      interpts.obj (.text)
                   000070df    00000017      timer.obj (.text)
                   000070f6    00000497      error.obj (.text)
```

```
.const      0     0000758d  000018a9
                   0000758d  0000010d    rrt_main.obj (.const)
                   0000769a  0000023c    ext_bit.obj (.const)
                   000078d6  0000015b    cmdmode.obj (.const)
                   00007a31  0000014d    upload.obj (.const)
                   00007b7e  0000019d    download.obj (.const)
                   00007d1b  0000019f    copy.obj (.const)
                   00007eba  000000ed    erase.obj (.const)
                   00007fa7  0000012b    switches.obj (.const)
                   000080d2  00000008    initprot.obj (.const)
                   000080da  00000104    protob.obj (.const)
                   000081de  00000005    msgs_b.obj (.const)
                   000081e3  00000106    protoc.obj (.const)
                   000082e9  00000002    msgs_c.obj (.const)
                   000082eb  00000088    protod.obj (.const)
                   00008373  00000004    msgs_d.obj (.const)
                   00008377  0000004c    protoe.obj (.const)
                   000083c3  00000001    msgs_e.obj (.const)
                   000083c4  00000073    protof.obj (.const)
                   00008437  00000004    msgs_f.obj (.const)
                   0000843b  0000004c    protog.obj (.const)
                   00008487  00000059    protoh.obj (.const)
                   000084e0  00000003    msgs_h.obj (.const)
                   000084e3  00000063    protou1.obj (.const)
                   00008546  00000001    msgs_u1.obj (.const)
                   00008547  00000092    protou2.obj (.const)
                   000085d9  00000004    msgs_u2.obj (.const)
                   000085dd  00000078    memcard.obj (.const)
                   00008655  0000002d    ms1553.obj (.const)
                   00008682  000007b4    error.obj (.const)

.cinit      0     00008e36  0000000a
                   00008e36  00000003    serialio.obj (.cinit)
                   00008e39  00000006    basicbit.obj (.cinit)
                   00008e3f  00000001    --HOLE-- [fill = 00000000]

dma_regs    0     00808000  00000009    UNINITIALIZED
                   00808000  00000009    dspinit.obj (dma_regs)

t0_regs     0     00808020  00000009    UNINITIALIZED
                   00808020  00000009    dspinit.obj (t0_regs)

t1_regs     0     00808030  00000009    UNINITIALIZED
                   00808030  00000009    dspinit.obj (t1_regs)

s0_regs     0     00808040  0000000d    UNINITIALIZED
                   00808040  0000000d    dspinit.obj (s0_regs)

s1_regs     0     00808050  0000000d    UNINITIALIZED
                   00808050  0000000d    dspinit.obj (s1_regs)

pgm_ram     0     00809900  00000000    UNINITIALIZED

buffer_r    0     00809f00  00000000    UNINITIALIZED

.bss        0     00809f80  00000009    UNINITIALIZED
                   00809f80  00000000    boot.obj (.bss)
                   00809f80  00000000    error.obj (.bss)
                   00809f80  00000000    timer.obj (.bss)
                   00809f80  00000000    interpts.obj (.bss)
                   00809f80  00000000    ieee488.obj (.bss)
                   00809f80  00000000    ms1553.obj (.bss)
                   00809f80  00000000    msgs_u2.obj (.bss)
                   00809f80  00000000    protou2.obj (.bss)
                   00809f80  00000000    msgs_u1.obj (.bss)
                   00809f80  00000000    protou1.obj (.bss)
                   00809f80  00000000    msgs_h.obj (.bss)
                   00809f80  00000000    protoh.obj (.bss)
                   00809f80  00000000    msgs_g.obj (.bss)
                   00809f80  00000000    protog.obj (.bss)
                   00809f80  00000000    msgs_f.obj (.bss)
                   00809f80  00000000    protof.obj (.bss)
                   00809f80  00000000    msgs_e.obj (.bss)
                   00809f80  00000000    protoe.obj (.bss)
                   00809f80  00000000    msgs_d.obj (.bss)
                   00809f80  00000000    protod.obj (.bss)
                   00809f80  00000000    msgs_c.obj (.bss)
                   00809f80  00000000    protoc.obj (.bss)
                   00809f80  00000000    msgs_b.obj (.bss)
                   00809f80  00000000    protob.obj (.bss)
                   00809f80  00000000    initprot.obj (.bss)
                   00809f80  00000000    control.obj (.bss)
```

```
                00809f80    00000000      switches.obj (.bss)
                00809f80    00000000      erase.obj (.bss)
                00809f80    00000000      copy.obj (.bss)
                00809f80    00000000      download.obj (.bss)
                00809f80    00000000      upload.obj (.bss)
                00809f80    00000000      cmdmode.obj (.bss)
                00809f80    00000000      ext_bit.obj (.bss)
                00809f80    00000000      vectors.obj (.bss)
                00809f80    00000000      program.obj (.bss)
                00809f80    00000000      display.obj (.bss)
                00809f80    00000000      sysinit.obj (.bss)
                00809f80    00000000      dspinit.obj (.bss)
                00809f80    00000005      serialio.obj (.bss)
                00809f85    00000002      basicbit.obj (.bss)
                00809f87    00000001      rrt_main.obj (.bss)
                00809f88    00000001      memcard.obj (.bss)

.stack      0   00809800    00000100    NOLOAD SECTION
                00809800    00000000      dspinit.obj (.stack)

pagelow     0   00400000    00400000    UNINITIALIZED
                00400000    00400000      sysinit.obj (pagelow)

pagehigh    0   00c00000    00400000    UNINITIALIZED
                00c00000    00400000      sysinit.obj (pagehigh)

uart1reg    0   00804000    00000004    UNINITIALIZED
                00804000    00000004      sysinit.obj (uart1reg)

uart2reg    0   00804200    00000004    UNINITIALIZED
                00804200    00000004      sysinit.obj (uart2reg)

ms1553re    0   00804400    00000020    UNINITIALIZED
                00804400    00000020      sysinit.obj (ms1553re)

gpibregs    0   00804600    00000008    UNINITIALIZED
                00804600    00000008      sysinit.obj (gpibregs)

ppi1regs    0   00804800    00000004    UNINITIALIZED
                00804800    00000004      sysinit.obj (ppi1regs)

ppi2regs    0   00804a00    00000004    UNINITIALIZED
                00804a00    00000004      sysinit.obj (ppi2regs)

ppi3regs    0   00804c00    00000004    UNINITIALIZED
                00804c00    00000004      sysinit.obj (ppi3regs)

ms1553me    0   00805000    00001000    UNINITIALIZED
                00805000    00001000      sysinit.obj (ms1553me)

.data       0   00000000    00000000    UNINITIALIZED
                00000000    00000000      boot.obj (.data)
                00000000    00000000      error.obj (.data)
                00000000    00000000      timer.obj (.data)
                00000000    00000000      interpts.obj (.data)
                00000000    00000000      ieee488.obj (.data)
                00000000    00000000      ms1553.obj (.data)
                00000000    00000000      memcard.obj (.data)
                00000000    00000000      msgs_u2.obj (.data)
                00000000    00000000      protou2.obj (.data)
                00000000    00000000      msgs_u1.obj (.data)
                00000000    00000000      protou1.obj (.data)
                00000000    00000000      msgs_h.obj (.data)
                00000000    00000000      protoh.obj (.data)
                00000000    00000000      msgs_g.obj (.data)
                00000000    00000000      protog.obj (.data)
                00000000    00000000      msgs_f.obj (.data)
                00000000    00000000      protof.obj (.data)
                00000000    00000000      msgs_e.obj (.data)
                00000000    00000000      protoe.obj (.data)
                00000000    00000000      msgs_d.obj (.data)
                00000000    00000000      protod.obj (.data)
                00000000    00000000      msgs_c.obj (.data)
                00000000    00000000      protoc.obj (.data)
                00000000    00000000      msgs_b.obj (.data)
                00000000    00000000      protob.obj (.data)
                00000000    00000000      initprot.obj (.data)
                00000000    00000000      control.obj (.data)
                00000000    00000000      switches.obj (.data)
                00000000    00000000      erase.obj (.data)
                00000000    00000000      copy.obj (.data)
                00000000    00000000      download.obj (.data)
```

```
00000000    00000000    upload.obj (.data)
00000000    00000000    cmdmode.obj (.data)
00000000    00000000    ext_bit.obj (.data)
00000000    00000000    rrt_main.obj (.data)
00000000    00000000    vectors.obj (.data)
00000000    00000000    basicbit.obj (.data)
00000000    00000000    program.obj (.data)
00000000    00000000    display.obj (.data)
00000000    00000000    serialio.obj (.data)
00000000    00000000    sysinit.obj (.data)
00000000    00000000    dspinit.obj (.data)
```

GLOBAL SYMBOLS

```
address  name
-------- ----
00809f80 .bss
00000000 .data
00000fc0 .text
00000fdd AUTOINIT
0000000b DINT
00000fc1 DMA
00000001 INT0
00000002 INT1
00000003 INT2
00000004 INT3
00000fc3 ISR0
00000fc5 ISR1
00000fc7 ISR2
00000fc9 ISR3
00000fd1 RCV0
00000fd5 RCV1
00000006 RINT0
00000008 RINT1
0000071d SYSINIT
00000fcb TIME0
00000fcd TIME1
00000009 TINT0
0000000a TINT1
00000020 TRAP0
00000021 TRAP1
00000022 TRAP2
00000fd7 TRP0
00000fd9 TRP1
00000fdb TRP2
00000005 XINT0
00000007 XINT1
00000fcf XMT0
00000fd3 XMT1
000000c0 _BOOT_LOCATION
00809f00 _BUFFER_RAM
00000d20 _BasicSerialTest
00000bae _CalcChecksum
00001c39 _CardChecksumTest
00001cea _CardErased
00001bd1 _CardStatusTest
00000bc6 _ChecksumTest
00001a39 _DIS
00808000 _DMAREGS
00001a49 _DifferentialDiscretesTest
00804600 _GPIBREGS
00001528 _IEEE488test
000009a1 _LCD_display
000008c4 _LCD_initialize
00000c37 _LCDtest
00805000 _MS1553MEM
00804400 _MS1553REGS
00000d11 _MS1553test1
000015f7 _MS1553test2
00001e44 _Memcard1test
00001e51 _Memcard2test
00001d1b _Memcardtest
00809f88 _Memory_Card_ID
00c00000 _PAGEHIGH
00400000 _PAGELOW
000015c7 _PAVB
00804800 _PPI1
00804a00 _PPI2
00804c00 _PPI3
00809900 _PROGRAM_RAM
00000fc0 _REPROGRAM
```

```
address  name
-------- ----
00000000 _RESET
00000000 .data
00000000 edata
00000001 INT0
00000002 INT1
00000003 INT2
00000004 INT3
00000005 XINT0
00000006 RINT0
00000007 XINT1
00000008 RINT1
00000009 TINT0
0000000a TINT1
0000000b DINT
00000020 TRAP0
00000021 TRAP1
00000022 TRAP2
000000c0 _BOOT_LOCATION
00000100 __STACK_SIZE
000006d4 _c_int00
000006d4 _dspinit
0000071d SYSINIT
00000764 _serial_get_byte
00000783 _serial_get_nyble
000007b4 _serial_put_byte
000007ca _serial_put_nyble
000007e1 _serial_receive
0000086b _serial_data
00000888 _serial_send
000008a7 _serial_send_string
000008c4 _LCD_initialize
000009a1 _LCD_display
00000a54 _program
00000b6b _mem_cpy
00000b82 _str_cpy
00000b94 _str_cat
00000bae _CalcChecksum
00000bc6 _ChecksumTest
00000c37 _LCDtest
00000d11 _MS1553test1
00000d20 _BasicSerialTest
00000d8a _RS232test1
00000d9f _RS422test1
00000db4 _basicbit
00000fc0 .text
00000fc0 _REPROGRAM
00000fc1 DMA
00000fc3 ISR0
00000fc5 ISR1
00000fc7 ISR2
00000fc9 ISR3
00000fcb TIME0
00000fcd TIME1
00000fcf XMT0
00000fd1 RCV0
00000fd3 XMT1
00000fd5 RCV1
00000fd7 TRP0
00000fd9 TRP1
00000fdb TRP2
00000fdd AUTOINIT
00000fef _rrt_main
00001350 _ext_bit
000014e0 _WaitForSwitch
00001528 _IEEE488test
```

```
00000000 _RESET
00000d8a _RS232test1
000019f9 _RS232test2
00804000 _RS232
00000d9f _RS422test1
00001a19 _RS422test2
00804200 _RS422
000015df _SAVB
00001ae8 _SEDISC
00808040 _SERIAL0
00808050 _SERIAL1
00001900 _SerialTest
00001b06 _SingleDiscretesTest
00001797 _SwitchTest
00808020 _TIMER0
00808030 _TIMER1
000014e0 _WaitForSwitch
00000100 __STACK_SIZE
00003827 _activity_busy
0000385d _activity_message
00004518 _activity_response
00006806 _address_card_page
0000756b _ascii_conversion
00000db4 _basicbit
00809d1b _boot_address_card_page
00809c87 _boot_ascii_conversion
00809900 _boot
00809b4c _boot_error_display
00809ca0 _boot_get_byte
00809ced _boot_get_character
00809cca _boot_get_nyble
000006d4 _c_int00
00001df2 _card_test
000039f8 _command_message
00005cb3 _command_message_h
00001e5f _command_mode
00002f18 _convert_BC_to_RT
00002602 _copy
00004bab _d_command_message
00004be7 _d_header_message
00004c18 _d_memory_data_load_message
00004c4c _d_memory_data_verify_message
00004b6c _d_status_message
00004c7d _d_trailer_message
00005c33 _data_load_message
00809f85 _dbg
00809f86 _delays
000070d1 _dma_interrupt
00002242 _download
000006d4 _dspinit
00004f12 _e_command_response
00004f3f _e_header_response
00004f5d _e_memory_data_load_response
00004f9c _e_status_response
00004f7e _e_trailer_response
00809af4 _enable_eeprom_write
000038bf _enter_load_message
00004376 _enter_load_response
0000395f _enter_verify_message
0000445b _enter_verify_response
00002884 _erase
00007267 _error_display
000070f6 _error_serialio_display
00003931 _exit_load_message
0000441f _exit_load_response
000039b5 _exit_verify_message
000044b9 _exit_verify_response
00001350 _ext_bit
0000555d _f_command_message
00005587 _f_header_message
000055b1 _f_memory_data_load_message
000055db _f_memory_data_verify_message
0000550a _f_status_message
00005605 _f_trailer_message
00005890 _g_command_response
000058af _g_header_response
000058cd _g_memory_data_load_response
0000590c _g_status_response
000058ee _g_trailer_response
000038ef _header_message
000043b4 _header_response
000070ca _ieee488
000015c7 _PAVB
000015df _SAVB
000015f7 _MS1553test2
00001797 _SwitchTest
00001900 _SerialTest
000019f9 _RS232test2
00001a19 _RS422test2
00001a39 _DIS
00001a49 _DifferentialDiscretesTest
00001ae8 _SEDISC
00001b06 _SingleDiscretesTest
00001bd1 _CardStatusTest
00001c39 _CardChecksumTest
00001cea _CardErased
00001d1b _Memcardtest
00001df2 _card_test
00001e44 _Memcard1test
00001e51 _Memcard2test
00001e5f _command_mode
00001f15 _upload
00002242 _download
00002602 _copy
00002884 _erase
0000297b _switches
00002f18 _convert_BC_to_RT
00002f4c _quiet_BC
00002f80 _return_BC_to_BC
00002fb0 _init_protocol
00003023 _init_file
00003126 _protocol_b
0000344e _upload_b
0000361b _verify_b
00003827 _activity_busy
0000385d _activity_message
00003897 _memory_configuration_message
000038bf _enter_load_message
000038ef _header_message
00003904 _memory_data_load_message
0000391c _trailer_message
00003931 _exit_load_message
0000395f _enter_verify_message
0000398a _memory_data_verify_message
000039b5 _exit_verify_message
000039de _rrt_error_message
000039f8 _command_message
00003a69 _test_busy_status
00003aaf _service_message
00003af7 _reprogram_status_message
00003b38 _protocol_c
00003f21 _upload_c
00004110 _verify_c
00004342 _memory_configuration_response
00004376 _enter_load_response
000043b4 _header_response
000043d7 _memory_data_load_response
000043fc _trailer_response
0000441f _exit_load_response
0000445b _enter_verify_response
00004494 _memory_data_verify_response
000044b9 _exit_verify_response
000044f0 _rrt_error_response
00004518 _activity_response
00004540 _protocol_d
000047d3 _upload_d
00004994 _verify_d
00004b6c _d_status_message
00004bab _d_command_message
00004be7 _d_header_message
00004c18 _d_memory_data_load_message
00004c4c _d_memory_data_verify_message
00004c7d _d_trailer_message
00004cae _protocol_e
00004e07 _upload_e
00004f12 _e_command_response
00004f3f _e_header_response
00004f5d _e_memory_data_load_response
00004f7e _e_trailer_response
00004f9c _e_status_response
00004fbb _protocol_f
0000520c _upload_f
0000536b _verify_f
0000550a _f_status_message
```

```
00003023 _init_file
00002fb0 _init_protocol
000070d2 _isr0_interrupt
000070d3 _isr1_interrupt
000070d4 _isr2_interrupt
000070d5 _isr3_interrupt
00000b6b _mem_cpy
000068fb _memory_card_ID
000068d7 _memory_card_block
000066f8 _memory_card_erase
0000664f _memory_card_read
000068b3 _memory_card_size
00006833 _memory_card_status
00006662 _memory_card_write
00003897 _memory_configuration_message
00004342 _memory_configuration_response
00003904 _memory_data_load_message
000043d7 _memory_data_load_response
0000398a _memory_data_verify_message
00004494 _memory_data_verify_response
00006ee8 _ms1553_BC_setup
00007064 _ms1553_MT_setup
00006f57 _ms1553_RT_setup
0000709f _ms1553_change_bus_channel
00006ea9 _ms1553_monitor
000069be _ms1553_receive
00006a63 _ms1553_respond
0000691e _ms1553_send
000070df _msec_timer
00005c73 _prepare_verify_message
000064c6 _program_mode_u2
00000a54 _program
00003126 _protocol_b
00003b38 _protocol_c
00004540 _protocol_d
00004cae _protocol_e
00004fbb _protocol_f
0000562c _protocol_g
0000592b _protocol_h
00005d1d _protocol_u1
00006067 _protocol_u2
00002f4c _quiet_BC
000070d9 _rcv0_interrupt
000070db _rcv1_interrupt
00003af7 _reprogram_status_message
00002f80 _return_BC_to_BC
000039de _rrt_error_message
000044f0 _rrt_error_response
00000fef _rrt_main
00005c4b _send_status_message
00005c88 _send_verify_data_message
00809f81 _serial_buffer
0000086b _serial_data
00000764 _serial_get_byte
00000783 _serial_get_nyble
000007b4 _serial_put_byte
000007ca _serial_put_nyble
000007e1 _serial_receive
00809f80 _serial_response_time
000008a7 _serial_send_string
00000888 _serial_send
00003aaf _service_message
00809f87 _status_flags
00000b94 _str_cat
00000b82 _str_cpy
0000297b _switches
00003a69 _test_busy_status
000070d6 _time0_interrupt
000070d7 _time1_interrupt
0000391c _trailer_message
000043fc _trailer_response
000070dc _trp0_interrupt
000070dd _trp1_interrupt
000070de _trp2_interrupt
00005fe5 _u1_data_load_message
00005fbb _u1_mode_command
00006012 _u1_prepare_data_message
0000603c _u1_send_data_message
0000659c _u2_calculate_checksum
00006528 _u2_command_message
00006569 _u2_data_load_message
00006581 _u2_data_read_message
```

```
0000555d _f_command_message
00005587 _f_header_message
000055b1 _f_memory_data_load_message
000055db _f_memory_data_verify_message
00005605 _f_trailer_message
0000562c _protocol_g
00005785 _upload_g
00005890 _g_command_response
000058af _g_header_response
000058cd _g_memory_data_load_response
000058ee _g_trailer_response
0000590c _g_status_response
0000592b _protocol_h
000059a9 _upload_h
00005ada _verify_h
00005c33 _data_load_message
00005c4b _send_status_message
00005c73 _prepare_verify_message
00005c88 _send_verify_data_message
00005cb3 _command_message_h
00005d1d _protocol_u1
00005ddd _upload_u1
00005e62 _verify_u1
00005fbb _u1_mode_command
00005fe5 _u1_data_load_message
00006012 _u1_prepare_data_message
0000603c _u1_send_data_message
00006067 _protocol_u2
00006114 _upload_u2
00006248 _verify_u2
000064c6 _program_mode_u2
00006528 _u2_command_message
0000653d _u2_status_message
00006569 _u2_data_load_message
00006581 _u2_data_read_message
0000659c _u2_calculate_checksum
000065b1 _u2_send_checksum
000065c9 _u2_send_message
0000660d _u2_receive_message
0000664f _memory_card_read
00006662 _memory_card_write
000066f8 _memory_card_erase
00006806 _address_card_page
00006833 _memory_card_status
000068b3 _memory_card_size
000068d7 _memory_card_block
000068fb _memory_card_ID
0000691e _ms1553_send
000069be _ms1553_receive
00006a63 _ms1553_respond
00006ea9 _ms1553_monitor
00006ee8 _ms1553_BC_setup
00006f57 _ms1553_RT_setup
00007064 _ms1553_MT_setup
0000709f _ms1553_change_bus_channel
000070ca _ieee488
000070d1 _dma_interrupt
000070d2 _isr0_interrupt
000070d3 _isr1_interrupt
000070d4 _isr2_interrupt
000070d5 _isr3_interrupt
000070d6 _time0_interrupt
000070d7 _time1_interrupt
000070d8 _xmt0_interrupt
000070d9 _rcv0_interrupt
000070da _xmt1_interrupt
000070db _rcv1_interrupt
000070dc _trp0_interrupt
000070dd _trp1_interrupt
000070de _trp2_interrupt
000070df _msec_timer
000070f6 _error_serialio_display
00007267 _error_display
0000756b _ascii_conversion
0000758d etext
00008e36 cinit
00400000 _PAGELOW
00804000 _RS232
00804200 _RS422
00804400 _MS1553REGS
00804600 _GPIBREGS
00804800 _PPI1
```

```
0000660d _u2_receive_message
000065b1 _u2_send_checksum
000065c9 _u2_send_message
0000653d _u2_status_message
0000344e _upload_b
00003f21 _upload_c
000047d3 _upload_d
00004e07 _upload_e
0000520c _upload_f
00005785 _upload_g
000059a9 _upload_h
00005ddd _upload_u1
00006114 _upload_u2
00001f15 _upload
0000361b _verify_b
00004110 _verify_c
00004994 _verify_d
00809b31 _verify_eeprom
0000536b _verify_f
00005ada _verify_h
00005e62 _verify_u1
00006248 _verify_u2
00809b01 _write_eeprom
000070d8 _xmt0_interrupt
000070da _xmt1_interrupt
00008e36 cinit
00000000 edata
00809f89 end
0000758d etext

[258 symbols]

00804a00 _PPI2
00804c00 _PPI3
00805000 _MS1553MEM
00808000 _DMAREGS
00808020 _TIMER0
00808030 _TIMER1
00808040 _SERIAL0
00808050 _SERIAL1
00809900 _PROGRAM_RAM
00809900 _boot
00809af4 _enable_eeprom_write
00809b01 _write_eeprom
00809b31 _verify_eeprom
00809b4c _boot_error_display
00809c87 _boot_ascii_conversion
00809ca0 _boot_get_byte
00809cca _boot_get_nyble
00809ced _boot_get_character
00809d1b _boot_address_card_page
00809f00 _BUFFER_RAM
00809f80 .bss
00809f80 _serial_response_time
00809f81 _serial_buffer
00809f85 _dbg
00809f86 _delays
00809f87 _status_flags
00809f88 _Memory_Card_ID
00809f89 end
00c00000 _PAGEHIGH
```

ASSEMBLY LANGUAGE FILES

```
;****************************************************************************
;Module Name:  DSPINIT.ASM
;Number/Version:
;History:
;     Date            Rev     Author          Description
;     13-Mar-1993 0.0   C. Houlberg Baseline
;    13-Mar-1993  0.1   C. Houlberg Initialize Serial RX Timers
;
;Abstract:
;
;     This is the Rapid Reprogramming Terminal (RRT) TMS320C30 Digital
;Signal Processor (DSP) initialization routine.  This routine initializes
;all DSP internal registers prior to entering the RRT "C" program.  The
;linker command file (RRT.CMD) must specify the -e <global symbol> option
;where "global symbol" defines the entry point, "RRTINIT", to this routine.
;
;     To ensure the maximum size for the stack the stack section
;must be specified last in the linker command file.
;
;     This routine performs the following actions:
;
;     1) Establishes interrupt vectors
;     2) Initializes the system stack and Frame Pointer (FP = AR3)
;     3) Initializes internal processor registers (ST, IE, IF, IOF)
;     4) Initializes data memory to floating point zero
;     5) Calls auto-initialization routine ((.cinit) ==> (.bss))
;     6) Initializes internal control registers
;          DMA, timer 0, timer 1, serial port 0,
;          serial port 1, and external buses
;     7) Initializes external peripherials (UART, PPI1, PPI2, PPI3)
;     8) Branches to the assembly language program "sysinit" to
;          initialize the external peripherials.
;
;****************************************************************************;
;     ***** PROCESSOR GLOBAL DECLARATIONS *****
;
;     Defined globals
;
      .global     _RESET, _c_int00, _dspinit
      .global     INT0, INT1, INT2, INT3
      .global     XINT0, RINT0, XINT1, RINT1, TINT0, TINT1, DINT
      .global     TRAP0, TRAP1, TRAP2
;
      .global     _DMAREGS, _TIMER0, _TIMER1, _SERIAL0, _SERIAL1
;
```

```
;       Referenced globals
;
        .global     AUTOINIT, SYSINIT
        .global     ISR0, ISR1, ISR2, ISR3
        .global     XMT0, RCV0, XMT1, RCV1, TIME0, TIME1, DMA
        .global     TRP0, TRP1, TRP2
;
;       ***** RESET AND INTERRUPT VECTOR SPECIFICATION *****
;
                .sect "int_vecs"   ;Named section for interrupt vectors
;
_RESET          .word _dspinit          ;_RESET- load address _dspinit to PC
;
INT0            .word ISR0              ;INT0- loads address ISR0 to PC
INT1            .word ISR1              ;INT1-   "       "    ISR1  "  "
INT2            .word ISR2              ;INT2-   "       "    ISR2  "  "
INT3            .word ISR3              ;INT3-   "       "    ISR3  "  "
;
XINT0           .word XMT0              ;Serial port 0 transmit processing
RINT0           .word RCV0              ;Serial port 0 receive processing
XINT1           .word XMT1              ;Serial port 1 transmit processing
RINT1           .word RCV1              ;Serial port 1 receive processing
TINT0           .word TIME0             ;Timer 0 interrupt processing
TINT1           .word TIME1             ;Timer 1 interrupt processing
DINT            .word DMA               ;DMA interrupt
                .space 20               ;Reserved space
TRAP0           .word TRP0              ;Trap 0 vector processing begins
TRAP1           .word TRP1              ;  " 1   "       "       "
TRAP2           .word TRP2              ;  " 2   "       "       "
                .space 29               ;Leave space for the other 29 traps
;
;       ***** STACK SECTION *****
;
STACK           .sect ".stack"     ;Uninitialized section
;
;       ***** DMA SECTION *****
;
_DMAREGS            .usect      "dma_regs", 0     ;Location of DMA registers
DMAGCR              .usect      "dma_regs", 4     ;DMA Global Control Register
DMASAR              .usect      "dma_regs", 2     ;DMA Source Address Register
DMADAR              .usect      "dma_regs", 2     ;DMA Destination Address Register
DMATCR              .usect      "dma_regs", 1     ;DMA Transfer Counter Register
;
;       ***** TIMER 0 SECTION *****
;
_TIMER0             .usect      "t0_regs", 0      ;Location of Timer 0 registers
TIM0GCR             .usect      "t0_regs", 4      ;Timer 0 Global Control Register
TIM0CTR             .usect      "t0_regs", 4      ;Timer 0 Counter Register
TIM0PDR             .usect      "t0_regs", 1      ;Timer 0 Period Register
;
;       ***** TIMER 1 SECTION *****
;
_TIMER1             .usect      "t1_regs", 0      ;Location of Timer 1 registers
TIM1GCR             .usect      "t1_regs", 4      ;Timer 1 Global Control Register
TIM1CTR             .usect      "t1_regs", 4      ;Timer 1 CounTer Register
TIM1PDR             .usect      "t1_regs", 1      ;Timer 1 PerioD Register
;
;       ***** SERIAL PORT 0 SECTION *****
;
_SERIAL0            .usect      "s0_regs", 0      ;Location of Serial port 0 registers
SER0GCR             .usect      "s0_regs", 2      ;Serial port 0 Global Control Register
SER0XCR             .usect      "s0_regs", 1      ;Serial port 0 Xmit Control Register
SER0RCR             .usect      "s0_regs", 1      ;Serial port 0 Recv Control Register
SER0TCR             .usect      "s0_regs", 1      ;Serial port 0 Timer Control Register
SER0CTR             .usect      "s0_regs", 1      ;Serial port 0 timer CounTeR Register
SER0PDR             .usect      "s0_regs", 2      ;Serial port 0 timer PerioD Register
SER0DXR             .usect      "s0_regs", 4      ;Serial port 0 Data Xmit Register
SER0DRR             .usect      "s0_regs", 1      ;Serial port 0 Data Recv Register
;
;       ***** SERIAL PORT 1 SECTION *****
;
_SERIAL1            .usect      "s1_regs", 0      ;Location of Serial port 1 registers
SER1GCR             .usect      "s1_regs", 2      ;Serial port 1 Global Control Register
SER1XCR             .usect      "s1_regs", 1      ;Serial port 1 Xmit Control Register
SER1RCR             .usect      "s1_regs", 1      ;Serial port 1 Recv Control Register
SER1TCR             .usect      "s1_regs", 1      ;Serial port 1 Timer Control Register
SER1CTR             .usect      "s1_regs", 1      ;Serial port 1 timer CounTeR Register
SER1PDR             .usect      "s1_regs", 2      ;Serial port 1 timer PerioD Register
SER1DXR             .usect      "s1_regs", 4      ;Serial port 1 Data Xmit Register
SER1DRR             .usect      "s1_regs", 1      ;Serial port 1 Data Recv Register
;
;       ***** DATA CONSTANTS *****
```

```
;
;      Data and executable code are both contained in the
;      pgm_entry section.  This is code that cannot be over
;      written by the RRT program routines.
;
        .sect     ".text"                  ;Entry code for boot and rrt_main
;
STACK_ADDR  .word   STACK                  ;address of stack
FP                .set     AR3             ;frame pointer
;
MASK      .word      000003F0H             ;CPU interrupts (X---X3F0H) enabled.
                                           ;  0 => EINT3, EINT2, EINT1, EINT0
                                           ;  F => ERINT1, EXINT1, ERINT0, EXINT0
                                           ;  3 => XX, EDINT, ETINT1, ETINT0
                                           ;DMA interrupts (X000X---H) disabled.
                                           ;  0 => EINT3, EINT2, EINT1, EINT0
                                           ;  0 => ERINT1, EXINT1, ERINT0, EXINT0
                                           ;  0 => XX, EDINT, ETINT1, ETINT0
;
DMACTL  .word      00000050H               ;Init. for DMA control (0)
                                           ;  START = 00 => DMA will be completed
                                           ;   STAT = 00 => DMA held between DMA
                                           ;        = 01 => Held in middle of DMA
                                           ;      = 10 => Reserved
                                           ;      = 11 => DMA busy
                                           ; INCSRC =  1 => Source address...
                                           ; DECSRC =  0 => ... incremented
                                           ; INCDST =  1 => Destination address...
                                           ; DECDST =  0 => ... incremented
                                           ;   SYNC = 00 => No synchronization
                                           ;     TC =  0 => Not terminated
                                           ;  TCINT =  0 => Interrupt not set
                                           ;     XX  = Rest reserved, read as 0
IOFCTL  .word      00000022H               ;IOF Register control
                                           ;     XX  = Reserved, read as 0
                                           ; I/OXF0 = 1 => Data output pin
                                           ; OUTXF0 = 0 => XF0 output data (RESET)
                                           ;  INXF0 = 1/0 => XF0 input data
                                           ;     XX  = Reserved, read as 0
                                           ; I/OXF1 = 1 => Data output pin
                                           ; OUTXF1 = 0 => XF1 output data (PP)
                                           ;  INXF1 = 1/0 => XF1 input data
                                           ;     XX  = Reserved, read as 0
TIM0CTL .word      00000081H               ;Init. of timer 0 control (32)
                                           ;Timer control (XXXXX081H)
                                           ;   FUNC = 1 => TCLK = Timer pin
                                           ;    I/O = 0 => TCLK = Input pin
                                           ; DATOUT = TCLK output when in I/O mode
                                           ;  DATIN = TCLK input when in I/O mode
                                           ;     XX  = Reserved
                                           ;     XX  = Reserved
                                           ;     GO = 1 Starts timer (auto resets)
                                           ;   /HLD = 1 => Counter enabled
                                           ;    C/P = 0 => Output active for 1 H1
                                           ; CLKSRC = 0 => TCLK increments counter
                                           ;    INV = 0 => TCLK not inverted
                                           ;  TSTAT = Uninverter TCLK pin
TIM1CTL .word      00000081H               ;Init. of timer 1 control (48)
                                           ;   Same definitions as TIM0CTL
SERGL00 .word      0C140380H               ;Init. of serial 0 glbl control (64)
                                           ;   RRDY = 1/0 => Yes/No new data
                                           ;   XRDY = 1/0 => Is/Not ready for data
                                           ; FSXOUT =   0 => FSX Input mode
                                           ;XSREMPTY= 1/0 => XSR Is/Not empty
                                           ; RSRFULL= 1/0 => Yes/No RSR overrun
                                           ;     HS =   0 => No handshake mode
                                           ;XCLKSRCE=   0 => External Xmit clock
                                           ;RCLKSRCE=   1 => Internal Recv clock
                                           ; XVAREN =   1 => Variable data rate
                                           ; RVAREN =   1 => Variable data rate
                                           ;   XFSM =   0 => Standard sync mode
                                           ;   RFSM =   0 => Standard sync mode
                                           ;  CLKXP =   0 => Active high clock
                                           ;  CLKRP =   0 => Active high clock
                                           ;    DXP =   0 => Active high data
                                           ;    RXP =   0 => Active high data
                                           ;   FSXP =   0 => Active high FSX
                                           ;   FSRP =   0 => Active high FSR
                                           ;   XLEN =  01 => 16 bit word length
                                           ;   RLEN =  01 => 16 bit word length
                                           ;  XTINT =   0 => Timer INT disabled
                                           ;   XINT =   0 => Xmit INT disabled
```

```
                                ;  RTINT =   0 => Timer INT disabled
                                ;   RINT =   0 => Recv INT disabled
                                ; XRESET =   1 => Xmit not reset
                                ; RRESET =   1 => Recv not reset
                                ;     XX  = Rest reserved, read as 0
SERPTX0 .word     00000006H     ;Init of serial 0 xmt port control (66)
                                ;CLKXFUNC =   0 => Data port CLKX
                                ; CLKXI/O =   1 => Output for CLKX
                                ;CLKXDATOUT=1/0 => Data output on CLKX
                                ;CLKXDATIN=-1/0 => Data input from CLKX
                                ;  DXFUNC =   0 => Data port DX
                                ;   DXI/O =   0 => Input for DX
                                ;DXDATOUT = 1/0 => Data output on DX
                                ; DXDATIN = 1/0 => Data input from DX
                                ; FSXFUNC =   0 => Data port FSX
                                ;  FSXI/O =   0 => Input for FSX
                                ;FSXDATOUT= 1/0 => Data output on FSX
                                ;FSXDATIN = 1/0 => Data input from FSX
                                ;     XX  = Rest reserved, read as 0
SERPTR0 .word     00000003H     ;Init of serial 0 rcv port control (67)
                                ;CLKXFUNC =   1 => Serial port CLKX
                                ; CLKXI/O =   1 => Output for CLKX
                                ;CLKXDATOUT=1/0 => Data output on CLKX
                                ;CLKXDATIN= 1/0 => Data input from CLKX
                                ;  DXFUNC =   0 => Data port DX
                                ;   DXI/O =   0 => Input for DX
                                ;DXDATOUT = 1/0 => Data output on DX
                                ; DXDATIN = 1/0 => Data input from DX
                                ; FSXFUNC =   0 => Data port FSX
                                ;  FSXI/O =   0 => Input for FSX
                                ;FSXDATOUT= 1/0 => Data output on FSX
                                ;FSXDATIN = 1/0 => Data input from FSX
                                ;     XX  = Rest reserved, read as 0
SERTIM0 .word     000003CFH     ;Init. of serial 0 timer control (68)
                                ;     XGO =   1 starts Xmit timer count
                                ;   /XHLD =   1 => Continue count
                                ;    XC/P =   1 => Clock mode
                                ;XCLKSRC =    1 => Internal CLK
                                ;     XX  = Reserved, read as 0
                                ; XTSTAT = Uninverted CLKX pin
                                ;     RGO =   1 starts Recv timer count
                                ;   /RHLD =   1 => Continue count
                                ;    RC/P =   1 => Clock mode
                                ;RCLKSRC =    1 => Internal CLK
                                ;     XX  = Reserved, read as 0
                                ; RTSTAT = Tracks uninverted CLKR pin
                                ;     XX  = Rest reserved and read as 0
SERLVL0 .word     00030000H     ;Init. of serial 0 period register
                                ;  Count =    3 => Clock = 14/(3x4)MHz
SERGLO1 .word     0C140380H     ;Init. of serial 1 glbl control (80)
                                ;    RRDY = 1/0 => Yes/No new data
                                ;    XRDY = 1/0 => Is/Not ready for data
                                ; FSXOUT =    0 => FSX Output mode
                                ;XSREMPTY= 1/0 => XSR Is/Not empty
                                ; RSRFULL= 1/0 => Yes/No RSR overrun
                                ;      HS =   0 => No handshake mode
                                ;XCLKSRCE=    0 => External Xmit clock
                                ;RCLKSRCE=    1 => Internal Recv clock
                                ; XVAREN =    1 => Variable data rate
                                ; RVAREN =    1 => Variable data rate
                                ;    XFSM =   0 => Standard sync mode
                                ;    RFSM =   0 => Standard sync mode
                                ;   CLKXP =   0 => Active high clock
                                ;   CLKRP =   0 => Active high clock
                                ;     DXP =   0 => Active high data
                                ;     RXP =   0 => Active high data
                                ;    FSXP =   0 => Active high FSX
                                ;    FSRP =   0 => Active high FSR
                                ;    XLEN =  01 => 8 bit word length
                                ;    RLEN =  01 => 8 bit word length
                                ;   XTINT =   0 => Timer INT disabled
                                ;    XINT =   0 => Xmit INT disabled
                                ;   RTINT =   0 => Timer INT disabled
                                ;    RINT =   0 => Recv INT disabled
                                ; XRESET =    1 => Xmit not reset
                                ; RRESET =    1 => Recv not reset
                                ;     XX  = Rest reserved, read as 0
SERPTX1 .word     00000006H     ;Init of serial 1 xmt port control (82)
                                ;CLKXFUNC =   0 =>General I/O port CLKX
                                ; CLKXI/O =   1 => Output for CLKX
                                ;CLKXDATOUT= 1/0 => Data output on CLKX
                                ;CLKXDATIN= 1/0 => Data input from CLKX
```

```
                                        ;  DXFUNC =   0 => General I/O port DX
                                        ;   DXI/O =   0 => Input for DX
                                        ;DXDATOUT = 1/0 => Data output on DX
                                        ; DXDATIN = 1/0 => Data input from DX
                                        ; FSXFUNC =   0 => General I/O port FSX
                                        ;  FSXI/O =   0 => Input for FSX
                                        ;FSXDATOUT = 1/0 => Data output on FSX
                                        ;FSXDATIN = 1/0 => Data input from FSX
                                        ;      XX  = Rest reserved and read as 0
SERPTR1 .word     00000003H             ;Init of serial 1 rcv port control (83)
                                        ;Same definitions as with SERPTX1...
                                        ;... after replacing X with R.
SERTIM1 .word     000003CFH             ;Init. of serial 1 timer control (84)
                                        ;   Same definitions as with SERTIM0
SERPRD1 .word     00070000H             ;Init. of serial 1 period register
                                        ;  Count =   7 => Clock period = 2usec
;
;    ***** EXTERNAL INTERFACE SECTION *****
;
XPANBCR .word     00808060H             ;eXPANsion Bus Control Register
PRIMBCR .word     00808064H             ;PRIMary Bus Control Register
XPANBUS .word     000000F8H             ;Init. Expansion Bus control (96)
                                        ;     XX  = Reserved, read as 000
                                        ;     SWW =  11 => RDY and wait count
                                        ;   WTCNT = 111 => 7 Software waits,...
                                        ;               ... 500ns access
                                        ;     XX  = Rest reserved and read as 0
PRIMBUS .word     000000F8H             ;Init. Primary Bus control (100)
                                        ; HOLDST = 1/0 => Port Is/Not held
                                        ; NOHOLD =   0 => Port Not allowed held
                                        ;    HIZ =   0 => Not internally held
                                        ;    SWW =  11 => RDY and wait count
                                        ;  WTCNT = 111 => Software wait states
                                        ; BNKCMP =00000=> No memory banks
                                        ;     XX  = Rest reserved and read as 0
;
;    Program execution begins here as specified by the
;linker -e <global symbol> option.  When RESET is applied, the
;following registers are initialized to zero:
;
;          ST  --     CPU STATUS REGISTER
;          IE  --     CPU/DMA INTERRUPT ENABLE FLAGS
;          IF  --     CPU INTERRUPT FLAGS
;
;    The STATUS register has the following arrangement:
;
;    BITS:     31-14  13  12 11 10  9   8   7   6   5  4 3 2 1 0
;    FUNCTION: RESRV GIE CC CE CF RES RM OVM LUF LV UF N Z V C
;
_c_int00
;
_dspinit
;
;    Set up the initial stack pointer
;
     LDP   STACK_ADDR              ;Get page of stored address
     LDI   @STACK_ADDR,SP              ;Load the address into SP
     LDI   SP,FP                   ;  and into FP
;
     LDI   1800H,ST                ;Clear and enable cache, disable OVM
     LDP   MASK                    ;Get page of stored mask
     LDI   @MASK,IE                ;Unmask CPU interrupts
     LDI   00000000H,IF            ;CPU interrupts disabled (XXXXX000H)
                                   ;   0 => INT3, INT2, INT1, INT0
                                   ;   0 => RINT1, XINT1, RINT0, XINT0
                                   ;   0 => XX, DINT0 TINT1 TINT0
;
;    Perform autoinitialization
;
     CALL  AUTOINIT                ;ASM routine
;
;    Initialize the DMA section
;
     LDP   DMACTL                  ;Get page of stored data
     LDI   @DMACTL,R0              ;Initial control word
     LDP   DMAGCR                  ;Get DMA Global Control Register page
     STI   R0,@DMAGCR              ;Initialize
;
;    Initialize the XF0 and XF1 bits
;
     LDP   IOFCTL                  ;Get page of stored data
     LDI   @IOFCTL,IOF             ;Initial control word
```

```
;
;       Initialize the timer 0 section
;
        LDP     TIMOCTL                 ;Get page of stored data
        LDI     @TIMOCTL,R0             ;Initial control word
        LDP     TIMOGCR                 ;Get TIMO Global Control Register page
        STI     R0,@TIMOGCR             ;Initialize
;
;       Initialize the timer 1 section
;
        LDP     TIMOCTL                 ;Get page of stored data
        LDI     @TIM1CTL,R0             ;Initial control word
        LDP     TIM1GCR                 ;Get TIM1 Global Control Register page
        STI     R0,@TIM1GCR             ;Initialize
;
;       Initialize the serial port 0 section
;
        LDP     SERGLO0                 ;Get page of stored data
        LDI     @SERGLO0,R0             ;Initial control word
        LDP     SER0GCR                 ;Get SER0 Global Control Register page
        STI     R0,@SER0GCR             ;Initialize
;
        LDP     SERPTX0                 ;Get page of stored data
        LDI     @SERPTX0,R0             ;Initial control word
        LDP     SER0XCR                 ;Get SER0 Xmit Control Register page
        STI     R0,@SER0XCR             ;Initialize
;
        LDP     SERPTR0                 ;Get page of stored data
        LDI     @SERPTR0,R0             ;Initial control word
        LDP     SER0RCR                 ;Get SER0 Rcvr Control Register page
        STI     R0,@SER0RCR             ;Initialize
;
        LDP     SERTIM0                 ;Get page of stored data
        LDI     @SERTIM0,R0             ;Initial control word
        LDP     SER0TCR                 ;Get SER0 Timer Control Register page
        STI     R0,@SER0TCR             ;Initialize
;
        LDP     SERLVL0                 ;Get page of stored data
        LDI     @SERLVL0,R0             ;Counter count
        LDP     SER0PDR                 ;Get SER0 Timer Period Register page
        STI     R0,@SER0PDR             ;Initialize
;
;       Initialize the serial port 1 section
;
        LDP     SERGLO1                 ;Get page of stored data
        LDI     @SERGLO1,R0             ;Initial control word
        LDP     SER1GCR                 ;Get SER1 Global Control Register page
        STI     R0,@SER1GCR             ;Initialize
;
        LDP     SERPTX1                 ;Get page of stored data
        LDI     @SERPTX1,R0             ;Initial control word
        LDP     SER1XCR                 ;Get SER1 Xmit Control Register page
        STI     R0,@SER1XCR             ;Initialize
;
        LDP     SERPTR1                 ;Get page of stored data
        LDI     @SERPTR1,R0             ;Initial control word
        LDP     SER1RCR                 ;Get SER1 Rcvr Control Register page
        STI     R0,@SER1RCR             ;Initialize
;
        LDP     SERTIM1                 ;Get page of stored data
        LDI     @SERTIM1,R0             ;Initial control word
        LDP     SER1TCR                 ;Get SER1 Timer Control Register page
        STI     R0,@SER1TCR             ;Initialize
;
        LDP     SERPRD1                 ;Get page of stored data
        LDI     @SERPRD1,R0             ;Counter count
        LDP     SER1PDR                 ;Get SER1 Timer Period Register page
        STI     R0,@SER1PDR             ;Initialize
;
;       Initialize the external buses
;
        LDP     XPANBCR                 ;Get page of stored address
        LDI     @XPANBCR,AR0            ;Get address of Bus Control Register
        LDP     XPANBUS                 ;Get page of stored control word
        LDI     @XPANBUS,R0             ;Initial control word
        STI     R0,*AR0                 ;Initialize
;
        LDP     PRIMBCR                 ;Get page of stored address
        LDI     @PRIMBCR,AR0            ;Get address of Bus Control Register
        LDP     PRIMBUS                 ;Get page of stored control word
        LDI     @PRIMBUS,R0             ;Initial control word
        STI     R0,*AR0                 ;Initialize
```

```
;
;       Initialize the external peripherials
;
        BR      SYSINIT                 ;Initialize external system
;
        .end

;*****************************************************************************;Module Name:
SYSINIT.ASM
;Number/Version:
;History:
;       Date            Rev     Author          Description
;       13-Mar-1993     0.0     C. Houlberg     Baseline
;       13-Mar-1993     0.1     C. Houlberg     Initialize serial RX timers
;
;Abstract:
;
;*****************************************************************************;
;       ***** SYSTEM GLOBAL DECLARATIONS *****
;
        .global SYSINIT                         ;Defined globals
        .global _RS232, _RS422
        .global _MS1553REGS, _GPIBREGS
        .global _PPI1, _PPI2, _PPI3
        .global _MS1553MEM
        .global _PAGELOW, _PAGEHIGH
;
        .global SER1XCR, _basicbit              ;Referenced global
;
;       ***** UNITIALIZED SECTIONS *****
;
_RS232          .usect  "uart1regs", 0  ;Location of RS-232 registers
UART1GCR        .usect  "uart1regs", 1  ;UART #1 Buffer Register
UART1CSR        .usect  "uart1regs", 1  ;UART #1 Control/Status Register
UART1MCR        .usect  "uart1regs", 1  ;UART #1 Modem Control Register
UART1BMR        .usect  "uart1regs", 1  ;UART #1 Baud rate/Modem status Reg.
;
_RS422          .usect  "uart2regs", 0  ;Location of RS-422 registers
UART2GCR        .usect  "uart2regs", 1  ;UART #2 Buffer Register
UART2CSR        .usect  "uart2regs", 1  ;UART #2 Control/Status Register
UART2MCR        .usect  "uart2regs", 1  ;UART #2 Modem Control Register
UART2BMR        .usect  "uart2regs", 1  ;UART #2 Baud rate/Modem status Reg.
;
_MS1553REGS .usect      "ms1553regs", 20H ;MS-1553 Registers
;
_GPIBREGS   .usect      "gpibregs", 8   ;GPIB (IEEE-488) Register
;
_PPI1       .usect      "ppi1regs", 0   ;Location of PPI1 registers
PPI1A       .usect      "ppi1regs", 1   ;PPI #1 port A
PPI1B       .usect      "ppi1regs", 1   ;PPI #1 port B
PPI1C       .usect      "ppi1regs", 1   ;PPI #1 port C
PPI1CP      .usect      "ppi1regs", 1   ;PPI #1 Control register
;
_PPI2       .usect      "ppi2regs", 0   ;Location of PPI2 registers
PPI2A       .usect      "ppi2regs", 1   ;PPI #2 port A
PPI2B       .usect      "ppi2regs", 1   ;PPI #2 port B
PPI2C       .usect      "ppi2regs", 1   ;PPI #2 port C
PPI2CP      .usect      "ppi2regs", 1   ;PPI #2 Control register
;
_PPI3       .usect      "ppi3regs", 0   ;Location of PPI3 registers
PPI3A       .usect      "ppi3regs", 1   ;PPI #3 port A
PPI3B       .usect      "ppi3regs", 1   ;PPI #3 port B
PPI3C       .usect      "ppi3regs", 1   ;PPI #3 port C
PPI3CP      .usect      "ppi3regs", 1   ;PPI #3 Control register
;
_MS1553MEM  .usect      "ms1553mem", 1000H      ;MS-1553 Memory
;
_PAGELOW    .usect      "pagelow", 0400000H     ;Memory Card Page LSH (4Mbytes)
_PAGEHIGH   .usect      "pagehigh", 0400000H ;Memory Card Page MSH (4Mbytes)
;
;       ***** SYSTEM CONSTANTS *****
;
IORESET     .set  00000004H             ;IOF register I/O Reset bit
RDELAY      .set  000000FFH             ;Reset loop counter (pulse width)
;
;       ***** DEVICE CONTROL WORDS *****
;
WORD1N8     .set  3CH                   ;UART Control Register (00111100)
                                        ;  0 => 1 stop bit
                                        ;110 => Parity disabled
                                        ; 11 => 8 bit words
```

```
                                     ; 00 => Required by part
;Baud rate set for 9600.  UART Baud Rate Register (10011000)
                                     ;Prescaler select =    00 => 1
                                     ;    (11,10,01,00 ==> 1/(5,4,3,1))
                                     ; Divisor select = 00110 => 58/3
                                     ;        CO select =     1 => BRG OUTPUT
                                     ; Acceptable Standard Baud Rates:
                                     ;     Rate  Error  Prescaler  Divisor
BAU1536     .set  0FFH               ;   153600  -2.34     11       11111
BAUD768     .set  83H                ;    76800  -2.34     11       00000
BAUD384     .set  98H                ;    38400   1.02     00       00110
BAUD192     .set  8FH                ;    19200   2.34     11       00011
BAUD096     .set  9AH                ;     9600   1.02     10       00110
                                     ;     4800   2.34     11       01000
                                     ;     2400   2.34     11       01001
                                     ;     1200   2.34     11       01010
                                     ;      600   2.34     11       01100
                                     ;      300   2.34     11       01111
                                     ; Maximum Possible Baud Rate:
                                     ;   750000   0.00     00       11111
STOPMD      .set  22H                ;Modem Control Register (00100010)
                                     ;  0 => Not clear to send data
                                     ;  1 => Data set is ready
                                     ;  0 => Interrupts are enabled
                                     ; 00 => Normal operation...
                                     ;     ... (11 => Loop test)
                                     ;  1 => Receiver enabled
                                     ;  0 => Modem interrupt enabled
                                     ;  0 => Required by part
CTSMD       .set  23H                ;Clear to send data
TESTMD      .set  3AH                ;UART self test mode
EMODE       .set  08000H             ;Operate in Enhanced Mode
CFGREG2     .set  0AD6AH             ;BU61590 Configuration Register #2
CFGREG3     .set 08785H              ;Configuration Register #3
CFGREG4     .set  01060H             ;Configuration Register #4
CFGREG5     .set 08180H              ;Configuration Register #5
PPI1CTL     .set  80H                ;Control word (10000000)
                                     ;  0 => Port C (lower) output
                                     ;  0 => Port B output
                                     ;  0 => Mode 0
                                     ;  0 => Port C (upper) output
                                     ;  0 => Port A output
                                     ; 00 => Mode 0
                                     ;  1 => Mode set flag active
PPI1AO      .set  00H                ;Port 1A Output Initialization
                                     ;  0 => EW bus not selected
                                     ;  0 => AV1 bus not selected
                                     ;  0 => AV2 bus not selected
                                     ;  0 => AV3 bus not selected
                                     ;  0 => AV4 bus not selected
                                     ;  0 => PPI1A5 low (spare)
                                     ;  0 => PPI1A6 low (spare)
                                     ;  0 => PPI1A7 low (spare)
PPI1BO      .set  00H                ;Port 1B Output Initialization
                                     ;  0 => MS-1553 Long stub selected
                                     ;  0 => MS-1553 CT grounded
                                     ;  0 => MS-1553 Primary bus selected
                                     ;  0 => MS-1553 Transformer coupled
                                     ;  0 => BOOT_EN_SMS not enabled
                                     ;  0 => BOOT_EN_RDP not enabled
                                     ;  0 => MSDRS_ON/OFF off
                                     ;  0 => PPI1B7 spare relay open
PPI1CO      .set  00H                ;Port 1C Output Initialization
                                     ;  0 => RT Address LSB
                                     ;  0 => RT Address 2SB
                                     ;  0 => RT Address 3SB
                                     ;  0 => RT Address 4SB
                                     ;  0 => RT Address MSB
                                     ;  0 => RT Address Parity
                                     ;  0 => LCD Character select
                                     ;  0 => LCD not enabled
PPI2CTL     .set  81H                ;Control word (10000001)
                                     ;Port A: output
                                     ;Port B: output
                                     ;Port C (lower): input
                                     ;Port C (upper): output
PPI2AO      .set 00H                 ;Port 2A Output initialization
                                     ;  0 => EW_OSM_EN not enabled
                                     ;  0 => EW_UDM_EN not enabled
                                     ;  0 => EXT_PROC_ON/OFF not off
                                     ;  0 => PPI2A3 spare relay open
                                     ;  0 => AV EN1 not enabled
```

```
                                        ;  0 => AV_EN2 not enabled
                                        ;  0 => PPI2A6 low (spare)
                                        ;  0 => PPI2A7 low (spare)
PPI2BO      .set  00H                   ;Port 2B Output initialization
                                        ;  0 => PWR_ON/OFF_1 not off
                                        ;  0 => PWR_ON/OFF_2 not off
                                        ;  0 => PWR_ON/OFF_3 not off
                                        ;  0 => PWR_ON/OFF_4 not off
                                        ;  0 => IPL_1 not selected
                                        ;  0 => IPL_2 not selected
                                        ;  0 => IPL_3 not selected
                                        ;  0 => IPL_4 not selected
PPI2CO      .set  00H                   ;Port 2C Output initialization
                                        ;  0 => IPL_1 Fail
                                        ;  0 => IPL_2 Fail
                                        ;  0 => IPL_3 Fail
                                        ;  0 => IPL_4 Fail
                                        ;  0 => MCA23
                                        ;  0 => MCA24
                                        ;  0 => MCA25
                                        ;  0 => MCS1/MCS0
PPI3CTL     .set  92H                   ;Control word (10010010)
                                        ;Port A: input
                                        ;Port B: input
                                        ;Port C (lower): output
                                        ;Port C (upper): output
PPI3CO      .set 00H                    ;Port 3C Output initialization
                                        ; LCD Implementation -
                                        ;    => ASCII character
;
            .sect ".text"               ;Entry code for boot and rrt_main
;
;     ***** INITIALIZE SYSTEM I/O DEVICES *****
;
SYSINIT
;
            OR    IORESET,IOF           ;Peripherial Reset is Active
            LDI   RDELAY,AR1            ;Delay for Reset pulse width
SYSRES      DB    AR1,SYSRES
            XOR   IORESET,IOF           ;Peripherial Reset is Inactive
;
            LDI   WORD1N8,R0            ;Get stop bits, parity, and word length
            LDP   UART1CSR              ;Get page of UART #1 Control Register
            STI   R0,@UART1CSR          ;Set stop bits, parity, and word length
            LDP   UART2CSR              ;Get page of UART #2 Control Register
            STI   R0,@UART2CSR          ;Set stop bits, parity, and word length
;
            LDI   BAUD096,R0            ;Get baud rate (9,600 baud)
            LDP   UART1BMR              ;Get page of UART #1 Baud Rate Register
            STI   R0,@UART1BMR          ;Set baud rate
            LDP   UART2BMR              ;Get page of UART #2 Baud Rate Register
            STI   R0,@UART2BMR          ;Set baud rate
;
            LDI   STOPMD,R0             ;Remote not Clear To Send
            LDP   UART1MCR              ;Get page of Modem Control Register
            STI   R0,@UART1MCR          ;Set UART #1 Control Register
            LDP   UART2MCR              ;Get page of Modem Control Register
            STI   R0,@UART2MCR          ;Set UART #2 Control Register
;
            LDP   UART1CSR              ;Get page of UART #1 Status Register
            LDI   @UART1CSR,R0          ;Clear out residual status
            LDP   _RS232                ;Get page of UART #1 Buffer Register
            LDI   @_RS232,R0            ;Clear out residual data
            LDI   @_RS232,R0
;
            LDP   UART2CSR              ;Get page of UART #2 Status Register
            LDI   @UART2CSR,R0          ;Clear out residual status
            LDP   _RS422                ;Get page of UART #2 Buffer Register
            LDI   @_RS422,R0            ;Clear out residual data
            LDI   @_RS422,R0
;
;     ***** INITIALIZE MS-1553 INTERFACE *****
;
            LDP   _MS1553REGS                 ;Initialize BU61590 Registers
            LDI   EMODE,R0                    ;Operate in Enhanced Mode
            STI   R0,@(_MS1553REGS + 07H)     ;Initialize
            LDI   CFGREG2,R0                  ;Configuration Register #2
            STI   R0,@(_MS1553REGS + 02H)     ;Initialize
            LDI   CFGREG3,R0                  ;Configuration Register #3
            STI   R0,@(_MS1553REGS + 07H)     ;Initialize
            LDI   CFGREG4,R0                  ;Configuration Register #4
            STI   R0,@(_MS1553REGS + 08H)     ;Initialize
```

```
          LDI    CFGREG5,R0            ;Configuration Register #5
          STI    R0,@(_MS1553REGS + 09H) ;Initialize
;
;     ***** INITIALIZE IEEE-488 INTERFACE *****
;
;     ******************************************
;     *     Initialize Code Goes Here          *
;     ******************************************
;
;
      LDI    PPI1CTL,R0                ;Initialize PPI1
      LDP    PPI1CP                    ;Get page of PPI1 control port
      STI    R0,@PPI1CP
      LDI    PPI1AO,R0                 ;Initial Port A Output
      LDP    PPI1A
      STI    R0,@PPI1A
      LDI    PPI1BO,R0                 ;Initial Port B Output
      LDP    PPI1B
      STI    R0,@PPI1B
      LDI    PPI1CO,R0                 ;Initial Port C Output
      LDP    PPI1C
      STI    R0,@PPI1C
;
      LDI    PPI2CTL,R0                ;Initialize PPI2
      LDP    PPI2CP                    ;Get page of PPI2 control port
      STI    R0,@PPI2CP
      LDI    PPI2AO,R0                 ;Initial Port A Output
      LDP    PPI2A
      STI    R0,@PPI2A
      LDI    PPI2BO,R0                 ;Initial Port B Output
      LDP    PPI2B
      STI    R0,@PPI2B
      LDI    PPI2CO,R0                 ;Initial Port C Output
      LDP    PPI2C
      STI    R0,@PPI2C
;
      LDI    PPI3CTL,R0                ;Initialize PPI3
      LDP    PPI3CP                    ;Get page of PPI3 control port
      STI    R0,@PPI3CP
      LDI    PPI3CO,R0                 ;Initial Port C Output
      LDP    PPI3C
      STI    R0,@PPI3C
;
      BR     _basicbit                 ;"C" program (Basic Built In Test)
;
      .end

;****************************************************************************;Module Name:
VECTORS.ASM
;Number/Version:
;History:
;           Date            Rev    Author      Description
;           17-Mar-1993     0.0    C. Houlberg Baseline
;
;Abstract:
;
;****************************************************************************;
;     Defined Globals
;
      .global     _REPROGRAM, AUTOINIT
      .global     DMA, ISR0, ISR1, ISR2, ISR3
      .global     TIME0, TIME1, XMT0, RCV0, XMT1, RCV1
      .global     TRP0, TRP1, TRP2
;
;     Referenced Globals
;
      .global     _dma_interrupt
      .global     _isr0_interrupt, _isr1_interrupt
      .global     _isr2_interrupt, _isr3_interrupt
      .global     _time0_interrupt, _time1_interrupt
      .global     _xmt0_interrupt, _rcv0_interrupt
      .global     _xmt1_interrupt, _rcv1_interrupt
      .global     _trp0_interrupt, _trp1_interrupt, _trp2_interrupt
      .global     cinit
;
      .text
;
INIT_ADDR   .word cinit      ;address of init tables
;

DMA
      CALL  _dma_interrupt
```

```
        RETI
;
ISR0
        CALL  _isr0_interrupt
        RETI
;
ISR1
        CALL  _isr1_interrupt
        RETI
;
ISR2
        CALL  _isr2_interrupt
        RETI
;
ISR3
        CALL  _isr3_interrupt
        RETI
;
TIME0
        CALL  _time0_interrupt
        RETI
;
TIME1
        CALL  _time1_interrupt
        RETI
;
XMT0
        CALL  _xmt0_interrupt
        RETI
;
RCV0
        CALL  _rcv0_interrupt
        RETI
;
XMT1
        CALL  _xmt1_interrupt
        RETI
;
RCV1
        CALL  _rcv1_interrupt
        RETI
;
TRP0
        CALL  _trp0_interrupt
        RETI
;
TRP1
        CALL  _trp1_interrupt
        RETI
;
TRP2
        CALL  _trp2_interrupt
        RETI
;
;       Do the autoinitialization
;
AUTOINIT
        LDP   INIT_ADDR                 ;Get page of stored address
        LDI   @INIT_ADDR,AR0            ;Get address of .cinit tables
        CMPI  -1,AR0                    ;If RAM model, skip init
        BEQ   DONE
        LDI   *AR0++,R1                 ;Get first count
        BZ  DONE                        ;If 0, nothing to do
        LDI   *AR0++,AR1                ;Get destination address
        LDI   *AR0++,R0                 ;Get first word
DO_INIT
        STI   R0,*AR1++
        LDI   *AR0++,R0
        SUBI  1,R1                      ;Decrement count
        BNZ   DO_INIT                   ;Do it again
        LDI   R0,R1                     ;Move next count into R1
        BNZD  DO_INIT                   ;If there is more, repeat
        LDI   *AR0++,AR1                ;Get next destination address
        LDI   *AR0++,R0                 ;Get next first word
        NOP
DONE    RETS                            ;Return to calling routine (dspinit)
;
        .end
```

"C" LANGAUGE FILES

```
/*************************************************************************
Include File Name:    rrt.h
Number/Version:
History:
          Date         Rev      Author          Description
          17-Mar-1993  0.0      C. Houlberg     Baseline

Abstract:
          Definitions defining the form of the program.
*************************************************************************/

/* Program configuration defined as follows:
*/
     #define          TMS320C30                /* TMS320C30 conditionals activated */
                                               /*     32 bit program and data word length */
     #define          BOOT_LOADABLE            /* Command Mode */
                                               /*     Program function activated */
/*   #define          FLEET_VERSION      */    /* Fleet version of software */
                                               /*     Fleet Release Flag activated */
/* Definitions used throughout the program
*/
     #define YES          1
     #define NO           0
     #define TRUE         1
     #define FALSE        0

/* end*/


/*************************************************************************
Include File Name:    dsp.h
Number/Version:
History:
          Date         Rev      Author          Description
          17-Mar-1993  0.0      C. Houlberg     Baseline

Abstract:
          Definitions defining the configuration of the DSP.
*************************************************************************/

/* External definitions used for boot operation */

     extern       PROGRAM_RAM;                /* Execution location of boot.c */
     extern       BUFFER_RAM;                 /* Storage location for boot.c data */
     #define      SIZE_BUFFER_RAM   0x80      /* Size of RAM storage buffer */

/* Definitions of variables internal to DSP */

     extern       DMAREGS;
     extern       TIMER0;
     extern       TIMER1;
     extern       SERIAL0;
     extern       SERIAL1;

typedef struct                  /* Variable definitions pertaining to DMA usage */
{
     unsigned Not_Used_0[4];                  /* Not used by "C" Program */
     unsigned DMA_Source_Address;
     unsigned Not_Used_1;                     /* Not used by "C" Program */
     unsigned DMA_Destination_Address;
     unsigned Not_Used_2;                     /* Not used by "C" Program */
     unsigned DMA_Transfer_Counter;

} DMA_REG_TYPE;

typedef struct                  /* Variable definitions pertaining to Timer usage */
{
     unsigned Not_Used_0[4];                  /* Not used by "C" Program */
     unsigned Timer_Counter;

} TIMER_REG_TYPE;

typedef struct     /* Variable definitions pertaining to Serial port usage */
{
     unsigned Not_Used_0;                     /* Unused word */

     unsigned Not_Used_1;                     /* Unused word */

     unsigned Not_Used_2                : 2; /* Unused bits */
     unsigned Memory_Card_Array         : 1; /* 1/0 ==> Card Array/Registers */
     unsigned Not_Used_3                : 4; /* Unused bits */
     unsigned Card_WP                   : 1; /* 1 ==> Card Write Protected */
```

```
     unsigned Not_Used_4              :  3; /* Unused bits */
     unsigned Card_Ready              :  1; /* 1 ==> Card Ready for access */
     unsigned Not_Used_5              : 20; /* Unused bits */

     unsigned Not_Used_6              :  2; /* Unused bits */
     unsigned Clock                   :  1; /* Active Clock */
     unsigned Not_Used_7              :  4; /* Unused bit */
     unsigned Card_Not_Detect_2       :  1; /* 1 ==> Card Not Detected 2 */
     unsigned Not_Used_8              :  3; /* Unused bit */
     unsigned Card_Not_Detect_1       :  1; /* 1 ==> Card Not Detected 1 */
     unsigned Not_Used_9              : 20; /* Unused bits */

     unsigned Timer_Control_Reg;            /* Not used by "C" Program */

     unsigned Xmit_Timer_Counter      : 16; /* Transmit timer counter */
     unsigned Recv_Timer_Counter      : 16; /* Receive timer counter */

     unsigned Xmit_Timer_Period       : 16; /* Transmit timer period */
     unsigned Recv_Timer_Period       : 16; /* Receive timer period */

} MEMORY_CARD_CONTROL_TYPE;

/* end */


/***************************************************************************
Include File Name:    system.h
Number/Version:
History:
          Date          Rev      Author          Description
          23-Mar-1993   0.0      C. Houlberg     Baseline

Abstract:
          System definitions external to DSP.
***************************************************************************/

/* EEPROM size used in checking RRT memory */

     #define     MEMORY_SIZE     0xffff         /* RRT EEPROM memory size */

/* Global buffer used for memory card IDs */

     extern      Memory_Card_ID;

/* Global buffer used for serial I/O (UART) data for fast communications */

     extern      serial_buffer[];
     extern      serial_response_time;

/* External definitions used for boot operation */

     extern      BOOT_LOCATION;                 /* Storage location for boot.c */
     extern      REPROGRAM;                     /* Reprogram starting boundary */

/* Definitions of variables external to DSP */

     extern      PAGELOW;
     extern      PAGEHIGH;

     extern      RS232;
     extern      RS422;
     extern      MS1553REGS;
     extern      GPIBREGS;
     extern      PPI1;
     extern      PPI2;
     extern      PPI3;
     extern      MS1553MEM;

typedef struct                           /* IC Memory Card address sections */
{
     unsigned Address                   : 23; /* Address within page bit range */
     unsigned Page_Number               :  4; /* Page number bit range */

} IC_MEMORY_CARD_TYPE;

     #define     CARD1_PAGE0     0x08      /* Card 1 page 0 page address */

typedef struct           /* Variable definitions pertaining to UART #1 & #2 usage */
{
     unsigned Data_Register            :  8; /* Input and Output Register */
     unsigned Unusable_0               : 24; /* Unusable bits */
```

```
     unsigned Status_Register;                    /* I/O status */

     unsigned Control_Register;                   /* Modem control register */

     unsigned Request_To_Send        :  1; /* Terminal's Request to send */
     unsigned Terminal_Ready         :  1; /* Terminal ready to receive */
     unsigned Not_Used_3             :  6; /* Unused bits */
     unsigned Unusable_3             : 24; /* Unusable bits */

} SERIAL_REG_TYPE;

typedef struct              /* Status Register bit definitions */
{
     unsigned Error                  :  3; /* 0 ==> No Error */
     unsigned Received_Break         :  1; /* 1 ==> Break received */
     unsigned Modem_Status_Change    :  1; /* 1 ==> Status has changed */
     unsigned Transmitting           :  1; /* 1 ==> Still Transmitting */
     unsigned Transmitter_Empty      :  1; /* 1 ==> Buffer register empty */
     unsigned Data_Ready             :  1; /* 1 ==> Data received */
     unsigned Unusable_1             : 24; /* Unusable bits */

} STATUS_REG_TYPE;

     /* Fail Flags */

     #define RS232_Fail              0x01
     #define RS422_Fail              0x02
     #define IEEE488_Fail            0x04
     #define MS1553_Fail             0x08

     /* Types of Errors */

     #define Parity_Error            0x01
     #define Framing_Error           0x02
     #define Overrun_Error           0x04

     /* Definitions for Control Register */

     #define     Stop_Mode           0x22  /* UART remote transmissions stopped */
     #define     CTS_Mode            0x23  /* UART ready to receive */
     #define     Test_Mode           0x3a  /* UART in loop test mode */
     #define Baud38400               0x98  /* 38,400 baudrate setting */
     #define Baud9600                0x9A  /* 9,600 baudrate setting */

     /* Serial receive buffer definitions */

     #define BUFFER_SIZE             4            /* Size of serial receive buffer */

typedef struct          /* Variable definitions pertaining to MS-1553 usage. */
{
     unsigned Not_Yet_Used;
} MS1553_REG_TYPE;

typedef struct          /* Variable definitions pertaining to GPIB usage. */
{
     unsigned Not_Yet_Used;

} GPIB_REG_TYPE;

typedef struct          /* Variable definitions pertaining to PPI #1 usage. */
{
     unsigned MS1553_Bus_Select;                  /* MS-1553 bus selection port */

     unsigned MS1553_Bus_Discretes;               /* Config. and boot discretes */

     unsigned RRT_RT_Address         :  6;        /* RRT Address and Parity */
     unsigned LCD_Display_Control    :  2;        /* Control signals to LCD */
     unsigned Unusable_2             : 24;        /* Unusable bits */

} PPI1_REG_TYPE;

     /* Definitions for MS1553_Bus_Select Register */

     #define EW_BUS             0x01  /* EW MS-1553 bus select */
     #define AV1_BUS            0x02  /* Avionics bus #1 select */
     #define AV2_BUS            0x04  /* Avionics bus #2 select */
     #define AV3_BUS            0x08  /* Avionics bus #3 select */
     #define AV4_BUS            0x10  /* Avionics bus #4 select */

     /* Definitions for MS1553_Bus_Discrete Register */

     #define SHORT_STUB         0x01  /* Short stub connection */
```

```
#define CENTERTAP_GND   0x02  /* Grounded centertap connection */
#define BOOT_ENABLE_SMS 0x10  /* SMS boot enabled */
#define BOOT_ENABLE_RDP 0x20  /* RDP boot enabled */
#define MSDRS_PWR_OFF   0x40  /* MSDRS turned off */

typedef struct          /* Variable definitions pertaining to PPI #2 usage. */
{
    unsigned EW_AV_Discretes;                   /* Equipment enables */

    unsigned AYK14_Discretes;                   /* Power and IPL discretes */

    unsigned IPL_Fail              :  4; /* AYK-14 IPL fail discretes */
    unsigned IC_Memory_Card_Page   :  4; /* IC memory card page */
    unsigned Unusable_2            : 24; /* Unusable bits */

} PPI2_REG_TYPE;

    /* Definitions pertaining to Memory Card */

    #define FOUR_MEG        0x0400000   /* Size of both Memory Card areas */
    #define MEMORY_CARD_0   0x0000000   /* Memory Card 0 start address */
    #define MEMORY_CARD_1   0x2000000   /* Memory Card 1 start address */

    #define WRITE_TIMEOUT   USEC14      /* Typical time is 10 uSecs */
    #define ERASE_TIMEOUT   SEC2        /* Typical time is 1.6 Secs */

typedef struct          /* Variable definitions pertaining to PPI #3 usage */
{
    unsigned Platform_ID            :  5;   /* Platform ID discretes */
    unsigned Not_Used_0             :  1;   /* Unused bit */
    unsigned Not_Execute            :  1;   /* 0 ==> Execute SW active */
    unsigned Not_Skip               :  1;   /* 0 ==> Skip SW active */
    unsigned Unusable_0             : 24;   /* Unusable bits */

    unsigned Platform_Configuration :  4;   /* Platform config. discretes */
    unsigned Skip_Extended_BIT      :  1;   /* Extended BIT discrete */
    unsigned Not_Used_1             :  1;   /* Unused bit (switch circuit) */
    unsigned Download               :  1;   /* 1 ==> Set for download */
    unsigned Verify                 :  1;   /* 1 ==> Set for Verify only */
    unsigned Unusable_1             : 24;   /* Unusable bits */

    unsigned RRT_Display;                       /* LCD display character */

} PPI3_REG_TYPE;

    /* Special Platform IDs */
    #define DIRECT_LOAD_CABLE       0x00
    #define NO_CABLE                0x1F

    #define SETTLE_TIME                 MSEC100         /* Switch settling time */

typedef struct          /* Bit definitions pertaining to status flags */
{
    unsigned UPLOAD                :  1;  /* Switch in upload position */
    unsigned DOWNLOAD              :  1;  /* Switch in download position */
    unsigned Reserved              :  2;  /* Reserved for future use */
    unsigned Library_Card_0        :  1;  /* Card 0 is a Library Card */
    unsigned Library_Card_1        :  1;  /* Card 1 is a Library Card */
    unsigned RRT_Program_Card_0    :  1;  /* Card 0 is an RRT Program Card */
    unsigned RRT_Program_Card_1    :  1;  /* Card 1 is an RRT Program Card */
    unsigned Reserved_Card_Use     :  8;  /* Reserved for future card use */
    unsigned Not_Used              : 16;  /* Unused bits */

} STATUS_FLAGS_TYPE;

    extern STATUS_FLAGS_TYPE status_flags;

/* end */

/*****************************************************************************
Include File Name:   boot.h
Number/Version:
History:
        Date          Rev     Author          Description
        17-Mar-1993   0.0     C. Houlberg     Baseline

Abstract:
        boot.c prototypes and definitions.
*****************************************************************************/

/*  boot.c contains the following functions:
*/
```

```
        void boot(int *source, int *pointer);
        int verify_eeprom(int word_count, int *data_store, int *data_buffer);
        void write_eeprom(int word_count, int *data_store, int *data_buffer);
        void enable_eeprom_write(void);
        void boot_error_display(int source, int *pointer, int error_condition);
        void boot_ascii_conversion(int hex_number, char *ascii_string);
        int boot_get_byte(int *source, int *pointer);
        int boot_get_nyble(int *source, int *pointer);
        int boot_get_character(int *source, int *pointer);
        int *boot_address_card_page(int card_address);

/*      Functions called
*/
        void dspinit(void);                                 /* Assembly routine */

/*      Definitions
*/
        #define PROM_PAGE_MASK              0x3f  /* Page boundary mask */
        #define SERIALIO_PORT               0x00  /* Serial I/O data source flag */
        #define MEMORY_CARD_LOW_BYTE        0x01  /* Memory card data source flag */
        #define MEMORY_CARD_HIGH_BYTE       0x02  /* Memory card data source flag */

/* end */


/*****************************************************************************
Module Name:    boot.c
Number/Version:
History:
        Date            Rev         Author          Description
        17-Mar-1993 0.0             C. Houlberg     Baseline

Abstract:
                Boot strap loader module
*****************************************************************************/

        /* Assigning the label "BOOT_LOCATION" to the beginning of ROM where the
                "boot.c" routine will be stored. */
        /* label command, code location label */
        asm("                   .label          _BOOT_LOCATION");

/*
        All definitions used by BOOT.C are defined in
                the following header files:
*/

#include "rrt.h"                        /* RRT configuration */
#include "dsp.h"                        /* DSP definitions */
#include "system.h"                     /* System definitions */
#include "timer.h"                      /* Time definitions for LCD display */
#include "display.h"                    /* LCD display definitions */
#include "error.h"                      /* Error definitions */
#include "boot.h"                       /* Program loader definitions */

/*****************************************************************************
Name:           boot
Number/Version:
History:
        Date            Rev         Author          Description
        17-Mar-1993 0.0             C. Houlberg     Baseline

Inputs:
        source
        pointer
Outputs:
        - None -
Global Data:
        - None -
Functions Referenced:
        serial_get_byte()
        serial_receive()
        serial_send()
        serial_send_string()
        LCD_display()
Abstract:
        writes RRT program code to EEPROM
*****************************************************************************/
void boot(int *source, int *pointer)
{
        TIMER_REG_TYPE *timer;                  /* Pointer to timer counter register */
        STATUS_REG_TYPE *status;                /* Pointer into serial status */
        int i, data, byte_count, temp;
```

```
int high_address, medium_address, low_address;
int record_type, checksum;
int word_count, *data_buffer, *data_store;
int error_condition, serial_status;
int mod4_record_count = 0;
char rotating_wheel[2];

timer = (TIMER_REG_TYPE *) &TIMER0;
status = (STATUS_REG_TYPE *) &serial_status;

data_buffer = (int *) &BUFFER_RAM;          /* Pointer to storage buffer */

high_address = 0;
medium_address = 0;

/* Loading record */
LCD_display(START_LINE1, "\fLoading Program");

for(;;)
{
      error_condition = NO_ERROR;                   /* Initially no error */

      do                                            /* do while statement */
      {
            data = boot_get_character(source, pointer);    /* Get input */

      } while(data != ':');               /* Wait for start of record */

      byte_count = boot_get_byte(source, pointer);    /* Byte count */
      if(byte_count & TYPE_MASK)
            error_condition = byte_count;
      else if(byte_count > (SIZE_BUFFER_RAM << 2))
            error_condition = RECORD_LENGTH_ERROR;
      else
            checksum = byte_count;

      if(!error_condition)                          /* Execute if no error */
      {
            /* Get the record address */
            low_address = boot_get_byte(source, pointer);
            if(low_address & TYPE_MASK)
                  error_condition = low_address;
      }
      if(!error_condition)                          /* Execute if no error */
      {
            checksum += low_address;

            low_address = (low_address << 8) + boot_get_byte(source,
            pointer);
            if(low_address & TYPE_MASK)
                  error_condition = low_address;
      }
      if(!error_condition)                          /* Execute if no error */
      {
            checksum += (0xff & low_address);

            record_type = boot_get_byte(source, pointer); /* Get type */
            if(record_type & TYPE_MASK)
                  error_condition = record_type;
            else
                  checksum += record_type;          /* Update the checksum */
      }

      if((record_type == 0x00) && !error_condition)    /* Data */
      {
            /* Display rotating wheel */
            switch(mod4_record_count++)
            {
                  case 0:
                        rotating_wheel[0] = BACK_SLASH;
                        break;
                  case 1:
                        rotating_wheel[0] = '|'
                        break;
                  case 2:
                        rotating_wheel[0] = '/';
                        break;
                  default:
                        rotating_wheel[0] = '-';
                        mod4_record_count = 0;
            }
```

```
rotating_wheel[1] = 0;                              /* End of string */
LCD_display(START_LINE1 + 16, &rotating_wheel[0]);

word_count = (byte_count >> 2);                     /* 4 bytes/word */
for(i = 0; (i < word_count) && !error_condition; i++)
{
      data = boot_get_byte(source, pointer);     /* Get byte */
      if(data & TYPE_MASK)
            error_condition = data;
      else
      {
            checksum += data;       /* Update the checksum */

            /* 16 bits of word */
            data = (data << 8) + boot_get_byte(source, pointer);
            if(data & TYPE_MASK)
                  error_condition = data;
      }
      if(!error_condition)          /* Execute if no error */
      {
            checksum += (0xff & data);

            /* 24 bits of word */
            temp = boot_get_byte(source, pointer);
            if(temp & TYPE_MASK)
                  error_condition = temp;
      }
      if(!error_condition)          /* Execute if no error */
      {
            data = (data << 8) + temp;
            checksum += (0xff & data);

            /* 32 bit word */
            temp = boot_get_byte(source, pointer);
            if(temp & TYPE_MASK)
                  error_condition = temp;
            else
            {
              data = (data << 8) + temp;
              checksum += (0xff & data);
              *(data_buffer + i) = data;  /* Put data in buffer */
            }
      }
}

if(!error_condition)                  /* Execute if no error */
{
      checksum &= 0xff;             /* Mask for error test */
      checksum += boot_get_byte(source, pointer);
      if(checksum & TYPE_MASK)
            error_condition = checksum;
      else if(checksum & 0xff)            /* Test for error */
            error_condition = CHECKSUM_ERROR;   /* Boot_error */
      else
      {
            /* To store or not to store, that is the question */
            data_store = (int *) (high_address
                  + medium_address + low_address);
            if(data_store < &REPROGRAM)
            {
                  if((data_store + word_count - 1) < &REPROGRAM)
                  {
                        /* Just verify the EEPROM contents */
                        error_condition = verify_eeprom(word_count,
                              data_store, data_buffer);
                  }
                  else  /* Partial record contains program update */
                  {
                        /* Data amount not stored */
                        temp = &REPROGRAM - data_store;

                        /* Just verify this part of the record */
                        error_condition = verify_eeprom(temp,
                              data_store, data_buffer);

                        if(!error_condition)
                        {
                              /* Update and verify this part of the
                              record */
                              write_eeprom(word_count - temp,
                                    &REPROGRAM, data_buffer + temp);
```

```
                        error_condition =
                            verify_eeprom(word_count - temp,
                            &REPROGRAM, data_buffer + temp);
                    }
                }
            }
            else        /* Entire record contains program update */
            {
                write_eeprom(word_count, data_store, data_buffer);

                error_condition = verify_eeprom(word_count,
                    data_store, data_buffer);
            }
        }
    }
}

/* Have end of file record */
else if((record_type == 0x01) && !error_condition)
{
    checksum += boot_get_byte(source, pointer);
    if(checksum & TYPE_MASK)
        error_condition = checksum;
    else if(!(byte_count) && !(low_address) && !(checksum & 0xff))
    {
        if(*source == SERIALIO_PORT)
        {
            serial_send_string(
                "\r\nUpdate completed\r\n",
                (SERIAL_REG_TYPE *) pointer);
            /* Wait for message to get out */
            timer->Timer_Counter = HALFSEC;
            while(timer->Timer_Counter);
        }

        /* Reinitialize and restart new RRT program */
        dspinit();
    }
    else
        error_condition = CHECKSUM_ERROR;/* Improper termination */
    }

    /* Have extended segment address record */
    else if((record_type == 0x02) && !error_condition)
    {
        high_address = 0;       /* Not using extended linear address */

        if(byte_count != 0x02)  /* Have 2 bytes for address */
            error_condition = RECORD_TYPE_ERROR;
        if(!error_condition)
        {
            medium_address = boot_get_byte(source, pointer);
            if(medium_address & TYPE_MASK)
                error_condition = medium_address;
        }
        if(!error_condition)
        {
            checksum += medium_address;

            medium_address = (medium_address << 8)
                + boot_get_byte(source, pointer);
            if(medium_address & TYPE_MASK)
                error_condition = medium_address;
        }
        if(!error_condition)
        {
            checksum += (0xff & medium_address);
            medium_address = (medium_address << 4);

            checksum &= 0xff;           /* Mask for error test */
            checksum += boot_get_byte(source, pointer);
            if(checksum & TYPE_MASK)
                error_condition = checksum;
            else if(checksum & 0xff)
                error_condition = CHECKSUM_ERROR;
        }
    }

    /* Have extended linear address record */
    else if((record_type == 0x04) && !error_condition)
    {
        medium_address = 0;                 /* Not using segment address */
```

```
if(byte_count != 0x02)              /* Have 2 bytes for address */
      error_condition = RECORD_TYPE_ERROR;
if(!error_condition)
{
      high_address = boot_get_byte(source, pointer);
      if(high_address & TYPE_MASK)
            error_condition = high_address;
}
if(!error_condition)
{
      checksum += high_address;

      high_address = (high_address << 8)
            + boot_get_byte(source, pointer);
                        if(high_address & TYPE_MASK)
                              error_condition = high_address;
                  }
                  if(!error_condition)
                  {
                        checksum += (0xff & high_address);
                        high_address = high_address << 16;

                        checksum += boot_get_byte(source, pointer);
                        if(checksum & TYPE_MASK)
                              error_condition = checksum;
                        else if(checksum & 0xff)
                              error_condition = CHECKSUM_ERROR;
                  }
            }

            else if(!error_condition)
                  error_condition = RECORD_TYPE_ERROR;

            if(error_condition)                         /* If error wait here for retry */
            {
                  /* Indicate Error */
                  boot_error_display(*source, pointer, error_condition);

                  error_condition = NO_ERROR;         /* Reset error flag */
                  high_address = 0;                   /* Reset address pointers */
                  medium_address = 0;
                  if(*source != SERIALIO_PORT)
                        *source = MEMORY_CARD_LOW_BYTE;

                  LCD_display(START_LINE1, "\fLoading Program");
                  LCD_display(START_LINE2, "Proceed with Retry");
            }
      }
}

/******************************************************************************
Name:       enable_eeprom_write
Number/Version:
History:
            Date        Rev         Author        Description
            17-Mar-1993 0.0         C. Houlberg   Baseline

Inputs:
            - Void -
Outputs:
            - None -
Global Data:
            - None -
Functions Referenced:

Abstract:

******************************************************************************/
void enable_eeprom_write(void)
{
      int *pointer;

      pointer = (int *) 0x5555;
      *pointer = 0xaaaaaaaa;

      pointer = (int *) 0x2aaa;
      *pointer = 0x55555555;

      pointer = (int *) 0x5555;
      *pointer = 0xa0a0a0a0;
}
```

```
/*******************************************************************************
Name:       write_eeprom
Number/Version:
History:
            Date         Rev       Author          Description
            17-Mar-1993  0.0       C . Houlberg    Baseline

Inputs:
            word_count
            data_store
            data_buffer
Outputs:
            - None -
Global Data:
            - None -
Functions Referenced:
            enable_eeprom_write()
Abstract:
            Returns error status
*******************************************************************************/
void write_eeprom(int word_count, int *data_store, int *data_buffer)
{
      int i;

      enable_eeprom_write();

      for(i = 0; i < word_count; i++)
      {
            /* This loop cycle time must take 1 usec. to satisfy the
                  minimum byte load cycle time of the EEPROM */

            /* Crossing page boundary? */
            if(!((int)(data_store + i) & PROM_PAGE_MASK) && i)
            {
                  /* Data polling, wait for last written word to compare.
                        This will take from 5 to 10 msecs. */

                  /* Wait for EEPROM page transfer to complete */
                  while(*(data_store + i - 1) != *(data_buffer + i - 1));

                  enable_eeprom_write();        /* Allow additional data writes */
            }
            *(data_store + i) = *(data_buffer + i);
      }

      /* Data polling, wait for last written word to compare.
            This will take from 5 to 10 msecs. */

      while(*(data_store + word_count - 1) != *(data_buffer + word_count - 1));

      return;
}

/*******************************************************************************
Name:       verify_eeprom
Number/Version:
History:
            Date         Rev       Author          Description
            03-Apr-1993  0.0       C. Houlberg     Baseline

Inputs:
            word_count
            data_store
            data_buffer
Outputs:
            error_condition
Global Data:
            - None -
Functions Referenced:

Abstract:
            Returns error status
*******************************************************************************/
int verify_eeprom(int word_count, int *data_store, int *data_buffer)
{
      int i, error_condition;

      error_condition = NO_ERROR;

      /* Verify data properly stored */
      for(i = 0; ((i < word_count) && !error_condition); i++)
            if(*(data_store + i) != *(data_buffer + i))
                  error_condition = VERIFY_ERROR;
```

```
    return error_condition;
}

/*****************************************************************************
Name:           boot_error_display
Number/Version:
History:
                Date          Rev      Author          Description
                17-Mar-1993   0.0      C. Houlberg     Baseline
Inputs:
                source
                *pointer
                error_condition
Outputs:
                - None -
Global Data:
                - None -
Functions Referenced:

Abstract:

*****************************************************************************/
void boot_error_display(int source, int *pointer, int error_condition)
{
    SERIAL_REG_TYPE *serial_reg;
    STATUS_REG_TYPE *status;
    PPI3_REG_TYPE *switch_status;        /* Switch status pointer */
    TIMER_REG_TYPE *timer;               /* Pointer to timer counter register */

    int data, serial_status;
    char ascii_string[5];

    status = (STATUS_REG_TYPE *) &serial_status;
    switch_status = (PPI3_REG_TYPE *) &PPI3;
    timer = (TIMER_REG_TYPE *) &TIMER0;

    LCD_display(START_LINE1, "\fERROR:");

    switch(error_condition & TYPE_MASK)
    {
        case SERIAL_INPUT_ERROR:            /* Processed under serial I/O errors */
            break;
        case HEX_CHARACTER_ERROR:
            LCD_display(START_LINE1 + 7, "HEX Character");
            break;
        case RECORD_LENGTH_ERROR:
            LCD_display(START_LINE1 + 7, "Record Length");
            break;
        case CHECKSUM_ERROR:
            LCD_display(START_LINE1 + 7, "Checksum");
            break;
        case RECORD_TYPE_ERROR:
            LCD_display(START_LINE1 + 7, "Record Type");
            break;
        case VERIFY_ERROR:
            LCD_display(START_LINE1 + 7, "Data Verify");
            break;
        default:
            LCD_display(START_LINE1 + 7, "RRT Code\rUnexpected");
            boot_ascii_conversion(error_condition >> 16, &ascii_string[0]);
            LCD_display(START_LINE2 + 12, &ascii_string[0]);
            boot_ascii_conversion(error_condition, &ascii_string[0]);
            LCD_display(START_LINE2 + 16, &ascii_string[0]);
            for(;;);
            break;                                          /* Permanent Trap */
    }

    if(source == SERIALIO_PORT)                             /* Serial I/O error */
    {
        serial_reg = (SERIAL_REG_TYPE *) pointer;

        serial_send_string("\r\nWARNING!!, PROGRAM ERROR!!\r\n", serial_reg);

        switch(error_condition & TYPE_MASK)
        {
            case SERIAL_INPUT_ERROR:
                LCD_display(START_LINE2, "Character ");
                switch(error_condition & ~TYPE_MASK)  /* Determine error */
```

```
            {
                  case Framing_Error:
                        serial_send_string("Framing", serial_reg);
                        LCD_display(START_LINE2 + 10, "Framing");
                        break;
                  case Overrun_Error:
                        serial_send_string("Overrun", serial_reg);
                        LCD_display(START_LINE2 + 10, "Overrun");
                        break;
                  case Parity_Error:
                        serial_send_string("Parity", serial_reg);
                        LCD_display(START_LINE2 + 10, "Parity");
                        break;
            }
            break;
      case HEX_CHARACTER_ERROR:
            serial_send_string("HEX Character", serial_reg);
            break;
      case RECORD_LENGTH_ERROR:
            serial_send_string("Record Length", serial_reg);
            break;
      case CHECKSUM_ERROR:
            serial_send_string("Checksum", serial_reg);
            break;
      case RECORD_TYPE_ERROR:
            serial_send_string("Record Type", serial_reg);
            break;
      case VERIFY_ERROR:
            serial_send_string("Data Verify", serial_reg);
            break;
      }

      serial_send_string(" Error\r\n", serial_reg);  /* End of display */

      serial_send_string("To Retry type R.\r\n", serial_reg);

      do                                            /* do while statement */
      {
            serial_status = serial_reg->Status_Register;
            if(status->Data_Ready)                  /* Character received */
                  data = serial_reg->Data_Register;

      } while(data != 'R');                         /* Wait for retry command */

      serial_send(data, serial_reg);                /* Echo "R" character */

      serial_send_string("\r\n", serial_reg);
      serial_send_string("Proceed with Retry", serial_reg);
      serial_send_string("\r\n", serial_reg);
}
else
{
      LCD_display(START_LINE2, "EXEC to Retry");

      while(switch_status->Not_Execute);  /* Wait for switch closure */

      /* Allow time for switch to settle. */

            timer->Timer_Counter = SETTLE_TIME;
            while(timer->Timer_Counter)
                  /* Make sure switch is open */
                  if(!(switch_status->Not_Execute)
                        || !(switch_status->Not_Skip))
                        timer->Timer_Counter = SETTLE_TIME;
      }
}
/*****************************************************************************Name:
boot_ascii_conversion
Number/Version:
History:
            Date          Rev       Author         Description
            9-Aug-1993    0.0       C. Houlberg    Baseline

Inputs:
            hex_number
Outputs:
            ascii_string
Global Data:
            - None -
Functions Referenced:
            - None -
Abstract:
```

```
            Convert the least 16 bits into an ascii character string.
******************************************************************************/
void boot_ascii_conversion(int hex_number, char *ascii_string)
{
      int i, temp;

      for(i = 0; i < 4; i++)
      {
            temp = 0x0f & hex_number;
            if(temp <= 9)
                  temp += '0';
            else
                  temp += ('A' - 0x0a);
            *(ascii_string + 3 - i) = ( char )temp;
            hex_number = hex_number >> 4;
      }
      *(ascii_string + 4) = 0;                       /* End of string indicator */
}

/******************************************************************************
Name:         boot_get_byte
Number/Version:
History:
              Date          Rev       Author        Description
              9-Aug-1993    0.0       C. Houlberg   Baseline

Inputs:
              *source
              *pointer
Outputs:
              byte
Global Data:
              - None -
Functions Referenced:
              - None -
Abstract:
              Gets an byte from either the memory card
                  or the serial port.
******************************************************************************/
int boot_get_byte(int *source, int *pointer)
{
      int nyble, byte;

      if(*source == SERIALIO_PORT)
      {
            byte = serial_get_byte((SERIAL_REG_TYPE *) pointer);
      }
      else
      {
            byte = boot_get_nyble(source, pointer);
            if(!(byte & TYPE_MASK))
            {
                  nyble = boot_get_nyble(source, pointer);
                  if(nyble & TYPE_MASK)
                        byte = nyble;                 /* Need to return error */
                  else
                        byte = (byte << 4) + nyble;
            }
      }

      return byte;
}

/******************************************************************************Name:
boot_get_nyble
Number/Version:
History:
              Date          Rev       Author        Description
              9-Aug-1993    0.0       C. Houlberg   Baseline

Inputs:
              *source
              *pointer
Outputs:
              byte
Global Data:
              - None -
Functions Referenced:
              - None -
Abstract:
              Gets an byte from either the memory card
                  or the serial port.
******************************************************************************/
```

```
int boot_get_nyble(int *source, int *pointer)
{
        int character, nyble;

        character = boot_get_character(source, pointer);

    if((character >= '0') && (character <= '9'))
          nyble = character - '0';
    else if((character >= 'a') && (character <= 'f'))
          nyble = character - 'a' + 0x0a;
    else if((character >= 'A') && (character <= 'F'))
          nyble = character - 'A' + 0x0a;
    else
          nyble = HEX_CHARACTER_ERROR;

    return nyble;
}

/*****************************************************************************
Name:           boot_get_character
Number/Version:
History:
                Date          Rev       Author          Description
                9-Aug-1993    0.0       C. Houlberg     Baseline

Inputs:
                *source
                *pointer
Outputs:
                character
Global Data:
                - None -
Functions Referenced:
                - None -
Abstract:
                Gets an ASCII character from either the memory card
                      or the serial port.
*****************************************************************************/
int boot_get_character(int *source, int *pointer)
{
      int character, *system_address;

      if(*source == MEMORY_CARD_LOW_BYTE)
      {
            /* Address card page and return system_address */
            system_address = boot_address_card_page(*pointer);

            /* Extract character from memory card */
            character = 0xff & (*system_address);
            /* Updata source for next access */
            *source = MEMORY_CARD_HIGH_BYTE;
      }
      else if(*source == MEMORY_CARD_HIGH_BYTE)
      {
            /* Address card page and return system_address */
            system_address = boot_address_card_page((*pointer)++);

            /* Extract character from memory card */
            character = 0xff & ((*system_address) >> 8);
            /* Update source for next access */
            *source = MEMORY_CARD_LOW_BYTE;
      }
      else
            character = serial_receive((SERIAL_REG_TYPE *) pointer);

      return character;
}

/*****************************************************************************
Name:           boot_address_card_page
Number/Version:
History:
                Date          Rev       Author          Description
                9-Aug-1993    0.0       C. Houlberg     Baseline

Inputs:
                source
                pointer
Outputs:
                character
```

```
Global Data:
            - None -
Functions Referenced:
            - None -
Abstract:
            Gets an ASCII character from either the memory card
                  or the serial port.
******************************************************************************/

int *boot_address_card_page(int card_address)
{
      PPI2_REG_TYPE *page_pointer;                /* IC Memory Card page pointer */
      IC_MEMORY_CARD_TYPE *address_pointer;       /* Pointer to address */

      int system_address;

      page_pointer = (PPI2_REG_TYPE *) &PPI2;
      address_pointer = (IC_MEMORY_CARD_TYPE *) &card_address;

      /* Adjust card_address for word access addressing (A0 ignored by card) */
      card_address = (card_address << 1);

      /* Output page number */
      page_pointer->IC_Memory_Card_Page = address_pointer->Page_Number;

      /* Extract address */
      system_address = address_pointer->Address;

      /* Map address to proper location */
      if(system_address < FOUR_MEG) /* Address within 1st 4M words of page */
            system_address += (int) &PAGELOW;
      else
                                    /* Address within 2nd 4M words of page */
            system_address += (int) &PAGEHIGH - FOUR_MEG;

      return (int *) system_address;
}

/* end */

/******************************************************************************
Include File Name:    serialio.h
Number/Version:
History:
            Date         Rev     Author          Description
            17-Mar-1993  0.0     C. Houlberg     Baseline

Abstract:
            serialio.c prototypes for RS-232 or RS-422 UARTS.
******************************************************************************/

/*    serialio.c contains the following functions:
*/
      int  serial_get_byte(SERIAL_REG_TYPE *serial_reg);
      int  serial_get_nyble(SERIAL_REG_TYPE *serial_reg);
      void serial_put_byte(int data, SERIAL_REG_TYPE *serial_reg);
      void serial_put_nyble(int data, SERIAL_REG_TYPE *serial_reg);
      int  serial_receive(SERIAL_REG_TYPE *serial_reg);
      int  serial_data(SERIAL_REG_TYPE *serial_reg, STATUS_REG_TYPE *status);
      void serial_send(int data, SERIAL_REG_TYPE *serial_reg);
      void serial_send_string(char *string, SERIAL_REG_TYPE *serial_reg);

/*    ASCII characters definitions
*/
      #define          ESC         0x1b              /* Escape character */

/* end */

/******************************************************************************
Module Name:  serialio.c
Number/Version:
History:
            Date         Rev     Author          Description
            17-Mar-1993  0.0     C. Houlberg     Baseline

Abstract:
            Serial I/O (UART) processing
******************************************************************************/

/*
      All definitions used by SERIALIO.C are defined in the
            following header files:
*/
```

```
#include "rrt.h"                        /* RRT configuration */
#include "dsp.h"                        /* DSP definitions */
#include "system.h"                     /* System definitions */
#include "timer.h"                      /* Timer definitions */
#include "display.h"                    /* LCD display definitions */
#include "error.h"                      /* Error definitions */
#include "serialio.h"                   /* Serial I/O definitions */

/* Global serial receive buffer */
int serial_buffer[BUFFER_SIZE];
int serial_response_time = RESPONSE_TIME_9600;

/****************************************************************************
Name:        serial_get_byte
Number/Version:
History:
             Date        Rev      Author           Description
             17-Mar-1993 0.0      C. Houlberg      Baseline

Inputs:
             serial_reg
Outputs:
             data
Global Data:
             - None -
Functions Referenced:
             serial_get_nyble()
Abstract:

****************************************************************************/
int serial_get_byte(SERIAL_REG_TYPE *serial_reg)
{
      /*
            serial_reg->Status_Register must not be read since the
            reception of the last character.  Reading
            serial_reg->Status_Register will clear all of its bits
            and cause the detected character to be lost.
      */
      int data, temp;

      /* Get the most significant nyble */
      data = serial_get_nyble(serial_reg);

      if(!(data & TYPE_MASK))
      {
            /* Get the least */
            temp = serial_get_nyble(serial_reg);

            if(temp & TYPE_MASK)
                  data = temp;
            else
                  data = (data << 4) + temp;

      }

      return data;
}

/****************************************************************************
Name:        serial_get_nyble
Number/Version:
History:
             Date        Rev      Author           Description
             17-Mar-1993 0.0      C. Houlberg      Baseline

Inputs:
             serial_reg
Outputs:
             data
Global Data:
             - None -
Functions Referenced:
             serial_receive()
             error_hex_character()
Abstract:

****************************************************************************/
int serial_get_nyble(SERIAL_REG_TYPE *serial_reg)
{
      /*
```

```
        serial_reg->Status_Register must not be read since the
        reception of the last character.  Reading
        serial_reg->Status_Register will clear all of its bits
        and cause the detected character to be lost.
    */
    int data;

    data = serial_receive(serial_reg);         /* Should be hex byte */

    if(!(data & TYPE_MASK))
    {
        if((data >= '0') && (data <= '9')) /* Data must be valid hex number */
                data -= '0';
        else if((data >= 'A') && (data <= 'F'))      /* Upper case hex */
                data -= ('A' - 0x0a);
        else if((data >= 'a') && (data <= 'f')) /* Lower case hex */
                data -= ('a' - 0x0a);
        else
                data = HEX_CHARACTER_ERROR;
    }

    return data;
}

/******************************************************************************
Name:         serial_put_byte
Number/Version:
History:
              Date         Rev      Author        Description
              17-Mar-1993 0.0      C. Houlberg   Baseline

Inputs:
              serial_reg
Outputs:
              - None -
Global Data:
              - None -
Functions Referenced:
              serial_put_nyble()
Abstract:

******************************************************************************/
void serial_put_byte(int data, SERIAL_REG_TYPE *serial_reg)
{
    /* Send most significant nyble */
    serial_put_nyble((data & 0x0f0) >> 4, serial_reg);
    /* Now send the least */
    serial_put_nyble(data & 0x0f, serial_reg);
}

/******************************************************************************
Name:         serial_put_nyble
Number/Version:
History:
              Date         Rev      Author        Description
              17-Mar-1993 0.0      C. Houlberg   Baseline

Inputs:
              serial_reg
Outputs:
              - None -
Global Data:
              - None -
Functions Referenced:
              serial_get_nyble()
Abstract:

******************************************************************************/
void serial_put_nyble(int data, SERIAL_REG_TYPE *serial_reg)
{
    if(data <= 0x09)                           /* Must send ASCII hex value */
          serial_send(data + '0', serial_reg);
    else
          serial_send(data - 0x0a + 'A', serial_reg);
}

/******************************************************************************
Name:         serial_receive
Number/Version:
History:
              Date         Rev   Author              Description
```

```
        17-Mar-1993 0.0   C. Houlberg      Baseline
Inputs:
        serial_reg
Outputs:
        data
Global Data:
        serial_buffer[]
Functions Referenced:
        serial_data()
Abstract:
        serial_reg->Status_Register must not be read since
        the reception of the last character.  Reading
        serial_reg->Status_Register will clear all of its bits
        and cause the detected character to be lost.
*****************************************************************************/
int serial_receive(SERIAL_REG_TYPE *serial_reg)
{
    STATUS_REG_TYPE *status;
    TIMER_REG_TYPE *timer;           /* Pointer to timer counter register */

    int data, i;
    unsigned serial_status;

    timer = (TIMER_REG_TYPE *) &TIMER0;
    serial_status = serial_reg->Status_Register;
    status = (STATUS_REG_TYPE *) &serial_status;

    if(serial_buffer[0])
    {
        data = serial_buffer[1];
        for(i = 1; i < serial_buffer[0]; i++)
            serial_buffer[i] = serial_buffer[i + 1];
        --serial_buffer[0];
    }
    else if(!(status->Data_Ready))          /* Might not have data yet */
    {
        /* Ensure ready to receive more data */
        serial_reg->Control_Register = CTS_Mode;

        /* Wait for received data */
        do                                   /* do while statement */
        {
            serial_status = serial_reg->Status_Register;

        } while(!(status->Data_Ready));

        /* Not ready to receive any more */
        serial_reg->Control_Register = Stop_Mode;

        data = serial_data(serial_reg, status);

        if(!(data & TYPE_MASK))
        {
         timer->Timer_Counter = serial_response_time;
         serial_buffer[0] = 0;
         while(timer->Timer_Counter && !(data & TYPE_MASK))
         {
            serial_status = serial_reg->Status_Register;
            if(status->Data_Ready)
            {
                serial_buffer[++(serial_buffer[0])]
                    = serial_data(serial_reg, status);
                if(serial_buffer[serial_buffer[0]] & TYPE_MASK) /* Error */
                    data = serial_buffer[serial_buffer[0]];
                else if(serial_buffer[0] == (BUFFER_SIZE - 1))  /* Error */
                    data = SERIAL_INPUT_ERROR + Overrun_Error;
                else
                    timer->Timer_Counter = serial_response_time;
                }
         }
        }
    }
    else
        data = serial_data(serial_reg, status);

    return data;
}
```

```
/******************************************************************************
Name:         serial_data
Number/Version:
History:
              Date          Rev   Author          Description
              17-Mar-1993   0.0   C. Houlberg     Baseline

Inputs:
              serial_reg
Outputs:
              data
Global Data:
              - None -
Functions Referenced:
              serial_get_nyble()
Abstract:
              serial_reg->Status_Register must be read prior to entering
              this routine.  This will ensure proper error processing
              and the return of received data.
******************************************************************************/
int serial_data(SERIAL_REG_TYPE *serial_reg, STATUS_REG_TYPE *status)
{
      int data;

      if(status->Error)                               /* Test for errors */
          data = SERIAL_INPUT_ERROR + (int) status;
      else
      {
          data = serial_reg->Data_Register; /* data = received character */

          if(data != ESC)                   /* Do not echo ESC character */
             serial_send(data, serial_reg); /* Echo data back (full duplex) */
      }

      return data;
}

/******************************************************************************
Name:         serial_send
Number/Version:
History:
              Date          Rev   Author          Description
              17-Mar-1993   0.0   C. Houlberg     Baseline

Inputs:
              serial_reg
Outputs:
              data
Global Data:
              - None -
Functions Referenced:
              error_serial_input()
              send_message()
Abstract:
              Sends an ASCII character
******************************************************************************/
void serial_send(int data, SERIAL_REG_TYPE *serial_reg)
{
      STATUS_REG_TYPE *status;
      unsigned serial_status;

      serial_status = serial_reg->Status_Register;
      status = (STATUS_REG_TYPE *) &serial_status;

      serial_reg->Data_Register = data;   /* Send serial data */

      /* Wait until through sending */
      while(!(status->Transmitter_Empty))
          serial_status = serial_reg->Status_Register;
}

/******************************************************************************
Name:         serial_send_string
Number/Version:
History:
              Date          Rev   Author          Description
              17-Mar-1993   0.0   C. Houlberg     Baseline

Inputs:
              serial_reg
Outputs:
              data
```

```
Global Data:
            - None -
Functions Referenced:
            serial_send()
Abstract:
            Display string message
*****************************************************************************/
void serial_send_string(char *string, SERIAL_REG_TYPE *serial_reg)
{
      for(;*string != '\0';string++)                     /* Send the string */
            serial_send(*string, serial_reg);
}

/* end */


/*****************************************************************************
Include File Name:    display.h
Number/Version:
History:
            Date        Rev  Author         Description
            17-Mar-1993 0.0  C. Houlberg    Baseline
Abstract:
            display.c prototypes and definitions
*****************************************************************************/

/*    display.c contains the following functions:
*/
      void LCD_initialize(void);                        /* LCD initialize routine */
      void LCD_display(int location, char string[]);    /* LCD display routine */

/*    Definitions of display line locations.
*/
      #define START_LINE1              0x00        /* Line 1 start location */
      #define START_LINE2              0x40        /* Line 2 start location */
      #define BACK_SLASH               0x100       /* Back Slash character */
      #define LINE_LENGTH              20          /* Length of LCD line */

/*    Definitions of display control codes.
*/
      #define Control_Select           0x00        /* Clear control lines */
      #define Data_Select              0x01        /* Data Register Select */
      #define Control_Enable           0x02        /* Enable control signals to display */
      #define Data_Enable              0x03        /* Enable data signals to display */

      #define Initialize               0x30        /* Initialize the display */
      #define Clear_Display            0x01        /* Clear display and return home */
      #define Entry_Mode_Set           0x06        /* Increment cursor, do not shift */
      #define Cursor_Off               0x0c        /* Cursor off */
      #define Function_Set             0x38        /* 2 lines of 5X7 dot characters */
      #define Address_Set              0x80        /* Character location */
      #define Char_Gen_Address         0x40        /* Character Generator location */

/* end */


/*****************************************************************************
Module Name:    display.c
Number/Version:
History:
            Date        Rev  Author         Description
            17-Mar-1993 0.0  C. Houlberg    Baseline
Abstract:
                  LCD display functions
*****************************************************************************/
/*
      All definitions used by DISPLAY.C are defined in the
            following header files:
*/

#include "rrt.h"                                  /* RRT configuration */
#include "dsp.h"                                  /* DSP definitions */
#include "system.h"                               /* System definitions */
#include "timer.h"                                /* Timer definitions */
#include "display.h"                              /* Display definitions */

/*****************************************************************************
Name:         LCD_initialize
Number/Version:
```

```
History:
          Date        Rev  Author           Description
          17-Mar-1993 0.0  C. Houlberg      Baseline
Inputs:
          - None -
Outputs:
          - None -
Global Data:
          - None -
Functions Referenced:
          - None -
Abstract:
          Initializes the LCD display
*****************************************************************************/
void LCD_initialize(void)
{
    PPI1_REG_TYPE *control;                  /* Pointer to LCD control lines */
    PPI3_REG_TYPE *display;                  /* Pointer to LCD data lines */
    TIMER_REG_TYPE *timer;                   /* Pointer to timer counter register */
    int i;

    control = (PPI1_REG_TYPE *) &PPI1;
    display = (PPI3_REG_TYPE *) &PPI3;
    timer = (TIMER_REG_TYPE *) &TIMER0;

    /* 15 msec delay (required delay following power on) */
    for (i = 1; i <= 15; i++)
    {
        timer->Timer_Counter = MSEC1; /* msec. delay */
        while(timer->Timer_Counter);  /* delay done when counter = 0 */
    }

    /* Insure all control lines are cleared */
    control->LCD_Display_Control = Control_Select;

    /* Initialize the display for valid busy flag */
    display->RRT_Display = Initialize;
    control->LCD_Display_Control = Control_Enable;
    control->LCD_Display_Control = Control_Select;

    /* 5 msec delay (must be >= 4.1 msec) */
    for (i = 1; i <= 5; i++)
    {
        timer->Timer_Counter = MSEC1; /* msec. delay */
        while(timer->Timer_Counter);  /* delay done when counter = 0 */
    }

    /* Initialize command again */
    control->LCD_Display_Control = Control_Enable;
    control->LCD_Display_Control = Control_Select;

    /* 100 usec delay */
    timer->Timer_Counter = USEC100;
    while(timer->Timer_Counter);  /* delay done when counter = 0 */

    /* Initialize command again */
    control->LCD_Display_Control = Control_Enable;
    control->LCD_Display_Control = Control_Select;

    /* 100 usec delay */
    timer->Timer_Counter = USEC100;
    while(timer->Timer_Counter);  /* delay done when counter = 0 */

    /* Ensure the display is cleared */
    display->RRT_Display = Clear_Display;
    control->LCD_Display_Control = Control_Enable;
    control->LCD_Display_Control = Control_Select;

    /* 2 msec delay for display to clear (typically takes 1.64 msecs) */
    for (i = 1; i <= 2; i++)
    {
        timer->Timer_Counter = MSEC1; /* msec. delay */
        while(timer->Timer_Counter);  /* delay done when counter = 0 */
    }

    /* Set the entry mode */
    display->RRT_Display = Entry_Mode_Set;
    control->LCD_Display_Control = Control_Enable;
    control->LCD_Display_Control = Control_Select;
```

```
/* 50 usec delay to next character (typically takes 40 usecs) */
timer->Timer_Counter = USEC50;
while(timer->Timer_Counter);  /* delay done when counter = 0 */

/* Cursor is off */
display->RRT_Display = Cursor_Off;
control->LCD_Display_Control = Control_Enable;
control->LCD_Display_Control = Control_Select;

/* 50 usec delay to next character (typically takes 40 usecs) */
timer->Timer_Counter = USEC50;
while(timer->Timer_Counter);  /* delay done when counter = 0 */

/* Set the number of lines and the character size */
display->RRT_Display = Function_Set;
control->LCD_Display_Control = Control_Enable;
control->LCD_Display_Control = Control_Select;

/* 50 usec delay to next character (typically takes 40 usecs) */
timer->Timer_Counter = USEC50;
while(timer->Timer_Counter);  /* delay done when counter = 0 */

/* Create special character (BACK_SLASH = character code 0x100) */
display->RRT_Display = Char_Gen_Address + 0;    /* First scan line */
control->LCD_Display_Control = Control_Enable;
control->LCD_Display_Control = Control_Select;
control->LCD_Display_Control = Data_Select;

/* 50 usec delay to character (typically takes 40 usecs) */
timer->Timer_Counter = USEC50;
while(timer->Timer_Counter);  /* delay done when counter = 0 */

for(i = 0x20; i > 0; i = i >> 1)
{
      display->RRT_Display = i;
      control->LCD_Display_Control = Data_Enable;
      control->LCD_Display_Control = Data_Select;

      /* 50 usec delay to character (typically takes 40 usecs) */
      timer->Timer_Counter = USEC50;
      while(timer->Timer_Counter);  /* delay done when counter = 0 */
}
/* Zero ASCII port */
display->RRT_Display = 0;
for(i = 1; i <= 2 ; i++)
{
      control->LCD_Display_Control = Data_Enable;
      control->LCD_Display_Control = Data_Select;

      /* 50 usec delay to character (typically takes 40 usecs) */
      timer->Timer_Counter = USEC50;
      while(timer->Timer_Counter);  /* delay done when counter = 0 */
}
}

/******************************************************************************
Name:         LCD_display
Number/Version:
History:
              Date        Rev   Author          Description
              17-Mar-1993 0.0   C. Houlberg     Baseline

Inputs:
              location
              string
Outputs:
              - None -
Global Data:
              - None -
Functions Referenced:
              - None -
Abstract:
              Displays the character string at the indicated location
******************************************************************************/
void LCD_display(int location, char string[])
{
PPI1_REG_TYPE *control;                 /* Pointer to LCD control lines */
PPI3_REG_TYPE *display;                 /* Pointer to LCD data lines */
TIMER_REG_TYPE *timer;                  /* Pointer to timer counter register */
int i, j;
```

```
control = (PPI1_REG_TYPE *) &PPI1;
display = (PPI3_REG_TYPE *) &PPI3;
timer = (TIMER_REG_TYPE *) &TIMER0;

/* Set initial character location */
control->LCD_Display_Control = Control_Select;
display->RRT_Display = Address_Set + location;
control->LCD_Display_Control = Control_Enable;
control->LCD_Display_Control = Control_Select;
control->LCD_Display_Control = Data_Select;

/* 50 usec delay to character (typically takes 40 usecs)*/
timer->Timer_Counter = USEC50;
while(timer->Timer_Counter);  /* delay done when counter = 0 */

for(i = 0; string[i] != '\0'; i++)  /* Send characters to display */
{
      if(string[i] == '\f')                /* Test for form feed */
      {                                    /* Clear the display */
            control->LCD_Display_Control = Control_Select;
            display->RRT_Display = Clear_Display;
            control->LCD_Display_Control = Control_Enable;
            control->LCD_Display_Control = Control_Select;

            /* 2 msec delay for display to clear
                  (typically takes 1.64 msecs) */
            for (j = 1; j <= 2; j++)
            {
                  timer->Timer_Counter = MSEC1; /* msec. delay */
                  /* delay done when counter = 0 */
                  while(timer->Timer_Counter);
            }

            location = START_LINE1;        /* Beginning of line #1 */
      }
      else if(string[i] == '\r')           /* Test for carriage return */
      {                                    /* Start line #2 */
            control->LCD_Display_Control = Control_Select;
            display->RRT_Display = Address_Set + START_LINE2;
            control->LCD_Display_Control = Control_Enable;
            control->LCD_Display_Control = Control_Select;

            location = START_LINE2;        /* Starting of line #2 */
      }
      else if(string[i] == '\t')           /* Test for horizontal tab */
      {                                    /* Space to end of line */
       if(location < START_LINE2)
            j = location - START_LINE1;
       else
            j = location - START_LINE2;

       display->RRT_Display = ' '; /* ASCII space */
       for(;j < LINE_LENGTH; j++)
       {
            control->LCD_Display_Control = Data_Enable;
            control->LCD_Display_Control = Data_Select;

            /* 50 usec delay to next character (typically takes 40 usecs)*/
            timer->Timer_Counter = USEC50;
            while(timer->Timer_Counter);  /* done when counter = 0 */
       }
      }
      else
      {                                    /* Output the character */
            display->RRT_Display = string[i];
            control->LCD_Display_Control = Data_Enable;

            location++;
      }                                    /* Next character location */
      control->LCD_Display_Control = Data_Select;

      /* 50 usec delay to next character (typically takes 40 usecs)*/
      timer->Timer_Counter = USEC50;
      while(timer->Timer_Counter);  /* delay done when counter = 0 */
}

/* Zero ASCII port */
display->RRT_Display = 0;
}
/* end */
```

```
/*****************************************************************************
Include File Name:    program.h
Number/Version:
History:
            Date        Rev         Author          Description
            17-Mar-1993 0.0         C. Houlberg     Baseline

Abstract:
            Prototype for program.c (boot.c loader) function.
*****************************************************************************/

/*    program.c contains the following functions:
*/
      void program(int *source, SERIAL_REG_TYPE *serial_reg);

/* end */


/*****************************************************************************
Module Name:    program.c
Number/Version:
History:
            Date        Rev         Author          Description
            17-Mar-1993 0.0         C. Houlberg     Baseline

Abstract:
            EEPROM program module, entry to "boot.c"
*****************************************************************************/
/*
      All definitions used by PROGRAM.C are defined in
            the following header files.
*/

#include "rrt.h"                                /* RRT.configuration */
#include "dsp.h"                                /* DSP definitions */
#include "system.h"                             /* System definitions */
#include "serialio.h"                           /* Serial I/O definitions */
#include "display.h"                            /* LCD display definitions */
#include "timer.h"                              /* Timer definitions */
#include "boot.h"                               /* Boot definitions */
#include "program.h"                            /* Program definitions */

/*****************************************************************************
Name:       program
Number/Version:
History:
            Date        Rev         Author          Description
            17-Mar-1993 0.0         C. Houlberg     Baseline

Inputs:
            serial_reg
Outputs:
            return_word
Global Data:
            - None -
Functions Referenced:
            LCD_display()
            boot()
Abstract:
            Transfers boot loader to RAM for execution
*****************************************************************************/
void program(int *source, SERIAL_REG_TYPE *serial_reg)
{
      TIMER_REG_TYPE *timer;              /* Pointer to timer counter register */
      PPI3_REG_TYPE *switch_status;       /* Switch status pointer */
      int data;
      int program_size;
      int i, *eeprom, *boot_program;

      timer = (TIMER_REG_TYPE *) &TIMER0;
      switch_status = (PPI3_REG_TYPE *) &PPI3;

      LCD_display(START_LINE1, "\fProgram Mode");      /* Display mode */

      if(*source == SERIALIO_PORT)
      {
            /* Program Prompt */
            serial_send_string("\r\nUpdate RRT Program\r\n", serial_reg);

            serial_send_string("WARNING!!, RRT Program will be Changed!!\r\n",
                  serial_reg);

            /* Ensure Serial I/O stopped */
            serial_reg->Control_Register = Stop_Mode;   /* Stop incomming data */
```

```
            serial_send_string("Continue (Y/N): ", serial_reg);

            do                                                      /* do while statement */
            {
                  data = serial_receive(serial_reg);

            } while((data != 'y') && (data != 'Y')
                  && (data != 'n') && (data != 'N')); /* Wait for response */

            serial_send_string("\r\n", serial_reg);         /* New line */
      }
      else
      {
            LCD_display(START_LINE2, "EXEC to Reprogram");

            while((switch_status->Not_Execute)  /* Wait for switch closure */
                  && (switch_status->Not_Skip));
            if(!(switch_status->Not_Execute))
                  data = 'Y';
            else
                  data = 'N';

            /* Allow time for switch to settle. */
            timer->Timer_Counter = SETTLE_TIME;
            while(timer->Timer_Counter)
                  /* Make sure switch is open */
                  if(!(switch_status->Not_Execute)
                        || !(switch_status->Not_Skip))
                        timer->Timer_Counter = SETTLE_TIME;
      }

      if((data == 'y') || (data == 'Y'))
      {
         program_size = &BUFFER_RAM - &PROGRAM_RAM; /* Allowed size for boot */
         eeprom = (int *) &BOOT_LOCATION;   /* Point to EEPROM location */
         boot_program = (int *) &PROGRAM_RAM;   /* Point to execute location */

         for(i = 0; i < program_size; i++)        /* Move program */
              *(boot_program + i) = *(eeprom + i);

         /* Execute program */
         boot(source, (int *) serial_reg);
      }

      return;
}

/* end */


/*****************************************************************************
Header Name:    BIT.H
Number/Version:
History:
          Date             Rev      Author          Description
          18-Mar-1993               Stanley Taylor

Abstract:
          Information needed to interface with basic and extended BIT
          modules (rrt_bit.c and rrt_exbt.c respectively).

NOTE:     BIT.H header file:
NOTE:     All modules that uses the functions, definitions, or data
NOTE:     structures used in either the BASICBIT or EXT_BIT modules
NOTE:     must include the BIT.H header file.
NOTE:
*****************************************************************************/

/*****************************************************************************
Enumeration

Abstract:
          Masks for the bit positions of test failure flags set by
          basic BIT routine.

NOTE:     Basic BIT failure flag bit masks
NOTE:     These are referenced in C. Houlberg's BASICBIT.C but I couldn't
NOTE:     find their definition in any of the source/header files
NOTE:     concurrent with this version of basic BIT.  Therefore, I have
NOTE:     defined them in BIT.H
NOTE:
*****************************************************************************/
```

```
enum {
      RS232_fail  = 0x01 << 0,
      RS422_fail  = 0x01 << 1,
      MS1553_fail = 0x01 << 2
};

/*****************************************************************************
Enumeration

Abstract:
            Codes returned by basic and extended BIT tests to indicate
            pass/fail result.
*****************************************************************************/
enum {
      SUCCESS, FAILURE
};

/*****************************************************************************
Definition: FOREVER

Abstract:
            Code used for infinite loop.
*****************************************************************************/
#define FOREVER 1


/*****************************************************************************
Macros:  SETBIT, CLEARBIT

Abstract:
            These simplify the setting and clearing of individual bits

            of an integer.  'i' is the integer in which to set or clear a bit,
            and 'b'is the bit-position to set or clear (starting with the LSB
            as the 0th bit).

            Carefull - there is no overflow protection built into these macros.
*****************************************************************************/
#define SETBIT(i,b)     ((i) |= 0x00000001 << (b))
#define CLEARBIT(i,b)   ((i) &= ~(0x00000001 << (b)))

/*****************************************************************************
Macro:  BITSET

Abstract:
            Returns zero or non-zero to indicate whether a particular
            bit-position of an integer is 0 or 1 respectively.  'i' is
            the integer to check, and 'b' is the bit-position (starting
            with the LSB as the 0th bit).

            Neither argument is altered.  Carefull - there is no overflow
            protection built into this macro.
*****************************************************************************/
#define BITSET(i,b)  ((i) & (0x00000001 << (b)))

/*****************************************************************************
Definitions

Abstract:
            Additional timer counter values needed by BIT.
*****************************************************************************/
#define     MSEC2        -(  2000 >> 1)      /* Count for 2 millseconds */
#define     MSEC15       -( 15000 >> 1)      /* Count for 15 milliseconds */
#define     MSEC50       -( 50000 >> 1)      /* Count for 50 milliseconds */
#define     THREEQTRSEC  -(750000 >> 1)      /* Count for 3/4 sec time */

/*****************************************************************************
Type definition:  CHECKTYPE

Abstract:
            The data type for the checksum test to operate upon.
            This has been typedef'ed to facilitate testing of the checksumming
            routines on machines where data types are of different sizes.
*****************************************************************************/
typedef unsigned int CHECKTYPE;


/*****************************************************************************
Type definition:  ChecksumInfo
```

```
Abstract:
            This is the information structure written to ROM so that
            checksums of the ROM memories can be verified.
*****************************************************************************/
typedef struct
{
      CHECKTYPE *StartAddr;  /* start of memory for checksum          */
      unsigned Length;       /* number of checksummed data elements   */
      CHECKTYPE Checksum;    /* checksum calculated at time of write  */
} ChecksumInfo;


/*****************************************************************************
Definition:  CHECKSUM_NBR_LOCATION

Abstract:
            This gives the absolute ROM address where the checksum verification
            information ends.  At this address is the number of ROM areas that
            were checksummed when the ROM was written, and immediately
            preceding this address are the ChecksumInfo structures.
*****************************************************************************/
#define CHECKSUM_NBR_LOCATION (unsigned *)0xFFFF


/*****************************************************************************
Enumeration

Abstract:
            Return values for card_test() function in EXT_BIT.C
*****************************************************************************/
enum {
      CARD_GOOD, CARD_BAD, CARD_ERASED
};


/*****************************************************************************
Type definition:  GPIB_READ_REG_TYPE

Abstract:
            This structure maps to the IEEE-488 interface read-registers.

NOTE:       GPIB_READ_REG_TYPE
NOTE:       This structure, currently in BIT.H, should be moved to SYSTEM.H,
NOTE:       where the empty GPIB_REG_TYPE structure currently resides.
NOTE:
*****************************************************************************/
typedef struct
{
      /* Interrupt Flag status registers */
      unsigned IntStatus0;
      unsigned IntStatus1;
      unsigned AddrStatus;
      unsigned BusStatus;
      unsigned Unusable_4;
      unsigned Unusable_5;
      unsigned CmdPassThru;
      unsigned DataIn;
} GPIB_READ_REG_TYPE;


/*****************************************************************************
Enumeration

Abstract:
            Numbers of bits of GPIB_READ_REG's AddrStatus read-
            register and GPIB_READ_REG's BusStatus register.
*****************************************************************************/
enum {
  /* Address Status register bits
  */
  REMOTE = 0,    /* REMOTE/LOCAL
  LLO,           /* Local lockout in effect                */
  ATN,           /* ATN line is low (TRUE) on bus          */
  LPAS,          /* In listener primary addressed state    */
  TPAS,          /* In talker primary addressed state      */
  LISTEN,        /* Addressed to listen                    */
  TALK,          /* Addressed to talk                      */
  ULPA,          /* LSB of last addr recognized            */

  /* Bus Status register bits
  */
```

```
  B_ATN  = 0,  /* Attention            */
  B_DAV,       /* Data-Valid           */
  B_NDAC,      /* Not-Data-Accepted    */
  B_NRFD,      /* Not-Ready-For-Data   */
  B_EOI,       /* End-Or-Identify      */
  B_SRQ,       /* Service Request      */
  B_IFC,       /* Interface Clear      */
  B_REN        /* Remote Enable        */
};

/*****************************************************************************
Type definition:  GPIB_WRITE_REG_TYPE

Abstract:
            This structure maps to the IEEE-488 interface write-registers.

NOTE:       GPIB_WRITE_REG_TYPE
NOTE:       This structure, currently in BIT.H, should be moved to SYSTEM.H.
NOTE:       This structure, in conjunction with the GPIB_READ_REG_TYPE and
NOTE:       associated enumerations, should replace the empty GPIB_REG_TYPE
NOTE:       structure currently in the SYSTEM.H header file.
NOTE:
*****************************************************************************/
typedef struct
{
  unsigned IntMask0;
  unsigned IntMask1;
  unsigned Unusable_2;
  unsigned AuxCmd;

  /* Address register */
  unsigned EnableDualPadMode      : 1;
  unsigned DisableListenerFunc    : 1;
  unsigned DisableTalkerFunc      : 1;
  unsigned PrimaryAddress         : 5;    /* MSB first, LSB last */
  unsigned Unusable_4             : 24;

  /* Serial Poll register */
  unsigned SerialPoll;      /* set 2nd bit (7th?) to request service */
  /* Parallel Poll register */
  unsigned ParallelPoll;

  unsigned DataOut;

} GPIB_WRITE_REG_TYPE;

/*****************************************************************************
Enumeration

Abstract:
            Definitions for disabling/enabling IEEE-488 AuxCmd control
            features.
*****************************************************************************/
enum {
  /*  Definitions for enabling/disabling AuxCmd features
  */
  Clr_swrst = 0x00, Set_swrst,
  Clr_dacr  = 0x80, Set_dacr,
  rhdf      = 0x40,
  Clr_hdfa  = 0xC0, Set_hdfa,
  Clr_hdfe  = 0x20, Set_hdfe,
  nbaf      = 0xA0,
  Clr_fget  = 0x60, Set_fget,
  Clr_rtl   = 0xE0, Set_rtl,
  feoi      = 0x10,
  Clr_lon   = 0x90, Set_lon,
  Clr_ton   = 0x50, Set_ton,
  gts       = 0xD0,
  tca       = 0x30,
  tcs       = 0xB0,
  Clr_rpp   = 0x70, Set_rpp,
  Clr_sic   = 0xF0, Set_sic,
  Clr_sre   = 0x08, Set_sre,
  rqc       = 0x88,
  Clr_ric   = 0x48,
  Clr_dai   = 0xC8, Set_dai,
  pts       = 0x28,
  Clr_stdl  = 0xA8, Set_stdl,
  Clr_shdw  = 0x68, Set_shdw,
  Clr_vstdl = 0xE8, Set_vstdl,
  Clr_rsv2  = 0x18, Set_rsv2
};
```

```
/*****************************************************************************
Type Definition: PPI_REG_TYPE

Abstract:
           Generic mapping of Programmable Peripheral Interface (PPI)
           register.  The BIT-test routines are simpler to program using
           pointers to registers and bitmasks, rather than through
           individual bit fields whose functional names are irrelevant to
           extended BIT operation.
*****************************************************************************/
typedef struct
{
  unsigned A;
  unsigned B;
  unsigned C;
} PPI_REG_TYPE;


/*  Bitmasks defined for 232/422 UART status register (USR)
*/
enum {
  UART_PE    = 0x01,  /* Parity Error */
  UART_FE    = 0x02,  /* Framing Error */
  UART_OE    = 0x04,  /* Overrun Error */
  UART_ERROR = 0x07,  /* combination of the 3 error masks above */
  UART_RBRK  = 0x08,  /* Received Break */
  UART_MS    = 0x10,  /* Modem State Change */
  UART_TC    = 0x20,  /* Transmission Complete */
  UART_TBRE  = 0x40,  /* Transmitter Buffer Register Empty */
  UART_DR    = 0x80   /* Data Ready */
};


/*  Functions declarations for BASICBIT.C
*/
extern void *mem_cpy(char *, const char *, unsigned);
extern char *str_cpy(char *, const char *);

extern CHECKTYPE CalcChecksum(CHECKTYPE *, unsigned);
extern int ChecksumTest(char *);
extern int LCDtest(char *);

extern int ms1553_test(int, int);
extern int MS1553test1(char *);

extern int BasicSerialTest(char *, SERIAL_REG_TYPE *);
extern int RS232test1(char *);
extern int RS422test1(char *);
extern void basicbit(void);

/*  Functions declarations for EXT_BIT.C
*/
extern int IEEE488test(char *);
extern int MS1553test2(char *);
extern int SwitchTest(char *);
extern int SerialTest(char *, char *, SERIAL_REG_TYPE *);
extern int RS232test2(char *);
extern int RS422test2(char *);
extern int DifferentialDiscretesTest(char *);
extern int SingleDiscretesTest(char *);

extern int CardStatusTest(unsigned, int *);
extern int CardChecksumTest(unsigned);
extern int CardErased(unsigned);
extern int MemcardTest(unsigned, char **); /* for used by extended BIT */
extern int card_test(unsigned);            /* for use by main program  */
extern int Memcard1test(char *);
extern int Memcard2test(char *);
extern char WaitForSwitch(void);
extern void ext_bit(void);

extern unsigned int dbg;
extern unsigned int delays;
```

```
/*************************************************************************
Module Name:    BASICBIT.C
Number/Version:
History:
            Date            Rev     Author          Description
            18-Mar-1993             Stanley Taylor

Abstract:
            Basic Built-In-Test routines for RRT.
*************************************************************************/

#include "boot.h"
#include "rrt.h"            /* RRT configuration definitions */
#include "dsp.h"            /* DSP definitions */
#include "system.h"         /* System definitions */
#include "display.h"        /* LCD display definitions */
#include "program.h"        /* Program boot loader */
#include "error.h"          /* Error routines */
#include "rrt_main.h"       /* RRT main program definitions */
#include "timer.h"

#include "bit.h"

unsigned int dbg = 0;
unsigned int delays = 1;


void *mem_cpy(char *dest, const char *src, unsigned n)
{
      while(n--)
            *dest++ = *src++;
}

char *str_cpy(char *dest, const char *src)
{
      char *ptr = dest;

      while(*ptr++ = *src++);
      return(dest);
}

char *str_cat(char *dest, const char *src)
{
  char *chptr;
  for(chptr = dest; *chptr; chptr++); /* find NULL in dest */
  str_cpy(chptr, src);
  return(dest);
}

/*************************************************************************
Name:           CalcChecksum
Number/Version:
History:
        Date            Rev     Author          Description
        3-18-1993               S. Taylor
Inputs:
                Address
                The address at which to start checksumming.

                Nbr
                The number of data elements for which to compute the checksum.
Outputs:
                (return value)
                A calculated checksum.
Global Data:
                - None -
Functions Referenced:
                - None -
Abstract:
        This routine computes a checksum value for a range of values
        given a starting memory address and number values to sum as arguments.
        A checksum is defined as the least significant word of the one's
        complement of the sum of the values at the given memory addresses.

*************************************************************************/
CHECKTYPE CalcChecksum(CHECKTYPE *Address, unsigned Nbr)
{
      CHECKTYPE Sum = 0;
      /*
      *  Using 'Nbr' as a counter and 'Address' as a value pointer, total up
      *  the values.
      */
```

```
    for(; Nbr > 0; Nbr--, Address++)
         Sum += *Address;
    /*
    *  Return the one's complement of the total.
    */
    return(~Sum);
}
/* end CalcChecksum()
******************************************************************************/

/*****************************************************************************
Name:          ChecksumTest
Number/Version:
History:
                         Date          Rev       Author        Description
                         3-18-1993               S. Taylor
Inputs:
                         - None -
Outputs:
                         msg
                         Must be passed in as a pointer to a character array of at least
                         21 characters.  This will be returned containing a message
                         indicating the name of the test.  If the test fails this message
                         will also indicate the memory section that failed.

                         (return value)
                         This function returns one of the #define'd constants SUCCESS or
                         FAILURE to indicate if the test passed or failed.
Global Data:
                         - None -
Functions Referenced:
                         CalcChecksum()
Abstract:
     This routine performs a checksum test of the RRT memory.  It expects to
     find checksumming information records at the top of RRT EEPROM to indicate
     the memory sections to test, and providing the checksums calculated at the
     time EEPROM was written.

******************************************************************************/
int ChecksumTest(char *msg)
{
  ChecksumInfo *Ptr;
  CHECKTYPE NewChecksum;
  TIMER_REG_TYPE *timer =
      (TIMER_REG_TYPE *) &TIMER0; /* Pointer to timer counter register */


  /*  The number of checksummed memory sections is indicated by the value
        at the topmost memory address in ROM.
  */
  unsigned *NbrChecksPtr = CHECKSUM_NBR_LOCATION, SectionCount;
  int i, Done, Error = 0;

  /*  One-pass loop provides convenient meeting place for error paths.
  */
  for(Done = 0; !Done; Done++)
  {
      /*  Get section count - the section count is expected to be written as
            a one-byte value written four times to the memory location.  Compare
            first byte of section count against the 2nd, 3rd, and 4th bytes.
      */
      SectionCount = *NbrChecksPtr;
      for(i = 0; i <= 24; i += 8)
        if ((SectionCount & 0xFF) != ((SectionCount >> i) & 0xFF)) /* error */
            break;
      if (i <= 24)  /* error */
        break;

      /*  Mask-off extra 1-byte values.
      */
      SectionCount &= 0xFF;

      /*  The structure containing the checksum memory information are located
          in front of the NbrChecksPtr.

          The typecast of NbrChecksPtr to (char *) is necessary for compilation
          on systems where the char and int data types are different sizes - it
          should have no effect on compilation for the TMS320C30 and should be
          left in to facilitate testing.
      */
```

```
      Ptr = (ChecksumInfo *)((char *)NbrChecksPtr - sizeof(ChecksumInfo));

      /*  Move backward through the number of checksummed areas indicated by
          NbrChecksPtr.
      */
      for(i = 1; i <= SectionCount; i++, Ptr--)
      {
        /*  Perform "reasonability check" on start address and length
            information.
        */
        if (((unsigned)(Ptr->StartAddr) > 0xFFFF) ||
              (Ptr->Length < 1) || (Ptr->Length > 0xFFFF) ||
              ((unsigned)(Ptr->StartAddr) + Ptr->Length > 0x10000))
            break;  /* Error = 0 */

        /*  Calculate independent checksum and compare with value
            written to ROM.
        */
        NewChecksum = CalcChecksum(Ptr->StartAddr, Ptr->Length);
        if (Ptr->Checksum != NewChecksum)
        {
            Error = i;
            break;
        }
      }
      if (i <= SectionCount) /* broke out of for loop */
        break;
  }
  if (Done)
  {
      str_cpy(msg, "EEPROM Checksum");
      return(SUCCESS);
  }
  /*
  *  On error, add error code to end of "name" for return to operator.
  */
  str_cpy(msg, "Checksum, section: X");
  msg[19] = Error + '0'; /* replace 'X' with failed section number */
  return(FAILURE);
}
/* end ChecksumTest()
*****************************************************************************/


/*****************************************************************************
Definitions: INTERCHARACTER_DELAY, WIPE_DELAY

Abstract:
          These specify delays to be used within LCDtest().
          INTERCHARACTER_DELAY specifies the amount of time to
          delay between writing each character.  WIPE_DELAY specifies
          the amount of time to delay between writing the solid-block
          characters and clearing them.  Each delay must be assigned as
          one of the counter constants defined in TIMER.H.
*****************************************************************************/
#define INTERCHARACTER_DELAY MSEC50
#define WIPE_DELAY           THREEQTRSEC

/*****************************************************************************
Name:           LCDtest
Number/Version:
History:
                Date         Rev     Author        Description
                3-18-1993            S. Taylor
Inputs:
                - None -
Outputs:
                msg
                Must be passed in as a pointer to a character array of at least
                21 characters.  This will be returned containing a message
                indicating the name of the test.

                (return value)
                This function always returns the #define'd constant SUCCESS.
Global Data:
                - None -
Functions Referenced:
                - None -
Abstract:
                Exercises the LCD display by first writing solid blocks to
                all character positions and then clearing them.  There is no
```

```
                automatic way to determine the success or failure of this test;
                the operator must observe the display.
*****************************************************************************/
int LCDtest(char *msg)
{
      PPI1_REG_TYPE *control =
            (PPI1_REG_TYPE *) &PPI1;     /* Pointer to LCD control lines */
      PPI3_REG_TYPE *display =
            (PPI3_REG_TYPE *) &PPI3;     /* Pointer to LCD data lines */
      TIMER_REG_TYPE *timer =
            (TIMER_REG_TYPE *) &TIMER0; /* Pointer to timer counter register */
      int i, C, StartAddr;

      str_cpy(msg, "LCD Test");
      LCD_initialize();

      /*  Fill all eight custom characters with a solid block character
                in order to exercise all of the LCD's Character-Generator RAM.

                First, select character-generator RAM for writing.
      */
      control->LCD_Display_Control = Control_Select;
      display->RRT_Display = Char_Gen_Address;
      control->LCD_Display_Control = Control_Enable;
      control->LCD_Display_Control = Control_Select;
      timer->Timer_Counter = USEC50;
      while(timer->Timer_Counter);

      /*  Fill character-generator RAM with solid scan lines.
      */
      control->LCD_Display_Control = Data_Select;
      for(i = 0; i < 64; i++) /* 8 characters x 8 scan lines */

{
  display->RRT_Display = 0xFF;
  control->LCD_Display_Control = Data_Enable;
  control->LCD_Display_Control = Data_Select;
  timer->Timer_Counter = USEC50;
  while(timer->Timer_Counter);
}

/*  Clear the display.
*/
control->LCD_Display_Control = Control_Select;
display->RRT_Display = Clear_Display;
control->LCD_Display_Control = Control_Enable;
control->LCD_Display_Control = Control_Select;
timer->Timer_Counter = MSEC2;
while(timer->Timer_Counter);

/*  Fill both lines of display with solid blocks.
*/
for(StartAddr = START_LINE1; StartAddr <= START_LINE2;
      StartAddr += START_LINE2 - START_LINE1)

{ /*  Set character location.
  */
  control->LCD_Display_Control = Control_Select;
  display->RRT_Display = Address_Set + StartAddr;
  control->LCD_Display_Control = Control_Enable;
  control->LCD_Display_Control = Control_Select;
  timer->Timer_Counter = USEC50;
  while(timer->Timer_Counter);

  /*  Fill all 20 character positions, cycling through the eight
       identical custom characters, with a delay after each to allow
       user time to verify display.
  */
  control->LCD_Display_Control = Data_Select;
  for(C = 0; C < 20; C++)
  {
      /* (modulus would be better, but requires library function) */
      display->RRT_Display = (C < 8) ? C : (C < 16) ? (C-8) : (C-16);
      control->LCD_Display_Control = Data_Enable;
      control->LCD_Display_Control = Data_Select;
      timer->Timer_Counter = USEC50;
      while(timer->Timer_Counter);

      timer->Timer_Counter = INTERCHARACTER_DELAY;  /* additional delay */
      while(timer->Timer_Counter);
  }
```

```
 timer->Timer_Counter = WIPE_DELAY;        /* additional non-required delay */
 while(timer->Timer_Counter);

 /*  Write zeros to all character-generator RAM, producing "blank"
     characters.  Since these custom characters are currently being
     displayed, blanking the character bitmaps will also blank the
     display.
 */
      control->LCD_Display_Control = Control_Select;
      display->RRT_Display = Char_Gen_Address;
      control->LCD_Display_Control = Control_Enable;
      control->LCD_Display_Control = Control_Select;
      timer->Timer_Counter = USEC50;
      while(timer->Timer_Counter);

      control->LCD_Display_Control = Data_Select;
      for(C = 0; C < 64; C++) /* 8 characters x 8 scan lines */
      {
        display->RRT_Display = 0x00;
        control->LCD_Display_Control = Data_Enable;
        control->LCD_Display_Control = Data_Select;
        timer->Timer_Counter = USEC50;
        while(timer->Timer_Counter);
      }
      /*  Must re-do LCD initialization since test has overwritten custom
          backslash character.
      */
      LCD_initialize();
      return(SUCCESS);
}
/* end LCDtest()
***************************************************************************/

/**************************************************************************
Name:        MS1553test1
Number/Version:
History:
                    Date            Rev     Author          Description
                    3-24-1993               S. Taylor
Inputs:
                    - None -
Outputs:
                    msg
                    Must be passed in as a pointer to a character array of at least
                    21 characters.  This will be returned containing a message
                    indicating the name of the test.

                    (return value)
                    This function returns one of the #define'd constants SUCCESS or
                    FAILURE to indicate if the test passed or failed.
Global Data:
                    - None -
Functions Called:
Abstract:
       This routine tests the MS-1553 encoder/decoder and transceiver.
***************************************************************************/
int MS1553test1(char *msg)
{
  str_cpy(msg, "MS-1553");
  return(SUCCESS);
}
/* end MS1553test1
***************************************************************************/

/**************************************************************************
Name:        BasicSerialTest
Number/Version:
History:
                    Date            Rev     Author          Description
                    3-18-1993               S. Taylor
Inputs:
                    serial_reg
                    A pointer to the registers of the serial UART upon which test is
                    to be performed.
Outputs:
                    (return value)
                    This function returns one of the #define'd constants SUCCESS or
                    FAILURE to indi ate if the test passed or failed.
Global Data:
                    - None -
Functions R ferenced:
                    - None -
```

```
Abstract:
                    Tests the RS-232 or RS-422 interface by putting the UART
                    in test (internal loopback) mode and running data through it.
******************************************************************************/
int BasicSerialTest(char *msg, SERIAL_REG_TYPE *serial_reg)
{
      char *ch;
      char string[] = "Testing 123\r";
      TIMER_REG_TYPE *timer = (TIMER_REG_TYPE *)&TIMER0;

      /*  Put UART in test (internal loopback) mode.
      */
      serial_reg->Control_Register = Test_Mode;

      /*  Send/receive test string character-by-character.
      */
      for (ch = string; *ch; ch++)
      {
            /*  Send character.
            */
            serial_reg->Data_Register = *ch;

            /*  Wait up to 1/2 second for receipt of character.
            */
            timer->Timer_Counter = HALFSEC;
            while((*ch != serial_reg->Data_Register) && timer->Timer_Counter);
            if(!(timer->Timer_Counter))  /* error - timed out */
            {
              str_cat(msg, ":UART");
              break;
            }
      }

      /*  Take UART out of test mode.
      */
      serial_reg->Control_Register = Stop_Mode;

      /*  If ch points to NULL, then the loop completed with no errors.
      */
      if (!*ch)
            return(SUCCESS);

      return(FAILURE);
}
/* end BasicSerialTest()
******************************************************************************/

/******************************************************************************
Name:           RS232test1
Number/Version:
History:
                    Date            Rev     Author          Description
                    3-18-1993               S. Taylor
Inputs:
                    - None -
Outputs:
                    msg
                    Must be passed in as a pointer to a character array of at least
                    21 characters.  This will be returned containing a message
                    indicating the name of the test.

                    (return value)
                    This function returns one of the #define'd constants SUCCESS or
                    FAILURE to indicate if the test passed or failed.
Global Data:
                    - None -
Functions Referenced:
                    BasicSerialTest()
Abstract:
                    This routine calls the basic (internal) serial port test for the
                    RS-232 interface.
******************************************************************************/
int RS232test1(char *msg)
{
      str_cpy(msg, "RS-232");
      return(BasicSerialTest(msg, (SERIAL_REG_TYPE *)&RS232));
}
/* end RS232test1
******************************************************************************/
```

```
/*****************************************************************************
Name:       RS422test1
Number/Version:
History:
                  Date            Rev     Author        Description
                  3-18-1993               S. Taylor
Inputs:
                  - None -
Outputs:
                  msg
                  Must be passed in as a pointer to a character array of at least
                  21 characters.  This will be returned containing a message
                  indicating the name of the test.

                  (return value)
                  This function returns one of the #define'd constants SUCCESS or
                  FAILURE to indicate if the test passed or failed.
Global Data:
                  - None -
Functions Referenced:
                  BasicSerialTest()
Abstract:
                  This routine calls the basic (internal) serial port test for the
                  RS-422 interface.
*****************************************************************************/
int RS422test1(char *msg)
{
      str_cpy(msg, "RS-422");
      return(BasicSerialTest(msg, (SERIAL_REG_TYPE *)&RS422));
}
/* end RS422test1
*****************************************************************************/


/*****************************************************************************
Definition:  FAILURE_DELAY

Abstract:
             This defines the length of delay after the failure of
             a basic BIT test.  A message describing the failure will be
             displayed during this period.
*****************************************************************************/
#define FAILURE_DELAY   SEC1


/*****************************************************************************
Definition:  BASICBIT_MIN_DELAY

Abstract:
             This defines the minimum length of time for basic bit to execute.
             Test execution is practically instant (from a user-perspective) -
             if all tests pass, most this time will be spent displaying a
             "success" message, while if a test fails, the time will be spent
             displaying the failure message for that test.
*****************************************************************************/
#define BASICBIT_MIN_DELAY  SEC2

/*****************************************************************************
Name:       basicbit
Number/Version:
History:
                  Date            Rev     Author        Description
                  3-18-1993               S. Taylor
Inputs:
                  - None -
Outputs:
                  - None -
Global Data:
                  InterfaceStatus (WRITTEN)
Functions Referenced:
                  LCDtest()
                  LCD_display()
                  rrt_main()
                  ChecksumTest()
                  RS232test1()
                  RS422test1()
                  MS1553test1()
                  CLEARBIT()
                  program()
Abstract:
                  Main routine for performing RRT Basic BIT testing.
*****************************************************************************/
```

```
void basicbit(void)
{
      char msg[21];
      TIMER_REG_TYPE *timer0 = (TIMER_REG_TYPE *)&TIMER0;
      TIMER_REG_TYPE *timer1 = (TIMER_REG_TYPE *)&TIMER1;
      PPI3_REG_TYPE *switch_status = (PPI3_REG_TYPE *)&PPI3; /* Switch status */
      SERIAL_REG_TYPE *serial_reg;                           /* Serial I/O register pointer */
      int fail_flags = 0;
      char FailureLine1[] = "Basic BIT Failure\t\r\t";
      int source = SERIALIO_PORT;

      /*  Initialize and test the LCD display.
      */
      LCDtest(msg);

      LCD_display(START_LINE1, "Running Basic BIT\t\r\t");
      timer1->Timer_Counter = BASICBIT_MIN_DELAY;

      /*  Perform checksum test.  If it fails, hang the system.
      */
      if (ChecksumTest(msg) == FAILURE)
      {
            LCD_display(START_LINE1, FailureLine1);
            LCD_display(START_LINE2, msg);
#ifdef HANG_ON_CHECKSUM_FAILURE
            while(FOREVER);
#else
            timer0->Timer_Counter = FAILURE_DELAY;
            while(timer0->Timer_Counter);
#endif
      }

      /*  Test RS-232 interface.  Upon failure, clear interface's GO/NO-GO flag
                and display error message.
      */
      if (RS232test1(msg) == FAILURE)
      {
            fail_flags |= RS232_fail;
            LCD_display(START_LINE1, FailureLine1);
            LCD_display(START_LINE2, msg);
            timer0->Timer_Counter = FAILURE_DELAY;
            while(timer0->Timer_Counter);
      }

      /*  Test RS-422 interface.  Upon failure, clear interface's GO/NO-GO flag
                and display error message for 2 seconds.
      */
       if (RS422test1(msg) == FAILURE)
       {
            fail_flags |= RS422_fail;
            LCD_display(START_LINE1, FailureLine1);
            LCD_display(START_LINE2, msg);
            timer0->Timer_Counter = FAILURE_DELAY;
            while(timer0->Timer_Counter);
       }

       /*  Check for held-down SKIP switch.
       */
       if (!switch_status->Not_Skip)
       {
           /* If RS-422 interface is working and has a terminal device connected,
           skip normal operation and go to "program" mode.
           */
           serial_reg = (SERIAL_REG_TYPE *)&RS422;
           if (!(fail_flags & RS422_fail) && serial_reg->Terminal_Ready)
               program(&source, serial_reg);

           /* If RS-232 interface is working and has a terminal device connected,
           skip normal operation and go to "program" mode.
           */
           serial_reg = (SERIAL_REG_TYPE *)&RS232;
           if (!(fail_flags & RS232_fail) && serial_reg->Terminal_Ready)
               program(&source, serial_reg);
       }

       /*  Test MS-1553 interface.  Upon failure, clear interface's GO/NO-GO
             flag and display error message.
       */
       if (MS1553test1(msg) == FAILURE)
       {
```

```
      fail_flags |= MS1553_fail;
      LCD_display(START_LINE1, FailureLine1);
      LCD_display(START_LINE2, msg);
      timer0->Timer_Counter = FAILURE_DELAY;
      while(timer0->Timer_Counter);
    }

    /*  Don't allow operator to continue until both skip and execute switches
        have been released.
    */
    while(!(switch_status->Not_Skip && switch_status->Not_Execute))
    {
      if (!switch_status->Not_Skip)
        LCD_display(START_LINE1, "\fRelease SKIP switch");
      else
        LCD_display(START_LINE2, "\fRelease EXEC switch");

      timer0->Timer_Counter = MSEC100;
      while(timer0->Timer_Counter);
    }
    /*  If all tests passed, display success message and pause.
    */
    if (!fail_flags)
      LCD_display(START_LINE1, "Basic BIT Success\t\rAll Tests Passed\t");
    /*  If tests didn't require minimum message display time, wait for
        time to expire.
    */
    while(timer1->Timer_Counter);

    /*  Execute main RRT program.
    */
    rrt_main(fail_flags);
}
/* end basicbit()
**************************************************************************/


/**************************************************************************
Include File Name:    cardhdrs.h
Number/Version:
History:
        Date          Rev        Author          Description
        23-Mar-1993   0.0        C. Houlberg     Baseline

Abstract:
        Structure of headers and header definitions.
**************************************************************************/

/* IC Memory Card header structure
*/
typedef struct                          /* Structure form derived from MS-2217 */
{
    /* Platform and Card IDs */
    unsigned Card_Implementation        :  4; /* Memory card implementation */
    unsigned Memory_Card_Sequence       :  4; /* Memory card sequence number */
    unsigned Platform_ID                :  5; /* Platform ID discretes */
    unsigned Unused_0                   :  3; /* Unused bits in word */
    #ifdef TMS320C30
        unsigned Unusable_0             : 16; /* Unusable bits in word */
    #endif


    /* Month */
    unsigned Month_MSC                  :  8; /* Most Significant Character */
    unsigned Month_LSC                  :  8; /* Least Significant Character */
    #ifdef TMS320C30
        unsigned Unusable_1             : 16; /* Unusable bits in word */
    #endif

    /* Day */
    unsigned Day_MSC                    :  8; /* Most Significant Character */
    unsigned Day_LSC                    :  8; /* Least Significant Character */
    #ifdef TMS320C30
        unsigned Unusable_2             : 16; /* Unusable bits in word */
    #endif

    /* Year */
    unsigned Year_MSC                   :  8; /* Most Significant Character */
    unsigned Year_2SC                   :  8; /* 2ND Significant Character */
    #ifdef TMS320C30
        unsigned Unusable_3             : 16; /* Unusable bits in word */
```

```
    #endif

    unsigned Year_3SC                   :  8; /* 3RD Significant Character */
    unsigned Year_LSC                   :  8; /* Least Significant Character */
    #ifdef TMS320C30
        unsigned Unusable_4             : 16; /* Unusable bits in word */
    #endif

    /* Card Discretes */
    unsigned Card_Classification        :  4;/* Unclass, Class, Secret, etc. */
    unsigned Fleet_Releasable           :  1; /* Memory card releasable */
    unsigned Card_Erase_OK              :  1; /* Erase Permitted */
    unsigned Download_From_Card_OK      :  1; /* Download to PC permitted */
    unsigned Upload_To_Card_OK          :  1; /* Upload to card permitted */
    unsigned Copy_From_Card_OK          :  1; /* Copy of card permitted */
    unsigned Auto_Load_OK               :  1; /* Auto load permitted */
    unsigned Unused_1                   :  6; /* Unused bits in word */
    #ifdef TMS320C30
        unsigned Unusable_5             : 16; /* Unusable bits in word */
    #endif

} CARD_HEADER_TYPE;

/* IC Memory Card Header definitions
*/
    #define SIZE_CARD_HEADER        sizeof(CARD_HEADER_TYPE)
    #define HEADER0_BUFFER          &BUFFER_RAM
    #define HEADER1_BUFFER          (HEADER0_BUFFER + SIZE_CARD_HEADER)

    /* IC Memory Card implementation */
    #define NOT_USED                0x00
    #define LIBRARY_CARD            0x01
    #define RRT_PROGRAM_CARD        0x02

/* Lookup Table Header Structure
*/
typedef struct
{                                       /* Structure form derived from MS-2217 */
    /* File name */
    unsigned File_Name_MSC              :  8; /* Most Significant Character */
    unsigned File_Name_2SC              :  8; /* 2ND Significant Character */
    #ifdef TMS320C30
        unsigned Unusable_0             : 16; /* Unusable bits in word */
    #endif

    unsigned File_Name_3SC              :  8; /* 3RD Significant Character */
    unsigned File_Name_4SC              :  8; /* 4TH Significant Character */
    #ifdef TMS320C30
        unsigned Unusable_1             : 16; /* Unusable bits in word */
    #endif

    unsigned File_Name_5SC              :  8; /* 5TH Significant Character */
    unsigned File_Name_6SC              :  8; /* 6TH Significant Character */
    #ifdef TMS320C30
        unsigned Unusable_2             : 16; /* Unusable bits in word */
    #endif
    unsigned File_Name_7SC              :  8; /* 7TH Significant Character */
    unsigned File_Name_LSC              :  8; /* Least Significant Character */
    #ifdef TMS320C30
        unsigned Unusable_3             : 16; /* Unusable bits in word */
    #endif

    unsigned Separator                  :  8; /* Extension separator "." */
    unsigned File_Name_EXT1             :  8; /* Most Significant Character */
    #ifdef TMS320C30
        unsigned Unusable_4             : 16; /* Unusable bits in word */
    #endif

    unsigned File_Name_EXT2             :  8; /* 2ND Significant Character */
    unsigned File_Name_EXT3             :  8; /* Least Significant Character */
    #ifdef TMS320C30
        unsigned Unusable_5             : 16; /* Unusable bits in word */
    #endif

    /* File size */
    unsigned File_Size_LSW              : 16; /* Least Significant Word */
    #ifdef TMS320C30
        unsigned Unusable_6             : 16; /* Unusable bits in word */
    #endif

    unsigned File_Size_MSW              : 16; /* Most Significant Byte */
    #ifdef TMS320C30
        unsigned Unusable_7             : 16; /* Unusable bits in word */
    #endif
```

```
unsigned Unused_5                         :  5; /* Unused bits */
unsigned Use_Memory_Config_Msg            :  1; /* 0 ==> Do not use */
#ifdef TMS320C30
        unsigned Unusable_12
#endif                                    : 16; /* Unusable bits in word */

/* Automatic Busy Retry Count Before Error */
unsigned Auto_Busy_Count                  : 16; /* Auto busy count */
#ifdef TMS320C30
        unsigned Unusable_13              : 16; /* Unusable bits in word */
#endif

/* Manual Retry Count Before Error */
unsigned Manual_Error_Count               : 16; /* Manual error count */
#ifdef TMS320C30
        unsigned Unusable_14              : 16; /* Unusable bits in word */
#endif

/* Nomenclature of RT */
unsigned RT_Nomenclature_MSW              : 16; /* Most Significant Word */
#ifdef TMS320C30
        unsigned Unusable_15              : 16; /* Unusable bits in word */
#endif

unsigned RT_Nomenclature_2SW              : 16; /* 2RD Significant Word */
#ifdef TMS320C30
        unsigned Unusable_16              : 16; /* Unusable bits in word */
#endif

unsigned RT_Nomenclature_LSW              : 16; /* Least Significant Character */
#ifdef TMS320C30
        unsigned Unusable_17              : 16; /* Unusable bits in word */
#endif

/* Memory Configuration Word 1 */
unsigned Memory_Config_1                  : 16; /* Configuration word #1 */
#ifdef TMS320C30
        unsigned Unusable_18              : 16; /* Unusable bits in word */
#endif

/* Memory Configuration Word 2 */
unsigned Memory_Config_2                  : 16; /* Configuration word #2 */
#ifdef TMS320C30
        unsigned Unusable_19              : 16; /* Unusable bits in word */
#endif

/* Memory CONTROL */
unsigned Unused_6                         :  2; /* Unused bits */
unsigned Fill_Data                        :  6; /* Word 4 fill data */
unsigned Control_Transfer                 :  1; /* 1 = Control is transferred */
unsigned Unused_7                         :  3; /* Unused bits */
unsigned Disc_Disable                     :  2; /*  0 ==> Do not disable
                                                    1 ==> Disable discrete #2
                                                    2 ==> Disable discrete #1
                                                    3 ==> Disable both */
unsigned Disc_Enable                      :  2; /*  0 ==> Do not enable
                                                    1 ==> Enable discrete #2
                                                    2 ==> Enable discrete #1
#ifdef TMS320C30                                    3 ==> Enable both */
        unsigned Unusable_20              : 16; /* Unusable bits in word */
#endif
/* File and Control Type */
unsigned File_Type                        :  2; /*  0 ==> Single file
                                                    1 ==> Sequential
                                                    2 ==> Simultaneous */
unsigned Verify_After_Load                :  1; /*  1 ==> Verify */
unsigned Stand_Alone_Verify               :  1; /*  1 ==> Stand alone OK */
unsigned Platform_Configuration           :  4; /* Platform configuration code
                                                   when loading from CCU */
unsigned Unused_10                        :  2; /* Unused bits in word */
unsigned BC_Fill_Data                     :  6; /* Word 4 fill Data */
#ifdef TMS320C30
        unsigned Unusable_22              : 16; /* Unusable bits in word */
#endif

/* BC and RRT addresses */
unsigned BC_RT_Address                    :  5; /* Address */
unsigned Unused_11                        :  3; /* Unused bits */
unsigned RRT_RT_Address                   :  5; /* Address */
unsigned Unused_12                        :  3; /* Unused bits */
#ifdef TMS320C30
```

```
/* File Discretes */
unsigned Upload_From_Card_OK          :  1; /* Upload from card permitted */
unsigned Download_To_Card_OK          :  1; /* Download to card permitted */
unsigned Check_Platform_ID            :  1; /* Check ID required */
unsigned Direct_CT_Grounded           :  1; /* Direct load center tap GND */
unsigned Direct_Short_Stub            :  1; /* Direct load short stub */
unsigned Unused                       :  3; /* Unused */
unsigned Data_Transfer_Bus            :  8; /* Bus used for data transfer */
#ifdef TMS320C30
      unsigned Unusable_7a            : 16; /* Unusable bits in word */
#endif

/****************************************************
*     Beginning of Lookup Table derived from MS-2217  *
****************************************************/

/* Discretes #1 */
unsigned Primary_Bus                  :  3; /* Primary MS-1553 Bus */
unsigned Secondary_Bus                :  2; /* Secondary MS-1553 Bus */
unsigned Redundant_Bus_Usable         :  1; /* 1 ==> Usable */
unsigned Short_Stub_Coupled           :  1; /* 1 ==> Short stub (direct) */
unsigned Center_Tap_Grounded          :  1; /* 1 ==> Grounded */
unsigned AYK14_Power_Off              :  4; /* 1 ==> Power Off */
unsigned Device_Enable                :  1; /* 1 ==> Decive On */
unsigned MSDRS_Off                    :  1; /* 1 ==> MSDRS Off */
unsigned RDP_SOC_CSC_CIT_Off          :  1; /* 1 ==> Off */
unsigned SMS_Off                      :  1; /* 1 ==> Off */
#ifdef TMS320C30

      unsigned Unusable_8             : 16; /* Unusable bits in word */
#endif

/* Discretes #2 */
unsigned AYK14_IPL                    :  4; /* 1 ==> Initiate Load */
unsigned AV_Reprogram_Enable_1        :  1; /* 1 ==> Enable AV #1 */
unsigned AV_Reprogram_Enable_2        :  1; /* 1 ==> Enable AV #2 */
unsigned EW_UDM_Repro_Enable          :  1; /* 1 ==> Enable EW UDM */
unsigned EW_OSM_Repro_Enable          :  1; /* 1 ==> Enable EW OSM */
unsigned AYK14_Correlation            :  4; /* 1 ==> Use discrete set */
unsigned Unused_0                     :  3; /* Unused bits in word */
unsigned IPL_Fail_Used                :  1; /* 1 ==> IPL Fail checked */
#ifdef TMS320C30
      unsigned Unusable_9             : 16; /* Unusable bits in word */
#endif

/* Operational Status */
unsigned RRT_Terminal_Mode            :  3; /*  0 ==> Not used
                                                1 ==> RRT = RT
                                                      BC  --> RT
                                                      RRT --> BC
                                                2 ==> RRT = BC
                                                3 ==> RRT = RT
                                                4 ==> RRT = RT
                                                      BC  --> Quiet
                                                      RRT --> BC */
unsigned Unused_1                     :  4; /* Unused bits in word */
unsigned AYK14_Normal_BC              :  1; /* 1 ==> AYK-14 is Normal BC */
unsigned RT_Address                   :  5; /* Address */
unsigned Unused_2                     :  3; /* Unused bits in word */
#ifdef TMS320C30
      unsigned Unusable_10            : 16; /* Unusable bits in word */
#endif

/* Operational Mode */
unsigned Protocol                     :  4; /* MS-1553 Protocol used */
unsigned Paging_Parameters_Used       :  1; /* Unit uses paging method */
unsigned Unused_3                     :  3; /* Unused bits */
unsigned Delay                        :  8; /* 0 to 255 msecs. */
#ifdef TMS320C30
      unsigned Unusable_11            : 16; /* Unusable bits in word */
#endif

/* Busy Bit and Memory Word Usage */
unsigned Status_Busy_Not_Usable       :  1; /* 1 ==> Busy Bit Not Usable */
unsigned Unused_4                     :  5; /* Unused bits in word */
unsigned BC_Pause_After_Command       :  1; /* BC pauses after command */
unsigned Transmit_Next_Message        :  1; /* 0 ==> Repeat last message */
unsigned Memory_Word_Usage            :  2; /*  0 ==> Check none
                                                1 ==> Check word 1 (area 1)
                                                2 ==> Check word 2 (area 2)
                                                3 ==> Check both words */
```

```
        unsigned Unusable_23            : 16; /* Unusable bits in word */
#endif

/* Nomenclature of BC */
unsigned BC_Nomenclature_MSW            : 16; /* Most-Significant Word */
#ifdef TMS320C30
        unsigned Unusable_24            : 16; /* Unusable bits in word */
#endif

unsigned BC_Nomenclature_2SW            : 16; /* 2RD Significant Word */
#ifdef TMS320C30
        unsigned Unusable_25            : 16; /* Unusable bits in word */
#endif

unsigned BC_Nomenclature_LSW            : 16; /* Least Significant Word*/
#ifdef TMS320C30
        unsigned Unusable_26            : 16; /* Unusable bits in word */
#endif

/* Device Control Times */
unsigned Device_On_Time                 :  8; /* 1 to 256 seconds */
unsigned Device_Response_Time           :  8; /* 1 to 256 seconds */
#ifdef TMS320C30
        unsigned Unusable_27            : 16; /* Unusable bits in word */
#endif

} LOOKUP_TABLE_TYPE;

/* Lookup Table Header definitions
*/
    #define SIZE_LOOKUP_TABLE       sizeof(LOOKUP_TABLE_TYPE)
    #define LOOKUP_TABLE_BUFFER     (HEADER1_BUFFER + SIZE_CARD_HEADER)
    #define NEXT_TABLE_BUFFER       (LOOKUP_TABLE_BUFFER + SIZE_LOOKUP_TABLE)

    /* Indicator for no more files on memory card */
    #define NO_FILE                         0xffff          /* Non-ascii indicator */
    /* RRT operational status */
    #define CONVERTS_BC_TO_RT       0x01
    #define ALWAYS_BC               0x02
    #define ALWAYS_RT               0x03
    #define QUIETS_BC               0x04

    /* Memory area definitions */
    #define CHECK_NONE              0x00    /* Do not check memory config. */
    #define CHECK_WORD_1            0x01    /* Check config. word #1 */
    #define CHECK_WORD_2            0x02    /* Check config. word #2 */
    #define CHECK_BOTH_WORDS        0x03    /* Check both config. words */

    /* Memory area types */
    #define SINGLE_FILE             0x00    /* Only one file to program */
    #define SEQUENTIAL_FILE         0x01    /* Program and verify each */
    #define SIMULTANEOUS_FILE       0x02    /* Program each and verify each */

    /* Transfer mode definitions */
    #define NO_XFER                 0x00    /* No transfer done */
    #define BYTE_XFER               0x01    /* 8 bit transfer */
    #define WORD_XFER               0x02    /* 16 bit transfer */
    #define DOUBLE_WORD_XFER        0x03    /* 32 bit transfer */

    /* Header type definitions */
    #define WORD_COUNT              0x00    /* Word count used */
    #define MESSAGE_COUNT           0x01    /* Message count (32 words) used */
    #define UNDEFINED_TYPE          0x02    /* Undefined transaction */
    #define RESERVED_TYPE           0x03    /* Reserved for MLV internal use */

    /* Buffer transfer count definitions */
    #define MAX_BUFFER_COUNT        0x1000  /* 0 translates to 0x1000 (4096) */
    #define MAX_SDC_COUNT           0x0400  /* 0 translates to 0x0400 (1024) */
    #define MAX_DMC_COUNT           0x4000  /* 0 translates to 0x0200 << 5 */

    /* Transfer control definitions */
    #define LAST_TRANSACTION        0x00
    #define ANOTHER_TRANSACTION     0x01
    #define TRANSFER_CONTROL        0x02
    #define TC_MASK                 0x03

    /* Defined control message values */
    #define     REPROGRAM_CONTROL   0x00
    #define     MEMORY_LOAD         0x01
    #define     MEMORY_VERIFY       0x02
```

```
/* Defined Reprogram Status Message error values */
#define CODE_MASK 0x3fff  /* Status message code mask */
#define ABORT          0x8001  /* RRT should abort load/verify */
#define RESTART        0x8002  /* RRT should completely reload unit */
#define RETRY          0x8003  /* RRT should repeat last message sequence */
#define AUTO_RETRY     0x8004  /* RRT has retried 3 times and should abort */

/* Defined Error Message action values */
#define TRANSACTION     0x01   /* RRT will retry transaction */
#define RESTART_ACTION  0x02   /* RRT is restarting entire operation */
#define ABORT_ACTION    0x04   /* RRT is aborting operation */

/* Defined values for protocols */
#define PROTOCOL_B                  0x01
#define PROTOCOL_C                  0x02
#define PROTOCOL_D                  0x03
#define PROTOCOL_E                  0x04
#define PROTOCOL_F_SMS_CORE         0x08
#define PROTOCOL_F_SMS_EEPROM       0x09
#define PROTOCOL_F_SDC              0x0a
#define PROTOCOL_G                  0x06
#define PROTOCOL_H                  0x07
#define PROTOCOL_U2                 0x0b  /* DMC protocol */
#define PROTOCOL_U1                 0x0c  /* MADC protocol */

/* Constant values used to set boolean flags */
#define UPLOADING   1
#define VERIFYING   0

/* end */

/*****************************************************************************
Include File Name:    rrt_main.h
Number/Version:
History:
          Date         Rev   Author          Description
          18-Mar-1993  0.0   C. Houlberg     Baseline

Abstract:
          Prototype for rrt_main.c
*****************************************************************************/

/*    rrt_main.c contains the following functions:
*/
      void rrt_main(int fail_flags);

/* end */

/*****************************************************************************
Module Name:    rrt_main.c
Number/Version:
History:
              Date         Rev   Author       Description
              18-Mar-1993  0.0   C. Houlberg  Updates status_flags with card use
              31-Mar_1993  0.0   C. Houlberg  Added buffer[] for card headers

Abstract:
      ***************************************
      *                                     *
      *   RAPID REPROGRAMMING TERMINAL      *
      *                                     *
      *              (RRT)                  *
      *                                     *
      *       START OF MAIN PROGRAM         *
      *                                     *
      ***************************************

      All RRT I/O comes from one of the following six places:

      1)  Polled RS-232 input and associated output.  The RRT will
            dialogue with Data Terminal Equipment (DTE).  If a proper
            sequence of ASCII characters (+++) is received the RRT will
            enter its command mode and transmit a menu of commands it
            will respond to for testing and/or data transferral.  While
            in the command mode all switch settings will be ignored.
      2)  Polled switch setting inputs and associated LCD outputs.
            While the RRT is transferring data to/from a communications
            port (RS-232, RS-422, MS-1553, or GPIB) from/to the Memory Card,
            any activity on the other communications ports will be ignored.
```

```
     3)  Polled SRAM Memory Card status and when available Memory Card
           header information and corresponding ACFT discrete inputs
           with resulting LCD outputs.
     4).  Polled MS-1553 I/O when enabled by appropriate RS-232 or
           RS-422 dialogue and/or Memory Card and ACFT discretes with
           associated switch settings.
     5)  Polled RS-422 input and associated output.  The RRT will
           dialogue with Data Terminal Equipment (DTE).  If a proper
           sequence of ASCII characters (+++) is received the RRT will
           enter its command mode and transmit a menu of commands it
           will respond to for testing and/or data transferral.  While
           in the command mode all switch settings will be ignored.
     6)  Polled GPIB input and associated output.

     NOTE: ALL memory card accesses MUST use the memory card drivers
           in the MEMCARD.C module.

*****************************************************************************/

/*
     All definitions used by rrt_main.c are defined in
           the following header files:
*/

#include "rrt.h"                    /* RRT configuration definitions */
#include "dsp.h"                    /* DSP definitions */
#include "system.h"                 /* System definitions */
#include "cardhdrs.h"               /* Memory card header definitions */
#include "serialio.h"               /* Serial I/O definitions */
#include "display.h"                /* LCD display definitions */
#include "error.h"                  /* Error routines */
#include "cmdmode.h"                /* Command mode definitions */
#include "switches.h"               /* Switch definitions */
#include "timer.h"                  /* Timer definitions */
#include "boot.h"                   /* Boot reprogram definitions */
#include "rrt_main.h"               /* RRT main definitions */

#include "bit.h"

/* Global status flags */

     STATUS_FLAGS_TYPE status_flags;

/* Definitions used in processing switch positions */
#define not_tested      0x00
#define up              0x01
#define down            0x02
#define load            0x01
#define verify          0x02

/* Definitions used to determine message displayed */
#define none            0x00
#define library_msg     0x01
#define reprogram_msg   0x02
#define error_msg       0xff

/*****************************************************************************
Name:          rrt_main
Number/Version:
History:
                    Date         Rev    Author          Description
                    18-Mar-1993  0.0    C. Houlberg     Baseline

Inputs:
                    fail_flags
Outputs:
                    - None -
Global Data:
                    status_flags
Functions Referenced:
                    LCD_display()
                    ext_bit()
                    command_mode()
                    memory_card_status()
                    card_test()
                    ascii_conversion()
                    switches()
                    pgm_card()
Abstract:
                    Background executive
*****************************************************************************/
void rrt_main(int fail_flags)
{
```

```
SERIAL_REG_TYPE *serial_reg;          /* Serial I/O register pointer */
STATUS_REG_TYPE *status;              /* Serial I/O status pointer */
PPI3_REG_TYPE *switch_status;         /* Switch status pointer */
TIMER_REG_TYPE *timer;                /* Pointer to timer counter register */
CARD_HEADER_TYPE *buffer_pointer;     /* Memory card header buffer pointer */

unsigned serial_status;
int rs232_plus_count = 0;             /* RS-232 "+" count */
int rs422_plus_count = 0;             /* RS-422 "+" count */
int data;
int card0_status = CARD_GOOD;
int card1_status = CARD_GOOD;
int card0_tested = NO;
int card1_tested = NO;
int card0_use, card1_use;
char string[11];
int msg_displayed = none;
int display_card0_status = YES;
int display_card1_status = YES;
int i, buffer[SIZE_CARD_HEADER];
int *source, *pointer;                /* Variables used for boot function */

switch_status = (PPI3_REG_TYPE *) &PPI3;

timer = (TIMER_REG_TYPE *) &TIMER0;

/* Display Revision # and Date */
/*
      --------------------
      |RRT  rev X.XX      |
      |hh:mm:ss mmm_dd_yyyy|
      --------------------
*/
LCD_display(START_LINE1, "\fRRT  rev 0.00\r"__TIME__" "__DATE__);
timer->Timer_Counter = SEC2;
while(timer->Timer_Counter);

/* Clear LCD display */
LCD_display(START_LINE1, "\f");

/* If BIT connector is attached inform user to perform extended BIT */
if(!switch_status->Skip_Extended_BIT)
{
      LCD_display(START_LINE1, "WARNING Extended BIT\rEXEC to Start\t");
      /* Wait for switch input */
      while(switch_status->Not_Execute && switch_status->Not_Skip);
      if(!(switch_status->Not_Execute))
            ext_bit();
      else
      {
            /* Allow time for switch to settle. */
            timer->Timer_Counter = SETTLE_TIME;
            while(timer->Timer_Counter)
                  /* Make sure switch is open */
                  if(!(switch_status->Not_Skip))
                        timer->Timer_Counter = SETTLE_TIME;
      }
}

/* Point to first location in card */
buffer_pointer = (CARD_HEADER_TYPE *) &buffer[0];

/* Ensure UARTs are ready (Clear To Send) */
/* Point to RS-232 registers */
serial_reg = (SERIAL_REG_TYPE *) &RS232;
serial_reg->Control_Register = CTS_Mode;
/* Point to RS-422 */
serial_reg = (SERIAL_REG_TYPE *) &RS422;
serial_reg->Control_Register = CTS_Mode;

for (;;)
{                                          /* "Infinite" loop */
      /* Point to RS-232 registers */
      serial_reg = (SERIAL_REG_TYPE *) &RS232;
      /* Test for RS-232 operational and ready */
      if(!(fail_flags & RS232_Fail) && (serial_reg->Terminal_Ready))
{
      /* Update serial communications status */
      serial_status = serial_reg->Status_Register;
      status = (STATUS_REG_TYPE *) &serial_status;
      if(status->Data_Ready)                 /* Character received */
      {
```

```
                        /* Process RS-232 input */
                        data = serial_data(serial_reg, status);
                        if(data == '+')        /* Test for command mode sequence */
                        {
                                ++rs232_plus_count;
                                if(rs232_plus_count == 3)    /* Test for +++ */
                                {
                                        command_mode(serial_reg);/* Enter command mode */

                                        /* Set flags to test cards and display status */
                                        LCD_display(START_LINE1, "\f"); /* Clead LCD */
                                        rs232_plus_count = 0;
                                        display_card0_status = YES;
                                        card0_tested = NO;
                                        card0_status = CARD_GOOD;    /* Update display */
                                        display_card1_status = YES;
                                        card1_tested = NO;
                                        card1_status = CARD_GOOD;    /* Update display */
                                        msg_displayed = none;
                                }
                        }
                        else
                                rs232_plus_count = 0;        /* Not + character */
                }                                            /* Reset sequence count */
        }

        /* Point to RS-422 */
        serial_reg = (SERIAL_REG_TYPE *) &RS422;
        /* Test for RS-422 operational and ready */
        if(!(fail_flags & RS422_Fail) && (serial_reg->Terminal_Ready))
        {
                /* Update serial communications status */
                serial_status = serial_reg->Status_Register;
                status = (STATUS_REG_TYPE *) &serial_status;
                if(status->Data_Ready)                      /* Character received */
                {
                        /* Process RS-422 input */
                        data = serial_data(serial_reg, status);
                        if(data == '+')        /* Test for command mode sequence */
                        {
                                ++rs422_plus_count;
                                if(rs422_plus_count == 3)    /* Test for +++ */
                                {
                                        command_mode(serial_reg);/* Enter command mode */

                                        /* Set flags to test cards and display status */
                                        LCD_display(START_LINE1, "\f"); /* Clead LCD */
                                        rs422_plus_count = 0;
                                        display_card0_status = YES;
                                        card0_tested = NO;
                                        card0_status = CARD_GOOD;    /* Update display */
                                        display_card1_status = YES;
                                        card1_tested = NO;
                                        card1_status = CARD_GOOD;    /* Update display */
                                        msg_displayed = none;
                                }
                        }
                        else
                                rs422_plus_count = 0;        /* Not + character */
                }                                            /* Reset sequence count */
        }

        /* Establish ID of card for status function */
        memory_card_ID(MEMORY_CARD_0);

        /* Test and display memory card status */
        if(memory_card_status(MEMORY_CARD_0) == NO_CARD_0)
        {
                if(card0_status != NO_CARD_0)
                {
                        LCD_display(START_LINE1, "No Card1  ");
                        card0_status = NO_CARD_0;
                        card0_tested = NO;
                        card0_use = NOT_USED;
                        if(card1_status == NO_CARD_1)
                        {
                                msg_displayed = none;
                                LCD_display(START_LINE2, "\t");
                        }
                        display_card0_status = YES;
                }
        }
        else
```

```
{
      if(display_card0_status)
      {
            LCD_display(START_LINE1, "Detect 1  ");
            if(!card0_tested)
            {
                  card0_status = card_test(MEMORY_CARD_0);
                  card0_tested = YES;
            }
            switch(card0_status)
            {
                  case CARD_ERASED:
                        card0_use = NOT_USED;
                        LCD_display(START_LINE1, "#1 Erased ");
                        break;
                  case CARD_BAD:
                        card0_use = NOT_USED;
                        LCD_display(START_LINE1, "Bad Card1 ");
                        break;
                  case CARD_GOOD:
                        for(i = 0; i < SIZE_CARD_HEADER; i++)
                         buffer[i] = memory_card_read(MEMORY_CARD_0 + i);
                        card0_use = buffer_pointer->Card_Implementation;
                        data = buffer_pointer->Memory_Card_Sequence;
                        string[0] = '#';
                        ascii_conversion(data, &string[1]);
                        string[1] = string[4];
                        string[2] = ' ';
                        string[3] = buffer_pointer->Month_MSC;
                        string[4] = buffer_pointer->Month_LSC;
                        string[5] = buffer_pointer->Day_MSC;
                        string[6] = buffer_pointer->Day_LSC;
                        string[7] = buffer_pointer->Year_3SC;
                        string[8] = buffer_pointer->Year_LSC;
                        string[9] = ' ';
                        string[10] = 0;          /* String terminator */
                        LCD_display(START_LINE1, &string[0]);
                        break;
            }
            display_card0_status = NO;
      }
}

/* Establish ID of card for status function */
memory_card_ID(MEMORY_CARD_1);

if(memory_card_status(MEMORY_CARD_1) == NO_CARD_1)
{
      if(card1_status != NO_CARD_1)
      {
            LCD_display(START_LINE1 + 10, " No Card2 ");
            card1_status = NO_CARD_1;
            card1_tested = NO;
            card1_use = NOT_USED;
            if(card0_status == NO_CARD_0)
            {
                  msg_displayed = none;
                  LCD_display(START_LINE2, "\t");
            }
            display_card1_status = YES;
      }
}
else
{
      if(display_card1_status)
      {
            LCD_display(START_LINE1 + 10, " Detect 2 ");
            if(!card1_tested)
            {
                  card1_status = card_test(MEMORY_CARD_1);
                  card1_tested = YES;
            }
            switch(card1_status)
            {
                  case CARD_ERASED:
                        card1_use = NOT_USED;
                        LCD_display(START_LINE1 + 10, " #2 Erased");
                        break;
                  case CARD_BAD:
                        card1_use = NOT_USED;
                        LCD_display(START_LINE1 + 10, " Bad Card2");
                        break;
```

```
                case CARD_GOOD:
                        for(i = 0; i < SIZE_CARD_HEADER; i++)
                         buffer[i] = memory_card_read(MEMORY_CARD_1 + i);
                        card1_use = buffer_pointer->Card_Implementation;
                        data = buffer_pointer->Memory_Card_Sequence;
                        string[0] = '#';
                        ascii_conversion(data, &string[1]);
                        string[1] = string[4];
                        string[2] = ' ';
                        string[3] = buffer_pointer->Month_MSC;
                        string[4] = buffer_pointer->Month_LSC;
                        string[5] = buffer_pointer->Day_MSC;
                        string[6] = buffer_pointer->Day_LSC;
                        string[7] = buffer_pointer->Year_3SC;
                        string[8] = buffer_pointer->Year_LSC;
                        string[9] = ' ';
                        string[10] = 0;         /* String terminator */
                        LCD_display(START_LINE1 + 11, &string[0]);
                        break;
            }
            display_card1_status = NO;
        }
}

/* Update global status flags with memory card use */
switch(card0_use)
{
        case NOT_USED:
                status_flags.Library_Card_0 = NO;
                status_flags.RRT_Program_Card_0 = NO;
                break;
        case LIBRARY_CARD:
                status_flags.Library_Card_0 = YES;
                status_flags.RRT_Program_Card_0 = NO;
                break;
        case RRT_PROGRAM_CARD:
                status_flags.Library_Card_0 = NO;
                status_flags.RRT_Program_Card_0 = YES;
                break;
}
switch(card1_use)
{
        case NOT_USED:
                status_flags.Library_Card_1 = NO;
                status_flags.RRT_Program_Card_1 = NO;
                break;
        case LIBRARY_CARD:
                status_flags.Library_Card_1 = YES;
                status_flags.RRT_Program_Card_1 = NO;
                break;
        case RRT_PROGRAM_CARD:
                status_flags.Library_Card_1 = NO;
                status_flags.RRT_Program_Card_1 = YES;
                break;
}

/* Display operation and test for execute */
if(((card0_use == LIBRARY_CARD) && (card1_status == NO_CARD_1))
        || ((card0_status == NO_CARD_0) && (card1_use == LIBRARY_CARD))
        || ((card0_use == LIBRARY_CARD) && (card1_use == LIBRARY_CARD)))
{
        if(msg_displayed != library_msg)
                LCD_display(START_LINE2, "EXEC To ");

        /* Mode switch testing done here and one place in switches() */
        if(switch_status->Verify)
        {
                if(status_flags.UPLOAD || status_flags.DOWNLOAD
                        || (msg_displayed != library_msg))
                {                       /* Switch change or initial state */
                        status_flags.UPLOAD = NO;
                        status_flags.DOWNLOAD = NO;

                        LCD_display(START_LINE2 + 8, "Verify\t");
                }
        }
        else
        {
                if(switch_status->Download)
                {
                        if(!status_flags.DOWNLOAD
                                || (msg_displayed != library_msg))
                        {                       /* Switch change or initial state */
```

```
                    status_flags.DOWNLOAD = YES;
                    status_flags.UPLOAD = NO;

                    LCD_display(START_LINE2 + 8, "Download\t");
                }
            }
            else
            {
                if(!status_flags.UPLOAD
                    || (msg_displayed != library_msg))
                {                   /* Switch change or initial state */
                    status_flags.DOWNLOAD = NO;
                    status_flags.UPLOAD = YES;

                    LCD_display(START_LINE2 + 8, "Upload\t");
                }
            }
        }

        msg_displayed = library_msg;

        /* Test for Execute switch */
        if (!(switch_status->Not_Execute))
        {
            /* Allow time for switch to settle. */
            timer->Timer_Counter = SETTLE_TIME;
            while(timer->Timer_Counter)
                /* Make sure switch is open */
                if(!(switch_status->Not_Execute))
                    timer->Timer_Counter = SETTLE_TIME;
            switches(fail_flags);   /* Respond to switch settings */
                display_card0_status = YES;
                card0_status = CARD_GOOD;        /* Update display */
                display_card1_status = YES;
                card1_status = CARD_GOOD;        /* Update display */
                msg_displayed = none;
            }
        }
        else if(((card0_use == RRT_PROGRAM_CARD)
            && (card1_status == NO_CARD_1))
            || ((card0_use == NO_CARD_0)
            && (card1_status == RRT_PROGRAM_CARD)))
        {
            if(msg_displayed != reprogram_msg)
            {
                LCD_display(START_LINE2, "EXEC To Program RRT ");
                msg_displayed = reprogram_msg;
            }

            /* Test for Execute switch */
            if(!(switch_status->Not_Execute))
            {
                /* Allow time for switch to settle. */
                timer->Timer_Counter = SETTLE_TIME;
                while(timer->Timer_Counter)
                    /* Make sure switch is open */
                    if(!(switch_status->Not_Execute))
                        timer->Timer_Counter = SETTLE_TIME;

                /* Reprogram RRT from memory card */
                *source = MEMORY_CARD_LOW_BYTE;
                if(card0_use == RRT_PROGRAM_CARD)
                    *pointer = MEMORY_CARD_0 + SIZE_CARD_HEADER;
                else
                    *pointer = MEMORY_CARD_1 + SIZE_CARD_HEADER;

                program(source, (SERIAL_REG_TYPE *) pointer);
            }
        }
        else if((card0_status != NO_CARD_0) || (card1_status != NO_CARD_1))
        {   /* No other implementations are currently in use */
            if(msg_displayed != error_msg)
            {
                LCD_display(START_LINE2, "ERROR: Improper Card");
                msg_displayed = error_msg;
                display_card0_status = YES;
                display_card1_status = YES;
            }
        }
    }
}
/* end */
```

```
/*****************************************************************************
Module Name:    EXT_BIT.C
Number/Version:
History:
            Date            Rev     Author          Description
                                    S. Taylor
Description:
            Extended Built-In-Test (BIT) routines for RRT.
*****************************************************************************/

/*****************************************************************************
Compiler Directives:  USE_ASM_ARRAY, USE_AUTOINITIALIZATION

Description:

  If USE_ASM_ARRAY is defined, the arrays of structures used in the discrete
  tests (MS-1553 continuity, single-ended, and differential) will be set up
  with "asm" inline assembly directives.  If not defined, then auto-
  initialization or explicit initialization of every element/member of every
  array/structure will be done in 'C', according to wether or not
  USE_AUTOINITIALIZATION is defined.

  - USE_ASM_ARRAY generates the most efficient object code, but is the
    least understandable/maintainable.

  - USE_AUTOINITIALIZATION is the most understandable/maintainable but
    results in permanent allocation of RAM, which is unacceptable.

  - Explicit initialization is easily understood, but is lengthly in both
    source code lines and object code size.

*****************************************************************************/
#define USE_ASM_ARRAY
#undef  USE_AUTOINITIALIZATION


#define AV_BUS_5_PRESENT


#include "rrt.h"
#include "dsp.h"
#include "system.h"
#include "display.h"
#include "timer.h"
#include "memcard.h"
#include "cardhdrs.h"
#include "error.h"
#include "bit.h"


/*****************************************************************************
Enumeration: Test flag bit masks.

Description:
            These bit masks are used to set test-behavior parameters and to
            initialize flags associated with each test.

            RUN_TEST - the test will run only if this flag is set.  This
            flag should be initially set.  rrt_exbit() will clear this
            flag if the operator selects "SKIP" upon a pause after test
            execution.

            FAILED - retains the last test execution result for the test;
            if the flag is set, it indicates that the test failed on most
            recent execution.  This bit will be set or cleared as necessary
            by rrt_exbit().

            QUERY_ON_SUCCESS - if this flag is set, the operator will be
            given the opportunity to skip the test on successive iterations
            of the test suite, even if the test passed.  rrt_exbit() will
            never change the value of this flag during execution; if operator
            elects to skip test on successive iterations then the RUN_TEST
            flag will be cleared.

            COUNT_TOWARDS_COMPLETE_SUCCESS - tests with this flag set must be
            run and pass in each iteration of the test suite in order for
            "Complete Success" to be displayed at the end of the test suite
            run.  rrt_exbit() will never change the value of this flag during
            execution.
*****************************************************************************/
enum {
```

```
    RUN_TEST = 0x01, FAILED = 0x02, QUERY_ON_SUCCESS = 0x04,
    COUNT_TOWARDS_COMPLETE_SUCCESS = 0x08
};

/******************************************************************************
Definition: DEFAULT_TEST_FLAGS

Description:
            Defines the most common initialization for the test flags.
******************************************************************************/
#define DEFAULT_TEST_FLAGS (RUN_TEST + COUNT_TOWARDS_COMPLETE_SUCCESS)

/******************************************************************************
Definition: NBR_TESTS

Description:
            The number of tests that comprise extended bit
******************************************************************************/
#define NBR_TESTS 14

/******************************************************************************
Definition: PASS_MSG_DELAY

Description:
            Length of wait (in milliseconds) after display of "Complete Success"
            or "Partial Success" message before starting next iteration of
            testing.
******************************************************************************/
#define PASS_MSG_DELAY    2000

/******************************************************************************
Name:       ext_bit()
Number/Version:
History:
                  Date          Rev     Author          Description
                  3-18-1993             S. Taylor
Inputs:
                  - None -
Outputs:
      - None -
Global Data:
                  - None -
Functions Referenced:
      ascii_conversion()
      ChecksumTest()
      DifferentialDiscretesTest()
      IEEE488test()
      LCD_display()
      LCD_initialize()
      LCDtest()
      Memcard1test()
      Memcard2test()
      MS1553test1()
      MS1553test2()
      msec_timer()
      RS232test1()
      RS232test2()
      RS422test1()
      RS422test2()
      SingleDiscretesTest()
      SwitchTest()
      WaitForSwitch()
Description:
            Main extended bit routine.  This is called by rrt_main()
            upon determining that the shorting connector is installed
            on the RRT, and never returns.
******************************************************************************/
void ext_bit(void)
{
      int (*CurrentTest)(char *);
      unsigned int TestNbr, Iteration = 0, *TestFlags;
      char msg[21], IterationStr[5], TestNbrStr[5];
      TIMER_REG_TYPE *timer = (TIMER_REG_TYPE *)&TIMER0;

  struct
  {
      int (*Function)(char *);
      unsigned int Flags;
```

```
} Test[NBR_TESTS], *TestPtr;

for(TestNbr = 0; TestNbr < NBR_TESTS; TestNbr++)
    Test[TestNbr].Flags = DEFAULT_TEST_FLAGS;

TestPtr = &Test[0];
TestPtr->Function = ChecksumTest;
(++TestPtr)->Function = MS1553test1;
(++TestPtr)->Function = MS1553test2;
(++TestPtr)->Function = RS232test1;
(++TestPtr)->Function = RS232test2;
(++TestPtr)->Function = RS422test1;
(++TestPtr)->Function = RS422test2;
(++TestPtr)->Function = IEEE488test;
(++TestPtr)->Function = SingleDiscretesTest;
(++TestPtr)->Function = DifferentialDiscretesTest;
(++TestPtr)->Function = Memcard1test;
(++TestPtr)->Function = Memcard2test;
(++TestPtr)->Function = SwitchTest;
TestPtr->Flags = RUN_TEST;
(++TestPtr)->Function = LCDtest;
TestPtr->Flags = RUN_TEST + QUERY_ON_SUCCESS;

LCD_initialize();

while(FOREVER)
{
    /*  Increment and display iteration number and test-run message.
    */
    ascii_conversion(++Iteration, IterationStr);
    LCD_display(START_LINE1, "Extended BIT\t");
    LCD_display(START_LINE1 + 16, IterationStr);

    /*  If no tests remain in loop, halt.
    */
    for(TestNbr = 0; TestNbr < NBR_TESTS; TestNbr++)
      if (Test[TestNbr].Flags & RUN_TEST)
          break;
    if (TestNbr == NBR_TESTS)
    {
      LCD_display(START_LINE2, "No Tests Remain");
      while(FOREVER);
    }

    /*  Run tests
    */
    for(TestNbr = 0; TestNbr < NBR_TESTS; TestNbr++)
    {
      /*  Place iteration number in message string, so that when serial
            test is performed, the iteration number can be read by serial
            monitoring device.
      */
      str_cpy(msg, "RRT BIT ");
      str_cat(msg, IterationStr);
      CurrentTest = Test[TestNbr].Function;
      TestFlags = &(Test[TestNbr].Flags);

      /*  Skip test if the RUN_TEST flag has been cleared.
      */
      if (!(*TestFlags & RUN_TEST))
          continue;

      ascii_conversion(TestNbr, TestNbrStr);
      /* want only least significant byte of number (00 to FF) */
      str_cpy(TestNbrStr, TestNbrStr + 2);
      LCD_display(START_LINE2, "Test\t");
      LCD_display(START_LINE2 + 5, TestNbrStr);

      /*  Run test.
      */
      while(BITSET(dbg,16));
      if ((*CurrentTest)(msg) == FAILURE)
      {
          *TestFlags |= FAILED;  /* set flag */
          LCD_display(START_LINE1, "\fExt BIT Fail");
          LCD_display(START_LINE1 + 16, IterationStr);
          LCD_display(START_LINE2, msg);

          /* Wait for operator to select SKIP or EXEC.  If SKIP is selected,
             clear the RUN_TEST flag so that the test won't ever be run again.
          */
          while(BITSET(dbg,17));
```

```
            if (WaitForSwitch() == 'S')
              *TestFlags &= ~RUN_TEST;

            /*  After switch is selected, go back to display of "running tests"
            */
            LCD_display(START_LINE1, "Extended BIT\t");
            LCD_display(START_LINE1 + 16, IterationStr);
          }
        else /* test passed */
          {
            *TestFlags &= ~FAILED;  /* clear flag */

            /*  If QUERY_ON_SUCCESS is set, then display pass message and pause
                for user selection of SKIP or EXEC.
            */
            if (*TestFlags & QUERY_ON_SUCCESS)
            {
              str_cat(msg, " Done\t");
              LCD_display(START_LINE1, msg);
              LCD_display(START_LINE1 + 16, IterationStr);
              LCD_display(START_LINE2, "EXEC to Keep\t");

              /*  If SKIP selected, remove test from loop.  Otherwise EXEC was
                  selected - keep test in loop, but don't pause on successive
                  iterations.
              */
              if (WaitForSwitch() == 'S')
                  *TestFlags &= ~RUN_TEST;           /* clear execution flag */
              else /* EXEC selected */
                  *TestFlags &= ~QUERY_ON_SUCCESS;  /* clear pause flag */
            }
           /*  Completion of the interactive switch test must be handled
               specially in order that the operator be able to skip it on
               successive test-suite runs.  SwitchTest will point TestMsg
               to "SKIP", "EXEC", or "EXEC/SKIP SWITCH FAILURE" to indicate
               the method of exit.  If "SKIP" is returned, clear the test's
               run flag.
           */
           if ((CurrentTest == SwitchTest) && (msg[0] == 'S'))
             *TestFlags &= ~RUN_TEST; /* clear flag */
        }
      }
      /*  If no tests that were run failed, and no tests with
          COUNT_TOWARDS_COMPLETE_SUCCESS were skipped, then display
          "complete success" message; otherwise display "partial
          success".
      */
      for(TestNbr = 0; TestNbr < NBR_TESTS; TestNbr++)
      {
        TestFlags = &(Test[TestNbr].Flags);
        if (*TestFlags & FAILED)
            break;
        if ((*TestFlags & COUNT_TOWARDS_COMPLETE_SUCCESS) &&
            !(*TestFlags & RUN_TEST))
        break;
      }
      LCD_display(START_LINE1, "\fExtended BIT");
      LCD_display(START_LINE1 + 16, IterationStr);
      LCD_display(START_LINE2, (TestNbr == NBR_TESTS) ?
                         "Complete Success" : "Limited Success");
      msec_timer(PASS_MSG_DELAY, timer);
  }
}
/* end ext_bit()
*****************************************************************************/

/*****************************************************************************
Name:        WaitForSwitch()
Number/Version:
History:
                 Date            Rev     Author          Description
                 3-18-1993               S. Taylor
Inputs:
                 - None -
Outputs:
                 (return value)
                 Returns 'S' if SKIP was selected and released or 'E' if EXEC was
                 selected and released.
Global Data:
                 - None -
Functions Referenced:
                 - None -
```

```
Description:
                    Waits for the operator to select and release either the
                    SKIP or EXEC switch.
****************************************************************************/
char WaitForSwitch(void)
{
  TIMER_REG_TYPE *timer = (TIMER_REG_TYPE *)&TIMER0;
  PPI3_REG_TYPE *switch_status = (PPI3_REG_TYPE *)&PPI3;/* Switch status */
  char Switch;

  /*  Wait for switch to open - switch must be open for at least the
      SETTLE_TIME period.
  */
  timer->Timer_Counter = SETTLE_TIME;
  while(timer->Timer_Counter)
      if(!switch_status->Not_Execute || !switch_status->Not_Skip)
        timer->Timer_Counter = SETTLE_TIME;
  /*  Wait for switch closure
  */
  while(BITSET(dbg,15));
  while(switch_status->Not_Execute && switch_status->Not_Skip);

  Switch = switch_status->Not_Execute ? 'S' : 'E';

  /*  Wait for switch to open - switch must be open for at least the
      SETTLE_TIME period.
  */
  timer->Timer_Counter = SETTLE_TIME;
  while(timer->Timer_Counter)
      if(!switch_status->Not_Execute || !switch_status->Not_Skip)
        timer->Timer_Counter = SETTLE_TIME;

  return(Switch);
}
/* end WaitForSwitch()
****************************************************************************/

/****************************************************************************
Name:           IEEE488test
Number/Version:
History:
                    Date            Rev     Author          Description
                                            S. Taylor

Inputs:
                    - None -
Outputs:
                    msg
                    Must be passed in as a pointer to an array of at least
                    21 characters.  This will be returned containing a message
                    indicating the name of the test and cause of test failure if
                    any failure occurred.

                    (return value)
                    Returns one of the constants SUCCESS or FAILURE to
                    indicate whether the test passed or failed.
Global Data:
                    - None -
Functions Called:
                    ascii_conversion()
                    BITSET()
                    str_cat()
                    str_cpy()
                    SETBIT()
Description:
                    Tests IEEE-488 interface through the shorting connector.
                    The shorting connector is expected to be configured as follows:

                    Handshake       Data
                      Line          Line
                    ---------     ---------
                       REN   <---> DATA I/O 1
                       IFC   <---> DATA I/O 2
                       SRQ   <---> DATA I/O 3
                       EOI   <---> DATA I/O 4
                       NRFD  <---> DATA I/O 5
                       NDAC  <---> DATA I/O 6
                       DAV   <---> DATA I/O 7
                       ATN   <---> DATA I/O 8

                    With this shorting arrangement, the bits of the data-line
                    Cmd-Pass-Thru register and handshake-line Bus Status register
                    line up.
```

```
                  Much of what is coded here is based on only a basic
                  understanding of the description of operation in the TI9914A
                  data manual; much of it doesn't seem to work as intended and
                  has been enclosed in the compilation directive
                  STUFF_THAT_DOESNT_WORK.  With this directive undefined, only
                  the parts of the test that are known to succeed are compiled.

                  The working part of this test tests three data lines and three
                  handshake lines, the handshake lines being tested as the inputs
                  to the data-line outputs.

*****************************************************************************/
int IEEE488test(char *msg)
{
  TIMER_REG_TYPE *timer = (TIMER_REG_TYPE *)&TIMER0;
  GPIB_READ_REG_TYPE *GpibRead = (GPIB_READ_REG_TYPE *)&GPIBREGS;
  GPIB_WRITE_REG_TYPE *GpibWrite = (GPIB_WRITE_REG_TYPE *)&GPIBREGS;
  unsigned *AuxCmd      = &(GpibWrite->AuxCmd);
  unsigned *DataOut     = &(GpibWrite->DataOut);
  unsigned *SerialPoll  = &(GpibWrite->SerialPoll);
  unsigned *AddrStatus  = &(GpibRead->AddrStatus);
  unsigned *BusStatus   = &(GpibRead->BusStatus);
  unsigned *CmdPassThru = &(GpibRead->CmdPassThru);
  unsigned *DataIn      = &(GpibRead->DataIn);
  unsigned int Error = 0, i, OutValue;
  char TempString[5];

  str_cpy(msg, "IEEE-488");

  while(BITSET(dbg, 1));

#ifdef STUFF_THAT_DOESNT_WORK
  /*  Clear data-out register
  */
  *DataOut = 0;

  /*  Test ATN (attention) line
  */
  *AuxCmd = Set_swrst;  /* set software reset condition */
  *AuxCmd = tca;     /* take control async - sets ATN */
  *AuxCmd = Clr_swrst;  /* finished with reset operations */
  if (!BITSET(*BusStatus, B_ATN) || !BITSET(*CmdPassThru, B_ATN))
      SETBIT(Error,0);

  *AuxCmd = Set_swrst;
  *AuxCmd = gts;     /* go to standby - clears Attention line */
  *AuxCmd = Clr_swrst;
  if (BITSET(*BusStatus, B_ATN) || BITSET(*CmdPassThru, B_ATN))
      SETBIT(Error,0);

  /*  Put interface in system-controller mode for rest of testing.
  */
  *AuxCmd = Set_swrst;  /* set software reset condition */
  *AuxCmd = tca;     /* take control async - sets Attention line */
  *AuxCmd = Clr_swrst;  /* finished with reset operations */

  /*  Test REN (Remote-Enable) line.
  */
  *AuxCmd = Set_sre;   /* set send-remote-enable */
  if (!BITSET(*BusStatus, B_REN) || !BITSET(*CmdPassThru, B_REN))
      SETBIT(Error,1);

  *AuxCmd = Clr_sre;   /* clear send-remote-enable */
  if (BITSET(*BusStatus, B_REN) || BITSET(*CmdPassThru, B_REN))
      SETBIT(Error,1);

  /*  Test IFC (interface-clear) line.
  */
  *AuxCmd = Set_sic;   /* set interface-clear */
  if (!BITSET(*BusStatus, B_IFC) || !BITSET(*CmdPassThru, B_IFC))
      SETBIT(Error,2);

  *AuxCmd = Clr_sic;   /* clear interface-clear */
  if (BITSET(*BusStatus, B_IFC) || BITSET(*CmdPassThru, B_IFC))
      SETBIT(Error,2);

  /*  Test SRQ (service-request) line.
      QUESTION:  Assertion of IEEE-488 Service Request
      QUESTION:  Will the SRQ line be asserted immediately upon putting
      QUESTION:  data in the service request request register with the
      QUESTION:  most significant bit TRUE?
      QUESTION:
```

```
 */
 *SerialPoll = 0xFF;   /* request service */
 if (!BITSET(*BusStatus, B_SRQ) || !BITSET(*CmdPassThru, B_SRQ))
     SETBIT(Error,3);

 *SerialPoll = 0x00;   /* clear service-request */
 if (BITSET(*BusStatus, B_SRQ) || BITSET(*CmdPassThru, B_SRQ))
     SETBIT(Error,3);

 *DataOut = 0;
 if (*CmdPassThru != *BusStatus)
     SETBIT(Error, 4);
#else

 /*  Put interface in system-controller mode for rest of testing.
 */
 *AuxCmd = Set_swrst;  /* set software reset condition */
 *AuxCmd = tca;     /* take control async - sets Attention line */
 *AuxCmd = Clr_swrst;  /* finished with reset operations */

 /*  Setting and clearing interface-clear line seems necessary in order
      for ATN line to be asserted.
 */
 *AuxCmd = Set_sic;    /* set interface-clear */
 *AuxCmd = Clr_sic;    /* clear interface-clear */

#endif

  for(i = 0; i < 8; i++)  /* for each data/handshake pair */
  {
      /*  Check to see if data line is currently TRUE; if so, don't attempt
           to put data out on it.
      */
      if (BITSET(*CmdPassThru, i))
        continue;

      /*  Check only bits that are known to test out good
      */
      if ((i != 2) && (i != 3) && (i != 5))
        continue;

      /*  Set data line TRUE and verify in both registers.  Don't try to use
           SETBIT() on *DataOut directly - this implies a read of the register
           (the |= operator), which obtains the current contents of the DataIn
           register, since all of the IEEE-488 controller registers are
           independent (read-only or write-only).
      */
      OutValue = *CmdPassThru;
      SETBIT(OutValue, i);
      *DataOut = OutValue;
      if (!BITSET(*CmdPassThru, i) || !BITSET(*BusStatus, i))
        SETBIT(Error, i+5);

      OutValue = *CmdPassThru;
      CLEARBIT(OutValue, i);
      *DataOut = OutValue;
      if (BITSET(*CmdPassThru, i) || BITSET(*BusStatus, i))
        SETBIT(Error, i+5);
  }
  if (!Error)
      return(SUCCESS);

  str_cat(msg, ":");
  /*  Place error code as a 4-byte (8-character) hex value in the returned
       message.  The function ascii_conversion() works with 16-bit values,
       so it must be called twice.
  */
  ascii_conversion(Error >> 16, TempString); /* upper 2 bytes of Error */
  str_cat(msg, TempString);
  ascii_conversion(Error, TempString);       /* lower 2 bytes of Error */
  str_cat(msg, TempString);
  return(FAILURE);
}
/* end IEEE488test
******************************************************************************/


/******************************************************************************
Type definition:  PPI1_MS1553TEST_REG_TYPE

Description:
          A specialized mapping of the PPI1 registers for use by the MS-1553
          inteface test function, MS1553test2().
```

```
****************************************************************************/
typedef struct          /* Variable definitions pertaining to PPI #1 usage. */
{
  unsigned BusSelect;                       /* MS-1553 bus selection port    */
  unsigned DirXfmr                  : 1;   /* 1 = short path, 0 = long path */
  unsigned CenterTapGround          : 1;   /* 1 = CT grounded, 0 = CT open  */
  unsigned Not_Used_0               : 30;
  unsigned Not_Used_1;
} PPI1_MS1553TEST_REG_TYPE;

/****************************************************************************
Type definition:  AV_BUS_TEST_STRUCT

Description:
            Structure specifying the characteristics a single shorted wire for
            BIT test.
****************************************************************************/
typedef struct
{
  unsigned *InputPort; /* PPI register of input */
  unsigned InputBit;   /* Bit-position of input in register (0-based) */
} AV_BUS_TEST_STRUCT;

#ifdef USE_ASM_ARRAY
/*  If using assembly-defined array, which allows constant array to be
    initialized in EEPROM, declare external symbol for test structures for
    primary avionics bus (PAV) and secondary avionics bus (SAV).
*/
extern AV_BUS_TEST_STRUCT *PAVB, *SAVB;


/*  Define array of structures in assembly - the three words on each line
    correspond to the three structure elements of AV_BUS_TEST_STRUCT.
*/
asm("_PAVB  .word  (_PPI3+1), 0"); /* +EW_BUS       -->CONFIG0 */
asm("       .word  (_PPI3+1), 1"); /* -EW_BUS       -->CONFIG1 */
asm("       .word  (_PPI3+1), 0"); /* +AV_BUS1_PRI-->CONFIG0 */
asm("       .word  (_PPI3+1), 1"); /* -AV_BUS1_PRI-->CONFIG1 */
asm("       .word  (_PPI3+1), 0"); /* +AV_BUS2_PRI-->CONFIG0 */
asm("       .word  (_PPI3+1), 1"); /* -AV_BUS2_PRI-->CONFIG1 */
asm("       .word  (_PPI3+1), 0"); /* +AV_BUS3_PRI-->CONFIG0 */
asm("       .word  (_PPI3+1), 1"); /* -AV_BUS3_PRI-->CONFIG1 */
asm("       .word  (_PPI3+1), 0"); /* +AV_BUS4_PRI-->CONFIG0 */
asm("       .word  (_PPI3+1), 1"); /* -AV_BUS4_PRI-->CONFIG1 */
#ifdef AV_BUS_5_PRESENT
  asm("       .word  (_PPI3+1), 0"); /* +AV_BUS5_PRI-->CONFIG0 */
  asm("       .word  (_PPI3+1), 1"); /* -AV_BUS5_PRI-->CONFIG1 */
#endif

/* first two elements for seconday bus array are zeroed because
   there is no "+/-EW_BUS_SEC".
*/

asm("_SAVB  .word  0, 0");
asm("       .word  0, 0");
asm("       .word  (_PPI3+1), 2"); /* +AV_BUS1_SEC-->CONFIG2 */
asm("       .word  (_PPI3+1), 3"); /* -AV_BUS1_SEC-->CONFIG3 */
asm("       .word  (_PPI3+1), 2"); /* +AV_BUS2_SEC-->CONFIG2 */
asm("       .word  (_PPI3+1), 3"); /* -AV_BUS2_SEC-->CONFIG3 */
asm("       .word  (_PPI3+1), 2"); /* +AV_BUS3_SEC-->CONFIG2 */
asm("       .word  (_PPI3+1), 3"); /* -AV_BUS3_SEC-->CONFIG3 */
asm("       .word  (_PPI3+1), 2"); /* +AV_BUS4_SEC-->CONFIG2 */
asm("       .word  (_PPI3+1), 3"); /* -AV_BUS4_SEC-->CONFIG3 */
#ifdef AV_BUS_5_PRESENT
  asm("       .word  (_PPI3+1), 2"); /* +AV_BUS5_SEC-->CONFIG2 */
  asm("       .word  (_PPI3+1), 3"); /* -AV_BUS5_SEC-->CONFIG3 */
#endif

#endif

#ifdef AV_BUS_5_PRESENT
  #define NBR_AV_BUSES 6 /* EW + AV BUS 1 through 5 */
#else
  #define NBR_AV_BUSES 5 /* EW + AV BUS 1 through 4 */
#endif

/****************************************************************************
Name:         MS1553test2
Number/Version:
History:
                    Date              Rev     Author          Description
                    3-18-1993                 S. Taylor
```

```
Inputs:
                  - None -
Outputs:
                  msg
                  Must be passed in as a pointer to an array of at least
                  21 characters.  This will be returned containing a message
                  indicating the name of the test and cause of test failure if
                  any failure occurred.

                  (return value)
                  Returns one of the constants SUCCESS or FAILURE to
                  indicate whether the test passed or failed.
Global Data:
                  - None -
Functions Referenced:
                  ascii_conversion()
                  BITSET()
                  CLEARBIT()
                  SETBIT()
                  str_cpy()
                  USEC_PAUSE()
Description:
                  Continuity test of MS-1553 interface on secondary windings
                  of isolation transformers and associated relays.

                  The required configuration of the shorting connector for this
                  test is as follows:

                  Output                 Input
                  ------                 -----
                  +EW_BUS --------->     CONFIG0 (PPI3B0)
                  +AV_BUS1_PRI --->      ""
                  +AV_BUS2_PRI --->      ""
                  +AV_BUS3_PRI --->      ""
                  +AV_BUS4_PRI --->      ""
                  +AV_BUS5_PRI --->      ""

                  -EW_BUS --------->     CONFIG1 (PPI3B1)
                  -AV_BUS1_PRI --->      ""
                  -AV_BUS2_PRI --->      ""
                  -AV_BUS3_PRI --->      ""
                  -AV_BUS4_PRI --->      ""
                  -AV_BUS5_PRI --->      ""

                  +AV_BUS1_SEC --->      CONFIG2 (PPI3B2)
                  +AV_BUS2_SEC --->      ""
                  +AV_BUS3_SEC --->      ""
                  +AV_BUS4_SEC --->      ""
                  +AV_BUS5_SEC --->      ""

                  -AV_BUS1_SEC --->      CONFIG3 (PPI3B3)
                  -AV_BUS2_SEC --->      ""
                  -AV_BUS3_SEC --->      ""
                  -AV_BUS4_SEC --->      ""
                  -AV_BUS5_SEC --->      ""

******************************************************************************/
int MS1553test2(char *msg)
{
  /*  Bus relay control registers.  Uses custom bitfield structure to
      simplify access for this test.
  */
  PPI1_MS1553TEST_REG_TYPE *Control = (PPI1_MS1553TEST_REG_TYPE *)&PPI1;
  unsigned *BusSelect = &(Control->BusSelect);
  TIMER_REG_TYPE *timer = (TIMER_REG_TYPE *)&TIMER0;
  unsigned int i, j, Error = 0;
  char TempString[5];
  AV_BUS_TEST_STRUCT *PosPrimary, *NegPrimary, *PosSecondary, *NegSecondary;
  AV_BUS_TEST_STRUCT *PrimaryAVbus = (AV_BUS_TEST_STRUCT *)&PAVB;
  AV_BUS_TEST_STRUCT *SecondaryAVbus = (AV_BUS_TEST_STRUCT *)&SAVB;

  while(BITSET(dbg, 2));

  /*  Verify that the inputs are high for three cases:

          1. with all buses disabled,
          2. AV BUS 1 enabled, center-tap open, long (xfmr) path, and
          3. AV BUS 1 enabled, center-tap open, short (direct) path.
  */
  for(i = 0; i <= 2; i++)
  {
     /*  First iteration - open all bus relays
```

```
    */
    if (i == 0)
    {
      for(j = 0; j < NBR_AV_BUSES; j++)
          CLEARBIT(*BusSelect, i);
    }
    /*  Second iteration - open center-tap, select "long" path, and enable
        AV BUS 1 (any of the buses would suffice).
    */
    else if (i == 1)
    {
      Control->C nterTapGround = 0;
      Control->DirXfmr = 0;
      SETBIT(*BusSelect, 1);
    }
    /*  Third iteration - switch to "short" path
    */
    else
    {
      Control->DirXfmr = 1;
    }
    /*  Delay for relay-settling.
    */
    if (delays)
    {
      timer->Timer_Counter = SETTLE_TIME;
      while(timer->Timer_Counter);
    }

    /*  +AV_BUS1_PRI should read high.
    */
    if (!BITSET(*PrimaryAVbus[2].InputPort, PrimaryAVbus[2].InputBit))
      SETBIT(Error, (i*4)+0); /* error bits 0, 4, 8 */

    /*  -AV_BUS1_PRI should read high.
    */
    if (!BITSET(*PrimaryAVbus[3].InputPort, PrimaryAVbus[3].InputBit))
      SETBIT(Error, (i*4)+1); /* error bits  1, 5, 9 */

    /*  +AV_BUS1_SEC should read high.
    */
    if (!BITSET(*SecondaryAVbus[2].InputPort, SecondaryAVbus[2].InputBit))
      SETBIT(Error, (i*4)+2); /* error bits 2, 6, 10 */

    /*  -AV_BUS1_SEC should read high.
    */
    if (!BITSET(*SecondaryAVbus[3].InputPort, SecondaryAVbus[3].InputBit))
      SETBIT(Error, (i*4)+3); /* error bits 3, 7, 11 */
}

/*  Ground the center-tap and verify low inputs through both transformer
    paths.
*/
for(i = 0; i <= 1; i++)
{
    /*  First iteration - ground center-tap, select "long" path.
    */
    if (i == 0)
    {
      Control->CenterTapGround = 1;
      Control->DirXfmr = 0;
    }
    /* Second iteration - switch to "short" path.
    */
    else
      Control->DirXfmr = 1;

    /*  Delay for relay-settling.
    */
    if (delays)
    {
      timer->Timer_Counter = SETTLE_TIME;
      while(timer->Timer_Counter);
    }

    /*  +AV_BUS1_PRI should read low.
    */
    if (BITSET(*PrimaryAVbus[2].InputPort, PrimaryAVbus[2].InputBit))
      SETBIT(Error, (i*4)+12);  /* error bits 12, 16 */

    /*  -AV_BUS1_PRI should read low.
    */
```

```
    if (BITSET(*PrimaryAVbus[3].InputPort, PrimaryAVbus[3].InputBit))
      SETBIT(Error, (i*4)+13);  /* error bits 13, 17 */

    /*  +AV_BUS1_SEC should read low.
    */
    if (BITSET(*SecondaryAVbus[2].InputPort, SecondaryAVbus[2].InputBit))
      SETBIT(Error, (i*4)+14); /* error bits 14, 18 */

    /*  -AV_BUS1_SEC should read low.
    */
    if (BITSET(*SecondaryAVbus[3].InputPort, SecondaryAVbus[3].InputBit))
      SETBIT(Error, (i*4)+15); /* error bits 15, 19 */
}

/*  Disable all buses.
*/
for(i = 0; i < NBR_AV_BUSES; i++)
    CLEARBIT(*BusSelect, i);

/*  With center-tap closed and DIR/XFMR on "long" path, test bus-select
     relays individually to ensure that ground can be established and
     broken.

     There are 6 primary bus-select relays (EW and AV PRI 1 through 5) but
     only 5 secondary bus-select relays (AV SEC 1 through 5)
*/
while(BITSET(dbg, 3));
for(i = 0; i < NBR_AV_BUSES; i++)
{
    /*  Assign "convenience" pointers to +/- lines of primary and secondary
        buses.
    */
    PosPrimary = &PrimaryAVbus[(i*2)+0];
    NegPrimary = &PrimaryAVbus[(i*2)+1];
    PosSecondary = &SecondaryAVbus[(i*2)+0];
    NegSecondary = &SecondaryAVbus[(i*2)+1];

/*  Enable bus being tested.
*/
SETBIT(*BusSelect, i);
if (delays)
{
  timer->Timer_Counter = SETTLE_TIME;
  while(timer->Timer_Counter);
}

/*  Inputs for +/- primaries should read low.
*/
if (BITSET(*PosPrimary->InputPort, PosPrimary->InputBit))
  SETBIT(Error, (i*2)+20); /* error bits 20, 22, 24, 26, 28, 30 */

if (BITSET(*NegPrimary->InputPort, NegPrimary->InputBit))
  SETBIT(Error, (i*2)+20); /* error bits 20, 22, 24, 26, 28, 30 */

/*  Input for +/- secondaries should read low.  Not checked on the
    first (i == 0) iteration, since there is no secondary on the EW bus.
    (Error bit 21, which would represent EW_BUS_SEC if there was
    such a thing, is not used.)
*/
if (i)
{
  if (BITSET(*PosSecondary->InputPort, PosSecondary->InputBit))
      SETBIT(Error, (i*2)+21); /* error bits 23, 25, 27, 29, 31 */

  if (BITSET(*NegSecondary->InputPort, NegSecondary->InputBit))
      SETBIT(Error, (i*2)+21); /* error bits 23, 25, 27, 29, 31 */
}

/*  Disable bus being tested.
*/
CLEARBIT(*BusSelect, i);
if (delays)
{
  timer->Timer_Counter = SETTLE_TIME;
  while(timer->Timer_Counter);
}

/*  Inputs for +/- primaries should read high.
*/
if (!BITSET(*PosPrimary->InputPort, PosPrimary->InputBit))
  SETBIT(Error, (i*2)+20); /* error bits 20, 22, 24, 26, 28, 30 */
```

```
  if (!BITSET(*NegPrimary->InputPort, NegPrimary->InputBit))
    SETBIT(Error, (i*2)+20); /* error bits 20, 22, 24, 26, 28, 30 */

  /*  Inputs for +/- secondaries should read high.
  */
  if (i)
  {
    if (!BITSET(*PosSecondary->InputPort, PosSecondary->InputBit))
        SETBIT(Error, (i*2)+21); /* error bits 23, 25, 27, 29, 31 */

    if (!BITSET(*NegSecondary->InputPort, NegSecondary->InputBit))
        SETBIT(Error, (i*2)+21); /* error bits 23, 25, 27, 29, 31 */
      }
  }
  str_cpy(msg, "MS-1553");

  /*  If Error is still zero, all tests passed.
  */
  if (!Error)
      return(SUCCESS);

  str_cat(msg, ":");

  /*  Place error code as a 4-byte (8-character) hex value in the returned
       message.  The function ascii_conversion() works with 16-bit values,
       so it must be called twice.
  */
  ascii_conversion(Error >> 16, TempString); /* upper 2 bytes of Error */
  str_cat(msg, TempString);
  ascii_conversion(Error, TempString);       /* lower 2 bytes of Error */
  str_cat(msg, TempString);
  return(FAILURE);
}
/* end MS1553test2()
*****************************************************************************/


/*****************************************************************************
Definition: SWITCH_HOLDTIME

Description:
            The SwitchTest() routine is exited upon the operator's holding
            of the EXEC or SKIP switch for an extended period of time.
            SWITCH_HOLDTIME defines how long the switch must be held before the
            routine exits this must be set equal to one of the symbolic timer
            constants defined in timer.h
*****************************************************************************/
#define SWITCH_HOLDTIME SEC2


/*****************************************************************************
Type definition: PPI3_REG_TYPE_2

Description:
            Same as the PPI3_REG_TYPE typedef'ed structure in SYSTEM.H, except
            that the Download and Verify bit fields have been combined into
            a single 2-bit bitfield called "Mode"; this is to facilitate the
            change to the test for the new switch panel where the PPI registers
            read differently for the three-position UP/VRFY/DOWN switch and the
            bitfield names "Download" and "Verify" are no longer accurate.
*****************************************************************************/
typedef struct      /* Variable definitions pertaining to PPI #3 usage */
{
     unsigned Platform_ID            :  5;   /* Platform ID discretes */
     unsigned Not_Used_0             :  1;   /* Unused bit */
     unsigned Not_Execute            :  1;   /* 0 ==> Execute SW active */
     unsigned Not_Skip               :  1;   /* 0 ==> Skip SW active */
     unsigned Unusable_0             : 24;   /* Unusable bits */
     unsigned Platform_Configuration :  4;   /* Platform config. discretes */
     unsigned Skip_Extended_BIT      :  1;   /* Extended BIT discrete */
     unsigned Not_Used_1             :  1;   /* Unused bit (switch circuit) */
     unsigned Mode                   :  2;   /* Status of UP/VRFY/DOWN */
     unsigned Unusable_1             : 24;   /* Unusable bits */

     unsigned RRT_Display;                   /* LCD display character */

} PPI3_REG_TYPE_2;

/*****************************************************************************
Definitions: UPLOAD, DOWNLOAD, VERIFY

Description:
```

```
        Contants for the "Mode" bit field of the PPI3_REG_TYPE_2 structure,
        giving the switch position indicated by each combination of the
        switch flags.
****************************************************************************/
enum { UPLOAD = 0x01, DOWNLOAD, VERIFY };

/****************************************************************************
Name:           SwitchTest
Number/Version:
History:
                        Date            Rev     Author          Description
                        3-18-1993               S. Taylor
Inputs:
                        - None -
Outputs:
                        msg
                        Must be passed in as a pointer to a character array of at least
                        21 characters.  This will be returned containing "SKIP" or "EXEC"
                        to indicate that the routine was exited via holding down the
                        switch in the SKIP or EXECUTE position, respectively.

                        (return value)
                        This function returns one of the #define'd constants SUCCESS or
                        FAILURE to indicate if the test passed or failed.
Global Data:
                        - None -
Functions Referenced:
                        LCD_display()
                        mem_cpy()
                        str_cpy()
Description:
                        Interactive test of the RRT toggle switches.  Uses LCD display to
                        indicate current position of each switch.  The operator must
                        toggle each switch and observe that the display shows the correct
                        position.  This function is exited when the SKIP/EXEC switch is
                        held for two seconds
****************************************************************************/
int SwitchTest(char *msg)
{
#ifdef OLD_FRONT_PANEL
  PPI3_REG_TYPE *switch_status = (PPI3_REG_TYPE *)&PPI3; /* Switch status  */
#else
  PPI3_REG_TYPE_2 *switch_status = (PPI3_REG_TYPE_2 *)&PPI3;
#endif

  /*  Need to use timer 1 instead of timer 0 to preserve timer count across
      calls to LCD_display() which uses timer 0.
  */
  TIMER_REG_TYPE *timer = (TIMER_REG_TYPE *)&TIMER1;     /* Timer pointer  */
  char Line1[21];
  char Line2[21];
  char SpaceStr[] = "     "; /* 5 spaces */
  int Stat;
  unsigned int Time;
  char SwitchHeld = '\x0';

  LCD_display(START_LINE1, "\f"); /* clear display */
  mem_cpy(Line1, SpaceStr, 5);
  mem_cpy(Line2, SpaceStr, 5);

  while(FOREVER)
  {
      /* Read switch settings and build strings for line 1 and line 2 display.
      */
#ifdef OLD_FRONT_PANEL
      Stat = switch_status->Download;
      mem_cpy(Line1+5,  Stat ? SpaceStr : " UP  ",  5);
      mem_cpy(Line2+5,  Stat ? "DOWN "  : SpaceStr, 5);

      Stat = switch_status->Verify;
      mem_cpy(Line1+10, Stat ? SpaceStr : "LOAD ",  5);
      mem_cpy(Line2+10, Stat ? "VRFY "  : SpaceStr, 5);
#else
      Stat = switch_status->Mode;
      switch(Stat)
      {
        UPLOAD:
            mem_cpy(Line1+5, SpaceStr, 5);
            mem_cpy(Line2+5, SpaceStr, 5);
            mem_cpy(Line1+10, " UP  ",  5);
            mem_cpy(Line2+10, SpaceStr, 5);
            break;
```

```
        DOWNLOAD:
            mem_cpy(Line1+5,  SpaceStr, 5);
            mem_cpy(Line2+5,  SpaceStr, 5);
            mem_cpy(Line1+10, SpaceStr, 5);
            mem_cpy(Line2+10, "DOWN ",  5);
            break;
        VERIFY:
            mem_cpy(Line1+5,  "VRFY ",  5);
            mem_cpy(Line2+5,  SpaceStr, 5);
            mem_cpy(Line1+10, SpaceStr, 5);
            mem_cpy(Line2+10, SpaceStr, 5);
            break;
        default:
            str_cpy(msg, "UP/VRFY/DOWN Switch");
            return(FAILURE);
      }
#endif
    Stat = !switch_status->Not_Execute;
    mem_cpy(Line1+15, Stat ? "EXEC " : SpaceStr, 5);

    Stat = !switch_status->Not_Skip;
    mem_cpy(Line2+15, Stat ? "SKIP " : SpaceStr, 5);

    Line1[20] = '\0';
    Line2[20] = '\0';

    LCD_display(START_LINE1, Line1);
    LCD_display(START_LINE2, Line2);

    while(BITSET(dbg,4));
    /* If both EXEC and SKIP read as active there is a definite problem.
    */
    if (!switch_status->Not_Execute && !switch_status->Not_Skip)
    {
      str_cpy(msg, "EXEC/SKIP Switch");
      return(FAILURE);
    }
    /*  Check EXEC switch.
    */
    else if (!switch_status->Not_Execute)
    {
      /*  If switch not aready detected as selected, start timing.
      */
      if (SwitchHeld != 'E')
      {
          timer->Timer_Counter = SWITCH_HOLDTIME; /* 1's comp of usec */
          SwitchHeld = 'E';
      }
    }
    /*  Check SKIP switch.
    */
    else if (!switch_status->Not_Skip)
    {
      /*  If switch not aready detected as selected, start timing.
      */
      if (SwitchHeld != 'S')
      {
          timer->Timer_Counter = SWITCH_HOLDTIME; /* 1's comp of usec */
          SwitchHeld = 'S';
      }
    }
    /*  Neither EXEC nor SKIP is currently selected; clear flag.
    */
    else
      SwitchHeld = '\x0';

    /*  If a switch is held down and the timer has expired, then exit
        test.
    */
    Time = timer->Timer_Counter;
    while(BITSET(dbg,5));
    if (SwitchHeld && !Time)
    {
      while(BITSET(dbg,6));
      if (SwitchHeld == 'E')
      {
          str_cpy(msg, "EXEC");
          LCD_display(START_LINE1, "RELEASE EXEC SWITCH\t\r\t");
      }
      else /* SwitchHeld == 'S' */
      {
```

```
            str_cpy(msg, "SKIP");
            LCD_display(START_LINE1, "\t\rRELEASE SKIP SWITCH\t");
        }
        /*  Wait until switch is released and then return.
        */
        while(!switch_status->Not_Skip || !switch_status->Not_Execute);
        return(SUCCESS);
      }
  } /* end while FOREVER */
}
/* end SwitchTest()
*****************************************************************************/

/*****************************************************************************
Name:           SerialTest
Number/Version:
History:
                    Date            Rev     Author          Description
                    3-18-1993               S. Taylor
Inputs:
                    string
                    String to send/receive for test.

                    serial_reg
                    Pointer to the UART register for the serial port to test.
Outputs:
                    (return value)
                    This function returns one of the #define'd constants SUCCESS or
                    FAILURE to indicate if the test passed or failed.
Global Data:
                    - None -
Functions Referenced:
                    - None -
Description:
                    Performs serial data loopback test on the RS-232 or RS-422
                    interface.
*****************************************************************************/
int SerialTest(char *string, char *msg, SERIAL_REG_TYPE *serial_reg)
{
  TIMER_REG_TYPE *timer = (TIMER_REG_TYPE *) &TIMER0;
  unsigned int status, data_ready;
  char *chptr;

  while(BITSET(dbg,7));

  /* Set RTS and DTR low.  Shorting connector attaches RTS to CTS, and DTR
      to DSR.  Verify that DSR ("Terminal_Ready") and CTS ("Request_To_Send)
      lines go low within 10 msec.
  */
  serial_reg->Control_Register = 0x20;
  timer->Timer_Counter = MSEC10;
  while(timer->Timer_Counter &&
            (serial_reg->Terminal_Ready || serial_reg->Request_To_Send));

  if (!timer->Timer_Counter)
  {
      str_cat(msg, serial_reg->Terminal_Ready ? ":DTP/DSR" : ":RTS/CTS");
      serial_reg->Control_Register = Stop_Mode;
      return(FAILURE);
  }

  /*  Set RTS and DTR high and verify that DSR and CTS lines
        go high within 10 msec.
  */
  serial_reg->Control_Register = CTS_Mode;
  timer->Timer_Counter = MSEC10;
  while(timer->Timer_Counter &&
            (!serial_reg->Terminal_Ready || !serial_reg->Request_To_Send));

  if (!timer->Timer_Counter)
  {
      str_cat(msg, !serial_reg->Terminal_Ready ? ":DTR/DSR" : ":RTS/CTS");
      serial_reg->Control_Register = Stop_Mode;
        return(FAILURE);
  }

  /*  Clear any old status register contents.
  */
  timer->Timer_Counter = SEC1;
  do
  {
      status = serial_reg->Status_Register & 0xFF;
```

```
    } while(status && timer->Timer_Counter);
    if (status)
    {
        str_cat(msg, ":Stuck status");
        return(FAILURE);
    }

    /*  Perform data transmit/receive test.
    */
    for (chptr = string; *chptr; chptr++)
    {
        data_ready = 0;

        /*  Send character and wait up to one second for transmit-complete.
        */
        serial_reg->Data_Register = *chptr;
        timer->Timer_Counter = SEC1;
        do
        {
          status = serial_reg->Status_Register;
          if (status & UART_DR)
              data_ready = 1;
        } while (timer->Timer_Counter && !(status & (UART_ERROR | UART_TC)));

        if (status & UART_ERROR)
        {
          str_cat(msg, status & UART_PE ? ":Parity" :
                              status & UART_FE ? ":Framing" : ":Overrun");
          break;
        }
        if (!(status & UART_TC))
        {
          str_cat(msg, ":TX time-out");
          break;
        }

        /*  If data-ready already received set status to data-ready, otherwise
            wait up to one second for receipt of data.
        */
        if (data_ready)
          status = UART_DR;
        else
        {
          timer->Timer_Counter = SEC1;
          while(timer->Timer_Counter && !(status & (UART_ERROR | UART_DR)))
              status = serial_reg->Status_Register;
        }
        if (status & UART_ERROR)
        {
          str_cat(msg, status & UART_PE ? ":Parity" :
                              status & UART_FE ? ":Framing" : ":Overrun");
          break;
        }
        if (!(status & UART_DR))    /* data not ready; test failed */
        {
          while(BITSET(dbg,8));
          str_cat(msg, ":RX time-out");
          break;
        }

        /* Compare received data with transmitted data.
        */
        if (serial_reg->Data_Register != *chptr)
        {
          str_cat(msg, ":Bad data");
          break;
        }
    }
    serial_reg->Control_Register = Stop_Mode;

    if (*chptr) /* didn't make it all the way through test string */
        return(FAILURE);

    return(SUCCESS);
}
/* end SerialTest()
*******************************************************************************/


/*******************************************************************************
Name:       RS232test2
Number/Version:
```

```
History:
                    Date            Rev     Author          Description
                    3-18-1993               S. Taylor       --
Inputs:
                    - None -
Outputs:
                    msg
                    Must be passed in as a pointer to a character array of at least
                    21 characters.  This will be returned containing a message
                    indicating the name of the test.

                    (return value)
                    This function returns one of the #define'd constants SUCCESS or
                    FAILURE to indicate if the test passed or failed.
Global Data:
                    - None -
Functions Referenced:
                    SerialTest()
Description:
                    Tests the RS-232 interface through the shorting connector.
*****************************************************************************/
int RS232test2(char *msg)
{
  char TestString[21];

  /*  Use contents of message string as test send/receive string, so that
      external device can be passed information without disturbing test.
  */
  str_cpy(TestString, msg);
  str_cpy(msg, "RS-232");
  return(SerialTest(TestString, msg, (SERIAL_REG_TYPE *)&RS232));
}
/* end RS232test2()
*****************************************************************************/


/*****************************************************************************
Name:          RS422test2
Number/Version:
History:
                    Date            Rev     Author          Description
                    3-18-1993               S. Taylor
Inputs:
                    - None -
Outputs:
                    msg
                    Must be passed in as a pointer to a character array of at least
                    21 characters.  This will be returned containing a message
                    indicating the name of the test.

                    (return value)
                    This function returns one of the #define'd constants SUCCESS or
                    FAILURE to indicate if the test passed or failed.
Global Data:
                    - None -
Functions Referenced:
                    SerialTest()
Description:
                    Tests the RS-422 interface through the shorting connector.
*****************************************************************************/
int RS422test2(char *msg)
{
  char TestString[21];

  /*  Use contents of message string as test send/receive string, so that
      external device can be passed information without disturbing test.
  */
  str_cpy(TestString, msg);
  str_cpy(msg, "RS-422");
  return(SerialTest(TestString, msg, (SERIAL_REG_TYPE *)&RS422));
}
/* end RS422test()
*****************************************************************************/


/*****************************************************************************
Definition: NBR_DIFF_DISCRETES

Description:
               The number of differential discrete outputs to test.
*****************************************************************************/
#define NBR_DIFF_DISCRETES 4
```

```
/****************************************************************************
Type definition:  DISCRETE_TEST_STRUCT

Description:
            Structure specifying the characteristics of a connection made by the
            shorting connector for extended BIT.
****************************************************************************/
typedef struct
{
      unsigned *OutputPort;      /* write-register for output */
      unsigned OutputBit;        /* write-register bit-position of output */
      unsigned *InputPort;       /* read-register for input */
      unsigned InputBit;         /* read-register bit-position of input */
} DISCRETE_TEST_STRUCT;


#ifdef USE_ASM_ARRAY
/*  If using assembly-defined array, which allows constant array to be
    initialized in EEPROM, declare external symbol for test structure for
    discrete testing (DIS).
*/
extern DISCRETE_TEST_STRUCT *DIS;

/*  Define array of structures in assembly - the three words on each line
    correspond to the three structure elements of AV_BUS_TEST_STRUCT.
*/
asm("_DIS  .word (_PPI2+0), 4, (_PPI2+2), 1");
asm("      .word (_PPI2+0), 5, (_PPI2+2), 3");
asm("      .word (_PPI2+1), 4, (_PPI2+2), 0");
/* asm("      .word (_PPI2+1), 5, (_PPI3+0), 5"); */
asm("      .word (_PPI2+1), 6, (_PPI2+2), 2");
/* asm("      .word (_PPI2+1), 7, (_PPI3+0), 4"); */

#endif


/****************************************************************************
Name:       DifferentialDiscretesTest
Number/Version:
History:
                  Date          Rev     Author          Description
                  3-18-1993             S. Taylor
Inputs:
                  - None -
Outputs:
                  msg
                  Must be passed in as a pointer to a character array of at least
                  21 characters.  This will be returned containing a message
                  indicating the name of the test. If the test fails this message
                  will indicate the name of the test, plus a one-byte error
                  code if the test has failed.  The set bits of the error code
                  indicate failures in specific I/O paths:

                        BIT  Mask  Meaning
                        ---  ----  -------
                         0   0x01  Failure in path AV_EN1     --> IPL Fail 2
                         1   0x02  Failure in path AV_EN2     --> IPL Fail 4
                         2   0x03  Failure in path IPL 1      --> IPL Fail 1
                         3   0x04  Failure in path IPL 3      --> IPL Fail 3

                  (return value)
                  This function returns one of the #define'd constants SUCCESS or
                  FAILURE to indicate if the test passed or failed.
Global Data:
                  - None -
Functions Referenced:
                  ascii_conversion()
                  BITSET()
                  CLEARBIT()
                  SETBIT()
                  str_cpy()
Description:
                  Tests the differential input/output discretes through the
                  shorting connector.  The differential outputs tested are:

                        PPI2A, bits 4 and 5, bit masks 0x10 and 0x20
                        PPI2B, bits 4 and 6, bit masks 0x10 and 0x40

                  The differential inputs tested are:

                        PPI2C, bits 0 through 3, bit masks 0x01, 0x02, 0x04, 0x08
```

```
*****************************************************************************/
int DifferentialDiscretesTest(char *msg)
{
  unsigned Error = 0, i, *OutputPort, OutputBit, InputBit;
  char TempString[5];


#ifdef USE_ASM_ARRAY
  DISCRETE_TEST_STRUCT *Discrete = (DISCRETE_TEST_STRUCT *)&DIS;

#elif USE_AUTOINITIALIZATION
      DISCRETE_TEST_STRUCT Discrete[] = {
       { &(((PPI_REG_TYPE *)&PPI2)->A), 4, &(((PPI_REG_TYPE *)&PPI2)->C), 1 },
       { &(((PPI_REG_TYPE *)&PPI2)->A), 5, &(((PPI_REG_TYPE *)&PPI2)->C), 3 },
       { &(((PPI_REG_TYPE *)&PPI2)->B), 4, &(((PPI_REG_TYPE *)&PPI2)->C), 0 },
/*    { &(((PPI_REG_TYPE *)&PPI2)->B), 5, &(((PPI_REG_TYPE *)&PPI3)->A), 5 },*/
       { &(((PPI_REG_TYPE *)&PPI2)->B), 6, &(((PPI_REG_TYPE *)&PPI2)->C), 2 },
/*    { &(((PPI_REG_TYPE *)&PPI2)->B), 7, &(((PPI_REG_TYPE *)&PPI3)->A), 4 } */
      };
#else /* No assembly array or 'C' autoinitialization */

  DISCRETE_TEST_STRUCT Discrete[NBR_DIFF_DISCRETES];
  DISCRETE_TEST_STRUCT *StructPtr = &Discrete[0];

  /* something is wrong with this initialization */

  StructPtr->OutputPort = &(((PPI_REG_TYPE *)&PPI2)->A);
  StructPtr->OutputBit = 4;
  StructPtr->InputPort = &(((PPI_REG_TYPE *)&PPI2)->C);
  StructPtr->InputBit = 1;
  StructPtr++;

  StructPtr->OutputPort = &(((PPI_REG_TYPE *)&PPI2)->A);
  StructPtr->OutputBit = 5;
  StructPtr->InputPort = &(((PPI_REG_TYPE *)&PPI2)->C);
  StructPtr->InputBit = 3;
  StructPtr++;

  StructPtr->OutputPort = &(((PPI_REG_TYPE *)&PPI2)->B);
  StructPtr->OutputBit = 4;
  StructPtr->InputPort = &(((PPI_REG_TYPE *)&PPI2)->C);
  StructPtr->InputBit = 0;
  StructPtr++;
/*
  StructPtr->OutputPort = &(((PPI_REG_TYPE *)&PPI2)->B);
  StructPtr->OutputBit = 5;
  StructPtr->InputPort = &(((PPI_REG_TYPE *)&PPI3)->A);
  StructPtr->InputBit = 5;
  StructPtr++;
*/
  StructPtr->OutputPort = &(((PPI_REG_TYPE *)&PPI2)->B);
  StructPtr->OutputBit = 6;
  StructPtr->InputPort = &(((PPI_REG_TYPE *)&PPI2)->C);
  StructPtr->InputBit = 2;
  StructPtr++;
/*
  StructPtr->OutputPort = &(((PPI_REG_TYPE *)&PPI2)->B);
  StructPtr->OutputBit = 7;
  StructPtr->InputPort = &(((PPI_REG_TYPE *)&PPI3)->A);
  StructPtr->InputBit = 4;
  StructPtr++;
*/
#endif

  while(BITSET(dbg,9));
  for(i = 0; i < NBR_DIFF_DISCRETES; i++)
  {
      /*  Set output low and verify input is low.
      */
      CLEARBIT(*Discrete[i].OutputPort, Discrete[i].OutputBit);
      if (BITSET(*Discrete[i].InputPort, Discrete[i].InputBit))
        SETBIT(Error, i);          /* set error flag */

      /*  Set output high and verify input is high.
      */
      SETBIT(*Discrete[i].OutputPort, Discrete[i].OutputBit);
      if (!BITSET(*Discrete[i].InputPort, Discrete[i].InputBit))
        SETBIT(Error, i);          /* set error flag */

      /*  Set output low again and verify.
      */
      CLEARBIT(*Discrete[i].OutputPort, Discrete[i].OutputBit);
```

```
        if (BITSET(*Discrete[i].InputPort, Discrete[i].InputBit))
          SETBIT(Error, i);          /* set error flag */
    }
    /*  Point msg to name so that whatever is in name will be returned to
        caller.
    */
    str_cpy(msg, "D-Discretes");

    /*  If "Error" is still zero, all tests passed.
    */
    if (!Error)
        return(SUCCESS);

    str_cat(msg, ":");
    ascii_conversion(Error >> 16, TempString); /* higher 2 bytes */
    str_cat(msg, TempString);
    ascii_conversion(Error, TempString); /* lower 2 bytes */
    str_cat(msg, TempString);
    return(FAILURE);
}
/* end DifferentialDiscretesTest()
*****************************************************************************/


typedef struct
{
  unsigned *Port;           /* PPI register for output */
  signed Bit[4];            /* bit-positions of outputs (use -1 if N/A) */
} SE_DISCRETE_TEST_STRUCT;


extern SE_DISCRETE_TEST_STRUCT *SEDISC;

/*  EW_OSM_EN, EW_UDM_EN, EXT_PROC_ON/OFF --> ACFT0 (PPI3A0)
*/
asm("_SEDISC .word  (_PPI2+0), 0, 1, 2, -1");

/*  BOOT_EN_SMS, BOOT_EN_RDP              --> ACFT1 (PPI3A1)
*/
asm("         .word  (_PPI1+1), 4, 5, -1, -1");

/*  MSDRS_ON/OFF                          --> ACFT2 (PPI3A2)
*/
asm("         .word  (_PPI1+1), 6, -1, -1, -1");

/*  PWR_OFF/ON_3, PWR_OFF/ON_4            --> ACFT3 (PPI3A3)
*/
asm("         .word  (_PPI2+1), 2, 3, -1, -1");

/*  PWR_OFF/ON_1, PWR_OFF/ON_2            --> ACFT4 (PPI3A4)
*/
asm("         .word  (_PPI2+1), 0, 1, -1, -1");

/*  PPI1A6, PPI1A7                        --> PPI3A5
*/
asm("         .word  (_PPI1+0), 6, 7, -1, -1");

/*****************************************************************************
Definition: NBR_SE_DISCRETES

Description:
            The number of groups of single-ended discrete outputs (and the number
            of single-ended discrete inputs) to test.
*****************************************************************************/
#define NBR_SE_DISCRETE_INPUTS 6


/*****************************************************************************
Name:       SingleDiscretesTest
Number/Version:
History:
                  Date          Rev    Author        Description
                  3-18-1993            S. Taylor
Inputs:
                  - None -
Outputs:
                  msg
                  Must be passed in as a pointer to a character array of at least
                  21 characters.  This will be returned containing a message
                  indicating the name of the test.  If the test fails this message
                  will indicate the name of the test, plus a four-byte error
                  code if the test has failed.
```

```
                    (return value)
                    This function returns one of the #define'd constants SUCCESS or
                    FAILURE to indicate if the test passed or failed.
Global Data:
                    - None -
Functions Referenced:
                    ascii_conversion()
                    BITSET()
                    CLEARBIT()
                    SETBIT()
                    str_cpy()
                    USEC_PAUSE()
Description:
                    Tests the relay-output discretes by shorting them to single-ended
                    input discretes through the shorting connector.
*************************************************************************/
int SingleDiscretesTest(char *msg)
{
  TIMER_REG_TYPE *timer = (TIMER_REG_TYPE *)&TIMER0;
  unsigned Error = 0;
  unsigned i, b;
  unsigned *InputPort = &(((PPI_REG_TYPE *)&PPI3)->A);
  char TempString[5];

  SE_DISCRETE_TEST_STRUCT *Output = (SE_DISCRETE_TEST_STRUCT *)&SEDISC;
  SE_DISCRETE_TEST_STRUCT *Out;

  while(BITSET(dbg,10));
  for(i = 0; i < NBR_SE_DISCRETE_INPUTS; i++)
  {
      Out = &Output[i];
      for(b = 0; Out->Bit[b] >= 0; b++)
        CLEARBIT(*Out->Port, Out->Bit[b]);

      if (delays)
      {
        timer->Timer_Counter = SETTLE_TIME;
        while(timer->Timer_Counter);
      }

      if (!BITSET(*InputPort, i)) /* error - input is low */
        SETBIT(Error, i*5); /* error bits 0, 5, 10, 15, etc. */

      /*  Test each relay indicated for the input port in the array by closing
          and opening it again, each time verifying the input.
      */
      for(b = 0; Out->Bit[b] >= 0; b++)
      {
        /*  Close relay and verify input is low.
        */
        SETBIT(*Out->Port, Out->Bit[b]);
        if (delays)
        {
            timer->Timer_Counter = SETTLE_TIME;
            while(timer->Timer_Counter);
        }

        if (BITSET(*InputPort, i))
            SETBIT(Error, (i*5) + b + 1);

        /*  Open relay and verify input is high.
        */
        CLEARBIT(*Out->Port, Out->Bit[b]);
        if (delays)
        {
            timer->Timer_Counter = SETTLE_TIME;
            while(timer->Timer_Counter);
        }

        if (!BITSET(*InputPort, i))
            SETBIT(Error, (i*5) + b + 1);
      }
  }
  /*  Assign returned message.
  */
  str_cpy(msg, "S-Discretes");

  /*  If "Error" is still zero, all tests passed.
  */
  if (!Error)
      return(SUCCESS);
```

```
  /*  If Error has bits set, return *msg that includes the error value.
      Place 'Error' as a 4-byte (8-character) hex value in the returned
      message.  ascii_conversion() works with 16-bit values, so it must be
      called twice (it takes care of re-terminating the string also).
  */
  str_cat(msg, ":");
  ascii_conversion(Error >> 16, TempString); /* higher 2 bytes */
  str_cat(msg, TempString);
  ascii_conversion(Error, TempString); /* lower 2 bytes */
  str_cat(msg, TempString);
  return(FAILURE);
}
/* end SingleDiscretesTest()
****************************************************************************/

/****************************************************************************
Name:           CardStatusTest
Number/Version:
History:
                Date            Rev     Author          Description
                3-18-1993               S. Taylor
Inputs:
                CardAddress
                The base address of the card to be checked (should be one of the
                #define'd constants MEMORY_CARD_0 or MEMORY_CARD_1).

Outputs:
                (return value)
                -2  = no card
                -1  = success
                 0+ =  number of failed block
Global Data:
                - None -
Functions Referenced:

Description:
                Checks to see if all memory card block devices are ready to
                read/write.

****************************************************************************/
int CardStatusTest(unsigned CardAddress, int *Status)
{
  TIMER_REG_TYPE *timer = (TIMER_REG_TYPE *)&TIMER0;
  int address, *system_address;
  int CardSize, BlockSize, BlockNbr;

  /* Recheck card presence
  */
  timer->Timer_Counter = 0;
  if ((*Status = memory_card_status(CardAddress)) != NO_ERROR)
      return(-2);

  /* Obtain memory card and block sizes
  */
  CardSize = memory_card_size(CardAddress);
  BlockSize = memory_card_block(CardAddress);

  /*  If Type I card, then there are no registers to read.
  */
  if (((Memory_Card_ID & 0xFFFF) == S1_1MEG) ||
       ((Memory_Card_ID & 0xFFFF) == S1_4MEG))
      return(-1);  /* "success" */

  BlockNbr = 0;
  for(address = 0; address < CardSize; address += BlockSize)
  {
      BlockNbr++;

      /* Get block status
      */
      system_address = address_card_page(CardAddress + address);
      *system_address = READ_STATUS;
      *Status =  BLOCK_STATUS_MASK & *system_address;
      *system_address = READ_ARRAY;
      if (*Status)
        break;

      timer->Timer_Counter = 0;
      if ((*Status = memory_card_status(CardAddress)) != NO_ERROR)
        break;
  }
```

```
  while(BITSET(dbg,11));

  /* Ensure memory card in Read Array Mode
  */
  *system_address = READ_ARRAY;

  if (address < CardSize)  /* failure */
      return(BlockNbr);

  return(-1);  /* success */
}
/* end CardStatusTest
******************************************************************************/

/******************************************************************************
Definition: WC_SHIFT

Description:
            The card checksum test periodically updates the LCD display with a
            count value to indicate progress is being made.  This is a 16-bit
            value representing the number of words read from the memory card,
            or some number of significant bits of the count, as determined by
            this #define.  WC_SHIFT determines the number of bits of right-shift
            to apply to the current word count before displaying it.  A value of
            0 causes the display to be updated at every word read, which would
            slow down the test.  On the other hand a value of 16, which would
            cause the most significant 16 bits of the 32-bit word count to be
            displayed would not update fast enough to indicate progress.  An
            arbitrary value has been picked which reasonably indicates progress
            adding one to the value causes the progress to be displayed half as
            fast and subtracting one causes the progress to be displayed twice
            as fast.  The significance of the value (whether it represents a
            word count, word count / 2, word count / 4, etc) is also affected,
            of course.  A value of 32 disables display updates entirely.
******************************************************************************/
#define WC_SHIFT 12   /* update display every 4096th word read from card */


/******************************************************************************
Name:       CardChecksumTest
Number/Version:
History:
                  Date        Rev     Author          Description
                  3-18-1993           S. Taylor
Inputs:
                  CardAddress
                  The base address of the card to be checked (should be one of the
                  #define'd constants MEMORY_CARD_0 or MEMORY_CARD_1).


Outputs:
                  (return value)
                  Returns SUCCESS or FAILURE.
Global Data:
                  - None -
Functions Referenced:
                  memory_card_read()
Description:
                  Performs a checksum test of the indicated memory card.
******************************************************************************/
int CardChecksumTest(unsigned CardAddress)
{
  unsigned int i, j, Sum = 0, FileNbr = 0, Address, FileSize;
  unsigned int WordCount = 0, WordCardSize;
  unsigned int Status, Data;
  unsigned int DisplayValue = 0;
  char DisplayValueStr[9];

  int lookup_table[SIZE_LOOKUP_TABLE];  /* Array for lookup table */
  LOOKUP_TABLE_TYPE *lookup_table_ptr = (LOOKUP_TABLE_TYPE *)lookup_table;

  WordCardSize = memory_card_size(CardAddress) >> 1;

   /*  Sum the bytes of the card header.
   */
   for(i = 0; i < SIZE_CARD_HEADER; i++)
   {
      Data = memory_card_read(CardAddress+i);
      WordCount++;
      Sum += Data;
```

```
    }

    /*  Initialize address to start of first file's lookup table.
    */
    Address = CardAddress + SIZE_CARD_HEADER;
    for(FileNbr = 0; memory_card_read(Address) != 0xFFFF; FileNbr++)
    {
        /*  If number of read exceeds card size, something is wrong...
        */
        if (WordCount > WordCardSize)
          break;

        /*  Read lookup table from card and add values to checksum.
        */
        for(i = 0; i < SIZE_LOOKUP_TABLE; i++)
        {
          Data = memory_card_read(Address + i);
          WordCount++;
          lookup_table[i] =  Data;
          Sum += Data;
        }

        /*  Get size of file in 16-bit WORDS.
        */
        FileSize = ((lookup_table_ptr->File_Size_MSW << 16)
                           + lookup_table_ptr->File_Size_LSW) >> 1;

        /*  Verify file size is within amount of memory card not yet read.
        */
        if (FileSize > (WordCardSize - WordCount))
          break;

        /*  Sum the values over the file, if and only if file is not a
            "download" file.
        */
        if (!lookup_table_ptr->Download_To_Card_OK)
        {
          j = 0;
          for(i = SIZE_LOOKUP_TABLE; i < SIZE_LOOKUP_TABLE + FileSize; i++, j++)
          {
              Data = memory_card_read(Address + i);
              if (++WordCount > WordCardSize)
                break;
              if ((WordCount >> WC_SHIFT) != DisplayValue)
              {
                DisplayValue = WordCount >> WC_SHIFT;
                ascii_conversion(DisplayValue, DisplayValueStr);
                LCD_display(START_LINE2 + 16, DisplayValueStr);
              }
              Sum += Data;
              if (j > 10000)
              {
                if ((Status = memory_card_status(CardAddress)) != NO_ERROR)
                    return(FAILURE);
                j = 0;
              }
          }
        }

        /*  Add file size count to "Address" to point at next lookup table.
        */
        Address += SIZE_LOOKUP_TABLE + FileSize;
    }
    /* Add in card terminator.
    */
    Sum += 0xFFFF;

    /* Take lower 16 bits only.
    */
    Sum &= 0xFFFF;

    if (Sum)
        return(FAILURE);
    else
        return(SUCCESS);
}
/* end CardChecksumTest
*****************************************************************************/


/*****************************************************************************
Name:       CardErased
```

```
Number/Version:
History:
                  Date          Rev     Author        Description
                  3-18-1993             S. Taylor
Inputs:
                  CardAddress
                  The base address of the card to be checked (should be one of the
                  #define'd constants MEMORY_CARD_0 or MEMORY_CARD_1).

Outputs:
                  (return value)
                   1 = card is erased, or
                   0 = card not erased
                  -1 = card not detected

Global Data:
                  - None -
Functions Referenced:
                  memory_card_read()
Description:
                  Checks to see if memory card has been erased.  An erased
                  card should have 0xFFFF written to each word.
*****************************************************************************/

signed int CardErased(unsigned CardAddress)
{
  unsigned i, j, Size;

  /*  Get size of memory card or set size equal to amount of memory to
      check before considering the card erased.
  */
  Size = memory_card_size(CardAddress);

  /*  Check for 0xFFFF's written to the number of word indicated by Size
  */
  for(i = 0, j =0; i < Size; i++, j++)
  {
      if (memory_card_read(CardAddress+i) != 0xFFFF)
        return(0);  /* not erased */
      if (j > 10000)
      {
        if (memory_card_status(CardAddress) != NO_ERROR)
            return(-1);
        j = 0;
      }
  }
  return(1);
}
/* end CardErased()
*****************************************************************************/


/*****************************************************************************
Name:         MemcardTest
Number/Version:
History:
                  Date          Rev     Author        Description
                  3-18-1993             S. Taylor
Inputs:
                  CardAddress
                  The base address of the card to be tested (should be one of the
                  #define'd constants MEMORY_CARD_0 or MEMORY_CARD_1).


Outputs:
                  msg

                  (return value)
                  This function returns one of the #define'd constants: CARD_GOOD,
                  CARD_BAD, or CARD_ERASED.
Global Data:
                  - None -
Functions Referenced:
                  ascii_conversion()
                  CheckCardStatusRegister()
                  CardChecksumTest()
                  memory_card_status()
                  str_cpy()
Description:
                  Tests an EEPROM memory card by detecting its presence,
                  reading each memory blocks status register for errors,
                  reading/writing the interrupt mask register to verify
```

```
                  operability (not yet implemented), and verifying data
                  validity by checksumming the header and files.
****************************************************************************/
int Memcardtest(unsigned CardAddress, char *msg)
{
  TIMER_REG_TYPE *timer = (TIMER_REG_TYPE *)&TIMER0;
  int *system_address;          /* system address pointer */
  int i, Done, Status;
  char TempString[5];

#ifdef USE_AUTOINITIALIZATION
  struct MemCardStruct
  {
      unsigned NoCard;           /* "no card" indicator */
      unsigned Timeout;          /* "card not ready" indicator */
      unsigned WriteProtected;   /* "write protect" indicator */
  } MemoryCardArray[2] = {
      { NO_CARD_0, CARD_0_TIMEOUT, CARD_0_WP },
      { NO_CARD_1, CARD_1_TIMEOUT, CARD_1_WP }
  };
  struct MemCardStruct *MemoryCard =
      &MemoryCardArray[CardAddress == MEMORY_CARD_0 ? 0 : 1];
#else
  struct
  {
      unsigned NoCard;           /* "no card" indicator */
      unsigned Timeout;          /* "card not ready" indicator */
      unsigned WriteProtected;   /* "write protect" indicator */
  } MemoryCard;

  if (CardAddress == MEMORY_CARD_0)
  {
      MemoryCard.NoCard = NO_CARD_0;
      MemoryCard.Timeout = CARD_0_TIMEOUT;
      MemoryCard.WriteProtected = CARD_0_WP;
  }
  else
  {
      MemoryCard.NoCard = NO_CARD_1;
      MemoryCard.Timeout = CARD_1_TIMEOUT;
      MemoryCard.WriteProtected = CARD_1_WP;
  }
#endif

  /*  All messages, both success and error, start with Card1 or Card2.
  */
  str_cpy(msg, "Card");
  str_cat(msg, (CardAddress == MEMORY_CARD_0) ? "1" : "2");

  while(BITSET(dbg,12));

  /*  Get card status.  Zero out timer for use by memory_card_status().
  */
  memory_card_ID(CardAddress);
  timer->Timer_Counter = 0;
  Status = memory_card_status(CardAddress);
  while(BITSET(dbg,13));

  /*  If card not present or not ready, set message and return.
  */
  if (Status == MemoryCard.NoCard)
  {
     str_cat(msg, " Not Detected");
     return(FAILURE);
  }
  else if (Status == MemoryCard.Timeout)
  {
     str_cat(msg, " Not Ready");
     return(FAILURE);
  }
  else if (Status == CARD_ID_BAD)
  {
     str_cat(msg, ": Bad ID");
     return(FAILURE);
  }

  /* Read status register of each device pair.  If i is zero or positive,
     then it indicates a failed device block number; if negative, the
     test passed.
  */
  i = CardStatusTest(CardAddress, &Status);
```

```
  while(BITSET(dbg,14));
  if (i >= 0)
  {
      str_cat(msg, ":Stat ");

      /* Append 1-byte (2-character) block number, followed by '/'
      */
      ascii_conversion(i, TempString);
      str_cat(msg, &TempString[2]);
      str_cat(msg, "/");

      /*  Append 2-byte (4-character) status code.
      */
      ascii_conversion(Status, TempString);
      str_cat(msg, TempString);
      return(FAILURE);
  }
  i = CardChecksumTest(CardAddress);
  if (i == FAILURE)
  {
      /* The check for an erased card is made AFTER the checksum test because
         it takes a LOT longer to run.
      */
      i = CardErased(CardAddress);
      if (i == 1)
        str_cat(msg, ":Erased");
      else if (i == -1)
        str_cat(msg, " Not Detected");
      else
        str_cat(msg, ":Read Error");
      return(FAILURE);

  }
  /*
        if (memory card is a BIT-test card)
        {
            timer->Timer_Counter = 0;
            if (memory_card_status(CardAddress) == MemoryCard.WriteProtected)
            {
              str_cat(msg, " Write Protect");
              return(FAILURE);
            }
            memory_card_erase(CardAddress);
            if (CardErased(CardAddress) != 1)
            {
              str_cat(msg, ":Erase Error");
              return(FAILURE);
            }
            - Write new header and a lookup table to card. -
            if (CardChecksumTest(CardAddress) == FAILURE)
            {
              str_cat(msg, ":Write Error");
              return(FAILURE);
            }
        }
  */
  str_cat(msg, " Test");
  return(SUCCESS);
}
/* end MemcardTest()
***************************************************************************/


/**************************************************************************
Name:         card_test
Number/Version:
History:
                   Date            Rev     Author          Description
                   3-18-1993               S. Taylor
Inputs:
                   CardAddress
                   The base address of the card to be tested (should be one of the
                   #define'd constants MEMORY_CARD_0 or MEMORY_CARD_1).

Outputs:
                   (return value)
                   This function returns one of the #define'd constants CARD_GOOD,
                   CARD_BAD, or CARD_ERASED.
Global Data:
                   - None -
```

```
Functions Referenced:
      ascii_conversion()
      str_cpy()
      memory_card_read()
      memory_card_status()
Description:
                  Tests an EEPROM memory card by detecting its presence,
                  reading each memory blocks status register for errors,
                  reading/writing the interrupt mask register to verify
                  operability (not yet implemented), and verifying data
                  validity by checksumming the header and files.
****************************************************************************/
int card_test(unsigned CardAddress)
{
  TIMER_REG_TYPE *timer = (TIMER_REG_TYPE *)&TIMER0;
  int *system_address;          /* system address pointer */
  int i, Status;

  struct
  {
      unsigned NoCard;           /* "no card" indicator */
      unsigned Timeout;          /* "card not ready" indicator */
      unsigned WriteProtected;   /* "write protect" indicator */
  } MemoryCard;

  if (CardAddress == MEMORY_CARD_0)
  {
      MemoryCard.NoCard = NO_CARD_0;
      MemoryCard.Timeout = CARD_0_TIMEOUT;
      MemoryCard.WriteProtected = CARD_0_WP;
  }
  else
  {
      MemoryCard.NoCard = NO_CARD_1;
      MemoryCard.Timeout = CARD_1_TIMEOUT;
      MemoryCard.WriteProtected = CARD_1_WP;
  }

  /* Get card status.  Zero out timer for use by memory_card_status().
  */
  timer->Timer_Counter = 0;
  Status = memory_card_status(CardAddress);

  /*  If card not present or not ready return.
  */
  if (Status == MemoryCard.NoCard)
      return(CARD_BAD);
  else if (Status == MemoryCard.Timeout)
      return(CARD_BAD);

  /*  Read status register of each device pair.  If return value is zero or
        positive, then it indicates a failed device block number; if negative,
        the test passed.
  */
  if (CardStatusTest(CardAddress, &Status) >= 0)
      return(CARD_BAD);

  /*  Perform checksum test.  If return value is zero or position, it
       indicates the number of the failed file; if negative the test passed.
  */
  if (CardChecksumTest(CardAddress) == FAILURE)
  {
      Status = CardErased(CardAddress);
      if (Status == 1)
        return(CARD_ERASED);
      else if (Status == -1)
        return(NO_CARD);
      else
        return(CARD_BAD);
  }
  return(CARD_GOOD);
}
/* end card_test()
****************************************************************************/



/****************************************************************************
Name:       Memcard1test
Number/Version:
```

```
History:
                  Date          Rev     Author          Description
                  3-18-1993             S. Taylor       --

Inputs:
                  - None -

Outputs:
                  msg
                  Must be passed in as a pointer to a character array of at least
                  21 characters.  This will be returned-containing a message
                  indicating the name of the test.

                  (return value)
                  This function returns one of the #define'd constants SUCCESS or
                  FAILURE to indicate if the test passed or failed.

Global Data:
                  - None -

Functions Referenced:
                  Memcardtest()

Description:
                  Tests EEPROM memory card 1 by calling Memcardtest for card 1.
****************************************************************************/
int Memcard1test(char *msg)
{
      return(Memcardtest(MEMORY_CARD_0, msg));
}
/* end Memcard1test()
****************************************************************************/


/****************************************************************************
Name:        Memcard2test
Number/Version:
History:
                  Date          Rev     Author          Description
                  3-18-1993             S. Taylor

Inputs:
                  - None -

Outputs:

                  msg
                  Must be passed in as a pointer to a character array of at least
                  21 characters.  This will be returned containing a message
                  indicating the name of the test.

                  (return value)
                  This function returns one of the #define'd constants SUCCESS or
                  FAILURE to indicate if the test passed or failed.

Global Data:
                  - None -

Functions Referenced:
                  Memcardtest()

Description:
                  Tests EEPROM memory card 2 by calling Memcardtest for card 2.
****************************************************************************/
int Memcard2test(char *msg)
{
      return(Memcardtest(MEMORY_CARD_1, msg));
}
/* end Memcard2test()
****************************************************************************/


/****************************************************************************
Include File Name:    cmdmode.h
Number/Version:
History:
            Date          Rev     Author          Description
            17-Mar-1993 0.0      C. Houlberg      Baseline

Abstract:
            Prototype for cmdmode.c (User command mode) function.
****************************************************************************/

/*    cmdmode.c contains the following functions:
*/
      void command_mode(SERIAL_REG_TYPE *serial_reg);

/* end */


/****************************************************************************
Module Name:    cmdmode.c
Number/Version:
```

```
History:
            Date        Rev     Author          Description
            17-Mar-1993 0.0     C. Houlberg     Baseline

Abstract:
                    Command mode menu module

      Note: There will be no response to any changes in the switch
            settings when the RRT is in the Command Mode.  All
            operations will be directed from the keyboard via the
            serial I/O link (RS-232 or RS-422).

*************************************************************************/

#include "rrt.h"                        /* RRT configuration definitions */
#include "system.h"                     /* System definitions */
#include "serialio.h"                   /* RS-232 definitions */
#include "upload.h"                     /* Upload definitions */
#include "download.h"                   /* Download definitions */
#include "copy.h"                       /* Copy definitions */
#include "erase.h"                      /* Erase definitions */
#include "program.h"                    /* Program RRT definitions */
#include "boot.h"                       /* Boot definitions */
#include "display.h"                    /* LCD display definitions */
#include "cmdmode.h"                    /* Command Mode definitions */

/*************************************************************************
Name:           command_mode
Number/Version:
History:
            Date        Rev     Author          Description
            17-Mar-1993 0.0     C. Houlberg     Baseline

Inputs:
            serial_reg
Outputs:
            - None -
Global Data:
            - None -
Functions Referenced:
            LCD_display()
            serial_send_string()
            serial_receive()
            upload()
            download()
            copy()
            erase()
            program()
Abstract:
                User command mode menu:
                    ESC         return to rrt_main
                    U           upload data to memory card
                    D           down load data to memory card
                    C           copy data from one memory card to another
                    A           append file to memory card
                    V           verify memory card copy
                    E           erase memory card
                    P           program RRT
*************************************************************************/
void command_mode(SERIAL_REG_TYPE *serial_reg)
{
      int data;
      int *source;

      /* From this point on RS-232 or RS-422 communications is
            controlled (gated on when data is needed) */
      serial_reg->Control_Register = Stop_Mode;

      do                                  /* Loop until get (ESC) character */
      {
            /* Display Menu */

            serial_send_string("\r\n   COMMAND MODE\r\n", serial_reg);
            serial_send_string("(ESC) = Exit\r\n", serial_reg);
            serial_send_string("  U   = Upload data to memory card\r\n",
                  serial_reg);
            serial_send_string("  D   = Download data from memory card\r\n",
                  serial_reg);
            serial_send_string("  C   = Copy from memory card to memory card\r\n",
                  serial_reg);
            serial_send_string("  A   = Append file to memory card\r\n",
                  serial_reg);
```

```
        serial_send_string("  V   = Verify memory card copy\r\n",
              serial_reg);
        serial_send_string("  E   = Erase memory card\r\n", serial_reg);

        #ifdef BOOT_LOADABLE
              serial_send_string("  P   = Program update for RRT\r\n\n",
                    serial_reg);
        #endif

        serial_send_string("RRT>", serial_reg);

        LCD_display(START_LINE1,"\fCommand Mode");       /* Display mode */

        data = serial_receive(serial_reg);          /* Wait for serial input */

        if((data == 'u') || (data == 'U'))          /* Upload command */
              upload(UPLOAD_MODE, serial_reg);      /* Upload to RRT Memory card */

        else if((data == 'd') || (data == 'D'))     /* Download command */
              download(serial_reg);                 /* Data from RRT Memory card */

        else if((data == 'c') || (data == 'C'))     /* Copy command */
              copy(COPY_CARD, serial_reg);          /* Copy RRT Memory card */

        else if((data == 'a') || (data == 'A'))     /* Append command */
              upload(APPEND_MODE, serial_reg);      /* Append to Memory card */

        else if((data == 'v') || (data == 'V'))     /* Verify command */
              copy(VERIFY_CARD, serial_reg);        /* Verify Memory card copy */

        else if((data == 'e') || (data == 'E'))     /* Erase command */
              erase(serial_reg);                    /* Erase RRT Memory card */

        #ifdef BOOT_LOADABLE
              if((data == 'p') || (data == 'P'))    /* RRT program command */
              {
                    *source = SERIALIO_PORT;
                    program(source, serial_reg);    /* Update RRT program */
              }
        #endif

  } while(data != ESC);

  /* Exit Command Mode */
  serial_send_string("Exiting Command Mode\r\n", serial_reg);

  /* RS-232 or RS-422 communications is returned to a
        non_controlled mode (receive is on all the time) */
  serial_reg->Control_Register = CTS_Mode;

  return;
}

/* end */


/******************************************************************************
Include File Name:    upload.h
Number/Version:
History:
          Date         Rev   Author          Description
          17-Mar-1993  0.0   C. Houlberg     Baseline

Abstract:
          Prototype for upload.c (upload to IC Memory Card) function.
******************************************************************************/

/*    upload.c contains the following functions:
*/
      void upload(int load_mode, SERIAL_REG_TYPE *serial_reg);

      /* Modes on loading */
      #define UPLOAD_MODE            1                /* Simple upload mode */
      #define APPEND_MODE            2                /* Append data mode */

/* end */


/******************************************************************************
Module Name:    upload.c
Number/Version:
History:
```

```
        Date         Rev  Author          Description
        17-Mar-1993 0.0  C. Houlberg     Baseline

Abstract:
              Memory card upload module
***********************************************************************/

/*
    All definitions used by UPLOAD.C are defined in
        the following header files:
*/

#include "rrt.h"                          /* RRT configuration */
#include "dsp.h"                          /* DSP definitions */
#include "system.h"                       /* System definitions */
#include "cardhdrs.h"                     /* Memory card header definitions */
#include "serialio.h"                     /* Serial I/O definitions */
#include "display.h"                      /* LCD display definitions */
#include "memcard.h"                      /* Memory card driver difinitions */
#include "error.h"                        /* Error definitions */
#include "upload.h"                       /* Upload definitions */

/***********************************************************************
Name:       upload
Number/Version:
History:
        Date         Rev   Author          Description
        17-Mar-1993 0.0       C. Houlberg     Baseline
        02-Apr-1993 0.0       C. Houlberg     Establish Memory_Card_ID
        06-Apr-1993 0.0       C. Houlberg     Added record length error test
        25-Jul-1993 0.0       C. Houlberg     Added append mode
Inputs:
        load_mode
        serial_reg
Outputs:
        - None -
Global Data:
        Establishes Memory_Card_ID
Functions Referenced:
        LCD_display()
        serial_receive()
        serial_send_string()
        serial_get_byte()
        memory_card_write()
        memory_card_read()
        error_serialio_display()
Abstract:
              Memory card upload function
***********************************************************************/
void upload(int load_mode, SERIAL_REG_TYPE *serial_reg)
{
    CARD_HEADER_TYPE *card_pointer;                  /* Memory card pointer */

    int i, data, temp;
    int byte_count, low_address, record_type, checksum;
    int address, high_address, medium_address, card_address;
    int *data_buffer, word_count, done_status = NO;
    int mod4_record_count, error_condition = NO_ERROR;
    int offset_address, card_size, file_size;
    char rotating_wheel[2];

    card_pointer = (CARD_HEADER_TYPE *) HEADER0_BUFFER;

    if(load_mode == UPLOAD_MODE)
    {
        LCD_display(START_LINE1, "\fUpload Mode");      /* Display mode */

        /* Upload Prompt */
        serial_send_string("\r\nUpload data to Memory Card\r\n", serial_reg);
    }
    else
    {
        LCD_display(START_LINE1, "\fAppend Mode");      /* Display mode */

        /* Upload Prompt */
        serial_send_string("\r\nAppend file to Memory Card\r\n", serial_reg);
    }

    /* Obtain Memory Card # */

    serial_send_string("Enter Memory Card Location (1/2): ",
        serial_reg);
```

```
do
{
      data = serial_receive(serial_reg);          /* Get character */
      if(data == ESC)
            error_condition = ABORT_OCCURRED;
      else if(data == '\b')
            serial_send(' ', serial_reg);
      else if((data != '1') && (data != '2'))      /* Invalid input */
            serial_send_string("\b \b",serial_reg);

} while(!error_condition
      && (data != '1') && (data != '2'));         /* Wait for 0 or 1 */

if(!error_condition)
{
      if(data == '1')
            card_address = MEMORY_CARD_0;
      else
            card_address = MEMORY_CARD_1;

      /* New line */
      serial_send_string("\r\n", serial_reg);

      /* Obtain card size */
      card_size = memory_card_size(card_address);

      error_condition = memory_card_status(card_address);
}

if(!error_condition)
{
      /* Transfer card header to header buffer location */
      for(i = 0; i < SIZE_CARD_HEADER; i++)
            *((int *)card_pointer + i) = memory_card_read(card_address + i);

      /* Test Upload Protect flag */
      if(!(card_pointer->Upload_To_Card_OK))
      {
            if(load_mode == UPLOAD_MODE)
                  error_condition = UPLOAD_PROHIBITED;
            else
                  error_condition = APPEND_PROHIBITED;
      }
}

/* Upload data */
if(!error_condition)
{
      if(load_mode == UPLOAD_MODE)
      {
            /* Offset address for upload */
            offset_address = 0;
      }
      else
      {

      /* Search for end of last file */
      offset_address = SIZE_CARD_HEADER;  /* First file location */
      while(memory_card_read(card_address + offset_address) != NO_FILE)
      {
            /* Get file size including Lookup Table (size in bytes) */
            file_size =
                  memory_card_read(card_address + offset_address + 6)
                  + (memory_card_read(card_address + offset_address + 7)
                  << 16) + (SIZE_LOOKUP_TABLE << 1);

            offset_address += ((file_size + 1) >> 1); /* In words */
      }
}

/* Temporary storage location for data */
data_buffer = (int *) &BUFFER_RAM;

high_address = 0;
medium_address = 0;

/* Display action */
if(load_mode == UPLOAD_MODE)
      LCD_display(START_LINE1, "\fLoading Card");
else
      LCD_display(START_LINE1, "\fAppending File");
```

```
do                                                  /* do while statement */
{
    do                                              /* do while statement */
    {
        data = serial_receive(serial_reg);  /* Get another character */
        if(data == ESC)                     /* (ESC), Abort upload */
            error_condition = ABORT_OCCURRED;

    } while((data != ':') && !error_condition);    /* Wait for start */


    if(!error_condition)
    {
        byte_count - serial_get_byte(serial_reg); /* Byte count */

        if(byte_count & TYPE_MASK)
            error_condition = byte_count;
    }

    if(!error_condition)
    {
        checksum = byte_count;

        low_address = serial_get_byte(serial_reg);      /* Get address */
        if(low_address & TYPE_MASK)
            error_condition = low_address;
    }

    if(!error_condition)
    {
        checksum += low_address;

        low_address = (low_address << 8) + serial_get_byte(serial_reg);
        if(low_address & TYPE_MASK)
            error_condition = low_address;
    }

    if(!error_condition)
    {
        checksum += 0x0ff & low_address;

        record_type = serial_get_byte(serial_reg);      /* Record type */
        if(record_type & TYPE_MASK)
            error_condition = record_type;
    }

    if(!error_condition)
    {
        checksum += record_type;                        /* Update checksum */

        if(record_type == 0x00)                         /* Have data record */
        {
            /* Check if record will exceed card size */
            if((high_address + medium_address + low_address
                + byte_count - 1 + (offset_address << 1)) > card_size)
                error_condition = CARD_FILE_SIZE;

            if(!error_condition)
            {
                /* Display rotating wheel */
                switch(mod4_record_count++)
                {
                    case 0:
                        rotating_wheel[0] = BACK_SLASH;
                        break;
                    case 1:
                        rotating_wheel[0] = '|';
                        break;
                    case 2:
                        rotating_wheel[0] = '/';
                        break;
                    default:
                        rotating_wheel[0] = '-';
                        mod4_record_count = 0;
                }
                rotating_wheel[1] = 0;              /* End of string */
                LCD_display(START_LINE1 + 15, &rotating_wheel[0]);

                /* Start address of load */
                address = ((high_address + medium_address +
                    low_address) >> 1) + card_address + offset_address;
```

```
	/* Determine count of memory card word accesses */
	word_count = byte_count >> 1;
	/* Account for odd byte count or address */
	if((byte_count & 0x01) || (address & 0x01))
		word_count++;
}

	/* Don't overflow buffer */
	if(!error_condition && (word_count > SIZE_BUFFER_RAM))
		error_condition = RECORD_LENGTH_ERROR;

	if(!error_condition)
	{
		/* Initialize index pointers */
		i = 0;                          /* Word index pointer */
		/* Account for record starting with an odd address */
		if(low_address & 0x01)
		{
			temp = memory_card_read(address);
			data = serial_get_byte(serial_reg);
			if(data & TYPE_MASK)
				error_condition = data;
			if(!error_condition)
			{
				checksum += data;        /* Update checksum */
				*data_buffer = (temp & 0xff) + (data << 8);
				i++;
				byte_count--;
			}
		}
	}

	while(!error_condition && byte_count)
	{
		data = serial_get_byte(serial_reg); /* Get data byte */
		if(data & TYPE_MASK)
			error_condition = data;

		if(!error_condition)
		{
			checksum += data;        /* Update the checksum */
			byte_count--;
			if(byte_count)    /* Complete word from hex record */
			{
				temp = serial_get_byte(serial_reg);
				if(temp & TYPE_MASK)
					error_condition = temp;

				if(!error_condition)
				{
					data += (temp << 8);
					checksum += temp;
					byte_count--;
				}
			}
			else         /* Complete word from memory card */
			{
				temp = 0xff00 & memory_card_read(address + i);
				data += temp;
			}

			*(data_buffer + i++) = data;  /* Put in buffer */
		}
	}
	if(!error_condition)
	{
		/* Check checksum */
		checksum &= 0xff; /* Reduce size for error test */
		checksum += serial_get_byte(serial_reg);
		if(checksum & TYPE_MASK)
			error_condition = checksum;

		/* Test for checksum error */
		if((!error_condition) && (checksum & 0xff))
			error_condition = RECORD_CHECKSUM;
	}

	/* Transfer data to card */
	for(i = 0; (i < word_count) && !error_condition; i++)
		error_condition = memory_card_write(address + i,
			*(data_buffer + i));

	/* Verify data transferred to card */
```

```
        for(i = 0; (i < word_count) && !error_condition; i++)
            if(*(data_buffer + i) != memory_card_read(address + i))
                error_condition = CARD_VERIFY_ERROR;
    }

    else if(record_type == 0x01)  /* Have end of file record */
    {
        checksum &= 0xff;          /* Reduce size for error test */
        checksum += serial_get_byte(serial_reg);
        if(checksum & TYPE_MASK)
            error_condition = checksum;
        else if(byte_count || low_address || (checksum & 0xff))
            error_condition = RECORD_CHECKSUM;
        else
            done_status = YES;
    }

    else if(record_type == 0x02)  /* Segment address record */
    {
        if(byte_count != 0x02)  /* Have 2 bytes for address */
            error_condition = RECORD_TYPE_ERROR;
        else
        {
            medium_address = serial_get_byte(serial_reg);
            if(medium_address & TYPE_MASK)
                error_condition = medium_address;

            if(!error_condition)
            {
                checksum += medium_address;

                medium_address = (medium_address << 8)
                    + serial_get_byte(serial_reg);
                if(medium_address & TYPE_MASK)
                    error_condition = medium_address;
            }

            if(!error_condition)

            {
                checksum += 0xff & medium_address;
                medium_address = medium_address << 4;
                checksum &= 0xff;       /* Set up for error test */
                checksum += serial_get_byte(serial_reg);
                if(checksum & TYPE_MASK)
                    error_condition = checksum;
            }

            if(!error_condition && (checksum & 0xff))
                error_condition = RECORD_CHECKSUM;

            high_address = 0; /* Not using high address */
        }
    }

    else if(record_type == 0x04)  /* Linear address record */
    {
        if(byte_count != 0x02)        /* Have 2 byte for address */
            error_condition = RECORD_TYPE_ERROR;
        else
        {
            high_address = serial_get_byte(serial_reg);
            if(high_address & TYPE_MASK)
                error_condition = high_address;

            if(!error_condition)
            {
                checksum += high_address;

                high_address = (high_address << 8) +
                    serial_get_byte(serial_reg);
                if(high_address & TYPE_MASK)
                    error_condition = high_address;
            }

            if(!error_condition)
            {
                checksum += 0xff & high_address;
                high_address = high_address << 16;
                checksum += serial_get_byte(serial_reg);
                if(checksum & TYPE_MASK)
                    error_condition = checksum;
```

```
                                if(!error_condition && (checksum & 0xff))
                                      error_condition = RECORD_CHECKSUM;

                                medium_address = 0;  /* Not using medimum address */
                          }
                    }
              }

              else
                    error_condition = RECORD_TYPE_ERROR;
        }

        if(error_condition)

        {
              error_serialio_display(serial_reg, error_condition);
              error_condition = NO_ERROR;                  /* Clear error flag */

              serial_send_string("To Retry Type R\r\n", serial_reg);
              LCD_display(START_LINE1, "\fWaiting for Retry");
              do                                           /* do while statement */
              {
                    data = serial_receive(serial_reg);
                    if(data == ESC)                        /* (ESC), Abort upload */
                          error_condition = ABORT_OCCURRED;

              } while((data != 'R') && !error_condition);

              if(!error_condition)
              {
                    serial_send_string("\r\nProceed with retry\r\n",
                          serial_reg);
                    if(load_mode == UPLOAD_MODE)
                          LCD_display(START_LINE1, "\fUpload Retry\rProceeding");
                    else
                          LCD_display(START_LINE1, "\fAppend Retry\rProceeding");
              }
        }

  } while(!error_condition && done_status == NO);
}

/* Display error */
if(error_condition)
{
      if(error_condition != ABORT_OCCURRED)
            error_serialio_display(serial_reg, error_condition);

      if(load_mode == UPLOAD_MODE)
            serial_send_string("Aborting Upload\r\n", serial_reg);
      else
            serial_send_string("Aborting Append\r\n", serial_reg);
}

return;
}

/* end */


/****************************************************************************
Include File Name:    download.h
Number/Version:
History:
            Date        Rev   Author            Description
            17-Mar-1993 0.0   C. Houlberg       Baseline

Abstract:
            Prototype for download.c (download from IC Memory Card) function.
****************************************************************************/

/*    download.c contains the following functions:
*/
      void download(SERIAL_REG_TYPE *serial_reg);

/* end */


/****************************************************************************
Module Name:    download.c
Number/Version:
History:
```

```
            Date          Rev    Author              Description
            17-Mar-1993 0.0    C. Houlberg          Baseline

Abstract:
            Memory card download module
*****************************************************************************/

#include "rrt.h"                                  /* RRT configuration */
#include "dsp.h"                                  /* DSP definitions */
#include "system.h"                               /* System definitions */
#include "cardhdrs.h"                             /* Memory card header definitions */
#include "serialio.h"                             /* Serial I/O definitions */
#include "display.h"                              /* LCD display definitions */
#include "error.h"                                /* Error definitions */
#include "download.h"                             /* Download definitions */

#define ADDRESS_AND_SIZE        1                 /* Address and length download */
#define FILE                    2                 /* File download */

#define RECORD_LENGTH           0x20              /* Data length of Intel hex record */

/*****************************************************************************
Name:       download
Number/Version:
History:
            Date          Rev    Author              Description
            17-Mar-1993 0.0    C. Houlberg          Baseline

Inputs:
            serial_reg
Outputs:
            - None -
Global Data:
            - None -
Functions Referenced:
            LCD_display()
            serial_receive()
            serial_send_string()
            serial_put_byte()
            memory_card_read()
            error_serialio_display()
Abstract:
            Memory card download function
*****************************************************************************/
void download(SERIAL_REG_TYPE *serial_reg)
{
    CARD_HEADER_TYPE *card_pointer;            /* Memory card pointer */
    STATUS_REG_TYPE *status_pointer;           /* Serial I/O status pointer */
    int i, mode, size;
    int data, start_address, end_address;
    int byte_count, word_count, byte, word, checksum;
    int page, page_address, page_high, page_low;
    int card_address, address, error_condition = NO_ERROR;
    int card_size, done_status = NO;
    int status, word_address;
    char ascii_string[5];

    card_pointer = (CARD_HEADER_TYPE *) HEADER0_BUFFER;

    LCD_display(START_LINE1, "\fDownload Mode");    /* Display mode */

    /* Prompt */
    serial_send_string("\r\nDownload data from Memory Card\r\n", serial_reg);
    serial_send_string(" (ESC) = Abort download\r\n", serial_reg);
    serial_send_string("  A   = Download by address and size\r\n",
        serial_reg);
    serial_send_string("  F   = Download by file\r\n", serial_reg);
    serial_send_string("RRT> ", serial_reg);
    do
    {
        data = serial_receive(serial_reg);               /* Get character */
        if(data == ESC)
            error_condition = ABORT_OCCURRED;
        else if(data == '\b')
            serial_send(' ', serial_reg);
        else if((data != 'a') && (data != 'A')
            && (data != 'f') && (data != 'F'))           /* Invalid input */
            serial_send_string("\b \b",serial_reg);

    } while(!error_condition
        && (data != 'a') && (data != 'A')
        && (data != 'f') && (data != 'F'));
```

```
if(!error_condition)
{
	if((data == 'a') || (data == 'A'))
		mode = ADDRESS_AND_SIZE;
	else
		mode = FILE;

	/* Obtain Memory Card # */
	serial_send_string("\r\nEnter Memory Card Location (1/2): ",
		serial_reg);
	do
	{
		data = serial_receive(serial_reg);		/* Get character */
		if(data == ESC)
			error_condition = ABORT_OCCURRED;
		else if(data == '\b')
			serial_send(' ', serial_reg);
		else if((data != '1') && (data != '2'))		/* Invalid input */
			serial_send_string("\b \b",serial_reg);
	} while(!error_condition
		&& (data != '1') && (data != '2'));	/* Wait for 0 or 1 */
}

if(!error_condition)
{
	if(data == '1')
		card_address = MEMORY_CARD_0;
	else
		card_address = MEMORY_CARD_1;

	/* New line */
	serial_send_string("\r\n", serial_reg);

	/* Get size of memory card */
	card_size = memory_card_size(card_address);

	/* Test for memory card */
	error_condition = memory_card_status(card_address);
}

if(!error_condition)
{
	/* Transfer card header to header buffer location */
	for(i = 0; i < SIZE_CARD_HEADER; i++)
		*((int *)card_pointer + i) = memory_card_read(card_address + i);

	/* Test Download to PC Protect flag */
	if(!(card_pointer->Download_From_Card_OK))
		error_condition = DOWNLOAD_PROHIBITED;
}

if(!error_condition)
{
	if(mode == ADDRESS_AND_SIZE)  /* Download by address and size */
	{
		/* Request address */
		serial_send_string("\r\n   ADDRESS (HEX): ", serial_reg);
		/* Get the start address (Maximum address of card_size - 1) */
		start_address = 0;
		i = 0;
		do						/* do while statement */
		{
			data = serial_receive(serial_reg);
			++i;

			if((data >= '0') && (data <= '9'))
				start_address = (start_address << 4) + (0x0f & data);
			else if(((data >= 'a') && (data <= 'f'))
				|| ((data >= 'A') && (data <= 'F')))
				start_address = (start_address << 4) + (0x0f & (data + 9));
			else if(data == '\b')
				if(!(--i))
					serial_send(' ', serial_reg);
				else
				{
					--i;				/* Character eliminated */

					serial_send_string(" \b", serial_reg);
					start_address = start_address >> 4;
				}
			else if(data == ESC)
				error_condition = ABORT_OCCURRED;
```

```
            else                /* Ignore character */
            {
                  --i;
                  serial_send_string("\b \b", serial_reg);
            }

            if(!error_condition && (start_address > (card_size - 1)))
            {
                  start_address = 0;
                  i = 0;

                  serial_send_string("\r\nMAXIMUM address is ", serial_reg);
                  ascii_conversion(((card_size - 1) >> 16),
                        &ascii_string[0]);
                  serial_send_string(&ascii_string[0], serial_reg);
                  ascii_conversion((card_size - 1), &ascii_string[0]);
                  serial_send_string(&ascii_string[0], serial_reg);

                  serial_send_string("\r\n   ADDRESS (HEX): ", serial_reg);
            }

      } while(!error_condition && (data != '\r'));

      if(!error_condition)
      {
            /* Request size in bytes */
            serial_send_string("\r\n   SIZE (HEX): ", serial_reg);
            /* Get size (Maximum size of MEMORY_CARD_1 - start_address) */
            size = 0;
            i = 0;
            do                                        /* do while statement */
            {
                  data = serial_receive(serial_reg);
                  ++i;

                  if((data >= '0') && (data <= '9'))
                        size = (size << 4) + (0x0f & data);
                  else if (((data >= 'a') && (data <= 'f'))
                        || ((data >= 'A') && (data <= 'F')))
                        size = (size << 4) + (0x0f & (data + 9));
                  else if(data == '\b')
                        if(!(--i))
                              serial_send(' ', serial_reg);
                        else
                        {
                              --i;                /* Character eliminated */
                              serial_send_string(" \b", serial_reg);
                              size = size >> 4;
                        }
                  else if(data == ESC)
                        error_condition = ABORT_OCCURRED;
                  else
                  {
                        --i;
                        serial_send_string("\b \b", serial_reg);
                  }

                  if(!error_condition
                        && (size > (card_size - start_address)))
                  {
                        size = 0;
                        i = 0;

                        serial_send_string("\r\nMAXIMUM size is ", serial_reg);
                        ascii_conversion(((card_size - start_address) >> 16),
                              &ascii_string[0]);
                        serial_send_string(&ascii_string[0], serial_reg);
                        ascii_conversion((card_size - start_address),
                              &ascii_string[0]);
                        serial_send_string(&ascii_string[0], serial_reg);

                        serial_send_string("\r\n   SIZE (HEX): ", serial_reg);
                  }

            } while(!error_condition && (data != '\r'));

            /* All address and size dumps begin at the specified address */
            page_address = start_address;
      }
}
else                                    /* Download by file name */
{
```

```
                /* Search for file */
                word_address = SIZE_CARD_HEADER;          /* First file location */
                status = 'N';
                do                                        /* do while statement */
                {
                      serial_send_string("\r\nDownload ", serial_reg);
                      for(i = 0; i < 6; i++)  /* 6 words of file name (16 bits) */
                      {
                            data = memory_card_read(card_address + word_address + i);
                            if(data == 0xffff)                 /* No file found  /
                                  error_condition = NO_FILE_ERROR;
                            else
                            {
                                  serial_send(0xff & data, serial_reg);     /* LS Char */
                                  serial_send(data >> 8, serial_reg);       /* MS Char */
                            }
                      }

                      if(!error_condition)
                      {
                            serial_send_string(" (Y/N): ",serial_reg);

                            /* Wait for input */
                            do
                            {
                                  status = serial_receive(serial_reg);
                                  if(status == ESC)
                                        error_condition = ABORT_OCCURRED;

                            } while(!error_condition
                                  && (status != 'y') && (status != 'Y')
                                  && (status != 'n') && (status != 'N'));
                      }

                      if(!error_condition)
                      {
                            /* Get file size including Lookup Table (size in bytes) */
                            size = memory_card_read(card_address + word_address + 6)
                                  + (memory_card_read(card_address + word_address + 7)
                                  << 16) + (SIZE_LOOKUP_TABLE << 1);

                            if((status == 'n') || (status == 'N'))
                                  word_address += ((size + 1) >> 1);

                            if(memory_card_read(card_address + word_address)
                                  == NO_FILE)
                            {
                                  serial_send_string(
                                        "\r\nAll files listed\r\nStarting list again\r\n",
                                        serial_reg);
                                  word_address = SIZE_CARD_HEADER;
                            }
                      }

                } while(!error_condition && (status != 'y') && (status != 'Y'));

                /* Convert word_address to start_address (byte address) */
                start_address = (word_address << 1);

                /* All file dumps will start at address 0 */
                page_address = 0;
          }
    }

    if(!error_condition)
    {
          /* Check size of download */
          if(!size)
          {
                serial_send_string("\r\nNo data to send\r\n",serial_reg);
                error_condition = ABORT_OCCURRED;
          }
          else
          {
                end_address = start_address + size - 1;

                /* Initialize page number */
                page = 0;                          /* Start as if beginning at page 0 */
          }
    }

    /* Start at new line */
    serial_send_string("\r\n", serial_reg);
```

```
if(!error_condition)
{
      /* Allow ESC character to be sent at any time */
      serial_reg->Control_Register = CTS_Mode;

      do                                              /* do while statement */
      {
            /* Start record (Intel format, word oriented) */
            serial_send_string("\r\n:", serial_reg);
            /* Determine byte count */
            if((end_address - start_address) >= RECORD_LENGTH)
                  byte_count = RECORD_LENGTH;
            else
                  byte_count = end_address - start_address + 1;

            if(!byte_count)                     /* End of data record (type 01) */
            {
                  /* Output byte count (0x00) */
                  serial_put_byte(byte_count, serial_reg);
                  serial_put_byte(0x00, serial_reg);  /* Output null address */
                  serial_put_byte(0x00, serial_reg);
                  serial_put_byte(0x01, serial_reg);  /* Output record type */
                  serial_put_byte(0xff, serial_reg);  /* Output checksum */
                  serial_send_string("\r\n", serial_reg);   /* New line */

                  done_status = YES;            /* End of download to terminal */
            }

            if(!done_status && (page_address >= 0x10000)) /* Extended record */
            {
                  page += ((0xffff0000 & page_address) >> 16);
                  page_high = 0xff & (page >> 8);
                  page_low = 0xff & page;
                  page_address &= 0xffff;
                  byte = 0xff & (- 0x06 - page_high - page_low);  /* Checksum */
                  serial_put_byte(0x02, serial_reg);  /* Output byte count */
                  serial_put_byte(0x00, serial_reg);  /* Output start address */
                  serial_put_byte(0x00, serial_reg);
                  serial_put_byte(0x04, serial_reg);  /* Output record type */
                  serial_put_byte(page_high, serial_reg);   /* Extended address */
                  serial_put_byte(page_low, serial_reg);
                  serial_put_byte(byte, serial_reg);        /* Output checksum */
                  serial_send_string("\r\n:", serial_reg);  /* Begin record */
            }


            if(!done_status)
            {
                  checksum = - byte_count;
                  serial_put_byte(byte_count, serial_reg);  /* Byte_count */

                  byte = 0xff & (page_address >> 8);  /* Output record address */
                  checksum -= byte;
                  serial_put_byte(byte, serial_reg);
                  byte = 0xff & page_address;
                  checksum -= byte;
                  serial_put_byte(byte, serial_reg);
                  serial_put_byte(0x00, serial_reg);  /* Output record type */

                  /* Account for record starting with an odd address */
                  if(start_address & 0x01)
                  {
                        word = memory_card_read(card_address
                              + (start_address >> 1));
                        byte = 0xff & (word >> 8);
                        checksum -= byte;
                        serial_put_byte(byte, serial_reg);
                        byte_count--;
                        start_address++;
                        page_address++;
                  }
                  while(byte_count)                   /* Output data */
                  {
                        word = memory_card_read(card_address
                              + (start_address >> 1));
                        byte = 0xff & word;             /* Output LSByte first */
                        checksum -= byte;
                        serial_put_byte(byte, serial_reg);
                        byte_count--;
                        start_address++;
                        page_address++;
                        if(byte_count)                  /* Test for MSByte */
```

```
                {
                        byte = 0xff & (word >> 8);    /* Output MSByte */
                        checksum -= byte;
                        serial_put_byte(byte, serial_reg);
                        byte_count--;
                        start_address++;
                        page_address++;
                }
            }
            serial_put_byte(0xff & checksum, serial_reg); /* Checksum */
        }

        /* Test for abort */
        if(serial_reg->Data_Register == ESC)      /* ESC = abort */
            error_condition = ABORT_OCCURRED;

    } while(!done_status && !error_condition);

    /* Return control register back to controlled comunications mode */
    serial_reg->Control_Register = Stop_Mode;
}

if(error_condition)
{
    if(error_condition != ABORT_OCCURRED)
        error_serialio_display(serial_reg, error_condition);

    serial_send_string("\r\nAborting Download\r\n", serial_reg);
}

return;
}
/* end */

/*****************************************************************************
Include File Name:    copy.h
Number/Version:
History:
        Date          Rev    Author        Description
        27-Mar-1993   0.0    C. Houlberg   Baseline

Abstract:
        Prototype for copy.c (IC Memory Card copy) function.
*****************************************************************************/

/*  All functions contained in COPY.C are listed as follows:
*/
    void copy(int copy_mode, SERIAL_REG_TYPE *serial_reg);

    /* Modes of copying */
    #define COPY_CARD         1         /* Copy memory card to memory card */
    #define VERIFY_CARD       2         /* Verify memory card with memory card */

    /* Definitions */
    #define WHEEL_COMPARE_INCREMENT     0x0fff      /* 4K increment */
    #define WHEEL_COPY_INCREMENT        0x03ff      /* 1K increment */

/* end */


/*****************************************************************************
Module Name:    copy.c
Number/Version:
History:
        Date          Rev    Author        Description
        17-Mar-1993   0.0    C. Houlberg       Baseline

Abstract:
                IC Memory Card copy module
*****************************************************************************/

#include "rrt.h"                               /* RRT.configuration */
#include "dsp.h"                               /* DSP definitions */
#include "system.h"                            /* System definitions */
#include "cardhdrs.h"                          /* Memory card header definitions */
#include "serialio.h"                          /* Serial I/O definitions */
#include "display.h"                           /* LCD display definitions */
#include "memcard.h"                           /* Memory card definitions */
#include "error.h"                             /* Error definitions */
#include "copy.h"                              /* Copy definitions */
```

```
/*****************************************************************************
Name:           copy
Number/Version:
History:
                Date        Rev    Author         Description
                17-Mar-1993 0.0    C. Houlberg    Baseline
Inputs:
                serial_reg
Outputs:
                - None -
Global Data:
                - None -
Functions Referenced:
                serial_send_string
                memory_card_read
                memory_card_write
Abstract:
                Copy memory card function
*****************************************************************************/
void copy(int copy_mode, SERIAL_REG_TYPE *serial_reg)
{
      CARD_HEADER_TYPE *source_pointer;
      CARD_HEADER_TYPE *target_pointer;
      int source_card, target_card;
      int source_card_size, target_card_size;
      int i, error_condition = NO_ERROR;
      int mod4_count, data;
      char rotating_wheel[2];

      source_pointer = (CARD_HEADER_TYPE *) HEADER0_BUFFER;
      target_pointer = (CARD_HEADER_TYPE *) HEADER1_BUFFER;

      if(copy_mode == COPY_CARD)
      {                                              /* Display mode and prompt */
            LCD_display(START_LINE1, "\fCopy From Card Mode");

            serial_send_string("\r\nCopy Source Card to Target Card\r\n",
                  serial_reg);
      }
      else
      {
            LCD_display(START_LINE1, "\fVerify Card Mode");

            serial_send_string("\r\nVerify Target Card with Source Card\r\n",
                  serial_reg);
      }

      /* Get source_card # */
      serial_send_string("\r\nEnter number of Source: ", serial_reg);
      do
      {
            source_card = serial_receive(serial_reg);
            if(source_card == ESC)
                  error_condition = ABORT_OCCURRED;
            else if((source_card != '1') && (source_card != '2'))
                  serial_send_string("\b \b",serial_reg);
      } while((source_card != '1') && (source_card != '2') && !error_condition);

      if(!error_condition)
      {
            if(source_card == '1')
                  source_card = MEMORY_CARD_0;
                  target_card = MEMORY_CARD_1;
            }
            else
            {
                  source_card = MEMORY_CARD_1;
                  target_card = MEMORY_CARD_0;
            }

            /* New line */
            serial_send_string("\r\n", serial_reg);

            /* Obtain size of source and establish card ID */
            source_card_size = memory_card_size(source_card);

            /* Test for source memory card */
            error_condition = memory_card_status(source_card);
            if(error_condition)
                  serial_send_string("Source ", serial_reg);
      }
```

```
if(!error_condition)
{
      /* Obtain size of target and establish card ID */
      target_card_size = memory_card_size(target_card);

      /* Test for target memory card */
      error_condition = memory_card_status(target_card);
      if(error_condition)
            serial_send_string("Target ", serial_reg);
}

if(!error_condition)
{
      /* Test for size of source card <= size of target card */
      if(source_card_size > target_card_size)
            error_condition = SOURCE_CARD_LARGER;
}


if(!error_condition)
      /* Allow ESC character to be sent at any time */
      serial_reg->Control_Register = CTS_Mode;

if(!error_condition && (copy_mode == COPY_CARD))
{
      /* Transfer source card header to header buffer location */
      for(i = 0; i < SIZE_CARD_HEADER; i++)
            *((int *)source_pointer + i) = memory_card_read(source_card + i);

      /* Test Copy From Card Protect flag */
      if(!(source_pointer->Copy_From_Card_OK))
            error_condition = COPY_PROHIBITED;

      if(!error_condition)
      {
            /* Transfer target card header to header buffer location */
            for(i = 0; i < SIZE_CARD_HEADER; i++)
                  *((int *)target_pointer + i)
                        = memory_card_read(target_card + i);

            /* Test Upload Protect flag */
            if(!(target_pointer->Upload_To_Card_OK))
                  error_condition = UPLOAD_PROHIBITED;
      }

      /* Test for blank target card */
      if(!error_condition)
      {
            LCD_display(START_LINE2, "Testing Target\t");
            serial_send_string("Testing for Erased Target  ",serial_reg);
      }
      /* Testing memory card words */
      for(i = 0; (i < (target_card_size >> 1)) && !error_condition; i++)
      {
            if(!(i & WHEEL_COMPARE_INCREMENT))
            {
                  /* Display rotating wheel */
                  switch(mod4_count++)
                  {
                        case 0:
                              rotating_wheel[0] = BACK_SLASH;
                              serial_send_string("\b\\", serial_reg);
                              break;
                        case 1:
                              rotating_wheel[0] = '|';
                              serial_send_string("\b|", serial_reg);
                              break;
                        case 2:
                              rotating_wheel[0] = '/';
                              serial_send_string("\b/", serial_reg);
                              break;
                        default:
                              rotating_wheel[0] = '-';
                              serial_send_string("\b-", serial_reg);
                              mod4_count = 0;
                  }
                  rotating_wheel[1] = 0;                    /* End of string */
                  LCD_display(START_LINE2 + 15, &rotating_wheel[0]);
            }

            if(memory_card_read(target_card + i) != 0xffff)
                  error_condition = TARGET_NOT_ERASED;
```

```
        /* Test for abort */
        if(!error_condition)
            if(serial_reg->Data_Register == ESC)      /* ESC = abort */
                error_condition = ABORT_OCCURRED;
    }

    if(!error_condition)
    {
        /* Copy card data words */
        LCD_display(START_LINE2, "Copying Card\t");
            serial_send_string("\r\nCopying Card  ", serial_reg);
            for(i = 0; ((i < (source_card_size >> 1)) && !error_condition);
                i++)
            {
                if(!(i & WHEEL_COPY_INCREMENT))
                {
                    /* Display rotating wheel */
                    switch(mod4_count++)
                    {
                        case 0:
                            rotating_wheel[0] = BACK_SLASH;
                            serial_send_string("\b\\", serial_reg);
                            break;
                        case 1:
                            rotating_wheel[0] = '|';
                            serial_send_string("\b|", serial_reg);
                            break;
                        case 2:
                            rotating_wheel[0] = '/';
                            serial_send_string("\b/", serial_reg);
                            break;
                        default:
                            rotating_wheel[0] = '-';
                            serial_send_string("\b-", serial_reg);
                            mod4_count = 0;
                    }
                    rotating_wheel[1] = 0;                  /* End of string */
                    LCD_display(START_LINE2 + 15, &rotating_wheel[0]);
                }

                error_condition = memory_card_write(target_card + i,
                    memory_card_read(source_card + i));

                /* Test for abort */
                if(!error_condition)
                    if(serial_reg->Data_Register == ESC)      /* ESC = abort */
                        error_condition = ABORT_OCCURRED;
            }

            if(!error_condition)
                serial_send_string("\r\nCopy From Card Completed\r\n",
                    serial_reg);
        }
    }

    if(!error_condition)
    {
        /* Verify card */
        LCD_display(START_LINE2, "Verifying Card\t");
        serial_send_string("Verifying Card  ", serial_reg);
        for(i = 0; ((i < (source_card_size >> 1)) && !error_condition); i++)
        {
            if(!(i & WHEEL_COMPARE_INCREMENT))
            {
                /* Display rotating wheel */
                switch(mod4_count++)
                {
                    case 0:
                        rotating_wheel[0] = BACK_SLASH;
                        serial_send_string("\b\\", serial_reg);
                        break;
                    case 1:
                        rotating_wheel[0] = '|';
                        serial_send_string("\b|", serial_reg);
                        break;
                    case 2:
                        rotating_wheel[0] = '/';
                        serial_send_string("\b/", serial_reg);
                        break;
                    default:
                        rotating_wheel[0] = '-';
```

```
                    serial_send_string("\b-", serial_reg);
                    mod4_count = 0;
                }
                rotating_wheel[1] = 0;                          /* End of string */
                LCD_display(START_LINE2 + 15, &rotating_wheel[0]);
            }

            if(memory_card_read(target_card + i)
                != memory_card_read(source_card + i))
                error_condition = CARD_VERIFY_ERROR;

            /* Test for abort */
            if(!error_condition)
                if(serial_reg->Data_Register == ESC)      /* ESC = abort */
                    error_condition = ABORT_OCCURRED;
        }

        /* New line */
        serial_send_string("\r\n", serial_reg);

        if(!error_condition)
            serial_send_string("Memory Card Verify Completed\r\n", serial_reg);
    }

    /* Ensure control register back to controlled comunications mode */
    serial_reg->Control_Register = Stop_Mode;

    if(error_condition)
    {
        if(error_condition != ABORT_OCCURRED)
            error_serialio_display(serial_reg, error_condition);

        if(copy_mode == COPY_CARD)
            serial_send_string("\r\nAborting Copy\r\n", serial_reg);
        else
            serial_send_string("\r\nAborting Verify\r\n", serial_reg);
    }

    return;
}

/* end */


/****************************************************************************
Include File Name:    erase.h
Number/Version:
History:
        Date        Rev  Author          Description
        26-Mar-1993 0.0  C. Houlberg     Baseline

Abstract:
        Definitions used by erase.c
****************************************************************************/

/*  erase.c function prototype:
*/
    void erase(SERIAL_REG_TYPE *serial_reg);

/* end */


/****************************************************************************
Module Name:   erase.c
Number/Version:
History:
        Date        Rev  Author          Description
        26-Mar-1993 0.0  C. Houlberg     Baseline

Abstract:
        Memory card erase module
****************************************************************************/

/*
    All definitions used by ERASE.C are defined in
        the following header files.
*/

#include "rrt.h"                                /* RRT.configuration */
#include "dsp.h"                                /* DSP definitions */
#include "system.h"                             /* System definitions */
```

```
#include "serialio.h"                       /* Serial I/O definitions */
#include "display.h"                        /* Display definitions */
#include "memcard.h"                        /* Memory card definitions */
#include "error.h"                          /* Error definitions */
#include "erase.h"                          /* Erase definitions */

/*****************************************************************************
Name:        erase
Number/Version:
History:
             Date        Rev   Author        Description
             26-Mar-1993 0.0   C. Houlberg   Baseline
Inputs:
             serial_reg
Outputs:
             - None -
Global Data:
             - None -
Functions Referenced:
             LCD_display()
             serial_send_string()
             serial_receive()
             memory_card_erase()
             error_serialio_display()
Abstract:
             Erase memory card function
*****************************************************************************/
void erase(SERIAL_REG_TYPE *serial_reg)
{
      int data, card_address, return_word;
      int error_condition = NO_ERROR;

      /* Display mode */
      LCD_display(START_LINE1, "\fWARNING!!!\rErase Mode");

      /* Erase Prompt */
      serial_send_string("\r\n  WARNING!!!\r\n", serial_reg);
      serial_send_string("Memory Card Erase Mode\r\n", serial_reg);
      serial_send_string("Erase Card? (Y/N): ", serial_reg);

      do
      {
            /* Get serial input */
            data = serial_receive(serial_reg);                  /* Get character */
            if((data == ESC) || (data == 'n') || (data == 'N'))   /* If No abort */
                  error_condition = ABORT_OCCURRED;
            else if(data == '\b')
                  serial_send(' ', serial_reg);
            else if((data != 'y') && (data != 'Y'))             /* Invalid input */
                  serial_send_string("\b \b",serial_reg);
      } while(!error_condition && (data != 'y') && (data != 'Y'));

      if(!error_condition)
      {
            /* Obtain Memory Card # */
            serial_send_string("\r\nEnter Memory Card Location (1/2): ",
                  serial_reg);
            do
            {
                  data = serial_receive(serial_reg);            /* Get character */
                  if(data == '\b')
                        serial_send(' ', serial_reg);
                  else if(data == ESC)
                        error_condition = ABORT_OCCURRED;
                  else if((data != '1') && (data != '2'))       /* Invalid input */
                        serial_send_string("\b \b",serial_reg);

            } while(!error_condition && (data != '1') && (data != '2'));
      }

      if(!error_condition)
      {
            if(data == '1')
                  card_address = MEMORY_CARD_0;
            else
                  card_address = MEMORY_CARD_1;

            /* Second Erase Prompt */
            serial_send_string("\r\nAre you ABSOLUTELY sure? (Y/N): ", serial_reg);

            do
```

```
            {
                /* Process serial input */
                data = serial_receive(serial_reg);          /* Get character */
                if((data == ESC) || (data == 'n') || (data == 'N'))
                    error_condition = ABORT_OCCURRED;
                else if(data == '\b')
                    serial_send(' ', serial_reg);
                else if((data != 'y') && (data != 'Y'))     /* Invalid input */
                    serial_send_string("\b \b",serial_reg);
            } while(!error_condition && (data != 'y') && (data != 'Y'));
        }

        if(!error_condition)
        {
            /* New line */
            serial_send_string("\r\n", serial_reg);

            /* Establish the memory card ID for status function */
            memory_card_ID(card_address);

            error_condition = memory_card_status(card_address);
        }

        if(!error_condition)
        {
            /* Erase memory card message */
            serial_send_string("Erasing Memory Card\r\n", serial_reg);

            error_condition = memory_card_erase(card_address);
        }

        if(error_condition)
        {
            if(error_condition != ABORT_OCCURRED)
                error_serialio_display(serial_reg, error_condition);
            serial_send_string("Aborting Erase\r\n", serial_reg);
        }
        else
            serial_send_string("Memory Card Erased\r\n", serial_reg);

        return;
}

/* end */


/*****************************************************************************
Include File Name:    switches.h
Number/Version:
History:
            Date          Rev   Author          Description
            17-Mar-1993 0.0    C. Houlberg     Baseline

Abstract:
            switches.c prototypes
*****************************************************************************/

/*    switches.c contains the following functions:
*/
      void switches(int fail_flags);

/* end */


/*****************************************************************************
Module Name:    Switches
Number/Version:
History:
            Date          Rev   Author          Description
            17-Mar-1993 0.0    C. Houlberg     Baseline

Abstract:
            Module to process library cards (could be named libarian)

Switches:
            Exec                  Execute the switch settings (active low).
            Skip                  Skip the file or function (active low).

      The Memory Card must be in place when Exec switch is activated.

*****************************************************************************/
```

```
/*
      All definitions used by SWITCHES.C are defined
            in the following header files:
*/

#include "rrt.h"                 /* RRT configuration */
#include "dsp.h"                 /* DSP definitions */
#include "system.h"              /* System definitions */
#include "cardhdrs.h"            /* Memory Card header definitions */
#include "display.h"             /* LCD display definitions */
#include "timer.h"               /* Timer definitions */
#include "error.h"               /* Error routine definitions */
#include "control.h"             /* Controller control functions */
#include "protob.h"              /* Protocol B definitions */
#include "protoc.h"              /* Protocol C definitions */
#include "protod.h"              /* Protocol D definitions */
#include "protoe.h"              /* Protocol E definitions */
#include "protof.h"              /* Protocol F definitions */
#include "protog.h"              /* Protocol G definitions */
#include "protoh.h"              /* Protocol H definitions */
#include "protou1.h"             /* Protocol U1 definitions */
#include "protou2.h"             /* Protocol U2 definitions */
#include "ms1553.h"              /* MS1553 definitions */
#include "switches.h"            /* Switches definitions */
#define MODE_NOT_DISPLAYED    0
#define UPLOAD_MODE           1
#define DOWNLOAD_MODE         2
#define VERIFY_MODE           3
#define MODE_NOT_ALLOWED      4

/*****************************************************************************
Name:         switches
Number/Version:
History:
             Date         Rev   Author        Description
             17-Mar-1993  0.0   C. Houlberg   Baseline
             31-Mar-1993  0.0   C. Houlberg   Added buffers for card headers
Inputs:
             fail_flags
Outputs:
             - None -
Global Data:
             status_flags
Functions Referenced:
             LCD_display()
             protob()
             protoc()
             protod()
             protoe()
             protof()
             protog()
             protoh()
             protou1()
             protou2()
             ms1553_monitor()
             error_display()
Abstract:
             Processes Library Cards
*****************************************************************************/
void switches(int fail_flags)
{
      TIMER_REG_TYPE *timer;                    /* Pointer to timer counter register */
      PPI1_REG_TYPE *ms1553_discretes;          /* MS-1553 discretes pointer */
      PPI2_REG_TYPE *equipment_discretes;       /* Equipment discretes pointer */
      PPI3_REG_TYPE *switch_status;             /* Switch status pointer */
      PPI3_REG_TYPE *discrete_pointer;          /* System discretes pointer */
      CARD_HEADER_TYPE *header0_pointer;        /* Memory Card0 header pointer */
      CARD_HEADER_TYPE *header1_pointer;        /* Memory Card1 header pointer */
      CARD_HEADER_TYPE *header;
      LOOKUP_TABLE_TYPE *lookup_table_pointer;  /* Lookup table pointer */
      LOOKUP_TABLE_TYPE *next_table_pointer;    /* Pointer to next file to load */
      int *header_pointer, *pointer, *next_pointer;
      int status, address, card_address;
      int card_0_to_process, card_1_to_process;
      int temp, automode, operational_mode, i;
      int execute, activity, manual_power_off;
      char string[13];                          /* string to form filename */
      int return_word = NO_ERROR;               /* Start with no error */
      int file_size;                            /* Size of binary file in bytes */
      int another_file;                         /* Another file was processed */
```

```
int platform_id_match;
int general_file_processed = NO;
int specific_file_processed = NO;
int empty_library_card = YES;

/* initialize structure pointers */
timer = (TIMER_REG_TYPE *) &TIMER0;
ms1553_discretes = (PPI1_REG_TYPE *) &PPI1;
equipment_discretes = (PPI2_REG_TYPE *) &PPI2;
switch_status = (PPI3_REG_TYPE *) &PPI3;
discrete_pointer = (PPI3_REG_TYPE *) &PPI3;

/* Card headers and Lookup Tables will be stored in
      RAM_BUFFER to conserve stack */
header0_pointer = (CARD_HEADER_TYPE *) HEADER0_BUFFER;
header1_pointer = (CARD_HEADER_TYPE *) HEADER1_BUFFER;
lookup_table_pointer = (LOOKUP_TABLE_TYPE *) LOOKUP_TABLE_BUFFER;
pointer = (int *) lookup_table_pointer;
next_table_pointer = (LOOKUP_TABLE_TYPE *) NEXT_TABLE_BUFFER;
next_pointer = (int *) next_table_pointer;

/* Test for first card to process */
if(status_flags.Library_Card_0)
{
      card_0_to_process = YES;

      /* Transfer card0 header to RAM header0 buffer */
      header_pointer = (int *) header0_pointer;
      for(i = 0; i < SIZE_CARD_HEADER; i++)
            *(header_pointer + i) = memory_card_read(MEMORY_CARD_0 + i);

      #ifdef FLEET_VERSION
            /* Test memory card0 for not Fleet Released */
            if(!(header0_pointer->Fleet_Releasable))
                  return_word = NOT_RELEASED;
      #endif

      if((status_flags.Library_Card_1) && !(return_word))
      {
            card_1_to_process = YES;

            /* Transfer card1 header to RAM header1 buffer */
            header_pointer = (int *) header1_pointer;
            for(i = 0; i < SIZE_CARD_HEADER; i++)
                  *(header_pointer + i) = memory_card_read(MEMORY_CARD_1 + i);

            #ifdef FLEET_VERSION
                  /* Test memory card0 for not Fleet Released */
                  if(!(header1_pointer->Fleet_Releasable))
                        return_word = NOT_RELEASED;
            #endif

            /* Test for 1st to process */
            if(header0_pointer->Memory_Card_Sequence
                  <= header1_pointer->Memory_Card_Sequence)
            {
                  card_address = MEMORY_CARD_0;
                  header = header0_pointer;
            }
            else
            {
                  card_address = MEMORY_CARD_1;
                  header = header1_pointer;
            }
      }
      else if(!(return_word))
      {
            card_1_to_process = NO;
            card_address = MEMORY_CARD_0;
            header = header0_pointer;
      }
}
else
{
      card_0_to_process = NO;
      if(status_flags.Library_Card_1)
      {
            card_1_to_process = YES;

            /* Transfer card1 header to RAM header1 buffer */
            header_pointer = (int *) header1_pointer;
            for(i = 0; i < SIZE_CARD_HEADER; i++)
                  *(header_pointer + i) = memory_card_read(MEMORY_CARD_1 + i);
```

```
#ifdef FLEET_VERSION
        /* Test memory card0 for not Fleet Released */
        if(!(header1_pointer->Fleet_Releasable))
            return_word = NOT_RELEASED;
#endif

        card_address = MEMORY_CARD_1;
        header = header1_pointer;
    }
    else if(!(return_word))
        return_word = NO_CARD;
}

/* Test Platform ID for no cable */
if(!(return_word))
    if(discrete_pointer->Platform_ID == NO_CABLE)
        return_word = NO_CABLE_ATTACHED;

/* Allow above errors to display before returning */
if(return_word)
{
    return_word = error_display(return_word); /* Display error */

    while(switch_status->Not_Execute);        /* Wait for switch */

    /* Allow time for switch to settle. */
    timer->Timer_Counter = SETTLE_TIME;
    while(timer->Timer_Counter)
        /* Make sure switch is open */
        if(!(switch_status->Not_Execute))
            timer->Timer_Counter = SETTLE_TIME;
    return;
}

/*****************************/
/* Have a usable memory card */
/*****************************/

/* Test if Auto Load allowed */
if(header->Auto_Load_OK)
{
    /* Query user */
    LCD_display(START_LINE1, "\fEXEC => Auto Mode\rSKIP => Manual Mode");
    while((switch_status->Not_Execute)  /* Wait for switch closure */
        && (switch_status->Not_Skip));
    if(!(switch_status->Not_Execute))
        automode = YES;
    else
        automode = NO;

    /* Allow time for switch to settle. */
    timer->Timer_Counter = SETTLE_TIME;
    while(timer->Timer_Counter)
        /* Make sure switch is open */
        if(!(switch_status->Not_Execute)
            || !(switch_status->Not_Skip))
            timer->Timer_Counter = SETTLE_TIME;
}
else
    automode = NO;

/* Initialize memory card address to file lookup table location */
address = card_address + SIZE_CARD_HEADER;

/* Establish the memory card ID */
memory_card_ID(card_address);

/* Move memory card lookup table data to LOOKUP_TABLE_BUFFER */
for(i = 0; i < SIZE_LOOKUP_TABLE; i++)
    *(pointer + i) = memory_card_read(address + i);

/* Execute for each file */
/* End of files is designated by a null word
    for the first word of the lookup table */
while(!(*(pointer) == NO_FILE) && !(return_word))
{
    /* Indicate Library Card is not empty */
    if(empty_library_card)
        empty_library_card = NO;

    /* Test for loadable file */
```

```
if(!(lookup_table_pointer->Check_Platform_ID)
     || (discrete_pointer->Platform_ID == DIRECT_LOAD_CABLE)
     || ((discrete_pointer->Platform_ID == header->Platform_ID)
     && (discrete_pointer->Platform_Configuration
     == lookup_table_pointer->Platform_Configuration)))
{
     /* Register type of file processed */
     if(lookup_table_pointer->Check_Platform_ID)
     {
          if(discrete_pointer->Platform_ID != DIRECT_LOAD_CABLE)
               specific_file_processed = YES;
     }
     else
          general_file_processed = YES;

     /* Form filename for display */
     for(i = 0; i < 6; i++)
     {
          string[i+i] = (char) (0xff & *(pointer + i));
          string[i+i+1] = (char)
               (0xff & ((*(pointer + i)) >> 8));
     }
     string[12] = 0;                    /* End of string indicator */

     if(automode)
     {
          /* Only process files for which operation is allowed */
          if((status_flags.UPLOAD
               && lookup_table_pointer->Upload_From_Card_OK)
               || (status_flags.DOWNLOAD
               && lookup_table_pointer->Download_To_Card_OK)
               || (!status_flags.UPLOAD && !status_flags.DOWNLOAD
               && lookup_table_pointer->Stand_Alone_Verify))
          {
               /* Display filename and wait for response */
               LCD_display(START_LINE1, "\fFILE:");
               LCD_display(START_LINE1 + 7, &string[0]);

               execute = YES;
          }
          else
               execute = NO;
     }
     else
     {
          /* Display filename */
          LCD_display(START_LINE1, "\fFILE:");
          LCD_display(START_LINE1 + 7, &string[0]);

          /* Mode not yet displayed */
          operational_mode = MODE_NOT_DISPLAYED;

          /* Display mode condition and allow operator to change it */
          while((switch_status->Not_Execute
               || (operational_mode == MODE_NOT_ALLOWED))
               && switch_status->Not_Skip)
          {
               /* Update mode switch status flags */
               /* Mode switch testing done here and
                    one place in rrt_main() */
               if(switch_status->Verify)
               {
                    status_flags.UPLOAD = NO;
                    status_flags.DOWNLOAD = NO;
               }
               else
               {
                    if(switch_status->Download)
                    {
                         status_flags.DOWNLOAD = YES;
                         status_flags.UPLOAD = NO;
                    }
                    else
                    {
                         status_flags.DOWNLOAD = NO;
                         status_flags.UPLOAD = YES;
                    }
               }

               /* Display status indicated by switches and lookup table */
               if(status_flags.UPLOAD
                    && lookup_table_pointer->Upload_From_Card_OK)
               {
```

```
                if(operational_mode != UPLOAD_MODE)
                {
                        operational_mode = UPLOAD_MODE;

                        LCD_display(START_LINE2, "EXEC to ");
                        LCD_display(START_LINE2 + 8, "Upload\t");
                }
        }
        else if(status_flags.DOWNLOAD
                && lookup_table_pointer->Download_To_Card_OK)
        {
                if(operational_mode != DOWNLOAD_MODE)
                {
                        operational_mode = DOWNLOAD_MODE;

                        LCD_display(START_LINE2, "EXEC to ");
                        LCD_display(START_LINE2 + 8, "Download\t");
                }
        }
        else if(!status_flags.UPLOAD && !status_flags.DOWNLOAD
                && lookup_table_pointer->Stand_Alone_Verify)
        {
                if(operational_mode != VERIFY_MODE)
                {
                        operational_mode = VERIFY_MODE;

                        LCD_display(START_LINE2, "EXEC to ");
                        LCD_display(START_LINE2 + 8, "Verify\t");
                }
        }
        else
                if(operational_mode != MODE_NOT_ALLOWED)
                {
                        operational_mode = MODE_NOT_ALLOWED;

                        LCD_display(START_LINE2, "Mode NOT Allowed\t");
                }
    }
    if(!switch_status->Not_Execute)
        execute = YES;
    else
        execute = NO;

    /* Allow time for switch to settle. */
    timer->Timer_Counter = SETTLE_TIME;
    while(timer->Timer_Counter)
        /* Make sure switch is open */
        if(!(switch_status->Not_Execute)
            || !(switch_status->Not_Skip))
            timer->Timer_Counter = SETTLE_TIME;
}

/* At this time all code dealing with the MS-1553 interface is
    contained within the following if() statement.  To use any
    of the protocols with any other interface this code should
    be moved to a function (i.e. switches_1553) as well as any
    code specific to the other interfaces (i.e. switches_serial
    and switches_488).  The only code then needed in the if()
    statement would be a test for the specific interface, such
    as switch(){} statement, and a call to the appropriate
    function. */
if(execute)                                     /* Execute the operation */
{
    /* Characterize MS-1553 bus and discretes */
    temp = 0;                                   /* Inactive discrete state */
    /* Characterize MS-1553 bus */
    if(discrete_pointer->Platform_ID == DIRECT_LOAD_CABLE)
    {
        if(lookup_table_pointer->Direct_CT_Grounded)
            temp |= CENTERTAP_GND;
        if(lookup_table_pointer->Direct_Short_Stub)
            temp |= SHORT_STUB;
    }
    else
    {
        if(lookup_table_pointer->Center_Tap_Grounded)
            temp |= CENTERTAP_GND;
        if(lookup_table_pointer->Short_Stub_Coupled)
            temp |= SHORT_STUB;
    }
    ms1553_discretes->MS1553_Bus_Discretes = temp;
```

```
timer->Timer_Counter = SETTLE_TIME;        /* Let relays settle */
while(timer->Timer_Counter);

/* Set the MS-1553 bus controller to monitor mode */
ms1553_MT_setup();

/* Select MS-1553 bus */
switch(lookup_table_pointer->Primary_Bus)
{
        case 0x00:                          /* Not used at this time */
                break;
        case 0x01:
                ms1553_discretes->MS1553_Bus_Select = AV1_BUS;
                break;
        case 0x02:
                ms1553_discretes->MS1553_Bus_Select = AV2_BUS;
                break;
        case 0x03:
                ms1553_discretes->MS1553_Bus_Select = AV3_BUS;
                break;
        case 0x04:
                ms1553_discretes->MS1553_Bus_Select = AV4_BUS;
                break;
        case 0x05:
                ms1553_discretes->MS1553_Bus_Select = EW_BUS;
                break;
        default:                            /* Not used at this time */
                return_word = BUS_SELECT;
                break;
}

/* Let relays settle */
timer->Timer_Counter = SETTLE_TIME;
while(timer->Timer_Counter);

/* Check if an AYK-14 is the normal Bus Controller */
if(lookup_table_pointer->AYK14_Normal_BC)
{
        /* Test for MUX bus load or AYK14 load */
        if((discrete_pointer->Platform_ID != DIRECT_LOAD_CABLE)
                || lookup_table_pointer->AYK14_Correlation)
        {
                /* Set power off/on discretes */
                temp = lookup_table_pointer->AYK14_Power_Off;
                equipment_discretes->AYK14_Discretes = temp;

                /* Let relays settle */
                timer->Timer_Counter = SETTLE_TIME;
                while(timer->Timer_Counter);
        }
}

/* Determine activity on bus */
activity = ms1553_monitor();

/* Check for activity if AYK-14 is the normal Bus Controller */
manual_power_off = NO;  /* Assume no manual power off needed */
if((activity == ACTIVE_BUS)
        && lookup_table_pointer->AYK14_Normal_BC)
{
        /* Manual power off takes place */
        manual_power_off = YES;
        /* Inform user to power off AYK14 */
        LCD_display(START_LINE2, "Turn Off MC");
        /* Build message string */
        i = 0;
        if(lookup_table_pointer->AYK14_Power_Off & 0x01)
                string[i++] = '1';
        if(lookup_table_pointer->AYK14_Power_Off & 0x02)
        {
                if(i)
                        string[i++] = ',';
                string[i++] = '2';
        }
        if(lookup_table_pointer->AYK14_Power_Off & 0x04)
        {
                if(i)
                        string[i++] = ',';
                string[i++] = '3';
        }
        if(lookup_table_pointer->AYK14_Power_Off & 0x08)
        {
```

```
		if(i)
			string[i++] = ',';
		string[i++] = '4';
	}
	string[i++] = '\t';			/* Clear rest of line */
	string[i] = 0;
	LCD_display(START_LINE2 + 11, &string[0]);

	/* Wait until bus is inactive, or aborting operation */
	while((activity == ACTIVE_BUS)
		&& (switch_status->Not_Skip))
		activity = ms1553_monitor();

	/* Check if aborting operation and let switch settle */
	if(!(switch_status->Not_Skip))
	{
		LCD_display(START_LINE1, "ABORT:\r\t");

		return_word = ABORT_OCCURRED;
		timer->Timer_Counter = SETTLE_TIME;
		while(timer->Timer_Counter)
			/* Make sure switch is open */
			if(!(switch_status->Not_Skip))
				timer->Timer_Counter = SETTLE_TIME;
	}
}

if(!(return_word))
{
	/* Set up as an RT before activating discretes */
	ms1553_RT_setup();

	/* Set reprogram enable discretes if needed */
	temp = lookup_table_pointer->EW_OSM_Repro_Enable;
	temp += ((lookup_table_pointer->EW_UDM_Repro_Enable) << 1);
	temp += ((lookup_table_pointer->AV_Reprogram_Enable_1)
		<< 4);
	temp += ((lookup_table_pointer->AV_Reprogram_Enable_2)
		<< 5);
	if(temp)			/* Delay for relay only if needed */
	{
		equipment_discretes->EW_AV_Discretes = temp;

		/* Let relays settle */
		timer->Timer_Counter = SETTLE_TIME;
		while(timer->Timer_Counter);
	}

	/* Set up bus for load */
	switch(activity)
	{
		case ACTIVE_BUS:
			/* Acquire control of bus if directed */
			switch(lookup_table_pointer->RRT_Terminal_Mode)
			{
				case ALWAYS_BC:
					return_word = ACTIVE_BUS;
					break;
				case CONVERTS_BC_TO_RT:
					return_word =
					  convert_BC_to_RT(lookup_table_pointer);
					if(!(return_word))	/* Now as BC */
						ms1553_BC_setup(activity);
					break;
				case ALWAYS_RT:
					/* Already set up as an RT */
					break;
				case QUIETS_BC:
					return_word =
						quiet_BC(lookup_table_pointer);
					if(!(return_word))	/* Now as BC */
						ms1553_BC_setup(activity);
					break;
				default:
					return_word = TERMINAL_MODE;
					break;
			}
			break;
		case NO_ACTIVITY:
			/* Assume control of bus */
			switch(lookup_table_pointer->RRT_Terminal_Mode)
			{
```

```
                        case ALWAYS_BC:
                              ms1553_BC_setup(activity);
                              break;
                        case CONVERTS_BC_TO_RT:
                              if(lookup_table_pointer->BC_RT_Address
                                == lookup_table_pointer->RT_Address)
                                    return_word = NO_ACTIVITY;
                              else
                                 -  ms1553_BC_setup(activity);
                              break;
                        case ALWAYS_RT:
                              /* Check if not reprogramming an AYK14 */
                              if(!(lookup_table_pointer->
                                    AYK14_Correlation))
                                    return_word = NO_ACTIVITY;
                              break;
                        case QUIETS_BC:
                              ms1553_BC_setup(activity);
                              break;
                        default:
                              return_word = TERMINAL_MODE;
                              break;
                  }
      }
}

if(!(return_word))
{
      /* Set condition of platform discretes */
      if(lookup_table_pointer->MSDRS_Off)
            temp = MSDRS_PWR_OFF;
      if(lookup_table_pointer->RDP_SOC_CSC_CIT_Off)
            temp |= BOOT_ENABLE_RDP;
      if(lookup_table_pointer->SMS_Off)
            temp |= BOOT_ENABLE_SMS;
      if(temp)
      {
            temp |= ms1553_discretes->MS1553_Bus_Discretes;
            ms1553_discretes->MS1553_Bus_Discretes = temp;

            /* Let relays settle */
            timer->Timer_Counter = SETTLE_TIME;
            while(timer->Timer_Counter);
      }

      /* Check if reprogramming an AYK14 for auto power off */
      if(lookup_table_pointer->AYK14_Correlation
            && !manual_power_off)
      {
            /* Set IPL to reprogram AYK14 */
            equipment_discretes->AYK14_Discretes
                  |= ((lookup_table_pointer->AYK14_IPL) << 4);

            /* Let relays settle */
            timer->Timer_Counter = SETTLE_TIME;
            while(timer->Timer_Counter);

            /* Release power off/on for AYK-14 */
            equipment_discretes->AYK14_Discretes
                  &= ~(lookup_table_pointer->AYK14_Correlation);

            /* Let relays settle */
            timer->Timer_Counter = SETTLE_TIME;
            while(timer->Timer_Counter);
      }

      /* Select the appropriate protocol and execute it */
      switch(lookup_table_pointer->Protocol)
      {
            case PROTOCOL_B:
                  /* Appendix B protocol */
                  return_word = protocol_b(address, automode);
                  break;
            case PROTOCOL_C:
                  /* Appendix C protocol */
                  return_word = protocol_c(address, automode);
                  break;
            case PROTOCOL_D:
                  /* Appendix D protocol */
                  return_word = protocol_d(address, automode);
                  break;
```

```
                    case PROTOCOL_E:
                          /* Appendix E protocol */
                          return_word = protocol_e(address, automode);
                          break;
                    case PROTOCOL_G:
                          /* Appendix G protocol */
                          return_word = protocol_g(address, automode);
                          break;
                    case PROTOCOL_H:
                          /* Appendix H protocol */
                          return_word = protocol_h(address, automode);
                          break;
                    case PROTOCOL_F_SMS_CORE:
                    case PROTOCOL_F_SMS_EEPROM:
                    case PROTOCOL_F_SDC:
                          return_word = protocol_f(address, automode);
                          break;
                    case PROTOCOL_U1:
                          /* U1 protocol */
                          return_word = protocol_u1(address, automode);
                          break;
                    case PROTOCOL_U2:
                          /* U2 protocol */
                          return_word = protocol_u2(address, automode);
                          break;
                    default:
                          /* Illegal protocol */
                          return_word = error_display(PROTOCOL_SELECT);
                          break;
              }

              /* Return active bus control if AYK-14
                    was not the Bus Controller */
              if(!(lookup_table_pointer->AYK14_Normal_BC))
                    if(activity == ACTIVE_BUS)
                          /* Return control to bus controller */
                          if((lookup_table_pointer->RRT_Terminal_Mode)
                                == CONVERTS_BC_TO_RT)
                          {
                                temp =
                                      return_BC_to_BC(lookup_table_pointer);
                                if(temp)
                                      /* Identify new error */
                                      return_word = temp;
                          }
        }

        /* Ensure all equipment discretes are cleared */
        equipment_discretes->EW_AV_Discretes = 0;
        equipment_discretes->AYK14_Discretes = 0;
        /* Ensure all bus discretes are cleared */
        ms1553_discretes->MS1553_Bus_Select = 0;
        ms1553_discretes->MS1553_Bus_Discretes = 0;

        /* Allow 1 sec. to view last message
              and let discretes settle */
        timer->Timer_Counter = SEC1;
        while(timer->Timer_Counter);
  }
}
else if(discrete_pointer->Platform_ID == header->Platform_ID)
      platform_id_match = YES;

/* If an error occurred (ie. ABORT) wait for operator interaction */
if(return_word)
{
      /* Display the error */
      return_word = error_display(return_word);

      while((switch_status->Not_Execute)  /* Wait for switch closure */
            && (switch_status->Not_Skip));
      if(!(switch_status->Not_Execute))
            return_word = NO_ERROR;       /* Try next file (else abort) */

      /* Allow time for switch to settle. */
      timer->Timer_Counter = SETTLE_TIME;
      while(timer->Timer_Counter)
            /* Make sure switch is open */
            if(!(switch_status->Not_Execute)
                  || !(switch_status->Not_Skip))
                  timer->Timer_Counter = SETTLE_TIME;
}
```

```
if(!(return_word))
{
     /* Adjust pointer to next file to process */
                                        /* do while command combination */
     do
     {
          /* Transfer in next possible file's lookup table */
          file_size = (lookup_table_pointer->File_Size_MSW << 16)
               + lookup_table_pointer->File_Size_LSW;
          /* Add size in words to address next lookup table */
          address += SIZE_LOOKUP_TABLE + ((file_size + 1) >> 1);
          for(i = 0; i < SIZE_LOOKUP_TABLE; i++)
               *(next_pointer + i) = memory_card_read(address + i);

          /* Test if last file on card */
          if(*next_pointer == NO_FILE)  /* No other files on card */
          {
               if(card_address == MEMORY_CARD_0)
               {
                    card_0_to_process = NO;
                    if(card_1_to_process)   /* Test other memory card */
                    {
                         card_address = MEMORY_CARD_1;
                         header = header1_pointer;
                    }
               }
               else
               {
                    card_1_to_process = NO;
                    if(card_0_to_process)   /* Test other memory card */
                    {
                         card_address = MEMORY_CARD_0;
                         header = header0_pointer;
                    }
               }

               if(card_0_to_process || card_1_to_process)
               {
                    /* Initialize memory card address */
                    address = card_address + SIZE_CARD_HEADER;

                    /* Move card lookup table data to next_table[] */
                    for(i = 0; i < SIZE_LOOKUP_TABLE; i++)
                         *(next_pointer + i)
                              = memory_card_read(address + i);

                    /* Establish the next card ID */
                    memory_card_ID(card_address);
               }
          }

          /* Determine if the next file was already processed */
          if(!card_0_to_process && !card_1_to_process)
          {
               another_file = NO;
          }
          else if((lookup_table_pointer->File_Type)
               == SINGLE_FILE)
          {
               another_file = NO;
          }
          else if((lookup_table_pointer->RT_Address)
               != (next_table_pointer->RT_Address))
          {
               another_file = NO;
          }
          else if((lookup_table_pointer->Primary_Bus)
               != (next_table_pointer->Primary_Bus))
          {
               another_file = NO;
          }
          else if((lookup_table_pointer->File_Type == SIMULTANEOUS_FILE)
               && (lookup_table_pointer->Disc_Enable
                    != next_table_pointer->Disc_Enable))
               another_file = NO;
          else
               another_file = YES;

          /* Replace last lookup table with next */
          for(i = 0; i < SIZE_LOOKUP_TABLE; i++)
               *(pointer + i) = *(next_pointer + i);

     }while(another_file == YES);
}
```

```
    }

    /* Display File Process Message */
    if(empty_library_card)
          LCD_display(START_LINE1, "\fEmpty Library Card");
    else if(!general_file_processed && !platform_id_match)
          LCD_display(START_LINE1, "\fID Missmatch");
    else if(!general_file_processed && !specific_file_processed)
          LCD_display(START_LINE1, "\fNo Files Processed");
    else if(!specific_file_processed)
          LCD_display(START_LINE1, "\fFiles Processed");
    else if(specific_file_processed)
          LCD_display(START_LINE1, "\fAll Files Processed");

    LCD_display(START_LINE2, "EXEC to Continue\t");

    while(switch_status->Not_Execute);                    /* Wait for switch */

    /* Allow time for switch to settle. */
    timer->Timer_Counter = SETTLE_TIME;
    while(timer->Timer_Counter)
          /* Make sure switch is open */
          if(!(switch_status->Not_Execute))
                timer->Timer_Counter = SETTLE_TIME;

    return;
}

/* end */


/******************************************************************************
Include File Name:    wordtype.h
Number/Version:
History:
           Date          Rev    Author           Description
           23-Mar-1993   0.0    C. Houlberg      Baseline

Abstract:
           Structure of MS-1553 command, status, and data words.
******************************************************************************/

typedef struct
{                                                    /* Command word */
      unsigned Data_Word_Count          :  5; /* Number of data words returning */
      unsigned Subaddress               :  5; /* Subaddress field */
      unsigned RT_Transmit              :  1; /* RT transmit bit */
      unsigned Terminal_Address         :  5; /* RT's address */

} COMMAND_WORD_TYPE;

      #define RT_TRANSMIT                          0x0400    /* Transmit/Receive bit mask */

typedef struct
{                                                    /* Status word */
      unsigned Terminal_Flag            :  1; /* 1 ==> Examine status code field */
      unsigned Bus_Acceptance           :  1; /* Dynamic Bus Control Acceptance */
      unsigned Subsystem_Flag           :  1; /* Subsystem Flag */
      unsigned Busy_Bit                 :  1; /* Terminal busy indication */
      unsigned Broadcast_Received       :  1; /* Broadcast Command Received */
      unsigned Reserved_5               :  1; /* Reserved bit */
      unsigned Reserved_6               :  1; /* Reserved bit */
      unsigned Reserved_7               :  1; /* Reserved bit (used by msgs_f (S)) */
      unsigned Service_Request          :  1; /* Service_Request */
      unsigned Instrumentation          :  1; /* 1/0 ==> Command/Status word */
      unsigned Message_Error            :  1; /* Message error occurred */
      unsigned Terminal_Address         :  5; /* RT's address */

} STATUS_WORD_TYPE;

/********** Protocol B and C definitions **********/
      #define      BUSY_STATUS          0x0008      /* Status busy response */
      #define SERVICE_STATUS            0x0100      /* Status service request */
      #define      ERROR_STATUS         0x0400      /* Status error response */

/********** Protocol D definitions **********/
      #define D_Data_Ready Service_Request          /* Protocol D Data Ready bit */

/********** Protocol E definitions **********/
      #define E_STATUS_COMMAND          0x0401
      #define E_DATA_READY              0x0100      /* Protocol E Data Ready (Ser. Req.) */
```

```
/*********** Protocol F definitions **********/
      #define F_Success Reserved_7              /* Protocol F Success bit */
      #define F_Wait          Instrumentation   /* Protocol F Wait bit */

/*********** Protocol G definitions **********/
      #define G_STATUS_COMMAND      0x0402
      #define G_DATA_READY          0x0100      /* Protocol G Data Ready (Ser. Req.) */
      #define G_BUSY                0x0200      /* Protocol G Busy (Instrumentation) */

typedef struct                                  /* Activity message data word */
{
      unsigned Data_Word_Count       :  5;      /* Number of data words returning */
      unsigned Subaddress            :  5;      /* Subaddress field */
      unsigned RT_Transmit           :  1;      /* RT transmit bit */
      unsigned Not_Used              :  4;      /* Bits not used */
      unsigned Busy_Bit              :  1;      /* RT's address */

} ACTIVITY_DATA_TYPE;

      #define ACTIVITY              0x04e1      /* Protocol C activity command */
      #define     BUSY_DATA         0x8000      /* Data associated with busy */

typedef struct
{
      unsigned Buffer_Xfer_Count     : 12;      /* Buffer transfer count */
      unsigned Header_Type           :  2;      /* Buffer transfer count type */
      unsigned Transfer_Mode         :  2;      /* Data transfer mode */

} HEADER_WORD_TYPE;

typedef struct                                  /* Reprogram status message status */
{
      unsigned Status_Code           : 14;      /* Reprogram status code */
      unsigned Status_Indicator      :  1;      /* Reprogram status indicator */
      unsigned Status_Flag           :  1;      /* Reprogram status flag */

} REPROGRAM_STATUS_TYPE;

      #define REPROGRAM_STATUS_COMMAND    0x02e1

typedef struct
{
      unsigned Ready_Bit             :  1;      /* Send status data ready bit */
      unsigned Program_Status        :  2;      /* Reprogramming status */
      unsigned Data_Status_Error     :  1;      /* Received data status error bit */
      unsigned Spares                : 12;      /* Spare bits */

} SEND_STATUS_DATA_TYPE;

/* end */

/*****************************************************************************
Include File Name:    control.h
Number/Version:
History:
            Date        Rev   Author            Description
            17-Mar-1993 0.0   C. Houlberg       Baseline

Abstract:
            Prototypes and definitions used in manipulating bus controllers.
*****************************************************************************/

/*    control.c contains the following functions:
*/
      int convert_BC_to_RT(LOOKUP_TABLE_TYPE *lookup_table_pointer);
      int quiet_BC(LOOKUP_TABLE_TYPE *lookup_table_pointer);
      int return_BC_to_BC(LOOKUP_TABLE_TYPE *lookup_table_pointer);

/*    Definitions used by control.c */

      #define REPROGRAM_CONTROL_CMD 0x03a4
      #define REPROGRAM_CONTROL_REQ 0x07a4

/* end */

/*****************************************************************************
Module Name:    control.c
Number/Version:
History:
            Date        Rev   Author            Description
            17-Mar-1993 0.0   C. Houlberg       Baseline
```

```
Abstract:
                    This module provides functions to control the conversion
                    of a bus controller to and from a remote terminal or to
                    quiet the bus controller.
**************************************************************************/
/*
      All definitions used by CONTROL.C are defined in the
            following header files:
*/

#include "rrt.h"                          /* RRT configuration */
#include "dsp.h"                          /* DSP definitions */
#include "system.h"                       /* System definitions */
#include "cardhdrs.h"                     /* Memory card header definitions */
#include "ms1553.h"                       /* MS-1553 definitions */
#include "timer.h"                        /* Timer definitions */
#include "error.h"                        /* Error definitions */
#include "display.h"                      /* LCD display definitions */
#include "control.h"                      /* Functions used in this module */

/* Defined reprogram control codes */

      #define EXECUTE              0x01
      #define REVERT_TO_BC         0x02
      #define BC_QUIET             0x04
      #define BC_TO_RT             0x08

/*************************************************************************
Module Name:    convert_BC_to_RT
Number/Version:
History:
          Date         Rev  Author          Description
          17-Mar-1993  0.0  C. Houlberg     Baseline
Abstract:
                 Converts the bus controller to a remote terminal
*************************************************************************/
int convert_BC_to_RT(LOOKUP_TABLE_TYPE *lookup_table_pointer)
{
      int command, message[33], return_word;

      /* Reprogramming control message, quiet controller */
      /* Enter expected command */
      command = (lookup_table_pointer->RRT_RT_Address << 11)
            + REPROGRAM_CONTROL_REQ;

      /* Status word containing RRT RT address */
      message[0] = 0xf800 & command;

      /* Data */
      message[1] = lookup_table_pointer->BC_Nomenclature_MSW;
      message[2] = lookup_table_pointer->BC_Nomenclature_2SW;
      message[3] = lookup_table_pointer->BC_Nomenclature_LSW;
      message[4] = (lookup_table_pointer->BC_Fill_Data << 10) + BC_TO_RT;

      /* Submit status and data words */
      return_word = ms1553_respond(&command, &message[0]);
      if(return_word)
            error_display(return_word);
      return return_word;                            /* Return MS-1553 error */
}

/*************************************************************************
Module Name:    quiet_BC
Number/Version:
History:
          Date         Rev  Author          Description
          17-Mar-1993  0.0  C. Houlberg     Baseline
Abstract:
                 Quiets the bus controller.
*************************************************************************/
int quiet_BC(LOOKUP_TABLE_TYPE *lookup_table_pointer)
{
      int command, message[33], return_word;

      /* Reprogramming control message, quiet controller */
      /* Enter expected command */
      command = (lookup_table_pointer->RRT_RT_Address << 11)
            + REPROGRAM_CONTROL_REQ;
```

```
        /* Status word containing RRT RT address */
        message[0] = 0xf800 & command;

        /* Data */
        message[1] = lookup_table_pointer->BC_Nomenclature_MSW;
        message[2] = lookup_table_pointer->BC_Nomenclature_2SW;
        message[3] = lookup_table_pointer->BC_Nomenclature_LSW;
        message[4] = (lookup_table_pointer->BC_Fill_Data << 10) + BC_QUIET;

        /* Submit status and data words */
        return_word = ms1553_respond(&command, &message[0]);
        if(return_word)
            error_display(return_word);                    /* Return MS-1553 error */
        return return_word;
}

/******************************************************************************
Module Name:    return_BC_to_BC
Number/Version:
History:
        Date         Rev   Author          Description
        17-Mar-1993 0.0    C. Houlberg     Baseline

Abstract:
                Returns a bus controller to the bus controller function
                from a remote terminal function.
******************************************************************************/
int return_BC_to_BC(LOOKUP_TABLE_TYPE *lookup_table_pointer)
{
        int send_message[5], return_word;

        /* Reprogramming control message, enable programming */
        /* Command */
        send_message[0] = (lookup_table_pointer->BC_RT_Address << 11)
            + REPROGRAM_CONTROL_CMD;

        /* Data */
        send_message[1] = lookup_table_pointer->BC_Nomenclature_MSW;
        send_message[2] = lookup_table_pointer->BC_Nomenclature_2SW;
        send_message[3] = lookup_table_pointer->BC_Nomenclature_LSW;
        send_message[4] = (lookup_table_pointer->BC_Fill_Data << 10)
            + REVERT_TO_BC;

        /* Send the message */
        return_word = command_message(lookup_table_pointer, &send_message[0]);
        if(return_word)
            error_display(return_word);                    /* Return MS-1553 error */
        return return_word;
}

/* end */


/******************************************************************************
Include File Name:    initprot.h
Number/Version:
History:
        Date         Rev   Author          Description
        22-Mar-1993 0.0    B. Malmberg

Abstract:
******************************************************************************/

/*  The STATE TABLE structure contains the address and flags needed to access
    memory card data and to determine if more data is to be processed.
*/
typedef struct
{
    int card_address;                  /* Address of first card read */
    int another_card_address;          /* Address of second card read */
    int card_0_to_upload;              /* Card 0 upload flag */
    int card_1_to_upload;              /* Card 1 upload flag */
    int card_0_to_verify;              /* Card 0 verify flag */
    int card_1_to_verify;              /* Card 1 verify flag */
    int card_number;                   /* Memory card number */

    int another_upload;                /* More to upload flag */
    int another_verify;                /* More to verify flag */
    int next_file_address;

    int process;                       /* Upload/verify indicator */
```

```
} STATE_TABLE_TYPE;

/*  The LOOKUP TABLE UNION is defined to allow data to be written to the lookup
    table as a sequence of bytes.
*/
typedef union
{
    LOOKUP_TABLE_TYPE structure;             /* Lookup table structure */
    int array[SIZE_LOOKUP_TABLE];            /* Array overlay */

} LOOKUP_TABLE_UNION;

/*    Function prototype
*/
int init_protocol(int address, STATE_TABLE_TYPE *state_ptr);

void init_file(int address, LOOKUP_TABLE_UNION *lookup_table_ptr,
        LOOKUP_TABLE_UNION *next_lookup_ptr, STATE_TABLE_TYPE *state_ptr);


/*****************************************************************************
Module Name:    init protocol
Number/Version:
History:
            Date        Rev     Author      Description
            01-Mar-1993 0.0     B. Malmberg

Abstract:
            Initializes data for the protocols of MIL-STD-2217.
*****************************************************************************/

/*  Include files.
*/
#include "rrt.h"                    /* RRT configuration                  */
#include "dsp.h"                    /* DSP definitions                    */
#include "system.h"                 /* System definitions                 */
#include "cardhdrs.h"               /* Memory card header definitions     */
#include "wordtype.h"               /* Word definitions                   */
#include "display.h"                /* LCD display definitions            */
#include "timer.h"                  /* Timer definitions                  */
#include "error.h"                  /* Error definitions                  */
#include "initprot.h"               /* Initialize protocol definitions    */
/*****************************************************************************
Name:       init_protocol
Number/Version:
History:
            Date        Rev     Author      Description
            01-Mar-1993 0.0     B. Malmberg
            22-Mar-1993 0.1     C. Houlberg Switch positions in status_flags.
Inputs:
            address
            header pointer
            state pointer
Outputs:
            - None -
Global Data:
            - status_flags -
Functions Referenced:
            memory_card_read()
Abstract:
            Initializes parameters passed to protocols and init_file() that
            were acquired from RAM BUFFER card header and lookup table
            which were established by switches().
*****************************************************************************/

int init_protocol(int address, STATE_TABLE_TYPE *state)
{

      CARD_HEADER_TYPE *card_pointer;      /* Pointer to card header in RAM BUFFER */
      LOOKUP_TABLE_UNION *header;          /* Pointer to lookup table in RAM BUFFER */
      int return_word = NO_ERROR;

    /* Pointer to lookup table stored in RAM BUFFER.
    */
      header = (LOOKUP_TABLE_UNION *) LOOKUP_TABLE_BUFFER;

      /*  Determine which card is to be read from.
      */
      if (address < MEMORY_CARD_1)
      {
            card_pointer = (CARD_HEADER_TYPE *) HEADER0_BUFFER;
```

```
            /*  Set card 0 as the card to be read and card 1 as the
                  alternate card.
            */
            state->card_address = MEMORY_CARD_0;
            state->another_card_address = MEMORY_CARD_1;

            /*  Initialize card 0's upload and verify flags to YES.
            */
            state->card_0_to_upload = YES;
            state->card_0_to_verify = YES;

            /*  Set the initial value of card 1's upload and verify
                  flags to YES if the card is present.
            */
            if (status_flags.Library_Card_1)
            {
                  state->card_1_to_upload = YES;
                  state->card_1_to_verify = YES;
            }
            else
            {
                  state->card_1_to_upload = NO;
                  state->card_1_to_verify = NO;
            }
      }
      else
      {
            card_pointer = (CARD_HEADER_TYPE *) HEADER1_BUFFER;
            /*  Set card 1 as the card to be read and card 0 as the
                  alternate card.
            */
            state->card_address = MEMORY_CARD_1;
            state->another_card_address = MEMORY_CARD_0;

            /*  Initialize card 1's upload and verify flags to YES.
            */
            state->card_1_to_upload = YES;
            state->card_1_to_verify = YES;

            /*  Set the initial value of card 0's upload and verify
                  flags to YES if the card is present.
            */
            if (status_flags.Library_Card_0)
            {
                  state->card_0_to_upload = YES;
                  state->card_0_to_verify = YES;
            }
            else
            {
                  state->card_0_to_upload = NO;
                  state->card_0_to_verify = NO;
            }
      }

      /* Acquire card number from card header in RAM BUFFER.
      */
      state->card_number = card_pointer->Memory_Card_Sequence;

      /* If upload indicated set another_upload to YES.
      */
      if(status_flags.UPLOAD)
      {
            if(header->structure.Upload_From_Card_OK)
            {
                  state->another_upload = YES;

                  if(header->structure.Verify_After_Load)
                        state->another_verify = YES;
                  else
                        state->another_verify = NO;
            }
            else
                  return_word = NO_UPLOAD;
      }
      else    /* Set another_upload to NO and test for download or verify */
      {
            state->another_upload = NO;

            if(status_flags.DOWNLOAD)
                  if(header->structure.Download_To_Card_OK)
                        state->another_verify = YES;
                  else
```

```
                return_word = DOWNLOAD_VERIFY;
        else                              /* Stand alone verify indicated */
            if(header->structure.Stand_Alone_Verify)
                state->another_verify = YES;
            else
                return_word = DOWNLOAD_VERIFY;
    }

    return return_word;
}

/****************************************************************************
Name:       init_file
Number/Version:
History:
            Date        Rev   Author      Description
            01-Mar-1993 0.0   J. Ng
            22-Mar-1993 0.1   C. Houlberg Switch positions in status_flags.

Inputs:
            address
            card_pointer
            header
            state
Outputs:
            - None -
Global Data:
            - status_flags -
Functions Referenced:
            memory_card_read()
Abstract:
****************************************************************************/

void init_file(int address, LOOKUP_TABLE_UNION *header,
    LOOKUP_TABLE_UNION *next_header, STATE_TABLE_TYPE *state)
{
    CARD_HEADER_TYPE *card_pointer;     /* Local pointer to card header */
    PPI3_REG_TYPE *discrete_pointer;    /* Local pointer to discretes */
    int i = 0;                          /* Loop counter */
    int file_size = 0;                  /* Size of the current file */
    int another_card = YES;             /* Another memory card exists */
    int identifier;

    discrete_pointer = (PPI3_REG_TYPE *) &PPI3;

    /* Transfer in next possible files lookup_table */
    file_size = (header->structure.File_Size_MSW << 16)
        + header->structure.File_Size_LSW;

    /* Add size in words to address next file header */
    state->next_file_address = address + ((file_size + 1) >> 1);
    for(i = 0; i < SIZE_LOOKUP_TABLE; i++)
        next_header->array[i] = memory_card_read(state->next_file_address++);

    /*  Check if the current file is the last on the card. */
    if(next_header->array[0] == NO_FILE)
    {
        /*  If either memory card is set for uploading or verifying, or
            if the process flag is not set to UPLOADING, then check if more
            files are to be uploaded or verified, or read the next header.
        */
        if (((state->card_0_to_upload || state->card_1_to_upload) &&
            (state->process == UPLOADING)) ||
            ((state->card_0_to_verify || state->card_1_to_verify) &&
            (state->process == VERIFYING)))
        {
            /* Current card's Platform ID */
            identifier = card_pointer->Platform_ID;

            /* Current memory card is 0 ,check if memory card 1 exists.
            */
            if (address < MEMORY_CARD_1)
            {
                if (status_flags.Library_Card_1)
                    card_pointer = (CARD_HEADER_TYPE *)HEADER1_BUFFER;
                else
                    another_card = NO;
            }
            /* Current memory card is 1 ,check if memory card 0 exists.
            */
            else if (status_flags.Library_Card_0)
                    card_pointer = (CARD_HEADER_TYPE *)HEADER0_BUFFER;
                else
```

```
                another_card = NO;

            /*  If the memory card number for the other memory card is not
                the next number in sequence in the other card's card header,
                or if the ID of other card does not match the aircraft ID,
                then clear both memory cards' upload or verify flags.
            */
            if ((another_card = NO) ||
                ((state->card_number + 1) !=  -
                              (card_pointer->Memory_Card_Sequence)) ||
                ((card_pointer->Platform_ID) != (identifier)))
            {
                /*  If the process flag is set to UPLOADING then clear both
                    memory cards' upload flags; otherwise, clear both memory
                    cards' verify flags.
                */
                if (state->process == UPLOADING)
                {
                      state->card_0_to_upload = NO;
                      state->card_1_to_upload = NO;
                }
                else
                {
                      state->card_0_to_verify = NO;
                      state->card_1_to_verify = NO;
                }
            }
            else
            {
                /*  Initialize the next file's address.
                */
                state->next_file_address = state->another_card_address
                      + SIZE_CARD_HEADER;

                /*  Read the next file's lookup table.
                */
                for(i = 0; i < SIZE_LOOKUP_TABLE; i++)
                      next_header->array[i] =
                                  memory_card_read(state->next_file_address++);
            }
      }
}
/*  If the process flag is set to UPLOADING then check if the upload flag
    should be cleared.
*/
if (state->process == UPLOADING)
{
      /*  If neither memory card is set for uploading or the file type
          of the target system is SINGLE or SEQUENTIAL then clear
          the upload flag.

      */
      if ((!state->card_0_to_upload && !state->card_1_to_upload) ||
                  (header->structure.File_Type == SINGLE_FILE) ||
                  (header->structure.File_Type == SEQUENTIAL_FILE))
                  state->another_upload = NO;
      else
      {
            /*  If there is an inconsistancy in the RT address or the
                primary bus, then if uploading clear the upload flag.
            */
            if ((header->structure.RT_Address !=
                      next_header->structure.RT_Address) ||
                  (header->structure.Primary_Bus !=
                      next_header->structure.Primary_Bus))
                                  state->another_upload = NO;

            /*  If the file type of the target system is SIMULTANEOUS
                and if there is an inconsistancy in the setting of either
                file's enable flag, then clear the upload flag.
            */
            else if (header->structure.File_Type == SIMULTANEOUS_FILE)
                      if (header->structure.Disc_Enable !=
                            next_header->structure.Disc_Enable)
                                  state->another_upload = NO;
      }
}
else        /* Must be verifying */
{
      /*  If neither memory card is set for verifying or the file type
          of the target system is SINGLE then clear the verify flag.
      */
```

```
        if((!state->card_0_to_verify && !state->card_1_to_verify) ||
             (header->structure.File_Type == SINGLE_FILE))
             state->another_verify = NO;
        else
             /*  If there is an inconsistancy in the RT address or the
                 primary bus clear the verify flag.
             */
             if ((header->structure.RT_Address !=
                           next_header->structure.RT_Address)  ||
                   (header->structure.Primary_Bus !=
                          next_header->structure.Primary_Bus))
                                      state->another_verify = NO;
             /*  If the file type of the target system is SEQUENTIAL
                 then clear the verify flag and check for further uploads.
             */
             else
                   if (header->structure.File_Type == SEQUENTIAL_FILE)
                   {
                         state->another_verify = NO;

                         /*  If uploading set the upload flag.
                         */
                         if (status_flags.UPLOAD)
                               state->another_upload = YES;
                   }

                   /*  If the file type of the target system is SIMULTANEOUS
                       and if there is an inconsistancy in the setting of either
                       file's enable flag, then clear the verify flag and check
                       for further uploading.
                   */
                   else if (header->structure.File_Type == SIMULTANEOUS_FILE)
                         if ((header->structure.Disc_Enable !=
                                     next_header->structure.Disc_Enable))
                               state->another_verify = NO;
    }

    return;
}


/*****************************************************************************
Include File Name:    protob.h
Number/Version:
History:

            Date         Rev   Author            Description
            22-Mar-1993  0.0   C. Houlberg       Baseline
Abstract:

*****************************************************************************

/*    Function prototypes
*/
int protocol_b(int address, int automode);
int upload_b(LOOKUP_TABLE_TYPE *header_pointer, int file_address);
int verify_b(LOOKUP_TABLE_TYPE *header_pointer, int file_address);
/* end */


/*****************************************************************************
Module Name:  protob.c
Number/Version:
History:

            Date         Rev   Author            Description
            22-Mar-1993  0.0   C. Houlberg       Baseline
Abstract:

            Implements appendix B of MIL-STD-2217 for
            Rapid Reprogramming Terminal use.
*****************************************************************************/

#include "rrt.h"                        /* RRT configuration */
#include "dsp.h"                        /* DSP definitions */
#include "system.h"                     /* System definitions */
#include "cardhdrs.h"                   /* Memory card header definitions */
#include "wordtype.h"                   /* Word definitions */
#include "display.h"                    /* LCD display definitions */
```

```
#include "timer.h"                          /* Timer definitions */
#include "error.h"                          /* Error definitions */
#include "initprot.h"                       /* Protocol state table def */
#include "msgs_b.h"                         /* Protocol B message definitions */
#include "protob.h"                         /* Protocol B definitions */

/**************************************************************************
Name:  protocol_b
Number/Version:
History:
            Date         Rev    Author          Description
            22-Mar-1993  0.0    C. Houlberg     Baseline

Inputs:
            address
            automode
Returns:
            0 for success
            non-zero error message for failure

Global Data:
            - None-

Functions Referenced:
            memory_card_read()
            LCD_display()
            msec_timer()
            activity_busy()
            memory_configuration_message()
            enter_load_message()
            exit_load_message()
            rrt_error_message()
            init_protocol()
            upload_b()
            verify_b()
Abstract:
            Implements appendix B of MIL-STD-2217
**************************************************************************/
int protocol_b(int address, int automode)
{
      LOOKUP_TABLE_UNION header;
      LOOKUP_TABLE_UNION *header_union;
      LOOKUP_TABLE_UNION next_header;
      LOOKUP_TABLE_UNION *next_header_union;
      STATE_TABLE_TYPE state_table;
      STATE_TABLE_TYPE *state;
      PPI3_REG_TYPE *switch_status;            /* Switch status pointer */
      int first_file, file_address;
      int return_word, return_message[3];
      int delay, data_word;
      int match, load_file;
      int file_size, restart_count, i;
      int temp, error_count;
      char ascii_string[13];

      TIMER_REG_TYPE *timer;        /* Pointer to timer counter register */
      timer = (TIMER_REG_TYPE *) &TIMER0;
      switch_status = (PPI3_REG_TYPE *) &PPI3;

      state = &state_table;
      header_union = &header;
      next_header_union = &next_header;

      /*  The following function is used by this protocol to establish
            the initial value of the variables:
                  state->another_upload,
                  state->another_verify,
      */
      return_word = init_protocol(address, state);

      while((state->another_upload || state->another_verify) && !return_word)
      {
            /* First file load is preceded by enter load reprogram
                  control message */
            first_file = YES;
            /* Set up file address to point to lookup table */
            file_address = address;

            /* Read in file lookup table */
            for(i = 0; i < SIZE_LOOKUP_TABLE; i++)
                  header_union->array[i] = memory_card_read(file_address++);
```

```
/* Establish delay between messages */
delay = header_union->structure.Delay;

/* Process indication for init_file() */
state->process = UPLOADING;

while((state->another_upload) && !return_word)
{
      /* Form filename */
      for(i = 0; i < 6; i++)
      {
            ascii_string[i+i] = (char) (0xff & header_union->array[i]);
            ascii_string[i+i+1] = (char)
                  (0xff & (header_union->array[i] >> 8));
      }
      ascii_string[12] = 0;              /* End of string indicator */
      /* Display filename */
      LCD_display(START_LINE1 + 7, &ascii_string[0]);

      /* Do first file operations */
      if(first_file)
      {                       /* Check for memory configuration message usage */
            if(header_union->structure.Use_Memory_Config_Msg)
            {
                  /* Check if activity busy */
                  return_word = activity_busy(
                        (LOOKUP_TABLE_TYPE *)header_union, &return_message[0]);

                  /* Delay next message */
                  msec_timer(delay, timer);

                  if(!(return_word))
                  {
                        /* Get memory configuration */
                        return_word = memory_configuration_message(
                              (LOOKUP_TABLE_TYPE *)header_union,
                              &return_message[0]);

                        /* Delay next message */
                        msec_timer(delay, timer);
                  }

                  if(!(return_word))
                  {
                        /* Check configuration */
                        switch (header_union->structure.Memory_Word_Usage)
                        {
                              case CHECK_WORD_1:            /* Test word #1 */
                                    data_word =
                                          header_union->structure.Memory_Config_1;
                                    if(data_word == return_message[1])
                                          match = YES;
                                    else
                                          match = NO;
                                    break;
                              case CHECK_WORD_2:            /* Test word #2 */
                                    data_word =
                                          header_union->structure.Memory_Config_2;
                                    if(data_word == return_message[2])
                                          match = YES;
                                    else
                                          match = NO;
                                    break;
                              case CHECK_BOTH_WORDS:  /* Test word #1 and #2 */
                                    data_word =
                                          header_union->structure.Memory_Config_1;
                                    if(data_word != return_message[1])
                                    {
                                          match = NO;
                                          break;
                                    }
                                    data_word =
                                          header_union->structure.Memory_Config_2;
                                    if(data_word == return_message[2])
                                          match = YES;
                                    else
                                          match = NO;
                                    break;
                        }
                  }

                  if(match && !return_word)
                  {
```

```
                        /* Display configuration */
                        LCD_display(START_LINE2, "CFG:");
                        ascii_conversion(return_message[1], &ascii_string[0]);
                        LCD_display(START_LINE2 + 5, &ascii_string[0]);
                        LCD_display(START_LINE2 + 9, " ");
                        ascii_conversion(return_message[2], &ascii_string[0]);
                        LCD_display(START_LINE2 + 10, &ascii_string[0]);

                        /* Allow time for viewing configuration */
                        if(automode)
                        {
                              timer->Timer_Counter = SEC1;
                              while(timer->Timer_Counter);
                              return NO_ERROR;
                        }

                        LCD_display(START_LINE2 + 15, "LOAD?");

                        /* Wait for switch closure */
                        while((switch_status->Not_Execute)
                                    && (switch_status->Not_Skip));
                        if(!(switch_status->Not_Execute))   /* Skip the load */
                              load_file = YES;
                        else
                              load_file = NO;

                        /* Allow time for switch to settle open */
                        timer->Timer_Counter = SETTLE_TIME;
                        while(timer->Timer_Counter)
                              /* Make sure switch is open */
                              if(!(switch_status->Not_Execute)
                                    || !(switch_status->Not_Skip))
                                    timer->Timer_Counter = SETTLE_TIME;

                        if(!(load_file))
                              return NO_ERROR;

                        /* Clear end of LCD display for load routine */
                        LCD_display(START_LINE2 + 15, "\t");
                  }
            }

            if(!(return_word))
            {
                  /* Check if activity busy */
                  return_word = activity_busy((LOOKUP_TABLE_TYPE *)
                        header_union, &return_message[0]);

                  /* Delay next message */
                  msec_timer(delay, timer);
            }
      }

      if(!(return_word))
      {
            /* Send the Enter Load message */
            return_word = enter_load_message(
                  (LOOKUP_TABLE_TYPE *)header_union);

            /* Delay next message */
            msec_timer(delay, timer);
      }
      /*    The following function is used here by this protocol to
            establish or update the value of the variables:
                  state->another_upload,
                  state->next_file_address.
            Variable established locally and used by this function is:
                  state->process = UPLOADING.
      */
      if(!(return_word))
      {
            init_file(file_address, header_union,
                  next_header_union, state);

            /* Load the data */
            error_count = header_union->structure.Manual_Error_Count;
            do                                  /* do while command combination */
            {
                  /* Display Load message */
                  LCD_display(START_LINE2, "Uploading\t");
```

```
                return_word = upload_b((LOOKUP_TABLE_TYPE *)header_union,
                    file_address);

                if(return_word == (ERROR_CODE + RESTART))
                {
                    LCD_display(START_LINE2, "Error: EXEC Restart?");
                    /* Wait for switch closure */
                    while((switch_status->Not_Execute)
                        && (switch_status->Not_Skip));
                    if(!(switch_status->Not_Execute) && error_count--)
                    {
                        temp = rrt_error_message(
                            (LOOKUP_TABLE_TYPE *)header_union,
                            RESTART_ACTION);
                        if(temp)
                            return_word = temp;
                        else
                            LCD_display(START_LINE2,
                                "Restarting Load\t");
                    }
                    else
                        return_word = (ERROR_CODE + ABORT);

                    /* Allow time for switch to settle. */
                    timer->Timer_Counter = SETTLE_TIME;
                    while(timer->Timer_Counter)
                        /* Make sure switch is open */
                        if(!(switch_status->Not_Execute)
                            || !(switch_status->Not_Skip))
                            timer->Timer_Counter = SETTLE_TIME;
                }
            }while(return_word == (ERROR_CODE + RESTART));
        }

        /* Test for the occurrence of an ABORT */
        if(return_word == (ERROR_CODE + ABORT))
        {
            return_word = rrt_error_message(
                (LOOKUP_TABLE_TYPE *)header_union, ABORT_ACTION);
            return_word = ABORT_OCCURRED;
        }

        if(!(return_word))
        {
            return_word = exit_load_message(
                (LOOKUP_TABLE_TYPE *)header_union);

            /* Delay for verify or next possible load */
            msec_timer(delay, timer);

        }

        if(!(return_word))
            if(state->another_upload)
            {
                /* Clear first file indication */
                first_file = NO;

                /* Make address of next file the current file address,
                    skips lookup table. */
                file_address = state->next_file_address;

                /* Move next header to current header location */
                for(i = 0; i < SIZE_LOOKUP_TABLE; i++)
                    header_union->array[i] = next_header_union->array[i];
            }
            else
                /* Indicate load done */
                LCD_display(START_LINE2, "Upload Done\t");
    }

    if(!(return_word))
    {
        /* First file verify is preceded by enter verify
            reprogram control message */
        first_file = YES;
        /* Set up file address to point to lookup table */
        file_address = address;

        /* Read in file lookup table */
        for(i = 0; i < SIZE_LOOKUP_TABLE; i++)
            header_union->array[i] = memory_card_read(file_address++);
```

```
        /* Process indication for init_file() */
        state->process = VERIFYING;
}

while((state->another_verify) && !return_word)
{
        /* Form filename */
        for(i = 0; i < 6; i++)
        {
                ascii_string[i+i] = (char) (0xff & header_union->array[i]);
                ascii_string[i+i+1] = (char)
                        (0xff & (header_union->array[i] >> 8));
        }
        ascii_string[12] = 0;                   /* End of string indicator */
        /* Display filename */
        LCD_display(START_LINE1 + 7, &ascii_string[0]);

        /* Check if activity busy */
        return_word = activity_busy(
                (LOOKUP_TABLE_TYPE *)header_union, &return_message[0]);

        /* Delay next message */
        msec_timer(delay, timer);

        if(!(return_word))
        {
                /* Send the Enter Verify message */
                return_word = enter_verify_message(
                        (LOOKUP_TABLE_TYPE *)header_union);

                /* Delay next message */
                msec_timer(delay, timer);
        }

        /*      The following function is used here by this protocol to
                establish or update the value of the variables:
                        state->another_upload,
                        state->another_verify,
                        state->next_file_address.
                Variable established locally and used by this function is:
                        state->process = VERIFYING.
        */
        if(!(return_word))
        {
                init_file(file_address, header_union,
                        next_header_union, state);

                /* Verify the data */
                error_count = header_union->structure.Manual_Error_Count;
                do                              /* do while command combination */
                {
                        /* Test if loading Memory Card */
                        if(status_flags.DOWNLOAD)
                                /* Display Download message */
                                LCD_display(START_LINE2, "Download\t");
                        else
                                /* Display Verify message */
                                LCD_display(START_LINE2, "Verifying\t");

                        return_word = verify_b((LOOKUP_TABLE_TYPE *)header_union,
                                file_address);

                        if(return_word == (ERROR_CODE + RESTART))
                        {
                                LCD_display(START_LINE2,
                                        "Error: EXEC Restart?");
                                /* Wait for switch closure */
                                while((switch_status->Not_Execute)
                                        && (switch_status->Not_Skip));
                                if(!(switch_status->Not_Execute) && error_count--)
                                {
                                        temp = rrt_error_message(
                                                (LOOKUP_TABLE_TYPE *)header_union,
                                                RESTART_ACTION);
                                        if(temp)
                                                return_word = temp;
                                        else
                                                LCD_display(START_LINE2,
                                                        "Restarting Verify\t");
                                }
                                else
                                        return_word = (ERROR_CODE + ABORT);
```

```
                    /* Allow time for switch to settle. */
                    timer->Timer_Counter = SETTLE_TIME;
                    while(timer->Timer_Counter)
                          /* Make sure switch is open */
                          if(!(switch_status->Not_Execute)
                                || !(switch_status->Not_Skip))
                                timer->Timer_Counter = SETTLE_TIME;
                    LCD_display(START_LINE2 + 12, "\t");
                }
            }while(return_word == (ERROR_CODE + RESTART));
        }

        /* Test for the occurrence of an ABORT */
        if(return_word == (ERROR_CODE + ABORT))
        {
              return_word = rrt_error_message(
                    (LOOKUP_TABLE_TYPE *)header_union, ABORT_ACTION);
              return_word = ABORT_OCCURRED;
        }

        if(!(return_word))
        {
              /* Send the Exit verify message */
              return_word = exit_verify_message(
                    (LOOKUP_TABLE_TYPE *)header_union);

              /* Delay next message */
              msec_timer(delay, timer);
        }

        if(!(return_word))
              if(state->another_verify)
              {
                    /* Make address of next file the current file address,
                          skips lookup table. */
                    file_address = state->next_file_address;

                    /* Move next header to current header location */
                    for(i = 0; i < SIZE_LOOKUP_TABLE; i++)
                          header_union->array[i] = next_header_union->array[i];
              }
              else
              {
                    /* Test if loaded Memory Card */
                    if(status_flags.DOWNLOAD)
                          /* Display Download complete indication */
                          LCD_display(START_LINE2, "Download Done\t");
                    else
                          /* Display Verify complete indication */
                          LCD_display(START_LINE2, "Data Verified\t");
              }
    }

    /* Update address to location of next lookup table */
    address = state->next_file_address - SIZE_LOOKUP_TABLE;
  }

  return return_word;
}

/**************************************************************************
Name:  upload_b
Number/Version:
History:
            Date          Rev   Author          Description
            22-Mar-1993   0.0   C. Houlberg     Baseline

Inputs:
            header_pointer
            file_address
Returns:
            0 for success
            non-zero error message for failure

Global Data:
            - None-

Functions Referenced:
            header_message()
            test_busy_status()
            memory_data_load_message()
            trailer_message()
```

```
        ascii_conversion()
        LCD_display()
        msec_timer()

Abstract:

*****************************************************************************/
int upload_b(LOOKUP_TABLE_TYPE *header_pointer, int file_address)
{
    HEADER_WORD_TYPE *header;           /* Pointer to header message data */
    TIMER_REG_TYPE *timer;              /* Pointer to timer counter register */
    PPI3_REG_TYPE *switch_status;       /* Switch status pointer */
    int i, file_size;
    int data_word_count, data_amount;
    int data_location;
    int transfer_mode, header_type;
    int buffer_xfer_count;
    int load_address;
    int transfer_count, transfer_amount;
    int message_amount;
    int return_word = NO_ERROR;
    int message[33];
    int error_count;
    int delay, word;
    int checksum_adjustment;
    char ascii_string[5];

    timer = (TIMER_REG_TYPE *) &TIMER0;
    switch_status = (PPI3_REG_TYPE *) &PPI3;

    /* Header message data word 1 pointer */
    header = (HEADER_WORD_TYPE *) &message[1];

    /* Establish delay between messages */
    delay = header_pointer->Delay;

    /* File size measured in bytes */
    file_size = (header_pointer->File_Size_MSW << 16)
        + header_pointer->File_Size_LSW;

    /* Initialize data counter */
    data_word_count = (file_size + 1) >> 1;

    /* Transfer data */
    error_count = header_pointer->Manual_Error_Count;
    while(data_word_count && !(return_word))        /* Transfer all data */
    {
        /* Initialize location of data to transfer */
        data_location = file_address;

        /* Filter out all transactions with
            undefined or reserved header types */
        do
        {
            /* Gather header data words */
            for(i = 1; i <= 4; i++)
                message[i] = memory_card_read(data_location++);

            header_type = header->Header_Type;
            if((header_type == UNDEFINED_TYPE) ||
                (header_type == RESERVED_TYPE))
            {
                data_location += 2;     /* Skip Trailer to next header */
                data_word_count -= 6;   /* Subtract null transaction */
            }

        } while((header_type == UNDEFINED_TYPE)
            || (header_type == RESERVED_TYPE));

        /* Extract remaining load descriptors */
        transfer_mode = header->Transfer_Mode;
        buffer_xfer_count = header->Buffer_Xfer_Count;
        load_address = message[2];

        /* Display page number for transaction */
        ascii_conversion((message[4] >> 3), &ascii_string[0]);
        LCD_display(START_LINE2 + 16, &ascii_string[0]);

        /* Acount for maximum buffer count */
        if(transfer_mode && !buffer_xfer_count)
            buffer_xfer_count = MAX_BUFFER_COUNT;
```

```
            /* Determine data count */
            switch (header_type)
            {
                  case WORD_COUNT:
                        transfer_count = buffer_xfer_count;
                        break;
                  case MESSAGE_COUNT:
                        transfer_count = buffer_xfer_count << 5;
                        break;
                  default:
                        return_word = HEADER_TYPE;
            }
            /* Acount for no transfer, byte transfers, and header & trailer data */
            if(transfer_mode == NO_XFER)
            {
                  transfer_count = 0;
                  data_amount = 6;
            }
            else if(transfer_mode == BYTE_XFER)
                  data_amount = ((transfer_count + 1) >> 1) + 6;  /* Bytes packed */
            else
                  data_amount = transfer_count + 6;

            /* Ensure Transfer Control agrees with transfer_count */
            if(((message[4] & TC_MASK) == LAST_TRANSACTION)
                  && (data_amount != data_word_count))
                  return_word = TC_ERROR;

            /* Ensure data amount transferring does
                  not exceed data left to transfer */
            if(data_amount > data_word_count)
                  return_word = DATA_COUNT_ERROR;

            /* Acount for verify following load in Transfer Control bits */
            if(header_pointer->Verify_After_Load)
            {
                  checksum_adjustment = ANOTHER_TRANSACTION - (message[4] & TC_MASK);
                  message[4] = (message[4] & ~TC_MASK) + ANOTHER_TRANSACTION;
            }
            else
                  checksum_adjustment = 0;

            if(!(return_word))
            {
                  /* Send the Header message */
                  return_word = header_message(header_pointer, &message[0]);

                  /* Delay next message */
                  msec_timer(delay, timer);
            }
/* Send the Data Load messages */
transfer_amount = transfer_count;
while(transfer_count && !(return_word))
{
      /* Check for RT busy if status busy bit is not usable */
      if(header_pointer->Status_Busy_Not_Usable)
            return_word = test_busy_status(header_pointer);

      /* Load data if no error detected */
      if(!(return_word))
      {
            message_amount = 32;          /* Maximum words per message */
            if(message_amount > transfer_count)
            {                             /* Fewer words left to send */
                  message_amount = transfer_count;    /* Amount sending */
                  transfer_count = 0;
            }
            else                          /* Count of words left */
                  transfer_count -= message_amount;

            /* Ready data for transfer, command inserted later */
            for(i = 1; i <= message_amount; i++)
            {
                  word = memory_card_read(data_location++);
                  if(transfer_mode == BYTE_XFER)
                  {                             /* 8 bit transfer */
                        message[i++] = 0xff & word;
                        if(i <= message_amount)
                              message[i] = 0xff & (word >> 8);
                  }
                  else                                /* 16 or 32 bit transfer */
```

```
                message[i] = word;
            }

            /* Display address for block of data */
            ascii_conversion(load_address + transfer_amount
                - (transfer_count + message_amount), &ascii_string[0]);
            LCD_display(START_LINE2 + 11, &ascii_string[0]);

            return_word = memory_data_load_message(header_pointer,
                &message[0], message_amount);

            /* Delay next message */
            msec_timer(delay, timer);
        }
    }

    /* Check for RT busy if status busy bit is not usable */
    if(header_pointer->Status_Busy_Not_Usable && !(return_word))
        return_word = test_busy_status(header_pointer);

    if(!(return_word))
    {
        for(i = 1; i <= 2; i++)
            message[i] = memory_card_read(data_location++);

        /* Adjust checksum if necessary */
            message[2] = 0xffff & (message[2] + checksum_adjustment);

            /* Send the trailer message */
            return_word = trailer_message(header_pointer, &message[0]);

            /* Delay next message */
            msec_timer(delay, timer);
        }

        /* Check for RT busy if status busy bit is not usable */
        if(header_pointer->Status_Busy_Not_Usable && !(return_word))
            return_word = test_busy_status(header_pointer);

        switch (return_word)
        {
            case (NO_ERROR):
                file_address = data_location;
                data_word_count -= data_amount;
                break;
            case (ERROR_CODE + AUTO_RETRY):
                if(error_count)
                {
                    --error_count;                    /* Decrement error count */
                    return_word = rrt_error_message(
                        header_pointer, TRANSACTION);
                    break;
                }
            case (ERROR_CODE + RETRY):
                LCD_display(START_LINE2, "Error: EXEC Retry?\t");
                /* Wait for switch closure */
                while((switch_status->Not_Execute)
                    && (switch_status->Not_Skip));
                if(!(switch_status->Not_Execute))
                {
                    /* Reset error count */
                    error_count = header_pointer->Manual_Error_Count;
                    return_word = rrt_error_message(
                        header_pointer, TRANSACTION);
                    if(!(return_word))
                        LCD_display(START_LINE2, "Retrying Load\t");
                }
                else
                    return_word = (ERROR_CODE + ABORT);

                /* Allow time for switch to settle. */
                timer->Timer_Counter = SETTLE_TIME;
                while(timer->Timer_Counter)
                    /* Make sure switch is open */
                    if(!(switch_status->Not_Execute)
                        || !(switch_status->Not_Skip))
                        timer->Timer_Counter = SETTLE_TIME;
                LCD_display(START_LINE2, "Retrying\t");
                break;
        }
    }

    /* Return status of load */
```

```
    return return_word;                                   /* Load completed */
}

/*****************************************************************************
Name:  verify_b
Number/Version:
History:
            Date        Re    Author          Description
            22-Mar-1993 0.0   C. Houlberg     Baseline

Inputs:
            header_pointer
            file_address
Returns:
            0 for success
            non-zero error message for failure

Global Data:
            - None-

Functions Referenced:
            header_message()
            test_busy_status()
            memory_data_verify_message()
            trailer_message()
            ascii_conversion()
            LCD_display()
            msec_timer()

Abstract:
            Verifies data
*****************************************************************************/
int verify_b(LOOKUP_TABLE_TYPE *header_pointer, int file_address)
{
    HEADER_WORD_TYPE *header;             /* Pointer to header message data */
    TIMER_REG_TYPE *timer;                /* Pointer to timer counter register */
    PPI3_REG_TYPE *switch_status;         /* Switch status pointer */
    int i, file_size;
    int data_word_count, data_amount;
    int data_location;
    int transfer_mode, header_type;
    int buffer_xfer_count;
    int load_address;
    int transfer_count, transfer_amount;
    int message_amount;
    int return_word = NO_ERROR;
    int message[33];
    int checksum;
    int error_count;
    int delay, word;
    char ascii_string[5];

    timer = (TIMER_REG_TYPE *) &TIMER0;
    switch_status = (PPI3_REG_TYPE *) &PPI3;

    /* Header message data word 1 pointer */
    header = (HEADER_WORD_TYPE *) &message[1];
    /* Establish delay between messages */
    delay = header_pointer->Delay;

    /* File size measured in bytes */
    file_size = (header_pointer->File_Size_MSW << 16)
          + header_pointer->File_Size_LSW;

    /* Initialize data counter */
    data_word_count = (file_size + 1) >> 1;

    /* Transfer data */
    error_count = header_pointer->Manual_Error_Count;
    while(data_word_count && !(return_word))  /* Transfer all data */
    {
          checksum = 0;                       /* Clear the checksum */

          /* Initialize location of data to transfer */
          data_location = file_address;

          /* Filter out all transactions with
               undefined or reserved header types */
          do
          {
               /* Gather header data words */
               for(i = 1; i <= 4; i++)
               {
```

```
            message[i] = memory_card_read(data_location++);
            checksum += message[i];
        }

        header_type = header->Header_Type;
        if((header_type == UNDEFINED_TYPE) ||
            (header_type == RESERVED_TYPE))
        {
            checksum = 0;                   /* Start checksum over */
            data_location += 2;     /* Skip Trailer to next header */
            data_word_count -= 6;   /* Subtract null transaction */
        }

} while((header_type == UNDEFINED_TYPE)
     || (header_type == RESERVED_TYPE));

/* Extract load descriptors */
transfer_mode = header->Transfer_Mode;
buffer_xfer_count = header->Buffer_Xfer_Count;
load_address = message[2];

/* Display page number for transaction */
ascii_conversion((message[4] >> 3), &ascii_string[0]);
LCD_display(START_LINE2 + 16, &ascii_string[0]);

/* Acount for maximum buffer count */
if(transfer_mode && !buffer_xfer_count)
      buffer_xfer_count = MAX_BUFFER_COUNT;

/* Determine data count */
switch (header_type)
      {
            case WORD_COUNT:
                  transfer_count = buffer_xfer_count;
                  break;
            case MESSAGE_COUNT:
                  transfer_count = buffer_xfer_count << 5;
                  break;
            default:
                  return_word = HEADER_TYPE;
      }

      /* Acount for no transfer, byte transfers, and header & trailer data */
      if(transfer_mode == NO_XFER)
      {
            transfer_count = 0;
            data_amount = 6;
      }
      else if(transfer_mode == BYTE_XFER)
            data_amount = ((transfer_count + 1) >> 1) + 6;  /* Bytes packed */
      else
            data_amount = transfer_count + 6;

      /* Ensure Transfer Control agrees with transfer_count */
      if(((message[4] & TC_MASK) == LAST_TRANSACTION)
            && (data_amount != data_word_count))
            return_word = TC_ERROR;

      /* Ensure data amount transferring does
            not exceed data left to transfer */
      if(data_amount > data_word_count)
            return_word = DATA_COUNT_ERROR;

      if(!(return_word))
      {
            /* Send the Header message */
            return_word = header_message(header_pointer, &message[0]);

            /* Delay next message */
            msec_timer(delay, timer);
      }

      /* Send the Data Verify messages */
      transfer_amount = transfer_count;
      while(transfer_count && !(return_word))
      {
            /* Check for RT busy if status busy bit is not usable */
            if(header_pointer->Status_Busy_Not_Usable)
                  return_word = test_busy_status(header_pointer);

            /* Load data if no error detected */
            if(!(return_word))
```

```
                {
                        message_amount = 32;            /* Maximum words per message */
                        if(message_amount > transfer_count)
                        {
                                message_amount = transfer_count;   /* Amount sending */
                                transfer_count = 0;         /* Count of words left */
                }
                else                                    /* Count of words left */
                        transfer_count -= message_amount;

                /* Display address for block of data */
                ascii_conversion(load_address + transfer_amount
                        - (transfer_count + message_amount), &ascii_string[0]);
                LCD_display(START_LINE2 + 11, &ascii_string[0]);

                return_word = memory_data_verify_message(header_pointer,
                        &message[0], message_amount);

                /* Delay next message */
                msec_timer(delay, timer);

                if(!(return_word))
                {
                        /* Set up data to store or verify */
                        for(i = 1; (i <= message_amount) && !return_word;
                                i++, data_location++)
                        {
                                if(transfer_mode == BYTE_XFER)
                                {       /* 8-bit transfer */
                                        word = 0xff & message[i];
                                        checksum += message[i++];
                                        if(i <= message_amount)
                                        {
                                                word += ((0xff & message[i]) << 8);
                                                checksum += message[i];
                                        }
                                }
                                else
                                {
                                        word = message[i];
                                        checksum += message[i];
                                }

                                /* Test if downloading to Memory Card */
                                if(status_flags.DOWNLOAD)
                                {                       /* Store data in Memory Card */
                                        return_word = memory_card_write(data_location,
                                                word);
                                }
                                else                    /* Verify data with Memory Card */
                                {
                                        if(word != memory_card_read(data_location))
                                                return_word = VERIFY_ERROR
                                                        + load_address + transfer_amount
                                                        - (transfer_count + message_amount)
                                                        + i - 2;
                                }
                        }
                }
        }
}

/* Check for RT busy if status busy bit is not usable */
if(header_pointer->Status_Busy_Not_Usable && !(return_word))
        return_word = test_busy_status(header_pointer);

if(!(return_word))
{
        /* Set up data for trailer message */
        message[1] = memory_card_read(data_location++);
        checksum = 0xffff & (checksum + message[1]);
        message[2] = checksum;

        /* Test if downloading to Memory Card */
        if(status_flags.DOWNLOAD)
                return_word = memory_card_write(data_location, checksum);
        else                    /* Verify checksum with Memory Card */
                if(checksum != memory_card_read(data_location))
                        return_word = CHECKSUM_ERROR;

        /* Keep data location in step for next transaction */
        data_location++;
```

```
            }
            if(!(return_word))
            {
                  /* Send the Trailer message (end verify) */
                  return_word = trailer_message(header_pointer, &message[0]);

                  /* Delay next message */
                  msec_timer(delay, timer);
            }

            /* Check for RT busy if status busy bit is not usable */
            if(header_pointer->Status_Busy_Not_Usable && !(return_word))
                  return_word = test_busy_status(header_pointer);

            switch (return_word)
            {
                  case (NO_ERROR):
                        file_address = data_location;
                        data_word_count -= data_amount;
                        break;
                  case (ERROR_CODE + AUTO_RETRY):
                        if(error_count)
                        {
                              --error_count;                    /* Decrement error count */
                              return_word = rrt_error_message(
                                    header_pointer, TRANSACTION);
                              break;
                        }
                  case (ERROR_CODE + RETRY):
                        LCD_display(START_LINE2, "Error: EXEC Retry?\t");
                        /* Wait for switch closure */
                        while((switch_status->Not_Execute)
                              && (switch_status->Not_Skip));
                        if(!(switch_status->Not_Execute))
                        {
                              /* Reset error count */
                              error_count = header_pointer->Manual_Error_Count;
                              return_word = rrt_error_message(
                                    header_pointer, TRANSACTION);
                              if(!(return_word))
                                    if(status_flags.DOWNLOAD)
                                          LCD_display(START_LINE2,
                                                "Retrying Download\t");
                                    else
                                          LCD_display(START_LINE2,
                                                "Retrying Verify\t");
                        }
                        else
                              return_word = (ERROR_CODE + ABORT);

                        /* Allow time for switch to settle. */
                        timer->Timer_Counter = SETTLE_TIME;
                        while(timer->Timer_Counter)
                              /* Make sure switch is open */
                              if(!(switch_status->Not_Execute)
                                    || !(switch_status->Not_Skip))
                                    timer->Timer_Counter = SETTLE_TIME;
                        LCD_display(START_LINE2, "Retrying\t");
                        break;
            }
      }

      /* Return status of verify */
      return return_word;                                     /* Verify completed */
}

/* end */

/*****************************************************************************
Include File Name:    msgs_b.h
Number/Version:
History:
          Date         Rev    Author           Description
          22-Mar-1993  0.0    C. Houlberg      Baseline

Abstract:
          This file contains define statements for setting the status word in
          protocol B.
*****************************************************************************/
```

```
/* Protocol B command definitions */
#define MEMORY_CONFIGURATION        0x0662
#define ENTER_LOAD                  0x03a4
#define HEADER                      0x0284
#define MEMORY_DATA_LOAD            0x15
#define TRAILER                     0x02c2
#define EXIT_LOAD                   0x03a4
#define ENTER_VERIFY                0x03a4
#define MEMORY_DATA_VERIFY          0x35
#define EXIT_VERIFY                 0x03a4
#define REPROGRAM_STATUS            0x06e1
#define RRT_ERROR                   0x02e1
/* Function prototypes */
int activity_busy(LOOKUP_TABLE_TYPE
     *lookup_table_pointer, int *message_pointer);
int activity_message(LOOKUP_TABLE_TYPE
     *lookup_table_pointer, int *message_pointer);
int memory_configuration_message(LOOKUP_TABLE_TYPE
     *lookup_table_pointer, int *message_pointer);
int enter_load_message(LOOKUP_TABLE_TYPE *lookup_table_pointer);
int header_message(LOOKUP_TABLE_TYPE *lookup_table_pointer,
     int *data_pointer);
int memory_data_load_message(LOOKUP_TABLE_TYPE *lookup_table_pointer,
     int *data_pointer, int amount);
int trailer_message(LOOKUP_TABLE_TYPE *lookup_table_pointer,
     int *data_pointer);
int exit_load_message(LOOKUP_TABLE_TYPE *lookup_table_pointer);
int enter_verify_message(LOOKUP_TABLE_TYPE *lookup_table_pointer);
int memory_data_verify_message(LOOKUP_TABLE_TYPE
     *lookup_table_pointer, int *message_pointer, int amount);
int exit_verify_message(LOOKUP_TABLE_TYPE *lookup_table_pointer);
int rrt_error_message(LOOKUP_TABLE_TYPE
     *lookup_table_pointer, int action);
int command_message(LOOKUP_TABLE_TYPE
     *lookup_table_pointer, int *send_message);
int test_busy_status(LOOKUP_TABLE_TYPE *lookup_table_pointer);
int service_message(LOOKUP_TABLE_TYPE *lookup_table_pointer,
     int request);
int reprogram_status_message(LOOKUP_TABLE_TYPE *lookup_table_pointer);

/* end */


/****************************************************************************
Module Name:   msgs_b.c
Number/Version:
History:
          Date          Rev    Author          Description
          22-Mar-1993   0.0    C. Houlberg     Baseline

Abstract:
          Impliments mesages fo appendix B of MIL-STD-2217.
          Data checksum used for HEADER, MEMORY DATA, and
               TRAILER messages in Protocol B
****************************************************************************/

#include "rrt.h"                         /* RRT configuration */
#include "dsp.h"                         /* DSP definitions */
#include "system.h"                      /* System definitions */
#include "cardhdrs.h"                    /* Memory Card header definitions */
#include "wordtype.h"                    /* MS1553 word definitions */
#include "ms1553.h"                      /* MS-1553 functions and definitions */
#include "timer.h"                       /* Time function definitions */
#include "error.h"                       /* Error definitions */
#include "display.h"                     /* LCD display definitions */
#include "msgs_b.h"                      /* Protocol B message definitions */

/****************************************************************************
Name:          activity_busy
Number/Version:
History:
          Date          Rev    Author          Description
          22-Mar-1993   0.0    C. Houlberg     Baseline

Inputs:
          lookup_table_pointer
          message_pointer
Outputs:
          return_word
Global Data:
          - None -
```

```
Functions Referenced:
            activity_message
Abstract:
            Impliments the activity busy for protocol B.
******************************************************************************/
int activity_busy(LOOKUP_TABLE_TYPE
      *lookup_table_pointer, int *message_pointer)
{
      int return_word;
      int i, count, delay;

      TIMER_REG_TYPE *timer;        /* Pointer to timer counter register */
      timer = (TIMER_REG_TYPE *) &TIMER0;

      /* Establish delay between messages */
      delay = lookup_table_pointer->Delay;

      /* Keep trying */
      count = lookup_table_pointer->Auto_Busy_Count;

      /* Test activity */
      return_word = activity_message(lookup_table_pointer,
            message_pointer);

      for(i = 0; (i < count) && (return_word == BUSY_CONDITION); i++)
      {
            msec_timer(delay, timer);     /* Delay next try */

            return_word = activity_message(lookup_table_pointer,
                  message_pointer);
      }

    return return_word;
}

/******************************************************************************
Name:       activity_message
Number/Version:
History:
            Date        Rev   Author          Description
            22-Mar-1993 0.0   C. Houlberg     Baseline

Inputs:
            lookup_table_pointer
            message_pointer
Outputs:
            return_word
Global Data:
            - None -
Functions Referenced:
            ms1553_receive
Abstract:
            Impliments the activity message for protocol B.
******************************************************************************/
int activity_message(LOOKUP_TABLE_TYPE
      *lookup_table_pointer, int *message_pointer)
{
      /*    This message will be utilizedby the BC (MLV) to determine whether
            the remote terminal is ready to receive data and will allow the RT
            to request to send information to the BC or receive information
            from the BC.
      */
      STATUS_WORD_TYPE *status_field;
      ACTIVITY_DATA_TYPE *data_field;
      int command;
      int return_word;

      /* Command for receiving status */
      command = ((lookup_table_pointer->RT_Address) << 11) + ACTIVITY;

      /* Check Status message for no timeout */
      return_word = ms1553_receive(&command, message_pointer);

      if(!return_word)
      {
            status_field = (STATUS_WORD_TYPE *) message_pointer;
            /* Check return address */
            if((status_field->Terminal_Address) !=
                              (lookup_table_pointer->RT_Address))
                  return_word = ADDRESS_ERROR;
            else
            {
```

```
                /* Check status and data words for busy */
                data_field = (ACTIVITY_DATA_TYPE *) (message_pointer + 1);
                if(!(status_field->Busy_Bit) && !(data_field->Busy_Bit))
                     return_word = NO_ERROR;                          /* Not busy */
                else
                     return_word = BUSY_CONDITION;   /* busy timeout */
           }
     }
     return return_word;
}

/******************************************************************************
Name:       memory_configuration_message
Number/Version:
History:
            Date         Rev   Author           Description
            22-Mar-1993  0.0   C. Houlberg      Baseline

Inputs:
            lookup_table_pointer
            message_pointer
Outputs:
            return_word
Global Data:
            - None -
Functions Referenced:
            ms1553_receive
Abstract:
            Impliments the memory configuration message for protocol B.
******************************************************************************/
int memory_configuration_message(LOOKUP_TABLE_TYPE
     *lookup_table_pointer, int *message_pointer)
{
     /*    This message is utilized to read the current memory configuration of
           the unit. This message is only used when its use is indicated in the
           Lookup Table.
     */
     STATUS_WORD_TYPE *word_field;
     int command, return_word;

     /* Memory configuration command */
     command = ((lookup_table_pointer->RT_Address) << 11)
           + MEMORY_CONFIGURATION;

     /* Get status and data words */
     return_word = ms1553_receive(&command, message_pointer);
     if(!return_word)
     {
           /* Check return address */
           word_field = (STATUS_WORD_TYPE *) message_pointer;
           if((word_field->Terminal_Address) != (lookup_table_pointer->RT_Address))
                return_word = ADDRESS_ERROR;        /* Address error */
     }
     return return_word;                                 /* Return MS-1553 error */
}

/******************************************************************************
Name:       enter_load_message
Number/Version:
History:
            Date         Rev   Author           Description
            22-Mar-1993  0.0   C. Houlberg      Baseline

Inputs:
            lookup_table_pointer
Outputs:
            return_word
Global Data:
            - None -
Functions Referenced:
            command_message
Abstract:
            Impliments the enter load message for protocol B.
******************************************************************************/
int enter_load_message(LOOKUP_TABLE_TYPE *lookup_table_pointer)
{
     int send_message[5];

     /* Reprogramming control message, enable programming */
     /* Command */
     send_message[0] = ((lookup_table_pointer->RT_Address) << 11) + ENTER_LOAD;
```

```
        /* Data */
        send_message[1] = lookup_table_pointer->RT_Nomenclature_MSW;
        send_message[2] = lookup_table_pointer->RT_Nomenclature_2SW;
        send_message[3] = lookup_table_pointer->RT_Nomenclature_LSW;
        send_message[4] = ((((((lookup_table_pointer->Fill_Data) << 2)
              + MEMORY_LOAD) << 2) + lookup_table_pointer->Disc_Enable) << 6);

        /* Send the message */
        return command_message(lookup_table_pointer, &send_message[0]);
}

/*****************************************************************************
Name:       header_message
Number/Version:
History:
            Date        Rev  Author         Description
            22-Mar-1993 0.0  C. Houlberg    Baseline

Inputs:
            lookup_table_pointer
                  data_pointer
Outputs:
            return_word
Global Data:
            - None -
Functions Referenced:
            command_message
Abstract:
            Impliments the header message for protocol B.
*****************************************************************************/
/* Keep track of checksum for all data words
*/
int header_message(LOOKUP_TABLE_TYPE *lookup_table_pointer, int *data_pointer)
{
      /* Command */
      *data_pointer = ((lookup_table_pointer->RT_Address) << 11) + HEADER;

      /* Send the message */
      return command_message(lookup_table_pointer, data_pointer);
}

/*****************************************************************************
Name:       memory_data_load_message
Number/Version:
History:
            Date        Rev  Author         Description
            22-Mar-1993 0.0  C. Houlberg    Baseline

Inputs:
            lookup_table_pointer
            data_pointer
            amount
Outputs:
            return_word
Global Data:
            - None -
Functions Referenced:
            command_message
Abstract:
            Impliments the memory data load message for protocol B.
*****************************************************************************/
/*
      amount = number of words to transfer
*/
int memory_data_load_message(LOOKUP_TABLE_TYPE
      *lookup_table_pointer, int *data_pointer, int amount)
{
      /*    This message is used to pass the data to be loaded into the
            unit memory.
      */
      /* Command */
      *data_pointer = ((lookup_table_pointer->RT_Address) << 11)
            + (MEMORY_DATA_LOAD << 5) + (0x1f & amount);

      /* Send the data */
      return command_message(lookup_table_pointer, data_pointer);
}

/*****************************************************************************
Name:       trailer_message
Number/Version:
History:
```

```
            Date          Rev   Author          Description
            22-Mar-1993 0.0   C. Houlberg      Baseline

Inputs:
            lookup_table_pointer
                 data_pointer
Outputs:
            return_word
Global Data:
            - None -
Functions Referenced:
            command_message
Abstract:
            Impliments the trailer message for protocol B.
******************************************************************************/
int trailer_message(LOOKUP_TABLE_TYPE *lookup_table_pointer, int *data_pointer)
{
     /* Command */
     *data_pointer = ((lookup_table_pointer->RT_Address) << 11) + TRAILER;

     /* Send the message */
     return command_message(lookup_table_pointer, data_pointer);
}

/******************************************************************************
Name:       exit_load_message
Number/Version:
History:
            Date          Rev   Author          Description
            22-Mar-1993 0.0   C. Houlberg      Baseline

Inputs:
            lookup_table_pointer
Outputs:
            return_word
Global Data:
            - None -
Functions Referenced:
            command_message
Abstract:
            Impliments the exit load message for protocol B.
******************************************************************************/
int exit_load_message(LOOKUP_TABLE_TYPE   *lookup_table_pointer)
{
     int send_message[5];

     /* Reprogramming control message, exit programming */
     /* Command */
     send_message[0] = ((lookup_table_pointer->RT_Address) << 11) + EXIT_LOAD;

     /* Data */
     send_message[1] = lookup_table_pointer->RT_Nomenclature_MSW;
     send_message[2] = lookup_table_pointer->RT_Nomenclature_2SW;
     send_message[3] = lookup_table_pointer->RT_Nomenclature_LSW;
     send_message[4] = ((((lookup_table_pointer->Fill_Data) << 6)
           + lookup_table_pointer->Disc_Disable) << 4);

     /* Send the message */
     return command_message(lookup_table_pointer, &send_message[0]);
}

/******************************************************************************
Name:       enter_verify_message
Number/Version:
History:
            Date          Rev   Author          Description
            22-Mar-1993 0.0   C. Houlberg      Baseline

Inputs:
            lookup_table_pointer
Outputs:
            return_word
Global Data:
            - None -
Functions Referenced:
            command_message
Abstract:
            Impliments the enter verify message for protocol B.
******************************************************************************/
int enter_verify_message(LOOKUP_TABLE_TYPE *lookup_table_pointer)
{
     int send_message[5];
```

```
    /* Verify control message, enable verify */
    /* Command */
    send_message[0] = ((lookup_table_pointer->RT_Address) << 11)
         + ENTER_VERIFY;

    /* Data */
    send_message[1] = lookup_table_pointer->RT_Nomenclature_MSW;
    send_message[2] = lookup_table_pointer->RT_Nomenclature_2SW;
    send_message[3] = lookup_table_pointer->RT_Nomenclature_LSW;
    send_message[4] = ((((lookup_table_pointer->Fill_Data) << 2)
                      + MEMORY_VERIFY) << 8);

    /* Send the message */
    return command_message(lookup_table_pointer, &send_message[0]);
}

/******************************************************************************
Name:       memory_data_verify_message
Number/Version:
History:
            Date        Rev   Author           Description
            22-Mar-1993 0.0   C. Houlberg      Baseline

Inputs:
            lookup_table_pointer
            message_pointer
            amount
Outputs:
            return_word
Global Data:
            - None -
Functions Referenced:
            ms1553_receive
Abstract:
            Impliments the memory data verify message for protocol B.
******************************************************************************/
/*
      word_count = number of words to transfer
*/
int memory_data_verify_message(LOOKUP_TABLE_TYPE
      *lookup_table_pointer, int *message_pointer, int amount)
{
      /*    This message is used to pass the data that the MLV will compare to
            the data stored on the MSD.
      */
      STATUS_WORD_TYPE *word_field;
      int command, return_word;

      command = ((lookup_table_pointer->RT_Address) << 11)
            + (MEMORY_DATA_VERIFY << 5) + (0x1f & amount);

      /* Check Status message for no timeout */
      return_word = ms1553_receive(&command, message_pointer);
      if(!return_word)
      {
            word_field = (STATUS_WORD_TYPE *) message_pointer;
            /* Check return address */
            if((word_field->Terminal_Address) != (lookup_table_pointer->RT_Address))
                  return_word = ADDRESS_ERROR;
      }
      return return_word;                                 /* Return MS-1553 error */
}

/******************************************************************************
Name:       exit_verify_message
Number/Version:
History:
            Date        Rev   Author           Description
            22-Mar-1993 0.0   C. Houlberg      Baseline

Inputs:
            lookup_table_pointer
Outputs:
            return_word
Global Data:
            - None -
Functions Referenced:
            command_message
Abstract:
            Impliments the exit verify message for protocol B.
******************************************************************************/
int exit_verify_message(LOOKUP_TABLE_TYPE
      *lookup_table_pointer)
```

```
{
      int send_message[5];

      /* Verify control message, exit verify */
      /* Command */
      send_message[0] = ((lookup_table_pointer->RT_Address) << 11)
            + EXIT_VERIFY;

      /* Data */
      send_message[1] = lookup_table_pointer->RT_Nomenclature_MSW;
      send_message[2] = lookup_table_pointer->RT_Nomenclature_2SW;
      send_message[3] = lookup_table_pointer->RT_Nomenclature_LSW;
      send_message[4] = (lookup_table_pointer->Fill_Data) << 10;

      /* Send the message */
      return command_message(lookup_table_pointer, &send_message[0]);
}

/*****************************************************************************
Name:         rrt_error_message
Number/Version:
History:
              Date         Rev   Author           Description
              22-Mar-1993  0.0   C. Houlberg      Baseline

Inputs:
              lookup_table_pointer
              action
Outputs:
              return_word
Global Data:
              - None -
Functions Referenced:
              command_message
Abstract:
              Impliments the rrt error message for protocol B.
*****************************************************************************/
/*
      this message is sent to the RT to indicate
      that the RRT has detected an error in the
      LOAD/VERIFY.

      arguments:
      1 = abort, no further entries will be made
      2 = complete restart
      4 = last transaction will be repeated
*/
int rrt_error_message(LOOKUP_TABLE_TYPE   *lookup_table_pointer, int action)
{
      int send_message[2];

      /* Command */
      send_message[0] = ((lookup_table_pointer->RT_Address) << 11) + RRT_ERROR;
      send_message[1] = action;

      /* Send message */
      return command_message(lookup_table_pointer, &send_message[0]);
}

/*****************************************************************************
Name:         command_message
Number/Version:
History:
              Date         Rev   Author           Description
              22-Mar-1993  0.0   C. Houlberg      Baseline

Inputs:
              lookup_table_pointer
              send_message
Outputs:
              return_word
Global Data:
              - None -
Functions Referenced:
              ms1553_send
Abstract:
              Impliments the command message for protocol B.
*****************************************************************************/
/*
      high level MIL 1553 interface. This function
      performs the following tasks:
```

```
      - sends message transactions
      - includes required delay between messages
      - checks status word
      - errors out for busy retry count
      - repeats commands if required
      - errors out for too many repeats
      arguments to command_message are:
      *send_message = pointer to message to send
*/
int command_message(LOOKUP_TABLE_TYPE
      *lookup_table_pointer, int *send_message)
{
      STATUS_WORD_TYPE *status_field;
      int return_word, status;
      int return_message[2];
      int i, count, delay;

      TIMER_REG_TYPE *timer;          /* Pointer to timer counter register */
      timer = (TIMER_REG_TYPE *) &TIMER0;

      /* Send message */
      return_word = ms1553_send(send_message, &status);
      if(return_word)
            return return_word;                               /* Return MS-1553 error */
      /* Delay next message */
      delay = lookup_table_pointer->Delay;

      msec_timer(delay, timer);

      /* Check status for RT address mismatch */
      status_field = (STATUS_WORD_TYPE *) &status;
      /* Check return address */
      if(status_field->Terminal_Address != lookup_table_pointer->RT_Address)
            return ADDRESS_ERROR;

      /* Check if need to repeat last message due to busy */
      if(lookup_table_pointer->Transmit_Next_Message)
            return NO_ERROR;                           /* Do not repeat last */

      /* Check for RT busy if status busy bit is usable */
      if(lookup_table_pointer->Status_Busy_Not_Usable)
            /* The RT was tested prior to sending the message */
            return NO_ERROR;
      else
      {
            if(!(status_field->Busy_Bit))
                  return NO_ERROR;                     /* Not busy */
      }

      count = lookup_table_pointer->Auto_Busy_Count;
      for(i = 0; i < count; i++)
      {
            /* Check RT for busy */
            return_word = test_busy_status(lookup_table_pointer);
            if(return_word)
                  return return_word;

            /* Send command message */
            return_word = ms1553_send(send_message, &status);
            if(return_word)
                  return return_word;                         /* Return MS-1553 error */

            /* Check return address */
            if(status_field->Terminal_Address != lookup_table_pointer->RT_Address)
                  return ADDRESS_ERROR;

            /* If got this far the RT status busy bit is usable */
            if(!(status_field->Busy_Bit))
                  return NO_ERROR;                     /* Not busy */
      }

      return BUSY_CONDITION;                           /* Still busy */
}

/****************************************************************************
Name:       test_busy_status
Number/Version:
History:
            Date        Rev   Author          Description
            22-Mar-1993 0.0   C. Houlberg     Baseline
```

```
Inputs:
            lookup_table_pointer
Outputs:
            return_word
Global Data:
            - None -
Functions Referenced:
                  activity_busy
                  service_message
Abstract:
            Impliments the test busy status for protocol B.
******************************************************************************/
int test_busy_status(LOOKUP_TABLE_TYPE *lookup_table_pointer)
{
      TIMER_REG_TYPE *timer;          /* Pointer to timer counter register */
      int return_word, return_message[2];
      int delay;

      timer = (TIMER_REG_TYPE *) &TIMER0;

      /* Check RT for busy */
      return_word = activity_busy(lookup_table_pointer, &return_message[0]);
      if(!return_word)
      {
            /* Delay next message */
            delay = lookup_table_pointer->Delay;

            msec_timer(delay, timer);

            /* Test data word for service request */
            while(return_message[1])
            {
                  return_word = service_message(lookup_table_pointer,
                        return_message[1]);
                  if(return_word)                    /* Some error may have occurred */
                        break;                                /* Some error did occur */

                  /* Delay next message */
                  msec_timer(delay, timer);
                  /* Check RT for busy */
                  return_word = activity_busy(lookup_table_pointer,
                        &return_message[0]);
                  if(return_word)
                        /* Some error occurred */
                        break;
                  /* Delay next message */
                  msec_timer(delay, timer);
            }
      }
      return return_word;
}

/******************************************************************************
Name:       service_message
Number/Version:
History:
            Date         Rev   Author         Description
            22-Mar-1993  0.0   C. Houlberg    Baseline

Inputs:
            lookup_table_pointer
            request
Outputs:
            return_word
Global Data:
            - None -
Functions Referenced:
            ms1553_receive
            command_message
Abstract:
            Impliments the service message for protocol B.
******************************************************************************/
int service_message(LOOKUP_TABLE_TYPE *lookup_table_pointer,
                                          int request)
{
      COMMAND_WORD_TYPE *command_field;
      STATUS_WORD_TYPE *status_field;
      int command, status, message[33];
      int return_word;

      command_field = (COMMAND_WORD_TYPE *) &request;
```

```
        command = (lookup_table_pointer->RT_Address << 11) + request;

        if(command_field->RT_Transmit)              /* Requesting data from RT */
        {
              switch(request)
              {
                    case REPROGRAM_STATUS:
                          return_word = reprogram_status_message(lookup_table_pointer);
                          break;
                    default:
                          /* Data from remaining receive messages
                                is not used at this time */
                          return_word = ms1553_receive(&command, &message[0]);
                          if(!return_word)
                          {
                                status_field = (STATUS_WORD_TYPE *) &message[0];
                                /* Check return address */
                                if(status_field->Terminal_Address !=
                                      lookup_table_pointer->RT_Address)
                                      return_word = ADDRESS_ERROR;
                          }
                          break;
              }
        }
        else                                              /* Send requested message */
        {
              message[0] = command;

              /* No RT receive messages have been implemented */
              return_word = command_message(lookup_table_pointer, &message[0]);
        }
        return return_word;
}

/***************************************************************************
Name:       reprogram_status_message
Number/Version:
History:
            Date        Rev   Author          Description
            22-Mar-1993 0.0   C. Houlberg     Baseline

Inputs:
            lookup_table_pointer
Outputs:
            return_word
Global Data:
            - None -
Functions Referenced:
            ms1553_receive
Abstract:
            Impliments the reprogram status message for protocol B.
***************************************************************************/
/*
      During reprogramming operations the RT may
      halt operations by sending a BUSY bit in the
      status responce word or in the activity message data
      word.  When the RRT receives a busy bit, it will
      transmit activity messages untill the busy bit is
      cleared.  (The request to transmit the reprogram
      status message will be honored after the first activity
      message responce with a busy bit cleared.)

      Status codes include:  abort, restart, retry, and auto
            retry.

      >>>> On entry busy bit has been cleared above.
*/
int reprogram_status_message(LOOKUP_TABLE_TYPE *lookup_table_pointer)
{
      STATUS_WORD_TYPE *word_field;
      int command, return_word, return_message[2];
      char ascii_string[5];         /* String of characters for LCD display */

      /* Command */
      command = (lookup_table_pointer->RT_Address << 11) + REPROGRAM_STATUS;

      /* Get status */
      return_word = ms1553_receive(&command, &return_message[0]);
      if(return_word)
            return return_word;                        /* Return MS-1553 error */
```

```
        word_field = (STATUS_WORD_TYPE *) &return_message[0];
        /* Check return address */
        if(word_field->Terminal_Address != lookup_table_pointer->RT_Address)
             return ADDRESS_ERROR;
        /* Check if busy */
        if(word_field->Busy_Bit)                              /* Check status busy bit */
             return BUSY_CONDITION;                           /* Not busy */

        /* Process status word */
        return_word = error_display(STATUS_COMMAND + return_message[1]);

        /* No error generated by status commands containing only status */
        if((return_word & TYPE_MASK) == STATUS_COMMAND)
             return_word = NO_ERROR;

        return return_word;
}

/* end */


/*****************************************************************************
Include File Name:    protoc.h
Number/Version:
History:
            Date         Rev   Author          Description
            22-Mar-1993 0.0   C. Houlberg     Baseline

Abstract:

*****************************************************************************/

/*    Function prototypes
*/
int protocol_c(int address, int automode);
int upload_c(LOOKUP_TABLE_TYPE *header_pointer, int file_address);
int verify_c(LOOKUP_TABLE_TYPE *header_pointer, int file_address);

/* end */


/*****************************************************************************
Module Name:  protoc.c
Number/Version:
History:
            Date         Rev   Author          Description
            22-Mar-1993 0.0   C. Houlberg     Baseline
Abstract:
            Implements appendix C of MIL-STD-2217 for
            Rapid Reprogramming Terminal use.

*****************************************************************************/

#include "rrt.h"                         /* RRT configuration */
#include "dsp.h"                         /* DSP definitions */
#include "system.h"                      /* System definitions */
#include "cardhdrs.h"                    /* Memory card header definitions */
#include "wordtype.h"                    /* Word definitions */
#include "control.h"                     /* Controller control functions */
#include "display.h"                     /* LCD display definitions */
#include "timer.h"                       /* Timer definitions */
#include "error.h"                       /* Error definitions */
#include "initprot.h"                    /* Protocol state table def */
#include "msgs_c.h"                      /* Protocol C message definitions */
#include "protoc.h"                      /* Protocol C definitions */

/*****************************************************************************
Name:  protocol_c
Number/Version:
History:
            Date         Rev   Author          Description
            22-Mar-1993 0.0   C. Houlberg     Baseline

Inputs:
            address
            automode
Returns:
            0 for success
            non-zero error message for failure

Global Data:
            - None-
```

```
Functions Referenced:
            memory_card_read()
            error_display()
            LCD_display()
            memory_configuration_response()
            enter_load_response()
            exit_verify_response()
            rrt_error_response()
            init_protocol()
            upload_c()
            verify_c()
Abstract:
            Implements appendix C of MIL-STD-2217
******************************************************************************/
int protocol_c(int address, int automode)
{
      CARD_HEADER_TYPE *card_pointer;          /* Pointer into card header */
      LOOKUP_TABLE_UNION header;
      LOOKUP_TABLE_UNION *header_union;
      LOOKUP_TABLE_UNION next_header;
      LOOKUP_TABLE_UNION *next_header_union;
      STATE_TABLE_TYPE state_table;
      STATE_TABLE_TYPE *state;
      PPI3_REG_TYPE *switch_status;            /* Switch status pointer */
      int first_file, file_address;
      int return_word, return_message[3], data_word;
      int match, load_file;
      int file_size, i;
      int restart_count, status_count, count;
      int error_count, temp;
      char ascii_string[13];

      TIMER_REG_TYPE *timer;                   /* Pointer to timer counter register */
      timer = (TIMER_REG_TYPE *) &TIMER0;

      switch_status = (PPI3_REG_TYPE *) &PPI3;

    state = &state_table;
    header_union = &header;
    next_header_union = &next_header;

      status_count = header_union->structure.Auto_Busy_Count;

      /*  The following function is used by this protocol to establish
            the initial value of the variables:
                  state->another_upload,
                  state->another_verify,
    */
      return_word = init_protocol(address, state);

      while((state->another_upload || state->another_verify) && !return_word)
      {
            /* First file load is preceded by enter load
                  reprogram control message */
            first_file = YES;
            /* Set up file address to point to lookup table */
            file_address = address;

            /* Read in file header */
            for(i = 0; i < SIZE_LOOKUP_TABLE; i++)
                  header_union->array[i] = memory_card_read(file_address++);

            /* Process indication for init_file() */
            state->process = UPLOADING;

            while((state->another_upload) && !return_word)
            {
                  /* Form filename */
                  for(i = 0; i < 6; i++)
                  {
                        ascii_string[i+i] = (char) (0xff &  header_union->array[i]);
                        ascii_string[i+i+1] = (char)
                              (0xff & (header_union->array[i] >> 8));
                  }
                  ascii_string[12] = 0;            /* End of string indicator */
                  /* Display filename */
                  LCD_display(START_LINE1 + 7, &ascii_string[0]);
                  /* Do first file operations */
                  if(first_file)
                  {
                        /* Check for memory configuration message usage */
                        if(header_union->structure.Use_Memory_Config_Msg)
                        {
```

```
/* Get memory configuration and
      ignore status response messages */
count = status_count;
do
{                    /* do-while command combination */
      return_word = memory_configuration_response(
            (LOOKUP_TABLE_TYPE *)header_union,
            &return_message[0]);
      switch(return_word & TYPE_MASK)
      {
            case NO_ERROR:          /* No error occurred */
                  break;
            case STATUS_COMMAND:    /* Status occurred */
                  if(count--)
                  {
                        return_word = error_display(return_word);
                        break;
                  }
                  else
                        return_word = ONLY_POLLED;
            default:
                  return_word = error_display(return_word);
                  return return_word;
      }
}while(return_word);

/* Check configuration */
switch (header_union->structure.Memory_Word_Usage)
{
      case CHECK_WORD_1:            /* Test word #1 */
            data_word =
                  header_union->structure.Memory_Config_1;
            if(data_word == return_message[1])
                  match = YES;
            else
                  match = NO;
            break;
      case CHECK_WORD_2:            /* Test word #2 */
            data_word =
                  header_union->structure.Memory_Config_2;
            if(data_word == return_message[2])
                  match = YES;
            else
                  match = NO;
            break;
      case CHECK_BOTH_WORDS:  /* Test word #1 and #2 */
            data_word =
                  header_union->structure.Memory_Config_1;
            if(data_word != return_message[1])
            {
                  match = NO;
                  break;
            }
            data_word =
                  header_union->structure.Memory_Config_2;
            if(data_word == return_message[2])
                  match = YES;
            else
                  match = NO;
            break;
}

if(match)
{
      /* Display configuration */
      LCD_display(START_LINE2, "CFG:");
      ascii_conversion(return_message[1], &ascii_string[0]);
      LCD_display(START_LINE2 + 5, &ascii_string[0]);
      LCD_display(START_LINE2 + 9, " ");
      ascii_conversion(return_message[2], &ascii_string[0]);
      LCD_display(START_LINE2 + 10, &ascii_string[0]);

      /* Allow time for viewing configuration */
      if(automode)
      {
            timer->Timer_Counter = SEC1;
            while(timer->Timer_Counter);
      }

      LCD_display(START_LINE2 + 15, "LOAD?");
```

```
                /* Wait for switch closure */
                while((switch_status->Not_Execute)
                        && (switch_status->Not_Skip));
                if (!(switch_status->Not_Execute))  /* Skip the load */
                      load_file = YES;
                else
                      load_file = NO;

                /* Allow time for switch to settle open */
                timer->Timer_Counter = SETTLE_TIME;
                while(timer->Timer_Counter)
                {
                      /* Make sure switches open */
                      if (!(switch_status->Not_Execute)
                                || !(switch_status->Not_Skip))
                            timer->Timer_Counter = SETTLE_TIME;
                }

                if(!(load_file))
                      return NO_ERROR;

                /* Clear end of LCD display for load routine */
                LCD_display(START_LINE2 + 15, "\t");
          }
      }
}
/*    Send the Enter Load message and
      ignore status response messages */
count = status_count;
do                                  /* do while command combination */
{
      return_word = enter_load_response(
            (LOOKUP_TABLE_TYPE *)header_union);
      switch(return_word & TYPE_MASK)
      {
            case NO_ERROR:          /* No error occurred */
                  break;
            case STATUS_COMMAND:    /* Status message occurred */
                  if(count--)
                  {
                        return_word = error_display(return_word);
                        break;
                  }
                  else
                        return_word = ONLY_POLLED;
            default:                      /* Error occurred */
                  return_word = error_display(return_word);
                  return return_word;
      }
}while(return_word);

/*    The following function is used here by this protocol to
      establish or update the value of the variables:
            state->another_upload,
            state->next_file_address.
      Variable established locally and used by this function is:
            state->process = UPLOADING.
*/
init_file(file_address, header_union, next_header_union, state);

/* Load the data */
error_count = header_union->structure.Manual_Error_Count;
do                            /* do while command combination */
{
      /* Display Load message */
      LCD_display(START_LINE2, "Uploading\t");

      return_word = upload_c((LOOKUP_TABLE_TYPE *)header_union,
            file_address);
      if(return_word == (ERROR_CODE + RESTART))
      {
            LCD_display(START_LINE2, "Error: EXEC Restart?");

            /* Wait for switch closure */
            while((switch_status->Not_Execute)
                  && (switch_status->Not_Skip));

            if(!(switch_status->Not_Execute) && error_count--)
            {
                  temp = rrt_error_response(
                        (LOOKUP_TABLE_TYPE *)header_union, RESTART_ACTION);
                  if(temp)
                        return_word = error_display(temp);
```

```
                }
                else
                        return_word = (ERROR_CODE + ABORT);

                /* Allow time for switch to settle open */
                timer->Timer_Counter = SETTLE_TIME;
                while(timer->Timer_Counter)
                {
                        /* Make sure switch is open */
                        if(!(switch_status->Not_Execute)
                                || !(switch_status->Not_Skip))
                                timer->Timer_Counter = SETTLE_TIME;
                }

                LCD_display(START_LINE2 + 14, "\t");
        }
    }while(return_word == (ERROR_CODE + RESTART));

    /* Test for the occurrence of an ABORT */
    if(return_word == (ERROR_CODE + ABORT))
    {
        return_word = rrt_error_response(
            (LOOKUP_TABLE_TYPE *)header_union, ABORT_ACTION);
        return_word = ABORT_OCCURRED;
    }

    if(!(return_word))
    {
        /* Send the exit load message and
            ignore status response messages */
        count = status_count;
        do                              /* do while command combination */
        {
            return_word = exit_load_response(
                (LOOKUP_TABLE_TYPE *)header_union);
            switch(return_word & TYPE_MASK)
            {
                case NO_ERROR:          /* No error occurred */
                    break;
                case STATUS_COMMAND:    /* Status message occurred */
                    if(count--)
                    {
                        return_word = error_display(return_word);
                        break;
                    }
                    else
                        return_word = ONLY_POLLED;
                default:                /* Error occurred */
                    return_word = error_display(return_word);
                    return return_word;
            }
        }while(return_word);
    }

    if(!(return_word))
        if(state->another_upload)
        {
            /* Clear first file indication */
            first_file = NO;

            /* Make address of next file the current file address,
                skip lookup table */
            file_address = state->next_file_address;

            /* Move next header to current header location */
            for(i = 0; i < SIZE_LOOKUP_TABLE; i++)
                header_union->array[i] = next_header_union->array[i];
        }
        else
            /* Display Load message */
            LCD_display(START_LINE2, "Upload Done\t");
}

if(!(return_word))
{
    /* First file verify is preceded by enter verify
        reprogram control message */
    first_file = YES;
    /* Set up file pointer */
    file_address = address;
    /* Read in file header */
    for(i = 0; i < SIZE_LOOKUP_TABLE; i++)
```

```
            header_union->array[i] = memory_card_read(file_address++);

        /* Process indiction for init_file() */
        state->process = VERIFYING;
}

while((state->another_verify) && !return_word)
{
        /* Form filename, ensure proper one is displayed */
        for(i = 0; i < 6; i++)
        {
                ascii_string[i+i] = (char) (0xff & header_union->array[i]);
                ascii_string[i+i+1] = (char)
                        (0xff & (header_union->array[i] >> 8));
        }
        ascii_string[12] = 0;                   /* End of string indicator */
        /* Display filename */
        LCD_display(START_LINE1 + 7, &ascii_string[0]);

        /* Send the Enter Verify message and
                ignore status response messages */
        count = status_count;
        do
        {                                       /* do while command combination */
                return_word = enter_verify_response(
                        (LOOKUP_TABLE_TYPE *)header_union);
                switch(return_word & TYPE_MASK)
                {
                        case NO_ERROR:          /* No error occurred */
                                break;
                        case STATUS_COMMAND:    /* Status message occurred */
                                if(count--)
                                {
                                        return_word = error_display(return_word);
                                        break;
                                }
                                else
                                        return_word = ONLY_POLLED;
                        default:                                /* Error occurred */
                                return_word = error_display(return_word);
                                return return_word;
                }
        }while(return_word);

        /*      The following function is used here by this protocol to
                establish or update the value of the variables:
                        state->another_upload,
                        state->another_verify,
                        state->next_file_address.
                Variable established locally and used by this function is:
                        state->process = VERIFYING.
        */
        init_file(file_address, header_union, next_header_union, state);

        /* Verify the data */
        error_count = header_union->structure.Manual_Error_Count;
        do
        {                               /* do while command combination */
                /* Test if loading Memory Card */
                if(status_flags.DOWNLOAD)
                        /* Display Download message */
                        LCD_display(START_LINE2, "Download\t");
                else
                        /* Display Verify message */
                        LCD_display(START_LINE2, "Verifying\t");

/*      PC Change address to file_address to get correct
  verify address    */
                return_word = verify_c((LOOKUP_TABLE_TYPE *)header_union,
                        file_address);

                if(return_word == (ERROR_CODE + RESTART))
                {
                        LCD_display(START_LINE2, "Error: EXEC Restart?");

                        /* Wait for switch closure */
                        while((switch_status->Not_Execute)
                                && (switch_status->Not_Skip))

                        if(!(switch_status->Not_Execute) && error_count--)
                        {
                                /* Decrement restart count */
```

```
                temp = rrt_error_response(
                      (LOOKUP_TABLE_TYPE *)header_union, RESTART_ACTION);
                if(temp)
                      return_word = error_display(temp);
            }
            else
                  return_word = (ERROR_CODE + ABORT);
            /* Allow time for switch to settle open */
            timer->Timer_Counter = SETTLE_TIME;
            while(timer->Timer_Counter)
            {
                  /* Make sure switches open */
                  if(!(switch_status->Not_Execute)
                        || !(switch_status->Not_Skip))
                        timer->Timer_Counter = SETTLE_TIME;
            }

            LCD_display(START_LINE2 + 14, "\t");
      }
}while(return_word == (ERROR_CODE + RESTART));

if(return_word == (ERROR_CODE + ABORT))
{
      return_word = rrt_error_response(
            (LOOKUP_TABLE_TYPE *)header_union, ABORT_ACTION);
      return_word = ABORT_OCCURRED;
}

if(!(return_word))
{
      return_word = exit_verify_response(
            (LOOKUP_TABLE_TYPE *)header_union);
      switch(return_word)
      {
            case NO_ERROR:
                  if(!(state->another_verify))
                        /* Test if loaded Memory Card */
                        if(status_flags.DOWNLOAD)
                              /* Display Download complete indication */
                              LCD_display(START_LINE2, "Download Done\t");
                        else
                              /* Display Verify complete indication */
                              LCD_display(START_LINE2, "Data Verified\t");
                  break;
            default:
                  if((return_word & TYPE_MASK) == STATUS_COMMAND)
                  {
                        /* Burning in */
                        LCD_display(START_LINE2, "Burning In\t");
                        ascii_conversion(CODE_MASK & return_word,
                              &ascii_string[0]);
                        LCD_display(START_LINE2 + 16, &ascii_string[0]);
                  }
                  else
                        return return_word;
      }

      /* Send the Exit verify message */
      while(return_word)
      {
            switch(return_word & TYPE_MASK)
            {
                  case NO_ERROR:
                        if(!(state->another_upload))
                              /* Display Burn in complete message */
                              LCD_display(START_LINE2, "Burn In Done\t");
                        break;
                  case STATUS_COMMAND:
                        ascii_conversion(CODE_MASK & return_word,
                              &ascii_string[0]);
                        LCD_display(START_LINE2 + 16, &ascii_string[0]);
                  case NOT_POLLED:
                        switch (i)
                        {
                              case 1:
                                    /* Back slash character */
                                    ascii_string[0] = (char) BACK_SLASH;
                                    ascii_string[1] = 0;
                                    LCD_display(START_LINE2 + 11,
                                          &ascii_string[0]);
                                    i = 2;
                                    break;
```

```
                                        case 2:
                                              LCD_display(START_LINE2 + 11, "|");
                                              i = 3;
                                              break;
                                        case 3:
                                              LCD_display(START_LINE2 + 11, "/");
                                              i = 0;
                                              break;
                                        default:
                                              LCD_display(START_LINE2 + 11, "-");
                                              i = 1;
                                              break;
                                  }
                                  break;
                            default:
                                  return return_word;
                                  break;
                      }
                      if(return_word)
                            /* Keep trying until burn in is done */
                            return_word = exit_verify_response(
                                  (LOOKUP_TABLE_TYPE *)header_union);
                }
          }

          if(!(return_word))
                if(state->another_verify)
                {
                      /* Clear first file indication */
                      first_file = NO;
                      /* Point to next file to verify, skip file lookup table */
                      file_address = state->next_file_address;
                      /* Move next header to current header location */
                      for(i = 0; i < SIZE_LOOKUP_TABLE; i++)
                            header_union->array[i] = next_header_union->array[i];
                }
      }

      address = state->next_file_address - SIZE_LOOKUP_TABLE;
   }

   return return_word;
}

/*****************************************************************************
Name:  upload_c
Number/Version:
History:
          Date          Rev   Author          Description
          22-Mar-1993   0.0   C. Houlberg     Baseline

Inputs:
          header_pointer
          file_address
Returns:
          0 for success
          non-zero error message for failure

Global Data:
          - None-

Functions Referenced:
          error_display()
          header_response()
          memory_data_load_response()
          trailer_response()
          rrt_error_response()
          ascii_conversion()
          LCD_display()

Abstract:

*****************************************************************************/
int upload_c(LOOKUP_TABLE_TYPE *header_pointer, int file_address)
{
      HEADER_WORD_TYPE *header;          /* Pointer to header message data */
      TIMER_REG_TYPE *timer;             /* Pointer to timer counter register */
      PPI3_REG_TYPE *switch_status;      /* Switch status pointer */
      int i, file_size;
      int data_word_count, data_amount;
      int data_location;
      int transfer_mode, header_type;
      int buffer_xfer_count;
```

```
int load_address;
int transfer_count, transfer_amount;
int message_amount;
int return_word = NO_ERROR;
int message[33];
int status_count, count;
int error_count;
int delay, word;
int checksum_adjustment;
char ascii_string[5];

timer = (TIMER_REG_TYPE *) &TIMER0;
status_count = header_pointer->Auto_Busy_Count;
switch_status = (PPI3_REG_TYPE *) &PPI3;

/* Header message data word 1 pointer */
header = (HEADER_WORD_TYPE *) &message[1];

/* Establish delay between messages */
delay = header_pointer->Delay;

/* File size measured in bytes */
file_size = (header_pointer->File_Size_MSW << 16)
     + header_pointer->File_Size_LSW;

/* Initialize data counter */
data_word_count = (file_size + 1) >> 1;

/* Transfer data */
error_count = header_pointer->Manual_Error_Count;
while(data_word_count && !(return_word))        /* Transfer all data */
{
      /* Initialize location of data to transfer */
      data_location = file_address;

      /* Filter out all transactions with
           undefined or reserved header types */
      do
      {
           /* Gather header data words */
           for(i = 1; i <= 4; i++)
                message[i] = memory_card_read(data_location++);

           header_type = header->Header_Type;
           if((header_type == UNDEFINED_TYPE) ||
                (header_type == RESERVED_TYPE))
           {
                data_location += 2;     /* Skip Trailer to next header */
                data_word_count -= 6;   /* Subtract null transaction */
           }

      } while((header_type == UNDEFINED_TYPE)
           || (header_type == RESERVED_TYPE));

      /* Extract load descriptors */
      transfer_mode = header->Transfer_Mode;
      buffer_xfer_count = header->Buffer_Xfer_Count;
      load_address = message[2];

      /* Display page number for transaction */
      ascii_conversion((message[4] >> 3), &ascii_string[0]);
      LCD_display(START_LINE2 + 16, &ascii_string[0]);

      /* Acount for maximum buffer count */
      if(transfer_mode && !buffer_xfer_count)
           buffer_xfer_count = MAX_BUFFER_COUNT;

      /* Determine data count */
      switch (header_type)
      {
           case WORD_COUNT:
                transfer_count = buffer_xfer_count;
                break;
           case MESSAGE_COUNT:
                transfer_count = buffer_xfer_count << 5;
                break;
           default:
                return_word = HEADER_TYPE;
      }

      /* Acount for no transfer, byte transfers, and header & trailer data */
      if(transfer_mode == NO_XFER)
```

```
{
      transfer_count = 0;
      data_amount = 6;
}
else if(transfer_mode == BYTE_XFER)
      data_amount = ((transfer_count + 1) >> 1) + 6;  /* Bytes packed */
else
      data_amount = transfer_count + 6;

/* Ensure Transfer Control agrees with transfer_count */
if(((message[4] & TC_MASK) == LAST_TRANSACTION)
      && (data_amount != data_word_count))
      return_word = TC_ERROR;

/* Ensure data amount transferring does
      not exceed data left to transfer */
if(data_amount > data_word_count)
      return_word = DATA_COUNT_ERROR;

/* Acount for verify following load in Transfer Control bits */
if(header_pointer->Verify_After_Load)
{
      checksum_adjustment = ANOTHER_TRANSACTION - (message[4] & TC_MASK);
      message[4] = (message[4] & ~TC_MASK) + ANOTHER_TRANSACTION;
}
else
      checksum_adjustment = 0;

if(!(return_word))
{
      /* Send the Header message and ignore status response messages */
      count = status_count;
      do                                /* do while command combination */
      {
            return_word = header_response(header_pointer, &message[0]);
            if(return_word)
            {
                  /* Some error or status message occurred */
                  if((return_word & TYPE_MASK) == STATUS_COMMAND)
                        if(!count--)
                              return_word = ONLY_POLLED;
                  return_word = error_display(return_word);
            }
      }while((return_word & TYPE_MASK) == STATUS_COMMAND);
}
/* Send the Data Load messages */
transfer_amount = transfer_count;
while(transfer_count && !(return_word))
{
      message_amount = 32;          /* Maximum words per message */
      if(message_amount > transfer_count)
      {                                       /* Fewer words left to send */
            message_amount = transfer_count;     /* Amount sending */
            transfer_count = 0;
      }
      else                                 /* Count of words left */
            transfer_count -= message_amount;

      /* Ready data for transfer, command inserted later */
      for(i = 1; i <= message_amount; i++)
      {
            word = memory_card_read(data_location++);
            if(transfer_mode == BYTE_XFER)
            {                                 /* 8 bit transfer */
                  message[i++] = 0xff & word;
                  if(i <= message_amount)
                        message[i] = 0xff & (word >> 8);
            }
            else                              /* 16 or 32 bit transfer */
                  message[i] = word;
      }

      /* Display address for block of data */
      ascii_conversion(load_address + transfer_amount
            - (transfer_count + message_amount), &ascii_string[0]);
      LCD_display(START_LINE2 + 11, &ascii_string[0]);

      /* Send the data and process status response messages */
      count = status_count;
      do                                      /* do while command combination */
      {
            return_word = memory_data_load_response(
```

```
                header_pointer, &message[0], message_amount);
            if(return_word)
            {
                /* Some error or status message occurred */
                if((return_word & TYPE_MASK) == STATUS_COMMAND)
                    if(!count--)
                        return_word = ONLY_POLLED;
                return_word = error_display(return_word);
            }
        }while((return_word & TYPE_MASK) == STATUS_COMMAND);
    }

    if(!(return_word))
    {
        for(i = 1; i <= 2; i++)
            message[i] = memory_card_read(data_location++);

        /* Adjust checksum is necessary */
        message[2] = 0xffff & (message[2] + checksum_adjustment);
        /* Send the trailer message and
            process status response messages */
        count = status_count;
        do                                          /* do while command combination */
        {
            return_word = trailer_response(header_pointer, &message[0]);
            if(return_word)
            {
                /* Some error or status message occurred */
                if((return_word & TYPE_MASK) == STATUS_COMMAND)
                    if(!count--)
                        return_word = ONLY_POLLED;
                return_word = error_display(return_word);
            }
        }while((return_word & TYPE_MASK) == STATUS_COMMAND);
    }

    /* Check activity to ensure no error occurred due to trailer */
    if(!(return_word))
        return_word = activity_response(header_pointer);

    switch (return_word)
    {
        case (NO_ERROR):
            file_address = data_location;
            data_word_count -= data_amount;
            break;
        case (ERROR_CODE + AUTO_RETRY):
            if(error_count)
            {
                --error_count;    /* Decrement error count */
                return_word = rrt_error_message(
                    header_pointer, TRANSACTION);
                break;
            }
        case (ERROR_CODE + RETRY):
            LCD_display(START_LINE2, "Error: EXEC Retry?\t");
            /* Wait for switch closure */
            while((switch_status->Not_Execute)
                && (switch_status->Not_Skip));
            if(!(switch_status->Not_Execute))
            {
                /* Reset error count */
                error_count = header_pointer->Manual_Error_Count;
                return_word = rrt_error_message(
                    header_pointer, TRANSACTION);
                if(!(return_word))
                    LCD_display(START_LINE2, "Retrying Load\t");
            }
            else
                return_word = (ERROR_CODE + ABORT);

            /* Allow time for switch to settle. */
            timer->Timer_Counter = SETTLE_TIME;
            while(timer->Timer_Counter)
                /* Make sure switch is open */
                if(!(switch_status->Not_Execute)
                    || !(switch_status->Not_Skip))
                    timer->Timer_Counter = SETTLE_TIME;
            LCD_display(START_LINE2, "Retrying\t");
            break;
    }
}
```

```
    /* Return status of load */
    return return_word;
}

/*******************************************************************************
Name:  verify_c
Number/Version:
History:
            Date          Rev   Author          Description
            22-Mar-1993 0.0   C. Houlberg     Baseline

Inputs:
            header
            file_address
Returns:
            0 for success
            non-zero error message for failure

Global Data:
            - None-

Functions Referenced:
            error_display()
            header_response()
            memory_data_verify_response()
            trailer_response()
            rrt_error_response()
            ascii_conversion()
            LCD_display()

Abstract:
            Verifies data
*******************************************************************************/
int verify_c(LOOKUP_TABLE_TYPE *header_pointer, int file_address)
{
      HEADER_WORD_TYPE *header;                /* Pointer to header message data */
      TIMER_REG_TYPE *timer;                   /* Pointer to timer counter register */
      PPI3_REG_TYPE *switch_status;            /* Switch status pointer */
      int i, file_size;
      int data_word_count, data_amount;
      int data_location;
      int transfer_mode, header_type;
      int buffer_xfer_count;
      int load_address;
      int transfer_count, transfer_amount;
      int message_amount;
      int return_word = NO_ERROR;
      int message[33];
      int checksum;
      int status_count, count;
      int error_count;
      int delay, word;
      char ascii_string[5];

      timer = (TIMER_REG_TYPE *) &TIMER0;
      status_count = header_pointer->Auto_Busy_Count;
      switch_status = (PPI3_REG_TYPE *) &PPI3;

      /* Header message data word 1 pointer */
      header = (HEADER_WORD_TYPE *) &message[1];

      /* Establish delay between messages */
      delay = header_pointer->Delay;

      /* File size measured in bytes */
      file_size = (header_pointer->File_Size_MSW << 16)
          + header_pointer->File_Size_LSW;

      /* Initialize data counter */
      data_word_count = (file_size + 1) >> 1;

      /* Transfer data */
      error_count = header_pointer->Manual_Error_Count;
      while(data_word_count && !(return_word))  /* Transfer all data */
      {
            checksum = 0;                                /* Clear the checksum */

            /* Initialize location of data to transfer */
            data_location = file_address;

            /* Filter out all transactions with
                  undefined or reserved header types */
```

```
do
{
        /* Gather header data words */
        for(i = 1; i <= 4; i++)
        {
                message[i] = memory_card_read(data_location++);
                checksum += message[i];
        }

        header_type = header->Header_Type;
        if((header_type == UNDEFINED_TYPE) ||
                (header_type == RESERVED_TYPE))
        {
                checksum = 0;                       /* Start checksum over */
                data_location += 2;        /* Skip Trailer to next header */
                data_word_count -= 6;      /* Subtract null transaction */
        }

} while((header_type == UNDEFINED_TYPE)
        || (header_type == RESERVED_TYPE));

/* Extract load descriptors */
transfer_mode = header->Transfer_Mode;
header_type = header->Header_Type;
buffer_xfer_count = header->Buffer_Xfer_Count;
load_address = message[2];

/* Display page number for transaction */
ascii_conversion((message[4] >> 3), &ascii_string[0]);
LCD_display(START_LINE2 + 16, &ascii_string[0]);

/* Acount for maximum buffer count */
if(transfer_mode && !buffer_xfer_count)
        buffer_xfer_count = MAX_BUFFER_COUNT;

/* Determine data count */
switch (header_type)
{
        case WORD_COUNT:
                transfer_count = buffer_xfer_count;
                break;
        case MESSAGE_COUNT:
                transfer_count = buffer_xfer_count << 5;
                break;
        default:
                return_word = HEADER_TYPE;
}

/* Acount for no transfer, byte transfers, and header & trailer data */
if(transfer_mode == NO_XFER)
{
        transfer_count = 0;
        data_amount = 6;
}
else if(transfer_mode == BYTE_XFER)
        data_amount = ((transfer_count + 1) >> 1) + 6;  /* Bytes packed */
else
        data_amount = transfer_count + 6;

/* Ensure Transfer Control agrees with transfer_count */
if(((message[4] & TC_MASK) == LAST_TRANSACTION)
        && (data_amount != data_word_count))
        return_word = TC_ERROR;

/* Ensure data amount transferring does
        not exceed data left to transfer */
if(data_amount > data_word_count)
        return_word = DATA_COUNT_ERROR;

if(!(return_word))
{
        /* Send the Header message and ignore status response messages */
        count = status_count;
        do
        {                                        /* do while command combination */
                return_word = header_response(header_pointer, &message[0]);
                if(return_word)
                {
                        /* Some error or status message occurred */
                        if((return_word & TYPE_MASK) == STATUS_COMMAND)
                                if(!count--)
                                        return_word = ONLY_POLLED;
```

```
                return_word = error_display(return_word);
            }
        }while((return_word & TYPE_MASK) == STATUS_COMMAND);
}

/* Send the Data Verify messages */
transfer_amount = transfer_count;
while(transfer_count && !(return_word))
{
        message_amount = 32;            /* Maximum words per message */
        if(message_amount > transfer_count)
        {
                message_amount = transfer_count;    /* Amount sending */
                transfer_count = 0;             /* Count of words left */
        }
        else                                    /* Count of words left */
                transfer_count -= message_amount;

        /* Display address for block of data */
        ascii_conversion(load_address + transfer_amount
                - (transfer_count + message_amount), &ascii_string[0]);
        LCD_display(START_LINE2 + 11, &ascii_string[0]);

        /* Get the data and process status response messages */
        count = status_count;
        do                                              /* do while command combination */
        {
                return_word = memory_data_verify_response(
                        header_pointer, &message[0],
                        message_amount);
                if(return_word)
                {
                        /* Some error or status message occurred */
                        if((return_word & TYPE_MASK) == STATUS_COMMAND)
                                if(!count--)
                                        return_word = ONLY_POLLED;
                        return_word = error_display(return_word);
                }
        }while((return_word & TYPE_MASK) == STATUS_COMMAND);

        if(!(return_word))
        {
                /* Set up data to store or verify */
                for(i = 1; (i <= message_amount) && !return_word;
                        i++, data_location++)
                {
                        if(transfer_mode == BYTE_XFER)
                        {       /* 8-bit transfer */
                                word = 0xff & message[i];
                                checksum += message[i++];
                                if(i <= message_amount)
                                {
                                        word += ((0xff & message[i]) << 8);
                                        checksum += message[i];
                                }
                        }
                        else
                        {
                                word = message[i];
                                checksum += message[i];
                        }

                        /* Test if downloading to Memory Card */
                        if(status_flags.DOWNLOAD)
                        {                               /* Store data in Memory Card */
                                return_word = memory_card_write(data_location,
                                        word);
                        }
                        else                    /* Verify data with Memory Card */
                        {
                                if(word != memory_card_read(data_location))
                                        return_word = VERIFY_ERROR
                                                + load_address + transfer_amount
                                                - (transfer_count + message_amount)
                                                + i - 2;
                        }
                }
        }
}

if(!(return_word))
{
```

```
        /* Set up data for trailer message */
        message[1] = memory_card_read(data_location++);
        checksum = 0xffff & (checksum + message[1]);
        message[2] = checksum;

        /* Test if downloading to Memory Card */
        if(status_flags.DOWNLOAD)
              return_word = memory_card_write(data_location, checksum);
        else
                              /* Verify checksum with Memory Card */
              if(checksum != memory_card_read(data_location))
                    return_word = CHECKSUM_ERROR;

        /* Keep data location in step for next transaction */
        data_location++;
  }

  if(!(return_word))
  {
        /* Send the trailer message (end verify) and
              process status response messages */
        count = status_count;
        do
        {                                   /* do while command combination */
              return_word = trailer_response(header_pointer, &message[0]);
              if(return_word)
              {
                    /* Some error or status message occurred */
                    if((return_word & TYPE_MASK) == STATUS_COMMAND)
                          if(!count--)
                                return_word = ONLY_POLLED;
                    return_word = error_display(return_word);
              }
        }while((return_word & TYPE_MASK) == STATUS_COMMAND);
  }

  /* Check activity to ensure no error occurred due to trailer */
  if(!(return_word))
        return_word = activity_response(header_pointer);

  switch (return_word)
  {
        case (NO_ERROR):
              file_address = data_location;
              data_word_count -= data_amount;
              break;
        case (ERROR_CODE + AUTO_RETRY):
              if(error_count)
              {
                    --error_count;             /* Decrement error count */
                    return_word = rrt_error_message(
                          header_pointer, TRANSACTION);
                    break;
              }
        case (ERROR_CODE + RETRY):
              LCD_display(START_LINE2, "Error: EXEC Retry?\t");
              /* Wait for switch closure */
              while((switch_status->Not_Execute)
                    && (switch_status->Not_Skip));
              if(!(switch_status->Not_Execute))
              {
                    /* Reset error count */
                    error_count = header_pointer->Manual_Error_Count;
                    return_word = rrt_error_message(
                          header_pointer, TRANSACTION);
                    if(!(return_word))
                          if(status_flags.DOWNLOAD)
                                LCD_display(START_LINE2,
                                      "Retrying Download\t");
                          else
                                LCD_display(START_LINE2,
                                      "Retrying Verify\t");
              }
              else
                    return_word = (ERROR_CODE + ABORT);

              /* Allow time for switch to settle. */
              timer->Timer_Counter = SETTLE_TIME;
              while(timer->Timer_Counter)
                    /* Make sure switch is open */
                    if(!(switch_status->Not_Execute)
                          || !(switch_status->Not_Skip))
                          timer->Timer_Counter = SETTLE_TIME;
```

```
                    LCD_display(START_LINE2, "Retrying\t");
                    break;
            }
    }
    return return_word;
}
/* end */

/**************************************************************************
Include File Name:    msgs_c.h
Number/Version:
History:
          Date         Rev     Author           Description
          23-Mar-1993 0.0     C. Houlberg           Baseline

Abstract:
          This file contains definitions used in implementing
          appendix C of MS-2217.
**************************************************************************/

     /* Protocol C definitions */
     #define MEMORY_CONFIG_REQ           0x0262
     #define MEMORY_DATA_LOAD_REQ        0x35
     #define ENTER_LOAD_REQ              0x07a4
     #define HEADER_REQ                  0x0684
     #define TRAILER_REQ                 0x06c2
     #define EXIT_LOAD_REQ               0x07a4
     #define MEMORY_DATA_VERIFY_REQ      0x15
     #define ENTER_VERIFY_REQ            0x07a4
     #define EXIT_VERIFY_REQ             0x07a4
     #define RRT_ERROR_REQ               0x06e1

     /* Function prototypes */
     int memory_configuration_response(LOOKUP_TABLE_TYPE
          *lookup_table_pointer, int *message_pointer);
     int enter_load_response(LOOKUP_TABLE_TYPE *lookup_table_pointer);
     int header_response(LOOKUP_TABLE_TYPE *lookup_table_pointer,
          int *data_pointer);
     int memory_data_load_response(LOOKUP_TABLE_TYPE *lookup_table_pointer,
          int *data_pointer, int amount);
     int trailer_response(LOOKUP_TABLE_TYPE *lookup_table_pointer,
          int *data_pointer);
     int exit_load_response(LOOKUP_TABLE_TYPE *lookup_table_pointer);
     int enter_verify_response(LOOKUP_TABLE_TYPE *lookup_table_pointer);
     int memory_data_verify_response(LOOKUP_TABLE_TYPE
          *lookup_table_pointer, int *message_pointer, int amount);
     int exit_verify_response(LOOKUP_TABLE_TYPE *lookup_table_pointer);
     int rrt_error_response(LOOKUP_TABLE_TYPE
          *lookup_table_pointer, int action);
     int activity_response(LOOKUP_TABLE_TYPE *lookup_table_pointer);

/* end */

/**************************************************************************
Module Name:    msgs_c.c
Number/Version:
History:
          Date         Rev     Author           Description
          23-Mar-1992 0.0     C. Houlberg       Baseline

Abstract:

          Impliments mesages for appendix C of MIL-STD-2217.
          Data checksum used for HEADER, MEMORY DATA, and
               TRAILER messages in Protocol C
**************************************************************************/

#include "rrt.h"                          /* RRT configuration */
#include "dsp.h"                          /* DSP definitions */
#include "system.h"                       /* System definitions */
#include "cardhdrs.h"                     /* Memory Card header definitions */
#include "wordtype.h"                     /* MS1553 word definitions */
#include "ms1553.h"                       /* MS-1553 functions and definitions */
#include "timer.h"                        /* Time function definitions */
#include "error.h"                        /* Error definitions */
#include "display.h"                      /* LCD display definitions */
#include "msgs_c.h"

/**************************************************************************
Name:        memory_configuration_response
```

```
Number/Version:
History:
            Date        Rev   Author           Description
            23-Mar-1992 0.0   C. Houlberg      Baseline
Inputs:
            lookup_table_pointer
            message_pointer
Outputs:
            return_word
Global Data:
            - None -
Functions Referenced:
            ms1553_respond
Abstract:
            Impliments the memory configuration response for protocol C.
***************************************************************************/

int memory_configuration_response(LOOKUP_TABLE_TYPE
      *lookup_table_pointer, int *message_pointer)
{
      /*    This message is utilized to read the current memory configuration
            of the unit. This message is only used when its use is indicated
            in the Lookup Table.
      */
      int command, message[33], return_word;

      /* Status response */
      message[0] = ((lookup_table_pointer->RRT_RT_Address) << 11);

      /* Memory configuration command */
      command = message[0] + MEMORY_CONFIG_REQ;

      /* Get message containing command and data words */
      return_word = ms1553_respond(&command, &message[0]);
      if(!return_word)
      {
            /* Transfer response to message_pointer location */
            *message_pointer++ = message[0];
            *message_pointer++ = message[1];
            *message_pointer = message[2];
      }
      else if(return_word == (UNEXPECTED_COMMAND + REPROGRAM_STATUS_COMMAND))
            return_word = STATUS_COMMAND + message[1];

      return return_word;                                   /* Return MS-1553 error */
}

/***************************************************************************
Name:       enter_load_response
Number/Version:
History:
            Date        Rev   Author           Description
            23-Mar-1992 0.0   C. Houlberg      Baseline

Inputs:
            lookup_table_pointer
Outputs:
            return_word
Global Data:
            - None -
Functions Referenced:
            ms1553_respond
Abstract:
            Impliments the enter load response for protocol C.
***************************************************************************/
int enter_load_response(LOOKUP_TABLE_TYPE *lookup_table_pointer)
{
      int command, message[33], return_word;

      /* Status word containing RRT RT address */
      message[0] = ((lookup_table_pointer->RRT_RT_Address) << 11);

      /* Reprogramming control message, enable programming */
      /* Enter expected enter load command */
      command = message[0] + ENTER_LOAD_REQ;

      /* Data */
      message[1] = lookup_table_pointer->BC_Nomenclature_MSW;
      message[2] = lookup_table_pointer->BC_Nomenclature_2SW;
      message[3] = lookup_table_pointer->BC_Nomenclature_LSW;
      message[4] = (((((lookup_table_pointer->Fill_Data) << 2)
```

```
        + MEMORY_LOAD) << 2) + lookup_table_pointer->Disc_Enable) << 6);

    /* Submit status and data words */
    return_word = ms1553_respond(&command, &message[0]);

    if(return_word == (UNEXPECTED_COMMAND + REPROGRAM_STATUS_COMMAND))
        return_word = STATUS_COMMAND + message[1];

    return return_word;
}

/*****************************************************************************
Name:           header_response
Number/Version:
History:
                Date        Rev   Author          Description
                23-Mar-1992 0.0   C. Houlberg     Baseline

Inputs:
                lookup_table_pointer
                    data_pointer
Outputs:
                return_word
Global Data:
                - None -
Functions Referenced:
                ms1553_respond
Abstract:
                Impliments the header response for protocol C.
*****************************************************************************/
int header_response(LOOKUP_TABLE_TYPE *lookup_table_pointer, int *data_pointer)
{
    /*  This message is used to pass load/Verify parameters to the unit.
    */
    int command, return_word;

    /* Status word containing RRT RT address */
    *data_pointer = ((lookup_table_pointer->RRT_RT_Address) << 11);

    /* Enter expected header command */
    command = *data_pointer + HEADER_REQ;

    /* Submit status and data words */
    return_word = ms1553_respond(&command, data_pointer);

    if(return_word == (UNEXPECTED_COMMAND + REPROGRAM_STATUS_COMMAND))
        return_word = STATUS_COMMAND + *(data_pointer + 1);

    return return_word;
}

/*****************************************************************************
Name:           memory_data_load_response
Number/Version:
History:
                Date        Rev   Author          Description
                23-Mar-1992 0.0   C. Houlberg     Baseline

Inputs:
                lookup_table_pointer
                data_pointer
                amount
Outputs:
                return_word
Global Data:
                - None -
Functions Referenced:
                ms1553_respond
Abstract:
                Impliments the memory data load response for protocol C.
*****************************************************************************/
int memory_data_load_response(LOOKUP_TABLE_TYPE *lookup_table_pointer,
    int *data_pointer, int amount)
{
    /*  this message is used to pass the data to be loaded into the
        unit memory.
    */
    int command, return_word;

    /* Status word containing RRT RT address */
    *data_pointer = ((lookup_table_pointer->RRT_RT_Address) << 11);
```

```
        /* Enter expected memory data load command */
        command = *data_pointer + (MEMORY_DATA_LOAD_REQ << 5) + (0x1f & amount);

        /* Submit status and data words */
        return_word = ms1553_respond(&command, data_pointer);

        if(return_word == (UNEXPECTED_COMMAND + REPROGRAM_STATUS_COMMAND))
             return_word = STATUS_COMMAND + *(data_pointer + 1);

        return return_word;
}

/*****************************************************************************
Name:        trailer_response
Number/Version:
History:
             Date        Rev   Author          Description
             23-Mar-1992 0.0   C. Houlberg     Baseline
Inputs:
             lookup_table_pointer
                  data_pointer
Outputs:
             return_word
Global Data:
             - None -
Functions Referenced:
             ms1553_respond
Abstract:
             Impliments the trailer response for protocol C.
*****************************************************************************/
int trailer_response(LOOKUP_TABLE_TYPE *lookup_table_pointer,
      int *data_pointer)
{
      /*    This message is used to pass the data checksum and additional
            Load/Verify parameters to the unit.
      */
      int command, return_word;

      /* Status word containing RRT RT address */
      *data_pointer = ((lookup_table_pointer->RRT_RT_Address) << 11);

      /* Enter expected trailer command */
      command = *data_pointer + TRAILER_REQ;

      /* Submit status and data words */
      return_word = ms1553_respond(&command, data_pointer);

      if(return_word == (UNEXPECTED_COMMAND + REPROGRAM_STATUS_COMMAND))
           return_word = STATUS_COMMAND + *(data_pointer + 1);

      return return_word;
}

/*****************************************************************************
Name:        exit_load_response
Number/Version:
History:
             Date        Rev   Author          Description
             23-Mar-1992 0.0   C. Houlberg     Baseline
Inputs:
             lookup_table_pointer
Outputs:
             return_word
Global Data:
             - None -
Functions Referenced:
             ms1553_respond
Abstract:
             Impliments the exit load response for protocol C.
*****************************************************************************/
int exit_load_response(LOOKUP_TABLE_TYPE *lookup_table_pointer)
{
      int command, message[33], return_word;

      /* Status word containing RRT RT address */
      message[0] = ((lookup_table_pointer->RRT_RT_Address) << 11);

      /* Enter expected exit load command */
      command = message[0] + EXIT_LOAD_REQ;
```

```
        /* Data */
        message[1] = lookup_table_pointer->BC_Nomenclature_MSW;
        message[2] = lookup_table_pointer->BC_Nomenclature_2SW;
        message[3] = lookup_table_pointer->BC_Nomenclature_LSW;
        message[4] = ((((lookup_table_pointer->Fill_Data) << 6)
              + lookup_table_pointer->Disc_Disable) << 4);

        /* Submit status and data words */
        return_word = ms1553_respond(&command, &message[0]);

        if(return_word == (UNEXPECTED_COMMAND + REPROGRAM_STATUS_COMMAND))
              return_word = STATUS_COMMAND + message[1];

        return return_word;
}

/******************************************************************************
Name:       enter_verify_response
Number/Version:
History:
            Date         Rev   Author          Description
            23-Mar-1992  0.0   C. Houlberg     Baseline

Inputs:
            lookup_table_pointer
Outputs:
            return_word
Global Data:
            - None -
Functions Referenced:
            ms1553_respond
Abstract:
            Impliments the enter verify response for protocol C.
******************************************************************************/
int enter_verify_response(LOOKUP_TABLE_TYPE     *lookup_table_pointer)
{
        int command, message[33], return_word;

        /* Status word containing RRT RT address */
        message[0] = ((lookup_table_pointer->RRT_RT_Address) << 11);

        /* Enter expected enter verify command */
        command = message[0] + ENTER_VERIFY_REQ;

        /* Data */
        message[1] = lookup_table_pointer->BC_Nomenclature_MSW;
        message[2] = lookup_table_pointer->BC_Nomenclature_2SW;
        message[3] = lookup_table_pointer->BC_Nomenclature_LSW;
        message[4] = ((((lookup_table_pointer->Fill_Data) << 2)
              + MEMORY_VERIFY) << 8);

        /* Submit status and data words */
        return_word = ms1553_respond(&command, &message[0]);

        if(return_word == (UNEXPECTED_COMMAND + REPROGRAM_STATUS_COMMAND))
              return_word = STATUS_COMMAND + message[1];

        return return_word;
}

/******************************************************************************
Name:       memory_data_verify_response
Number/Version:
History:
            Date         Rev   Author          Description
            23-Mar-1992  0.0   C. Houlberg     Baseline

Inputs:
            lookup_table_pointer
            message_pointer
            amount
Outputs:
            return_word
Global Data:
            - None -
Functions Referenced:
            ms1553_respond
Abstract:
```

```
            Implliments the memory data verify response for protocol C.
*******************************************************************************/
int memory_data_verify_response(LOOKUP_TABLE_TYPE
      *lookup_table_pointer, int *message_pointer, int amount)
{
      /*    This message is used to pass the data that the MLV will compare to
            the data stored on the MSD.
      */
      int command, message[33], return_word;

      /* Status response */
      *message_pointer = ((lookup_table_pointer->RRT_RT_Address) << 11);

      /* Enter expected memory data verify command */
      command = *message_pointer
            + (MEMORY_DATA_VERIFY_REQ << 5) + (0x1f & amount);

      /* Wait for command and data words */
      return_word = ms1553_respond(&command, message_pointer);

      if(return_word == (UNEXPECTED_COMMAND + REPROGRAM_STATUS_COMMAND))
            return_word = STATUS_COMMAND + *(message_pointer + 1);

      return return_word;
}

/*******************************************************************************
Name:       exit_verify_response
Number/Version:
History:
            Date        Rev  Author          Description
            23-Mar-1992 0.0  C. Houlberg     Baseline

Inputs:
            lookup_table_pointer
Outputs:
            return_word
Global Data:
            - None -
Functions Referenced:
            ms1553_respond
Abstract:
            Impliments the exit verify response for protocol C.
*******************************************************************************/
int exit_verify_response(LOOKUP_TABLE_TYPE *lookup_table_pointer)
{
      int command, message[33], return_word;

      /* Status word containing RRT RT address */
      message[0] = ((lookup_table_pointer->RRT_RT_Address) << 11);

      /* Enter expected exit verify command */
      command = message[0] + EXIT_VERIFY_REQ;

      /* Data */
      message[1] = lookup_table_pointer->BC_Nomenclature_MSW;
      message[2] = lookup_table_pointer->BC_Nomenclature_2SW;
      message[3] = lookup_table_pointer->BC_Nomenclature_LSW;
      message[4] = ((lookup_table_pointer->Fill_Data) << 10);

      /* Submit status and data words */
      return_word = ms1553_respond(&command, &message[0]);

      if(return_word == (UNEXPECTED_COMMAND + REPROGRAM_STATUS_COMMAND))
            return_word = STATUS_COMMAND + message[1];

      return return_word;
}

/*******************************************************************************
Name:       rrt_error_response
Number/Version:
History:
            Date        Rev  Author          Description
            23-Mar-1992 0.0  C. Houlberg     Baseline

Inputs:
            lookup_table_pointer
            action
Outputs:
            return_word
```

```
Global Data:
            - None -
Functions Referenced:
            ms1553_respond
Abstract:
            Impliments the rrt error response for protocol C.
*****************************************************************************/
int rrt_error_response(LOOKUP_TABLE_TYPE
      *lookup_table_pointer, int action)
{
      /*    If an MLV error occurs, the MLV will set the BUSY bit in the
            Status Response Word for all messages and suppress transmission of
            any Data Words. The BC will then poll the MLV with Activity Messages.
            When the MLV is ready for the BC to command the MLV Error Message,
            it will clear the Busy bit, set the Service Request bit in the
            Status Request bit in the Status Response Word to the Activity
            Message, and transmit the Data Word requesting that the BC command
            the MLV error message.
      */
      int command, message[33], return_word;

      /* Status word containing RRT RT address */
      message[0] = ((lookup_table_pointer->RRT_RT_Address) << 11);

      /* Enter expected error command */
      command = message[0] + RRT_ERROR_REQ;

      message[1] = action;

      /* Submit status and data words */
      return_word = ms1553_respond(&command, &message[0]);

      if(return_word == (UNEXPECTED_COMMAND + REPROGRAM_STATUS_COMMAND))
            return_word = STATUS_COMMAND + message[1];

      return return_word;
}

/*****************************************************************************
Name:       activity_response
Number/Version:
History:
            Date        Rev   Author            Description
            01-Jul-1992 0.0   C. Houlberg       Baseline

Inputs:
            lookup_table_pointer
                  data_pointer
Outputs:
            return_word
Global Data:
            - None -
Functions Referenced:
            ms1553_respond
Abstract:
            Impliments test of activity for protocol C.
*****************************************************************************/
int activity_response(LOOKUP_TABLE_TYPE *lookup_table_pointer)
{
      int command, message[33];
      int return_word;

      /* Status word containing RRT RT address */
      message[0] = ((lookup_table_pointer->RRT_RT_Address) << 11);
      message[1] = 0;

      /* Enter expected activity command */
      command = message[0] + ACTIVITY;

      /* Submit status and data words */
      return_word = ms1553_respond(&command, &message[0]);

      if(return_word == (UNEXPECTED_COMMAN.. + REPROGRAM_STATUS_COMMAND))
            return_word = STATUS_COMMAND . message[1];

      return return_word;
}

/* end */
```

```
/*******************************************************************************
Include File Name:    protod.h
Number/Version:
History:
          Date         Rev   Author           Description
          23-Mar-1993 0.0   C. Houlberg      Baseline

Abstract:
*******************************************************************************/

/*    Function prototypes
*/
int protocol_d(int address, int automode);
int upload_d(LOOKUP_TABLE_TYPE *header, int file_address);
int verify_d(LOOKUP_TABLE_TYPE *header, int file_address);

/* end */


/*******************************************************************************
Module Name:  protod.c
Number/Version:
History:
          Date         Rev   Author           Description
          16-Jun-1993 0.0   C. Houlberg      Baseline

Abstract:
          Implements appendix D of MIL-STD-2217 for
          Rapid Reprogramming Terminal use.
*******************************************************************************/

#include "rrt.h"                               /* RRT configuration */
#include "dsp.h"                               /* DSP definitions */
#include "system.h"                            /* System definitions */
#include "cardhdrs.h"                          /* Memory card header definitions */
#include "wordtype.h"                          /* Word definitions */
#include "display.h"                           /* LCD display definitions */
#include "timer.h"                             /* Timer definitions */
#include "error.h"                             /* Error definitions */
#include "initprot.h"                          /* Protocol state table def */
#include "msgs_d.h"                            /* Protocol D message definitions */
#include "protod.h"                            /* Protocol D definitions */

/*******************************************************************************
Name:  protocol_d
Number/Version:
History:
          Date         Rev   Author           Description
          16-Jun-1993 0.0   C. Houlberg      Baseline

Inputs:
          address
          automode
Returns:
          0 for success
          non-zero error message for failure

Global Data:
          - None-

Functions Referenced:
          memory_card_read()
          LCD_display()
          msec_timer()
          d_command_message()
          init_protocol()
          upload_d()
          verify_d()
Abstract:
          Implements appendix D of MIL-STD-2217
*******************************************************************************/
int protocol_d(int address, int automode)
{
     LOOKUP_TABLE_UNION header;
     LOOKUP_TABLE_UNION *header_union;
     LOOKUP_TABLE_UNION next_header;
     LOOKUP_TABLE_UNION *next_header_union;
     STATE_TABLE_TYPE state_table;
     STATE_TABLE_TYPE *state;
     PPI3_REG_TYPE *switch_status;          /* Switch status pointer */
     PPI2_REG_TYPE *equipment_discretes;    /* Equipment discretes pointer */
```

```
int file_address;
int return_word;
int delay;
int i;
char ascii_string[13];

TIMER_REG_TYPE *timer;        /* Pointer to timer counter register.*/
timer = (TIMER_REG_TYPE *) &TIMER0;

switch_status = (PPI3_REG_TYPE *) &PPI3;
equipment_discretes = (PPI2_REG_TYPE *) &PPI2;

state = &state_table;
header_union = &header;
next_header_union = &next_header;

/*  The following function is used by this protocol to establish
    the initial value of the variables:
      state->another_upload,
      state->another_verify,
*/
return_word = init_protocol(address, state);

while((state->another_upload || state->another_verify) && !return_word)
{
      /* Set up file address to point to lookup table */
      file_address = address;

      /* Read in file lookup table */
      for(i = 0; i < SIZE_LOOKUP_TABLE; i++)
            header_union->array[i] = memory_card_read(file_address++);

      /* Establish delay between messages */
      delay = header_union->structure.Delay;

      /* Process indication for init_file() */
      state->process = UPLOADING;

      while((state->another_upload) && !return_word)
      {
            /* Form filename */
            for(i = 0; i < 6; i++)
            {
                  ascii_string[i+i] = (char) (0xff & header_union->array[i]);
                  ascii_string[i+i+1] = (char)
                        (0xff & (header_union->array[i] >> 8));
            }
            ascii_string[12] = 0;              /* End of string indicator */
            /* Display filename */
            LCD_display(START_LINE1 + 7, &ascii_string[0]);

            /* Send the Initiate Load message */
            return_word = d_command_message(
                  (LOOKUP_TABLE_TYPE *)header_union, D_INITIATE_LOAD);

            /* If NO_RESPONSE inform user to power up AYK14 */
            if(return_word == NO_RESPONSE)
            {
                  /* Set IPL in preparation of AYK14 power up */
                  equipment_discretes->AYK14_Discretes
                        |= (header_union->structure.AYK14_IPL) << 4;

                  LCD_display(START_LINE2, "Turn On MC\t");
                  i = 0;
                  if(header_union->structure.AYK14_Correlation & 0x01)
                        ascii_string[i++] = '1';
                  if(header_union->structure.AYK14_Correlation & 0x02)
                  {
                        if(i)
                              ascii_string[i++] = ',';
                        ascii_string[i++] = '2';
                  }
                  if(header_union->structure.AYK14_Correlation & 0x04)
                  {
                        if(i)
                              ascii_string[i++] = ',';
                        ascii_string[i++] = '3';
                  }
                  if(header_union->structure.AYK14_Correlation & 0x08)
                  {
                        if(i)
```

```
				ascii_string[i++] = ',';
			ascii_string[i++] = '4';
		}
		ascii_string[i++] = '\t';			/* Clear rest of line */
		ascii_string[i] = 0;
		LCD_display(START_LINE2 + 10, &ascii_string[0]);

		do
		{
			/* Delay next message */
			msec_timer(delay, timer);

			return_word = d_command_message(
				(LOOKUP_TABLE_TYPE *)header_union,
				D_INITIATE_LOAD);

		} while((return_word == NO_RESPONSE)
			&& (switch_status->Not_Skip));

		if(!(switch_status->Not_Skip))
		{
			return_word = ABORT_OCCURRED;
			LCD_display(START_LINE1, "ABORT:\rEXEC to Continue\t");

			/* Allow time for switch to settle. */
			timer->Timer_Counter = SETTLE_TIME;
			while(timer->Timer_Counter)
				/* Make sure switch is open */
				if(!(switch_status->Not_Skip))
					timer->Timer_Counter = SETTLE_TIME;
		}
	}

	/* Delay next message */
	msec_timer(delay, timer);

	/* Clear IPL to start reprogram of AYK14 */
	equipment_discretes->AYK14_Discretes &= 0x0f;

	/*	The following function is used here by this protocol to
		establish or update the value of the variables:
			state->another_upload,
			state->next_file_address.
		Variable established locally and used by this function is:
			state->process = UPLOADING.
	*/
	if(!(return_word))
	{
		init_file(file_address, header_union,
			next_header_union, state);

		/* Display Load message and load the data */
		LCD_display(START_LINE2, "Uploading\t");

		return_word = upload_d((LOOKUP_TABLE_TYPE *)header_union,
			file_address);
	}

	if(!(return_word))
		if(state->another_upload)
		{
			/* Make address of next file the current file address,
				skips lookup table. */
			file_address = state->next_file_address;
			/* Move next header to current header location */
			for(i = 0; i < SIZE_LOOKUP_TABLE; i++)
				header_union->array[i] = next_header_union->array[i];
		}
		else
		{
			/* Indicate load done */
			LCD_display(START_LINE2, "Upload Done\t");
		}
}
if(!(return_word))
{
	/* Set up file address to point to lookup table */
	file_address = address;

	/* Read in file lookup table */
	for(i = 0; i < SIZE_LOOKUP_TABLE; i++)
		header_union->array[i] = memory_card_read(file_address++);
```

```
        /* Process indication for init_file() */
        state->process = VERIFYING;
}

while((state->another_verify) && !return_word)
{
        /* Form filename */
        for(i = 0; i < 6; i++)
        {
                ascii_string[i+i] = (char) (0xff & header_union->array[i]);
                ascii_string[i+i+1] = (char)
                        (0xff & (header_union->array[i] >> 8));
        }
        ascii_string[12] = 0;                   /* End of string indicator */
        /* Display filename */
        LCD_display(START_LINE1 + 7, &ascii_string[0]);

        /* Send the Initiate Verify message */
        return_word = d_command_message(
                (LOOKUP_TABLE_TYPE *)header_union, D_INITIATE_VERIFY);

        /* If NO_RESPONSE inform user to power up AYK14 */
        if(return_word == NO_RESPONSE)
        {
                /* Set IPL in preparation of AYK14 power up */
                equipment_discretes->AYK14_Discretes
                        |= (header_union->structure.AYK14_IPL) << 4;

                LCD_display(START_LINE2, "Turn On MC\t");
                i = 0;
                if(header_union->structure.AYK14_Correlation & 0x01)
                        ascii_string[i++] = '1';
                if(header_union->structure.AYK14_Correlation & 0x02)
                {
                        if(i)
                                ascii_string[i++] = ',';
                        ascii_string[i++] = '2';
                }
                if(header_union->structure.AYK14_Correlation & 0x04)
                {
                        if(i)
                                ascii_string[i++] = ',';
                        ascii_string[i++] = '3';
                }
                if(header_union->structure.AYK14_Correlation & 0x08)
                {
                        if(i)
                                ascii_string[i++] = ',';

                        ascii_string[i++] = '4';
                }
                ascii_string[i++] = '\t';               /* Clear rest of line */
                ascii_string[i] = 0;
                LCD_display(START_LINE2 + 10, &ascii_string[0]);

                do
                {
                        /* Delay next message */
                        msec_timer(delay, timer);

                        return_word = d_command_message(
                                (LOOKUP_TABLE_TYPE *)header_union,
                                D_INITIATE_LOAD);

                } while((return_word == NO_RESPONSE)
                        && (switch_status->Not_Skip));

                if(!(switch_status->Not_Skip))
                {
                        return_word = ABORT_OCCURRED;
                        LCD_display(START_LINE1, "ABORT:\rEXEC to Continue\t");

                        /* Allow time for switch to settle. */
                        timer->Timer_Counter = SETTLE_TIME;
                        while(timer->Timer_Counter)
                                /* Make sure switch is open */
                                if(!(switch_status->Not_Skip))
                                        timer->Timer_Counter = SETTLE_TIME;
                }

                if(!return_word)
                        return_word = d_command_message(
                                (LOOKUP_TABLE_TYPE *)header_union, D_INITIATE_LOAD);
```

```
                }

                /* Delay next message */
                msec_timer(delay, timer);

                /*    The following function is used here by this protocol to
                      establish or update the value of the variables:
                            state->another_upload,
                            state->another_verify,
                            state->next_file_address.
                      Variable established locally and used by this function is:
                            state->process = VERIFYING.
                */
                if(!(return_word))
                {
                      init_file(file_address, header_union,
                            next_header_union, state);

                      /* Verify the data */
                      /* Test if loading Memory Card */
                      if(status_flags.DOWNLOAD)
                            /* Display Download message */
                            LCD_display(START_LINE2, "Download\t");
                      else
                            /* Display Verify message */
                            LCD_display(START_LINE2, "Verifying\t");

                      return_word = verify_d((LOOKUP_TABLE_TYPE *)header_union,
                            file_address);
                }

                if(!(return_word))
                      if(state->another_verify)
                      {
                            /* Make address of next file the current file address,
                                  skips lookup table. */
                            file_address = state->next_file_address;
                            /* Move next header to current header location */
                            for(i = 0; i < SIZE_LOOKUP_TABLE; i++)
                                  header_union->array[i] = next_header_union->array[i];
                      }
                      else
                      {
                            /* Test if loaded Memory Card */
                            if(status_flags.DOWNLOAD)
                                  /* Display Download complete indication */
                                  LCD_display(START_LINE2, "Download Done\t");
                            else
                                  /* Display Verify complete indication */
                                  LCD_display(START_LINE2, "Data Verified\t");
                      }
          }

          /* Update address to location of next lookup table */
          address = state->next_file_address - SIZE_LOOKUP_TABLE;
     }
     return return_word;
}

/*****************************************************************************
Name:  upload_d
Number/Version:
History:
          Date         Rev   Author         Description
          16-Jun-1993 0.0   C. Houlberg    Baseline

Inputs:
          header_pointer
          file_address
Returns:
          0 for success
          non-zero error message for failure

Global Data:
          - None-

Functions Referenced:
          d_command_message()
          d_status_message()
          d_header_message()
```

```
            d_memory_data_load_message()
            d_trailer_message()
            ascii_conversion()
            LCD_display()
            msec_timer()

Abstract:

****************************************************************************/
int upload_d(LOOKUP_TABLE_TYPE *header_pointer, int file_address)
{
      HEADER_WORD_TYPE *header;                /* Pointer to header message data */
      TIMER_REG_TYPE *timer0;                  /* Pointer to timer counter register */
      TIMER_REG_TYPE *timer1;                  /* Pointer to timer counter register */
      PPI2_REG_TYPE *discrete_pointer;         /* Pointer to IPL discretes */
      int i, file_size;
      int data_word_count, data_amount;
      int data_location;
      int transfer_mode, header_type;
      int buffer_xfer_count;
      int load_address;
      int transfer_count, transfer_amount;
      int message_amount;
      int return_word = NO_ERROR;
      int message[33];
      int delay, busy_count;
      int checksum_adjustment;
      char ascii_string[5];

      timer0 = (TIMER_REG_TYPE *) &TIMER0;
      timer1 = (TIMER_REG_TYPE *) &TIMER1;

      discrete_pointer = (PPI2_REG_TYPE *) &PPI2;

      /* Header message data word 1 pointer */
      header = (HEADER_WORD_TYPE *) &message[1];

      /* Establish delay between messages and busy count */
      delay = header_pointer->Delay;
      busy_count = header_pointer->Auto_Busy_Count;

      /* File size measured in bytes */
      file_size = (header_pointer->File_Size_MSW << 16)
            + header_pointer->File_Size_LSW;

      /* Initialize data counter */
      data_word_count = (file_size + 1) >> 1;

      /* Transfer data */
      while(data_word_count && !(return_word))       /* Transfer all data */
      {
            /* Initialize location of data to transfer */
            data_location = file_address;

            /* Filter out all transactions with
                  undefined or reserved header types */
            do

            {
                  /* Gather header data words */
                  for(i = 1; i <= 4; i++)
                        message[i] = memory_card_read(data_location++);

                  header_type = header->Header_Type;
                  if(header_type != WORD_COUNT)
                  {
                        data_location += 2;     /* Skip Trailer to next header */
                        data_word_count -= 6;   /* Subtract null transaction */
                  }

            } while(header_type != WORD_COUNT);

            /* Extract load descriptors */
            transfer_mode = header->Transfer_Mode;
            buffer_xfer_count = header->Buffer_Xfer_Count;
            load_address = message[2];

            /* Display page number for transaction */
            ascii_conversion((message[4] >> 3), &ascii_string[0]);
            LCD_display(START_LINE2 + 16, &ascii_string[0]);
```

```
/* Acount for maximum buffer count */
if(transfer_mode && !buffer_xfer_count)
      buffer_xfer_count = MAX_BUFFER_COUNT;

/* Acount for no transfer and header & trailer data */
if(transfer_mode == NO_XFER)
{
      transfer_count = 0;
      data_amount = 6;
}
else
{
      transfer_count = buffer_xfer_count;
      data_amount = transfer_count + 6;
}

/* Ensure Transfer Control agrees with transfer_count */
if(((message[4] & TC_MASK) == LAST_TRANSACTION)
      && (data_amount != data_word_count))
      return_word = TC_ERROR;

/* Ensure data amount transferring does
      not exceed data left to transfer */
if(data_amount > data_word_count)
      return_word = DATA_COUNT_ERROR;

/* Acount for verify following load in Transfer Control bits */
if(header_pointer->Verify_After_Load)
{
      checksum_adjustment = ANOTHER_TRANSACTION - (message[4] & TC_MASK);
      message[4] = (message[4] & ~TC_MASK) + ANOTHER_TRANSACTION;
}
else
      checksum_adjustment = 0;
/* Send IPL read message */
i = 0;                          /* Initialize counter */
do                              /* do while statement */
{
      return_word = d_command_message(header_pointer, D_IPL_READ);

      /* Delay next message */
      msec_timer(delay, timer0);

} while((return_word == BUSY_CONDITION) && (i++ < busy_count));

if(!(return_word))
{
      /* Send get status message */
      i = 0;                          /* Initialize counter */
      do                              /* do while statement */
      {
            return_word = d_status_message(header_pointer);

            /* Delay next message */
            msec_timer(delay, timer0);

      } while(((return_word == BUSY_CONDITION)
            || (return_word == NOT_DATA_READY)) && (i++ < busy_count));
}

if(!(return_word))
{
      /* Send the Header message */
      return_word = d_header_message(header_pointer, &message[0]);

      /* Delay next message */
      msec_timer(delay, timer0);
}

if(!(return_word))
{
      /* Send get status message */
      i = 0;                          /* Initialize counter */
      do                              /* do while statement */
      {
            return_word = d_status_message(header_pointer);

            /* Delay next message */
            msec_timer(delay, timer0);

      } while(((return_word == BUSY_CONDITION)
            || (return_word == NOT_DATA_READY)) && (i++ < busy_count));
```

```
}

if(transfer_count)
{
      /* Set up timer0 for address display interval */
      timer0->Timer_Counter = HALFSEC;

      /* Send the Data Load messages */
      transfer_amount = transfer_count;
      while(transfer_count && !(return_word))
      {
            message_amount = 32;          /* Maximum words per message */
            if(message_amount > transfer_count)
            {                             /* Fewer words left to send */
                  message_amount = transfer_count;    /* Amount sending */
                  transfer_count = 0;
            }
            else                          /* Count of words left */
                  transfer_count -= message_amount;

            /* Ready data for transfer, command inserted later */
            for(i = 1; i <= message_amount; i++)
                  message[i] = memory_card_read(data_location++);

            /* Display address */
            ascii_conversion(load_address + transfer_amount
                  - (transfer_count + message_amount), &ascii_string[0]);
            LCD_display(START_LINE2 + 11, &ascii_string[0]);

            return_word = d_memory_data_load_message(header_pointer,
                  &message[0], message_amount);

            /* Delay next message */
            msec_timer(delay, timer1);
      }

      if(!(return_word))
      {
            /* Send get status message */
            i = 0;                        /* Initialize counter */
            do                            /* do while statement */
            {
                  return_word = d_status_message(header_pointer);

                  /* Delay next message */
                  msec_timer(delay, timer0);

            } while(((return_word == BUSY_CONDITION)
                  || (return_word == NOT_DATA_READY)) && (i++ < busy_count));
      }

if(!(return_word))
{
      for(i = 1; i <= 2; i++)
            message[i] = memory_card_read(data_location++);

      /* Adjust checksum if necessage */
      message[2] = 0xffff & (message[2] + checksum_adjustment);

      /* Send the trailer message */
      return_word = d_trailer_message(header_pointer, &message[0]);

      /* Delay next message */
      msec_timer(delay, timer0);
}
if(!(return_word))
{
      /* Send get status message */
      i = 0;                        /* Initialize counter */
      do                            /* do while statement */
      {
            return_word = d_status_message(header_pointer);

            /* Delay next message */
            msec_timer(delay, timer0);

      } while(((return_word == BUSY_CONDITION)
            || (return_word == NOT_DATA_READY)) && (i++ < busy_count));
}

if(!(return_word) && (header_pointer->IPL_Fail_Used))
```

```
        {
              /* Test the IPL Fail discrete */
              if((header_pointer->AYK14_IPL) & (discrete_pointer->IPL_Fail))
                   return_word = IPL_FAIL_ERROR;
        }

        if(!(return_word))
        {
              file_address = data_location;
              data_word_count -= data_amount;
        }
    }

    /* Return status of load */
    return return_word;                              /* Load completed or aborted */
}

/****************************************************************************
Name:  verify_d
Number/Version:
History:
          Date         Rev   Author          Description
          16-Jun-1993  0.0   C. Houlberg     Baseline

Inputs:
          header_pointer
          file_address
Returns:
          0 for success
          non-zero error message for failure

Global Data:
          - None-

Functions Referenced:
          d_command_message()
          d_status_message()
          d_header_message()
          d_memory_data_verify_message()
          d_trailer_message()
          ascii_conversion()
          LCD_display()
          msec_timer()

Abstract:
          Verifies data
****************************************************************************/

int verify_d(LOOKUP_TABLE_TYPE *header_pointer, int file_address)
{
     HEADER_WORD_TYPE *header;             /* Pointer to header message data */
     TIMER_REG_TYPE *timer0;               /* Pointer to timer counter register */
     TIMER_REG_TYPE *timer1;               /* Pointer to timer counter register */
     int i, file_size;
     int data_word_count, data_amount;
     int data_location;
     int transfer_mode, header_type;
     int buffer_xfer_count;
     int load_address;
     int transfer_count, transfer_amount;
     int message_amount;
     int return_word = NO_ERROR;
     int message[33];
     int checksum;
     int delay, busy_count;
     char ascii_string[5];

     timer0 = (TIMER_REG_TYPE *) &TIMER0;
     timer1 = (TIMER_REG_TYPE *) &TIMER1;

     /* Header message data word 1 pointer */
     header = (HEADER_WORD_TYPE *) &message[1];

     /* Establish delay between messages */
     delay = header_pointer->Delay;
     busy_count = header_pointer->Auto_Busy_Count;

     /* File size measured in bytes */
     file_size = (header_pointer->File_Size_MSW << 16)
          + header_pointer->File_Size_LSW;

     /* Initialize data counter */
     data_word_count = (file_size + 1) >> 1;
```

```
/* Transfer data */
while(data_word_count && !(return_word))  /* Transfer all data */
{
     checksum = 0;                         /* Clear the checksum */

     /* Initialize location of data to transfer */
     data_location = file_address;

     /* Filter out all transactions with
          undefined or reserved header types */
     do
     {
          /* Gather header data words */
          for(i = 1; i <= 4; i++)
          {
               message[i] = memory_card_read(data_location++);
               checksum += message[i];
          }

          header_type = header->Header_Type;
          if(header_type != WORD_COUNT)
          {
               checksum = 0;          /* Start checksum over */
               data_location += 2;    /* Skip Trailer to next header */
               data_word_count -= 6;  /* Subtract null transaction */
          }

     } while(header_type != WORD_COUNT);

     /* Extract load descriptors */
     transfer_mode = header->Transfer_Mode;
     buffer_xfer_count = header->Buffer_Xfer_Count;
     load_address = message[2];

     /* Display page number for transaction */
     ascii_conversion((message[4] >> 3), &ascii_string[0]);
     LCD_display(START_LINE2 + 16, &ascii_string[0]);

     /* Acount for maximum buffer count */
     if(transfer_mode && !buffer_xfer_count)
          buffer_xfer_count = MAX_BUFFER_COUNT;

     /* Acount for no transfer and header & trailer data */
     if(transfer_mode == NO_XFER)
     {
          transfer_count = 0;
          data_amount = 6;
     }
     else
     {
          transfer_count = buffer_xfer_count;
          data_amount = transfer_count + 6;
     }

     /* Ensure Transfer Control agrees with transfer_count */
     if(((message[4] & TC_MASK) == LAST_TRANSACTION)
          && (data_amount != data_word_count))
          return_word = TC_ERROR;

     /* Ensure data amount transferring does
          not exceed data left to transfer */
     if(data_amount > data_word_count)
          return_word = DATA_COUNT_ERROR;

     /* Send IPL read message */
     i = 0;                      /* Initialize counter */
     do                          /* do while statement */
     {
          return_word = d_command_message(header_pointer, D_IPL_READ);

          /* Delay next message */
          msec_timer(delay, timer0);

     } while((return_word == BUSY_CONDITION) && (i++ < busy_count));

     if(!(return_word))
     {
          /* Send get status message */
          i = 0;                      /* Initialize counter */
          do                          /* do while statement */
          {
               return_word = d_status_message(header_pointer);
```

```
            /* Delay next message */
            msec_timer(delay, timer0);

        } while(((return_word == BUSY_CONDITION)
            || (return_word == NOT_DATA_READY)) && (i++ < busy_count));
    }

    if(!(return_word))
    {
        /* Send the Header message */
        return_word = d_header_message(header_pointer, &message[0]);

        /* Delay next message */
        msec_timer(delay, timer0);
    }

    if(!(return_word))
    {
        /* Send get status message */
        i = 0;                          /* Initialize counter */
        do                              /* do while statement */
        {
            return_word = d_status_message(header_pointer);

            /* Delay next message */
            msec_timer(delay, timer0);

        } while(((return_word == BUSY_CONDITION)
            || (return_word == NOT_DATA_READY)) && (i++ < busy_count));
    }

    if(transfer_count)
    {
        /* Set up timer0 for address display interval */
        timer0->Timer_Counter = HALFSEC;

        /* Send the Data Verify messages */
        transfer_amount = transfer_count;
        while(transfer_count && !(return_word))
        {
            message_amount = 32;            /* Maximum words per message */
            if(message_amount > transfer_count)
            {
                message_amount = transfer_count;    /* Amount sending */
                transfer_count = 0;             /* Count of words left */
            }
            else                                /* Count of words left */
                transfer_count -= message_amount;

            /* Display address */
            ascii_conversion(load_address + transfer_amount
                - (transfer_count + message_amount), &ascii_string[0]);
            LCD_display(START_LINE2 + 11, &ascii_string[0]);

            return_word = d_memory_data_verify_message(header_pointer,
                &message[0], message_amount);

            /* Delay next message */
            msec_timer(delay, timer1);

            if(!(return_word))
            {
                /* Set up data to store or verify */
                for(i = 1; (i <= message_amount) && !return_word;
                    i++, data_location++)
                {
                    checksum += message[i];

                    /* Test if downloading to Memory Card */
                    if(status_flags.DOWNLOAD)
                    {                           /* Store data in Memory Card */
                        return_word = memory_card_write(data_location,
                            message[i]);
                    }
                    else                        /* Verify data with Memory Card */
                    {
                        if(message[i] != memory_card_read(data_location))
                            return_word = VERIFY_ERROR
                                + load_address + transfer_amount
                                - (transfer_count + message_amount)
                                + i - 2;
```

```
                    }
                }
            }
        }

        if(!(return_word))
        {
            /* Send get status message */
            i = 0;                          /* Initialize counter */
            do                              /* do while statement */
            {
                return_word = d_status_message(header_pointer);

                /* Delay next message */
                msec_timer(delay, timer0);

            } while(((return_word == BUSY_CONDITION)
                || (return_word == NOT_DATA_READY)) && (i++ < busy_count));
        }
    }
    if(!(return_word))
    {
        /* Set up data for trailer message */
        message[1] = memory_card_read(data_location++);
        checksum = 0xffff & (checksum + message[1]);
        message[2] = checksum;

        /* Test if downloading to Memory Card */
        if(status_flags.DOWNLOAD)
            return_word = memory_card_write(data_location, checksum);
        else                    /* Verify checksum with Memory Card */
            if(checksum != memory_card_read(data_location))
                return_word = CHECKSUM_ERROR;

        /* Keep data location in step for next transaction */
        data_location++;
    }

    if(!(return_word))
    {
        /* Send the Trailer message (end verify) */
        return_word = d_trailer_message(header_pointer, &message[0]);

        /* Delay next message */
        msec_timer(delay, timer0);
    }

    if(!(return_word))
    {
        /* Send get status message */
        i = 0;                          /* Initialize counter */
        do                              /* do while statement */
        {
            return_word = d_status_message(header_pointer);

            /* Delay next message */
            msec_timer(delay, timer0);

        } while(((return_word == BUSY_CONDITION)
            || (return_word == NOT_DATA_READY)) && (i++ < busy_count));
    }

    if(!(return_word))
    {
        file_address = data_location;
        data_word_count -= data_amount;
    }
  }

  /* Return status of verify */
  return return_word;                               /* Verify completed */
}

/* end */

/*****************************************************************************
Include File Name:    msgs_d.h
Number/Version:
History:
        Date          Rev   Author              Description
        22-Mar-1993 0.0     B. Malmberg
```

```
Abstract:
            This file contains define statements for setting the status word in
            protocol D.
******************************************************************************/

     /* Protocol D command definitions */
    #define D_GET_STATUS                0x0401
    #define D_MODE_COMMAND              0x0011
    #define D_INITIATE_LOAD             0x0014
    #define D_INITIATE_VERIFY           0x0013
    #define D_IPL_READ                  0x0015
    #define D_HEADER                    0x0024
    #define D_MEMORY_DATA_LOAD          0x0020
    #define D_MEMORY_DATA_VERIFY        0x0420
    #define D_TRAILER                   0x0022

     /*  Prototype of procedures called by protocol_d().
     */
     int d_status_message(LOOKUP_TABLE_TYPE *header);
     int d_command_message(LOOKUP_TABLE_TYPE *header, int command);
     int d_header_message(LOOKUP_TABLE_TYPE *header, int *data_pointer);
     int d_memory_data_load_message(LOOKUP_TABLE_TYPE *header,
          int *data_pointer, int amount);
     int d_memory_data_verify_message(LOOKUP_TABLE_TYPE *header,
          int *data_pointer, int amount);
     int d_trailer_message(LOOKUP_TABLE_TYPE *header, int *data_pointer);

/* end */


/******************************************************************************
Module Name:    msgs_d.c
Number/Version:
History:
          Date        Rev     Author                  Description
          22-Mar-1993 0.0     B. Malmberg

Abstract:
          Impliments appendix D of MIL-STD-2217.
******************************************************************************/

#include "rrt.h"                  /* RRT configuration                    */
#include "dsp.h"                  /* DSP definitions                      */
#include "system.h"               /* System definitions                   */
#include "cardhdrs.h"             /* Memory card header definitions       */
#include "wordtype.h"             /* Word definitions                     */
#include "display.h"              /* LCD display definitions              */
#include "timer.h"                /* Timer definitions                    */
#include "error.h"                /* Error definitions                    */
#include "initprot.h"             /* Protocol state table definitions     */
#include "msgs_d.h"               /* Protocol message definitions         */
/******************************************************************************
Name:         d_status_message
Number/Version:
History:
          Date        Rev     Author                  Description
          22-Mar-1993 0.0     B. Malmberg

Inputs:
                header
Outputs:
          return_word
Global Data:
          - None -
Functions Referenced:
          ms1553_send
Abstract:
          Impliments appendix D of MIL-STD-2217.
******************************************************************************/
int d_status_message(LOOKUP_TABLE_TYPE *header)
{
     STATUS_WORD_TYPE *status_field;
     int return_word;
     int command, status;

     status_field = (STATUS_WORD_TYPE *) &status;

     command = ((header->RT_Address) << 11) + D_GET_STATUS;

     return_word = ms1553_send(&command, &status);

     /* If no error then check address and status word.
```

```
*/
if(!return_word)
{
     if(status_field->Terminal_Address != header->RT_Address)
          return_word = ADDRESS_ERROR;
     else if(status_field->Terminal_Flag)
          return_word = BOOT_LOADER_ERROR;
     else if(status_field->Busy_Bit)
          return_word = BUSY_CONDITION;
     else if(!status_field->D_Data_Ready)
          return_word = NOT_DATA_READY;
}
return return_word;
}
/****************************************************************************
Name:       d_command_message
Number/Version:
History:
            Date         Rev    Author              Description
            22-Mar-1993  0.0    B. Malmberg

Inputs:
            header
            command
Outputs:
            return_word
Global Data:
            - None -
Functions Referenced:
            ms1553_send
Abstract:
            Impliments appendix D of MIL-STD-2217.
****************************************************************************/
int d_command_message(LOOKUP_TABLE_TYPE *header, int command)
{
     STATUS_WORD_TYPE *status_field;
     int return_word;
     int message[2], status;

     status_field = (STATUS_WORD_TYPE *) &status;

     message[0] = ((header->RT_Address) << 11) + D_MODE_COMMAND;
     message[1] = command;

     return_word = ms1553_send(&message[0], &status);

     /* If no error then check address and status word.
     */
     if(!return_word)
     {
          if(status_field->Terminal_Address != header->RT_Address)
               return_word = ADDRESS_ERROR;
          else if(status_field->Terminal_Flag)
               return_word = BOOT_LOADER_ERROR;
          else if(status_field->Busy_Bit)
               return_word = BUSY_CONDITION;
     }
     return return_word;
}
/****************************************************************************
Name:       d_header_message
Number/Version:
History:
            Date         Rev    Author              Description
            22-Mar-1993  0.0    B. Malmberg

Inputs:
            header
            data_pointer
Outputs:
            return_word
Global Data:
            - None -
Functions Referenced:
            ms1553_send
Abstract:
            Impliments appendix D of MIL-STD-2217.
****************************************************************************/
/* Keep track of checksum for all data words
*/
int d_header_message(LOOKUP_TABLE_TYPE *header, int *data_pointer)
```

```
{
        STATUS_WORD_TYPE *status_field;
        int return_word;
        int status;

        status_field = (STATUS_WORD_TYPE *) &status;

        /* Command */
        *data_pointer = ((header->RT_Address) << 11) + D_HEADER;

        /* Send the message */
        return_word = ms1553_send(data_pointer, &status);

        /* If no error then check address and status.
        */
        if(!return_word)
        {
              if(status_field->Terminal_Address != header->RT_Address)
                    return_word = ADDRESS_ERROR;
              else if(status_field->Terminal_Flag)
                    return_word = BOOT_LOADER_ERROR;
        }

        return return_word;
}

/*****************************************************************************
Name:         d_memory_data_load_message
Number/Version:
History:
              Date          Rev      Author                  Description
              22-Mar-1993   0.0      B. Malmberg

Inputs:
              header
              data_pointer
              amount
Outputs:
              return_word
Global Data:
              - None -
Functions Referenced:
              ms1553_send
Abstract:
              Impliments appendix D of MIL-STD-2217.
*****************************************************************************/
int d_memory_data_load_message(LOOKUP_TABLE_TYPE *header,
     int *data_pointer, int amount)
{
      /*    This message is used to pass the data to be loaded into the
            unit memory.
      */
      STATUS_WORD_TYPE *status_field;
      int return_word;
      int status;

      status_field = (STATUS_WORD_TYPE *) &status;
      *data_pointer = ((header->RT_Address) << 11) + D_MEMORY_DATA_LOAD
        + (0x1f & amount);

      return_word = ms1553_send(data_pointer, &status);

      /* If no error then check for address error.
      */
      if(!return_word)
      {
            if(status_field->Terminal_Address != header->RT_Address)
                  return_word = ADDRESS_ERROR;
            else if(status_field->Terminal_Flag)
                  return_word = BOOT_LOADER_ERROR;
      }

      return return_word;
}

/*****************************************************************************
Name:         d_memory_data_verify_message
Number/Version:
History:
              Date          Rev      Author                  Description
              22-Mar-1993   0.0      B. Malmberg
```

```
Inputs:
            header
            data_pointer
            amount
Outputs:
            return_word
Global Data:
            - None -
Functions Referenced:
            ms1553_send
Abstract:
            Impliments appendix D of MIL-STD-2217.
****************************************************************************/
int d_memory_data_verify_message(LOOKUP_TABLE_TYPE *header,
            int *data_pointer, int amount)
{
      /*    This message is used to pass the data that the MLV will compare
            to the data stored on the MSD.
      */
      STATUS_WORD_TYPE *status_field;
      int return_word;
      int command;

      status_field = (STATUS_WORD_TYPE *) data_pointer;

      command = ((header->RT_Address) << 11) + D_MEMORY_DATA_VERIFY
            + (0x1f & amount);

      return_word = ms1553_receive(&command, data_pointer);

      /* If no error then check address and status.
      */
      if(!return_word)
      {
            if(status_field->Terminal_Address != header->RT_Address)
                  return_word = ADDRESS_ERROR;
            else if(status_field->Terminal_Flag)
                  return_word = BOOT_LOADER_ERROR;
      }

      return return_word;
}
/****************************************************************************
Name:       d_trailer_message
Number/Version:
History:
            Date        Rev     Author              Description
            22-Mar-1993 0.0     B. Malmberg

Inputs:
            header
            subpage_count
            first_subpage
            checksum
Outputs:
            return_word
Global Data:
            - None -
Functions Referenced:
            ms1553_send
Abstract:
            Impliments appendix D of MIL-STD-2217.
****************************************************************************/
int d_trailer_message(LOOKUP_TABLE_TYPE *header, int *data_pointer)
{
      STATUS_WORD_TYPE *status_field;
      int return_word;
      int status;

      status_field = (STATUS_WORD_TYPE *) &status;

      /* Command word */
      *data_pointer = ((header->RT_Address) << 11) + D_TRAILER;

      return_word = ms1553_send(data_pointer, &status);

      /* If no error then check address and status.
      */
      if(!return_word)
      {
            if(status_field->Terminal_Address != header->RT_Address)
                  return_word = ADDRESS_ERROR;
```

```
            else if(status_field->Terminal_Flag)
                 return_word = BOOT_LOADER_ERROR;
        }

        return return_word;
   }
   /* end */


   /*****************************************************************************
   Include File Name:    protoe.h
   Number/Version:
   History:
            Date          Rev   Author          Description
            21_jun-1993   0.0   C. Houlberg     Baseline
   Abstract:

   *****************************************************************************/
   /*   Function prototypes
   */
   int protocol_e(int address, int automode);
   int upload_e(LOOKUP_TABLE_TYPE *header, int file_address);

   /* end */


   /*****************************************************************************
   Module Name:  protoe.c
   Number/Version:
   History:
            Date          Rev   Author          Description
            21-Jun-1993   0.0   C. Houlberg     Baseline
   Abstract:
            Implements appendix E of MIL-STD-2217 for
            Rapid Reprogramming Terminal use.
   *****************************************************************************/

   #include "rrt.h"
   #include "dsp.h"                       /* RRT configuration */
   #include "system.h"                    /* DSP definitions */
   #include "cardhdrs.h"                  /* System definitions */
   #include "wordtype.h"                  /* Memory card header definitions */
   #include "display.h"                   /* Word definitions */
   #include "timer.h"                     /* LCD display definitions */
   #include "error.h"                     /* Timer definitions */
   #include "initprot.h"                  /* Error definitions */
   #include "msgs_e.h"                    /* Protocol state table def */
   #include "protoe.h"                    /* Protocol D message definitions */
                                          /* Protocol D definitions */
   /*****************************************************************************
   Name:  protocol_e
   Number/Version:
   History:
            Date          Rev   Author          Description
            21-Jun-1993   0.0   C. Houlberg     Baseline
   Inputs:
            address
            automode
   Returns:
            0 for success
            non-zero error message for failure
   Global Data:
            - None-
   Functions Referenced:
            memory_card_read()
            LCD_display()
            init_protocol()
            e_command_response()
            init_file()
            upload_e()
   Abstract:
            Implements appendix E of MIL-STD-2217
   *****************************************************************************/
   int protocol_e(int address, int automode)
   {
```

```
LOOKUP_TABLE_UNION header;
LOOKUP_TABLE_UNION *header_union;
LOOKUP_TABLE_UNION next_header;
LOOKUP_TABLE_UNION *next_header_union;
STATE_TABLE_TYPE state_table;
STATE_TABLE_TYPE *state;
PPI3_REG_TYPE *switch_status;                  /* Switch status pointer */
PPI2_REG_TYPE *equipment_discretes;            /* Equipment discretes pointer */
int file_address, activity;
int return_word;
int i;
char ascii_string[13];

TIMER_REG_TYPE *timer;          /* Pointer to timer counter register */
timer = (TIMER_REG_TYPE *) &TIMER0;

switch_status = (PPI3_REG_TYPE *) &PPI3;
equipment_discretes = (PPI2_REG_TYPE *) &PPI2;

state = &state_table;
header_union = &header;
next_header_union = &next_header;

/*  The following function is used by this protocol to establish
      the initial value of the variables:
           state->another_upload,
           state->another_verify.
*/
return_word = init_protocol(address, state);

/* Check for attempted illegal download or verify */
if(state->another_verify)
      return_word = NO_VERIFY_SUPPORT;


while((state->another_upload) && !return_word)
{
      /* Set up file address to point to lookup table */
      file_address = address;
      /* Read in file lookup table */
      for(i = 0; i < SIZE_LOOKUP_TABLE; i++)
            header_union->array[i] = memory_card_read(file_address++);

      /* Process indication for init_file() */
      state->process = UPLOADING;

      while((state->another_upload) && !return_word)
      {
            /* Form filename */
            for(i = 0; i < 6; i++)
            {
                  ascii_string[i+i] = (char) (0xff & header_union->array[i]);
                  ascii_string[i+i+1] = (char)
                        (0xff & (header_union->array[i] >> 8));
            }
            ascii_string[12] = 0;                   /* End of string indicator */
            /* Display filename */
            LCD_display(START_LINE1 + 7, &ascii_string[0]);

            /* Send the Initiate Load message */
            return_word = e_command_response(
                  (LOOKUP_TABLE_TYPE *)header_union, E_INITIATE_LOAD);

            /* If NOT_POLLED inform user to power up AYK14 */
            if(return_word == NOT_POLLED)
            {
                  /* Set the MS-1553 bus controller to monitor mode */
                  ms1553_MT_setup();

                  /* Determine activity on bus */
                  activity = ms1553_monitor();

                  if(activity == NO_ACTIVITY)             /* Need to power up BC */
                  {
                        /* Set up as an RT */
                        ms1553_RT_setup();

                        /* Set IPL in preparation of AYK14 power up */
                        equipment_discretes->AYK14_Discretes
                              |= (header_union->structure.AYK14_IPL) << 4;
```

```
			LCD_display(START_LINE2, "Turn On MC");
			i = 0;
			if(header_union->structure.AYK14_Correlation & 0x01)
				ascii_string[i++] = '1';
			if(header_union->structure.AYK14_Correlation & 0x02)
			{
				if(i)
					ascii_string[i++] = ',';
				ascii_string[i++] = '2';
			}
			if(header_union->structure.AYK14_Correlation & 0x04)
			{
				if(i)
					ascii_string[i++] = ',';
				ascii_string[i++] = '3';
			}
			if(header_union->structure.AYK14_Correlation & 0x08)
			{
				if(i)
					ascii_string[i++] = ',';
				ascii_string[i++] = '4';
			}
			ascii_string[i++] = '\t';		/* Clear rest of line */
			ascii_string[i] = 0;
			LCD_display(START_LINE2 + 10, &ascii_string[0]);

			do
			{
				return_word = e_command_response(
					(LOOKUP_TABLE_TYPE *)header_union,
					E_INITIATE_LOAD);

			} while((return_word == NOT_POLLED)
				&& (switch_status->Not_Skip));

			if(!(switch_status->Not_Skip))
			{
				return_word = ABORT_OCCURRED;
				LCD_display(START_LINE1, "ABORT:\rEXEC to Continue\t");

				/* Allow time for switch to settle. */
				timer->Timer_Counter = SETTLE_TIME;
				while(timer->Timer_Counter)
					/* Make sure switch is open */
					if(!(switch_status->Not_Skip))
						timer->Timer_Counter = SETTLE_TIME;
			}
		}
}

/* Clear IPL to start reprogram of AYK14 */
equipment_discretes->AYK14_Discretes &= 0x0f;

/*	The following function is used here by this protocol to
	establish or update the value of the variables:
		state->another_upload,
		state->next_file_address.
	Variable established locally and used by this function is:
		state->process = UPLOADING.
*/
if(!(return_word))
{
	init_file(file_address, header_union,
		next_header_union, state);

	/* Display Load message and load the data */
	LCD_display(START_LINE2, "Uploading\t");

	return_word = upload_e((LOOKUP_TABLE_TYPE *)header_union,
		file_address);
}

if(!(return_word))
	if(state->another_upload)
	{
		/* Make address of next file the current file address,
			skips lookup table. */
		file_address = state->next_file_address;

		/* Move next header to current header location */
		for(i = 0; i < SIZE_LOOKUP_TABLE; i++)
			header_union->array[i] = next_header_union->array[i];
```

```
                }
                else
                {
                        /* Indicate load done */
                        LCD_display(START_LINE2, "Upload Done\t");
                }
        }

        /*      The following function "init_file" is used here by this
                protocol to establish or update the value of the variables:
                        state->another_upload,
                        state->next_file_address.
                Variable established locally and used by this function is:
                        state->process = VERIFYING.
        */
        /* Process indication for init_file() is VERIFYING even though there
                is no verify or download permitted by Protocol E.  This process
                indication is needed to set up for sequentially loading a file
                following the transfer of control to a boot load program or the
                independent loading or some other program.
        */
        state->process = VERIFYING;
        init_file(file_address, header_union, next_header_union, state);

        /* Update address to location of next lookup table */
        address = state->next_file_address - SIZE_LOOKUP_TABLE;
    }

    return return_word;
}

/******************************************************************************
Name:  upload_e
Number/Version:
History:
            Date          Rev   Author          Description
            21-Jun-1993 0.0   C. Houlberg     Baseline

Inputs:
            header_pointer
            file_address
Returns:
            0 for success
            non-zero error message for failure

Global Data:
            - None-

Functions Referenced:
            e_header_response()
            e_memory_data_load_response()
            e_trailer_response()
            ascii_conversion()
            LCD_display()

Abstract:

******************************************************************************/
int upload_e(LOOKUP_TABLE_TYPE *header_pointer, int file_address)
{
        HEADER_WORD_TYPE *header;          /* Pointer to header message data */
        PPI2_REG_TYPE *discrete_pointer;   /* Pointer to IPL discretes */
        TIMER_REG_TYPE *timer0;            /* Pointer to timer counter register */
        int i, file_size;
        int data_word_count, data_amount;
        int data_location;
        int transfer_mode, header_type;
        int buffer_xfer_count;
        int load_address;
        int transfer_count, transfer_amount;
        int message_amount;
        int return_word = NO_ERROR;
        int message[33];
        char ascii_string[5];

        timer0 = (TIMER_REG_TYPE *) &TIMER0;

        /* Initialize IPL discrete pointer */
        discrete_pointer = (PPI2_REG_TYPE *) &PPI2;

        /* Header message data word 1 pointer */
        header = (HEADER_WORD_TYPE *) &message[1];
```

```
/* File size measured in bytes */
file_size = (header_pointer->File_Size_MSW << 16)
     + header_pointer->File_Size_LSW;

/* Initialize data counter */
data_word_count = (file_size + 1) >> 1;

/* Transfer data */
while(data_word_count && !(return_word))        /* Transfer all data */
{
     /* Send IPL read message */
     return_word = e_command_response(header_pointer, E_IPL_READ);

     if(!(return_word))
     {
          /* Initialize location of data to transfer */
          data_location = file_address;

          /* Filter out all transactions with
               undefined or reserved header types */
          do
          {
               /* Gather header data words */
               for(i = 1; i <= 4; i++)
                    message[i] = memory_card_read(data_location++);

               header_type = header->Header_Type;
               if(header_type != WORD_COUNT)
               {
                    data_location += 2;     /* Skip Trailer to next header */
                    data_word_count -= 6;   /* Subtract null transaction */
               }

          } while(header_type != WORD_COUNT);

          /* Extract load descriptors */
          transfer_mode = header->Transfer_Mode;
          buffer_xfer_count = header->Buffer_Xfer_Count;
          load_address = message[2];

          /* Display page number for transaction */
          ascii_conversion((message[4] >> 3), &ascii_string[0]);
          LCD_display(START_LINE2 + 16, &ascii_string[0]);

          /* Acount for maximum buffer count */
          if(transfer_mode && !buffer_xfer_count)
               buffer_xfer_count = MAX_BUFFER_COUNT;

          /* Acount for no transfer and header & trailer data */
          if(transfer_mode == NO_XFER)
          {
               transfer_count = 0;
               data_amount = 6;
          }
          else
          {
               transfer_count = buffer_xfer_count;
               data_amount = transfer_count + 6;
          }

          /* Ensure Transfer Control agrees with transfer_count */
          if(((message[4] & TC_MASK) == LAST_TRANSACTION)
               && (data_amount != data_word_count))
               return_word = TC_ERROR;

          /* Ensure data amount transferring does
               not exceed data left to transfer */
          if(data_amount > data_word_count)
               return_word = DATA_COUNT_ERROR;

          /* Send the Header message */
          return_word = e_header_response(header_pointer, &message[0]);
     }

     /* Send the Data Load messages */
     transfer_amount = transfer_count;
     while(transfer_count && !(return_word))
     {
          message_amount = 32;          /* Maximum words per message */
```

```
                if(message_amount > transfer_count)
                {                                       /* Fewer words left to send */
                     message_amount = transfer_count;   /* Amount sending */
                     transfer_count = 0;
                }
                else                            /* Count of words left */
                     transfer_count -= message_amount;

                /* Ready data for transfer, command inserted later */
                for(i = 1; i <= message_amount; i++)
                     message[i] = memory_card_read(data_location++);

                /* Display address */
                /* Display address for block of data */
                ascii_conversion(load_address + transfer_amount
                     - (transfer_count + message_amount), &ascii_string[0]);
                LCD_display(START_LINE2 + 11, &ascii_string[0]);

                return_word = e_memory_data_load_response(header_pointer,
                     &message[0], message_amount);
           }

           if(!(return_word))
           {
                for(i = 1; i <= 2; i++)
                     message[i] = memory_card_read(data_location++);

                /* Send the Trailer message */
                return_word = e_trailer_response(header_pointer, &message[0]);
           }

           if(!(return_word))
           {
                file_address = data_location;
                data_word_count -= data_amount;
           }
      }

      if(header_pointer->IPL_Fail_Used)
      {
           /* Wait some time (1 msec.) to allow IPL fail to be established */
           msec_timer(1, timer0);

           /* Test the IPL Fail discrete */
           if((header_pointer->AYK14_IPL) & (discrete_pointer->IPL_Fail))
                return_word = IPL_FAIL_ERROR;
      }

      /* Return status of load */
      return return_word;                          /* Load completed or aborted */
}

/* end */

/******************************************************************************
Include File Name:    msgs_e.h
Number/Version:
History:
          Date        Rev     Author              Description
          21-Jun-1993 0.0     C. Houlberg

Abstract:
          This file contains define statements for setting the status word in
          protocol E.
******************************************************************************/

      /* Protocol E command definitions */
    #define E_MODE_COMMAND          0x0011
    #define E_INITIATE_LOAD         0x0014
    #define E_IPL_READ              0x0015
    #define E_HEADER                0x0424
    #define E_MEMORY_DATA_LOAD      0x0420
    #define E_TRAILER               0x0422

      /*  Prototype of procedures called by protocol_e().
      */
      int e_command_response(LOOKUP_TABLE_TYPE *header, int command);
      int e_header_response(LOOKUP_TABLE_TYPE *header, int *data_pointer);
      int e_memory_data_load_response(LOOKUP_TABLE_TYPE *header,
           int *data_pointer, int amount);
```

```
int e_trailer_response(LOOKUP_TABLE_TYPE *header, int *data_pointer);
int e_status_response(LOOKUP_TABLE_TYPE *header);

/* end */

/*****************************************************************************
Module Name:    msgs_e.c
Number/Version:
History:
            Date        Rev     Author              Description
            21_Jun-1993 0.0     C. Houlberg

Abstract:
            Impliments appendix E of MIL-STD-2217.
*****************************************************************************/

#include "rrt.h"              /* RRT configuration                     */
#include "dsp.h"              /* DSP definitions                       */
#include "system.h"           /* System definitions                    */
#include "cardhdrs.h"         /* Memory card header definitions        */
#include "wordtype.h"         /* Word definitions                      */
#include "display.h"          /* LCD display definitions               */
#include "error.h"            /* Error definitions                     */
#include "initprot.h"         /* Protocol state table definitions      */
#include "msgs_e.h"           /* Protocol message definitions          */

/*****************************************************************************
Name:       e_command_response
Number/Version:
History:
            Date        Rev     Author              Description
            21-Jun-1993 0.0     C. Houlberg
Inputs:
            header
            command
Outputs:
            return_word
Global Data:
            - None -
Functions Referenced:
            ms1553_respond
Abstract:
            Impliments appendix E of MIL-STD-2217.
*****************************************************************************/
int e_command_response(LOOKUP_TABLE_TYPE *header, int command_word)
{
      int count, return_word;
      int command, message[33];

      /* Ensure have correct received data word */
      count = header->Manual_Error_Count;

      /* Status word (not busy and not data ready) */
      message[0] = (header->RRT_RT_Address) << 11;

      /* Expected command */
      command = message[0] + E_MODE_COMMAND;

      do
      {
          return_word = ms1553_respond(&command, &message[0]);
            if(!count--)
                  return_word = COMMAND_NOT_RCVD;

      } while((message[1] != command_word) && !return_word);

      return return_word;
}

/*****************************************************************************
Name:       e_header_response
Number/Version:
History:
            Date        Rev     Author              Description
            21-Jun-1993 0.0     C. Houlberg

Inputs:
            header
            data_pointer
```

```
Outputs:
            return_word
Global Data:
            - None -
Functions Referenced:
            ms1553_respond
Abstract:
            Impliments appendix E of MIL-STD-2217.
****************************************************************************/
/* Keep track of checksum for all data words
*/
int e_header_response(LOOKUP_TABLE_TYPE *header, int *data_pointer)
{
      int return_word;
      int command;

      /* Status word (not busy and data ready) */
      *data_pointer = ((header->RRT_RT_Address) << 11) + E_DATA_READY;

      /* Expected command */
      command = ((header->RRT_RT_Address) << 11) + E_HEADER;

      /* Send the message */
      return_word = ms1553_respond(&command, data_pointer);

      return return_word;
}

/****************************************************************************
Name:       e_memory_data_load_response
Number/Version:
History:
            Date        Rev     Author              Description
            21-Jun-1993 0.0     C. Houlberg

Inputs:
            header
            data_pointer
            amount
Outputs:
            return_word
Global Data:
            - None -
Functions Referenced:
            ms1553_respond
Abstract:
            Impliments appendix E of MIL-STD-2217.
****************************************************************************/
int e_memory_data_load_response(LOOKUP_TABLE_TYPE *header,
      int *data_pointer, int amount)
{
      /*    This message is used to pass the data to be loaded into the
            unit memory.
      */
      int return_word;
      int command;

      /* Status word (not busy and data ready) */
      *data_pointer = ((header->RRT_RT_Address) << 11) + E_DATA_READY;

      /* Expected command */
      command = ((header->RRT_RT_Address) << 11) + E_MEMORY_DATA_LOAD
        + (0x1f & amount);

      return_word = ms1553_respond(&command, data_pointer);
      return return_word;
}

/****************************************************************************
Name:       e_trailer_response
Number/Version:
History:
            Date        Rev     Author              Description
            21-Jun-1993 0.0     C. Houlberg

Inputs:
            header
            data_pointer
Outputs:
            return_word
Global Data:
```

```
          - None -
Functions Referenced:
          ms1553_respond
Abstract:
          Impliments appendix E of MIL-STD-2217.
******************************************************************************/
int e_trailer_response(LOOKUP_TABLE_TYPE *header, int *data_pointer)
{
     /*   This message is used to pass the data checksum and additional
          Load/Verify parameters to the unit.
     */
     int return_word;
     int command;

     /* Status word (not busy and data ready) */
     *data_pointer = ((header->RRT_RT_Address) << 11) + E_DATA_READY;

     /* Command word */
     command = ((header->RRT_RT_Address) << 11) + E_TRAILER;

     return_word = ms1553_respond(&command, data_pointer);

     return return_word;
}

/******************************************************************************
Name:       e_status_response
Number/Version:
History:
          Date        Rev  Author          Description
          01-Jul-1992 0.0  C. Houlberg     Baseline

Inputs:
          lookup_table_pointer
          data_pointer
Outputs:
          return_word
Global Data:
          - None -
Functions Referenced:
          ms1553_respond
Abstract:
          Impliments status response for protocol E.
******************************************************************************/
int e_status_response(LOOKUP_TABLE_TYPE *header)
{
     int command, message[33];
     int return_word;

     /* Status word (not busy and data ready) */
     message[0] = ((header->RRT_RT_Address) << 11) + E_DATA_READY;

     /* Command word */
     command = ((header->RRT_RT_Address) << 11) + E_STATUS_COMMAND;

     return_word = ms1553_respond(&command, &message[0]);

     return return_word;
}

/* end */

/******************************************************************************
Include File Name:   protof.h
Number/Version:
History:
          Date        Rev  Author          Description
          23-Mar-1993 0.0  C. Houlberg     Baseline

Abstract:

******************************************************************************/

/*   Function prototypes
*/

int protocol_f(int address, int automode);
int upload_f(LOOKUP_TABLE_TYPE *header, int file_address);
int verify_f(LOOKUP_TABLE_TYPE *header, int file_address);

/* end */
```

```
/******************************************************************************
Module Name:  protof.c
Number/Version:
History:
           Date         Rev    Author           Description
           25-Jun-1993 0.0     C. Houlberg      Baseline

Abstract:
           Implements appendix D of MIL-STD-2217 for
           Rapid Reprogramming Terminal use.
******************************************************************************/

#include "rrt.h"                                /* RRT configuration */
#include "dsp.h"                                /* DSP definitions */
      int i, channel_tried;
      int error_count, global_error_count;
      char ascii_string[13];

      timer = (TIMER_REG_TYPE *) &TIMER0;

      switch_status = (PPI3_REG_TYPE *) &PPI3;

      state = &state_table;
      header_union = &header;
      next_header_union = &next_header;

      /*  The following function is used by this protocol to establish
          the initial value of the variables:
                state->another_upload,
                state->another_verify,
      */
      return_word = init_protocol(address, state);

      while((state->another_upload || state->another_verify) && !return_word)
      {
           /* Set up file address to point to lookup table */
           file_address = address;

           /* Read in file lookup table */
           for(i = 0; i < SIZE_LOOKUP_TABLE; i++)
                header_union->array[i] = memory_card_read(file_address++);

           /* Establish delay between messages */
           delay = header_union->structure.Delay;

           /* Process indication for init_file() */
           state->process = UPLOADING;

           while((state->another_upload) && !return_word)
           {
                /* Form filename */
                for(i = 0; i < 6; i++)
                {
                     ascii_string[i+i] = (char) (0xff & header_union->array[i]);
                     ascii_string[i+i+1] = (char)
                          (0xff & (header_union->array[i] >> 8));
                }
                ascii_string[12] = 0;              /* End of string indicator */
                /* Display filename */
                LCD_display(START_LINE1 + 7, &ascii_string[0]);

                global_error_count = ALLOWED_ATTEMPTS;
                do
                {
                     error_count = ALLOWED_ATTEMPTS;     /* Hard coded for protocol F */
                     channel_tried = NO;
                     do
                     {
                          /* Send the Bootstrap Load message */
                          return_word = f_command_message(
                               (LOOKUP_TABLE_TYPE *)header_union, F_BOOTSTRAP_LOAD);
                          /* Delay next message */
                          msec_timer(delay, timer);

                          if((return_word == NO_RESPONSE) && !--error_count)
                               if(!channel_tried)
                               {
                                    channel_tried = YES;
                                    error_count = ALLOWED_ATTEMPTS;
                                    ms1553_change_bus_channel();
                               }
```

```
                else if(header_union->structure.Protocol
                      == PROTOCOL_F_SDC)
                {
                      /* Back to original bus channel */
                      ms1553_change_bus_channel();

                      LCD_display(START_LINE2, "Press Consumables\t");
                      do
                      {
                            return_word = f_command_message(
                                  (LOOKUP_TABLE_TYPE *)header_union,
                                  F_BOOTSTRAP_LOAD);

                            /* Delay next message */
                            msec_timer(delay, timer);

                      } while((return_word == NO_RESPONSE)
                            && (switch_status->Not_Skip));

                      if(!(switch_status->Not_Skip))
                      {
                            return_word = error_display(ABORT_OCCURRED);

                            /* Allow time for switch to settle. */
                            timer->Timer_Counter = SETTLE_TIME;
                            while(timer->Timer_Counter)
                                  /* Make sure switch is open */
                                  if(!(switch_status->Not_Skip))
                                        timer->Timer_Counter = SETTLE_TIME;
                      }
                }
                else
                      return_word = BOOT_LOADER_ERROR;

      } while(return_word == NO_RESPONSE);

      if(!return_word)
      {
            /* Check the status following bootstrap load */
            return_word = f_status_message((LOOKUP_TABLE_TYPE *)
                  header_union);

            if(return_word == NO_SUCCESS)
                  return_word = NO_ERROR;

            /* Delay next message */
            msec_timer(delay, timer);
      }

} while(return_word && --global_error_count
      && (return_word != BOOT_LOADER_ERROR)
      && (return_word != ABORT_OCCURRED));

/*    The following function is used here by this protocol to
      establish or update the value of the variables:
            state->another_upload,
            state->next_file_address.
      Variable established locally and used by this function is:
            state->process = UPLOADING.
*/
if(!(return_word))
{
      init_file(file_address, header_union,
            next_header_union, state);

      /* Display Load message and load the data */
      LCD_display(START_LINE2, "Uploading\t");

      return_word = upload_f((LOOKUP_TABLE_TYPE *)header_union,
            file_address);
}

if(!(return_word))
      if(state->another_upload)
      {
            /* Make address of next file the current file address.
                  skips lookup table. */
            file_address = state->next_file_address;
            /* Move next header to current header location */
            for(i = 0; i < SIZE_LOOKUP_TABLE; i++)
                  header_union->array[i] = next_header_union->array[i];
      }
```

```
            else
            {
                  /* Indicate load done */
                  LCD_display(START_LINE2, "Upload Done\t");
            }
}

if(!(return_word))
{
      /* Set up file address to point to lookup table */
      file_address = address;

      /* Read in file lookup table */
      for(i = 0; i < SIZE_LOOKUP_TABLE; i++)
            header_union->array[i] = memory_card_read(file_address++);

      /* Process indication for init_file() */
      state->process = VERIFYING;
}

while((state->another_verify) && !return_word)
{
      /* Form filename */
      for(i = 0; i < 6; i++)
      {
            ascii_string[i+i] = (char) (0xff & header_union->array[i]);
            ascii_string[i+i+1] = (char)
                  (0xff & (header_union->array[i] >> 8));
      }
      ascii_string[12] = 0;              /* E. d of string indicator */
      /* Display filename */
      LCD_display(START_LINE1 + 7, &ascii_string[0]);

      global_error_count = ALLOWED_ATTEMPTS;
      do
      {
            error_count = ALLOWED_ATTEMPTS;     /* Hard coded for protocol F */
            channel_tried = NO;
            do
            {
                  /* Send the Bootstrap Load message */
                  return_word = f_command_message(
                        (LOOKUP_TABLE_TYPE *)header_union, F_BOOTSTRAP_VERIFY);

                  /* Delay next message */
                  msec_timer(delay, timer);

            if((return_word == NO_RESPONSE) && !--error_count)
                  if(!channel_tried)
                  {
                        channel_tried = YES;
                        error_count = ALLOWED_ATTEMPTS;
                        ms1553_change_bus_channel();
                  }
                  else if(header_union->structure.Protocol == PROTOCOL_F_SDC)
                  {
                        /* Back to original bus channel */
                        ms1553_change_bus_channel();

                        LCD_display(START_LINE2, "Press Consumables\t");
                        do
                        {
                              return_word = f_command_message(
                                    (LOOKUP_TABLE_TYPE *)header_union,
                                    F_BOOTSTRAP_VERIFY);

                        } while((return_word == NO_RESPONSE)
                              && (switch_status->Not_Skip));

                        if(!(switch_status->Not_Skip))
                        {
                              return_word = error_display(ABORT_OCCURRED);

                              /* Allow time for switch to settle. */
                              timer->Timer_Counter = SETTLE_TIME;
                              while(timer->Timer_Counter)
                                    /* Make sure switch is open */
                                    if(!(switch_status->Not_Skip))
                                          timer->Timer_Counter = SETTLE_TIME;
```

```
                    }
                }
                else
                    return_word = BOOT_VERIFIER_ERROR;
            } while(return_word == NO_RESPONSE);

            if(!return_word)
            {
                /* Check the status following bootstrap load */
                return_word = f_status_message((LOOKUP_TABLE_TYPE *)
                    header_union);

                if(return_word == NO_SUCCESS)
                    return_word = NO_ERROR;

                /* Delay next message */
                msec_timer(delay, timer);
            }

        } while(return_word && --global_error_count
            && (return_word != BOOT_VERIFIER_ERROR)
            && (return_word != ABORT_OCCURRED));

        /*  The following function is used here by this protocol to
            establish or update the value of the variables:
                state->another_upload,
                state->another_verify,
                state->next_file_address.
            Variable established locally and used by this function is:
                state->process = VERIFYING.
        */
        if(!(return_word))
        {
            init_file(file_address, header_union,
                next_header_union, state);

            /* Verify the data */
            /* Test if loading Memory Card */
            if(status_flags.DOWNLOAD)
                /* Display Download message */
                LCD_display(START_LINE2, "Download\t");
            else
                /* Display Verify message */
                LCD_display(START_LINE2, "Verifying\t");

            return_word = verify_f((LOOKUP_TABLE_TYPE *)header_union,
                file_address);
        }

        if(!(return_word))
            if(state->another_verify)
            {
                /* Make address of next file the current file address,
                    skips lookup table. */
                file_address = state->next_file_address;
                /* Move next header to current header location */
                for(i = 0; i < SIZE_LOOKUP_TABLE; i++)
                    header_union->array[i] = next_header_union->array[i];
            }
            else
            {
                /* Test if loaded Memory Card */
                if(status_flags.DOWNLOAD)
                    /* Display Download complete indication */
                    LCD_display(START_LINE2, "Download Done\t");
                else
                    /* Display Verify complete indication */
                    LCD_display(START_LINE2, "Data Verified\t");
            }
    }

    /* Update address to location of next lookup table */
    address = state->next_file_address - SIZE_LOOKUP_TABLE;
}

/* Control is transferred if indicated by Lookup Table */
if(!return_word && header_union->structure.Control_Transfer)
    return_word = f_command_message(
        (LOOKUP_TABLE_TYPE *)header_union, F_EXECUTE);

return return_word;
}
```

```
/*****************************************************************************
Name:  upload_f
Number/Version:
History:
            Date          Rev   Author           Description
            25-Jun-1993 0.0   C. Houlberg      Baseline

Inputs:
            header_pointer
            file_address
Returns:
            0 for success
            non-zero error message for failure

Global Data:
            - None-

Functions Referenced:
            activity_busy()
            f_header_message()
            f_memory_data_load_message()
            f_trailer_message()
            ascii_conversion()
            LCD_display()
            msec_timer()

Abstract:

*****************************************************************************/
int upload_f(LOOKUP_TABLE_TYPE *header_pointer, int file_address)
{
     HEADER_WORD_TYPE *header;              /* Pointer to header message data */
     TIMER_REG_TYPE *timer0;                /* Pointer to timer counter register */
     TIMER_REG_TYPE *timer1;                /* Pointer to timer counter register */
     int i, file_size;
     int data_word_count, data_amount;
     int data_location;
     int transfer_mode, header_type;
     int buffer_xfer_count;
     int load_address;
     int transfer_count, transfer_amount;
     int message_amount;
     int return_word = NO_ERROR;
     int message[33];
     int delay;
     int error_count;
     int checksum_adjustment;
     char ascii_string[5];

     timer0 = (TIMER_REG_TYPE *) &TIMER0;
     timer1 = (TIMER_REG_TYPE *) &TIMER1;

     /* Header message data word 1 pointer */
     header = (HEADER_WORD_TYPE *) &message[1];

     /* Establish delay between messages and busy count */
     delay = header_pointer->Delay;

     /* File size measured in bytes */
     file_size = (header_pointer->File_Size_MSW << 16)
          + header_pointer->File_Size_LSW;

     /* Initialize data counter */
     data_word_count = (file_size + 1) >> 1;

     /* Transfer data */
     error_count = ALLOWED_ATTEMPTS;
     while(data_word_count && !(return_word))       /* Transfer all data */
     {
          /* Initialize location of data to transfer */
          data_location = file_address;

          /* Filter out all transactions with
               undefined or reserved header types */
          do
          {
               /* Gather header data words */
               for(i = 1; i <= 4; i++)
                    message[i] = memory_card_read(data_location++);

               header_type = header->Header_Type;
               if(header_type != WORD_COUNT)
```

```
        {
              data_location += 2;      /* Skip Trailer to next header */
              data_word_count -= 6;    /* Subtract null transaction */
        }
   } while(header_type != WORD_COUNT);

   /* Extract load descriptors */
   transfer_mode = header->Transfer_Mode;
   buffer_xfer_count = header->Buffer_Xfer_Count;
   load_address = message[2];

   /* Display page number for transaction */
   ascii_conversion((message[4] >> 3), &ascii_string[0]);
   LCD_display(START_LINE2 + 16, &ascii_string[0]);

   /* Acount for maximum buffer count */
   if(transfer_mode && !buffer_xfer_count)
         if(header_pointer->Protocol == PROTOCOL_F_SDC)
               buffer_xfer_count = MAX_SDC_COUNT;
         else
               buffer_xfer_count = MAX_BUFFER_COUNT;

   /* Acount for no transfer and header & trailer data */
   if(transfer_mode == NO_XFER)
   {
         transfer_count = 0;
         data_amount = 6;
   }
   else
   {
         transfer_count = buffer_xfer_count;
         data_amount = transfer_count + 6;
   }

   /* Ensure Transfer Control agrees with transfer_count */
   if(((message[4] & TC_MASK) == LAST_TRANSACTION)
         && (data_amount != data_word_count))
         return_word = TC_ERROR;

   /* Ensure data amount transferring does
         not exceed data left to transfer */
   if(data_amount > data_word_count)
         return_word = DATA_COUNT_ERROR;

   /* Acount for verify following load in Transfer Control bits */
   if(header_pointer->Verify_After_Load)
   {
         checksum_adjustment = ANOTHER_TRANSACTION - (message[4] & TC_MASK);
         message[4] = (message[4] & ~TC_MASK) + ANOTHER_TRANSACTION;
   }
   else
         checksum_adjustment = 0;

   if(!(return_word))
   {
         /* Send the Header message */
         return_word = f_header_message(header_pointer, &message[0]);

         /* Delay next message */
         msec_timer(delay, timer0);
         /* Send status message */
         return_word = f_status_message(header_pointer);
         if(return_word == NO_SUCCESS)
               return_word = NO_ERROR;

         /* Delay next message */
         msec_timer(delay, timer0);
   }

   /* Set up timer0 for sample and display of address */
   timer0->Timer_Counter = HALFSEC;

   /* Send the Data Load messages */
   transfer_amount = transfer_count;
   while(transfer_count && !(return_word))
   {
         message_amount = 32;           /* Maximum words per message */
         if(message_amount > transfer_count)
         {
               message_amount = transfer_count;    /* Fewer words left to send */
               transfer_count = 0;                 /* Amount sending */
         }
```

```
          else                                    /* Count of words left */
               transfer_count -= message_amount;

          /* Ready data for transfer, command inserted later */
          for(i = 1; i <= message_amount; i++)
               message[i] = memory_card_read(data_location++);

          /* Display address */
          /* Display address for block of data */
          ascii_conversion(load_address + transfer_amount
               - (transfer_count + message_amount), &ascii_string[0]);
          LCD_display(START_LINE2 + 11, &ascii_string[0]);

          return_word = f_memory_data_load_message(header_pointer,
               &message[0], message_amount);

          /* Delay next message */
          msec_timer(delay, timer1);


          /* Send status message */
          return_word = f_status_message(header_pointer);
          if(return_word == NO_SUCCESS)
               return_word = NO_ERROR;

          /* Delay next message */
          msec_timer(delay, timer1);
     }

     if(!(return_word))
     {
          for(i = 1; i <= 2; i++)
               message[i] = memory_card_read(data_location++);

          /* Adjust checksum if necessary */
          message[2] = 0xffff & (message[2] + checksum_adjustment);

          /* Send the trailer message */
          return_word = f_trailer_message(header_pointer, &message[0]);

          /* Delay next message */
          msec_timer(delay, timer0);

          /* Send status message */
          return_word = f_status_message(header_pointer);

          /* Delay next message */
          msec_timer(delay, timer0);
     }

     if(!(return_word))
     {
          file_address = data_location;
          data_word_count -= data_amount;
          error_count = ALLOWED_ATTEMPTS;
     }
     else
          if(--error_count)                /* Try again */
               return_word = NO_ERROR;
  }

  /* Return status of load */
  return return_word;                                /* Load completed or aborted */
}

/****************************************************************************
Name:  verify_f
Number/Version:
History:
          Date         Rev   Author          Description
          25-Jun-1993 0.0    C. Houlberg     Baseline

Inputs:
          header_pointer
          file_address
Returns:
          0 for success
          non-zero error message for failure

Global Data:
          - None-
```

```
Functions Referenced:
          activity_busy()
          f_header_message()
          f_memory_data_verify_message()
          f_trailer_message()
          ascii_conversion()
          LCD_display()
          msec_timer()

Abstract:
          Verifies data
*****************************************************************************/

int verify_f(LOOKUP_TABLE_TYPE *header_pointer, int file_address)
{
     HEADER_WORD_TYPE *header;          /* Pointer to header message data */
     TIMER_REG_TYPE *timer0;            /* Pointer to timer counter register */
     TIMER_REG_TYPE *timer1;            /* Pointer to timer counter register */
     int i, file_size;
     int data_word_count, data_amount;
     int data_location;
     int transfer_mode, header_type;
     int buffer_xfer_count;
     int load_address;
     int transfer_count, transfer_amount;
     int message_amount;
     int return_word = NO_ERROR;
     int message[33];
     int checksum;
     int delay;
     int error_count;
     char ascii_string[5];

     timer0 = (TIMER_REG_TYPE *) &TIMER0;
     timer1 = (TIMER_REG_TYPE *) &TIMER1;

     /* Header message data word 1 pointer */
     header = (HEADER_WORD_TYPE *) &message[1];

     /* Establish delay between messages */
     delay = header_pointer->Delay;

     /* File size measured in bytes */
     file_size = (header_pointer->File_Size_MSW << 16)
          + header_pointer->File_Size_LSW;

     /* Initialize data counter */
     data_word_count = (file_size + 1) >> 1;

     /* Transfer data */
     error_count = ALLOWED_ATTEMPTS;
     while(data_word_count && !(return_word))  /* Transfer all data */
     {
          checksum = 0;                               /* Clear the checksum */

          /* Initialize location of data to transfer */
          data_location = file_address;

          /* Filter out all transactions with
               undefined or reserved header types */
          do
          {
               /* Gather header data words */
               for(i = 1; i <= 4; i++)
               {
                    message[i] = memory_card_read(data_location++);
                    checksum += message[i];
               }

               header_type = header->Header_Type;
               if(header_type != WORD_COUNT)
               {
                    checksum = 0;              /* Clear checksum */
                    data_location += 2;    /* Skip Trailer to next header */
                    data_word_count -= 6;  /* Subtract null transaction */
               }

          } while(header_type != WORD_COUNT);

          /* Extract load descriptors */
          transfer_mode = header->Transfer_Mode;
          buffer_xfer_count = header->Buffer_Xfer_Count;
          load_address = message[2];
```

```
/* Display page number for transaction */
ascii_conversion((message[4] >> 3), &ascii_string[0]);
LCD_display(START_LINE2 + 16, &ascii_string[0]);

/* Acount for maximum buffer count */
if(transfer_mode && !buffer_xfer_count)
      if(header_pointer->Protocol == PROTOCOL_F_SDC)
            buffer_xfer_count = MAX_SDC_COUNT;
      else
            buffer_xfer_count = MAX_BUFFER_COUNT;

/* Acount for no transfer and header & trailer data */
if(transfer_mode == NO_XFER)
{
      transfer_count = 0;
      data_amount = 6;
}
else
{
      transfer_count = buffer_xfer_count;
      data_amount = transfer_count + 6;
}

/* Ensure Transfer Control agrees with transfer_count */
if(((message[4] & TC_MASK) == LAST_TRANSACTION)
      && (data_amount != data_word_count))
      return_word = TC_ERROR;

/* Ensure data amount transferring does
      not exceed data left to transfer */
if(data_amount > data_word_count)
      return_word = DATA_COUNT_ERROR;

if(!(return_word))
{
      /* Send the Header message */
      return_word = f_header_message(header_pointer, &message[0]);

      /* Delay next message */
      msec_timer(delay, timer0);
      /* Send status message */
      return_word = f_status_message(header_pointer);
      if(return_word == NO_SUCCESS)
            return_word = NO_ERROR;

      /* Delay next message */
      msec_timer(delay, timer0);
}

/* Set up timer0 for sample and display of address */
timer0->Timer_Counter = HALFSEC;

/* Send the Data Verify messages */
transfer_amount = transfer_count;
while(transfer_count && !(return_word))
{
      message_amount = 32;          /* Maximum words per message */
      if(message_amount > transfer_count)
      {
            message_amount = transfer_count;    /* Amount sending */
            transfer_count = 0;               /* Count of words left */
      }
      else                                    /* Count of words left */
            transfer_count -= message_amount;

      /* Display address */
      /* Display address for block of data */
      ascii_conversion(load_address + transfer_amount
            - (transfer_count + message_amount), &ascii_string[0]);
      LCD_display(START_LINE2 + 11, &ascii_string[0]);

      return_word = f_memory_data_verify_message(header_pointer,
            &message[0], message_amount);

      /* Delay next message */
      msec_timer(delay, timer1);

      /* Send status message */
      return_word = f_status_message(header_pointer);
      if(return_word == NO_SUCCESS)
            return_word = NO_ERROR;
```

```
        /* Delay next message */
        msec_timer(delay, timer1);

        if(!(return_word))
        {
              /* Set up data to store or verify */
              for(i = 1; (i <= message_amount) && !return_word;
                    i++, data_location++)
              {
                    checksum += message[i];

                    /* Test if downloading to Memory Card */
                    if(status_flags.DOWNLOAD)
                    {                               /* Store data in Memory Card */
                          return_word = memory_card_write(data_location,
                                message[i]);
                    }
                    else                        /* Verify data with Memory Card */
                    {
                          if(message[i] != memory_card_read(data_location))
                                return_word = VERIFY_ERROR
                                      + load_address + transfer_amount
                                      - (transfer_count + message_amount)
                                      + i - 1;
                    }
              }
        }
  }

  if(!(return_word))
  {
        /* Set up data for trailer message */
        message[1] = memory_card_read(data_location++);
        checksum = 0xffff & (checksum + message[1]);
        message[2] = checksum;

        /* Test if downloading to Memory Card */
        if(status_flags.DOWNLOAD)
              return_word = memory_card_write(data_location, checksum);
        else                        /* Verify checksum with Memory Card */
              if(checksum != memory_card_read(data_location))
                    return_word = CHECKSUM_ERROR;

        /* Keep data location in step for next transaction */
        data_location++;
  }

  if(!(return_word) && (transfer_mode == NO_XFER))
  {
        /* Send the Trailer message (end verify) */
        return_word = f_trailer_message(header_pointer, &message[0]);

        /* Delay next message */
        msec_timer(delay, timer0);

        /* Send status message */
        return_word = f_status_message(header_pointer);

        /* Delay next message */
        msec_timer(delay, timer0);
  }

  if(!(return_word))        /* If there was no error go to next transaction */
  {
        file_address = data_location;
        data_word_count -= data_amount;
        error_count = ALLOWED_ATTEMPTS;
  }
  else if(--error_count)        /* Try again until error count exhausted */
        return_word = NO_ERROR;

  /* Ignore SMS EEPROM NO_SUCCESS following null transactions */
  /* Null transactions include a trailer following and status message */
  else if((return_word == NO_SUCCESS)
        && (header_pointer->Protocol == PROTOCOL_F_SMS_EEPROM))
  {
        return_word = NO_ERROR;
        file_address = data_location;
        data_word_count -= data_amount;
        error_count = ALLOWED_ATTEMPTS;
  }
```

```
    }

    /* Return status of verify */
    return return_word;                                   /* Verify completed */
}

/* end */

/****************************************************************************
Include File Name:    msgs_f.h
Number/Version:
History:
            Date          Rev    Author              Description
            28-Jun-1993 0.0      C. Houlberg         Baseline

Abstract:
            This file contains define statements for setting the status word in
            protocol F.
****************************************************************************/

    /* Protocol F Defitions */
    #define F_STATUS                 0x0402
    #define F_BOOTSTRAP_LOAD         0x0411
    #define F_BOOTSTRAP_VERIFY       0x0412
    #define F_HEADER                 0x0324
    #define F_MEMORY_DATA_LOAD       0x0340
    #define F_MEMORY_DATA_VERIFY     0x0740
    #define F_TRAILER                0x0362
    #define F_EXECUTE                0x0413

    int f_status_message(LOOKUP_TABLE_TYPE *header);
    int f_command_message(LOOKUP_TABLE_TYPE *header, int command);
    int f_header_message(LOOKUP_TABLE_TYPE *header, int *data_pointer);
    int f_memory_data_load_message(LOOKUP_TABLE_TYPE *header,
        int *data_pointer, int amount);
    int f_memory_data_verify_message(LOOKUP_TABLE_TYPE *header,
    int *data_pointer, int amount);
    int f_trailer_message(LOOKUP_TABLE_TYPE *header, int *data_pointer);

/* end */

/****************************************************************************
Module Name:    msgs_f.c
Number/Version:
History:
            Date          Rev    Author              Description
            25-Jun-1993 0.0      C. Houlberg         Baseline

Abstract:
            Impliments appendix F of MIL-STD-2217.
****************************************************************************/

#include "rrt.h"                /* RRT configuration                  */
#include "dsp.h"                /* DSP definitions                    */
#include "system.h"             /* System definitions                 */
#include "cardhdrs.h"           /* Memory card header definitions     */
#include "wordtype.h"           /* Word definitions                   */
#include "display.h"            /* LCD display definitions            */
#include "timer.h"              /* Timer definitions                  */
#include "error.h"              /* Error definitions                  */
#include "initprot.h"           /* Protocol state table definitions   */
#include "msgs_f.h"             /* Protocol message definitions       */

/****************************************************************************
Name:       f_status_message
Number/Version:
History:
            Date          Rev    Author              Description
            25-Jun-1993 0.0      C. Houlberg

Inputs:
            header
Outputs:
            return_word
Global Data:
            - None -
Functions Referenced:
            ms1553_send
Abstract:
```

```
            Impliments appendix F of MIL-STD-2217.
*****************************************************************************/
int f_status_message(LOOKUP_TABLE_TYPE *header)
{
      STATUS_WORD_TYPE *status_field;
      TIMER_REG_TYPE *timer;              /* Pointer to timer counter register */
      int return_word;
      int command, message[33];
      int delay, busy_count;

      timer = (TIMER_REG_TYPE *) &TIMER0;
      delay = header->Delay;
      busy_count = header->Auto_Busy_Count;

      status_field = (STATUS_WORD_TYPE *) &message[0];

      command = ((header->RT_Address) << 11) + F_STATUS;

      do
      {
          return_word = ms1553_receive(&command, &message[0]);

            if(!(return_word))
            {
                  if(status_field->Terminal_Address != header->RT_Address)
                    return_word = ADDRESS_ERROR;
                  else if(status_field->F_Wait)
                  {
                        return_word = BUSY_CONDITION;
                        if(busy_count)
                              msec_timer(delay, timer);         /* Delay next message */
                  }
                  else if(!status_field->F_Success)
                        return_word = NO_SUCCESS;
            }

      } while((return_word == BUSY_CONDITION) && busy_count--);

      return return_word;
}

/*****************************************************************************
Name:         f_command_message
Number/Version:
History:
              Date          Rev      Author              Description
              28-Jun-1993   0.0      C. Houlberg         Baseline

Inputs:
              header
              command
Outputs:
              return_word
Global Data:
              - None -
Functions Referenced:
              ms1553_send
Abstract:
              Impliments commands of appendix F in MIL-STD-2217:
                    Bootstrap Load
                    Bootstrap Verify
                    Start Execution
*****************************************************************************/
int f_command_message(LOOKUP_TABLE_TYPE *header, int command)
{
      STATUS_WORD_TYPE *status_field;
      int return_word;
      int message[33];

      status_field = (STATUS_WORD_TYPE *) &message[0];

      command += ((header->RT_Address) << 11);

      return_word = ms1553_receive(&command, &message[0]);

      /* If no error then check address and status word.
      */
      if(!return_word)
      {
            if(status_field->Terminal_Address != header->RT_Address)
```

```
                return_word = ADDRESS_ERROR;
        }
        return return_word;
}

/*****************************************************************************
Name:           f_header_message
Number/Version:
History:
                Date            Rev     Author                  Description
                28-Jun-1993 0.0         C. Houlberg             Baseline

Inputs:
                header
                data_pointer
Outputs:
                return_word
Global Data:
                - None -
Functions Referenced:
                ms1553_send
Abstract:
                Impliments appendix F of MIL-STD-2217.
*****************************************************************************/
int f_header_message(LOOKUP_TABLE_TYPE *header, int *data_pointer)
{
        STATUS_WORD_TYPE *status_field;
        int return_word;
        int status;

        status_field = (STATUS_WORD_TYPE *) &status;

        /* Command */
        *data_pointer = ((header->RT_Address) << 11) + F_HEADER;

        /* Send the message */
        return_word = ms1553_send(data_pointer, &status);

        /* If no error then check address and status.
        */
        if(!return_word)
        {
                if(status_field->Terminal_Address != header->RT_Address)
                        return_word = ADDRESS_ERROR;
        }

        return return_word;
}

/*****************************************************************************
Name:           f_memory_data_load_message
Number/Version:
History:
                Date            Rev     Author                  Description
                28-Jun-1993 0.0         C. Houlberg             Baseline

Inputs:
                header
                data_pointer
                amount
Outputs:
                return_word
Global Data:
                - None -
Functions Referenced:
                ms1553_send
Abstract:
                Impliments appendix F of MIL-STD-2217.
*****************************************************************************/
int f_memory_data_load_message(LOOKUP_TABLE_TYPE *header,
        int *data_pointer, int amount)
{
        /*      This message is used to pass the data to be loaded into the
                unit memory.
        */
        STATUS_WORD_TYPE *status_field;
        int return_word;
        int status;

        *data_pointer = ((header->RT_Address) << 11) + F_MEMORY_DATA_LOAD
          + (0x1f & amount);
```

```
        return_word = ms1553_send(data_pointer, &status);

        /* If no error then check for address error.
        */
        if(!return_word)
        {
              if(status_field->Terminal_Address != header->RT_Address)
                    return_word = ADDRESS_ERROR;
        }

        return return_word;
}

/***************************************************************************
Name:       f_memory_data_verify_message
Number/Version:
History:
            Date          Rev    Author            Description
            28-Jun-1993   0.0    C. Houlberg       Baseline

Inputs:
            header
            data_pointer
            amount
Outputs:
            return_word
Global Data:
            - None -
Functions Referenced:
            ms1553_send
Abstract:
            Impliments appendix F of MIL-STD-2217.
***************************************************************************/
int f_memory_data_verify_message(LOOKUP_TABLE_TYPE *header,
            int *data_pointer, int amount)
{
        /*    This message is used to pass the data that the MLV will compare
              to the data stored on the MSD.
        */
        STATUS_WORD_TYPE *status_field;
        int return_word;
        int command;

        status_field = (STATUS_WORD_TYPE *) data_pointer;

        command = ((header->RT_Address) << 11) + F_MEMORY_DATA_VERIFY
          + (0x1f & amount);

        return_word = ms1553_receive(&command, data_pointer);

        /* If no error then check address and status.
        */
        if(!return_word)
        {
              if(status_field->Terminal_Address != header->RT_Address)
                    return_word = ADDRESS_ERROR;
        }

        return return_word;
}

/***************************************************************************
Name:       f_trailer_message
Number/Version:
History:
            Date          Rev    Author            Description
            28-Jun-1993   0.0    C. Houlberg       Baseline

Inputs:
            header
            subpage_count
            first_subpage
            checksum
Outputs:
            return_word
Global Data:
            - None -
Functions Referenced:
            ms1553_send
```

```
Abstract:
            Impliments appendix F of MIL-STD-2217.
*****************************************************************************/
int f_trailer_message(LOOKUP_TABLE_TYPE *header, int *data_pointer)
{
      STATUS_WORD_TYPE *status_field;
      int return_word;
      int status;

      /* Command word */
      *data_pointer = ((header->RT_Address) << 11) + F_TRAILER;

      return_word = ms1553_send(data_pointer, &status);

      /* If no error then check address and status.
      */
      if(!return_word)
      {
            if(status_field->Terminal_Address != header->RT_Address)
                  return_word = ADDRESS_ERROR;
      }

      return return_word;
}

/* end */


/*****************************************************************************
Include File Name:    protog.h
Number/Version:
History:
            Date        Rev   Author          Description
            23-Mar-1993 0.0   C. Houlberg     Baseline

Abstract:

*****************************************************************************/

/*    Function prototypes
*/
int protocol_g(int address, int automode);
int upload_g(LOOKUP_TABLE_TYPE *header, int file_address);

/* end */


/*****************************************************************************
Module Name:  protog.c
Number/Version:
History:
            Date        Rev   Author          Description
            24-Jun-1993 0.0   C. Houlberg     Baseline

Abstract:
            Implements appendix G of MIL-STD-2217 for
            Rapid Reprogramming Terminal use.
*****************************************************************************/

#include "rrt.h"                               /* RRT configuration */
#include "dsp.h"                               /* DSP definitions */
#include "system.h"                            /* System definitions */
#include "cardhdrs.h"                          /* Memory card header definitions */
#include "wordtype.h"                          /* Word definitions */
#include "display.h"                           /* LCD display definitions */
#include "timer.h"                             /* Timer definitions */
#include "error.h"                             /* Error definitions */
#include "initprot.h"                          /* Protocol state table def */
#include "msgs_g.h"                            /* Protocol G message definitions */
#include "protog.h"                            /* Protocol G definitions */

/*****************************************************************************
Name:  protocol_g
Number/Version:
History:
            Date        Rev   Author          Description
            24-Jun-1993 0.0   C. Houlberg     Baseline

Inputs:
            address
            automode
```

```
Returns:
        0 for success
        non-zero error message for failure

Global Data:
        - None-

Functions Referenced:
        memory_card_read()
        LCD_display()
        init_protocol()
        g_command_response()
        init_file()
        upload_g()
Abstract:
        Implements appendix E of MIL-STD-2217
*****************************************************************************/
int protocol_g(int address, int automode)
{
    LOOKUP_TABLE_UNION header;
    LOOKUP_TABLE_UNION *header_union;
    LOOKUP_TABLE_UNION next_header;
    LOOKUP_TABLE_UNION *next_header_union;
    STATE_TABLE_TYPE state_table;
    STATE_TABLE_TYPE *state;
    PPI3_REG_TYPE *switch_status;              /* Switch status pointer */
    PPI2_REG_TYPE *equipment_discretes;        /* Equipment discretes pointer */
    int file_address, activity;
    int return_word;
    int i;
    char ascii_string[13];

    TIMER_REG_TYPE *timer;          /* Pointer to timer counter register */
    timer = (TIMER_REG_TYPE *) &TIMER0;

    switch_status = (PPI3_REG_TYPE *) &PPI3;
    equipment_discretes = (PPI2_REG_TYPE *) &PPI2;

    state = &state_table;
    header_union = &header;
    next_header_union = &next_header;

    /*  The following function is used by this protocol to establish
        the initial value of the variables:
              state->another_upload,
              state->another_verify.
    */
    return_word = init_protocol(address, state);

    /* Check for attempted illegal download or verify */
    if(state->another_verify)
        return_word = NO_VERIFY_SUPPORT;

    while((state->another_upload) && !return_word)
    {
        /* Set up file address to point to lookup table */
        file_address = address;

        /* Read in file lookup table */
        for(i = 0; i < SIZE_LOOKUP_TABLE; i++)
            header_union->array[i] = memory_card_read(file_address++);

        /* Process indication for init_file() */
        state->process = UPLOADING;

        while((state->another_upload) && !return_word)
        {
            /* Form filename */
            for(i = 0; i < 6; i++)
            {
                ascii_string[i+i] = (char) (0xff & header_union->array[i]),
                ascii_string[i+i+1] = (char)
                    (0xff & (header_union->array[i] >> 8));
            }
            ascii_string[12] = 0;              /* End of string indicator */
            /* Display filename */
            LCD_display(START_LINE1 + 7, &ascii_string[0]);

            /* Send the Initialize Device message */
            return_word = g_command_response(
                (LOOKUP_TABLE_TYPE *)header_union, G_INITIALIZE_DEVICE);
```

```
/* If NOT_POLLED inform user to power up AYK14 */
if(return_word == NOT_POLLED)
{
      /* Set the MS-1553 bus controller to monitor mode */
      ms1553_MT_setup();

      /* Determine activity on bus */
      activity = ms1553_monitor();

      if(activity == NO_ACTIVITY)           /* Need to power up BC */
      {
            /* Set up as an RT */
            ms1553_RT_setup();

            /* Set IPL in preparation of AYK14 power up */
            equipment_discretes->AYK14_Discretes
                  |= (header_union->structure.AYK14_IPL) << 4;
            LCD_display(START_LINE2, "Turn On MC");
                  /* Build message string */
            i = 0;
            if(header_union->structure.AYK14_Correlation & 0x01)
                  ascii_string[i++] = '1';
            if(header_union->structure.AYK14_Correlation & 0x02)
            {
                  if(i)
                        ascii_string[i++] = ',';
                  ascii_string[i++] = '2';
            }
            if(header_union->structure.AYK14_Correlation & 0x04)
            {
                  if(i)
                        ascii_string[i++] = ',';
                  ascii_string[i++] = '3';
            }
            if(header_union->structure.AYK14_Correlation & 0x08)
            {
                  if(i)
                        ascii_string[i++] = ',';
                  ascii_string[i++] = '4';
            }
            ascii_string[i++] = '\t';           /* Clear rest of line */
            ascii_string[i] = 0;
            LCD_display(START_LINE2 + 10, &ascii_string[0]);

            do
            {
                  return_word = g_command_response(
                        (LOOKUP_TABLE_TYPE *)header_union,
                        G_INITIALIZE_DEVICE);

            } while((return_word == NOT_POLLED)
                  && (switch_status->Not_Skip));

            if(!(switch_status->Not_Skip))
            {
                  return_word = ABORT_OCCURRED;
                  LCD_display(START_LINE1, "ABORT:\rEXEC to Continue\t");

                  /* Allow time for switch to settle. */
                  timer->Timer_Counter = SETTLE_TIME;
                  while(timer->Timer_Counter)
                        /* Make sure switch is open */
                        if(!(switch_status->Not_Skip))
                              timer->Timer_Counter = SETTLE_TIME;
            }

      }
}

/* Clear IPL to start reprogram of AYK14 */
equipment_discretes->AYK14_Discretes &= 0x0f;

/*    The following function is used here by this protocol to
      establish or update the value of the variables:
            state->another_upload,
            state->next_file_address.
      Variable established locally and used by this function is:
            state->process = UPLOADING.
*/
if(!(return_word))
{
      init_file(file_address, header_union,
            next_header_union, state);
```

```
                    /* Display Load message and load the data */
                    LCD_display(START_LINE2, "Uploading\t");

                    return_word = upload_g((LOOKUP_TABLE_TYPE *)header_union,
                          file_address);
               }

               if(!(return_word))
                    if(state->another_upload)
                    {
                          /* Make address of next file the current file address,
                               skips lookup table. */
                          file_address = state->next_file_address;

                          /* Move next header to current header location */
                          for(i = 0; i < SIZE_LOOKUP_TABLE; i++)
                               header_union->array[i] = next_header_union->array[i];
                    }
                    else
                    {
                          /* Indicate load done */
                          LCD_display(START_LINE2, "Upload Done\t");
                    }
          }

          /*    The following function "init_file" is used here by this
                protocol to establish or update the value of the variables:
                      state->another_upload,
                      state->next_file_address.
                Variable established locally and used by this function is:
                      state->process = VERIFYING.
          */
          /* Process indication for init_file() is VERIFYING even though there
                is no verify or download permitted by Protocol G.  This process
                indication is needed to set up for sequentially loading a file
                following the transfer of control to a boot load program or the
                independent loading or some other program.
          */
          state->process = VERIFYING;
          init_file(file_address, header_union, next_header_union, state);

          /* Update address to location of next lookup table */
          address = state->next_file_address - SIZE_LOOKUP_TABLE;
     }

     return return_word;
}
/******************************************************************************
Name:  upload_g
Number/Version:
History:
          Date        Rev   Author          Description
          24-Jun-1993 0.0   C. Houlberg     Baseline

Inputs:
          header_pointer
          file_address
Returns:
          0 for success
          non-zero error message for failure

Global Data:
          - None-

Functions Referenced:
          g_header_response()
          g_memory_data_load_response()
          g_trailer_response()
          ascii_conversion()
          LCD_display()

Abstract:

******************************************************************************/
int upload_g(LOOKUP_TABLE_TYPE *header_pointer, int file_address)
{
     HEADER_WORD_TYPE *header;          /* Pointer to header message data */
     PPI2_REG_TYPE *discrete_pointer;   /* IPL discrete pointer */
     TIMER_REG_TYPE *timer0;            /* Pointer to timer counter register */
     int i, file_size;
     int data_word_count, data_amount;
```

```
int data_location;
int transfer_mode, header_type;
int buffer_xfer_count;
int load_address;
int transfer_count, transfer_amount;
int message_amount;
int return_word = NO_ERROR;
int message[33];
char ascii_string[5];

timer0 = (TIMER_REG_TYPE *) &TIMER0;

/* Initialize IPL discrete pointer */
discrete_pointer = (PPI2_REG_TYPE *) &PPI2;

/* Header message data word 1 pointer */
header = (HEADER_WORD_TYPE *) &message[1];

/* File size measured in bytes */
file_size = (header_pointer->File_Size_MSW << 16)
      + header_pointer->File_Size_LSW;

/* Initialize data counter */
data_word_count = (file_size + 1) >> 1;

/* Transfer data */
while(data_word_count && !(return_word))        /* Transfer all data */
{
      /* Send IPL read message */
      return_word = g_command_response(header_pointer,
            G_INITIALIZE_IO_TRANSFER);

      if(!(return_word))
      {
            /* Initialize location of data to transfer */
            data_location = file_address;

            /* Filter out all transactions with
                  undefined or reserved header types */
            do
            {
                  /* Gather header data words */
                  for(i = 1; i <= 4; i++)
                        message[i] = memory_card_read(data_location++);

                  header_type = header->Header_Type;
                  if(header_type != WORD_COUNT)
                  {
                        data_location += 2;     /* Skip Trailer to next header */
                        data_word_count -= 6;   /* Subtract null transaction */
                  }

            } while(header_type != WORD_COUNT);

            /* Extract load descriptors */
            transfer_mode = header->Transfer_Mode;
            buffer_xfer_count = header->Buffer_Xfer_Count;
            load_address = message[2];

            /* Display page number for transaction */
            ascii_conversion((message[4] >> 3), &ascii_string[0]);
            LCD_display(START_LINE2 + 16, &ascii_string[0]);

            /* Acount for maximum buffer count */
            if(transfer_mode && !buffer_xfer_count)
                  buffer_xfer_count = MAX_BUFFER_COUNT;

            /* Acount for no transfer and header & trailer data */
            if(transfer_mode == NO_XFER)
            {
                  transfer_count = 0;
                  data_amount = 6;
            }
            else
            {
                  transfer_count = buffer_xfer_count;
                  data_amount = transfer_count + 6;
            }

            /* Ensure Transfer Control agrees with transfer_count */
```

```
            if(((message[4] & TC_MASK) == LAST_TRANSACTION)
                  && (data_amount != data_word_count))
                  return_word = TC_ERROR;

            /* Ensure data amount transferring does
                  not exceed data left to transfer */
            if(data_amount > data_word_count)
                  return_word = DATA_COUNT_ERROR;

            /* Send the Header message */
            return_word = g_header_response(header_pointer, &message[0]);
      }

      /* Send the Data Load messages */
      transfer_amount = transfer_count;
      while(transfer_count && !(return_word))
      {
            message_amount = 32;          /* Maximum words per message */
            if(message_amount > transfer_count)
            {                                         /* Fewer words left to send */
                  message_amount = transfer_count;    /* Amount sending */
                  transfer_count = 0;
            }
            else                                  /* Count of words left */
                  transfer_count -= message_amount;

            /* Ready data for transfer, command inserted later */
            for(i = 1; i <= message_amount; i++)
                  message[i] = memory_card_read(data_location++);

            /* Display address */
            ascii_conversion(load_address + transfer_amount
                  - (transfer_count + message_amount), &ascii_string[0]);
            LCD_display(START_LINE2 + 11, &ascii_string[0]);

            return_word = g_memory_data_load_response(header_pointer,
                  &message[0], message_amount);
      }

      if(!(return_word))
      {
            for(i = 1; i <= 2; i++)
                  message[i] = memory_card_read(data_location++);

            /* Send the Trailer message */
            return_word = g_trailer_response(header_pointer, &message[0]);
      }

      if(!(return_word))
      {
            file_address = data_location;
            data_word_count -= data_amount;
      }
  }

  if(header_pointer->IPL_Fail_Used)
  {
        /* Allow some time (1 msec.) for IPL error to be established */
        msec_timer(1, timer0);

        /* Test the IPL Fail discrete */
        if((header_pointer->AYK14_IPL) & (discrete_pointer->IPL_Fail))
              return_word = IPL_FAIL_ERROR;
   }

   /* Return status of load */
   return return_word;                              /* Load completed or aborted */
}

/* end */

/***************************************************************************
Include File Name:    msgs_g.h
Number/Version:
History:
          Date         Rev     Author                  Description
          22-Mar-1993 0.0     B. Malmberg

Abstract:
          This file contains define statements for setting the
          status word in protocol G.
***************************************************************************/
```

```
/* Protocol G definitions */
/* Even though the address of the RRT for this protocol is always 31,
      it is added to the command in the message function */
#define G_STATUS                        0x0402
#define G_INITIALIZE_DEVICE             0x0414
#define G_INITIALIZE_IO_TRANSFER        0x0415
#define G_HEADER                        0x0424
#define G_MEMORY_LOAD                   0x0420
#define G_TRAILER                       0x0422

int g_command_response(LOOKUP_TABLE_TYPE *header, int command);
int g_header_response(LOOKUP_TABLE_TYPE *header, int *data_pointer);
int g_memory_data_load_response(LOOKUP_TABLE_TYPE *header,
        int *data_pointer, int amount);
int g_trailer_response(LOOKUP_TABLE_TYPE *header, int *data_pointer);
int g_status_response(LOOKUP_TABLE_TYPE *header);

/* end */


/*****************************************************************************
Module Name:    msgs_g.c
Number/Version:
History:
            Date        Rev     Author                  Description
            22-Mar-1993 0.0     D. Lane

Abstract:
            Implements mesages for appendix G of MIL-STD-2217.
                  Data checksum used for HEADER, MEMORY DATA, and
                        TRAILER messages in Protocol B
*****************************************************************************/

#include "rrt.h"                /* RRT configuration                    */
#include "dsp.h"                /* DSP definitions                      */
#include "system.h"             /* System definitions                   */
#include "cardhdrs.h"           /* Memory card definitions              */
#include "wordtype.h"           /* Word definitions                     */
#include "display.h"            /* LCD display definitions              */
#include "timer.h"              /* Timer definitions                    */
#include "error.h"              /* Error definitions                    */
#include "initprot.h"           /* Protocol state table definitions     */
#include "msgs_g.h"             /* Protocol G message definitions       */

/*****************************************************************************
Name:       g_command_response
Number/Version:
History:
            Date        Rev     Author                  Description
            22-Mar-1993 0.0     D. Lane

Inputs:
            header
            command_word
Outputs:
            return_word
Global Data:
            - None -
Functions Referenced:
            ms1553_respond
Abstract:
            Implements the response to Initialize Device, Initialize
            I/O Transfer, and Status messages.
*****************************************************************************/
int g_command_response(LOOKUP_TABLE_TYPE *header, int command_word)
{
      int command, message[33];
      int return_word;

      /* Status word (not busy and not data ready) */
      message[0] = ((header->RRT_RT_Address) << 11);
      message[1] = 0;

      command = message[0] + command_word;

      return_word = ms1553_respond(&command, &message[0]);

      return return_word;                     /* Return status of message */
}

/*****************************************************************************
```

```
Name:        g_header_response
Number/Version:
History:
             Date         Rev     Author                  Description
             22-Mar-1993 0.0      D. Lane
Inputs:
             header
             data_pointer
Outputs:
             return_word
Global Data:
             - None -
Functions Referenced:
             ms1553_respond
Abstract:
             Implements the header message for protocol G.
*******************************************************************************/
int g_header_response(LOOKUP_TABLE_TYPE *header, int *data_pointer)
{
      int command;
      int return_word;

      /* Status word (not busy and data ready) */
      *data_pointer = ((header->RRT_RT_Address) << 11) + G_DATA_READY;

      /* Command to build the header message */
      command = ((header->RRT_RT_Address) << 11) + G_HEADER;

      return_word = ms1553_respond(&command, data_pointer);

      return return_word;                        /* Return status of message */
}

/*******************************************************************************
Name:        g_memory_data_load_response
Number/Version:
History:
             Date         Rev     Author                  Description
             22-Mar-1993 0.0      D. Lane

Inputs:
             header
             data_pointer
             amount
Outputs:
             return_word
Global Data:
             - None -
Functions Referenced:
             ms1553_respond
Abstract:
             Implements the Memory Data Load message for protocol G.
*******************************************************************************/
int g_memory_data_load_response(LOOKUP_TABLE_TYPE *header,
             int *data_pointer, int amount)
{
      /*    This message will be used to pass the data to be loaded into
            the unit.
      */
      int command;
      int return_word;
      /* Status word (not busy and data ready) */
      *data_pointer = ((header->RRT_RT_Address) << 11) + G_DATA_READY;

      /*    Command to build the memory data load message */
      command = ((header->RRT_RT_Address) << 11) + G_MEMORY_LOAD
      + (0x1f & amount);

      return_word = ms1553_respond(&command, data_pointer);

      return return_word;                        /* Return status of message */
}

/*******************************************************************************
Name:        g_trailer_response
Number/Version:
History:
             Date         Rev     Author                  Description
             22-Mar-1993 0.0      D. Lane

Inputs:
             header
```

```
            data_pointer
Outputs:
            return_word
Global Data:
            - None -
Functions Referenced:
            ms1553_respond
Abstract:
            Implements the Trailer message for protocol G.
*******************************************************************************/
int g_trailer_response(LOOKUP_TABLE_TYPE *header, int *data_pointer)
{
      /*    This message is used to pass the data checksum and additional
            load parameters to the unit.
      */
      int command;
      int return_word;

      /* Status word (not busy and data ready) */
      *data_pointer = ((header->RRT_RT_Address) << 11) + G_DATA_READY;

      /*    Command to build the trailer response messsage */
      command = ((header->RRT_RT_Address) << 11) + G_TRAILER;

      return_word = ms1553_respond(&command, data_pointer);

      return return_word;                          /* return status of message */
}

/*******************************************************************************
Name:         g_status_response
Number/Version:
History:
            Date        Rev     Author          Description
            01-Jul-1992 0.0        C. Houlberg        Baseline
Inputs:
            lookup_table_pointer
            data_pointer
Outputs:
            return_word
Global Data:
            - None -
Functions Referenced:
            ms1553_respond
Abstract:
            Impliments status response for protocol G.
*******************************************************************************/
int g_status_response(LOOKUP_TABLE_TYPE *header)
{
      int command, message[33];
      int return_word;

      /* Status word (not busy and data ready) */
      message[0] = ((header->RRT_RT_Address) << 11) + G_DATA_READY;

      /* Command word */
      command = ((header->RRT_RT_Address) << 11) + G_STATUS_COMMAND;

      return_word = ms1553_respond(&command, &message[0]);

      return return_word;
}

/* end */

/*******************************************************************************
Include File Name:    protoh.h
Number/Version:
History:
            Date        Rev   Author            Description
            22-Mar-1993 0.0   C. Houlberg       Baseline

Abstract:
                  Definitioins used to implement appendix H of MS-2217.
*******************************************************************************/

/*    Function prototypes
*/
      int protocol_h(int address, int automode);
      int upload_h(LOOKUP_TABLE_TYPE *header_pointer, int file_address);
      int verify_h(LOOKUP_TABLE_TYPE *header_pointer, int file_address);

/* end */
```

```
/****************************************************************************
Module Name:  protoh.c
Number/Version:
History:
            Date         Rev   Author          Description
            25-May-1993  0.0   C. Houlberg     Baseline
Abstract:
            Implements appendix H of MIL-STD-2217 for HARM CLC loading
****************************************************************************/

#include "rrt.h"                                  /* RRT configuration */
#include "dsp.h"                                  /* DSP definitions */
#include "system.h"                               /* System definitions */
#include "cardhdrs.h"                             /* Memory card header definitions */
#include "wordtype.h"                             /* Word definitions */
#include "display.h"                              /* LCD display definitions */
#include "timer.h"                                /* Timer definitions */
#include "error.h"                                /* Error definitions */
#include "initprot.h"                             /* Protocol state table def */
#include "msgs_h.h"                               /* Protocol H message definitions */
#include "protoh.h"                               /* Protocol H definitions */

#define         BLOCK_SIZE        0x800           /* Number of sequences */
#define         MAX_ERRORS        3               /* Maximum number of errors */

/****************************************************************************
Name:  protocol_h
Number/Version:
History:
            Date         Rev   Author          Description
            23-Mar-1993  0.0   C. Houlberg     Baseline

Inputs:
            address
            automode
Returns:
            0 for success
            NOn-zero error message for failure

Global Data:
            - None-

Functions Referenced:
            memory_card_read()
            LCD_display()
            msec_timer()
            init_protocol()
            upload_h()
            verify_h()
Abstract:
            Implements appendix h of MIL-STD-2217 for HARM
****************************************************************************/
int protocol_h(int address, int automode)
{
      CARD_HEADER_TYPE *card_pointer;           /*  Pointer into card header */
      STATE_TABLE_TYPE state_table;
      STATE_TABLE_TYPE *state;                  /*  Pointer to state         */
      LOOKUP_TABLE_UNION header;
      LOOKUP_TABLE_UNION *header_pointer;       /*  Pointer to file header   */
      int return_word = 0;
      int i, file_address;                      /*  loop counter             */
      char ascii_string[13];
      TIMER_REG_TYPE *timer;                    /* Pointer to timer counter
                                                   register                  */
      timer = (TIMER_REG_TYPE *) &TIMER0;

      /* Set up pointers */
      state = &state_table;
      header_pointer = &header;

      /*    The following function is used by this protocol to establish
            the value of the variables:
                  state->another_upload,
                  state->another_verify.
      */
      return_word = init_protocol(address, state);

      file_address = address;

      /* Read in file header */
      for(i = 0; i < SIZE_LOOKUP_TABLE; i++)
            header_pointer->array[i] = memory_card_read(file_address++);
```

```
    /* Test for upload */
    if(!(return_word) && state->another_upload)
    {
          /* Display Load message */
          LCD_display(START_LINE2, "Uploading\t");

          /* Load the data */
          return_word = upload_h((LOOKUP_TABLE_TYPE *) header_pointer,
                file_address);

          if(!(return_word))
                /* Display Load complete */
                LCD_display(START_LINE2, "Upload Done\t");
    }

    /* Test for download */
    if(!(return_word) && state->another_verify)
    {
          /* Display message */
          if(status_flags DOWNLOAD)
                LCD_display(START_LINE2, "Download\t");
          else
                LCD_display(START_LINE2, "Verifying\t");

          /* Verify the data */
          return_word = verify_h((LOOKUP_TABLE_TYPE *) header_pointer,
                file_address);

          if(!(return_word))
                /* Display action complete */
                if(status_flags.DOWNLOAD)
                      LCD_display(START_LINE2, "Download Done\t");
                else
                      LCD_display(START_LINE2, "Data Verified\t");
    }

    return return_word;              /* return status with return_word */
}
/******************************************************************************
Name:  upload_h
Number/Version:
History:
            Date         Rev   Author          Description
            23-Mar-1993 0.0   C. Houlberg      Baseline

Inputs:
            header_pointer
            file_address
Returns:
            0 for success
            NOn-zero error message for failure

Global Data:
            - None-

Functions Referenced:
            send_status_message()
            data_load_message_h()
            ascii_conversion()
            LCD_display()
            msec_timer()

Abstract:
            Loads data into HARM
******************************************************************************/
int upload_h(LOOKUP_TABLE_TYPE *header_pointer, int file_address)
{
      STATUS_WORD_TYPE *status_field;
      SEND_STATUS_DATA_TYPE *data_field;
      TIMER_REG_TYPE *timer;                 /* Pointer to timer counter register */
      int i;                                 /* Loop counter */
      int return_word = NO_ERROR;            /* Error status */
      int device_file_size;
      int words_to_transfer;                 /* Number of words to transfer */
      int temp;
      int message[33];                       /* Message buffer */
      int data_word_amount;
      int starting_address;
      int checksum;                          /* Two's compliment checksum */
      int parity;
      int busy_count;                        /* Number of retries when busy */
      int retry = NO;
```

```
int retry_count;
int error = NO;
int error_count;
char ascii_string[5];                    /* Display string */

timer = (TIMER_REG_TYPE *) &TIMER0;

status_field = (STATUS_WORD_TYPE *) &message[0];
data_field = (SEND_STATUS_DATA_TYPE *) &message[1];

/* Number of retries when busy */
busy_count = header_pointer->Auto_Busy_Count;
/* File size measured in bytes */
device_file_size = (header_pointer->File_Size_MSW << 16)
      + header_pointer->File_Size_LSW;

/* Gather file header data words */
for(i = 1; i <= 4; i++)
      message[i] = memory_card_read(file_address++);

/* Extract load starting address from file header data */
starting_address = message[2];

/* Establish amount of words to transfer (omit header and trailer words) */
words_to_transfer = (device_file_size >> 1) - 6;

/* Establish amount of data in each message */
temp = 0;
for(data_word_amount = 0; temp < words_to_transfer; data_word_amount++)
      temp += BLOCK_SIZE;

/* Maximum number of message errors allowed */
error_count = header_pointer->Manual_Error_Count;

/* Send the Data Load messages if NO error */
while(words_to_transfer && !return_word)  /* Transfer all data */
{
      /*    Build the message starting with the starting address,
            command inserted later */
      message[1] = starting_address;

      /* Put the data into the message */
      checksum = 0;                          /* Initial checksum */
      parity = 0;                            /* Initial parity */
      for(i = 2; i < (data_word_amount + 2); i++)
      {
            message[i] = memory_card_read(file_address++);
            checksum -= message[i];          /* Update checksum */
            parity ^= message[i];            /* Update parity */
      }

      /* Mask checksum */
      checksum &= 0xffff;

      /* Append the checksum and parity words */
      message[i++] = checksum;
      message[i] = parity;

      /* Display the address for this block of data */
      ascii_conversion(starting_address, &ascii_string[0]);
      LCD_display(START_LINE2 + 11, &ascii_string[0]);

      /* Upload the data */
      return_word = data_load_message(header_pointer,
            &message[0], data_word_amount + 3);

      /* Test for a message error */
      if(return_word)
      {
            error = YES;
      }
      else                              /* Continue if NO error has occurred */
      {
            /* No error yet */
            error = NO;

            /* Setup retry and error counts */
            retry_count = busy_count;
            error_count = header_pointer->Manual_Error_Count;

            /* Delay next message */
            msec_timer(header_pointer->Delay, timer);
```

```
/* Get the status message and test it */
do                                      /* do while command combination */
{
      return_word = send_status_message(header_pointer, &message[0]);
      retry = NO;                       /* Initial condition */
      if(return_word)                   /* Some MS-1553 error occurred */
      {
            error = YES;
      }
      else if(status_field->Message_Error)      /* Test ME bit */
      {
            error = YES;
            return_word = MESSAGE_ERROR;  /* Error indication */
      }
      else if(status_field->Wait_Bit)          /* Test status wait bit */
      {
            retry = YES;
      }
      else if(!data_field->Ready_Bit)          /* Test ready */
      {
            retry = YES;
      }
      /* Test starting address */
      else if(starting_address != message[4])
      {
            retry = YES;
      }
      /* Test Receive Data Status error bit */
      else if(data_field->Data_Status_Error)
      {
            return_word = STATUS_ERROR;        /* Error indication */
      }
      /* Test checksum */
      else if(checksum != message[2])
      {
            return_word = CHECKSUM_ERROR; /* Error indication */
      }
      /* Test parity */
      else if(parity != message[3])
      {
            return_word = PARITY_ERROR;        /* Error indication */
      }

      /* Test error status */
      if(error)
      {
            if(error_count--)
            {
                  error = NO;
                  retry = YES;
            }
            else
                  retry = NO;
      }
      /* Test for programming error */
      else if(data_field->Program_Status == 3)
      {
            retry = NO;
            return_word = PROGRAMMING_ERROR;
      }

      /* Test retry status */
      if(retry)
      {
            if(retry_count--)
            {
                  /* Delay next message */
                  timer->Timer_Counter = USEC500;
                  while(timer->Timer_Counter);
            }
            else
            {
                  retry = NO;
                  return_word = ABORT_OCCURRED; /* Retry exhausted */
            }
      }

}while(retry);
```

```
                /* Words left to transfer */
                words_to_transfer -= data_word_amount;
                starting_address++;            /* Increment to next sta..ing address */
            }

            /* Delay next message */
            msec_timer(header_pointer->Delay, timer);
        }

        return return_word;            /* Return status of load */
}

/******************************************************************************
Name:  verify_h
Number/Version:
History:
            Date          Rev   Author          Description
            23-Mar-1993   0.0   C. Houlberg     Baseline
Inputs:
            header_pointer
            file_address
Returns:
            0 for success
            NOn-zero error message for failure

Global Data:
            - None-

Functions Referenced:
            prepare_verify_message()
            send_verify_data_message()
            ascii_conversion()
            LCD_display()
            msec_timer()

Abstract:
            Verifies data loaded into HARM
******************************************************************************/
int verify_h(LOOKUP_TABLE_TYPE *header_pointer, int file_address)
{
        STATUS_WORD_TYPE *status_field;
        TIMER_REG_TYPE *timer;         /* Pointer to timer counter register */
        int i;                         /* Loop counter */
        int return_word = NO_ERROR;
        int device_file_size;
        int words_to_transfer;         /* Number of words to transfer */
        int temp;
        int message[33];               /* Status word */
        int data_word_amount;
        int starting_address;
        int checksum, parity;
        int busy_count;                /* Number of auto retries */
        int file_checksum = 0;         /* File checksum (header, data, & trailer */
        int retry = NO;
        int retry_count;               /* Number of retries */
        int error = NO;
        int error_count;
        int block_address;
        char ascii_string[5];          /* Display string */

        timer = (TIMER_REG_TYPE *) &TIMER0;

        status_field = (STATUS_WORD_TYPE *) &message[0];

        /* Number of retries when busy */
        busy_count = header_pointer->Auto_Busy_Count;

        /* File size measured in bytes */
        device_file_size = (header_pointer->File_Size_MSW << 16)
              + header_pointer->File_Size_LSW;

        /* Gather file header data words */
        for(i = 1; i <= 4; i++)
        {
              message[i] = memory_card_read(file_address++);
              file_checksum += message[i];
        }

        /* Extract load starting address from file header data */
        starting_address = message[2];
```

```
/* Establish amount of words to transfer (omit header and trailer words) */
words_to_transfer = (device_file_size >> 1) - 6;

/* Establish amount of data in each message */
temp = 0;
for(data_word_amount = 0; temp < words_to_transfer; data_word_amount++)
      temp += BLOCK_SIZE;

/* Maximum number of message errors allowed */
error_count = header_pointer->Manual_Error_Count;

/* Send the Memory Verification messages if NO error */
while(words_to_transfer && !(return_word))      /* Transfer all data */
{
      /* First prepare memory words for transfer */
      /* Build the message starting with the starting address,
            command inserted later */
      message[1] = starting_address;
      /* Append the word count */
      message[2] = data_word_amount;
      /* Now append the checksum */
      checksum = 0;                              /* Initial checksum */
      checksum -= (starting_address + data_word_amount);
      message[3] = checksum;

      /* Display the address for this block of data */
      ascii_conversion(starting_address, &ascii_string[0]);
      LCD_display(START_LINE2 + 11, &ascii_string[0]);

      /* Send the message */
      return_word = prepare_verify_message(header_pointer, &message[0]);

      if(return_word)                                  /* Some error occurred */
      {
            error = YES;
      }
      else                      /* Transfer the data if NO error has occurred */
      {
            /* No errors yet */
            error = NO;

            /* Setup retry count */
            retry_count = busy_count;
            error_count = header_pointer->Manual_Error_Count;

            /* Delay next message */
            msec_timer(header_pointer->Delay, timer);

            /* Get the memory verification message and test it */
            do                               /* do while command combination */
            {
                  return_word = send_verify_data_message(header_pointer,
                        &message[0], data_word_amount + 1);

                  retry = NO;                      /* Initial condition */

                  if(return_word)                  /* Some error occurred */
                  {
                        error = YES;
                  }
                  else if(status_field->Message_Error)      /* Test ME bit */
                  {
                        error = YES;
                        return_word = MESSAGE_ERROR;
                  }
                  /* Test starting address */
                  else if(starting_address != message[1])
                  {
                        retry = YES;
                  }

                  if(error)
                  {
                        if(error_count--)
                        {
                              error = NO;
                              retry = YES;
                        }
                        else
                              retry = NO;
                  }
```

```
                if(retry)
                {
                        if(retry_count--)
                        {
                                return_word = NO_ERROR; /* Clear error indication */

                                /* Delay next message */
                                timer->Timer_Counter = USEC500;
                                while(timer->Timer_Counter);
                        }
                        else
                        {
                                retry = NO;
                                return_word = ABORT_OCCURRED; /* Retry exhausted */
                        }
                }

        }while(retry);
    }

    if(!return_word)                                /* If no errors verify data */
    {
        if(status_flags.DOWNLOAD)
                /* Store data in memory card */
                for(i = 2; (i < (data_word_amount + 2)) && !return_word; i++)
                {
                        return_word = memory_card_write(file_address++,
                                message[i]);
                        file_checksum += message[i];
                }
        else
                /* Verify data with Memory Card */
                for(i = 2; (i < (data_word_amount + 2)) && !return_word; i++)
                {
                        if(memory_card_read(file_address++) != message[i])
                        {
                                block_address = 0;              /* Initial block address */
                                for(;i > 2; i--)
                                        block_address += BLOCK_SIZE;
                                return_word = (VERIFY_ERROR + starting_address
                                        + block_address);
                        }
                        file_checksum += message[i];
                }

        words_to_transfer -= data_word_amount;
        starting_address++;                 /* Increment to next starting address */
    }
}

if(!(return_word))
{
        /* Process file checksum */
        file_checksum &= 0xffff;
        if(status_flags.DOWNLOAD)
        {
                return_word = memory_card_write(file_address++, 0);
                if(!(return_word))
                        return_word = memory_card_write(file_address, file_checksum);
        }
        else
                if(memory_card_read(file_address + 1) != file_checksum)
                        return_word = CHECKSUM_ERROR;
}

return return_word;                         /* Return status of verify */
}

/*****************************************************************************
Include File Name:    msgs_h.h
Number/Version:
History:
        Date            Rev     Author          Description
        23-Mar-1993     0.0     C. Houlberg     Baseline

Abstract:
        This file contains define statements for setting the status word in
        protocol H.
*****************************************************************************/

/* Messages developed for Protocol H */
/* BC messages */
```

```
int data_load_message(LOOKUP_TABLE_TYPE *lookup_table_pointer,
     int *message_pointer, int amount);
int send_status_message(LOOKUP_TABLE_TYPE *lookup_table_pointer,
     int *message_pointer);
int prepare_verify_message(LOOKUP_TABLE_TYPE *lookup_table_pointer,
     int *message_pointer);
int send_verify_data_message(LOOKUP_TABLE_TYPE *lookup_table_pointer,
     int *message_pointer, int amount);
int command_message_h(LOOKUP_TABLE_TYPE
     *lookup_table_pointer, int *send_message);

/********** Protocol H definitions **********/

     #define     DATA_LOAD              0x1a
     #define SEND_STATUS                0x0744
     #define PREPARE_VERIFY             0x0363
     #define VERIFY_DATA                0x3b
     #define DATA_READY                 0x100
     #define STATUS_CLEAR               0x00
     #define TRANSMIT_READY             0x400

     #define Wait_Bit  Instrumentation        /* Status word bit equivalent */

/* end */


/******************************************************************************
Module Name:    msgs_h.c
Number/Version:
History:
          Date          Rev  Author            Description
          23-Mar-1993 0.0  C. Houlberg       Baseline

Abstract:
          Impliments mesages for appendix H of MIL-STD-2217.
******************************************************************************/

#include "rrt.h"                              /* RRT configuration */
#include "dsp.h"                              /* DSP definitions */
#include "system.h"                           /* System definitions */
#include "cardhdrs.h"                         /* Memory Card header definitions */
#include "wordtype.h"                         /* MS1553 word definitions */
#include "ms1553.h"                           /* MS-1553 functions and definitions */
#include "timer.h"                            /* Time function definitions */
#include "error.h"                            /* Error definitions */
#include "display.h"                          /* LCD display definitions */
#include "msgs_h.h"

/******************************************************************************
Name:    data_load_message
Number/Version:
History:
          Date          Rev  Author            Description
          23-Mar-1993 0.0  C. Houlberg       Baseline

Inputs:
          lookup_table_pointer
          message_pointer
          amount
Outputs:
          return_word
Global Data:
          - None -
Functions Referenced:
          command_message_h
Abstract:

******************************************************************************/
int data_load_message(LOOKUP_TABLE_TYPE *lookup_table_pointer,
     int *message_pointer, int amount)
{
     /*   The Memory Data Load Message shall be used by the MLV to transfer
          memory data to the RT to be programmed into its EEPROM memory.
          Each Memory Data Load Memory shall be followed by one or more
          Send Ststus Message until the RT has processed the last data sent
          and is not indicating a wait condition in the Send Status Message.
     */
     /* Command to build the data load message */
     *message_pointer = ((lookup_table_pointer->RT_Address) << 11)
          + (DATA_LOAD << 5) + (0x1f & amount);
```

```
	/* Send the data */
	return command_message_h(lookup_table_pointer, message_pointer);
}

/*******************************************************************************
Name:	send_status_message
Number/Version:
History:
		Date		Rev	Author		Description
		23-Mar-1993 0.0	C. Houlberg	Baseline

Inputs:
		lookup_table_pointer
		message_pointer
Outputs:
		return_word
Global Data:
		- None -
Functions Referenced:
		ms1553_receive
Abstract:

*******************************************************************************/
int send_status_message(LOOKUP_TABLE_TYPE *lookup_table_pointer,
	int *message_pointer)
{
	/*	The send ststus message shall be used by the MLV to ascertain the RT's
		current ststus. When the Wait (W) bit is set (=1) in the STATUS RESPONSE
		WORD, it shall indicate that the RT's ststus data is not up-to-date.
	*/
	STATUS_WORD_TYPE *status_field;
	int command, return_word;

	/* Command to build the send status message */
	command = ((lookup_table_pointer->RT_Address) << 11) + SEND_STATUS;

	/* Get status and data words */
	return_word = ms1553_receive(&command, message_pointer);
	if(!return_word)
	{
		/* Check return address */
		status_field = (STATUS_WORD_TYPE *) message_pointer;
		if(status_field->Terminal_Address != lookup_table_pointer->RT_Address)
			return_word = ADDRESS_ERROR;		/* Address error */
	}
	return return_word;						/* Return MS-1553 error */
}

/*******************************************************************************
Name:	prepare_verify_message
Number/Version:
History:
		Date		Rev	Author		Description
		23-Mar-1993 0.0	C. Houlberg	Baseline

Inputs:
		lookup_table_pointer
		message_pointer
Outputs:
		return_word
Global Data:
		- None -
Functions Referenced:
		command_message_h
Abstract:

*******************************************************************************/
int prepare_verify_message(LOOKUP_TABLE_TYPE *lookup_table_pointer,
	int *message_pointer)
{
	/*	The prepare memory verification data message shall be used to tell
		the RT to prepare a set of memory words for transmission to the
		bus controller.
	*/
	/* Command to build the prepare verify message */
	*message_pointer = ((lookup_table_pointer->RT_Address) << 11)
		+ PREPARE_VERIFY;

	/* Send the data */
	return command_message_h(lookup_table_pointer, message_pointer);
}

/*******************************************************************************
```

```
Name:      send_verify_data_message
Number/Version:
History:
           Date         Rev   Author          Description
           23-Mar-1993 0.0    C. Houlberg     Baseline

Inputs:
           lookup_table_pointer
           message_pointer
           amount
Outputs:
           return_word
Global Data:
           - None -
Functions Referenced:
           ms1553_receive
Abstract:

******************************************************************************/
int send_verify_data_message(LOOKUP_TABLE_TYPE *lookup_table_pointer,
      int *message_pointer, int amount)
{
      /*    The send memory verification data message shall be used to
            retrieve from the RT the set of memory words requested by the
            precedding prepare memory verification data message.
      */
      STATUS_WORD_TYPE *word_field;
      int command, return_word;

      /* Command to build the send verify data message */
      command = ((lookup_table_pointer->RT_Address) << 11)
            + (VERIFY_DATA << 5) + (0x1f & amount);

      /* Get status and data words */
      return_word = ms1553_receive(&command, message_pointer);
      if(!return_word)
      {
            /* Check return address */
            word_field = (STATUS_WORD_TYPE *) message_pointer;
            if(word_field->Terminal_Address != lookup_table_pointer->RT_Address)
                  return_word = ADDRESS_ERROR;       /* Address error */
      }
      return return_word;                                /* Return MS-1553 error */
}

/******************************************************************************
Name:      comand_response_h
Number/Version:
History:
           Date         Rev   Author          Description
           23-Mar-1993 0.0    C. Houlberg     Baseline

Inputs:
           lookup_table_pointer
           send_message
Outputs:
           return_word
Global Data:
           - None -
Functions Referenced:
           ms1553_send
Abstract:

******************************************************************************/
/*
      high level MIL 1553 interface. This function
      performs the following tasks:

      - sends message transactions
      - includes required delay between messages
      - checks status word
      - errors out for busy retry count
      - repeats commands if required
      - errors out for too many repeats

      arguments to command_message are:
      *send_message = pointer to message to send
*/
int command_message_h(LOOKUP_TABLE_TYPE
      *lookup_table_pointer, int *send_message)
{
```

```
STATUS_WORD_TYPE *status_field;
int return_word, status;
int return_message[2];
int i, count, delay;

TIMER_REG_TYPE *timer;              /* Pointer to timer counter register */
timer = (TIMER_REG_TYPE *) &TIMER0;

/* Send message */
return_word = ms1553_send(send_message, &status);
if(return_word)
     return return_word;                              /* Return MS-1553 error */
/* Delay next message */
delay = lookup_table_pointer->Delay;

msec_timer(delay, timer);

/* Check status for RT address mismatch */
status_field = (STATUS_WORD_TYPE *) &status;
/* Check return address */
if(status_field->Terminal_Address != lookup_table_pointer->RT_Address)
     return ADDRESS_ERROR;

/* Check if need to repeat last message due to busy */
if(lookup_table_pointer->Transmit_Next_Message)
     return NO_ERROR;                              /* Do not repeat last */

/* Check for RT busy if status busy bit is usable */
if(lookup_table_pointer->Status_Busy_Not_Usable)
     /* The RT was tested prior to sending the message */
     return NO_ERROR;
else
{
     if(!(status_field->Busy_Bit))
          return NO_ERROR;                         /* Not busy */
}

count = lookup_table_pointer->Auto_Busy_Count;
for(i = 0; i < count; i++)
{
     /* Send command message */
     return_word = ms1553_send(send_message, &status);
     if(return_word)
          return return_word;                         /* Return MS-1553 error */

     /* Check return address */
     if(status_field->Terminal_Address != lookup_table_pointer->RT_Address)
          return ADDRESS_ERROR;

     /* If got this far the RT status busy bit is usable */
     if(!(status_field->Busy_Bit))
          return NO_ERROR;                         /* Not busy */
}
return BUSY_CONDITION;                             /* Still busy */
}
/* end */


/*****************************************************************************
Include File Name:    protoul.h
Number/Version:
History:
        Date          Rev    Author           Description
        23-Mar-1993   0.0    C. Houlberg      Baseline

Abstract:

*****************************************************************************/
     /* Function prototypes   */
     int protocol_ul(int address, int automode);
     int upload_ul(LOOKUP_TABLE_TYPE *header, int file_address);
     int verify_ul(LOOKUP_TABLE_TYPE *header, int file_address);

/* end */


/*****************************************************************************
Module Name:  protoul.c
Number/Version:
History:
        Date          Rev     Author           Description
        9-Jul-1993    0.0     C. Houlberg      Baseline
```

```
Abstract:
          Implements Unique Protocol One for loading the
          NADC using the Rapid Reprogramming Terminal.
*****************************************************************************/

#include "rrt.h"                    /* RRT configuration */
#include "dsp.h"                    /* DSP definitions */
#include "system.h"                 /* System definitions */
#include "cardhdrs.h"               /* Memory card header definitions */
#include "wordtype.h"               /* Word definitions */
#include "ms1553.h"                 /* MS-1553 functions and definitions */
#include "display.h"                /* LCD display definitions */
#include "timer.h"                  /* Timer definitions */
#include "error.h"                  /* Error definitions */
#include "initprot.h"               /* Protocol state table definitions */
#include "msgs_u1.h"                /* Protocol U1 message definitions */
#include "protou1.h"                /* Protocol U1 definitions */

/*****************************************************************************
Name:  protocol_u1
Number/Version:
History:
          Date         Rev      Author         Description
          9-Jul-1993   0.0      C. Houlberg    Baseline

Inputs:
          address
          automode

Returns:
          0 for success
          non-zero error message for failure

Global Data:
          - None-

Functions Referenced:
          memory_card_read()
          error_display()
          LCD_display()
          msec_timer()
          init_protocol()
          upload_u1()
          verify_u1()

Abstract:
          Implements protocol U1
*****************************************************************************/
int protocol_u1(int address, int automode)
{
     LOOKUP_TABLE_UNION header;
     LOOKUP_TABLE_UNION *header_union;
     STATE_TABLE_TYPE state_table;
     STATE_TABLE_TYPE *state;
     int file_address;
     int return_word;
     int delay;
     int i;

     TIMER_REG_TYPE *timer;        /* Pointer to timer counter register */
     timer = (TIMER_REG_TYPE *) &TIMER0;

     state = &state_table;
     header_union = &header;

     /*  The following function is used by this protocol to establish
         the initial value of the variables:
               state->another_upload,
               state->another_verify,
     */
     return_word = init_protocol(address, state);

     /* Set up file address to point to lookup table */
     file_address = address;

     /* Read in file lookup table */
     for(i = 0; i < SIZE_LOOKUP_TABLE; i++)
         header_union->array[i] = memory_card_read(file_address++);

     /* Establish delay between messages */
     delay = header_union->structure.Delay;
```

```
if((state->another_upload) && !return_word)
{
    /* Get the attention of MADC */
    /* Send mode command 2 */
    return_word = ul_mode_command((LOOKUP_TABLE_TYPE *) header_union,
        U1_MODE2_COMMAND);
    /* Send mode command 3 */
    if(!(return_word))
    {
        /* Delay next message */
        msec_timer(delay, timer);

        return_word = ul_mode_command((LOOKUP_TABLE_TYPE *) header_union,
            U1_MODE3_COMMAND);
    }

    if(!(return_word))
    {
        /* Display Load message and load the data */
        LCD_display(START_LINE2, "Uploading\t");

        /* Delay next message by 255 msecs. */
        msec_timer(255, timer);

        return_word = upload_ul((LOOKUP_TABLE_TYPE *) header_union,
            file_address);
    }

    if(!(return_word))
        /* Indicate load done */
        LCD_display(START_LINE2, "Upload Done\t");

    if(!(return_word) && (header_union->structure.Verify_After_Load));
        msec_timer(2000, timer);        /* Delay verify by 2 seconds */
}

if(!(return_word))
{
    /* Set up file address to point to lookup table */
    file_address = address;

    /* Read in file lookup table */
    for(i = 0; i < SIZE_LOOKUP_TABLE; i++)
        header_union->array[i] = memory_card_read(file_address++);
}
if((state->another_verify) && !return_word)
{
    /* Verify the data */
    /* Test if loading Memory Card */
    if(status_flags.DOWNLOAD)
        /* Display Download message */
        LCD_display(START_LINE2, "Download\t");
    else
        /* Display Verify message */
        LCD_display(START_LINE2, "Verifying\t");

    return_word = verify_ul((LOOKUP_TABLE_TYPE *) header_union,
        file_address);

    if(!(return_word))
        /* Test if loaded Memory Card */
        if(status_flags.DOWNLOAD)
            /* Display Download complete indication */
            LCD_display(START_LINE2, "Download Done\t");
        else
            /* Display Verify complete indication */
            LCD_display(START_LINE2, "Data Verified\t");
}

return return_word;
}

/*****************************************************************************
Name:  upload_ul
Number/Version:
History:
        Date         Rev     Author         Description
        9-Jul-1993   0.0     C. Houlberg    Baseline

Inputs:
        header
        file_address
```

```
Returns:
            0 for success
            non-zero error message for failure

Global Data:
            - None-

Functions Referenced:
            error_display()
            mode_command_two_ul()
            mode_command_three_ul()
            memory_data_load_ul()
            ascii_conversion()
            LCD_display()
            msec_timer()

Abstract:
            Loads data into NADC
*****************************************************************************/
int upload_ul(LOOKUP_TABLE_TYPE *header_pointer, int file_address)
{
      HEADER_WORD_TYPE *header;                /* Pointer to header message data */
      TIMER_REG_TYPE *timer;                   /* Pointer to timer counter register */
      int i, file_size;
      int data_word_count;
      int data_location;
      int load_address;
      int message_amount;
      int return_word = NO_ERROR;
      int message[33];
      int delay;
      char ascii_string[5];

      timer = (TIMER_REG_TYPE *) &TIMER0;

      /* Header message data word 1 pointer */
      header = (HEADER_WORD_TYPE *) &message[1];

      /* Establish delay between messages and busy count */
      delay = header_pointer->Delay;

      /* File size measured in bytes */
      file_size = (header_pointer->File_Size_MSW << 16)
            + header_pointer->File_Size_LSW;

      /* Establish amount of words to transfer (omit header and trailer words) */
      data_word_count = (file_size >> 1) - 6;

      /* Initialize location of data to transfer */
      data_location = file_address;

      /* Gather header data words */
      for(i = 1; i <= 4; i++)
            message[i] = memory_card_read(data_location++);

      /* Extract load address */
      load_address = message[2];

      /* Transfer data */
      while(data_word_count && !(return_word))           /* Transfer all data */
      {
            message_amount = 30;          /- Maximum data words per message */
            if(message_amount > data_word_count)
            {                                            /* Fewer words left to send */
                  message_amount = data_word_count;      /* Amount sending */
                  data_word_count = 0;
            }
            else                                   /* Count of words left */
                  data_word_count -= message_amount;

            /* Ready data for transfer, command inserted later */
            message[1] = load_address;
            for(i = 2; i <= (message_amount + 1); i++)
                  message[i] = memory_card_read(data_location++);

            /* Display address for block of data */
            ascii_conversion(load_address, &ascii_string[0]);

            LCD_display(START_LINE2 + 11, &ascii_string[0]);

            return_word = ul_data_load_message(header_pointer,
                  &message[0], message_amount + 1);
```

```
            /* Delay next message 45 msecs. */
            msec_timer(45, timer);

            /* Updata load address */
            load_address += message_amount;
        }

        /* Return status of load */
        return return_word;                                    /* Load completed or aborted */
}
/*****************************************************************************
Name:  verify_ul
Number/Version:
History:
            Date         Rev      Author        Description
            9-Jul-1993   0.0      C. Houlberg   Baseline

Inputs:
            header
            file_address
Returns:
            0 for success
            non-zero error message for failure

Global Data:
            - None-

Functions Referenced:
            error_display()
            prepare_memory_verify_ul()
            send_memory_verify_ul()
            ascii_conversion()
            LCD_display()
            msec_timer()

Abstract:
            Verifies data loaded into NADC
*****************************************************************************/
int verify_ul(LOOKUP_TABLE_TYPE *header_pointer, int file_address)
{
      HEADER_WORD_TYPE *header;                 /* Pointer to header message data */
      TIMER_REG_TYPE *timer;                    /* Pointer to timer counter register */
      PPI3_REG_TYPE *switch_status;             /* Switch status pointer */
      int i, file_size;
      int data_word_count;
      int data_location;
      int load_address;
      int message_amount;
      int return_word = NO_ERROR;
      int message[33];
      int checksum;
      int delay, busy_count;
      int data;
      char ascii_string[5];

      timer = (TIMER_REG_TYPE *) &TIMER0;
      switch_status = (PPI3_REG_TYPE *) &PPI3;

      /* Header message data word 1 pointer */
      header = (HEADER_WORD_TYPE *) &message[1];

      /* Establish delay between messages */
      delay = header_pointer->Delay;
      busy_count = header_pointer->Auto_Busy_Count;

      /* File size measured in bytes */
      file_size = (header_pointer->File_Size_MSW << 16)
           + header_pointer->File_Size_LSW;

      /* Initialize data counter */
      data_word_count = (file_size + 1) >> 1;

      /* Initialize location of data to transfer and checksum */
      data_location = file_address;
      checksum = 0;                                          /* Clear the checksum */

      /* Gather header data words */
      for(i = 1; i <= 4; i++)
      {
           message[i] = memory_card_read(data_location++);
           checksum += message[i];
      }
```

```
/* Extract load address */
load_address = message[2];

/* Transfer data */
while(data_word_count && !(return_word))  /* Transfer all data */
{
      /* Send the Data Verify messages */
      message_amount = 32;          /* Maximum words per message */
      if(message_amount > data_word_count)
      {
            message_amount = data_word_count;   /* Amount sending */
            data_word_count = 0;                      /* Count of words left */
      }
      else                                /* Count of words left */
            data_word_count -= message_amount;

      /* Display address for block of data */
      ascii_conversion(load_address, &ascii_string[0]);
      LCD_display(START_LINE2 + 11, &ascii_string[0]);

      message[1] = load_address;
      message[2] = message_amount;
      return_word = ul_prepare_data_message(header_pointer, &message[0]);

      if(!(return_word))
      {
            /* Delay next message by 28 msecs. */
            msec_timer(28, timer);

            return_word = ul_send_data_message(header_pointer,
                  &message[0], message_amount);
      }

      if(!(return_word))
      {
            /* Delay next message */
            msec_timer(delay, timer);

            /* Set up data to store or verify */
            for(i = 1; (i <= message_amount) && !return_word;
                  i++, data_location++)
            {
                  checksum += message[i];

                  /* Test if downloading to Memory Card */
                  if(status_flags.DOWNLOAD)
                  {                             /* Store data in Memory Card */
                        return_word = memory_card_write(data_location,
                              message[i]);
                  }
                  else                    /* Verify data with Memory Card */
                  {
                        data = memory_card_read(data_location);
                        if(message[i] != data)
                        {
                              /* Display address of error */
                              ascii_conversion(load_address + i, &ascii_string[0]);
                              LCD_display(START_LINE2, "Error:     ");
                              LCD_display(START_LINE2 + 11, &ascii_string[0]);

                              /* Wait for switch closure */
                              while((switch_status->Not_Execute)
                                    && (switch_status->Not_Skip));
                              if(!(switch_status->Not_Execute))
                              {
                                    /* Display data */
                                    ascii_conversion(message[i], &ascii_string[0]);
                                    LCD_display(START_LINE2 + 11, &ascii_string[0]);
                                    ascii_conversion(data, &ascii_string[0]);
                                    LCD_display(START_LINE2 + 16, &ascii_string[0]);

                                    /* Allow time for switch to settle */
                                    timer->Timer_Counter = SETTLE_TIME;
                                    while(timer->Timer_Counter)
                                          /* Make sure switch is open */
                                          if(!(switch_status->Not_Execute)
                                                || !(switch_status->Not_Skip))
                                                timer->Timer_Counter = SETTLE_TIME;

                                    /* Wait for switch closure */
                                    while((switch_status->Not_Execute)
                                          && (switch_status->Not_Skip));
                                    if(switch_status->Not_Execute)
```

```
                        return_word = VERIFY_ERROR + load_address + i;
                    }
                    else
                        return_word = VERIFY_ERROR + load_address + i;

                    /* Allow time for switch to settle. */
                    timer->Timer_Counter = SETTLE_TIME;
                    while(timer->Timer_Counter)
                        /* Make sure switch is open */
                        if(!(switch_status->Not_Execute)
                            || !(switch_status->Not_Skip))
                            timer->Timer_Counter = SETTLE_TIME;
                }
            }
        }
    }

        /* Updata load address */
        load_address += message_amount;
    }

    if(!(return_word))
    {
        /* Process file checksum */
        message[1] = memory_card_read(data_location++);
        checksum = 0xffff & (checksum + message[1]);
        if(status_flags.DOWNLOAD)
            return_word = memory_card_write(data_location, checksum);
        else
            if(memory_card_read(data_location) != checksum)
                return_word = CHECKSUM_ERROR;
    }

    /* Return status of verify */
    return return_word;                                     /* Verify completed */
}

/* end */


/****************************************************************************
Include File Name:    msgs_u1.h
Number/Version:
History:
        Date          Rev     Author              Description
        10-Jul-1993   0.0     C. Houlberg         Baseline

Abstract:
        This file contains define statements for setting the
        command words in protocol U1.
****************************************************************************/

    /* Protocol U1 1553 Message Commands */
    #define U1_MODE2_COMMAND            0x0402
    #define U1_MODE3_COMMAND            0x0403
    #define U1_DATA_LOAD_COMMAND        0x0360
    #define U1_PREPARE_DATA_COMMAND     0x0382
    #define U1_SEND_DATA_COMMAND        0x07a0

    /* Function prototypes */
    int u1_mode_command(LOOKUP_TABLE_TYPE *header, int command);
    int u1_data_load_message(LOOKUP_TABLE_TYPE *header,
        int *message_pointer, int amount);
    int u1_prepare_data_message(LOOKUP_TABLE_TYPE *header,
        int *message_pointer);
    int u1_send_data_message(LOOKUP_TABLE_TYPE *header,
        int *message_pointer, int amount);

/* end */


/****************************************************************************
Module Name:    msgs_u1.c
Number/Version:
History:
        Date          Rev     Author              Description
        10-Jul-1993   0.0     C. Houlberg         Baseline

Abstract:
        Impliments mesages for U1.
****************************************************************************/
#include "rrt.h"                    /* RRT configuration */
```

```
#include "dsp.h"                  /* DSP definitions */
#include "system.h"               /* System definitions */
#include "cardhdrs.h"             /* Memory card header definitions */
#include "wordtype.h"             /* Word definitions */
#include "ms1553.h"               /* MS-1553 functions and definitions */
#include "display.h"              /* LCD display definitions */
#include "timer.h"                /* Timer definitions */
#include "error.h"                /* Error definitions */
#include "initprot.h"             /* Protocol state table definitions */
#include "msgs_ul.h"              /* Protocol U1 message definitions */

/*****************************************************************************
Name:           ul_mode_command
Number/Version:
History:
                Date         Rev     Author              Description
                10-Jul-1993  0.0     C. Houlberg         Baseline

Inputs:
                *header
                mode_command

Outputs:
                return_word
Global Data:
                - None -
Functions Referenced:
                ms1553_send
Abstract:
                Impliments mode commands for protocol U1.
*****************************************************************************/
int ul_mode_command(LOOKUP_TABLE_TYPE *header, int mode_command)
{
      STATUS_WORD_TYPE *status_field;
      int command, status;
      int return_word;

      /* Construct command */
      command = (header->RT_Address << 11) + mode_command;

      /* Send message */
      return_word = ms1553_send(&command, &status);
      if(!return_word)
      {
            /* Check for Errors */
            status_field = (STATUS_WORD_TYPE *) &status;
            if((status_field->Terminal_Address) != (header->RT_Address))
                  return_word = ADDRESS_ERROR;          /* Address error */
      }

      return return_word;
}

/*****************************************************************************
Name:           ul_data_load_message
Number/Version:
History:
                Date         Rev     Author              Description
                10-Jul-1993  0.0     C. Houlberg         Baseline

Inputs:
                *header
                *data_pointer
                amount
Outputs:
                return_word
Global Data:
                - None -
Functions Referenced:

Abstract:
                Impliments the data load message for protocol U1.
*****************************************************************************/
int ul_data_load_message(LOOKUP_TABLE_TYPE *header,
      int *message_pointer, int amount)
{
      STATUS_WORD_TYPE *status_field;
      int status;
      int return_word;

      /* Construct Command */
      *message_pointer = ((header->RT_Address) << 11) + U1_DATA_LOAD_COMMAND
            + (0x1f & amount);
```

```
        /* Send the data */
        return_word = ms1553_send(message_pointer, &status);

        if(!return_word)
        {
              /* Check for Errors */
              status_field = (STATUS_WORD_TYPE *) &status;
              if((status_field->Terminal_Address) != (header->RT_Address))
                    return_word = ADDRESS_ERROR;          /* Address error */
        }

        return return_word;
}

/*****************************************************************************
Name:       u1_prepare_data_message
Number/Version:
History:
            Date        Rev    Author              Description
            10-Jul-1993 0.0    C. Houlberg         Baseline

Inputs:
            *header
            *message_pointer
Outputs:
            return_word
Global Data:
            - None -
Functions Referenced:
            command_response_u1
Abstract:
            Impliments the prepare data message for protocol U1.
*****************************************************************************/
int u1_prepare_data_message(LOOKUP_TABLE_TYPE *header, int *message_pointer)
{
        STATUS_WORD_TYPE *status_field;
        int status;
        int return_word;

        /* Construct Command */
        *message_pointer = ((header->RT_Address) << 11) + U1_PREPARE_DATA_COMMAND;

        /* Send the data */
        return_word = ms1553_send(message_pointer, &status);

        if(!return_word)
        {
              /* Check for Errors */
              status_field = (STATUS_WORD_TYPE *) &status;
              if((status_field->Terminal_Address) != (header->RT_Address))
                    return_word = ADDRESS_ERROR;          /* Address error */
        }

        return return_word;
}

/*****************************************************************************
Name:       u1_send_data_message
Number/Version:
History:
            Date        Rev    Author              Description
            10-Jul-1993 0.0    C. Houlberg         Baseline

Inputs:
            *header
            *message_pointer
            amount
Outputs:
            return_word
Global Data:
            - None -
Functions Referenced:
            ms1553_receive
Abstract:
            Impliments the send data message for protocol U1.
*****************************************************************************/
int u1_send_data_message(LOOKUP_TABLE_TYPE *header,
        int *message_pointer, int amount)
{
        STATUS_WORD_TYPE *status_field;
        int command, return_word;
```

```
        /* Command to build the send memory verify message */
        command = ((header->RT_Address) << 11) + U1_SEND_DATA_COMMAND
              + (0x1f & amount);

        /* Send command */
        return_word = ms1553_receive(&command, message_pointer);

        if(!return_word)
        {
              status_field = (STATUS_WORD_TYPE *) message_pointer;
              if((status_field->Terminal_Address) != (header->RT_Address))
                    return_word = ADDRESS_ERROR;
        }

        return return_word;
  }

  /* end */


/*****************************************************************************
Include File Name:    protou2.h
Number/Version:
History:
          Date          Rev   Author          Description
          12-Jul-1993 0.0     C. Houlberg     Baseline

Abstract:

*****************************************************************************/

      /* Function prototypes */
      int protocol_u2(int address, int automode);
      int upload_u2(LOOKUP_TABLE_TYPE *header, int file_address);
      int verify_u2(LOOKUP_TABLE_TYPE *header, int file_address);
      int program_mode_u2(LOOKUP_TABLE_TYPE *header, int command);

/* end */

/*****************************************************************************
Module Name:  protou2.c
Number/Version:
History:
          Date          Rev     Author          Description
          12-Jul-1993   0.0     C. Houlberg     Baseline

Abstract:
          Implements Unique Protocol Two for loading the
          DMC using the Rapid Reprogramming Terminal.
*****************************************************************************/

#include "rrt.h"                  /* RRT configuration */
#include "dsp.h"                  /* DSP definitions */
#include "system.h"               /* System definitions */
#include "cardhdrs.h"             /* Memory card header definitions */
#include "wordtype.h"             /* Word definitions */
#include "ms1553.h"               /* MS-1553 functions and definitions */
#include "display.h"              /* LCD display definitions */
#include "timer.h"                /* Timer definitions */
#include "error.h"                /* Error definitions */
#include "initprot.h"             /* Protocol state table definitions */
#include "msgs_u2.h"              /* Protocol U2 message definitions */
#include "protou2.h"              /* Protocol U2 definitions */

/*****************************************************************************
Name:  protocol_u2
Number/Version:
History:
          Date          Rev     Author          Description
          12-Jul-1993 0.0       C. Houlberg     Baseline

Inputs:
          address
          automode

Returns:
          0 for success
          non-zero error message for failure

Global Data:
          - None -
```

```
Functions Referenced:
            memory_card_read()
            error_display()
            LCD_display()
            msec_timer()
            init_protocol()
            upload_u2()
            verify_u2()
                  prepare_u2()

Abstract:
            Implements protocol U2
*****************************************************************************/

int protocol_u2(int address, int automode)
{
      LOOKUP_TABLE_UNION header;
      LOOKUP_TABLE_UNION *header_union;
      STATE_TABLE_TYPE state_table;
      STATE_TABLE_TYPE *state;
      int file_address;
      int return_word, temp;
      int delay;
      int i;

      TIMER_REG_TYPE *timer;        /* Pointer to timer counter register */
      timer = (TIMER_REG_TYPE *) &TIMER0;

    state = &state_table;
    header_union = &header;

      /*  The following function is used by this protocol to establish
            the initial value of the variables:
                  state->another_upload,
                  state->another_verify,
      */
      return_word = init_protocol(address, state);

      /* Set up file address to point to lookup table */
      file_address = address;

      /* Read in file lookup table */
      for(i = 0; i < SIZE_LOOKUP_TABLE; i++)
            header_union->array[i] = memory_card_read(file_address++);

      /* Establish delay between messages */
      delay = header_union->structure.Delay;

      if((state->another_upload) && !return_word)
      {
            /* Prepare the DMC for loading (enter the program mode) */
            return_word = program_mode_u2((LOOKUP_TABLE_TYPE *)
                  header_union, U2_PREPARE_PROGRAM_MODE);

            if(!(return_word))
            {
                  /* Display Load message and load the data */
                  LCD_display(START_LINE2, "Uploading\t");

                  return_word = upload_u2((LOOKUP_TABLE_TYPE *) header_union,
                        file_address);
            }

            if((!return_word) && !(state->another_verify))
            {
                  /* Complete loading sequence (exit the program mode) */
                  return_word = program_mode_u2((LOOKUP_TABLE_TYPE *)
                        header_union, U2_EXIT_PROGRAM_MODE);
            }

            if(!(return_word))

                  /* Indicate load done */
                  LCD_display(START_LINE2, "Upload Done\t");
      }

      if((state->another_verify) && !return_word)
      {
            /* Test if upload was not done (program mode not prepared) */
            if(!(state->another_upload))
            {
```

```
		/* Prepare the DMC for reading (enter the program mode) */
		return_word = program_mode_u2((LOOKUP_TABLE_TYPE *)
			header_union, U2_PREPARE_PROGRAM_MODE);
	}

	if(!return_word)
	{
		/* Read the data */
		/* Test if loading Memory Card */
		if(status_flags.DOWNLOAD)
			/* Display Download message */
			LCD_display(START_LINE2, "Download\t");
		else
			/* Display Verify message */
			LCD_display(START_LINE2, "Verifying\t");

		return_word = verify_u2((LOOKUP_TABLE_TYPE *) header_union,
			file_address);
	}

	if(!return_word)
		/* Test if loaded Memory Card */
		if(status_flags.DOWNLOAD)
			/* Display Download complete indication */
			LCD_display(START_LINE2, "Download Done\t");
		else
			/* Display Verify complete indication */
			LCD_display(START_LINE2, "Data Verified\t");

	/* Complete reading sequence (exit the program mode) */
	temp = program_mode_u2((LOOKUP_TABLE_TYPE *) header_union,
		U2_EXIT_PROGRAM_MODE);
	if(!return_word)
		return_word = temp;
    }

    return return_word;
}

/******************************************************************************
Name:  upload_u2
Number/Version:
History:
	Date		Rev	Author		Description
	12-Jul-1993	0.0	C. Houlberg	Baseline

Inputs:
	header
	file_address
Returns:
	0 for success
	non-zero error message for failure

Global Data:
	- None-

Functions Referenced:
	u2_command_message()
	u2_status_message()
	u2_data_load_message()
	ascii_conversion()
	LCD_display()
	msec_timer()

Abstract:
	Loads data into DMC
******************************************************************************/
int upload_u2(LOOKUP_TABLE_TYPE *header_pointer, int file_address)
{
    HEADER_WORD_TYPE *header;		/* Pointer to header message data */
    TIMER_REG_TYPE *timer0;		/* Pointer to timer0 counter register */
    TIMER_REG_TYPE *timer1;		/* Pointer to timer1 counter register */
    int i, file_size;
    int data_word_count, data_amount;
    int data_location;
    int buffer_xfer_count;
    int load_address;
    int page_number;
    int transfer_count, transfer_amount;
    int message_amount;
    int return_word = NO_ERROR;
    int message[33];
```

```
int delay;
int block_checksum;
char ascii_string[5];

timer0 = (TIMER_REG_TYPE *) &TIMER0;
timer1 = (TIMER_REG_TYPE *) &TIMER1;

/* Header message data word 1 pointer */
header = (HEADER_WORD_TYPE *) &message[1];

/* Establish delay between messages and busy count */
delay = header_pointer->Delay;

/* File size measured in bytes */
file_size = (header_pointer->File_Size_MSW << 16)
     + header_pointer->File_Size_LSW;

/* Initialize data counter */
data_word_count = (file_size + 1) >> 1;

/* Transfer data */
while(data_word_count && !(return_word))        /* Transfer all data */
{
     /* Initialize location of data to transfer */
     data_location = file_address;

     /* Gather header data words */
     for(i = 1; i <= 6; i++)
          message[i] = memory_card_read(data_location++);

     /* Extract load descriptors */
     page_number = message[2] & 0x000f;
     buffer_xfer_count = (message[2] >> 4) & 0x01ff; /* 32 word messages */
     load_address = message[3];                                 /* Start address */

     /* Display page number for transaction */
     ascii_conversion(page_number, &ascii_string[0]);
     LCD_display(START_LINE2 + 16, &ascii_string[0]);

     /* Acount for maximum buffer count */
     if(!buffer_xfer_count)
          transfer_count = MAX_DMC_COUNT;
     else
          transfer_count = buffer_xfer_count << 5;  /* Number of words */

     /* Data amount processed */
     data_amount = transfer_count + 6;          /* Account for 6 word header */

     /* Ensure data amount transferring does
          not exceed data left to transfer */
     if(data_amount > data_word_count)
          return_word = DATA_COUNT_ERROR;

     /* Send the header (initiate load setup) message */
     return_word = u2_command_message(header_pointer, &message[0]);

     if(!return_word)
     {
          /* Send the header (initiate load setup) message */
          return_word = u2_command_message(header_pointer, &message[0]);
     }

     if(!return_word)
     {
          /* Check on the status (maximum timer interval = 1 sec) */
          timer0->Timer_Counter = SEC1;
          do
          {
               /* Delay next message */
               msec_timer(delay, timer1);
               return_word = u2_status_message(header_pointer);

               if(!(return_word & TYPE_MASK))
               {
                    /* If load is initiated indicate no error */
                    if((return_word & U2_DMC_STATUS_MASK) == U2_LOAD_INITIATED)
                         return_word = NO_ERROR;              /* Continue */
                    else if(!timer0->Timer_Counter)           /* Time run out? */
                         return_word += DMC_STATUS_ERROR;
               }

          } while(!(return_word & TYPE_MASK) && return_word);
```

```
    }

    /* Send the Data Load messages */
    transfer_amount = transfer_count;
    while(transfer_count && !(return_word))
    {
         message_amount = 32;           /* Maximum words per message */
         if(message_amount > transfer_count)
         {                                        /* Fewer words left to send */
              message_amount = transfer_count;    /* Amount sending */
              transfer_count = 0;
         }
         else                              /* Count of words left */
              transfer_count -= message_amount;

         /* Ready data for transfer, command inserted later */
         for(i = 1; i <= message_amount; i++)
              message[i] = memory_card_read(data_location++);

         /* Display start address for block of data */
         ascii_conversion(load_address + transfer_amount
              - (transfer_count + message_amount), &ascii_string[0]);
         LCD_display(START_LINE2 + 11, &ascii_string[0]);

         /* Delay next message */
         msec_timer(delay, timer0);

         return_word = u2_data_load_message(header_pointer,
              &message[0], message_amount);
    }

    if(!(return_word))
    {
         /* Display end address for block of data */
         ascii_conversion(load_address + transfer_amount
              - (transfer_count + message_amount + 1), &ascii_string[0]);
         LCD_display(START_LINE2 + 11, &ascii_string[0]);

         /* Delay for 255 msecs after all data is loaded */
         msec_timer(255, timer0);

         /* Check on the status (maximum timer interval = 10 sec) */
         timer0->Timer_Counter = SEC10;
         do
         {
              return_word = u2_status_message(header_pointer);

              /* Delay next message */
              msec_timer(delay, timer1);

              if(!(return_word & TYPE_MASK))
              {
                   /* Mask status */
                   return_word &= U2_DMC_STATUS_MASK;

                   /* If load is initiated indicate no error */
                   if(return_word == U2_LOAD_CONTINUE)
                   {
                        return_word = NO_ERROR;
                   }
                   else if((return_word == U2_LOAD_BUSY)
                        || (return_word == U2_LOAD_NOT_READY))
                   {
                        if(!timer0->Timer_Counter)
                             return_word += DMC_STATUS_ERROR;
                   }
                   else                                    /* Invalid status */
                        return_word += DMC_STATUS_ERROR;
              }

         } while(!(return_word & TYPE_MASK) && return_word);
    }

    if(!(return_word))
    {
         file_address = data_location;
         data_word_count -= data_amount;
    }
}

/* Return status of load */
return return_word;                              /* Load completed or aborted */
}
```

```
/*******************************************************************************
Name:  verify_u2
Number/Version:
History:
            Date        Rev      Author        Description
            12-Jul-1993 0.0      C. Houlberg   Baseline

Inputs:
            header
            file_address
Returns:
            0 for success
            non-zero error message for failure

Global Data:
            - None-

Functions Referenced:
            prepare_memory_verify_u2()
            send_memory_verify_u2()
            ascii_conversion()
            LCD_display()
            msec_timer()

Abstract:
            Reads data loaded into DMC
*******************************************************************************/
int verify_u2(LOOKUP_TABLE_TYPE *header_pointer, int file_address)
{
    HEADER_WORD_TYPE *header;           /* Pointer to header message data */
    TIMER_REG_TYPE *timer0;             /* Pointer to timer0 counter register */
    TIMER_REG_TYPE *timer1;             /* Pointer to timer1 counter register */
    PPI3_REG_TYPE *switch_status;       /* Pointer to switch status */
    int i, file_size;
    int data_word_count, data_amount;
    int data_location, data;
    int buffer_xfer_count;
    int load_address;
    int page_number;
    int transfer_count, transfer_amount;
    int message_amount;
    int return_word = NO_ERROR;
    int message[33], checksum_message[4];
    int delay, download_retry = 3;
    int block_checksum, checksum;
    char ascii_string[5];

    timer0 = (TIMER_REG_TYPE *) &TIMER0;
    timer1 = (TIMER_REG_TYPE *) &TIMER1;

    switch_status = (PPI3_REG_TYPE *) &PPI3;

    /* Header message data word 1 pointer */
    header = (HEADER_WORD_TYPE *) &message[1];

    /* Establish delay between messages */
    delay = header_pointer->Delay;

    /* File size measured in bytes */
    file_size = (header_pointer->File_Size_MSW << 16)
        + header_pointer->File_Size_LSW;

    /* Initialize data counter */
    data_word_count = (file_size + 1) >> 1;

    /* Transfer data */
    while(data_word_count && !(return_word))  /* Transfer all data */
    {
        /* Initialize checksum */
        checksum = 0;

        /* Initialize location of data to transfer */
        data_location = file_address;

        /* Gather header data words */
        for(i = 1; i <= 6; i++)
            message[i] = memory_card_read(data_location++);

        /* Modify first data word for read setup message */
        message[1] = U2_INITIATE_READ;

        /* Extract load descriptors */
```

```
page_number = message[2] & 0x000f;
load_address = message[3];                          /* Start address */
transfer_count = message[4] - message[3] + 1;       /* Word count */
block_checksum = message[5];

/* Display page number for transaction */
ascii_conversion(page_number, &ascii_string[0]);
LCD_display(START_LINE2 + 16, &ascii_string[0]);

/* Acount for maximum buffer count */
if(!buffer_xfer_count)
      transfer_count = MAX_DMC_COUNT;

/* Data amount processed */
data_amount = transfer_count + 6;       /* Account for 6 word header */

/* Ensure data amount transferring does
      not exceed data left to transfer */
if(data_amount > data_word_count)
      return_word = DATA_COUNT_ERROR;

/* Determine block checksum for download (save) operation
      and setup download header (initiate read setup) message */
if(!return_word && status_flags.DOWNLOAD)
{
      /* Get block checksum from RT */
      checksum_message[1] = page_number;
      checksum_message[2] = message[3];
      checksum_message[3] = message[4];
      return_word = u2_calculate_checksum(header_pointer,
            &checksum_message[0]);

      /* Delay next message */
      msec_timer(delay, timer1);

      if(!return_word)
      {
            /* Check for block checksum (timer interval = 500 msecs) */
            timer0->Timer_Counter = HALFSEC;
            do
            {
                  return_word = u2_send_checksum(header_pointer,
                        &checksum_message[0]);

                  /* Delay next message */
                  msec_timer(delay, timer1);

                  /* If load is initiated indicate no error */
                  if(!return_word)
                  {
                        /* Mask checksum status */
                        checksum_message[1] &= U2_CHECKSUM_STATUS_MASK;

                        if(checksum_message[1] == U2_CHECKSUM_READY)
                        {
                              message[5] = checksum_message[2];
                              block_checksum = message[5];
                        }
                        else if(checksum_message[1] == U2_CHECKSUM_BUSY)
                        {
                              return_word = checksum_message[1];
                              if(!timer0->Timer_Counter)
                                    return_word += DMC_STATUS_ERROR;
                        }
                        else
                              return_word = DMC_STATUS_ERROR
                                    + checksum_message[1];
                  }

            } while(!(return_word & TYPE_MASK) && return_word);
      }
}

if(!return_word)
{
      /* Modify message checksum for read setup message */
      message[6] = 0xffff & (message[1] + message[2] + message[3]
            + message[4] + message[5]);

      /* Send the header (initiate read setup) message */
      return_word = u2_command_message(header_pointer, &message[0]);
}
```

```
if(!return_word)
{
      /* Check on the status (maximum timer interval = 1 sec) */
      timer0->Timer_Counter = SEC1;
      do
      {
            /* Delay next message */
            msec_timer(delay, timer1);

            return_word = u2_status_message(header_pointer);

            if(!(return_word & TYPE_MASK))
            {
                  /* Mask status */
                  return_word &= U2_DMC_STATUS_MASK;

                  /* If load is initiated indicate no error */
                  if(return_word == U2_READ_INITIATED)
                  {
                        return_word = NO_ERROR;
                  }
                  else if(return_word == U2_READ_BUSY)
                  {
                        /* Test if time has run out */
                        if(!timer0->Timer_Counter)
                              return_word += DMC_STATUS_ERROR;
                  }
                  else
                        return_word += DMC_STATUS_ERROR;     /* Invalid status */
            }

      } while(!(return_word & TYPE_MASK) && return_word);
}

/* Send the Data Read messages */
transfer_amount = transfer_count;
while(transfer_count && !(return_word))
{
      message_amount = 32;              /* Maximum words per message */
      if(message_amount > transfer_count)
      {
            message_amount = transfer_count;    /* Fewer words left to send */
            transfer_count = 0;                 /* Amount sending */
      }
      else
            transfer_count -= message_amount;   /* Count of words left */

      /* Display address for block of data */
      ascii_conversion(load_address + transfer_amount
            - (transfer_count + message_amount), &ascii_string[0]);
      LCD_display(START_LINE2 + 11, &ascii_string[0]);

      /* Delay next message */
      msec_timer(delay, timer0);

      return_word = u2_data_read_message(header_pointer,
            &message[0], message_amount);

      /* Set up data to store or verify */
      for(i = 1; (i <= message_amount) && !return_word;
            i++, data_location++)
      {
            checksum += message[i];

            /* Test if downloading to Memory Card */
            if(status_flags.DOWNLOAD)
            {
                                          /* Store data in Memory Card */
                  return_word = memory_card_write(data_location,
                        message[i]);
            }
            else                    /* Verify data with Memory Card */
            {
                  data = memory_card_read(data_location);
                  if(message[i] != data)
                  {
                        /* Display address of error */
                        ascii_conversion(load_address + transfer_amount
                              - (transfer_count + message_amount + 1) + i,
                              &ascii_string[0]);
                        LCD_display(START_LINE2, "Error at:\t");
                        LCD_display(START_LINE2 + 11, &ascii_string[0]);
```

```
                    ascii_conversion(page_number, &ascii_string[0]);
                    LCD_display(START_LINE2 + 16, &ascii_string[0]);

                    /* Wait for switch closure */
                    while((switch_status->Not_Execute)
                          && (switch_status->Not_Skip));
                    if(!(switch_status->Not_Execute))
                    {
                          /* Display data */
                          ascii_conversion(message[i], &ascii_string[0]);
                          LCD_display(START_LINE2, "Error val:\t");
                          LCD_display(START_LINE2 + 11, &ascii_string[0]);
                          ascii_conversion(data, &ascii_string[0]);
                          LCD_display(START_LINE2 + 16, &ascii_string[0]);

                          /* Allow time for switch to settle */
                          timer0->Timer_Counter = SETTLE_TIME;
                          while(timer0->Timer_Counter)
                                /* Make sure switch is open */
                                if(!(switch_status->Not_Execute)
                                      || !(switch_status->Not_Skip))
                                      timer0->Timer_Counter = SETTLE_TIME;

                          /* Wait for switch closure */
                          while((switch_status->Not_Execute)
                                && (switch_status->Not_Skip));

                          if(switch_status->Not_Execute)
                          {
                                LCD_display(START_LINE1, "ABORT:\r"
                                      "EXEC to Continue\t");
                                return_word = ABORT_OCCURRED;
                          }
                    }

                    else
                    {
                          LCD_display(START_LINE1, "ABORT:\r"
                                "EXEC to Continue\t");
                          return_word = ABORT_OCCURRED;
                    }

                    /* Allow time for switch to settle */
                    timer0->Timer_Counter = SETTLE_TIME;
                    while(timer0->Timer_Counter)
                          /* Make sure switch is open */
                          if(!(switch_status->Not_Execute)
                                || !(switch_status->Not_Skip))
                                timer0->Timer_Counter = SETTLE_TIME;

                    if(return_word != ABORT_OCCURRED)
                    {
                          /* Address displayed at next data message */
                          LCD_display(START_LINE2, "Verifying\t");
                          ascii_conversion(page_number, &ascii_string[0]);
                          LCD_display(START_LINE2 + 16, &ascii_string[0]);
                    }
              }
        }
  }
}

if(!return_word)
{
      /* Mask checksum */
      checksum &= 0xffff;

      if(status_flags.DOWNLOAD)
            if(block_checksum != checksum)
            {     if(!download_retry--)   /* Are all attempts exhausted? */
                        return_word = CHECKSUM_ERROR;
            }
            else
            {
                  /* Write block checksum to memory card header */
                  return_word =
                        memory_card_write((file_address + 4), checksum);

                  if(!return_word)
                  {
                        /* Write header message checksum to memory card */
                        checksum += (memory_card_read(file_address)
```

```
                                  + memory_card_read(file_address + 1)
                                  + memory_card_read(file_address + 2)
                                  + memory_card_read(file_address + 3));
                        return_word =
                              memory_card_write((file_address + 5),
                                    (0xffff & checksum));

                        file_address = data_location;
                        data_word_count -= data_amount;
                  }
            }
      else
            if(block_checksum != checksum)
            {
                  return_word = CHECKSUM_ERROR;
            }
            else        /* Adjust data_location to point to next header */
            {
                  file_address = data_location;
                  data_word_count -= data_amount;
            }
      }
}

/* Delay next message */
msec_timer(delay, timer0);

/* Return status of download or verify */
return return_word;
}

/*****************************************************************************
Name:  program_mode_u2
Number/Version:
History:
            Date        Rev       Author        Description
            12-Jul-1993 0.0       C. Houlberg   Baseline

Inputs:
            header
Returns:
            0 for success
            non-zero error message for failure

Global Data:
            - None-

Functions Referenced:
            u2_command_message()
            ascii_conversion()
            error_display()
            msec_timer()

Abstract:
            Establishes program mode for DMC (enter and exit)
*****************************************************************************/
int program_mode_u2(LOOKUP_TABLE_TYPE *header_pointer, int command)
{
      TIMER_REG_TYPE *timer;                  /* Pointer to timer counter register */
      int message[7];                         /* Message array */
      int delay, retry = 100;
      int return_word;

      timer = (TIMER_REG_TYPE *) &TIMER0;
      delay = header_pointer->Delay;

      /* Construct the message data */
      message[1] = command;                   /* Program mode command */
      message[2] = 0;
      message[3] = 0;
      message[4] = 0;
      message[5] = 0;
      message[6] = command;                   /* Checksum of preceeding data */

      if(command == U2_EXIT_PROGRAM_MODE)
      {
            return_word = u2_command_message(header_pointer, &message[0]);
      }
      else
      {
            return_word = u2_command_message(header_pointer, &message[0]);
```

```
        /* Delay 50 msecs */
        msec_timer(50, timer);

        if(!return_word)
        {
              do
              {
                    /* Check on the status */
                    return_word = u2_status_message(header_pointer);

                    /* Delay between messages */
                    msec_timer(delay, timer);

                    if(!(return_word & TYPE_MASK))
                    {
                          /* Mask status */
                          return_word &= U2_DMC_STATUS_MASK;

                          /* If program mode is enabled indicate no error */
                          if(return_word == U2_PROGRAM_MODE_ENABLED)
                          {
                                return_word = NO_ERROR;
                          }
                          else if(!retry--)             /* Test if exhausted retrys */
                          {
                                return_word += DMC_STATUS_ERROR;
                          }
                    }

              } while(!(return_word & TYPE_MASK) && return_word);
        }
  }

  return return_word;
}

/* end */

/****************************************************************************
Include File Name:    msgs_u2.h
Number/Version:
History:
            Date         Rev     Author                Description
            12-Jul-1993  0.0     C. Houlberg           Baseline

Abstract:
            This file contains define statements for setting the status word in
            protocol U2.
****************************************************************************/

      /* Protocol U2 1553 Message Commands */
      #define U2_COMMAND                  0x02c6
      #define U2_PREPARE_PROGRAM_MODE     0x9999
      #define U2_INITIATE_LOAD            0x1111
      #define U2_INITIATE_READ            0xaaaa
      #define U2_EXIT_PROGRAM_MODE        0x4444
      #define U2_REQUEST_STATUS           0x0643
      #define U2_DATA_LOAD                0x02e0
      #define U2_DATA_READ                0x0680
      #define U2_CALCULATE_CHECKSUM       0x0303
      #define U2_SEND_CHECKSUM            0x06a2

      /* DMC Status */

      #define U2_DMC_STATUS_MASK          0xf800
      #define U2_PROGRAM_MODE_ENABLED     0x0800
      #define U2_LOAD_INITIATED           0x8000
      #define U2_LOAD_BUSY                0x1000
      #define U2_LOAD_NOT_READY           0x4000
      #define U2_LOAD_CONTINUE            0x1800
      #define U2_READ_INITIATED           0x7800
      #define U2_READ_BUSY                0x7000

      /* Checksum Status */
      #define U2_CHECKSUM_STATUS_MASK     0x000f
      #define U2_CHECKSUM_BUSY            0x0001
      #define U2_CHECKSUM_READY           0x0002
      #define U2_CHECKSUM_ERROR1          0x0000 /* Not used in code */
      #define U2_CHECKSUM_ERROR2          0x0003 /* Not used in code */
```

```
int u2_command_message(LOOKUP_TABLE_TYPE *header, int *message_pointer);
int u2_status_message(LOOKUP_TABLE_TYPE *header);
int u2_data_load_message(LOOKUP_TABLE_TYPE *header,
     int *message_pointer, int amount);
int u2_data_read_message(LOOKUP_TABLE_TYPE *header,
     int *message_pointer, int amount);
int u2_calculate_checksum(LOOKUP_TABLE_TYPE *header, int *message_pointer);
int u2_send_checksum(LOOKUP_TABLE_TYPE *header, int *message_pointer);
int u2_send_message(LOOKUP_TABLE_TYPE *header, int *message_pointer);
int u2_reseive_message(LOOKUP_TABLE_TYPE *header, int *command,
     int *message_pointer);

/* end */


/******************************************************************************
Module Name:    msgs_u2.c
Number/Version:
History:
          Date        Rev    Author          Description
          12-Jul-1993 0.0    C. Houlberg     Baseline

Abstract:
          Impliments mesages for U2.
******************************************************************************/

#include "rrt.h"                    /* RRT configuration */
#include "dsp.h"                    /* DSP definitions */
#include "system.h"                 /* System definitions */
#include "cardhdrs.h"               /* Memory card header definitions */
#include "wordtype.h"               /* Word definitions */
#include "ms1553.h"                 /* MS-1553 functions and definitions */
#include "display.h"                /* LCD display definitions */
#include "timer.h"                  /* Timer definitions */
#include "error.h"                  /* Error definitions */
#include "initprot.h"               /* Protocol state table def */
#include "msgs_u2.h"                /* Protocol U2 message definitions */

/******************************************************************************
Name:       u2_command_message
Number/Version:
History:
          Date        Rev    Author          Description
          12-Jul-1993 0.0    C. Houlberg     Baseline

Inputs:
          header
          message_pointer

Outputs:
          return_word
Global Data:
          - None -
Functions Referenced:
          u2_send_message
Abstract:
          Impliments the program mode command messages for protocol U2.

     data word 1: command
     data word 2: page(001, block_size, page)
          block_size = 0 to 511 (0 => 512) words
          page = 0 to 15
     data word 3: beginning address
     data word 4: ending address
     data word 5: checksum from beginning through ending address
     data word 6: checksum of this message
******************************************************************************/
int u2_command_message(LOOKUP_TABLE_TYPE *header, int *message_pointer)
{

     /* Command to set program mode */
     *message_pointer = ((header->RT_Address) << 11) + U2_COMMAND;

     /* Send the data */
     return u2_send_message(header, message_pointer);
}

/******************************************************************************
Name:       u2_status_message
Number/Version:
History:
          Date        Rev    Author          Description
          12-Jul-1993 0.0    C. Houlberg     Baseline
```

```
Inputs:
            header
            message_pointer

Outputs:
            return_word
Global Data:
            - None -
Functions Referenced:
            ms1553_receive
Abstract:
            Impliments the request status message for protocol U2.

      data words retrived
      data word 1: DMC status
      data word 2: not used
      data word 3: checksum of dw1 + dw2
******************************************************************************/
int u2_status_message(LOOKUP_TABLE_TYPE *header)
{
      STATUS_WORD_TYPE *status_field;
      int command, message[33];
      int return_word;

      /* Command word */
      command = ((header->RT_Address) << 11) + U2_REQUEST_STATUS;

      /* Check Status message for no timeout */
      return_word = u2_receive_message(header, &command, &message);

      /* Check for checksum error */
      if(!return_word)
            if(((message[1] + message[2]) & 0xffff) != message[3])
                  return_word = CHECKSUM_ERROR;

      /* Return message status */
      if(!return_word)
            return_word = message[1];

      return return_word;          /* return status of message */
}

/******************************************************************************
Name:       u2_data_load_message
Number/Version:
History:
            Date        Rev     Author              Description
            12-Jul-1993 0.0     C. Houlberg         Baseline

Inputs:
            header
            message_pointer
            amount

Outputs:
            return_word
Global Data:
            - None -
Functions Referenced:
            u2_send_message
Abstract:
            Impliments the data load message for protocol U2.
******************************************************************************/
int u2_data_load_message(LOOKUP_TABLE_TYPE *header,
      int *message_pointer, int amount)
{
      /* Command to load data */
      *message_pointer = ((header->RT_Address) << 11)
            + U2_DATA_LOAD + (0x1f & amount);

      /* Send the data */

      return u2_send_message(header, message_pointer);
}

/******************************************************************************
Name:       u2_data_read_message
Number/Version:
History:
            Date        Rev     Author              Description
            12-Jul-1993 0.0     C. Houlberg         Baseline
```

```
Inputs:
            header
            message_pointer
            amount
Outputs:
            return_word
Global Data:
            - None -
Functions Referenced:
            ms1553_receive
Abstract:
            Impliments the data read message for protocol U2.
*******************************************************************************/
int u2_data_read_message(LOOKUP_TABLE_TYPE *header,
      int *message_pointer, int amount)
{
      STATUS_WORD_TYPE *status_field;
      int command, return_word;

      /* Command word */
      command = ((header->RT_Address) << 11)
            + U2_DATA_READ + (0x1f & amount);

      /* Send command */
      return u2_receive_message(header, &command, message_pointer);
}

/*******************************************************************************
Name:       u2_calculate_checksum
Number/Version:
History:
            Date        Rev    Author              Description
            12-Jul-1993 0.0    C. Houlberg         Baseline

Inputs:
            header
            message_pointer

Outputs:
            return_word
Global Data:
            - None -
Functions Referenced:
            us_send_message
Abstract:
            Impliments the calculate checksum message for protocol U2.

   data word 1: page
   data word 2: beginning address
   data word 3: ending address
*******************************************************************************/
int u2_calculate_checksum(LOOKUP_TABLE_TYPE *header, int *message_pointer)
{
      /* Command to calculate checksum*/
      *message_pointer = ((header->RT_Address) << 11)
            + U2_CALCULATE_CHECKSUM;

      /* Send the message */
      return u2_send_message(header, message_pointer);
}

/*******************************************************************************
Name:       u2_send_checksum
Number/Version:
History:
            Date        Rev    Author              Description
            12-Jul-1993 0.0    C. Houlberg         Baseline

Inputs:
            header
            message_pointer

Outputs:
            return_word
Global Data:
            - None -
Functions Referenced:
            ms1553_receive
Abstract:
            Impliments the send checksum message for protocol U2.

    data words retrived
```

```
    data word 1: checksum status
    data word 2: memory block checksum value
******************************************************************************/
int u2_send_checksum(LOOKUP_TABLE_TYPE *header, int *message_pointer)
{
      STATUS_WORD_TYPE *status_field;
      int command;
      int return_word;

      /* Command word */
      command = ((header->RT_Address) << 11)
            + U2_SEND_CHECKSUM;

      /* Send command */
      return u2_receive_message(header, &command, message_pointer);
}

/******************************************************************************
Name:       u2_send_message
Number/Version:
History:
            Date        Rev     Author              Description
            12-Jul-1993 0.0     C. Houlberg         Baseline

Inputs:
            header
            message_pointer

Outputs:
            return_word
Global Data:
            - None -
Functions Referenced:
            ms1553_send
Abstract:
            Impliments sending messages and test status for protocol U2.
******************************************************************************/
int u2_send_message(LOOKUP_TABLE_TYPE *header, int *message_pointer)
{
      STATUS_WORD_TYPE *status_field;
      TIMER_REG_TYPE *timer;              /* Pointer to timer counter register */
      int return_word, status;
      int retry = 10;
      int delay;

      timer = (TIMER_REG_TYPE *) &TIMER0;
      status_field = (STATUS_WORD_TYPE *) &status;

      delay = header->Delay;

      /*    Maximum number of retries will be 10 */
      do                                                  /* do while statement */
      {
            /* Send message */
            return_word = ms1553_send(message_pointer, &status);
            if(!return_word)
            {
                  /* Check for Errors */
                  if(status_field->Message_Error)
                  {
                        return_word = MESSAGE_ERROR;        /* Message error */
                        if(retry)
                              msec_timer(delay, timer);
                  }
                  else if((status_field->Terminal_Address) != (header->RT_Address))
                        return_word = ADDRESS_ERROR;        /* Address error */
            }

      } while((return_word == MESSAGE_ERROR) && retry--);

      return return_word;
}

/******************************************************************************
Name:       u2_receive_message
Number/Version:
History:
            Date        Rev     Author              Description
            12-Jul-1993 0.0     C. Houlberg         Baseline

Inputs:
            header
            message_pointer
```

```
Outputs:
            return_word
Global Data:
            - None -
Functions Referenced:
            ms1553_send
Abstract:
            Impliments sending messages and test status for protocol U2.
*******************************************************************************/
int u2_receive_message(LOOKUP_TABLE_TYPE *header, int *command,
      int *message_pointer)
{
      STATUS_WORD_TYPE *status_field;
      TIMER_REG_TYPE *timer;              /* Pointer to timer counter register */
      int return_word, status;
      int retry = 10;
      int delay;

      timer = (TIMER_REG_TYPE *) &TIMER0;
      status_field = (STATUS_WORD_TYPE *) message_pointer;

      delay = header->Delay;

      /*    Maximum number of retries will be 10 */
      do                                                    /* do while statement */
      {
            /* Send command */
            return_word = ms1553_receive(command, message_pointer);
            if(!return_word)
            {
                  /* Check for Errors */
                  if(status_field->Message_Error)
                  {
                        return_word = MESSAGE_ERROR;        /* Message error */
                        if(retry)
                              msec_timer(delay, timer);
                  }
                  else if((status_field->Terminal_Address) != (header->RT_Address))
                        return_word = ADDRESS_ERROR;        /* Address error */
            }

      } while((return_word == MESSAGE_ERROR) && retry--);

      return return_word;
}

/* end */


/*******************************************************************************
Module Name:    memcard.c
Number/Version:
History:
            Date        Rev   Author            Description
            17-Mar-1993 0.0   C. Houlberg       Baseline
            01-Apr-1993 0.0   C. Houlberg       Added global Memory_Card_ID
Abstract:
                  Memory card functions
NOTE:
                  All accesses to the memory card MUST be done through
                  the below listed functions.
*******************************************************************************/

#include "rrt.h"                                /* RRT configuration */
#include "dsp.h"                                /* DSP definitions */
#include "system.h"                             /* System definitions */
#include "serialio.h"                           /* Serial I/O definitions */
#include "display.h"                            /* LCD or LED display definitions */
#include "timer.h"                              /* Timer definitions */
#include "error.h"                              /* Error definitions */
#include "memcard.h"                            /* Memory card definitions */

/* Global memory card ID */
int Memory_Card_ID;

/*******************************************************************************
Name:       memory_card_read
Number/Version:
History:
            Date        Rev   Author            Description
            17-Mar-1993 0.0   C. Houlberg       Baseline
```

```
Inputs:
            card_address
Outputs:
            word
Global Data:
            - None -
Functions Referenced:
            address_card_page()
Abstract:
            This function maps the IC Memory Card address to
            the System Address.
**************************************************************************/
/*
            Its arguements are:
            IC Memory Card address -- int card_address
                  int card_address is passed from the calling routine.
            IC Memory Card word ----- int return value of function
*/

int memory_card_read(int card_address)
{
      int *system_address, word;

      /* Address card page and return system_address */
      system_address = address_card_page(card_address);

      word = 0xffff & *system_address;
      return word;
}

/**************************************************************************
Name:       memory_card_write
Number/Version:
History:
            Date         Rev   Author           Description
            17-Mar-1993  0.0   C. Houlberg      Baseline
            01-Apr-1993  0.0   C. Houlberg      Write keyed to card ID

Inputs:
            card_address
            data
Outputs:
            status
Global Data:
            Memory_Card_ID
Functions Referenced:
            memory_card_status()
            address_card_page()
Abstract:
            This function writes data to the indicated IC Memory Card
            address and returns a status value.
**************************************************************************/
/*
            IC Memory Card address -- int card_address
            IC Memory Card data ----- int data
            IC Memory Card status --- int return value of function
*/

int memory_card_write(int card_address, int data)
{
      /* Pointer to timer counter register */
      TIMER_REG_TYPE *timer;

      int *system_address;          /* system address pointer */
      int status;                   /* card memory status */
      int write_word, read_word;
      int i, write_command;

      timer = (TIMER_REG_TYPE *) &TIMER0;

      /* Test status of memory card before writing */
      /* Timer is zeroed here for status function */
      timer->Timer_Counter = 0;
      status = memory_card_status(card_address);
      if(status)
            return status;

      /* Address card page and return system_address */
      system_address = address_card_page(card_address);

      switch (Memory_Card_ID & 0xffff)
      {
```

```
        case S1_1MEG:
        case S1_4MEG:
              read_word = (0xffff & *system_address);
              write_word = data;
              write_command = WRITE_SETUP;
              i = 0;
              while((data != read_word) && (status == NO_ERROR))
              {
                    if(i > Max_Write_Count)
                          status = (MEMORY_CARD_ERROR + CARD_WRITE_ERROR);
                    else
                    {
                          ++i;
                          /* Write only what needs to be written */
                          if((data & 0x00ff) == (read_word & 0x00ff))
                          {
                                write_command |= 0x00ff;
                                write_word |= 0x00ff;
                          }
                          if((data & 0xff00) == (read_word & 0xff00))
                          {
                                write_command |= 0xff00;
                                write_word |= 0xff00;
                          }

                          /* Issue write setup command */
                          *system_address = write_command;

                          /* Write data to card */
                          *system_address = write_word;

                          timer->Timer_Counter = USEC10;          /* Wait 10 usecs */
                          while(timer->Timer_Counter);

                          /* Verify written data */
                          *system_address = WRITE_VERIFY;
                          timer->Timer_Counter = USEC6;       /* Wait 6 usecs */
                          while(timer->Timer_Counter);
                          read_word = (0xffff & *system_address);
                    }
              }
              break;
        case S2_20MEG:
              /* Issue write setup command */
              *system_address = WRITE_SETUP;

              /* Write data to card */
              *system_address = data;

              /* Test status of memory card before retrieving block status */
              /* Timer is initialized here for status function */
              timer->Timer_Counter = WRITE_TIMEOUT;
              status = memory_card_status(card_address);
              if(!status)                                      /* No error occurred */
              {
                    /* Return block status */
                    status = BLOCK_STATUS_MASK & *system_address;
                    if(status)
                          status += MEMORY_CARD_ERROR;
              }
        default:
              return CARD_ID_BAD;
              break;
  }

  /* Return memory card to Read Array Mode */
  *system_address = READ_ARRAY;

  return status;
}

/*********************************************************************************
Name:       memory_card_erase
Number/Version:
History:
            Date        Rev   Author          Description
            17-Mar-1993 0.0   C. Houlberg     Baseline
            01-Apr-1993 0.0   C. Houlberg     Erase keyed to card ID

Inputs:
            card_number
```

```
Outputs:
            error
Global Data:
            - None -
Functions Referenced:
            LCD_display()
            memory_card_status()
Abstract:
            This function erases the entire contents of the
            IC Memory Card.
******************************************************************************/
int memory_card_erase(int card_address)
{
      /* Pointer to card status */
      MEMORY_CARD_CONTROL_TYPE *status_pointer;
      /* Pointer to timer counter register */
      TIMER_REG_TYPE *timer;

      int i, j, kh, kl, *system_address;
      int address, data, erase_command;
      int card_size, block_size;
      int status, return_word;
      char ascii_string[2];

      timer = (TIMER_REG_TYPE *) &TIMER0;
      status = NO_ERROR;                                    /* Start with no error */

      /* Erasing Card */
      if(card_address == MEMORY_CARD_0)
            LCD_display(START_LINE1, "\fErasing Card 1");
      else
            LCD_display(START_LINE1, "\fErasing Card 2");

      /* Obtain memory card size */
      card_size = memory_card_size(card_address);

      /* Obtain memory card block size */
      block_size = memory_card_block(card_address);

      /* Erase card */
      i = 0;                                                /* Activity indicator type */
      for(address = 0; address < card_size; address += block_size)
      {
            /* Get system address of card block */
            system_address = address_card_page(address + card_address);

            switch (Memory_Card_ID & 0xffff)
            {
                  case S1_1MEG:
                  case S1_4MEG:
                        kh = 0;
                        kl = 0;
                        for(j = 0; j < block_size; j++)
                        {
                              data = (0xffff & *(system_address + j));
                              erase_command = ERASE_SETUP;
                              while((data != 0xffff) && (status == NO_ERROR))
                              {
                                    if((kh > Max_Erase_Count) || (kl > Max_Erase_Count))
                                          status = MEMORY_CARD_ERROR + CARD_ERASE_ERROR;
                                    else
                                    {
                                          /* Erase only the unerased */
                                          if((data & 0x00ff) == 0x00ff)
                                                erase_command |= 0x00ff;
                                          else
                                                ++kl;
                                          if((data & 0xff00) == 0xff00)
                                                erase_command |= 0xff00;
                                          else
                                                ++kh;

                                          /* Issue erase command */
                                          *(system_address + j) = erase_command;

                                          /* Confirm erase */
                                          *(system_address + j) = erase_command;

                                          /* Verify erase */
                                          timer->Timer_Counter = MSEC10; /* Wait 10 msecs */
                                          while(timer->Timer_Counter);
                                          *(system_address + j) = ERASE_VERIFY;
                                          data = (0xffff & *(system_address + j));
```

```
                    }
                }
            }
            break;
        case S2_20MEG:
            /* Issue erase command */
            *system_address = ERASE_SETUP;

            /* Confirm erase */
            *system_address = ERASE_CONFIRM;

            /* Test status of memory card before retrieving block status */
            /* Timer is initialized here for status function */
            timer->Timer_Counter = ERASE_TIMEOUT;
            status = memory_card_status(card_address);
            if(status)
            {
                return_word = error_display(status);
            }
            else
            {
                /* Get block status */
                status = BLOCK_STATUS_MASK & *system_address;
                if(status)
                {
                    status += MEMORY_CARD_ERROR;
                    return_word = error_display(status);
                }
            }
            break;
        default:
            return CARD_ID_BAD;
            break;
    }

    /* Return memory card block to Read Array Mode */
    *system_address = READ_ARRAY;

    /* Abort routine, had an error */
    if(status)
        return status;

    /* Output activity indicator to user interface */
    if(i == 0)
    {
        LCD_display(START_LINE1 + 17, "|");
        i = 1;
    }
    else if(i == 1)
    {
        LCD_display(START_LINE1 + 17, "/");
        i = 2;
    }
    else if(i == 2)
    {
        LCD_display(START_LINE1 + 17, "-");
        i = 3;
    }
    else
    {
        ascii_string[0] = (char) BACK_SLASH;
        ascii_string[1] = 0;
        LCD_display(START_LINE1 + 17, &ascii_string[0]);
        i = 0;
    }
}
if(card_address == MEMORY_CARD_0)

    LCD_display(START_LINE1, "\fMemory Card 1 Erased");
else
    LCD_display(START_LINE1, "\fMemory Card 2 Erased");

return NO_ERROR;
}

/*****************************************************************************
Name:       address_card_page
Number/Version:
History:
            Date        Rev  Author          Description
            17-Mar-1993 0.0  C. Houlberg     Baseline
```

```
Inputs:
            card_address
Outputs:
            system_address
Global Data:
            - None -
Functions Referenced:

Abstract:
            This function maps the IC Memory Card address to that of the
            system and updates the address bits A25-A23 (from here on
            referred to as the page address).
*****************************************************************************/
/*
            IC Memory Card address -- int card_address
            System address ---------- int return value of function
*/

int *address_card_page(int card_address)
{
      PPI2_REG_TYPE *page_pointer;              /* IC Memory Card page pointer */
      IC_MEMORY_CARD_TYPE *address_pointer;     /* Pointer to address */

      int system_address;

      page_pointer = (PPI2_REG_TYPE *) &PPI2;
      address_pointer = (IC_MEMORY_CARD_TYPE *) &card_address;

      /* Adjust card_address for word access addressing (A0 ignored by card) */
      card_address = (card_address << 1);

      /* Output page number */
      page_pointer->IC_Memory_Card_Page = address_pointer->Page_Number;

      /* Extract address */
      system_address = address_pointer->Address;

      /* Map address to proper location */
      if(system_address < FOUR_MEG) /* Address within 1st 4M words of page */
            system_address += (int) &PAGELOW;
      else                                      /* Address within 2nd 4M words of page */
            system_address += (int) &PAGEHIGH - FOUR_MEG;

      return (int *) system_address;
}

/*****************************************************************************
Name:       memory_card_status
Number/Version:
History:
            Date        Rev   Author            Description
            17-Mar-1993 0.0   C. Houlberg       Baseline
            01-Apr-1993 0.0   C. Houlberg       Status test keyed to Card ID

Inputs:
            card_address
Outputs:

Global Data:
            Memory_Card_ID
Functions Referenced:

Abstract:
            This function waits until the IC Memory Card is ready or
            times out and returns a status indicating possible memory
            card errors.
*****************************************************************************/
/*
            memory card block address -- int address
            memory card block status --- int return value of function
*/

int memory_card_status(int card_address)
{
      /* Pointer into card address makeup */
      IC_MEMORY_CARD_TYPE *address_pointer;
      /* Pointer to timer counter register */
      TIMER_REG_TYPE *timer;
      /* Pointer to card status */
      MEMORY_CARD_CONTROL_TYPE *card_status_pointer;

      /* Timer is initialized in calling routine */
      timer = (TIMER_REG_TYPE *) &TIMER0;
```

```
address_pointer = (IC_MEMORY_CARD_TYPE *) &card_address;

/* Adjust card_address to address words (A0 not used) */
card_address = card_address << 1;

/* Check status of IC Memory Card before returning */
if(address_pointer->Page_Number < CARD1_PAGE0)  /* Test memory card 1 */
{
      /* Point to proper location */
      card_status_pointer = (MEMORY_CARD_CONTROL_TYPE *) &SERIAL0;
      /* Test Memory Card #0 for Card Detect */
      if(card_status_pointer->Card_Not_Detect_1 ||
            card_status_pointer->Card_Not_Detect_2)
      {
            return NO_CARD_0;
      }
      switch (Memory_Card_ID & 0xffff)
      {
            case S1_1MEG:
            case S1_4MEG:
                  break;
            case S2_20MEG:
                  /* Test Memory Card #0 for Ready */
                  while(!(card_status_pointer->Card_Ready))
                  {
                        if(!(timer->Timer_Counter))
                              return CARD_0_TIMEOUT;
                  }
                  break;
            default:
                  return CARD_ID_BAD;
                  break;
      }
      /* Test Memory Card #0 for write protect */
      if(card_status_pointer->Card_WP)
            return CARD_0_WP;
}
else              /* Test memory card 0 */
{
      /* Point to proper location */
      card_status_pointer = (MEMORY_CARD_CONTROL_TYPE *) &SERIAL1;
      /* Test Memory Card #1 for Card Detect */
      if(card_status_pointer->Card_Not_Detect_1 ||
            card_status_pointer->Card_Not_Detect_2)
      {
            return NO_CARD_1;
      }
      switch (Memory_Card_ID & 0xffff)
      {
            case S1_1MEG:
            case S1_4MEG:
                  break;
            case S2_20MEG:
                  /* Test Memory Card #1 for Ready */
                  while(!(card_status_pointer->Card_Ready))
                  {
                        if(!(timer->Timer_Counter))
                              return CARD_1_TIMEOUT;
                  }
                  break;
            default:
                  return CARD_ID_BAD;
                  break;
      }
      /* Test Memory Card #1 for write protect */
      if(card_status_pointer->Card_WP)
            return CARD_1_WP;
}

return NO_ERROR;
}

/*****************************************************************************
Name:           memory_card_size
Number/Version:
History:
                Date          Rev   Author          Description
                17-Mar-1993   0.0   C. Houlberg     Baseline
                01-Apr-1993   0.0   C. Houlberg     Card sized using card ID

Inputs:
                card_address
```

```
Outputs:
            card_size
Global Data:
            Memory_Card_ID
Functions Referenced:
            memory_card_ID()
Abstract:
            This function obtains the size of the IC Memory Card
                  from the card ID.
*******************************************************************************/
int memory_card_size(int card_address)
{
      int card_size;

      memory_card_ID(card_address);                     /* Establishes global value */

      switch (Memory_Card_ID & 0xffff)
      {
            case S1_1MEG:
                  card_size = SIZE_1MEG;
                  break;
            case S1_4MEG:
                  card_size = SIZE_4MEG;
                  break;
            case S2_20MEG:
                  card_size = SIZE_20MEG;
                  break;
      }

      return card_size;
}

/*******************************************************************************
Name:       memory_card_block
Number/Version:
History:
            Date        Rev   Author          Description
            17-Mar-1993 0.0   C. Houlberg     Baseline
            01-Apr-1993 0.0   C. Houlberg     Block sized using card ID
Inputs:
            card_address
Outputs:
            block_size
Global Data:
            Memory_Card_ID
Functions Referenced:
            memory_card_ID()
Abstract:
            This function obtains the block size of the IC Memory Card
            from the card device tuple.
*******************************************************************************/
int memory_card_block(int card_address)
{
      int block_size;

      memory_card_ID(card_address);                     /* Establishes global value */

      switch (Memory_Card_ID & 0xffff)
      {
            case S1_1MEG:
                  block_size = BLOCK_128K;
                  break;
            case S1_4MEG:
                  block_size = BLOCK_256K;
                  break;
            case S2_20MEG:
                  block_size = BLOCK_64K;
                  break;
      }

      return block_size;
}

/*******************************************************************************
Name:       memory_card_ID
Number/Version:
History:
            Date        Rev   Author          Description
            01-Apr-1993 0.0   C. Houlberg     Baseline

Inputs:
            card_address
```

```
Outputs:
                    Manufacturer and Card IDs
Global Data:
                Memory_Card_ID
Functions Referenced:
                    - None -
Abstract:
                This function obtains the IC Memory Card manufacturer and card IDs.
*************************************************************************************/
void memory_card_ID(int card_address)
{
    /* Pointer to timer counter register */
    TIMER_REG_TYPE *timer;

    int *system_address;            /* system address pointer */

    /* Address card page and return system_address */
    system_address = address_card_page(card_address);

    /* Issue read ID command */
    *system_address = READ_ID;

    /* Read the manufacturer's and card's ID */
    /* Manufacturer's ID */
    Memory_Card_ID = *((int *)((int) system_address & 0xfffffc));
    /* Add Card's ID */
    Memory_Card_ID = (Memory_Card_ID << 16)
        + (0xffff & *((int *)(((int) system_address & 0xfffffc) + 2)));

    /* Return the card to the Read Array mode */
    *system_address = READ_ARRAY;

    return;
}

/* end */


/*********************************************************************************
Include File Name:    ms1553.h
Number/Version:
History:
            Date         Rev   Author          Description
            23-Mar-1993  0.0   C. Houlberg     Baseline
Abstract:
            MS-1553 controller function prototypes and definitions
**********************************************************************************/
/*    Function prototypes
*/
    int ms1553_send(int *message_pointer, int *status_pointer);
    int ms1553_receive(int *command_pointer, int *message_pointer);
    int ms1553_respond(int *command_pointer, int *message_pointer);
    int ms1553_monitor(void);
    void ms1553_BC_setup(int activity);
    int ms1553_RT_setup(void);
    void ms1553_MT_setup(void);
    void ms1553_change_bus_channel(void);

    #define     POLL_TIMEOUT      SEC2                  /* Two second polling timeout */
/*****************************************/
/* MS-1553 Controller Memory Locations */
/*****************************************/

#define Command_Stack              0x0000        /* Command Stack location */
#define Stack_Pointers             0x0100        /* Stack Pointers location */
#define BC_Message_Block           0x0108        /* BC Message Block location */
#define RT_Mode_Code_Int_Table     0x0108        /* Selective Interrupt Table */
#define RT_Mode_Code_RX_Data       0x0110        /* RX data words */
#define RT_Mode_Code_TX_Data       0x0120        /* TX data words */
#define RT_Mode_Code_BCST_Data     0x0130        /* BCST data words */
#define RT_RX_Lookup_Table         0x0140        /* RT Lookup Table location */
#define RT_TX_Lookup_Table         0x0160        /* RT Lookup Table location */
#define RT_BCST_Lookup_Table       0x0180        /* RT Lookup Table location */
#define RT_SACW_Block              0x01A0        /* RT Lookup Table location */
#define RT_Busy_Bit_Table          0x0240        /* RT Busy Bit Lookup Table */
#define MT_Lookup_Table            0x0280        /* MT Lookup Table location */
#define RT_RX_Data_Block           0x0400        /* RX Data Block pointer */
```

```
#define RT_TX_Data_Block            0x0430        /* TX Data Block pointer */
#define RT_BCST_Data_Block          0x0460        /* BCST Data Block pointer */
#define RT_Activity_Data_Block      0x0490        /* Activity Message Data */
#define RT_Command_Data_Block       0x0500        /* Expected Command Block */
#define MT_Command_Stack_Start      0x0C00
#define MT_Data_Stack_Start         0x0D00

#define Mode_Code_Int_Size          0x0008        /* Size of interrupt table */
#define Mode_Code_Table_Size        0x0010        /* Size of each table section*/
#define RT_Table_Size               0x0020        /* Size of each table section*/
#define RT_Busy_Table_Size          0x0008        /* Size of Busy Bit Table */
#define Data_Block_Size             0x0030        /* Size of message data block*/
#define Zero_Data                   0x0000        /* Zero data */
#define SACW_Block_Data             0x0000        /* 1 message block size */
#define MT_Table_Size               0x0080        /* Size of MT lookup table */
#define Monitor_All                 0xFFFF        /* Monitor all messages */

/***** DEFINITIONS OF STRUCTURES USED TO INTERFACE TO BU-61590 *****/

/****************************/
/* Register List Structure */
/****************************/

typedef struct                /* Registers */
{
      unsigned Interrupt_Mask             :16;  /* Interrupt masks */
      unsigned Unusable_0                 :16;  /* Unusable bits */
      unsigned Config_Reg_1               :16;  /* Configuration register #1 */
      unsigned Unusable_1                 :16;  /* Unusable bits */
      unsigned Config_Reg_2               :16;  /* Configuration register #2 */
      unsigned Unusable_2                 :16;  /* Unusable bits */
      unsigned Ctrl_Register_Pointer      :16;  /* Start/Reset, Cmd Stack */
      unsigned Unusable_3                 :16;  /* Unusable bits */
      unsigned Control_Word_Reg           :16;  /* Control word register */
      unsigned Unusable_4                 :16;  /* Unusable bits */
      unsigned Time_Tag_Reg               :16;  /* Time tag register */
      unsigned Unusable_5                 :16;  /* Unusable bits */
      unsigned Interrupt_Status           :16;  /* Interrupt status register */
      unsigned Unusable_6                 :16;  /* Unusable bits */
      unsigned Config_Reg_3               :16;  /* Configuration register #3 */
      unsigned Unusable_7                 :16;  /* Unusable bits */
      unsigned Config_Reg_4               :16;  /* Configuration register #4 */
      unsigned Unusable_8                 :16;  /* Unusable bits */
      unsigned Config_Reg_5               :16;  /* Configuration register #5 */
      unsigned Unusable_9                 :16;  /* Unusable bits */
      unsigned MT_Data_Stack_Add          :16;  /* MT Data stack address */
      unsigned Unusable_10                :16;  /* Unusable bits */
      unsigned BC_Time_To_EOF             :16;  /* BC time to end of frame */
      unsigned Unusable_11                :16;  /* Unusable bits */
      unsigned BC_Time_To_Message         :16;  /* Time to next message */
      unsigned Unusable_12                :16;  /* Unusable bits */
      unsigned RT_Last_Command            :16;  /* MT last command register */
      unsigned Unusable_13                :16;  /* Unusable bits */
      unsigned RT_Status_Word             :16;  /* Status word register */
      unsigned Unusable_14                :16;  /* Unusable bits */
      unsigned RT_BIT_Word                :16;  /* Bit word register */
      unsigned Unusable_15                :16;  /* Unusable bits */
      unsigned Test_Mode_Reg_0            :16;  /* Test mode register 0 */
      unsigned Unusable_16                :16;  /* Unusable bits */
      unsigned Test_Mode_Reg_1            :16;  /* Test mode register 1 */
      unsigned Unusable_17                :16;  /* Unusable bits */

} MS1553_REGS_TYPE;

#define Set_BC_Mode                 0x0000        /* Config_Reg_1 */
#define Set_RT_Mode_C               0x8F80        /* Config_Reg_1 */
#define Set_RT_Mode_E               0x8B80        /* Config_Reg_1 (Busy) */
#define Set_RT_Mode_G               0x8400        /* Config_Reg_1 (Alt Status) */
#define Set_MT_Mode                 0x5000        /* Config_Reg_1 */
#define Reset_Controller            0x0001        /* Register Pointer */
#define Start_Controller            0x0002        /* Register Pointer */
#define Clear_Status_Register       0x0004        /* Register Pointer */
#define Reset_Time_Tag              0x0008        /* Register Pointer */
#define Stop_Following_Message      0x0040        /* Register Pointer */
#define Active_Bus_A                0x0090        /* Control_Word_Reg */
#define Bus_Channel_A               0x0080        /* Control_Word_Reg */
#define Active_Bus_B                0x0010        /* Control_Word_Reg */
#define MS1553A_Select              0x0008        /* Control_Word_Reg */
#define Mode_Code_Format            0x0004        /* Control_Word_Reg */
#define MS1553A_Mode_Codes          0x0002        /* Config_Reg_3 */
#define Alternate_Status            0x0020        /* Config_Reg_3 */
```

```
/*******************************/
/* CONFIGURATION REGISTER #1 */
/*******************************/

typedef struct                  /* Register */
{
    unsigned Lower_Bits                         :12;  /* Lower bits not tested */
    unsigned Mode                               : 4;  /* Mode identification bits */
    unsigned Unusable                           :16;  /* Unusable bits */

} CONFIG_REG_1_TYPE;

#define RT_Mode                     8          /* Defines RT Mode */
#define MT_Mode                     5          /* Defines MT Mode */
#define Clear_Busy_Bit              0x0400     /* Busy bit location */
#define Clear_Service_Req_Bit       0x0200     /* Service request location */
#define Clear_Data_Ready_Bit        0x0100     /* Data ready bit location */
#define Set_G_Data_Ready_Bit        0x0200     /* G Data ready bit */

/*******************************/
/* INTERRUPT STATUS REGISTER */
/*******************************/

typedef struct                  /* Register */
{
    unsigned End_Of_Message                     : 1;  /* Message Completed */
    unsigned BC_Status_Set                      : 1;  /* Bad RT address or status */
    unsigned Format_Error                       : 1;  /* Loopback/Message/Timeout */
    unsigned BC_End_Of_Frame                    : 1;  /* Frame Completed */
    unsigned RT_Message_Completed               : 1;  /* Specific subaddress */
    unsigned Remaining_Bits                     :11;  /* Remaining bits not used */
    unsigned Unusable                           :16;  /* Unusable bits */
} INT_STATUS_REG_TYPE;

/******************/
/* STACK POINTERS */
/******************/

typedef struct                  /* Memory Block */
{
    unsigned Command_Stack_Pointer              :16;  /* BC/RT Stack Pointer */
    unsigned Unusable_0                         :16;  /* Unusable bits */
    unsigned Message_Count                      :16;  /* BC Message Count */
    unsigned Unusable_1                         :16;  /* Unusable bits */
    unsigned MT_Command_Stack_Pointer           :16;  /* MT Command Stack Pointer */
    unsigned Unusable_2                         :16;  /* Unusable bits */
    unsigned MT_Data_Stack_Pointer              :16;  /* MT Data Stack Pointer */
    unsigned Unusable_3                         :16;  /* Unusable bits */

} STACK_TYPE;

/************************/
/* BC DESCRIPTOR BLOCK */
/************************/

typedef struct                  /* Memory Block */
{
    unsigned Block_Status_Word                  :16;  /* BC Block Status Word */
    unsigned Unusable_0                         :16;  /* Unusable bits */
    unsigned Time_Tag_Word                      :16;  /* Time Tag */
    unsigned Unusable_1                         :16;  /* Unusable bits */
    unsigned Intermessage_Gap_Time              :16;  /* Intermessage Gap */
    unsigned Unusable_2                         :16;  /* Unusable bits */
    unsigned Message_Block_Address              :16;  /* Message Block Address */
    unsigned Unusable_3                         :16;  /* Unusable bits */

} BC_DESCRIPTOR_TYPE;

/***************************/
/* RT/MT DESCRIPTOR BLOCK */
/***************************/

typedef struct                  /* Memory Block */
{
    unsigned Block_Status_Word                  :16;  /* BC Block Status Word */
    unsigned Unusable_0                         :16;  /* Unusable bits */
    unsigned Time_Tag_Word                      :16;  /* Time Tag */
    unsigned Unusable_1                         :16;  /* Unusable bits */
    unsigned Data_Block_Pointer                 :16;  /* Data Block Pointer*/
    unsigned Unusable_2                         :16;  /* Unusable bits */
    unsigned Received_Command_Word              :16;  /* Received Command Word */
    unsigned Unusable_3                         :16;  /* Unusable bits */
```

```
} RT_MT_DESCRIPTOR_TYPE;

/****************************/
/* MS1553 BLOCK STATUS WORD */
/****************************/
typedef struct                  /* Memory Block Word */
{
      unsigned Lower_Bits                          : 8;  /* Lower bits not tested */
      unsigned Loop_Test_Failure                   : 1;  /* Loop Test failure */
      unsigned No_Response_Timeout                 : 1;  /* Timeout error */
      unsigned Format_Error                        : 1;  /* Format error */
      unsigned Not_Used                            : 1;  /* Bit not used */
      unsigned Error_Flag                          : 1;  /* Some error occurred */
      unsigned Bus_B                               : 1;  /* Bus B Active */
      unsigned Start_Of_Message                    : 1;  /* Message started */
      unsigned End_Of_Message                      : 1;  /* Message completed */
      unsigned Unusable                            :16;  /* Unusable bits */

} MS1553_BLOCK_STATUS_TYPE;

/* end */


/*****************************************************************************
Module Name:    ms1553.c
Number/Version:
History:
            Date        Rev   Author          Description
            23-Mar-1993 0.0   C. Houlberg     Baseline

Abstract:
      This module provides the drivers needed for the MS-1553 bus interface.
*****************************************************************************/

/*
      All definitions required by this program are contained in
      the following header files:
*/
#include "display.h"          /* test */
#include "rrt.h"                                /* RRT configuration */
#include "dsp.h"                                /* DSP definitions */
#include "system.h"                             /* System definitions */
#include "cardhdrs.h"                           /* Memory Card Header definitions */
#include "wordtype.h"                           /* MS-1553 word structures */
#include "timer.h"                              /* Timer definitions */
#include "error.h"                              /* Error definitions */
#include "ms1553.h"                             /* MS-1553 definitions & structures */

#define     SINGLE_MESSAGE    0xfffe            /* Counter for single message */

/*****************************************************************************
Module Name:    ms1553_send
Number/Version:
History:
            Date        Rev   Author          Description
            23-Mar-1993 0.0   C. Houlberg     Baseline

Abstract:
      This function sends a message to the RT and expects a status
      response back.  The message being sent is pointed to by the
      pointer passed as the 1st argument in this function.
      1st word is always a COMMAND word.
      The remaining words are data.

      If all goes well, the STATUS word will be returned and
      pointed to by the second argument in this function.

      If an error occurs the return word will be an error
      indicator (such as LOOP_TEST_ERROR, NO_RESPONSE, or
      MESSAGE_FAULT).

      arguments to ms1553_send are:
      int *message_pointer = pointer to command and message words
      int *status_pointer = pointer to returned status word
      int value returned from ms1553_send is an error indicator

      This function is implemented in the following manner:

            Address 0x0100 <= 0x0000            Stack points to descriptor stack start
            Address 0x0101 <= 0xfffe            Single message Frame

            Address 0x0003 <= 0x0108            Descriptor points to message block
```

```
        Address 0x0108 <= Control Word      Set up in ms1553_BC_setup routine
             If the Command is a Mode Code Command the Mode Code Format Bit
             in the Control Word will be set.
        Address 0x0109 <= 0x????            Command word from *message_pointer
        Address 0x010A <= 0x????            1ST data word if not no data Mode Code
         ...
        Address 0x010A+(N-1) <= 0x????      Nth data word

        Register 0x03 <= 0x0006             Clear status and start message

        Register 0x06 Bit 0 == EOM          Wait for Status Register EOM

        Address 0x0108 <= Control Word      Set up in ms1553_BC_setup routine
             If the Command was a Mode Code Command the Mode Code Format Bit
             in the Control Word will be cleared.

        Address 0x010A+(N+1) => 0x????      Status word to *status_pointer
*****************************************************************************/
int ms1553_send(int *message_pointer, int *status_pointer)
{
     MS1553_REGS_TYPE *ms1553_regs;             /* Controller registers pointer */
     STACK_TYPE *memory_stacks;                 /* Pointer to stack pointers */
     BC_DESCRIPTOR_TYPE *descriptor;            /* Pointer into Descriptor */
     COMMAND_WORD_TYPE *word_field;             /* Word field pointer */
     INT_STATUS_REG_TYPE *interrupt_status;     /* Pointer into status register */
     MS1553_BLOCK_STATUS_TYPE *block_status;    /* Pointer into block status */

     int *memory_pointer;                       /* Memory pointer */
     int *control_word_pointer;

     int i, subaddress, word, word_count;
     int command, status;

     ms1553_regs = (MS1553_REGS_TYPE *) &MS1553REGS;
     memory_stacks = (STACK_TYPE *) (&MS1553MEM + Stack_Pointers);
    /* Set up bus controller */
    memory_stacks->Command_Stack_Pointer = Command_Stack; /* Point to stack */
    memory_stacks->Message_Count = SINGLE_MESSAGE;  /* Single message frame */

    /* Set up message block pointer in descriptor */
    descriptor = (BC_DESCRIPTOR_TYPE *) (&MS1553MEM + Command_Stack);
    descriptor->Message_Block_Address = BC_Message_Block;

    /* Save command word */
    command = *message_pointer;

    /* Test for Mode Command */
    word_field = (COMMAND_WORD_TYPE *) message_pointer;
    word_count = word_field->Data_Word_Count;
    if(!(word_count))
         word_count = 32;                      /* Must account for 32 word messages */
    subaddress = word_field->Subaddress;
    memory_pointer = (int *) (&MS1553MEM + BC_Message_Block);
    control_word_pointer = memory_pointer;
    /* Set up BC message block */
    if(!(subaddress))                                    /* Test for Mode Command */
    {
         *memory_pointer++ |= Mode_Code_Format;   /* Set up Control Word */
         *memory_pointer++ = *message_pointer++;  /* Command in Message Block */
         if((word_count & 0x1f) > 0x0F)           /* Test for data word */
              *memory_pointer++ = *message_pointer++;   /* Only one data word */
    }
    else               /* Message Command (Broadcast Commands not allowed) */
    {
         memory_pointer++; /* Skip Control Word set up in ms1553_BC_setup() */
         for(i = 0; i <= word_count; i++)
              *memory_pointer++ = *message_pointer++;
    }

    /* Clear status register and send message */
    ms1553_regs->Ctrl_Register_Pointer = Clear_Status_Register;
    ms1553_regs->Ctrl_Register_Pointer = Start_Controller;

    /* Wait for Status Register EOM or Error */
    interrupt_status = (INT_STATUS_REG_TYPE *) &status;
    block_status = (MS1553_BLOCK_STATUS_TYPE *) &status;
    do
    {
         status = ms1553_regs->Interrupt_Status;   /* Read the status register */
         if(interrupt_status->Format_Error)        /* Test for Error */
         {
              ms1553_regs->Ctrl_Register_Pointer = Stop_Following_Message;
```

```
            /* Clear Mode_Code_Bit if command was a Mode Code command */
            if(!(subaddress))                      /* Test for Mode Command */
                 *control_word_pointer &= ~Mode_Code_Format;     /* Clear Bit */

            /* Return error */
            status = descriptor->Block_Status_Word;
            if(block_status->Loop_Test_Failure)
                 return LOOP_TEST_ERROR;                    /* Loop Test error */
            if(block_status->No_Response_Timeout)
                 return NO_RESPONSE;                        /* No Response error */
            return MESSAGE_FAULT + command;            /* Error in message */
        }
    } while(!(interrupt_status->End_Of_Message));

    /* Get and store Status Word for return */
    *status_pointer = 0xffff & (*(memory_pointer + 1));

    /* Clear Mode_Code_Format Bit if command was a Mode Command */
    if(!(subaddress))                              /* Test for Mode Command */
         *control_word_pointer &= ~Mode_Code_Format;     /* Clear Mode Code Bit */

    return NO_ERROR;
}

/*****************************************************************************
Module Name:    ms1553_receive
Number/Version:
History:
        Date        Rev  Author           Description
        23-Mar-1993 0.0  C. Houlberg      Baseline

Abstract:
    This function sends a command to the RT for the RT to send
    a message back to the RRT.

    1st word of the return message is always a STATUS word.
    The remaining words are data.

    If an error occurs the return word will be an error
    indicator (such as LOOP_TEST_ERROR, NO_RESPONSE, or
    MESSAGE_FAULT).

    arguments to ms1553_receive are:
    int *command_pointer = pointer to MS-1553 command word
    int *message_pointer = pointer to Status word and message
    int value returned is an error indicator

    This function is implemented in the following manner:

        Address 0x0100 <= 0x0000           Stack points to descriptor stack start
        Address 0x0101 <= 0xfffe           Single message Frame

        Address 0x0003 <= 0x0108           Descriptor points to message block

        Address 0x0108 <= Control Word     Set up in ms1553_BC_setup routine
              If the Command is a Mode Code Command the Mode Code Format Bit
              in the Control Word will be set.

        Address 0x0109 <= 0x????           Command word from *command_pointer

        Register 0x03 <= 0x0006            Clear status and start message

        Register 0x06 Bit 0 == EOM         Wait for Status Register EOM

        Address 0x0108 <= Control Word     Set up in ms1553_BC_setup routine
              If the Command was a Mode Code Command the Mode Code Format Bit
              in the Control Word will be cleared.

        Address 0x010B => 0x????           Status word to *message_pointer
        Address 0x010C => 0x????           1st data word
         ...
        Address 0x010B+(N-1) => 0x????     Nth data word
*****************************************************************************/
int  ms1553_receive(int *command_pointer, int *message_pointer)
{
    MS1553_REGS_TYPE *ms1553_regs;            /* Controller registers pointer */
    STACK_TYPE *memory_stacks;                /* Pointer to stack pointers */
    BC_DESCRIPTOR_TYPE *descriptor;           /* Pointer into Descriptor */
    COMMAND_WORD_TYPE *word_field;            /* Word field pointer */
    INT_STATUS_REG_TYPE *interrupt_status;    /* Pointer into status register */
    MS1553_BLOCK_STATUS_TYPE *block_status;   /* Pointer into block status */
```

```
    int *memory_pointer;                        /* Memory pointer */
    int *control_word_pointer;

    int i, word_count;
    int status;
    int subaddress;

    ms1553_regs = (MS1553_REGS_TYPE *) &MS1553REGS;
    memory_stacks = (STACK_TYPE *) (&MS1553MEM + Stack_Pointers);

    /* Set up bus controller */
    memory_stacks->Command_Stack_Pointer = Command_Stack; /* Point to stack */
    memory_stacks->Message_Count = SINGLE_MESSAGE;  /* Single message frame */

    /* Set up message block pointer in descriptor */
    descriptor = (BC_DESCRIPTOR_TYPE *) (&MS1553MEM + Command_Stack);
    descriptor->Message_Block_Address = BC_Message_Block;

    /* Test for Mode Command */
    word_field = (COMMAND_WORD_TYPE *) command_pointer;
    word_count = word_field->Data_Word_Count;
    if(!(word_count))                           /* Must account for 32 word messages */
        word_count = 32;
    subaddress = word_field->Subaddress;
    memory_pointer = (int *) (&MS1553MEM + BC_Message_Block);
    control_word_pointer = memory_pointer;
    /* Set up BC message block */
    if(!(subaddress))                               /* Test for Mode Command */
        *memory_pointer++ |= Mode_Code_Format;      /* Set up Control Word */
    else                    /* Message Command (Broadcast Commands not allowed) */
        memory_pointer++; /* Skip Control Word set up in ms1553_BC_setup() */
    *memory_pointer++ = *command_pointer;           /* Command in Message Block */

    /* Clear status register and send message */
    ms1553_regs->Ctrl_Register_Pointer = Clear_Status_Register;
    ms1553_regs->Ctrl_Register_Pointer = Start_Controller;

    /* Wait for Status Register EOM or Error */
    interrupt_status = (INT_STATUS_REG_TYPE *) &status;
    block_status = (MS1553_BLOCK_STATUS_TYPE *) &status;
    do
    {
        status = ms1553_regs->Interrupt_Status;   /* Read the status register */
        if(interrupt_status->Format_Error)        /* Test for Error */
        {
            ms1553_regs->Ctrl_Register_Pointer = Stop_Following_Message;

            /* Clear Mode_Code_Format Bit if command was a Mode Command */
            if(!(subaddress))                           /* Test for Mode Command */
                *control_word_pointer &= ~Mode_Code_Format;     /* Clear bit */

            /* Return error */
            status = descriptor->Block_Status_Word;
            if(block_status->Loop_Test_Failure)
                return LOOP_TEST_ERROR;                 /* Loop Test error */
            if(block_status->No_Response_Timeout)
                return NO_RESPONSE;                         /* No Response error */
            return MESSAGE_FAULT + *command_pointer;    /* Error in message */
        }
    } while(!(interrupt_status->End_Of_Message));

    /* Retrieve data for return from routine */
    memory_pointer++;                                   /* Skip loopback of command */
    *message_pointer++ = 0xffff & (*memory_pointer++);  /* Get Status Word */
    /* Test for Mode Command */
    if(!(subaddress))
    {
        if((word_count & 0x1f) > 0x0F)
            *message_pointer = 0xffff & (*memory_pointer);  /* Get data word */
        *control_word_pointer &= ~Mode_Code_Format;     /* Clear Mode Code Bit */
    }
    else
    {
        for(i = 1; i <= word_count; i++)            /* Get data words */
            *message_pointer++ = 0xffff & (*memory_pointer++);
    }

    return NO_ERROR;
}

/*****************************************************************************
Module Name:    ms1553_respo...
```

```
Number/Version:
History:
          Date        Rev  Author          Description
          23-Mar-1993 0.0  C. Houlberg     Baseline

Abstract:
     This function sets up the controller to respond to commands
     from the BC and process an Expected Command upon demand.
     The expected command to be received is pointed to by
     *command_pointer which is passed as the 1st argument in
     this function.

     The message being sent or received is pointed to by
     *message_pointer which is passed as the 2nd argument in
     this function.

     The 1st word pointed to by message_pointer is the STATUS word.
     The remaining words are data.

     The return word is an error indicator.
     The BU61590 is not programmed to respond to Broadcast Commands as
     address 31 is a valid RT address.

     arguments to ms1553_respond are:
     int *command_pointer = pointer to expected command
     int *message_pointer = pointer to status and message words
     int value returned is an error indicator

     This function does NOT reset the Command_Stack_Pointer initialized in
     the ms1553_RT_setup function.  This is so a history of a maximum of
     the last 64 command responses will be stored in the Command_Stack to
     assist in debugging the communications interface.

     This function is implemented differently for each RT protocol.
     These are Protocol B, C, E, and G and are implemented as follows:

     Protocol B       BC protocol could start out as an RT as in Protocol C.
     Protocol C
     1      If Transmit Command expected, transfer data to Data Block
            Address 0x0500 - 0x05?? <= Transfer Data.

     2      Transfer command (without address) to Activity Command Data Block.
            Address 0x0490 <= (0x07FF & Expected Command)

     3      Set Lookup Table to point to Expected Command Data Block.
            0x0500 => Address 0x0140 + 0x???? (command dependent)

     4      Set Status Word bits for Expected Command.
            Register Address 0x01 <= Expected Command Status Bits

     5      If Expected Command is not the Activity Command, clear bit in
            Busy Bit Lookup Table (Activity Command Busy Bit was cleared
            in ms1553_RT_setup()).
            Address 0x0240 + (appropriate bit location) <= 0 (appropriate bit)

     6      Clear Status Register.
            Register Address 0x03 <= 0x0004

     7      Wait for command transaction to complete.
            Register Address 0x06 Bit 0 == EOM

     8      If the command was the Expected Command but not an Activity
            Command, set bit in Busy Bit Lookup Table (Activity left cleared).
            Address 0x0240 + (appropriate bit location) <= 1 (appropriate bit)

     8.1    If Expected Command was not an Activity Command, set Lookup Table
            to point to Unexpected Command Data Block otherwise set it to
            point to the Activity Command Data Block.
            0x0400 + 0x???? => Address 0x0140 + 0x???? (command dependent)

     8.2    If Receive Command, transfer data for return from function call.
            Address 0x0500 - 0x05?? => Return Data

     8.3    Return from function call.

     9      If command was not the Expected Command, which is not the
            Activity Command, set the Service Request Bit in the Status Word
            to request the Expected Command.
            Register Address 0x01 <= Set Bit 9 (Service Request Bit)

     9.1    Set bit in Busy Bit Lookup Table for Expected Command.
            Address 0x0240 + (appropriate bit location) <= 1 (appropriate bit)
```

7.4 If the Expected Command was not a Mode Command, set bit in Busy Bit Lookup Table (Mode Command left cleared).
Address 0x0240 + (appropriate bit location) <= 1 (appropriate bit)

7.5 Return from function call.

8 If the command was not the Expected Command repeat from step 5.

The Status Word is left with the Busy Bit set as it was in the function call. The Data Ready Bit is left always cleared. This provides a data not ready response and the option of responding busy or not busy to commands that occur before the protocol can respond.

Protocol G
1 Set Status Word bits for Expected Command.
Register Address 0x01 <= Expected Command Status Bits 2.1 If Transmit Mode Command with data expected, transfer data to Mode Code Data Block.
Address 0x0120 + (0x0f & word_count) <= Transfer data 2.2 If Transmit Message Command, transfer data to Data Block.
Address 0x0500 - 0x05?? <= Transfer Data.

3 If Message Command, set up Lookup Table to point to Expected Command Data Block.
0x0500 => Address 0x0140 + 0x???? (command dependent)

4 Clear Status Register.
Register Address 0x03 <= 0x0004

5 Wait for command transaction to complete.
Register Address 0x06 Bit 0 == EOM 6.1 If the command was the Expected Command and was a receive Mode Command with data, transfer data from Mode Code Data Block for return from function call.
Address 0x0500 - 0x05?? => Return Data 6.2 If the Expected Command was a receive Message Command, transfer data from the Data Block for return from the function call.

6.3 If the Expected Command and was not a Mode Command, set Lookup Table to point to Unexpected Command Data Block otherwise set it to point to the Activity Command Data Block.
0x0400 + 0x???? => Address 0x0140 + 0x???? (command dependent)

6.4 Return from function call.

7 If the command was not the Expected Command repeat from step 4.

The Status Word is left with the Busy Bit set as it was in the function call. The Data Ready Bit is left always cleared. This provides a data not ready response and the option of responding busy or not busy to commands that occur before the protocol can respond.
```
*****************************************************************************/
int ms1553_respond(int *command_pointer, int *message_pointer)
```

9.2 Clear Status Register.
Register Address 0x03 <= 0x0004

9.3 Wait for command transaction to complete then repeat from step 4.
Register Address 0x06 Bit 0 == EOM The Status Word is left as it was in the function call. This provides the option of responding to Activity Commands with a busy or not busy response automatically.

Protocol E
1 Set Status Word bits for Expected Command.
Register Address 0x01 <= Expected Command Status Bits 2.1 If Transmit Mode Command with data expected, transfer data to Mode Code Data Block.
Address 0x0120 + (0x0f & word_count) <= Transfer data 2.2 If Transmit Message Command, transfer data to Data Block.
Address 0x0500 - 0x05?? <= Transfer Data.

3 If Message Command, set up Lookup Table to point to Expected Command Data Block.
0x0500 => Address 0x0140 + 0x???? (command dependent)

4 If Message Command, clear bit in Busy Bit Lookup Table.
Address 0x0240 + (appropriate bit location) <= 0 (appropriate bit)

5 Clear Status Register.
Register Address 0x03 <= 0x0004

6 Wait for command transaction to complete.
Register Address 0x06 Bit 0 == EOM 7.1 If the command was the Expected Command and was a receive Mode Command with data, transfer data from Mode Code Data Block for return from function call.
Address 0x0500 - 0x05?? => Return Data 7.2 If the Expected Command was a receive Message Command, transfer data from the Data Block for return from the function call.

7.3 If the Expected Command and was not a Mode Command, set Lookup Table to point to Unexpected Command Data Block otherwise set it to point to the Activity Command Data Block.
0x0400 + 0x???? => Address 0x0140 + 0x???? (command dependent)

```
{
    LOOKUP_TABLE_TYPE *lookup_table_pointer;    /* Lookup table pointer */
    COMMAND_WORD_TYPE *word_field;              /* Pointer into Command Word */
    STACK_TYPE *memory_stacks;                  /* Pointer to stack pointers */
    RT_MT_DESCRIPTOR_TYPE *descriptor;          /* Pointer into Descriptor */
    MS1553_REGS_TYPE *ms1553_regs;              /* Controller registers pointer */
    INT_STATUS_REG_TYPE *interrupt_status;
    MS1553_BLOCK_STATUS_TYPE *block_status;
    TIMER_REG_TYPE *timer;                  /* Pointer to timer counter register */

    int i, *memory_pointer;
    int word_count, subaddress, status_word;
    int xmit_bit = 0;                       /* Initialized for receive command */
    int command_part;
    int received_command, received_command_part;
    int *command_busy_bit_addr, command_busy_bit;
    int *rpro_stat_busy_bit_addr, rpro_stat_busy_bit;
    int status, timeout;
    int reprogram_status_flag = NO;
    int *message_data_location;             /* Data pointer for unexpected RX data */
    int return_word;

    /* Set up timer pointer */
    timer = (TIMER_REG_TYPE *) &TIMER0;

    /* The Lookup Table is located in RAM in LOOKUP_TABLE_BUFFER */
    lookup_table_pointer = (LOOKUP_TABLE_TYPE *) LOOKUP_TABLE_BUFFER;

    word_field = (COMMAND_WORD_TYPE *) command_pointer;
    memory_stacks = (STACK_TYPE *) (&MS1553MEM + Stack_Pointers);
    ms1553_regs = (MS1553_REGS_TYPE *) &MS1553REGS;

    /* Set up status pointers */
    interrupt_status = (INT_STATUS_REG_TYPE *) &status;
    block_status = (MS1553_BLOCK_STATUS_TYPE *) &status;

    /* Set up command word data */
    word_count = word_field->Data_Word_Count;
    if(!(word_count))                       /* Must account for 32 word messages */
        word_count = 32;
    subaddress = word_field->Subaddress;
    status_word = *message_pointer++;
    command_part = 0x07FF & *command_pointer;
    message_data_location = message_pointer;

    /* Set up message block pointer in descriptor */
    descriptor = (RT_MT_DESCRIPTOR_TYPE *) (&MS1553MEM + Command_Stack) -

    /* Set up time limit for polling to take place */
    timer->Timer_Counter = POLL_TIMEOUT;

    /* Test for protocol in use */
    switch(lookup_table_pointer->Protocol)
    {
        case PROTOCOL_B:                    /* MS-2217 Appendix B */
        case PROTOCOL_C:                    /* MS-2217 Appendix C */
            /* Test for Transmit Command */
```

```
if(word_field->RT_Transmit)
{                                   /* Move data to Data Block */
      xmit_bit = 0x20;              /* Set bit for Lookup Table */
      memory_pointer = &MS1553MEM + RT_Command_Data_Block;
      for(i = 1; i <= word_count; i++)
            *memory_pointer++ = *message_pointer++;
}

/* Set Lookup Table to point to Expected Command Data Block */
memory_pointer = (int *) (&MS1553MEM + RT_RX_Lookup_Table
      + xmit_bit + subaddress);
*memory_pointer = RT_Command_Data_Block;

/* Determine Busy Bit Lookup Table locations for active commands */
/* Expected command */
command_busy_bit_addr = (int *) (&MS1553MEM + RT_Busy_Bit_Table
      + (command_part >> 9));
i = (0x000F & (command_part >> 5));
command_busy_bit = 0x0001;
while(i--)
      command_busy_bit = (command_busy_bit << 1);
/* Reprogram Status command */
rpro_stat_busy_bit_addr = (int *) (&MS1553MEM + RT_Busy_Bit_Table
      + (REPROGRAM_STATUS_COMMAND >> 9));
i = (0x000F & (REPROGRAM_STATUS_COMMAND >> 5));
rpro_stat_busy_bit = 0x0001;
while(i--)
      rpro_stat_busy_bit = (rpro_stat_busy_bit << 1);

/* Process commands until time expires */
timeout = NOT_POLLED;               /* Initial reason for time out */
while(timer->Timer_Counter)
{
      /* Expecting to receive an Activity command */
      if(command_part == ACTIVITY)
      {
            /* Not sending service requests (checking status only) */
            if(status_word & BUSY_STATUS)
                  ms1553_regs->Config_Reg_1 &= ~Clear_Busy_Bit;
            else
                  ms1553_regs->Config_Reg_1 |= Clear_Busy_Bit;

            /* Clear busy bits in Lookup Table (Activity is clear) */
            *rpro_stat_busy_bit_addr &= ~rpro_stat_busy_bit;
      }
      else
      {
            /* Sending service request */
            /* Transfer Command to Activity Command Data Block */
            memory_pointer = &MS1553MEM + RT_Activity_Data_Block;
            *memory_pointer = command_part;

            /* Issue a service request for the Expected Command */
            /* Set Status Word bit for Service Request */
            ms1553_regs->Config_Reg_1 |= Clear_Busy_Bit;
            ms1553_regs->Config_Reg_1 &= ~Clear_Service_Req_Bit;
      }
     /* Clear Status Register */
     ms1553_regs->Ctrl_Register_Pointer = Clear_Status_Register;

     /* Wait for command transaction to complete */
     do
     {     /* Read the status register */
           status = ms1553_regs->Interrupt_Status;
           if(interrupt_status->Format_Error)  /* Test for Error */
           {
                 /* Return error */
                 status = descriptor->Block_Status_Word;
                 if(block_status->Loop_Test_Failure)
                       return LOOP_TEST_ERROR;       /* Loop Test error */
                 return MESSAGE_FAULT;               /* Message error */
           }

           /* Test for expired time */
           if(!(timer->Timer_Counter))
                 return timeout;

     } while(!(interrupt_status->End_Of_Message));

     /* Get the last command */
     received_command = ms1553_regs->RT_Last_Command;
     received_command_part = 0x07ff & received_command;
```

```
/* Set busy bits back to busy in Lookup Table */
*rpro_stat_busy_bit_addr |= rpro_stat_busy_bit;

timeout = ONLY_POLLED;  /* If timeout occurs RRT was polled */

/* Test for the Expected Command */
if(ACTIVITY == received_command_part)
{
      if(command_part == ACTIVITY)
      {
            /* Set Lookup Table Activity Command pointer back to
                  point to Activity Command Data Block */
            memory_pointer = (int *) (&MS1553MEM
                  + RT_RX_Lookup_Table + xmit_bit + subaddress);
            *memory_pointer = RT_Activity_Data_Block;

            return NO_ERROR;  /* Status word bits left as set */
      }
}
else if((REPROGRAM_STATUS_COMMAND == received_command_part)
      && (command_part != ACTIVITY))
{
            reprogram_status_flag = YES;
}
else if(command_part != received_command_part)
{
      /* Clear Status Word Service Request bit */
      ms1553_regs->Config_Reg_1 |= ~Clear_Service_Req_Bit;

      /* Return unexpected command and data */
      if(!(word_field->RT_Transmit))
      {
            word_field = (COMMAND_WORD_TYPE *) &received_command;
            word_count = word_field->Data_Word_Count;
            if(!(word_count)) /* Account for 32 word messages */
                  word_count = 32;

            /* Transfer data for return from function call */
            /* Test for Mode Command */
            if(!(word_field->Subaddress))       /* Mode Command */
            {
                  /* Test for data word */
                  if((word_count & 0x1f) > 0x0F)      /* data */
                  {
                        memory_pointer = (int *) (&MS1553MEM
                              + RT_Mode_Code_RX_Data
                              + (0x000F & word_count));
                        *message_data_location = 0xffff
                              & (*memory_pointer);
                  }
            }
            else                              /* Not Mode Command */
            {
                  memory_pointer = (int *) (&MS1553MEM
                        + RT_RX_Data_Block);
                  for(i = 1; i <= word_count; i++)
                        *message_data_location++ = 0xffff
                              & (*memory_pointer++);
            }
      }

      return (UNEXPECTED_COMMAND + received_command);
}

/* Clear Command from Activity Command Data Block */
memory_pointer = &MS1553MEM + RT_Activity_Data_Block;
*memory_pointer = 0;

/* Set Status Word bits for Expected Command */
/* Only bits used are Busy and Service Request */
if(reprogram_status_flag == YES)
{
                              /* Expect Reprogram Status command */
      ms1553_regs->Config_Reg_1 |= Clear_Busy_Bit;
      ms1553_regs->Config_Reg_1 |= Clear_Service_Req_Bit;
}
else                          /* Expect requested command */
{
      if(status_word & BUSY_STATUS)
            ms1553_regs->Config_Reg_1 &= ~Clear_Busy_Bit;
      else
            ms1553_regs->Config_Reg_1 |= Clear_Busy_Bit;
      if(status_word & SERVICE_STATUS)
```

```
            ms1553_regs->Config_Reg_1 &= ~Clear_Service_Req_Bit;
        else
            ms1553_regs->Config_Reg_1 |= Clear_Service_Req_Bit;
    }
    do                                   /* do while statement */
  {
        /* Clear busy bits in Lookup Table */
        *command_busy_bit_addr &= ~command_busy_bit;
        *rpro_stat_busy_bit_addr &= ~rpro_stat_busy_bit;

        /* Clear Status Register */
        ms1553_regs->Ctrl_Register_Pointer = Clear_Status_Register;

        /* Wait for command transaction to complete */
        do
        {     /* Read the status register */
              status = ms1553_regs->Interrupt_Status;
              if(interrupt_status->Format_Error)  /* Test Errors */
              {
                    /* Return error */
                    status = descriptor->Block_Status_Word;
                    if(block_status->Loop_Test_Failure)
                          return LOOP_TEST_ERROR; /* Loop Test error */
                    return MESSAGE_FAULT;         /* Message error */
              }

              /* Test for expired time */
              if(!(timer->Timer_Counter))
                    return timeout;

        } while(!(interrupt_status->End_Of_Message));

        /* Get the last command */
        received_command = ms1553_regs->RT_Last_Command;
        received_command_part = 0x07ff & received_command;

        /* Set busy bits back to busy in Lookup Table */
        *command_busy_bit_addr |= command_busy_bit;
        *rpro_stat_busy_bit_addr |= rpro_stat_busy_bit;

        if(ACTIVITY != received_command_part)
        {
              /* Clear Command in Activity Command Data Block */
              memory_pointer = &MS1553MEM + RT_Activity_Data_Block;
              *memory_pointer = Zero_Data;

              /* Set Lookup Table to Unexpected Command Data Block */
              memory_pointer = (int *) (&MS1553MEM
                    + RT_RX_Lookup_Table + xmit_bit + subaddress);
              if(xmit_bit)
                    *memory_pointer = RT_TX_Data_Block;
              else
                    *memory_pointer = RT_RX_Data_Block;

              /* Test for expected command */
              if(command_part == received_command_part)
              {
                    /* Test for receive command */
                    if(!xmit_bit)
                    {
                          /* Transfer data for return from function */
                          memory_pointer = (int *) (&MS1553MEM
                                + RT_Command_Data_Block);
                        for(i = 1; i <= word_count; i++)
                              *message_pointer++ = 0xffff
                                    & (*memory_pointer++);
                    }
                    return NO_ERROR;
              }
              else        /* Return unexpected command and data */
              {
                    word_field = (COMMAND_WORD_TYPE *)
                          &received_command;
                    if(!(word_field->RT_Transmit))
                    {
                          word_count = word_field->Data_Word_Count;
                          if(!(word_count))       /* 32 word messages? */
                                word_count = 32;

                          /* Transfer data for return from function */
                          /* Test for Mode Command */
```

```
                                if(!(word_field->Subaddress))
                                {
                                        /* Test for data word */
                                        if((word_count & 0x1f) > 0x0F) /* data */
                                        {
                                                memory_pointer = (int *)(&MS1553MEM

                                                        + RT_Mode_Code_RX_Data
                                                        + (0x000F & word_count));
                                                *message_data_location = 0xffff
                                                        & (*memory_pointer);
                                        }
                                }
                                else                            /* Not Mode Command */
                                {
                                        memory_pointer = (int *) (&MS1553MEM
                                                + RT_RX_Data_Block);
                                        for(i = 1; i <= word_count; i++)
                                                *message_data_location++ = 0xffff
                                                        & (*memory_pointer++);
                                }
                        }
                        return (UNEXPECTED_COMMAND
                                + received_command_part);
                }
        }

        } while(reprogram_status_flag == YES);
    }
    break;
case PROTOCOL_E:                                        /* MS-2217 Appendix E */
    /* Set Status Word bits for Expected Command */
    /* Only bits used are Busy and Data Ready (Service Request) */
    if(status_word & BUSY_STATUS)
        ms1553_regs->Config_Reg_1 &= ~Clear_Busy_Bit;
    else
        ms1553_regs->Config_Reg_1 |= Clear_Busy_Bit;
    if(status_word & SERVICE_STATUS)
        ms1553_regs->Config_Reg_1 &= ~Clear_Data_Ready_Bit;
    else
        ms1553_regs->Config_Reg_1 |= Clear_Data_Ready_Bit;

    /* Test for Transmit Command */
    if(word_field->RT_Transmit)
    {
        xmit_bit = 0x20;                /* Set bit for Lookup Table */
        /* Test for Mode Command */
        if(!(subaddress))               /* Mode Command */
        {
            /* Test for data word */
            if((word_count & 0x1f) > 0x0F)
            {                                       /* Move data to memory */
                memory_pointer = (int *) (&MS1553MEM
                    + RT_Mode_Code_TX_Data + (0x000F & word_count));
                *memory_pointer = *message_pointer;
            }
        }
        else
        {
            /* Transfer data to Command Data Block */
            memory_pointer = &MS1553MEM + RT_Command_Data_Block;
            for(i = 1; i <= word_count; i++)
                *memory_pointer++ = *message_pointer++;
        }
    }

    /* Test for message command */
    if(subaddress)                                  /* Not Mode Command */
    {
        /* Set Lookup Table to point to Expected Command Data Block */
        memory_pointer = (int *) (&MS1553MEM + RT_RX_Lookup_Table
            + xmit_bit + subaddress);
        *memory_pointer = RT_Command_Data_Block;

        /* Determine Busy Bit Lookup Table location */
        command_busy_bit_addr = (int *)
            (&MS1553MEM + RT_Busy_Bit_Table + (command_part >> 9));
        i = (0x000F & (command_part >> 5));
        command_busy_bit = 0x0001;
        while(i--)
            command_busy_bit = (command_busy_bit << 1);
```

```
        /* Clear bit in Busy Bit Lookup Table */
        *command_busy_bit_addr &= ~command_busy_bit;
}

/* Process commands until time expires */
timeout = NOT_POLLED;            /* Initial reason for time out */
while(timer->Timer_Counter)
{
        /* Clear Status Register */
        ms1553_regs->Ctrl_Register_Pointer = Clear_Status_Register;

        /* Wait for command transaction to complete */
        do
        {       /* Read the status register */
                status = ms1553_regs->Interrupt_Status;
                if(interrupt_status->Format_Error)  /* Test Error */
                {
                        /* Return error */
                        status = descriptor->Block_Status_Word;
                        if(block_status->Loop_Test_Failure)
                                return LOOP_TEST_ERROR; /* Loop Test error */
                        return MESSAGE_FAULT;          /* Message error */
                }

                /* Test for expired time */
                if(!(timer->Timer_Counter))
                        return timeout;

        } while(!(interrupt_status->End_Of_Message));

        /* Get the last command */
        received_command = ms1553_regs->RT_Last_Command;

        if(E_STATUS_COMMAND != (0x07ff & received_command))
        {
                /* Clear Data Ready bit (Service Request) */
                /* Busy bit remains as set upon entry to function */
                ms1553_regs->Config_Reg_1 |= Clear_Data_Ready_Bit;

                /* Test for Expected Message Command */
                if(subaddress)                  /* Not Mode Command */
                {
                        /* Set Lookup Table to Unexpected Command Data Block */
                        memory_pointer = (int *) (&MS1553MEM
                                + RT_RX_Lookup_Table + xmit_bit + subaddress);
                        if(xmit_bit)
                                *memory_pointer = RT_TX_Data_Block;
                        else
                                *memory_pointer = RT_RX_Data_Block;

                        /* Set busy in Lookup Table for Expected Command */
                        *command_busy_bit_addr |= command_busy_bit;
                }

                /* Test for the Expected Command */
                if(*command_pointer == received_command)
                {
                        /* Test for Receive Command */
                        if(!xmit_bit)
                        {
                                /* Test for Mode Command */
                                if(!(subaddress))             /* Mode Command */
                                {
                                        /* Test for data word */
                                        if((word_count & 0x1f) > 0x0F)      /* data */
                                        {
                                                memory_pointer = (int *) (&MS1553MEM
                                                        + RT_Mode_Code_RX_Data
                                                        + (0x000F & word_count));
                                                *message_pointer = 0xffff
                                                        & (*memory_pointer);
                                        }
                                }
                                else                              /* Not Mode Command */
                                {
                                        /* Transfer data for return from function */
                                        memory_pointer = (int *) (&MS1553MEM
                                                + RT_Command_Data_Block);
                                        for(i = 1; i <= word_count; i++)
                                                *message_pointer++ = 0xffff
                                                        & (*memory_pointer++);
```

```
                        }
                    }
                    return NO_ERROR;
                }
                else
                {
                    word_field = (COMMAND_WORD_TYPE *) &received_command;
                    if(!(word_field->RT_Transmit))
                    {
                        word_count = word_field->Data_Word_Count;
                        if(!(word_count))               /* 32 word messages? */
                            word_count = 32;
                        /* Test for Mode Command */
                        if(!(word_field->Subaddress)) /* Mode Command */
                        {
                            /* Test for data word */
                            if((word_count & 0x1f) > 0x0F)      /* data */
                            {
                                memory_pointer = (int *) (&MS1553MEM
                                    + RT_Mode_Code_RX_Data
                                    + (0x000F & word_count));
                                *message_data_location = 0xffff
                                    & (*memory_pointer);
                            }
                        }
                        else                            /* Not Mode Command */
                        {
                            /* Transfer data for return from function */
                            memory_pointer = (int *) (&MS1553MEM
                                + RT_RX_Data_Block);
                            for(i = 1; i <= word_count; i++)
                                *message_data_location++ = 0xffff
                                    & (*memory_pointer++);
                        }
                    }
                    return (UNEXPECTED_COMMAND + received_command);
                }
            }

            /* Reason if timeout occurs */
            timeout = ONLY_POLLED;
        }
        break;
    case PROTOCOL_G:                            /* MS-2217 Appendix G */
        /* Test for message command */
        if(subaddress)                          /* Not Mode Command */
        {
            /* Test for Transmit Command */
            if(word_field->RT_Transmit)
            {                               /* No MS-1553A Mode Codes contain data */
                xmit_bit = 0x20;            /* Set bit for Lookup Table */
                /* Transfer data to Command Data Block */
                memory_pointer = &MS1553MEM + RT_Command_Data_Block;
                for(i = 1; i <= word_count; i++)
                    *memory_pointer++ = *message_pointer++;
            }

            /* Set Lookup Table to point to Expected Command Data Block */
            memory_pointer = (int *) (&MS1553MEM + RT_RX_Lookup_Table
                + xmit_bit + subaddress);
            *memory_pointer = RT_Command_Data_Block;
        }

        /* Set Status Word bits for Expected Command */
        /* Only bits used are Busy and Data Ready (Alternate Status
            Word bits (Instrumentation and Service Request)) */
        ms1553_regs->Config_Reg_1 = (0xF000 & ms1553_regs->Config_Reg_1)
            + ((0x07ff & status_word) << 1);

        /* Process commands until time expires */
        timeout = NOT_POLLED;                   /* Initial reason for time out */
        while(timer->Timer_Counter)
        {
            /* Clear Status Register */
            ms1553_regs->Ctrl_Register_Pointer = Clear_Status_Register;

            /* Wait for command transaction to complete */
            do
            {   /* Read the status register */
                status = ms1553_regs->Interrupt_Status;
                if(interrupt_status->Format_Error)  /* Test Error */
                {
```

```
                /* Return error */
                status = descriptor->Block_Status_Word;
                if(block_status->Loop_Test_Failure)
                      return LOOP_TEST_ERROR; /* Loop Test error */
                return MESSAGE_FAULT;          /* Message error */
           }

           /* Test for expired time */
           if(!(timer->Timer_Counter))
                return timeout;

     } while(!(interrupt_status->End_Of_Message));

     /* Get the last command */
     received_command = ms1553_regs->RT_Last_Command;

     if(G_STATUS_COMMAND != (0x07ff & received_command))
     {
           /* Clear Data Ready bit (Service Request) */
           /* All other status bits left as set upon entry */
           ms1553_regs->Config_Reg_1 &= ~Set_G_Data_Ready_Bit;

           /* Test for Expected Message Command */
           if(subaddress)                        /* Not Mode Command */
           {
                 /* Set Lookup Table to Unexpected Command Data Block */
                 memory_pointer = (int *) (&MS1553MEM
                       + RT_RX_Lookup_Table + xmit_bit + subaddress);
                 if(xmit_bit)
                       *memory_pointer = RT_TX_Data_Block;
                 else
                       *memory_pointer = RT_RX_Data_Block;
           }

           /* Test for the Expected Command */
           if(*command_pointer == received_command)
           {
                 /* Test for Receive Command */
                 if(subaddress && !xmit_bit)        /* Not Mode Command */
                 {
                       /* Transfer data for return from function */
                       memory_pointer = (int *) (&MS1553MEM
                             + RT_Command_Data_Block);
                       for(i = 1; i <= word_count; i++)
                             *message_pointer++ = 0xffff
                                   & (*memory_pointer++);
                 }
                 return NO_ERROR;
           }
           else
           {
                 word_field = (COMMAND_WORD_TYPE *) &received_command;
                 if(word_field->Subaddress
                       && !(word_field->RT_Transmit)) /* Not Mode Cmd */
                 {
                       word_count = word_field->Data_Word_Count;
                       if(!(word_count))              /* 32 word message? */
                             word_count = 32;

                       /* Transfer data for return from function */
                       memory_pointer = (int *) (&MS1553MEM
                             + RT_RX_Data_Block);
                       for(i = 1; i <= word_count; i++)
                             *message_data_location++ = 0xffff
                                   & (*memory_pointer++);
                 }

                 return (UNEXPECTED_COMMAND + received_command);
           }
     }

     /* Reason if timeout occurs */
     timeout = ONLY_POLLED;
  }
  break;
default:
  /* Illegal protocol defined for an RT */
  return PROTOCOL_SELECT;
  break;
```

```
    }

    return timeout;
}

/*****************************************************************************
Module Name:    ms1553_monitor
Number/Version:
History:
          Date        Rev  Author        Description
          23-Mar-1993 0.0  C. Houlberg   Baseline

Abstract:
     This function monitors the MS-1553 Bus and returns
     NO_ACTIVITY if none is found on either Bus A or Bus B.
     If activity is found the function returns NO_ERROR.

     Prior to entering this routine the bus controller must
     be set up to operate as an MT.  To determine if the
     bus is active the MT Command Stack and MT Data Stack
     pointers are initialized.  The controller is started
     and the MT Command Stack pointer is monitored for a
     captured.  The pointer will change when a message is
     stored.  If there is no change in the pointer within
     a predetermined time the routine will return NO_ACTIVITY.
     After capturing a message or determining no activity the
     controller will be set to stop following any message.

     Address 0x0102 <= 0x0C00          MT Command Stack Pointer
     Address 0x0103 <= 0x0D00          MT Data Stack Pointer
     Register 0x03 <= 0x0002           MT Start
     Register 0x03 <= 0x0040           MT Stop On Message
*****************************************************************************/
int ms1553_monitor(void)
{
     STACK_TYPE *memory_stacks;              /* Pointer to stack pointers */
     MS1553_REGS_TYPE *ms1553_regs;          /* Controller registers pointer */
     TIMER_REG_TYPE *timer;                  /* Pointer to timer counter register */
     INT_STATUS_REG_TYPE *interrupt_status;  /* Pointer into status register */
     int status;                             /* Location to store status */

     memory_stacks = (STACK_TYPE *) (&MS1553MEM + Stack_Pointers);
     ms1553_regs = (MS1553_REGS_TYPE *) &MS1553REGS;
     timer = (TIMER_REG_TYPE *) &TIMER0;

     /* Initialize MT Command and Data stacks */
     memory_stacks->MT_Command_Stack_Pointer = MT_Command_Stack_Start;
     memory_stacks->MT_Data_Stack_Pointer = MT_Data_Stack_Start;

     /* Establish pointer to register storing interrupt status */
     interrupt_status = (INT_STATUS_REG_TYPE *) &status;

     /* Clear status register and start controller */
     ms1553_regs->Ctrl_Register_Pointer = Clear_Status_Register;
     ms1553_regs->Ctrl_Register_Pointer = Start_Controller;

     /* Wait for a captured message (stack pointer will change) */
     timer->Timer_Counter = POLL_TIMEOUT;
     do
     {
          status = ms1553_regs->Interrupt_Status;   /* Read the status register */
          /* Test for time limit */
          if(!timer->Timer_Counter)           /* Timed Out, No Activity */
               return NO_ACTIVITY;

     } while(!(interrupt_status->End_Of_Message));

     /* Stop Monitor Activity */
     ms1553_regs->Ctrl_Register_Pointer = Stop_Following_Message;

     return ACTIVE_BUS;                           /* Indication of an active bus */
}

/*****************************************************************************
Module Name:    ms1553_BC_setup
Number/Version:
History:
          Date        Rev  Author        Description
          23-Mar-1993 0.0  C. Houlberg   Baseline
```

```
Abstract:
     This function sets up the BU61590 controller
     to operate as a Bus Controller (BC).

     Upon entry to this routine the controller was operating as
     either a Monitor (MT) or Remote Terminal (RT). If previously
     set up as an MT and no activity was detected on either Bus A
     or Bus B the BC will be set up to operate on Bus A. If
     activity was detected or the controller was set up as an RT then
     the BC will be set up to operate on the active bus which will
     be the bus activity was last detected on by the MT or RT.

     To accomplish this, the controller's Configuration Register #1
     will be tested for the MT or RT mode. If it is in the MT mode
     the controller's Monitor Mode Block Status Word will be tested
     for the active bus. The location of the Block Status Word will
     be obtained from the Monitor Command Stack Pointer A. If it is
     in the RT mode the controller's RT Mode Block Status Word will
     be tested for the active bus. The location of the Block Status
     Word will be obtained from the RT Command Stack Pointer A.

     Configuration Register #1:                       Register 0x01
     Monitor Command Stack Pointer A:                 Address 0x0102
     RT Command Stack Pointer A:                      Address 0x0100

     Register 0x01 <= 0x0000                          Using Memory Area A
     Register 0x04 <= 0x0010 or 0x0090                Operating over Bus B or Bus A
************************************************************************************/
void ms1553_BC_setup(int activity)
{
     MS1553_REGS_TYPE *ms1553_regs;                   /* Controller registers pointer */
     STACK_TYPE *memory_stacks;                       /* Pointer to stack pointers */
     CONFIG_REG_1_TYPE *config_reg_1;                 /* Pointer into register 1 */
     RT_MT_DESCRIPTOR_TYPE *descriptor;               /* Pointer into descriptor block */
     MS1553_BLOCK_STATUS_TYPE *block_status;          /* Pointer into block status */
     LOOKUP_TABLE_TYPE *lookup_table_pointer;         /* Lookup table pointer */
     int *memory_pointer;                             /* Memory pointer */

     int data, command_stack_pointer;

     /* The Lookup Table is located in RAM in LOOKUP_TABLE_BUFFER */
     lookup_table_pointer = (LOOKUP_TABLE_TYPE *) LOOKUP_TABLE_BUFFER;

     ms1553_regs = (MS1553_REGS_TYPE *) &MS1553REGS;
     memory_stacks = (STACK_TYPE *) (&MS1553MEM + Stack_Pointers);

     /* Get Configuration register #1 data for testing */
     data = ms1553_regs->Config_Reg_1;
     config_reg_1 = (CONFIG_REG_1_TYPE *) &data;

     /* Test if operating as an MT */
     if(config_reg_1->Mode == MT_Mode)                /* Operating as an MT */
          command_stack_pointer = memory_stacks->MT_Command_Stack_Pointer;
     else                                             /* Must be operating as a RT */
          command_stack_pointer = memory_stacks->Command_Stack_Pointer;

     descriptor = (RT_MT_DESCRIPTOR_TYPE *)
          (&MS1553MEM + command_stack_pointer);

     data = descriptor->Block_Status_Word;
     block_status = (MS1553_BLOCK_STATUS_TYPE *) &data;   /* Retrieve the status word */

     /* Set up as BC */
     ms1553_regs->Config_Reg_1 = Set_BC_Mode;

     /* Set up BC Control Word (register and memory location)
          for active MS-1553B bus */
     memory_pointer = (int *) (&MS1553MEM + BC_Message_Block);
     if(activity == NO_ACTIVITY)                      /* Start on Bus A */
     {
          ms1553_regs->Control_Word_Reg = Active_Bus_A;
          *memory_pointer = Active_Bus_A;
     }
     else if(block_status->Bus_B)                     /* Operating on Bus B */
     {
          ms1553_regs->Control_Word_Reg = Active_Bus_B;
          *memory_pointer = Active_Bus_B;
     }
     else
     {                                                /* Operating on Bus A */
          ms1553_regs->Control_Word_Reg = Active_Bus_A;
          *memory_pointer = Active_Bus_A;
```

```
    }

    /* Ensure set up for proper MS-1553 type (A or B) */
    /* Protocol F is the only BC protocol using MS1553A mode codes */
    if((lookup_table_pointer->Protocol == PROTOCOL_F_SMS_CORE)
          || (lookup_table_pointer->Protocol == PROTOCOL_F_SMS_EEPROM)
          || (lookup_table_pointer->Protocol == PROTOCOL_F_SDC))
    {
          ms1553_regs->Control_Word_Reg |= MS1553A_Select;
          *memory_pointer |= MS1553A_Select;
    }

    return;
}

/*****************************************************************************
Module Name:    ms1553_RT_setup
Number/Version:
History:
          Date        Rev  Author          Description
          23-Mar-1993 0.0  C. Houlberg     Baseline

Abstract:
      This function sets up the BU61590 controller
      to operate as a Remote Terminal (RT).

      Upon entry to this routine the controller could have been
      operating as either a Bus Controller (BC) or Monitor Terminal
      (MT).  Regardless which mode the controller is in it will
      now be directly set up to operate as an RT.  The controller
      will be set up with pointers for all commands pointing to data
      blocks established for Unexpected RX Commands, Unexpected TX
      Commands, Broadcast Commands, Mode Commands, and the Expected
      Command.  Only one command will be the Expected Command and the
      Data Block pointer will be initialized for that command upon
      entry to the ms1553_respond routine.  The pointer will be set
      to point back to the Unexpected ?X Command data block prior to
      exiting the ms1553_respond routine.  To provide the proper
      response to a command following this setup the controller will
      be set up specifically for the Mil-Std-2217 Protocol to be used.

      To accomplish this the Lookup Table for the active file in the
      IC Memory Card will be tested for the Protocol.  That Protocol
      will be used to reference a table of Status Words.  The
      appropriate Status Word will then be used to initialize the
      appropriate registers and memory locations indicated by the
      Protocol.  The remaining initialization can be deduced from
      the following:

      Configuration Register #1:          Register 0x01
      RT Mode Code Interrupt Table:       Address 0x0108 - 0x010F
      RT Mode Code Data:                  Address 0x0110 - 0x013F
      RT Lookup Table (RX Commands):      Address 0x0140 - 0x015F
      RT Lookup Table (TX Commands):      Address 0x0160 - 0x017F
      RT Lookup Table (Broadcast):        Address 0x0180 - 0x019F
      RT Lookup Table (Control Word):     Address 0x01A0 - 0x01BF
      Unexpected Command TX Data Block:   Address 0x0430 - 0x045F

      Register 0x01 <= 0x8000 + 0x????    0x???? = Busy or Not Ready Status
      Address 0x0100 <= 0x0000            Command Stack Pointer
      Address 0x0140 - 0x015F <= 0x0400   Unexpected Receive Command Pointer
      Address 0x0160 - 0x017F <= 0x0430   Unexpected Transmit Command Pointer
      Address 0x0180 - 0x019F <= 0x0460   Unexpected Broadcast Command Pointer
      Address 0x01A0 - 0x01BF <= 0x0000   Subaddress Control Word (SACW)
      Address 0x0430 - 0x045F <= 0x0000   Unexpected Transmit Command Data Block
*****************************************************************************/
int ms1553_RT_setup(void)
{
      LOOKUP_TABLE_TYPE *lookup_table_pointer;  /* Lookup table pointer */
      PPI1_REG_TYPE *ms1553_discretes;          /* Pointer to MS-1553 discretes */
      MS1553_REGS_TYPE *ms1553_regs;            /* Controller registers pointer */
      STACK_TYPE *memory_stacks;                /* Pointer to stack pointers */

      int parity, RT_address;
      int RT_address_with_parity;
      int busy_status_word, return_word, i;
      int *memory_pointer;                      /* Pointer to Controller memory */
      int block_location;
      int busy_bit, *busy_bit_addr;

      /* The Lookup Table is located in RAM in LOOKUP_TABLE_BUFFER */
      lookup_table_pointer = (LOOKUP_TABLE_TYPE *) LOOKUP_TABLE_BUFFER;
```

```
/* Set up remaining pointers */
ms1553_discretes = (PPI1_REG_TYPE *) &PPI1;
ms1553_regs = (MS1553_REGS_TYPE *) &MS1553REGS;
memory_stacks = (STACK_TYPE *) (&MS1553MEM + Stack_Pointers);

/* Establish the RRT's RT address */
RT_address = lookup_table_pointer->RRT_RT_Address;
for(i = 1, parity = 1; i < 0x20; (i = i << 1))  /* Count ones */
      if(i & RT_address)
            parity++;
/* Parity bit is set when the number of 1's in the address is even */
RT_address_with_parity = RT_address + ((parity & 0x01) << 5);
ms1553_discretes->RRT_RT_Address = RT_address_with_parity;

/* Ensure set up for Mil-Std-1553B mode codes and status word */
ms1553_regs->Config_Reg_3 &= ~MS1553A_Mode_Codes;
ms1553_regs->Config_Reg_3 &= ~Alternate_Status;

/* Set RT Command Stack Pointer to point to the Command Stack */
memory_stacks->Command_Stack_Pointer = Command_Stack;

/* Set up RX, TX, and BCST Data Block pointers */
memory_pointer = (int *) (&MS1553MEM + RT_RX_Lookup_Table);
for(i = 0; i < RT_Table_Size; i++)
      *memory_pointer++ = RT_RX_Data_Block;
for(i = 0; i < RT_Table_Size; i++)
      *memory_pointer++ = RT_TX_Data_Block;
for(i = 0; i < RT_Table_Size; i++)
      *memory_pointer++ = RT_BCST_Data_Block;
/* Set up SACW Data Block */
for(i = 0; i < RT_Table_Size; i++)
      *memory_pointer++ = SACW_Block_Data;

/* Set up Unexpected TX Command Data Block */
memory_pointer = (int *) (&MS1553MEM + RT_TX_Data_Block);
for(i = 0; i < Data_Block_Size; i++)
      *memory_pointer++ = Zero_Data;

/* Set up Mode Code blocks */
memory_pointer = (int *) (&MS1553MEM + RT_Mode_Code_Int_Table);

for(i = 0; i < Mode_Code_Int_Size; i++)
      *memory_pointer++ = Zero_Data;
memory_pointer = (int *) (&MS1553MEM + RT_Mode_Code_TX_Data);
for(i = 0; i < Mode_Code_Table_Size; i++)
      *memory_pointer++ = Zero_Data;

/* Set all commands for Auto busy response if used */
busy_bit_addr = (int *) (&MS1553MEM + RT_Busy_Bit_Table);
for(i = 0; i < RT_Busy_Table_Size; i++)
      *busy_bit_addr = 0xFFFF;                /* Everything busy */

switch(lookup_table_pointer->Protocol)
{
      case PROTOCOL_B:  /* MS-2217 Appendix B (could start out as an RT) */
      case PROTOCOL_C:  /* MS-2217 Appendix C (always an RT) */
            /* Set the status word to respond not busy to Activity Commands */
            ms1553_regs->Config_Reg_1 = Set_RT_Mode_C;

            /* Set Lookup Table to point to Activity Command Data Block */
            block_location = (0x003F & (ACTIVITY >> 5));
            memory_pointer = (int *) (&MS1553MEM + RT_RX_Lookup_Table
                  + block_location);
            *memory_pointer = RT_Activity_Data_Block;

            /* Clear the data word in the Activity Data Block */
            memory_pointer = (int *) (&MS1553MEM + RT_Activity_Data_Block);
            *memory_pointer = Zero_Data;

            /* Determine Busy Bit Lookup Table location for Activity Command */
            busy_bit_addr = (int *) (&MS1553MEM + RT_Busy_Bit_Table
                  + (ACTIVITY >> 9));
            i = (0x000F & (ACTIVITY >> 5));
            busy_bit = 0x0001;
            while(i--)
                  busy_bit = (busy_bit << 1);
            *busy_bit_addr &= ~busy_bit;                /* Clear the busy bit */
            break;
      case PROTOCOL_E:          /* MS-2217 Appendix E (always an RT) */
            /* Set the status word to respond busy to all commands */
            ms1553_regs->Config_Reg_1 = Set_RT_Mode_E;
```

```
            /* Clear the Busy Bit Lookup Table location for Mode Commands */
            busy_bit_addr = (int *) (&MS1553MEM + RT_Busy_Bit_Table
                  + 0x0000);                       /* Receive Mode Command Address */
            *busy_bit_addr = 0xFFFE;      /* Receive Mode Command bit cleared */
            busy_bit_addr = (int *) (&MS1553MEM + RT_Busy_Bit_Table
                  + 0x0002);                       /* Transmit Mode Command Address */
            *busy_bit_addr = 0xFFFE;      /* Transmit Mode Command bit cleared */
            break;
      case PROTOCOL_G:         /* MS-2217 Appendix G (always an RT) */
            /* Set up for MS-1553A Mode Codes and alternate status word */
            ms1553_regs->Config_Reg_3 |= MS1553A_Mode_Codes;
            ms1553_regs->Config_Reg_3 |= Alternate_Status;

            /* Set the status word to respond busy to all commands */
            ms1553_regs->Config_Reg_1 = Set_RT_Mode_G;      /* Alt Status Word */
            break;

      default:            /* Illegal protocol defined for an RT */
            return PROTOCOL_SELECT;
            break;
    }

    return NO_ERROR;
}

/***************************************************************************
Module Name:    ms1553_MT_setup
Number/Version:
History:
          Date         Rev   Author           Description
          23-Mar-1993 0.0    C. Houlberg      Baseline

Abstract:
    This function sets up the BU61590 controller
    to operate as a Monitor Terminal (MT).

    Upon entry to this routine the controller could have been
    operating as either a Bus Controller (BC) or Remote Terminal
    (RT).  Regardless which mode the controller is in it will
    now be directly set up to operate as an MT by initializing
    the following:

    Configuration Register #1:               Register 0x01
    MT Command Stack Pointer A:              Address 0x0102
    MT Data Stack Pointer A:                 Address 0x0103
    MT Lookup Table:                         Address 0x0280 - 0x02FF

    Register 0x01 <= 0x5000                  Using Memory Area A
    Address 0x0102 <= 0x0C00                 Command Stack
    Address 0x0103 <= 0x0D00                 Data Stack
    Address 0x0280 - 0x02FF <= 0xFFFF        Lookup Table
***************************************************************************/
void ms1553_MT_setup(void)
{
    MS1553_REGS_TYPE *ms1553_regs;                /* Controller registers pointer */
    STACK_TYPE *memory_stacks;                    /* Pointer to stack pointers */

    int i, *lookup_table;

    ms1553_regs = (MS1553_REGS_TYPE *) &MS1553REGS;
    ms1553_regs->Config_Reg_1 = Set_MT_Mode;

    /* Set up for Mil-Std-1553B mode_codes and status word */
    ms1553_regs->Config_Reg_3 &= ~MS1553A_Mode_Codes;
    ms1553_regs->Config_Reg_3 &= ~Alternate_Status;

    memory_stacks = (STACK_TYPE *) (&MS1553MEM + Stack_Pointers);
    memory_stacks->MT_Command_Stack_Pointer = MT_Command_Stack_Start;
    memory_stacks->MT_Data_Stack_Pointer = MT_Data_Stack_Start;

    lookup_table = (int *) (&MS1553MEM + MT_Lookup_Table);

    for(i = 0; i < MT_Table_Size; i++)
         *(lookup_table + i) = Monitor_All;
    return;
}

/***************************************************************************
Module Name:    ms1553_change_bus_channel
Number/Version:
History:
          Date         Rev   Author           Description
          6-Aug-1993   0.0   C. Houlberg      Baseline
```

```
Abstract:
      This function causes the BU61590 controller to change
      operation to the alternate bus channel (either A or B).

      Upon entry to this routine the controller must be operating
      as a Bus Controller (BC).

      Control Word Register:                        Register 0x04
      BC Message Block:                             Address 0x0108

*******************************************************************************/
void ms1553_change_bus_channel(void)
{
      MS1553_REGS_TYPE *ms1553_regs;              /* Controller registers pointer */

      int *memory_pointer;                        /* Pointer to Control Word */

      ms1553_regs = (MS1553_REGS_TYPE *) &MS1553REGS;
      memory_pointer = (int *) (&MS1553MEM + BC_Message_Block);

      /* Change channel */
      if(*memory_pointer & Bus_Channel_A)       /* Select bus channel B */
      {
            ms1553_regs->Control_Word_Reg &= ~Bus_Channel_A;
            *memory_pointer &= ~Bus_Channel_A;
      }
      else                                      /* Select bus channel A */
      {
            ms1553_regs->Control_Word_Reg |= Bus_Channel_A;
            *memory_pointer |= Bus_Channel_A;
      }

      return;
}

/* end */


/*******************************************************************************
Module Name:     ieee488.c
Number/Version:
History:
            Date          Rev    Author           Description
            23-Mar-1993   0.0    C. Houlberg      Prototype

Abstract:

                  Module containing dummy IEEE-488 functions
*******************************************************************************/

/*
      All definitions used by IEEE488.C are defined in
            the following header files.
*/

#include "rrt.h"                              /* RRT.configuration */
#include "dsp.h"                              /* DSP definitions */
#include "system.h"                           /* System definitions */
#include "cardhdrs.h"                         /* Memory card header definitions */
#include "display.h"                          /* LCD display definitions */

/*********************************************
*                  MEMORY CARD COPY          *
*********************************************/
int ieee488(int *temp)
{
}

/* end */


/*******************************************************************************
Include File Name:    interpts.h
Number/Version:
History:
            Date          Rev    Author           Description
            23-Mar-1993   0.0    C. Houlberg      Baseline

Abstract:
            Interupt function prototypes
*******************************************************************************/
```

```
/* Function prototypes
*/
      void dma_interrupt(void);
      void isr0_interrupt(void);
      void isr1_interrupt(void);
      void isr2_interrupt(void);
      void isr3_interrupt(void);
      void time0_interrupt(void);
      void time1_interrupt(void);
      void xmt0_interrupt(void);
      void rcv0_interrupt(void);
      void xmt1_interrupt(void);
      void rcv1_interrupt(void);
      void trp0_interrupt(void);
      void trp1_interrupt(void);
      void trp2_interrupt(void);

/* end */

/******************************************************************************
Module Name:    interpts.c
Number/Version:
History:
            Date        Rev   Author          Description
            23-Mar-1993 0.0   C. Houlberg     Baseline

Abstract:

******************************************************************************/

/* All definitions used are contained in the following header files */

      #include "interpts.h"                    /* Interupt function definitions */

/******************************************************************************
Name:       dma_interrupt
Number/Version:
History:
            Date        Rev   Author          Description
            23-Mar-1993 0.0   C. Houlberg     Baseline

Inputs:
            - None -
Outputs:
            - None -
Global Data:
            - None -
Functions Referenced:
            - None -
Abstract:
            dma_interrupt not implemented
******************************************************************************/
void dma_interrupt(void)
{
}

/******************************************************************************
Name:       isr0_interrupt
Number/Version:
History:
            Date        Rev   Author          Description
            23-Mar-1993 0.0   C. Houlberg     Baseline

Inputs:
            - None -
Outputs:
            - None -
Global Data:
            - None -
Functions Referenced:
            - None -
Abstract:
            isr0_interrupt not implemented
******************************************************************************/
void isr0_interrupt(void)
{
}
```

```
/******************************************************************************
Name:        isr1_interrupt
Number/Version:
History:
             Date        Rev   Author          Description
             23-Mar-1993 0.0   C. Houlberg     Baseline

Inputs:
             - None -
Outputs:
             - None -
Global Data:
             - None -
Functions Referenced:
             - None -
Abstract:
             isr1_interrupt not implemented
******************************************************************************/
void isr1_interrupt(void)
{
}

/******************************************************************************
Name:        isr2_interrupt
Number/Version:
History:
             Date        Rev   Author          Description
             23-Mar-1993 0.0   C. Houlberg     Baseline

Inputs:
             - None -
Outputs:
             - None -
Global Data:
             - None -
Functions Referenced:
             - None -
Abstract:
             isr2_interrupt not implemented
******************************************************************************/
void isr2_interrupt(void)
{
}

/******************************************************************************
Name:        isr3_interrupt
Number/Version:
History:
             Date        Rev   Author          Description
             23-Mar-1993 0.0   C. Houlberg     Baseline

Inputs:
             - None -
Outputs:
             - None -
Global Data:
             - None -
Functions Referenced:
             - None -
Abstract:
             isr3_interrupt not implemented
******************************************************************************/
void isr3_interrupt(void)
{
}

/******************************************************************************
Name:        time0_interrupt
Number/Version:
History:
             Date        Rev   Author          Description
             23-Mar-1993 0.0   C. Houlberg     Baseline

Inputs:
             - None -
Outputs:
             - None -
Global Data:
             - None -
Functions Referenced:
             - None -
```

```
Abstract:
            time0_interrupt not implemented
***************************************************************************/
void time0_interrupt(void)
{
}

/**************************************************************************
Name:       time1_interrupt
Number/Version:
History:
            Date        Rev   Author          Description
            23-Mar-1993 0.0   C. Houlberg     Baseline

Inputs:
            - None -
Outputs:
            - None -
Global Data:
            - None -
Functions Referenced:
            - None -
Abstract:
            time1_interrupt not implemented
***************************************************************************/
void time1_interrupt(void)
{
}

/**************************************************************************
Name:       xmt0_interrupt
Number/Version:
History:

            Date        Rev   Author          Description
            23-Mar-1993 0.0   C. Houlberg     Baseline

Inputs:
            - None -
Outputs:
            - None -
Global Data:
            - None -
Functions Referenced:
            - None -
Abstract:
            xmt0_interrupt not implemented
***************************************************************************/
void xmt0_interrupt(void)
{
}

/**************************************************************************
Name:       rcv0_interrupt
Number/Version:
History:
            Date        Rev   Author          Description
            23-Mar-1993 0.0   C. Houlberg     Baseline

Inputs:
            - None -
Outputs:
            - None -
Global Data:
            - None -
Functions Referenced:
            - None -
Abstract:
            rcv0_interrupt not implemented
***************************************************************************/
void rcv0_interrupt(void)
{
}

/**************************************************************************
Name:       xmt1_interrupt
Number/Version:
History:
            Date        Rev   Author          Description
            23-Mar-1993 0.0   C. Houlberg     Baseline

Inputs:
            - None -
```

```
Outputs:
            - None -
Global Data:
            - None -
Functions Referenced:
            - None -
Abstract:
            xmt1_interrupt not implemented
****************************************************************************/
void xmt1_interrupt(void)
{
}

/****************************************************************************
Name:       rcv1_interrupt
Number/Version:
History:
            Date         Rev   Author          Description
            23-Mar-1993  0.0   C. Houlberg     Baseline

Inputs:
            - None -
Outputs:
            - None -
Global Data:
            - None -
Functions Referenced:
            - None -
Abstract:
            rcv1_interrupt not implemented
****************************************************************************/
void rcv1_interrupt(void)
{
}

/****************************************************************************
Name:       trp0_interrupt
Number/Version:
History:
            Date         Rev   Author          Description
            23-Mar-1993  0.0   C. Houlberg     Baseline

Inputs:
            - None -
Outputs:
            - None -
Global Data:
            - None -
Functions Referenced:
            - None -
Abstract:
            trp0_interrupt not implemented
****************************************************************************/
void trp0_interrupt(void)
{
}

/****************************************************************************
Name:       trp1_interrupt
Number/Version:
History:
            Date         Rev   Author          Description
            23-Mar-1993  0.0   C. Houlberg     Baseline

Inputs:
            - None -
Outputs:
            - None -
Global Data:
            - None -
Functions Referenced:
            - None -
Abstract:
            trp1_interrupt not implemented
****************************************************************************/
void trp1_interrupt(void)
{
}

/****************************************************************************
Name:       trp2_interrupt
Number/Version:
```

```
History:
            Date        Rev  Author           Description
            23-Mar-1993 0.0  C. Houlberg      Baseline

Inputs:
            - None -
Outputs:
            - None -
Global Data:
            - None -
Functions Referenced:
            - None -
Abstract:
            trp2_interrupt not implemented
*****************************************************************************/
void trp2_interrupt(void)
{
}

/* end */
/*****************************************************************************
Include File Name:    timer.h
Number/Version:
History:
            Date        Rev  Author           Description
            23-Mar-1993 0.0  C. Houlberg      Baseline
            22-Apr-1993 0.0  C. Houlberg      Deleted delay_timer()

Abstract:
                 Timer prototypes and definitions.
*****************************************************************************/

/* Prototype timer functions */
void msec_timer(int amount, TIMER_REG_TYPE *timer);   /* msec. counter timer */

/* Timer definitions */
/* Timer resolution is 2 usecs.
      Timer constants are calculated as -(delay_in_microseconds >> 1).
      Maximum possible delay is 8,589,934,588 microseconds or
            2 hrs. 23 mins. 9.934588 secs. */
#define         USEC6       -(6 >> 1)                 /* Count for 6 us time */
#define         USEC10      -(10 >> 1)                /* Count for 10 us time */
#define         USEC14      -(14 >> 1)                /* Count for 14 us time */
#define         USEC50      -(50 >> 1)                /* Count for 50 us time */
#define         USEC100     -(100 >> 1)               /* Count for 100 us time */
#define         USEC500     -(500 >> 1)               /* Count for 500 us time */
#define         MSEC1       -(1000 >> 1)              /* Count for 1 ms time */
#define         MSEC10      -(10000 >> 1)             /* Count for 10 ms time */
#define         MSEC100     -(100000 >> 1)            /* Count for 100 ms time */
#define         HALFSEC     -(500000 >> 1)            /* Count for 1/2 sec time */
#define         SEC1        -(1000000 >> 1)           /* Count for 1 sec time */
#define         SEC2        -(2000000 >> 1)           /* Count for 2 sec time */
#define         SEC10       -(10000000 >> 1)          /* Count for 10 sec time */
#define         MIN1        -(60000000 >> 1)          /* Count for 1 minute time */
#define         MIN10       -(600000000 >> 1)         /* Count for 10 minutes time */

      /* Serial I/O Terminal time to stop sending */
#define RESPONSE_TIME_9600          -(1100 >> 1)      /* > 1042 usecs. */
#define RESPONSE_TIME_38400         -(300 >> 1)       /* >  260 usecs. */

/* end */


/*****************************************************************************
Module Name:    timer.c
Number/Version:
History:
            Date        Rev  Author           Description
            23-Mar-1993 0.0  C. Houlberg      Baseline
            22-Apr-1993 0.0  C. Houlberg      Deleted delay_timer()

Abstract:
                 Microsecond and millisecond delay functions
*****************************************************************************/

#include "rrt.h"                                      /* RRT configuration */
#include "dsp.h"                                      /* DSP definitions */
#include "timer.h"                                    /* Timer definitions */

/*****************************************************************************
Name:       msec_timer
Number/Version:
```

```
History:
          Date        Rev    Author          Description
          23-Mar-1993 0.0   C. Houlberg      Baseline

Inputs:
          time
          timer
Outputs:
          - None -
Global Data:
          - None -
Functions Referenced:
          - None -
Abstract:
          Delays in milliseconds
****************************************************************************/
/*    delay in msec */
void msec_timer(int time, TIMER_REG_TYPE *timer)
{
      int i;

      for (i = 0; i < time; i++)
      {
            timer->Timer_Counter = MSEC1; /* msec. delay */
            while(timer->Timer_Counter);  /* delay done when counter = 0 */
      }
}

/* end */


/****************************************************************************
Include File Name:    error.h
Number/Version:
History:
          Date        Rev    Author          Description
          23-Mar-1993 0.0   C. Houlberg      Baseline
          06-Apr-1993 0.1   C. Houlberg      Added record length error

Abstract:
          error.c prototypes and definitions
****************************************************************************/

/*    error.c contains the following functions:
*/
      void error_serialio_display(SERIAL_REG_TYPE *serial_reg, int error);
      int error_display(int error);
      void ascii_conversion(int hex_number, char ascii_string[]); /* ASCII */

/*    Serial I/O error code definitions
*/
      #define SERIAL_INPUT_ERROR          0x10000000  /* RS-232 or RS-422 error */
      #define     HEX_CHARACTER_ERROR     0x20000000  /* Invalid hex character */
      #define     RECORD_LENGTH_ERROR     0x30000000  /* Invalid record length */
      #define RECORD_CHECKSUM             0x40000000  /* Invalid record checksum */
      #define     RECORD_TYPE_ERROR       0x50000000  /* Invalid record type */
      #define END_RECORD_ERROR            0x60000000  /* Invalid end of file record */
      #define     UPLOAD_PROHIBITED       0x70000000  /* Memory card upload prohibited */
      #define APPEND_PROHIBITED           0x80000000  /* Memory card append prohibited */
      #define DOWNLOAD_PROHIBITED         0x90000000  /* Card download prohibited */
      #define COPY_PROHIBITED             0xa0000000  /* Copy from card prohibited */
      #define     CARD_FILE_SIZE          0xb0000000  /* File size exceeds memory card */
      #define SOURCE_CARD_LARGER          0xc0000000  /* Source larger than target */
      #define TARGET_NOT_ERASED           0xd0000000  /* Target not erased */
      #define     CARD_VERIFY_ERROR       0xe0000000  /* Memory card verify error */
      #define NO_FILE_ERROR               0xf0000000  /* No file on memory card */

/*    Error code definitions
*/
      #define TYPE_MASK                   0xffff0000  /* Error type mask */
      #define NO_ERROR                    0x00000000  /* No error indication */
      #define ACTIVE_BUS                  0x10000000  /* MS-1553 active bus */
      #define NO_ACTIVITY                 0x20000000  /* MS-1553 no activity */
      #define     NO_RESPONSE             0x30000000  /* MS-1553 no response to BC */
      #define NOT_POLLED                  0x40000000  /* MS-1553 RT not being polled */
      #define ONLY_POLLED                 0x50000000  /* MS-1553 RT only polled */
      #define LOOP_TEST_ERROR             0x60000000  /* MS-1553 Loop Test failure */
      #define MESSAGE_FAULT               0x70000000  /* MS-1553 Message Fault */
      #define UNEXPECTED_COMMAND          0xf0000000  /* MS-1553 unexpected command */
      #define BUSY_CONDITION              0x01000000  /* Message busy indication */
      #define ADDRESS_ERROR               0x02000000  /* Message address error */
      #define STATUS_COMMAND              0x03000000  /* Message reprogram status cmd */
```

```
#define BOOT_LOADER_ERROR       0x04000000  /* Message bootstrap loader */
#define NOT_DATA_READY          0x05000000  /* Message not data ready*/
#define COMMAND_NOT_RCVD        0x06000000  /* Message command not received */
#define NO_SUCCESS              0x07000000  /* Message not successful */
#define BOOT_VERIFIER_ERROR     0x08000000  /* Message bootstrap verifier */
#define MEMORY_CARD_ERROR       0x0f000000  /* Memory Card block error */
#define CARD_VPP_DROP           0x00000808  /* Card block Vpp voltage drop */
#define CARD_WRITE_ERROR        0x00001010  /* Card block write failure */
#define CARD_ERASE_ERROR        0x00002020  /* Card block erase failure */
#define CARD_SUSPEND_MODE       0x00004040  /* Card block erase suspend mode */
#define NO_CARD_0               0x0f100000  /* No Memory Card 0 error */
#define NO_CARD_1               0x0f200000  /* No Memory Card 1 error */
#define CARD_0_TIMEOUT          0x0f300000  /* Memory Card 0 ready timeout */
#define CARD_1_TIMEOUT          0x0f400000  /* Memory Card 1 ready timeout */
#define CARD_0_WP               0x0f500000  /* Memory Card 0 write protected */
#define CARD_1_WP               0x0f600000  /* Memory Card 1 write protected */
#define CARD_ID_BAD             0x0f700000  /* Memory Card ID not supported */
#define HEADER_ERROR            0x00100000  /* Protocol header error */
#define VERIFY_ERROR            0x00200000  /* Protocol verify error */
#define CHECKSUM_ERROR          0x00300000  /* Protocol checksum error */
#define DOWNLOAD_VERIFY         0x00500000  /* Protocol download or verify */
#define TRANSFER_MODE           0x00600000  /* Protocol invalid mode */
#define HEADER_TYPE             0x00700000  /* Protocol invalid header type */
#define PARITY_ERROR            0x00800000  /* Protocol parity error */
#define MESSAGE_ERROR           0x00900000  /* Protocol message error */
#define PROGRAMMING_ERROR       0x00a00000  /* Protocol programming error */
#define STATUS_ERROR            0x00b00000  /* Protocol RT status error */
#define NO_UPLOAD               0x00c00000  /* Protocol upload not allowed */
#define ERROR_CODE              0x00d00000  /* Protocol have error code */
#define TC_ERROR                0x00e00000  /* Protocol transfer control */
#define     DATA_COUNT_ERROR    0x00f00000  /* Protocol data count error */
#define IPL_FAIL_ERROR          0x00110000  /* Protocol IPL fail error */
#define DMC_STATUS_ERROR        0x00120000  /* Protocol U2 status error */
#define     NO_VERIFY_SUPPORT   0x00130000  /* Protocol download & verify */
#define NO_CABLE_ATTACHED       0x00010000  /* Switches no cable attached */
#define NO_CARD                 0x00020000  /* Switches no memory card */
#define BUS_SELECT              0x00030000  /* Switches bus selection error */
#define TERMINAL_MODE           0x00040000  /* Switches terminal mode error */
#define PROTOCOL_SELECT         0x00050000  /* Switches invalid protocol */
#define FILE_SIZE_ERROR         0x00060000  /* Switches file size error */
#define NOT_RELEASED            0x00070000  /* Switches data not released */
#define ABORT_OCCURRED          0x00080000  /* Switches operation aborted */

/* end */

/*****************************************************************************
Module Name:    error.c
Number/Version:
History:
         Date         Rev   Author          Description
         23-Mar-1993  0.0   C. Houlberg     Baseline

Abstract:
         This module contains all the error definitions.
*****************************************************************************/
/*
      All definitions used by ERROR.C are defined in the
      following header files:
*/

#include "rrt.h"                          /* RRT configuration definitions */
#include "dsp.h"                          /* DSP definitions */
#include "system.h"                       /* System definitions */
#include "display.h"                      /* LCD Display definitions */
#include "timer.h"                        /* Timer definitions */
#include "serialio.h"                     /* Serial I/O definitions */
#include "wordtype.h"                     /* Word type definitions */
#include "error.h"

/*****************************************************************************
Name:        error_serialio_display
Number/Version:
History:
         Date         Rev   Author          Description
         7-Aug-1993   0.0   C. Houlberg     Baseline

Inputs:
         serial_reg
         error
Outputs:
         - None -
```

```
Global Data:
            - None -
Functions Referenced:
            serial_send_string()
            LCD_display()
Abstract:
            All errors involving serial I/O
*****************************************************************************/
void error_serialio_display(SERIAL_REG_TYPE *serial_reg, int error)
{
      char ascii_string[5];

      switch(error & TYPE_MASK)
      {
            case SERIAL_INPUT_ERROR:
                  switch(error & ~TYPE_MASK)                    /* Determine error */
                  {
                        case Framing_Error:
                              serial_send_string("\r\nFraming Error\r\n", serial_reg);
                              break;
                        case Overrun_Error:
                              serial_send_string("\r\nOverrun Error\r\n", serial_reg);
                              break;
                        case Parity_Error:
                              serial_send_string("\r\nParity Error\r\n", serial_reg);
                              break;
                  }
                  break;
            case HEX_CHARACTER_ERROR:
                  serial_send_string("\r\nBad HEX Character\r\n", serial_reg);
                  break;
            case RECORD_LENGTH_ERROR:
                  serial_send_string("\r\nRecord length exceeds 128 words\r\n",
                        serial_reg);
                  break;
            case RECORD_CHECKSUM:
                  serial_send_string("\r\nChecksum Error\r\n", serial_reg);
                  break;
            case RECORD_TYPE_ERROR:
                  serial_send_string("\r\nRecord Type Error\r\n", serial_reg);
                  break;
            case END_RECORD_ERROR:
                  serial_send_string("\r\nEnd of File Record Error\r\n", serial_reg);
                  break;
            case NO_CARD_0:
            case NO_CARD_1:
                  serial_send_string("No Memory Card Detected\r\n", serial_reg);
                  break;
            case CARD_0_TIMEOUT:
            case CARD_1_TIMEOUT:
                  serial_send_string("Memory Card Not Ready\r\n", serial_reg);
                  break;
            case CARD_0_WP:
            case CARD_1_WP:
                  serial_send_string("Memory Card Write Protected\r\n", serial_reg);
                  break;
            case UPLOAD_PROHIBITED:
                  serial_send_string("Upload to Card Prohibited\r\n", serial_reg);
                  break;
            case APPEND_PROHIBITED:
                  serial_send_string("Append to Card Prohibited\r\n", serial_reg);
                  break;
            case DOWNLOAD_PROHIBITED:
                  serial_send_string("Download From Card Prohibited\r\n",
                        serial_reg);
                  break;
            case COPY_PROHIBITED:
                  serial_send_string("Copy From Card Prohibited\r\n",
                        serial_reg);
                  break;
            case CARD_FILE_SIZE:
                  serial_send_string("\r\nFile exceeds memory card\r\n",
                        serial_reg);
                  break;
            case SOURCE_CARD_LARGER:
                  serial_send_string("Source larger than Target Card\r\n",
                        serial_reg);
                  break;
            case TARGET_NOT_ERASED:
                  serial_send_string("\r\nTarget Card NOT Erased!!\r\n", serial_reg);
                  break;
```

```
        case MEMORY_CARD_ERROR:
            serial_send_string("\r\nMemory Card ", serial_reg);
            switch(error & ~TYPE_MASK)
            {
                case CARD_VPP_DROP:                         /* Card Vpp voltage drop */
                    serial_send_string("VPP Drop\r\n", serial_reg);
                    break;
                case CARD_WRITE_ERROR:                      /* Card write failure */
                    serial_send_string("Write Error\r\n", serial_reg);
                    break;
                case CARD_ERASE_ERROR:                      /* Card erase failure */
                    serial_send_string("Erase Error\r\n", serial_reg);
                    break;
                case CARD_SUSPEND_MODE:                     /* Card erase suspend mode */
                    serial_send_string("Suspend Mode\r\n", serial_reg);
                    break;
                default:
                    ascii_conversion(error & ~TYPE_MASK, &ascii_string[0]);
                    serial_send_string("ERROR #", serial_reg);
                    serial_send_string(&ascii_string[0], serial_reg);
                    break;
            }
            break;
        case CARD_ID_BAD:
            serial_send_string("\r\nCard Not Supported\r\n", serial_reg);
            break;
        case CARD_VERIFY_ERROR:
            serial_send_string("\r\nMemory Card Verify Error\r\n", serial_reg);
            break;
        case NO_FILE_ERROR:
            serial_send_string("\r\nNo Files Found\r\n", serial_reg);
            break;
        default:
            LCD_display(START_LINE1, "\fERROR: RRT Code\rUnexpected");
            ascii_conversion(error >> 16, &ascii_string[0]);
            LCD_display(START_LINE2 + 12, &ascii_string[0]);
            ascii_conversion(error, &ascii_string[0]);
            LCD_display(START_LINE2 + 16, &ascii_string[0]);
            for(;;);                                    /* Permanent Trap */
            break;
    }
}

/****************************************************************************
Name:           error_display
Number/Version:
History:
                Date        Rev   Author          Description
                23-Mar-1993 0.0   C. Houlberg     Baseline

Inputs:
                serial_reg
Outputs:
                return_word
Global Data:
                - None -
Functions Referenced:
                LCD_display()
Abstract:
                All errors not involving serial I/O
****************************************************************************/
int error_display(int error)
{
    TIMER_REG_TYPE *timer;                  /* Pointer to timer counter register */
    REPROGRAM_STATUS_TYPE *status_field;
    char ascii_string[5];

    timer = (TIMER_REG_TYPE *) &TIMER0;
    status_field = (REPROGRAM_STATUS_TYPE *) &error;

    switch(error & TYPE_MASK)
    {
        case ACTIVE_BUS:
            LCD_display(START_LINE1, "ERROR:\rMS-1553: Active Bus ");
            break;
        case NO_ACTIVITY:
            LCD_display(START_LINE1, "ERROR:\rMS-1553: No Activity");
            break;
        case NO_RESPONSE:
            LCD_display(START_LINE1, "ERROR:\rMS-1553: No Response");
            break;
```

```
case NOT_POLLED:
      LCD_display(START_LINE1, "ERROR:\rMS-1553: Not Polled ");
      break;
case ONLY_POLLED:
      LCD_display(START_LINE1, "ERROR:\rMS-1553: Only Polled");
      break;
case LOOP_TEST_ERROR:
      LCD_display(START_LINE1, "ERROR:\rMS-1553: Loop Test\t");
      break;
case MESSAGE_FAULT:
      LCD_display(START_LINE1, "ERROR:\rMS-1553 Message ");
      ascii_conversion(error, &ascii_string[0]);
      LCD_display(START_LINE2 + 16, &ascii_string[0]);
      break;
case UNEXPECTED_COMMAND:
      ascii_conversion(error, &ascii_string[0]);
      LCD_display(START_LINE1, "ERROR:\rMS-1553 Command ");
      LCD_display(START_LINE2 + 16, &ascii_string[0]);
      break;
case BUSY_CONDITION:
      LCD_display(START_LINE1, "ERROR:\rMS-1553: Busy\t");
      break;
case ADDRESS_ERROR:
      LCD_display(START_LINE1, "ERROR:\rMS-1553: Bad Address");
      break;
case STATUS_COMMAND:
      if(!(status_field->Status_Flag))     /* Check status flag */
      {
            LCD_display(START_LINE2 + 16, "STAT");
      }
      else if(status_field->Status_Indicator)    /* Check indicator */
      {
            ascii_conversion(status_field->Status_Code, &ascii_string[0]);
            LCD_display(START_LINE2 + 16, &ascii_string[0]);
      }
      else                                        /* Return error code */
            return ERROR_CODE + (error & ~TYPE_MASK);
      break;
case BOOT_LOADER_ERROR:
      LCD_display(START_LINE1, "ERROR:\rBootstrap Loader Msg");
      break;
case NOT_DATA_READY:
      LCD_display(START_LINE1, "ERROR:\rNot Ready\t");
      break;
case COMMAND_NOT_RCVD:
      LCD_display(START_LINE1, "ERROR:\rCommand Not Received");
      break;
case NO_SUCCESS:
      LCD_display(START_LINE1, "ERROR:\rNot Successful\t");
      break;
case BOOT_VERIFIER_ERROR:
      LCD_display(START_LINE1, "ERROR:\rBootstrap Verify Msg");
      break;
case MEMORY_CARD_ERROR:
      switch(error & ~TYPE_MASK)
      {
            case CARD_VPP_DROP:                     /* Card Vpp voltage drop */
                  LCD_display(START_LINE1, "ERROR:\rCard Vpp Drop\t");
                  break;
            case CARD_WRITE_ERROR:            /* Card write failure */
                  LCD_display(START_LINE1, "ERROR:\rCard Write Failure\t");
                  break;
            case CARD_ERASE_ERROR:            /* Card erase failure */
                  LCD_display(START_LINE1, "ERROR:\rCard Erase Failure\t");
                  break;
            case CARD_SUSPEND_MODE:           /* Card erase suspend mode */
                  LCD_display(START_LINE1, "ERROR:\rCard Suspend Mode\t");
                  break;
            default:
                  ascii_conversion(error & ~TYPE_MASK, &ascii_string[0]);
                  LCD_display(START_LINE1, "ERROR\rCard Write Addr ");
                  LCD_display(START_LINE2 + 16, &ascii_string[0]);
                  break;
      }
      break;
case NO_CARD:
      LCD_display(START_LINE2, "Card Not Detected\t");
      break;
case NO_CARD_0:
      LCD_display(START_LINE2, "Card 0 Not Detected ");
      break;
```

```
case NO_CARD_1:
      LCD_display(START_LINE2, "Card 1 Not Detected ");
      break;
case CARD_0_TIMEOUT:
      LCD_display(START_LINE2, "Card 0 No Response\t");
      break;
case CARD_1_TIMEOUT:
      LCD_display(START_LINE2, "Card 1 No Response\t");
      break;
case CARD_0_WP:
      LCD_display(START_LINE2, "Card 0 Write Protect");
      break;
case CARD_1_WP:
      LCD_display(START_LINE2, "Card 1 Write Protect");
      break;
case CARD_ID_BAD:
      LCD_display(START_LINE2, "Card Not Supported\t");
      timer->Timer_Counter = SEC2;
      while(timer->Timer_Counter);
      break;
case HEADER_ERROR:
      LCD_display(START_LINE1, "ERROR:\rCard: Bad Header\t");
      break;
case VERIFY_ERROR:
      ascii_conversion(error, &ascii_string[0]);
      LCD_display(START_LINE1, "ERROR:");
      LCD_display(START_LINE2 + 11, &ascii_string[0]);
      break;
case CHECKSUM_ERROR:
      LCD_display(START_LINE1, "ERROR:\rMS-1553: Checksum\t");
      break;
case DOWNLOAD_VERIFY:
      if(status_flags.DOWNLOAD)
            LCD_display(START_LINE2, "Download Not Allowed");
      else
            LCD_display(START_LINE2, "Verify Not Allowed\t");
      break;
case TRANSFER_MODE:
      LCD_display(START_LINE1, "ERROR:\rCard: Transfer Mode ");
      break;
case HEADER_TYPE:
      LCD_display(START_LINE1, "ERROR:\rCard: Header Type\t");
      break;
case PARITY_ERROR:
      LCD_display(START_LINE1, "ERROR:\rMS-1553: Parity\t");
      break;
case MESSAGE_ERROR:
      LCD_display(START_LINE1, "ERROR:\rMS-1553 Message ");
      ascii_conversion(error, &ascii_string[0]);
      LCD_display(START_LINE2 + 16, &ascii_string[0]);
      break;
case PROGRAMMING_ERROR:
      LCD_display(START_LINE1, "ERROR:\rMS-1553: Programming");
      break;
case STATUS_ERROR:
      LCD_display(START_LINE1, "ERROR:\rMS-1553: Status\t");
      break;
case NO_UPLOAD:
      LCD_display(START_LINE2, "Upload Not Allowed\t");
      break;
case TC_ERROR:
      LCD_display(START_LINE1, "ERROR:\rXfer Control    ");
      break;
case DATA_COUNT_ERROR:
      LCD_display(START_LINE1, "ERROR:\rData Count      ");
      break;
case IPL_FAIL_ERROR:
      LCD_display(START_LINE1, "ERROR:\rIPL Failed      ");
      break;
case DMC_STATUS_ERROR:
      LCD_display(START_LINE1, "ERROR:\rDMC Status\t");
      ascii_conversion(error, &ascii_string[0]);
      LCD_display(START_LINE2 + 16, &ascii_string[0]);
      break;
case NO_VERIFY_SUPPORT:
      if(status_flags.DOWNLOAD)
            LCD_display(START_LINE2, "No Download Support ");
      else
            LCD_display(START_LINE2, "No Verify Support\t");
      break;
case NO_CABLE_ATTACHED:
      LCD_display(START_LINE1, "\fERROR:\rNo Cable Attached");
      break;
```

```
		case BUS_SELECT:
			LCD_display(START_LINE1, "ERROR:\rCard: Bad Bus\t");
			break;
		case TERMINAL_MODE:
			LCD_display(START_LINE1, "ERROR:\rCard: Terminal Mode ");
			break;
		case PROTOCOL_SELECT:
			LCD_display(START_LINE1, "ERROR:\rCard: Bad Protocol\t");
			break;
		case FILE_SIZE_ERROR:
			LCD_display(START_LINE1, "ERROR:\rCard: Bad File Size ");
			break;
		case NOT_RELEASED:
			LCD_display(START_LINE1, "\fERROR: Card\rData Not Approved");
			break;
		case ABORT_OCCURRED:
			LCD_display(START_LINE1, "ABORT:");
			break;
		default:
			LCD_display(START_LINE1, "\fERROR: RRT Code\rUnexpected");
			ascii_conversion(error >> 16, &ascii_string[0]);
			LCD_display(START_LINE2 + 12, &ascii_string[0]);
			ascii_conversion(error, &ascii_string[0]);
			LCD_display(START_LINE2 + 16, &ascii_string[0]);
			for(;;);                                    /* Permanent Trap */
			break;
	}

	return error;
}

/*****************************************************************************
Name:		ascii_conversion
Number/Version:
History:
		Date		Rev	Author		Description
		23-Mar-1993 0.0	C. Houlberg Baseline

Inputs:
		hex_number
Outputs:
		ascii_string
Global Data:
		- None -
Functions Referenced:
		- None -
Abstract:
		Convert the least 16 bits into an ascii character string.
*****************************************************************************/
void ascii_conversion(int hex_number, char *ascii_string)
{
	int i, temp;

	for(i = 0; i < 4; i++)
	{
		temp = 0x0f & hex_number;
		if(temp <= 9)
			temp += '0';
		else
			temp += ('A' - 0x0a);
		*(ascii_string + 3 - i) = ( char )temp;
		hex_number = hex_number >> 4;
	}
	*(ascii_string + 4) = 0;                      /* End of string indicator */
}

/* end */
```

APPENDIX B

```
TITLE RRT Decoder	;The underscore symbol (_) denotes active low
PATTERN Generates program bus decoding and I/O control signals
;Generation of _RESET, _RD, _WR, _IORD, _IOWR, IORD,
;	EEPROM, HCS0, and MCS1 signals
REVISION 2.02
AUTHOR Chris Houlberg
COMPANY NAWC-WPNS, Point Mugu, CA. 93042
DATE 8/26/92

CHIP Decoder PAL20RA10
```

```
;PINS (Numbers correspond to LCC locations)
;1    2      3     5     6     7       8    9       10   12   13     14
_PLD  RESET  R_W   _STRB xR_W  _IOSTRB A22  MCS1_0  WPO  WP1  NC13   GND
;15   16     17    19    20    21      22   23      24   26   27     28
_OE   _IOWR  _IORD IORD  NC20  _MCS1   _MCS0 _EEPROM _WR _RD  _RESET VCC

EQUATIONS

/_IOWR = /xR_W * /_IOSTRB          ;I/O Write enable

/_IORD = xR_W * /_IOSTRB           ;I/O Read enable

/IORD = _IORD                      ;I/O Read enable for the IEEE-488 Bus

/_MCS1 = MCS1_0 * A22 * /_STRB     ;Read cycle enable
      + MCS1_0 * A22 * /R_W        ;Write cycle enable

/_MCS0 = /MCS1_0 * A22 * /_STRB    ;Read cycle enable
      + /MCS1_0 * A22 * /R_W       ;Write cycle enable

/_EEPROM = /A22 * /_STRB           ;Read cycle enable
      + /A22 * /R_W                ;Write cycle enable

/_WR  = /R_W * /_STRB * /A22       ;EEPROM write
      + /R_W * /_STRB * A22        ;Memory Card write for Card 0
             * /WPO * /MCS1_0      ;      (with Write Protect)
      + /R_W * /_STRB * A22        ;Memory Card write for Card 1
             * /WP1 * MCS1_0       ;      (with Write Protect)

/_RD = R_W * /_STRB                ;Duration equal to memory enable

/_RESET = RESET                    ;Reset for the IEEE-488 Interface

NC20 := /NC20                      ;This function for simulation only
NC20.CLKF = NC13

SIMULATION

SETF   _PLD /_OE          ;Initialize
       /NC13              ;NC13 used for simulation timing only
       /RESET
       /A22 R_W _STRB /MCS1_0 /WPO /WP1
       _IOSTRB xR_W
TRACE_ON                  ;Start Display
       NC13
       RESET
       _RESET
       A22 R_W _STRB MCS1_0 WPO WP1
       _RD _WR _EEPROM _MCS0 _MCS1
       _IOSTRB xR_W
       _IORD _IOWR IORD

SETF   /NC13
SETF   NC13
SETF   /NC13
SETF   NC13
SETF   /NC13 RESET
SETF   NC13
SETF   /NC13
SETF   NC13 /RESET

SETF   /NC13              ;Read data from EEPROM (Read, Read timing)
SETF   NC13
SETF   /NC13 /_STRB
SETF   NC13               ;7 Internal waits extending Read cycle
SETF   /NC13
SETF   NC13
SETF   /NC13
SETF   NC13
SETF   /NC13
SETF   NC13
SETF   /NC13
SETF   NC13
SETF   /NC13
SETF   NC13
SETF   /NC13
SETF   NC13               ;Last internal wait extending Read cycle
SETF   /NC13
SETF   NC13
SETF   /NC13
SETF   NC13               ;7 Internal waits extending Read cycle
SETF   /NC13
```

```
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                    ;Last internal wait extending Read cycle
SETF  /NC13
SETF  NC13
SETF  /NC13 _STRB
SETF  NC13

SETF  /NC13                   ;Read data from Memory card 0 (Read, Read)
SETF  NC13
SETF  /NC13 /_STRB A22
SETF  NC13                    ;7 Internal waits extending Read cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                    ;Last internal wait extending Read cycle
SETF  /NC13
SETF  NC13
SETF  /NC13
SETF  NC13                    ;7 Internal waits extending Read cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                    ;Last internal wait extending Read cycle
SETF  /NC13
SETF  NC13
SETF  /NC13 _STRB /A22
SETF  NC13

SETF  /NC13                   ;Read data from Memory card 1 (Read, Read)
SETF  NC13 MCS1_0
SETF  /NC13 /_STRB A22
SETF  NC13                    ;7 Internal waits extending Read cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                    ;Last internal wait extending Read cycle
SETF  /NC13
SETF  NC13
SETF  /NC13
SETF  NC13                    ;7 Internal waits extending Read cycle
SETF  /NC13
SETF  NC13
SETF  /NC13
SETF  NC13
SETF  /NC13
SETF  NC13
SETF  /NC13
SETF  NC13
SETF  /NC13
```

```
SETF  NC13
SETF  /NC13
SETF  NC13                 ;Last internal wait extending Read cycle
SETF  /NC13
SETF  NC13
SETF  /NC13 _STRB /A22
SETF  NC13 /MCS1_0

SETF  /NC13                ;Write data to EEPROM (Write, Write timing)
SETF  NC13
SETF  /NC13
SETF  NC13 /R_W
SETF  /NC13 /_STRB
SETF  NC13                 ;7 Internal waits extending Write cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                 ;Last internal wait extending Write cycle
SETF  /NC13
SETF  NC13
SETF  /NC13 _STRB
SETF  NC13
SETF  /NC13 /_STRB
SETF  NC13                 ;7 Internal waits extending Write cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                 ;Last internal wait extending Write cycle
SETF  /NC13
SETF  NC13
SETF  /NC13 _STRB
SETF  NC13 R_W
SETF  /NC13
SETF  NC13
SETF  /NC13                ;Write data to Card 0 (Write, Write timing)
SETF  NC13
SETF  /NC13 A22
SETF  NC13 /R_W
SETF  /NC13 /_STRB
SETF  NC13                 ;7 Internal waits extending Write cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                 ;Last internal wait extending Write cycle
SETF  /NC13
SETF  NC13
SETF  /NC13 _STRB
SETF  NC13
SETF  /NC13 /_STRB
SETF  NC13                 ;7 Internal waits will extend Write cycle
SETF  /NC13
SETF  NC13
SETF  /NC13
SETF  NC13
SETF  /NC13
SETF  NC13
SETF  /NC13
SETF  NC13
```

```
SETF  /NC13
SETF  NC13
SETF  /NC13
SETF  NC13                 ;Last internal wait extending Write cycle
SETF  /NC13
SETF  NC13
SETF  /NC13 _STRB
SETF  NC13 R_W /A22
SETF  /NC13
SETF  NC13

SETF  /NC13 MCS1_0         ;Write data to Card 1 (Write, Write timing)
SETF  NC13
SETF  /NC13 A22
SETF  NC13 /R_W
SETF  /NC13 /_STRB
SETF  NC13                 ;7 Internal waits extending Write cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                 ;Last internal wait extending Write cycle
SETF  /NC13
SETF  NC13
SETF  /NC13 _STRB
SETF  NC13
SETF  /NC13 /_STRB
SETF  NC13                 ;7 Internal waits will extend Write cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                 ;Last internal wait extending Write cycle
SETF  /NC13
SETF  NC13
SETF  /NC13 _STRB
SETF  NC13 R_W /A22
SETF  /NC13
SETF  NC13 /MCS1_0

SETF  /NC13                ;Inhibit of Write to Memory card 0
SETF  NC13 WP0
SETF  /NC13 A22
SETF  NC13 /R_W
SETF  /NC13 /_STRB
SETF  NC13                 ;7 Internal waits extending Write cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                 ;Last internal wait extending Write cycle
SETF  /NC13
SETF  NC13
SETF  /NC13 _STRB
SETF  NC13 R_W /A22
SETF  /NC13 /WP0
SETF  NC13

SETF  /NC13 MCS1_0         ;Inhibit of Write to Memory card 1
SETF  NC13 WP1
SETF  /NC13 A22
```

```
SETF  NC13 /R_W
SETF  /NC13 /_STRB
SETF  NC13               ;7 Internal waits extending Write cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13               ;Last internal wait extending Write cycle
SETF  /NC13
SETF  NC13
SETF  /NC13 _STRB
SETF  NC13 R_W /A22
SETF  /NC13 /WP1
SETF  NC13 /MCS1_0

SETF  /NC13              ;Write to Memory card 0, Inhibit card 1
SETF  NC13 WP1
SETF  /NC13 A22
SETF  NC13 /R_W
SETF  /NC13 /_STRB
SETF  NC13               ;7 Internal waits extending Write cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13               ;Last internal wait extending Write cycle
SETF  /NC13
SETF  NC13
SETF  /NC13 _STRB
SETF  NC13 R_W /A22
SETF  /NC13 /WP1
SETF  NC13

SETF  /NC13 MCS1_0       ;Write to Memory card 1, Inhibit card 0
SETF  NC13 WP0
SETF  /NC13 A22
SETF  NC13 /R_W
SETF  /NC13 /_STRB
SETF  NC13               ;7 Internal waits extending Write cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13               ;Last internal wait extending Write cycle
SETF  /NC13
SETF  NC13
SETF  /NC13 _STRB
SETF  NC13 R_W /A22
SETF  /NC13 /WP0
SETF  NC13 /MCS1_0

SETF  /NC13              ;Read data from I/O
SETF  NC13
SETF  /NC13
SETF  NC13 /_IOSTRB
SETF  /NC13
SETF  NC13               ;7 Internal waits extending I/O Read cycle
SETF  /NC13
SETF  NC13
SETF  /NC13
SETF  NC13
SETF  /NC13
```

```
SETF  NC13
SETF  /NC13
SETF  NC13
SETF  /NC13
SETF  NC13
SETF  /NC13
SETF  NC13                ;Last internal wait extending I/O Read cycle
SETF  /NC13
SETF  NC13 _IOSTRB
SETF  /NC13
SETF  NC13

SETF  /NC13               ;Write data to I/O
SETF  NC13
SETF  /NC13 /xR_W
SETF  NC13 /_IOSTRB
SETF  /NC13
SETF  NC13                ;7 Internal waits extending I/O Read cycle
SETF  /NC13
SETF  NC13
SETF  /NC13
SETF  NC13
SETF  /NC13
SETF  NC13
SETF  /NC13
SETF  NC13
SETF  /NC13
SETF  NC13
SETF  /NC13
SETF  NC13                ;Last internal wait extending I/O Read cycle
SETF  /NC13
SETF  NC13 _IOSTRB
SETF  /NC13 xR_W
SETF  NC13

TRACE_OFF                 ;End Display
```

APPENDIX C

```
TITLE RRT Decoder        ;The underscore symbol (_) denotes active low
PATTERN Generates peripherial select signals
;Generation of _RS232SEL, _RS422SEL, _MS1553SEL, _MS1553REG, _IEEE488SEL,
;      _PPI1SEL, _PPI2SEL, _PPI3SEL, and _XRDY signals
REVISION 2.02
AUTHOR Chris Houlberg
COMPANY NAWC-WPNS, Point Mugu, CA. 93042
DATE 8/26/92

CHIP Decoder PAL20RA10

;PINS (Numbers correspond to LCC locations)
;     1            2            3            5           6           7
    _PLD         xA12         xA11         xA10        xA9       _READYD
;     8            9            10           12          13          14
   _INTO       _IOSTRB        NC10         NC12        NC13         GND
;     15           16           17           19          20          21
    _OE        _INTACK       _xRDY      _PPI3SEL    _PPI2SEL    _PPI1SEL
;     22           23           24           26          27          28
 _IEEE488SEL _MS1553REG  _MS1553SEL  _RS422SEL  _RS232SEL      VCC

EQUATIONS

/_RS232SEL  = /xA12 * /xA11 * /xA10 * /xA9       ;RS-232 select

/_RS422SEL  = /xA12 * /xA11 * /xA10 * xA9        ;RS-422 select

/_MS1553REG = /xA12 * /xA11 * xA10 * /xA9        ;MS-1553 register select

/_MS1553SEL = xA12 + /_MS1553REG                 ;MS-1553 select

/_IEEE488SEL = /xA12 * /xA11 * xA10 * xA9        ;IEEE-488 select

/_PPI1SEL = /xA12 * xA11 * /xA10 * /xA9          ;PPI1 select

/_PPI2SEL = /xA12 * xA11 * /xA10 * xA9           ;PPI2 select

/_PPI3SEL = /xA12 * xA11 * xA10 * /xA9           ;PPI3 select

_xRDY =  _READYD                                 ;DSP xRDY input
       * _RS232SEL * _RS422SEL
       * _IEEE488SEL * _PPI1SEL
       * _PPI2SEL * _PPI3SEL
```

```
/_INTACK = /_INTO * /_MS1553SEL * /_IOSTRB

SIMULATION

SETF  _PLD /_OE                                   ;Initialize
      xA12 xA11 xA10 xA9
      _READYD
      _INTO _IOSTRB

TRACE_ON                                          ;Start Display
      xA12 xA11 xA10 xA9
      _RS232SEL _RS422SEL
      _MS1553REG _MS1553SEL
      _IEEE488SEL _PPI1SEL
      _PPI2SEL _PPI3SEL
      _READYD _xRDY
      _INTO _IOSTRB _INTACK

SETF  /xA12 xA11 xA10 xA9                         ;Unused address combination
SETF  /xA12 /xA11 /xA10 /xA9
SETF  /xA12 xA11 xA10 xA9
SETF  /xA12 /xA11 /xA10 xA9
SETF  /xA12 xA11 xA10 xA9
SETF  /xA12 /xA11 xA10 /xA9
SETF  /xA12 xA11 xA10 xA9
SETF  /xA12 /xA11 xA10 xA9
SETF  /xA12 xA11 xA10 xA9
SETF  /xA12 xA11 /xA10 /xA9
SETF  /xA12 xA11 xA10 xA9
SETF  /xA12 xA11 /xA10 xA9
SETF  /xA12 xA11 xA10 xA9
SETF  /xA12 xA11 xA10 /xA9
SETF  /xA12 xA11 xA10 xA9
SETF  xA12 /xA11 /xA10 /xA9
SETF  xA12 /xA11 /xA10 xA9
SETF  xA12 /xA11 xA10 /xA9
SETF  xA12 /xA11 xA10 xA9
SETF  xA12 xA11 /xA10 /xA9
SETF  xA12 xA11 /xA10 xA9
SETF  xA12 xA11 xA10 /xA9
SETF  xA12 xA11 xA10 xA9
SETF  /_INTO
SETF  _INTO
SETF  /_READYD
SETF  _READYD

SETF  /_INTO
SETF  xA12
SETF  /_IOSTRB
SETF  _INTO
SETF  _IOSTRB
SETF  /xA12

TRACE_OFF                  ;End Display
```

APPENDIX D

<u>COMMON CONFIGURATION REGISTERS (Initialized at Power On):</u>

CONFIGURATION REGISTER #2 (Register Address 0x02)

| BIT | DESCRIPTION | COMMENT |
|---|---|---|
| 0 | Separate Broadcast Data | 0 => No Separate Storage |
| 1 | Enhanced RT Memory Management | 1 => Enhanced Mode |
| 2 | Clear Service Request | 0 => Host Control Only |
| 3 | Level/Pulse Interrupt Request | 1 => Interrupt Level |
| 4 | Interrupt Status Auto Clear | 1 => Clear Status following Read |
| 5 | Load Time Tag On Synchronize | Command Not Expected (1 => Load) |
| 6 | Clear Time Tag On Synchronize | Command Not Expected (1 => Clear) |
| 9-7 | Time Tag Resolution | 010 => 16 usecs |
| 10 | 256-Word Boundary Disable | 1 => Boundary Disabled |
| 11 | Overwrite Invalid Data Enable | 1 => Overwrite Enabled |
| 12 | RX Subaddress Double Buffering Enable | 0 => No Double Buffering |
| 13 | Busy Bit Lookup Table Enable | 1 => Table Not Enabled |
| 14 | RAM Parity Enable | No External Memory (0 => Check Not Enabled) |
| 15 | Enhanced Interrupts Enable | 1 => Interrupt Status Updated |
| 15-0 | BC, RT, & MT Operation | 0xAD7A |

CONFIGURATION REGISTER #3 (Register Address 0x07)

| BIT | DESCRIPTION | COMMENT |
|---|---|---|
| 0 | Enhanced Mode Code Handling | 1 => Not Enabled |
| 1 | 1553A Mode Codes Enabled | 0 => Subaddress 0 & 31 are Mode Code Addresses |
| 2 | RTFAIL/RTFLAG Wrap Enable | 1 => Host & Fail Flag |
| 3 | Busy Receive Transfer Disable | 0 => Data Stored |
| 4 | Illegal Receive Transfer Disable | 0 => Data Stored |
| 5 | Alternate RT Status Word Enabled | 0 => Mil-Std-1553B Status Word |
| 6 | Override Mode Code T/R Bit Error | 0 => No Override |
| 7 | Illegalization Disabled | 1 => Illegalization Disabled |
| 10-8 | Monitor Data Stack Size | 111 => 512 Words |
| 12-11 | Monitor Command Stack Size | 00 => 256 Words |
| 14-13 | BC/RT Command Stack Size | 00 => 256 Words (64 Messages) |
| 15 | Enhanced Mode Enable | 1 => Enhanced Mode Enabled |
| 15-0 | BC, RT, & MT Operation | 0x87A5 |

CONFIGURATION REGISTER #4 (Register Address 0x08)

| BIT | DESCRIPTION | COMMENT |
|---|---|---|
| 2-0 | Test Mode | 000 => Normal Operation |
| 3 | Latch RT Address With Config. Reg. 5 | 0 => Address Transparent |
| 4 | Monitor Tag Gap Option | 0 => Time Not Monitored |
| 5 | Valid Busy Bit/No Data | 1 => When Busy, Data Transmitted or Not is Valid |
| 6 | Valid If Message Error Bit/No Data | 1 => For Error, Data Transmitted or Not is Vaild |
| 8,7 | First Retry, Second Retry Alt/Same Bus | 00 => First and Second Retries on Same Bus |
| 9 | Retry If Status Set | 0 => No Retries |
| 10 | Retry If 1553A and Message Error | 0 => Basic Retries Only If Allowed by Bit 9 |
| 11 | Broadcast Mask Enabled/XOR | Not Using Broadcast Commands (0 => Expect 1) |
| 12 | Expanded BC Control Word Enabled | 1 => All BC Control Word Bits Enabled |
| 13 | Mode Code Override Busy | 0 => RT Data Not Xmitted |
| 14 | Inhibit BIT Word Transmit If Busy | 0 => BIT Xmitted if Busy |
| 15 | External BIT Word Enable | 0 => Internal BIT Xmitted |
| 15-0 | BC, RT, & MT Operation | 0x1060 |

CONFIGURATION REGISTER #5 (Register Address 0x09)

| BIT | DESCRIPTION | COMMENT |
|---|---|---|
| 0 | RT Address Parity | Read Only, Address Parity |
| 5-1 | RT Address | Read Only, RT Address |
| 6 | RT Address Latch/Transparent | Read Only, Transparent Address |
| 7 | Broadcast Disabled | 1 => Address 31 Not a Broadcast address |
| 8 | Gap Check Enabled | 1 => Gap Time Checked |
| 10,9 | Response Timeout Select | 0,0 => 18.5 usecs (Default) |
| 11 | Expanded Zero Crossing Enabled | Read Only (0 => 12 MHz or 16 MHz Clock) |
| 12 | External TX_B Inhibit | Read Only (0 => TX_B Not Inhibited) |
| 13 | External TX_A Inhibit | Read Only (0 => TX_A Not Inhibited) |
| 14 | Single-Ended Select | Read Only (1 => Configured for 1553 Signals) |
| 15 | Clock 12/16 Select | 1 => 12 MHz Clock Selected |
| 15-0 | BC, RT, & MT Operation | 0xC180 |

BC OPERATION:

CONFIGURATION REGISTER #1 (Register Address 0x01)

| BIT | DESCRIPTION | COMMENT |
|---|---|---|
| 0 | BC Message In Progress | Read Only (1 => Message in Progress) |
| 1 | BC Frame In Progress | Read Only (1 => Frame in Progress) |
| 2 | BC Enabled | Read Only (1 => BC Executing Sequence) |
| 3 | Double/Single Retry | Not Used (0 => Single Retry) |
| 4 | Retry Enabled | 0 => No Retries |
| 5 | Intermessage Gap Timer Enabled | 0 => Timer Disabled (1 to 65535 usecs) |
| 6 | Internal Trigger Enabled | 0 => Trigger Disabled (100 usecs to 6.55 secs) |
| 7 | External Trigger Enabled | 0 => Trigger Disabled |
| 8 | Frame Auto-Repeat | 0 => No Auto-Repeat |
| 9 | Status Set Stop-On-Frame | 0 => No Stop-On-Frame (No Auto-Repeat) |
| 10 | Status Set Stop-On-Message | 0 => No Stop-On-Message |
| 11 | Frame Stop-On-Error | 0 => No Stop-On-Frame (No Auto-Repeat) |
| 12 | Messge Stop-On-Error | 0 => No Stop-On-Error |
| 13 | Current Area B/A | 1/0 => Area B/A |
| 14 | MT | 0 => Not Functioning as an MT |
| 15 | RT/BC_L | 0 => Functioning as a BC |
| 15-0 | BC in Area A | 0x0000 |

BC CONTROL WORD REGISTER (Register Address 0x04)

| BIT | DESCRIPTION | COMMENT |
|---|---|---|
| 0 | RT to RT Format | 0 (Not Used in MIL-STD-2217) |
| 1 | Broadcast Format | 0 (Not Used in MIL-STD-2217) |
| 2 | Mode Code Format | 1/0 Mode Code/Message format |
| 3 | 1553A/B Select | 0 => Mil-Std-1553B Format (Effects Auto Repeat) |
| 4 | EOM Interrupt Enable | 1 => Enable EOM Interrupt |
| 5 | Mask Broadcast Bit | 0 (Not Used in MIL-STD-2217) |
| 6 | Off Line Self Test | 0 => Not Self Test |
| 7 | Bus Channel A/B | 1/0 => Bus B/A |
| 8 | Retry Enabled | 0 => Retries Not Enabled |
| 9 | Reserved Bits Mask | 0 => No Reserved Bits Masked |
| 10 | Terminal Flag Bit (S00) | 0 => Terminal Flag Bit Not Masked |
| 11 | Subsystem Flag Bit (S02) | 0 => Subsystem Flag Bit Not Masked |
| 12 | Subsystem Busy Bit (S03) | 0 => Subsystem Busy Bit Not Masked |
| 13 | Service Request Bit (S08) | 0 => Service Request Bit Not Masked |
| 14 | Illegal Bit (S10) | 0 => Illegal Bit Not Masked |
| 15 | Not Used | 0 |
| 15-0 | Bus A, Mil-Std-1553B Message | 0x0010 |
| 15-0 | Bus B, Mil-Std-1553B Message | 0x0090 |
| 15-0 | Bus A, Mil-Std-1553B Mode Code | 0x0014 |
| 15-0 | Bus B, Mil-Std-1553B Mode Code | 0x0094 |

BC FRAME TIME REMAINING REGISTER (Read Only, Register Address 0x0B)

| BIT | DESCRIPTION | COMMENT |
|---|---|---|
| 15-0 | BC Frame Time Remaining | Increments of 100 usecs. to 6.55 secs. |
| 15-0 | Not Used (Auto Repeat Not Enabled) | |

BC MESSAGE TIME REMAINING REGISTER (Read Only, Register Address 0x0C)

| BIT | DESCRIPTION | COMMENT |
|---|---|---|
| 15-0 | BC Message Time Remaining | Increments of 1 usec. to 65.5 msecs. |

BC FRAME TIME REGISTER (Register Address 0x0D)

| BIT | DESCRIPTION | COMMENT |
|---|---|---|
| 15-0 | BC Frame Time (Auto Repeat) | Increments of 100 usecs. to 6.55 secs. |
| 15-0 | Not Used (Auto Repeat Not Enabled) | |

RT STATUS WORD REGISTER (Read Only, Register Address 0x0E)

| BIT | DESCRIPTION (Mil-Std-1553B Format) | COMMENT |
|---|---|---|
| 0 | Terminal Flag | |
| 1 | Dynamic Bus Control Acceptance | |
| 2 | Subsystem Flag | |
| 3 | Busy | |
| 4 | Broadcast Command Received | |
| 5 | Reserved | Not masked (returned to protocol) |
| 6 | Reserved | Not masked (returned to protocol) |
| 7 | Reserved | Not masked (returned to protocol) |
| 8 | Service Request | |
| 9 | Instrumentation | |
| 10 | Message Error | |
| 15-11 | RT Address Bits 4-0 | |

BC MODE DESCRIPTOR STACKS

| PARAMETER | COMMENT |
|---|---|
| BLOCK STATUS WORD | Contains Messge Block Status |
| TIME TAG WORD | Resolution Programmed in Config. Reg. #2 |
| INTERMESSAGE GAP TIME WORD | Resolution in usecs. |
| MESSAGE BLOCK ADDRESS | Pointer to Starting Address of Message |

BLOCK STATUS WORD

| BIT | DESCRIPTION | COMMENT |
|---|---|---|
| 0 | Invalid Word | |
| 1 | Incorrect Sync Type | |
| 2 | Word Count Error | |
| 3 | Wrong Status Word Address/No Gap | |
| 4 | Good Data Block Transfer | |
| 5 | Retry Count 0 | |
| 6 | Retry Count 1 | |
| 7 | Masked Status Set | |
| 8 | Loop Test Failure | |

| | |
|---|---|
| 9 | No Response Timeout |
| 10 | Format Error |
| 11 | Status Set |
| 12 | Error Flag |
| 13 | Channel B/A |
| 14 | SOM |
| 15 | EOM |

BC MODE MESSAGE BLOCK

| PARAMETER (BC to RT Transfer) | COMMENT |
|---|---|
| BC Control Word (Same as BC Control Word Reg.) | Contains Messge Block Status |
| BC Command Word | Receive Command Word |
| Data Word #1 | |
| . . . | |
| Data Word #N | |
| Data Word #N Looped Back | |
| Status Word Received | Received from RT |

| PARAMETER (RT to BC Transfer) | COMMENT |
|---|---|
| BC Control Word (Same as BC Control Word Reg.) | Contains Messge Block Status |
| BC Command Word | Transmit Command Word |
| Command Word Looped Back | |
| Status Word Received | Received from RT |
| Data Word #1 | |
| . . . | |
| Data Word #N | |

RT OPERATION:

CONFIGURATION REGISTER #1 (Register Address 0x01)

| BIT | DESCRIPTION (Alternate RT Status) | COMMENT |
|---|---|---|
| 0 | RT Message In Progress | Read Only (1 => Message in Progress) |
| 11-1 | S10-0 | Direct Control over RT Status Word Bits |
| 12 | Message Monitor Enable | 0 => No Message Monitor |
| 13 | Current Area B/A | 1/0 => Area B/A |
| 14 | MT | 0 => Not Functioning as an MT |
| 15 | RT/BC_L | 1 => Functioning as a RT |
| 15-0 | RT in Area A | 0x8000 |

CONFIGURATION REGISTER #1 (Register Address 0x01)

| BIT | DESCRIPTION (Mil-Std-1553B) | COMMENT |
|---|---|---|
| 0 | RT Message In Progress | Read Only (1 => Message in Progress) |
| 6-1 | Not Used | Bits Not Used |
| 7 | RTFLAG* | 1/0 => Clears/Sets Terminal Flag |
| 8 | Subsystem Flag* | 1/0 => Clears/Sets Subsystem Flag |
| 9 | Service Request Flag* | 1/0 => Clears/Sets Service Request Bit |
| 10 | Busy Bit Flag* | 1/0 => Clears/Sets Busy Bit |
| 11 | Dynamic Bus Control Acceptance Flag* | 1 => Disables Dynamic Bus Control Acceptance |
| 12 | Message Monitor Enabled | 0 => No Message Monitor |
| 13 | Current Area B/A | 1/0 => Area B/A |
| 14 | MT | 0 => Not Functioning as an MT |
| 15 | RT/BC_L | 1 => Functioning as a RT |
| 15-0 | RT in Area A | 0x8F80 |

RT SUBADDRESS CONTROL WORD REGISTER (Register Address 0x04)

| BIT | DESCRIPTION | COMMENT |
|---|---|---|
| 2-0 | BCST: MM2-0 | |
| 3 | BCST: Circular Buffer Interrupt | |
| 4 | BCST: EOM Interrupt | |
| 7-5 | RX: MM2-0 | |
| 8 | RX: Circular Buffer Interrupt | |
| 9 | RX: EOM Interrupt | |
| 12-10 | TX: MM2-0 | |
| 13 | TX: Circular Buffer Interrupt | |
| 14 | TX: EOM Interrupt | |
| 15 | RX Double Buffering Enable | |

RT LAST COMMAND REGISTER (Register Address 0x0D)

| BIT | DESCRIPTION | COMMENT |
|---|---|---|
| 15-0 | Last Command Received by RT | |

RT STATUS WORD REGISTER (Read Only, Register Address 0x0E)

| BIT | DESCRIPTION (Mil-Std-1553B Format) | COMMENT |
|---|---|---|
| 15-0 | Last Status Word on Bus | Useful in Mil-Std-1553 Automatic Mode |

RT BIT WORD REGISTER (Read Only, Register Address 0x0F)

| BIT | DESCRIPTION | COMMENT |
|---|---|---|
| 0 | Command Word Contents Error | |
| 1 | RT - RT 2nd Command Word Error | |
| 2 | RT - RT No Response Error | |
| 3 | RT - RT Gap, Sync, Address Error | |
| 4 | Par/Man Error Word Received | |
| 5 | Incorrect Sync Received | |
| 6 | Low Word Count | |
| 7 | High Word Count | |
| 8 | Channel B/A | 1/0 => Active Channel B/A |
| 9 | Terminal Flag Inhibited | |
| 10 | Transmitter Shutdown_A | |
| 11 | Transmitter Shutdown_B | |
| 12 | Handshake Failure | |
| 13 | Loop Test Failure_A | |
| 14 | Loop Test Failure_B | |
| 15 | Transmitter Timeout | |

RT MODE DESCRIPTOR STACKS

| PARAMETER | COMMENT |
|---|---|
| BLOCK STATUS WORD | Contains Messge Block Status |
| TIME TAG WORD | Resolution Programmed in Config. Reg. #2 |
| DATA BLOCK POINTER | Location of Data Block |
| RECEIVED COMMAND WORD | Pointer to Look-up Table pointing to Data Block |

BLOCK STATUS WORD

| BIT | DESCRIPTION | COMMENT |
|---|---|---|
| 0 | Command Word Contents Error | |
| 1 | RT - RT Second Command Error | |
| 2 | RT - RT Gap/Sync/Address Error | |
| 3 | Invalid Word | |
| 4 | Incorrect Data Sync | |
| 5 | Word Count Error | |
| 6 | Illegal Command Word/Reserved | |
| 7 | Data Stack Rollover | |
| 8 | Loop Test Failure/Good Data Block Xfer | |
| 9 | No Response Timeout | |
| 10 | Format Error | |
| 11 | RT - RT Format Error | |
| 12 | Error Flag | |
| 13 | Channel B/A | |
| 14 | SOM | |
| 15 | EOM | |

MESSAGE ILLEGALIZATION MAPPING (Addresses 0x0300 through 0x03FF)

| BIT | DESCRIPTION | COMMENT |
|---|---|---|
| 0 | WC4/MC4 | 4th Bit of Word Count or Mode Code |
| 5-1 | SA4-0 | Subaddress |
| 6 | T/R | Transmit/Receive Bit |
| 7 | Own Address/Broadcast | 1/0 => Own Address/Broadcast |
| 15-8 | 0x30 | Upper half of Map's Address |

MT OPERATION:

CONFIGURATION REGISTER #1 (Register Address 0x01)

| BIT | DESCRIPTION (Mil-Std-1553A and McAir) | COMMENT |
|---|---|---|
| 0 | Monitor Active | Read Only (1 => Active) |
| 1 | Monitor Triggered | Read Only (1 => Triggered) |
| 2 | Monitor Enabled | Read Only (1 => Enabled) |
| 6-3 | Not Used | |
| 7 | External Trigger Enable | 0 => No External Trigger |
| 8 | Not Used | |
| 9 | Stop On Trigger | 1 => Stop Storing when Command Matches |
| 10 | Start On Trigger | 1 => Start Storing when Command Matches |
| 11 | Trigger Enabled | 0 => Trigger Not Activated |
| 12 | Message Monitor Enabled | 1 => Message Monitor |
| 13 | Current Area B/A | 1/0 => Area B/A |
| 14 | MT | 1 => Functioning as an MT |
| 15 | RT/BC_L | 0 => Not Functioning as a RT |
| 15-0 | MT in Area A | 0x5600 |

MONITOR DATA STACK ADDRESS REGISTER (Register Address 0x0A)

| BIT | DESCRIPTION | COMMENT |
|---|---|---|
| 15-0 | Monitor Data Stack Address | |

MONITOR TRIGGER REGISTER (Register Address 0x0D)

| BIT | DESCRIPTION | COMMENT |
|---|---|---|
| 15-0 | Monitor Trigger Word | |

GENERAL USE REGISTERS:

INTERRUPT MASK REGISTER (Register Address 0x00)

| BIT | DESCRIPTION | COMMENT |
|---|---|---|
| 0 | End Of Message | Enables Message Completed Interrupt |
| 1 | BC Status Set | Invalid RT Address or Unexpected Status Bit |
| 2 | RT/BC Format Error | Loop Test or Message Error or Response Timeout |
| 3 | BC End-Of-Frame | Enables Frame Completed Interrupt |
| 4 | RT Message Completed | Enables Specific Subaddress Message Interrupt |
| 5 | RT Data Stack Rollover | Enables Data Stack Rollover Interrupt |
| 6 | Time Tag Rollover | Enables Time Tag Rollover Interrupt |
| 7 | RT Address Parity Error | Enables RT Address Parity Error Interrupt |
| 8 | BC Retry | Enables BC Retried Message Interrupt |
| 9 | RT Mode/MT Pattern Trigger | Enables Specific Mode Code/Cmd Word Interrupt |
| 10 | MT Data Stack Rollover | Enables Monitor Data Stack Rollover Interrupt |
| 11 | MT Command Stack Rollover | Enables Monitor Command Stack Rollover Interrupt |
| 12 | BC/RT Command Stack Rollover | Enables Command Stack Rollover Interrupt |
| 13 | Transmitter Timeout | Enables Transmitter Timeout Interrupt |
| 14 | RAM Parity Error | Enables RAM Parity Error Interrupt |
| 15 | Not Used | |
| 15-0 | All Operations | 0x2207 |

START/RESET REGISTER (Write Only, Register Address 0x03)

| BIT | DESCRIPTION | COMMENT |
|---|---|---|
| 0 | Reset | 1 => Resets All Registers to Default Value |
| 1 | BC/MT Start | 1 => Starts Sending/Storing Messages |
| 2 | Interrupt Reset | 1 => Resets Interrupt Status Register to 0x0000 |
| 3 | Time Tag Reset | 1 => Resets Time Tag Register to 0x0000 |
| 4 | Time Tag Test Clock | 1 => Increments Time Tag Register in Test Mode |
| 5 | BC Stop-On-Frame | 1 => Stops BC Mode Following Current Frame |
| 6 | BC/Selected MT Stop-On-Message | 1 => Stops Operation Following Current Message |
| 15-7 | Reserved | |

| | |
|---|---|
| 0x0001 | RESET |
| 0x0002 | START |
| 0x0004 | CLEAR_STATUS |
| 0x0008 | RESET_TIME_TAG |
| 0x0040 | STOP_FOLLOWING CURRENT MESSAGE |

BC/RT COMMAND STACK POINTER REGISTER (Read Only, Register Address 0x03)

| BIT | DESCRIPTION | COMMENT |
|---|---|---|
| 15-0 | Stack A | 0x0000 |
| 15-0 | Stack B | 0x0FFF |

TIME TAG REGISTER (Register Address 0x05)

| BIT | DESCRIPTION | COMMENT |
|---|---|---|
| 15-0 | Time Tag | Resolution set for 16 usecs |

INTERRUPT STATUS REGISTER (Read Only, Register Address 0x06)

| BIT | DESCRIPTION | COMMENT |
|---|---|---|
| 0 | End Of Message | Message Completed Interrupt |
| 1 | BC Status Set | Invalid RT Address or Unexpected Status Bit |
| 2 | RT/BC Format Error | Loop Test or Message Error or Response Timeout |
| 3 | BC End-Of-Frame | Frame Completed Interrupt |
| 4 | RT Message Completed | Specific Subaddress Message Interrupt |
| 5 | RT Data Stack Rollover | Data Stack Rollover Interrupt |
| 6 | Time Tag Rollover | Time Tag Rollover Interrupt |
| 7 | RT Address Parity Error | RT Address Parity Error Interrupt |
| 8 | BC Retry | BC Retried Message Interrupt |
| 9 | RT Mode/MT Pattern Trigger | Specific Mode Code/Cmd Word Interrupt |
| 10 | MT Data Stack Rollover | Monitor Data Stack Rollover Interrupt |
| 11 | MT Command Stack Rollover | Monitor Command Stack Rollover Interrupt |
| 12 | BC/RT Command Stack Rollover | Command Stack Rollover Interrupt |
| 13 | Transmitter Timeout | Transmitter Timeout Interrupt |
| 14 | RAM Parity Error | RAM Parity Error Interrupt |
| 15 | Master Interrupt | Indicates an Interrupt Occurred |

What is claimed is:

1. An apparatus for reprogramming a plurality of remote terminals and a plurality of bus controllers connected to a first communications bus, said first communications bus being a command/response time division multiplex data bus, said reprogramming apparatus interfacing with a second communications bus, said reprogramming apparatus comprising:

an integrated circuit memory card;
transceiver means for receiving data from said second communications bus and transmitting data to said second communications bus, said transceiver means formatting the data received thereby to a digital format, the data received from said second communications bus being used to reprogram said remote terminals and said bus controllers connected to said first communications bus;
digital signal processor means for providing a plurality of data transfer control signals, a plurality of address signals and a plurality of data bytes, said digital signal processor means having direct access to said integrated circuit memory card such that data to and from said second communications bus is transferred between said integrated circuit memory card and said second communications bus via said transceiver means and said digital signal processor means;
first programmed array logic means for receiving said data transfer control signals from said digital signal processor means and for decoding said data transfer control signals to control the transfer of data between said second communications bus and said integrated circuit memory card, said integrated circuit memory card storing said data therein;
said first programmed array logic means upon decoding said data transfer control signals generating at least one read signal and at least one write signal;
memory means electrically coupled to said digital signal processor means, said memory means containing software for said digital signal processor means, said software controlling the handling and interpretation of data to and from said first and second communications buses by enabling the operation of said digital signal processor means to accommodate the use of said digital signal processor means with the bus standards, data protocols and formats of said first and second communications buses;
second programmed array logic means for receiving at least one of said data transfer control signals and at least some of said address signals from said digital signal processor means, said second programmed array logic means decoding said data transfer control signals and said address signals received thereby to provide a transceiver select signal to enable said transceiver means, a plurality of interface select signals and a bus controller select signal;
programmed interface means for receiving at least two of said address signals and said data bytes from said digital signal processor means, said interface select signals from said second programmed array logic means and said read signal and said write signal from said first programmed array logic means;
said programmed interface means in response to said at least two address signals, said interface select signals, said data bytes, said read signal and said write signal selectively enabling either one of said remote terminals or one of said bus controllers for reprogramming; and
bus controller means for providing an interface between said digital signal processor means and said first communications bus, said bus controller means formatting the reprogramming data being supplied to said remote terminal or said bus controller being reprogrammed in accordance with the bus standards, data protocols and formats of said first communications bus;
said second programmed array logic means providing said bus controller select signal to said bus controller means enabling said bus controller means allowing said bus controller means to control the transfer of reprogramming data from said digital signal processor means via said first communications bus to said remote terminal or said bus controller being reprogrammed;
said digital signal processor controlling the transfer of reprogramming data from said integrated circuit memory card to said bus controller means.

2. The reprogramming apparatus of claim 1 wherein said first communications bus is a Military Standard 1553 multiplex data bus.

3. The reprogramming apparatus of claim 1 wherein said second communications bus is an RS-232 communications bus.

4. The reprogramming apparatus of claim 1 wherein said memory means comprises an electrically erasable programmed read only memory.

5. The reprogramming apparatus of claim 1 wherein said programmed interface means comprises:
first, second and third programmable peripheral interfaces, each of said programmable peripheral interfaces being electrically coupled to said digital signal processor means, said first programmed array logic means and said second programmable array logic means;
each of said programmable peripheral interfaces receiving said at least two address signals and said data bytes from said digital signal processor means, said read signal and said write signal from said first programmed array logic means and one of said interface select signals from said second programmed interface;
each of said programmable peripheral interfaces being enabled by one of said interface select signals;
each of said programmable peripheral interfaces having first, second and third eight bit output ports, said address signals controlling the selection of the output port to be enabled and said read and write signals enabling the selected output port;
said first, second and third programmable peripheral interfaces providing at each enabled output thereof between one and eight discrete logic signals in response to one of said data bytes; and
said discrete logic signals when supplied to said first communications bus selectively enabling one of said remote terminals or one of said bus controllers for reprogramming allowing said selected remote terminal or said selected bus controller to be reprogrammed by said reprogramming apparatus.

6. The reprogramming apparatus of claim 1 wherein said bus controller being reprogrammed is an AN/AYK-14 computer.

7. The reprogramming apparatus of claim 1 wherein said bus controller being reprogrammed comprises an AN/ALR-67 Radar Warning Receiver.

8. The reprogramming apparatus of claim 1 wherein said remote terminal being reprogrammed comprises an AN/ALQ-126B Defensive Electronic Counter Measures Set.

9. An apparatus for reprogramming a plurality of remote terminals and a plurality of bus controllers connected to a first communications bus, said first communications bus being a command/response time division multiplex data bus, said reprogramming apparatus interfacing with a second communications bus, said reprogramming apparatus comprising:

an integrated circuit memory card;

first transceiver means for receiving data from said second communications bus and transmitting data to said second communications bus, said first transceiver means formatting the data received thereby to a digital format, the data received from said second communications bus being used to reprogram said remote terminals and said bus controllers connected to said first communications bus;

digital signal processor means for providing a plurality of data transfer control signals, a plurality of address signals and a plurality of data bytes, said digital signal processor means having direct access to said integrated circuit memory card such that data to and from said second communications bus is transferred between said integrated circuit memory card and said second communications bus via said first transceiver means and said digital signal processor means;

first programmed array logic means for receiving said data transfer control signals from said digital signal processor means and for decoding said data transfer control signals to control the transfer of data between said second communications bus and said integrated circuit memory card, said integrated circuit memory card storing said data therein;

said first programmed array logic means upon decoding said data transfer control signals generating at least one read signal and at least one write signal;

memory means electrically coupled to said digital signal processor means, said memory means containing software for said digital signal processor means, said software controlling the handling and interpretation of data to and from said first and second communications buses by enabling the operation of said digital signal processor means to accommodate the use of said digital signal processor means with the bus standards, data protocols and formats of said first and second communications buses;

second programmed array logic means for receiving at least one of said control signals and at least some of said address signals from said digital signal processor means, said second programmed array logic means decoding said control signals and said address signals received thereby to provide a first transceiver select signal to enable said first transceiver means, a second transceiver select signal, a plurality of interface select signals and a bus controller select signal;

programmed interface means for receiving at least two of said address signals and said data bytes from said digital signal processor means, said interface select signals from said second programmed array logic means and said read signal and said write signal from said first programmed array logic means;

said programmed interface means in response to said at least two address signals, said interface select signals, said data bytes and said read and said write signals selectively enabling either one of said remote terminals or one of said bus controller for reprogramming; and bus controller means for providing an interface between said digital signal processor means and said first communications bus, said bus controller means formatting the reprogramming data being supplied to said remote terminal or said bus controller being reprogrammed in accordance with the bus standards, data protocols and formats of said first communications bus;

said second programmed array logic means providing said bus controller select signal to said bus controller means enabling said bus controller means allowing said bus controller means to control the transfer of reprogramming data from said digital signal processor means via said first communications bus to said remote terminal or said bus controller being reprogrammed;

said digital signal processor controlling the transfer of reprogramming data from said integrated circuit memory card to said bus controller means; and second transceiver means electrically coupled to said digital signal processor means and a third communications bus, said second transceiver means being enable by said second interface select signal from said second programmed array logic means allowing said digital signal processor means to communicate with said third communications bus;

said second transceiver means receiving said read signal and write signal from said first programmed array logic means, said read signal and said write signal controlling a direction of a data transfer between said digital signal processor means and said second transceiver means.

10. The reprogramming apparatus of claim 9 wherein said second communications bus is an RS-422 communications bus.

11. The reprogramming apparatus of claim 9 wherein said second communications bus is an IEEE-488 communications bus.

* * * * *